US009311038B2

(12) United States Patent
Park et al.

(10) Patent No.: US 9,311,038 B2
(45) Date of Patent: Apr. 12, 2016

(54) SYSTEM AND METHOD FOR PROVIDING CLOUD PRINTING SERVICE

(71) Applicant: Samsung Electronics Co., Ltd., Suwon-si (KR)

(72) Inventors: Jeong-jin Park, Seongnam-si (KR); Jong-yoon Lim, Suwon-si (KR); Yong-chan Kwon, Anyang-si (KR); Jae-yeong So, Suwon-si (KR); Dong-wook Lee, Seongnam-si (KR); Mee-kyung Ryu, Seongnam-si (KR); Jung-mo Yeon, Suwon-si (KR); Hwan-joon Choi, Yongin-si (KR); Kwang-soo Ha, Seoul (KR); Hyun-il Lee, Namyangju-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/503,238

(22) Filed: Sep. 30, 2014

(65) Prior Publication Data

US 2015/0092233 A1 Apr. 2, 2015

Related U.S. Application Data

(60) Provisional application No. 61/937,835, filed on Feb. 10, 2014.

(30) Foreign Application Priority Data

| | | |
|---|---|---|
| Sep. 30, 2013 | (KR) | 10-2013-0116716 |
| Sep. 30, 2013 | (KR) | 10-2013-0116717 |
| Sep. 30, 2013 | (KR) | 10-2013-0116718 |
| Sep. 30, 2013 | (KR) | 10-2013-0116917 |
| Sep. 30, 2013 | (KR) | 10-2013-0116918 |
| Sep. 30, 2013 | (KR) | 10-2013-0116919 |
| Sep. 30, 2013 | (KR) | 10-2013-0116920 |
| Sep. 30, 2013 | (KR) | 10-2013-0116921 |
| Jan. 29, 2014 | (KR) | 10-2014-0011733 |
| Feb. 10, 2014 | (KR) | 10-2014-0015172 |
| Mar. 7, 2014 | (KR) | 10-2014-0027433 |
| Mar. 7, 2014 | (KR) | 10-2014-0027434 |
| Mar. 7, 2014 | (KR) | 10-2014-0027435 |
| Mar. 7, 2014 | (KR) | 10-2014-0027436 |
| Mar. 7, 2014 | (KR) | 10-2014-0027437 |
| Mar. 7, 2014 | (KR) | 10-2014-0027438 |
| Mar. 7, 2014 | (KR) | 10-2014-0027439 |
| Mar. 7, 2014 | (KR) | 10-2014-0027440 |
| Mar. 7, 2014 | (KR) | 10-2014-0027441 |
| Mar. 7, 2014 | (KR) | 10-2014-0027465 |
| Mar. 7, 2014 | (KR) | 10-2014-0027466 |
| Aug. 13, 2014 | (KR) | 10-2014-0105434 |

(51) Int. Cl.
*G06F 15/00* (2006.01)
*G06F 3/12* (2006.01)

(52) U.S. Cl.
CPC ............ *G06F 3/1288* (2013.01); *G06F 3/1203* (2013.01); *G06F 3/126* (2013.01); *G06F 3/1292* (2013.01)

(58) Field of Classification Search
CPC .................................................... G06F 3/1292
USPC ........................................................ 358/1.15
See application file for complete search history.

(56) References Cited

U.S. PATENT DOCUMENTS 8,189,225 B1 5/2012 Lo et al.
8,482,776 B2 7/2013 DeRoller (Continued)

FOREIGN PATENT DOCUMENTS

EP 2413234 2/2012
KR 10-2012-0012569 2/2012

(Continued)

OTHER PUBLICATIONS

International Search Report and Written Opinion of the International Searching Authority dated Dec. 23, 2014 in International Application PCT/KR2014/009211.

(Continued)

*Primary Examiner* — Saeid Ebrahimi Dehkordy
(74) *Attorney, Agent, or Firm* — Staas & Halsey LLP

(57) ABSTRACT

Provided is an image forming system operable to provide a cloud printing service, the image forming system comprising: a transmitting device operable to transmit content by designating a target phone number; a cloud printing server operable to receive the target phone number and the content from the transmitting device; a receiving device assigned with the target phone number and operable to receive an upload notification of the content with respect to the target phone number from the cloud printing server; and an image forming device operable to print the content by receiving the content from the cloud printing server, wherein the cloud printing server transmits the content to the image forming device registered in the target phone number when the cloud printing service is requested for the content to the target phone number.

23 Claims, 252 Drawing Sheets

(56) References Cited

U.S. PATENT DOCUMENTS

| | | | |
|---|---|---|---|
| 2005/0203805 A1 | 9/2005 | Clough et al. | |
| 2011/0299110 A1 | 12/2011 | Jazayeri et al. | |
| 2012/0057189 A1 | 3/2012 | DeRoller | |
| 2012/0057193 A1 | 3/2012 | Jazayeri et al. | |
| 2012/0140285 A1 | 6/2012 | Kamath et al. | |
| 2012/0147420 A1* | 6/2012 | Nishimi ................ | G06F 3/1204 358/1.15 |
| 2012/0284638 A1 | 11/2012 | Cutler et al. | |
| 2012/0317621 A1 | 12/2012 | Mihara | |
| 2013/0021638 A1 | 1/2013 | Hong et al. | |
| 2013/0238372 A1 | 9/2013 | Jordan | |
| 2013/0268999 A1 | 10/2013 | Kiang et al. | |
| 2013/0278966 A1 | 10/2013 | Saito et al. | |
| 2013/0325595 A1 | 12/2013 | Ilicak | |
| 2014/0029047 A1 | 1/2014 | Giannetti et al. | |

FOREIGN PATENT DOCUMENTS

| | | |
|---|---|---|
| KR | 10-2015-0037384 | 4/2015 |
| KR | 10-2015-0094191 | 8/2015 |
| WO | 2013/095498 | 6/2013 |

OTHER PUBLICATIONS

Erlang Solutions KRK "ESL MongooseIM vs. P1 ejabberd (Part 1)", Nov. 2012, URL<http://soerlang.tumblr.com/post/35563581435/esl-mongooseim-vs-p1-ejabberd-part-I-piotr-nosek>.

DailyRaga, "WSO2 vs ForgeRock Comparison for Identity & Access Management", Jan. 2014, URL < http://www.dailyraga.com/security/WSO2-vs-forgerock-comparison-for-identity-access-management/>.

Press Release, "HP Introduces the Future of Printing: Web Connected and Cloud Aware", Jun. 2010, 3 pages.

Alma Buelva, "HP unveils ePrint-enabled printers" Nov. 1, 2010, 3 pages.

URL: http://it.donga.com/1749/, Jul. 1, 2010, 4 pages.

Hewlett-Packard Development Company, L.P. "Essar Group executives enjoy printing on the move", 2011, 4 pages.

Hewlett-Packard Development Company, L.P. "Radisson Blu Hotel on Golden Lane offers guests the ability to print from virtually anywhere", 2012, 2 pages.

Hewlett-Packard Development Company, L.P. "Amaisys Technologies reduces print times and improves remote worker productivity, using the HP Designjet T520 ePrinter with HP Designjet ePrint & Share", 2012, 2 pages.

Press Release, "HP Reports First Quarter 2011 Results", Feb. 2011, 20 pages.

"HP Mobile Printing", http://www.hp.com/global/us/en/eprint/, 20 pages.

"HP ePrint", Wikipedia, http://en.wikipedia.org/wiki/hp_eprint, 7 pages.

Hewlett-Packard Development Company, L.P. "HP ePrint & Share", 2011, 2 pages.

"Print anywhere, anytime, with any device", 4AA0-1601ENW, 2010, 2 pages.

"HP ePrint Enterprise mobile printing solution", Mar. 2010, 2 pages.

HewlettPackard, "HP ePrint", 2 pages.

HP Mobile Printing Handy Reference Guide, 2010, 2 pages.

TechDepot by OfficeDepot, "HP ePrint is a Mobile Printing Feature", 2011, 1 page.

* cited by examiner

| PRINT FILE | PRINTING NUMBER OF TIMES |
|---|---|
| a.doc | 3 |

| USER (PRINTER) | PHONE NUMBER | PRINT FILE REFERENCE |
|---|---|---|
| A | 010-AAA-AAAA | a.doc |
| B | 010-BBB-BBBB | a.doc |
| C | 010-CCC-CCCC | a.doc |

5700

| FILE NAME | PRINTABLE NUMBER OF TIMES |
|---|---|
| document.doc | 1 |
| image.jpg | 3 |

5710

| PHONE NUMBER | DOCUMENT REFERENCE |
|---|---|
| 010-1111-1111 | document.doc |
| 010-2222-2222 | image.jpg |
| 010-3333-3333 | image.jpg |
| 010-4444-4444 | image.jpg |

5910

| PHONE NUMBER | DOCUMENT REFERENCE |
|---|---|
| 010-1111-1111 | document.doc |
| 010-2222-2222 | image.jpg |
| 010-3333-3333 | image.jpg |
| 010-4444-4444 | image.jpg |

5900

| FILE NAME | PRINTABLE DURATION | REGISTERED DATE |
|---|---|---|
| document.doc | 2일 | 2013-12-01 |
| image.jpg | 2일 | 2013-12-02 |

6010

| PHONE NUMBER | DOCUMENT REFERENCE |
|---|---|
| 010-2222-2222 | image.jpg |
| 010-3333-3333 | image.jpg |
| 010-4444-4444 | image.jpg |

6000

| FILE NAME | PRINTABLE DURATION | REGISTERED DATE |
|---|---|---|
| ~~image.jpg~~ | ~~2일~~ | 2013-12-02 |

Response Headers:

GET HTTP/1.1 200 OK
Server: Apache-Coyote/1.1
Content-Type: text/json;charset=UTF-8
Transfer-Encoding: chunked
Date: Mon, 16 Dec 2013 02:11:02 GMT

Response:

12120

```
{"phoneNumber":
            ["01012345678", "01023456789", "01034567890"],
"time":
            [" 0000_0000", "1000_1200", "1000_1200", "1000_1200", "1000_1200",
"1000_1200" , "0000_0000"]
}
```

Request URL:
http://xx.xx.xx.xx/transmit/pp
Request Headers
Accept:
text/html,application/xhtml+xml,application/xml;q=0.9,image/webp,*/*;q=0.8
Content-Type:
multipart/form-data; boundary=----WebKitFormBoundaryFpwivdMZX2QPchcV
Origin:
nul
Referer:
User-Agent:
Mozilla/5.0 (Windows NT 6.1; WOW64) AppleWebKit/537.36 (KHTML, like Gecko) Chrome/30.0.1599.101 Safari/537.36
Request Payload
------WebKitFormBoundaryFpwivdMZX2QPchcV
12140
Content-Disposition: form-data; name="ppt" 0000_0000,1000_1200,1000_1200, 1000_1200, 1000_1200,1000_1200,0000_0000
-----WebKitFormBoundaryFpwivdMZX2QPchcV
12145
Content-Disposition: form-data; name="ppal" 01012345678,01023456789, 01034567890
-----WebKitFormBoundaryFpwivdMZX2QPchcV--

FIG. 133A

Individual Address Book

| User Name | Fax Number | E-mail |
|---|---|---|
| 1. Jane | 010-xxxx-xxxx | aa@sumsung.com |
| 2. Jack | 010-xxxx-xxxx | bb@sumsung.com |
| 3. Bob | 010-xxxx-xxxx | cc@sumsung.com |

FIG. 133B

Group Address Book

| Group Name | No. of member |
|---|---|
| Company | 3 |

FIG. 133C

Any# Address Book

| Name | Number |
|---|---|
| 1. Jane | 010-xxxx-xxxx |
| 2. Jack | 010-xxxx-xxxx |
| 3. Bob | 010-xxxx-xxxx |

| JOB IDENTIFIER | CONTENT | PHONE NUMBER |
|---|---|---|
| 1 | a.jpg | 010-xxx-xxxx |
| 2 | b.jpg | 010-xxx-xxxx |
| 3 | c.jpg | 010-xxx-xxxx |

| JOB IDENTIFIER | CONTENT | PHONE NUMBER |
|---|---|---|
| 1 | a.jpg | 010-yyy-yyyy |

| JOB IDENTIFIER | CONTENT | PHONE NUMBER |
|---|---|---|
| 1 | a.jpg | 010-zzz-zzzz |

| JOB IDENTIFIER | CONTENT KEY |
|---|---|
| 1 | a.jpg |

| JOB IDENTIFIER | CONTENT KEY | PHONE NUMBER |
|---|---|---|
| 1 | abc | 010- yyy-yyyy |

| JOB IDENTIFIER | CONTENT KEY | PHONE NUMBER |
|---|---|---|
| 1 | abc | 010- yyy-yyyy |

SYSTEM AND METHOD FOR PROVIDING CLOUD PRINTING SERVICE

CROSS-REFERENCE TO RELATED APPLICATIONS

This application claims the priority benefit of Korean Patent Application No. 10-2013-0116716, filed on Sep. 30, 2013, Korean Patent Application No. 10-2013-0116717, filed on Sep. 30, 2013, Korean Patent Application No. 10-2013-0116718, filed on Sep. 30, 2013, Korean Patent Application No. 10-2013-0116917, filed on Sep. 30, 2013, Korean Patent Application No. 10-2013-0116918, filed on Sep. 30, 2013, Korean Patent Application No. 10-2013-0116919, filed on Sep. 30, 2013, Korean Patent Application No. 10-2013-0116920, filed on Sep. 30, 2013, Korean Patent Application No. 10-2013-0116921, filed on Sep. 30, 2013, Korean Patent Application No. 10-2014-0011733, filed on Jan. 29, 2014, Korean Patent Application No. 10-2014-0015172, filed on Feb. 10, 2014, Korean Patent Application No. 10-2014-0027433, filed on Mar. 7, 2014, Korean Patent Application No. 10-2014-0027434, filed on Mar. 7, 2014, Korean Patent Application No. 10-2014-0027435, filed on Mar. 7, 2014, Korean Patent Application No. 10-2014-0027436, filed on Mar. 7, 2014, Korean Patent Application No. 10-2014-0027437, filed on Mar. 7, 2014, Korean Patent Application No. 10-2014-0027438, filed on Mar. 7, 2014, Korean Patent Application No. 10-2014-0027439, filed on Mar. 7, 2014, Korean Patent Application No. 10-2014-0027440, filed on Mar. 7, 2014, Korean Patent Application No. 10-2014-0027441, filed on Mar. 7, 2014, Korean Patent Application No. 10-2014-0027465, filed on Mar. 7, 2014, Korean Patent Application No. 10-2014-0027466, filed on Mar. 7, 2014, Korean Patent Application No. 10-2014-0105434, filed on Aug. 13, 2014, in the Korean Intellectual Property Office, and U.S. Provisional Application No. 61/937,835, filed on Feb. 10, 2014, in the USPTO, the disclosures of which are incorporated herein in their entirety by reference.

BACKGROUND

1. Field

One or more embodiments relate to system and method for providing cloud printing service 2. Description of the Related Art Examples of an image forming apparatus include individual apparatuses, such as a printer, a scanner, a photocopier, and a facsimile, and a multi-function product (MFP) in which various functions of the individual apparatuses are combined. Recently, such an image forming apparatus includes a wired communication module, such as Ethernet, or a wireless communication module, such as Wi-Fi, Wi-Fi direct, near field communication (NFC), Bluetooth, zigbee, or infrared data association (IrDA), to be connected to a mobile device or a user device, such as a laptop, through a network. Also, the image forming apparatus may upload or download a document to or from a cloud server by connecting to the cloud server by using the wired or wireless communication module.

SUMMARY

One or more embodiments may include a cloud printing system and a method for providing a phone-number based cloud printing service. Also, one or more embodiments include a computer-readable recording medium having recorded thereon a program for executing the method.

Additional aspects will be set forth in part in the description which follows and, in part, will be apparent from the description, or may be learned by practice of the presented embodiments.

According to one or more embodiments, there is provided an image forming system operable to provide a cloud printing service, the image forming system comprising: a transmitting device operable to transmit content by designating a target phone number; a cloud printing server operable to receive the target phone number and the content from the transmitting device; a receiving device assigned with the target phone number and operable to receive an upload notification of the content with respect to the target phone number from the cloud printing server; and an image forming device operable to print the content by receiving the content from the cloud printing server, wherein the cloud printing server transmits the content to the image forming device registered in the target phone number when the cloud printing service is requested for the content to the target phone number.

The transmitting device may include: a user interface unit operable to receive input information about the content and the target phone number; a controller operable to generate print job information including the content and the target phone number; and a network interface unit operable to transmit the generated print job information to the cloud printing server.

The transmitting device may include: a user interface unit operable to display a list of contacts and a list of contents, which are stored in the transmitting device; and a network interface unit operable to transmit the content and the target phone number to the cloud printing server when the content and the target phone number are set from among the lists displayed through the user interface unit.

The user interface unit may display the list of contents, which is stored in the transmitting device when the list of contacts is displayed and the target phone number is selected from the displayed list of contacts.

The user interface unit may display the list of contacts, which is stored in the transmitting device when the list of contents is displayed and the content is selected from the displayed list of contents.

The cloud printing server may include: a network interface unit operable to receive print job information including the content and the target phone number from the transmitting device; a controller operable to register the print job information by mapping the content and the target phone number; and a storage unit operable to store the registered print job information.

The cloud printing server may receive, from at least one of the receiving device and the image forming device, registration request information including the target phone number and identification information of the image forming device to be mapped to the target phone number, and manages registration information about the image forming device mapped to the target phone number based on the received registration request information.

The identification information may include a media access control (MAC) address of the image forming device, the cloud printing server may receive, from the image forming device, meta information comprising at least one of the MAC address, an internet protocol (IP) address, a serial number, and a product name of the image forming device, maps the target phone number and the image forming device by using the identification information and the meta information when the registration request information is received, and transmits the meta information of the image forming device to the receiving device, and the receiving device may identify the image forming device registered in the target phone number by using the meta information received from the cloud printing server.

The receiving device may include: a network interface unit operable to receive, from the cloud printing server, the upload notification indicating that the content corresponding to the target phone number is registered in the cloud printing server; a user interface unit operable to display information about the content based on the received upload notification; and a controller operable to generate a print request about the content, wherein the network interface unit may transmit the generated print request to the cloud printing server.

When the print request is received from the receiving device, the cloud printing server may identify the image forming device for processing the received print request and transmits print data of the content to the identified image forming device.

According to one or more embodiments, there is provided a method of providing, by an image forming system, a cloud printing service, the method comprising: transmitting, by a transmitting device, content by designating a target phone number; receiving, by a cloud printing server, the target phone number and the content from the transmitting device; receiving, by a receiving device assigned with the target phone number, an upload notification of the content with respect to the target phone number from the cloud printing server; and printing, by an image forming device, the content by receiving the content from the cloud printing server, wherein the cloud printing server transmits the content to the image forming device registered in the target phone number when the cloud printing service is requested for the content to the target phone number.

The method may further include displaying, by the transmitting device, a list of contacts and a list of contents, which are stored in the transmitting device, wherein the transmitting of the content may include, when the content and the target phone number are set from among the displayed lists, transmitting the set content and the set target phone number to the cloud printing server.

The method may further include receiving, by the cloud printing server, print job information including the content and the target phone number from the transmitting device; registering, by the cloud printing server, the print job information by mapping the content and the target phone number; and storing, by the cloud printing server, the registered print job information.

The method may further include receiving, by the cloud printing server, registration request information including the target phone number and identification information of the image forming device to be mapped to the target phone number from at least one of the receiving device and the image forming device; updating, by the cloud printing server, registration information about the image forming device mapped to the target phone number based on the received registration request information; and storing, by the cloud printing server, the updated registration information.

The identification information may include a media access control (MAC) address of the image forming device, and the method may further include: receiving, by the cloud printing server, meta information comprising at least one of the MAC address, an internet protocol (IP) address, a serial number, and a product name of the image forming device, from the image forming device; mapping, by the cloud printing server, the target phone number and the image forming device by using the identification information and the meta information when the registration request information is received; transmitting, by the cloud printing server, the meta information of the image forming device to the receiving device; and identifying, by the receiving device, the image forming device registered in the target phone number by using the meta information received from the cloud printing server.

The method may further include: receiving, by the receiving device, the upload notification indicating that the content corresponding to the target phone number is registered in the cloud printing server, from the cloud printing server; displaying, by the receiving device, information about the content based on the received upload notification; generating, by the receiving device, a print request about the content; and transmitting, by the receiving device, the generated print request to the cloud printing server.

According to one or more embodiments, there is provided an image forming system operable to provide a cloud printing service, the image forming system may include: a cloud printing server operable to receive, from a transmitting device, content and a target phone number of a receiving device to which the cloud printing service for the content is to be provided; and an image forming device operable to print the content by receiving the content from the cloud printing server, wherein the cloud printing server maps and registers the target phone number and the image forming device so as to perform the cloud printing service on the target phone number requested by the transmitting device.

The cloud printing server may receive, from at least one of the receiving device and the image forming device, the target phone number and identification information of the image forming device to be mapped to the target phone number, and manages registration information about the image forming device mapped to the target phone number based on the received registration request information.

According to one or more embodiments, there is provided a method of providing, by an image forming system, a cloud printing service, the method may include: receiving, by a cloud printing server, content and a target phone number of a receiving device to which the cloud printing service for the content is to be provided, from a transmitting device; receiving, by an image forming device, the content from the cloud printing server; and printing, by the image forming device, the received content, wherein the cloud printing server maps and registers the target phone number and the image forming device so as to process a request of the cloud printing service on the target phone number.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of embodiments, taken in conjunction with the accompanying drawings in which:

FIG. 114 is a flowchart illustrating a method of providing a cloud printing service, according to an embodiment;

FIG. 115 is a flowchart illustrating a method of providing a cloud printing service, according to an embodiment;

FIG. 116 is a flowchart illustrating a method of providing a cloud printing service, according to an embodiment;

FIG. 117 is a flowchart illustrating a method of providing a cloud printing service, according to an embodiment;

FIG. 118 is a flowchart illustrating a method of providing a cloud printing service, according to an embodiment;

FIG. 119 is a flowchart illustrating a method of providing a cloud printing service, according to an embodiment;

FIG. 120 is a diagram for describing a process of providing a cloud printing service, which is performed by a cloud system, according to an embodiment;

FIG. 121A is a diagram of an HTTP packet for receiving options set in a cloud server, according to an embodiment;

FIG. 121B is a diagram of an HTTP packet for transmitting an option to be set in a cloud server, according to an embodiment;

FIGS. 122A through 122C are diagrams for describing a process of setting a time slot when direct printing is performable, according to embodiments;

FIGS. 123A through 123C are diagrams for describing a process of setting a sender who is allowed to perform direct printing, according to embodiments;

FIG. 124 is a diagram of a table for managing options about whether direct printing is performable, according to an embodiment;

Figure 125:
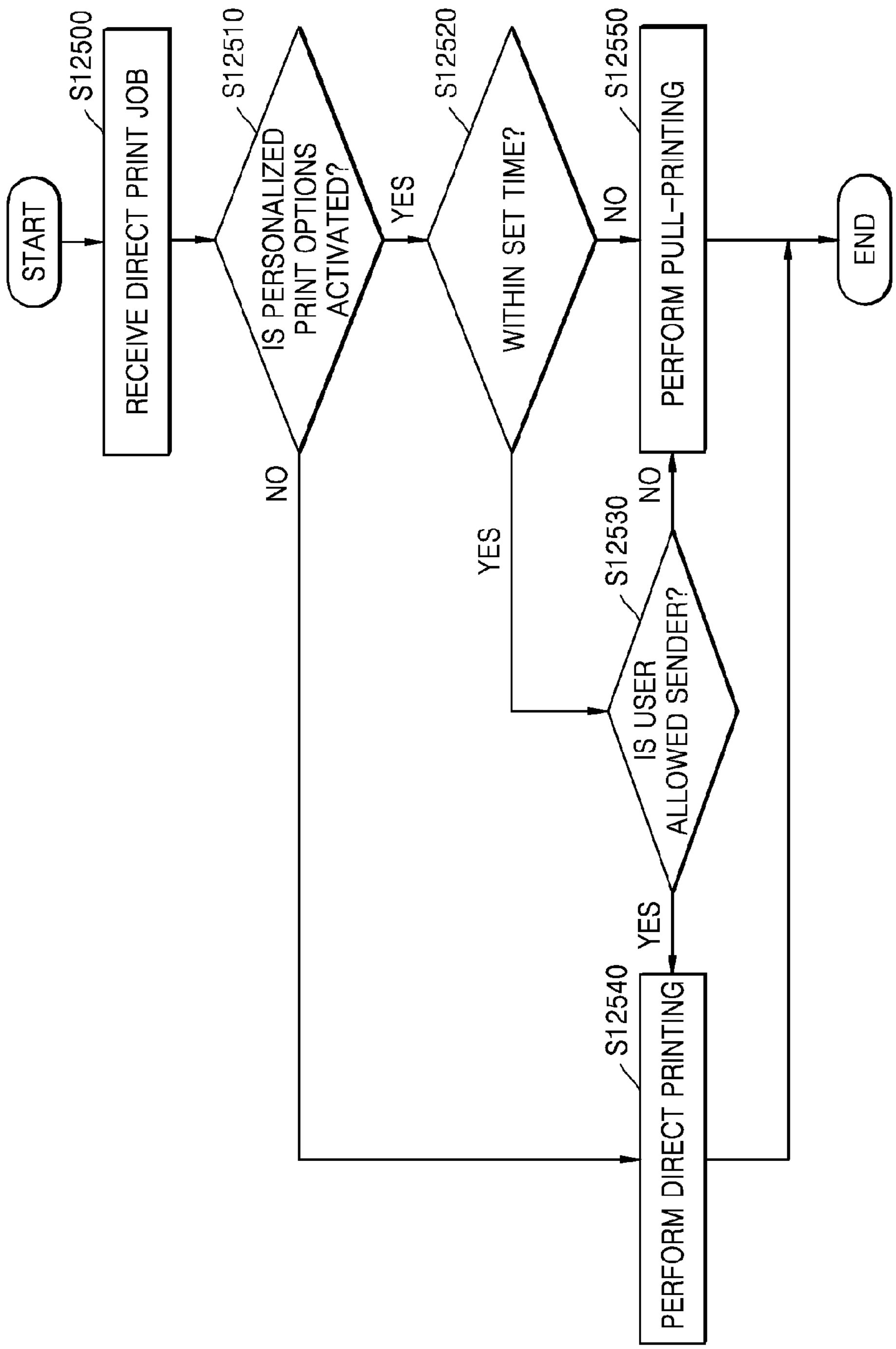
Figure 126:
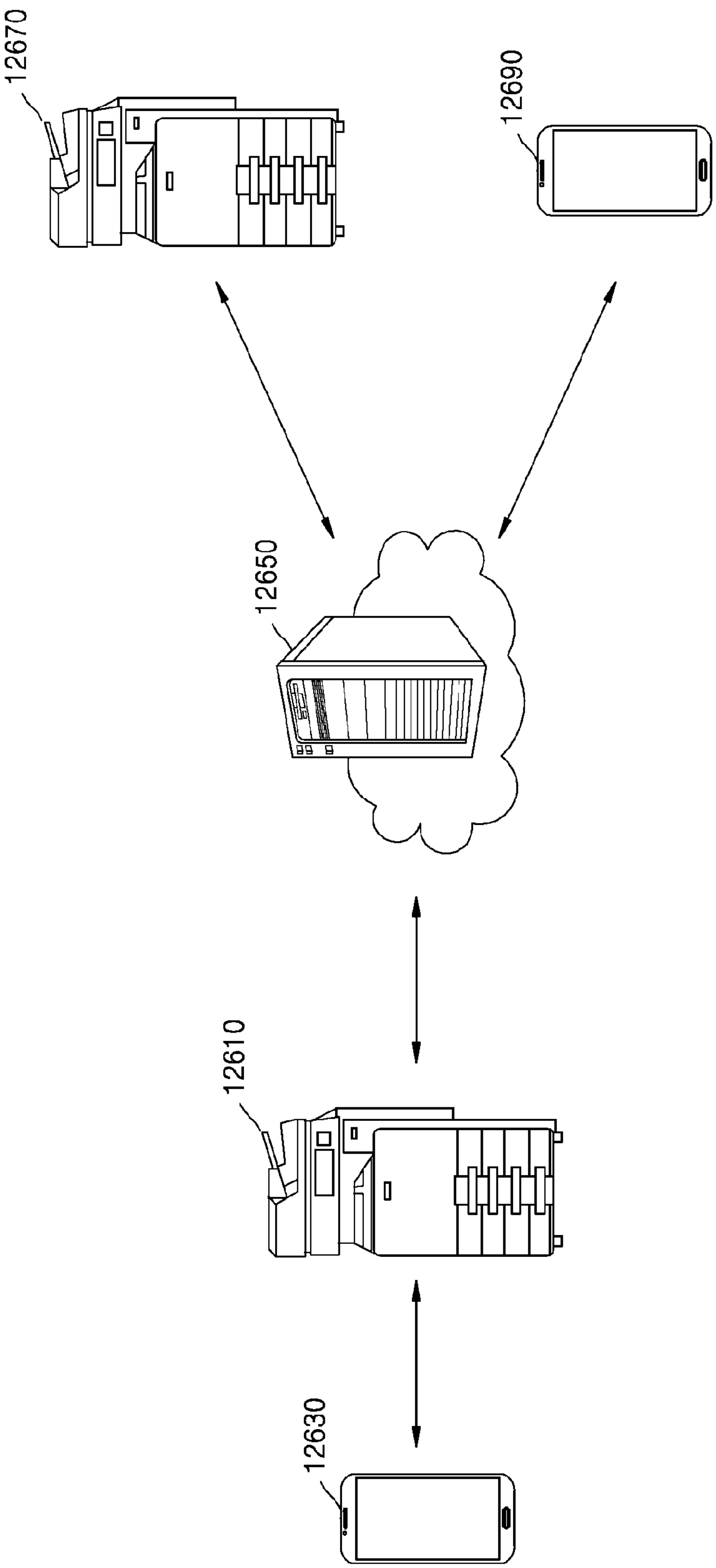
Figure 127:
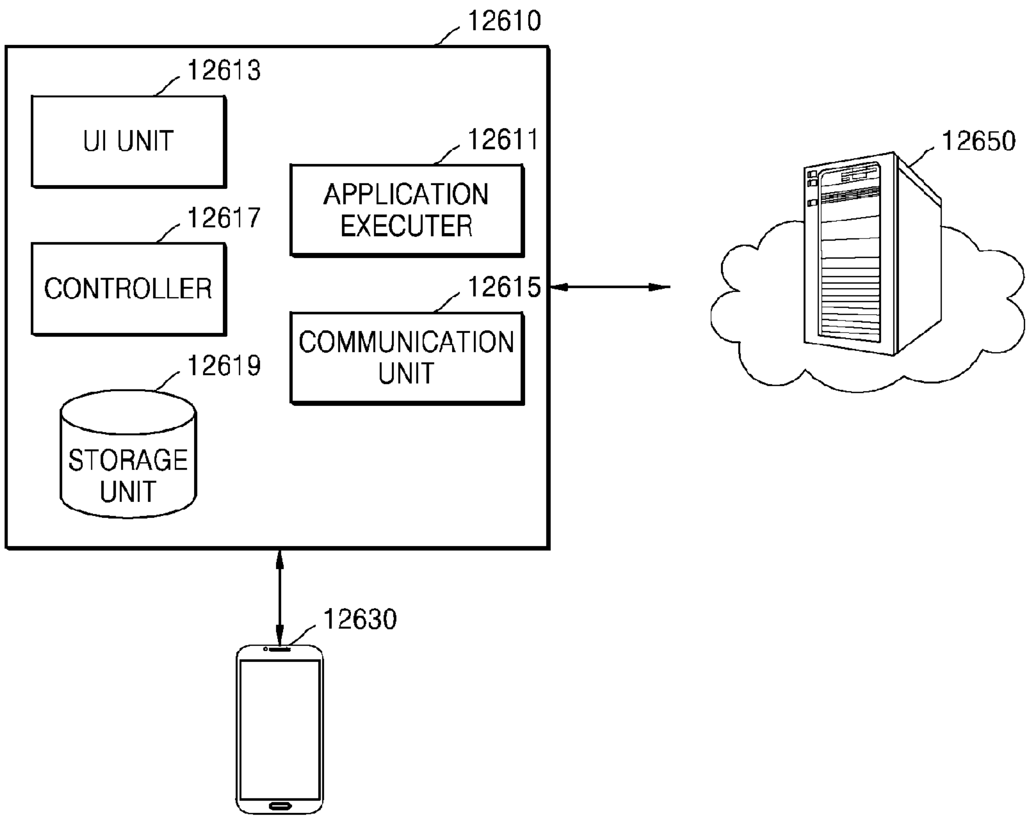
Figure 128:
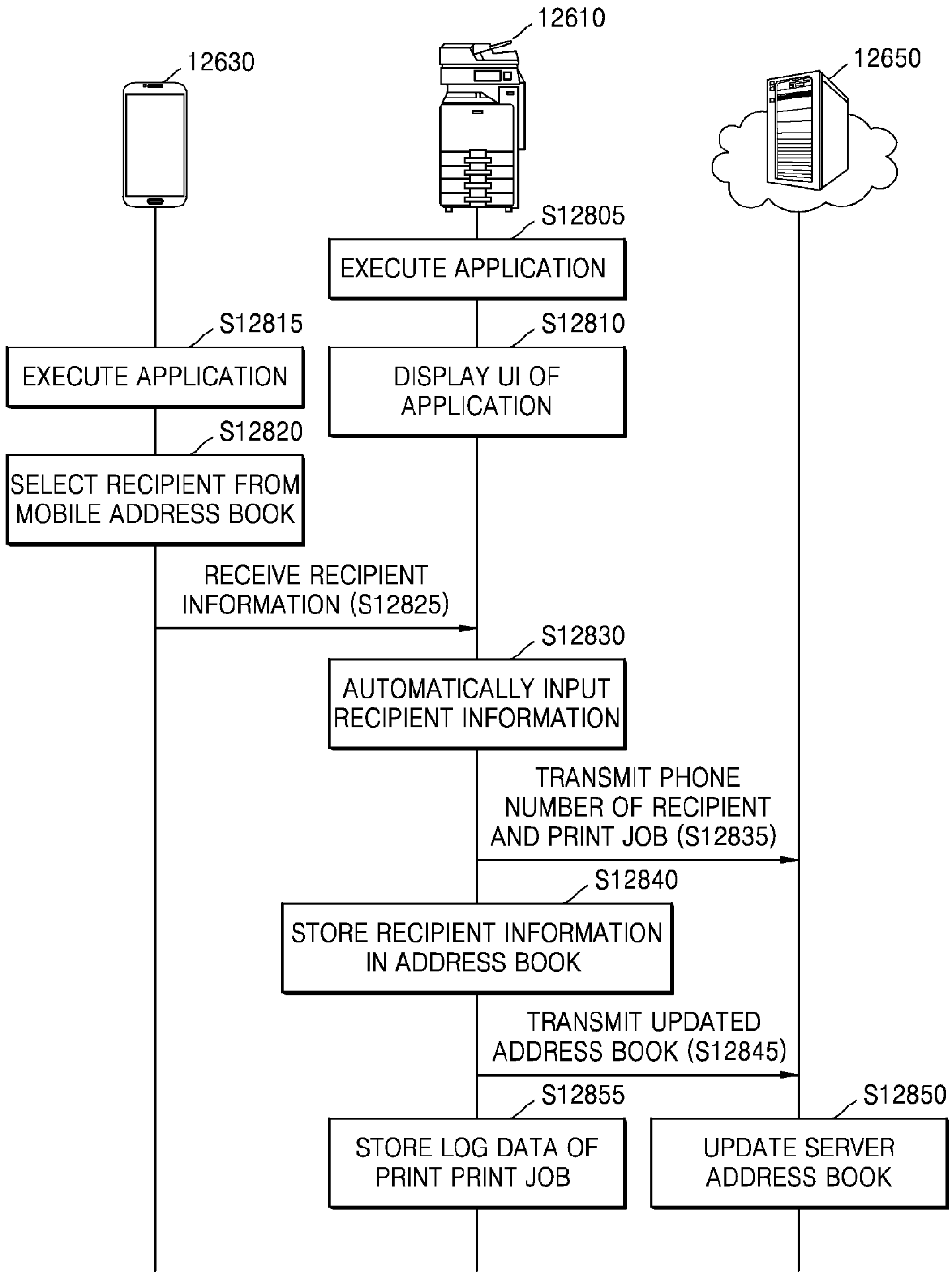
Figure 129:
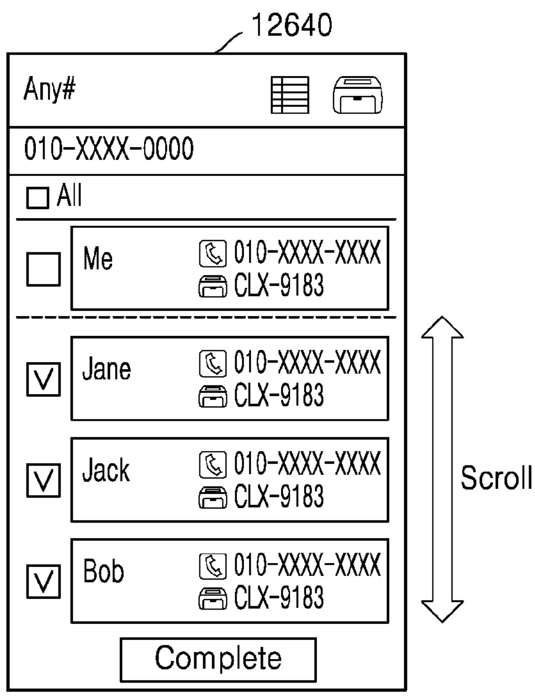
Figure 130:
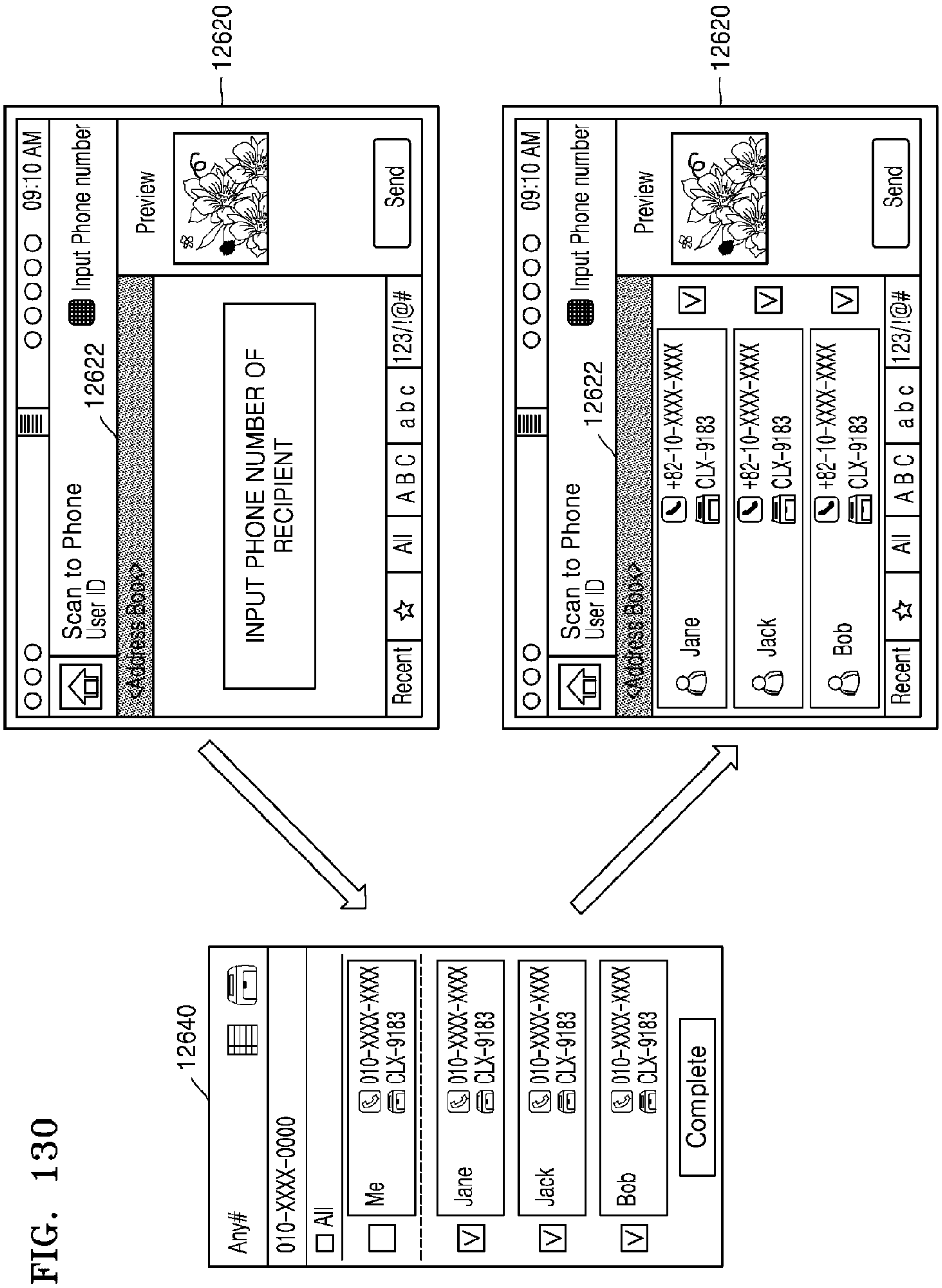
Figure 131:
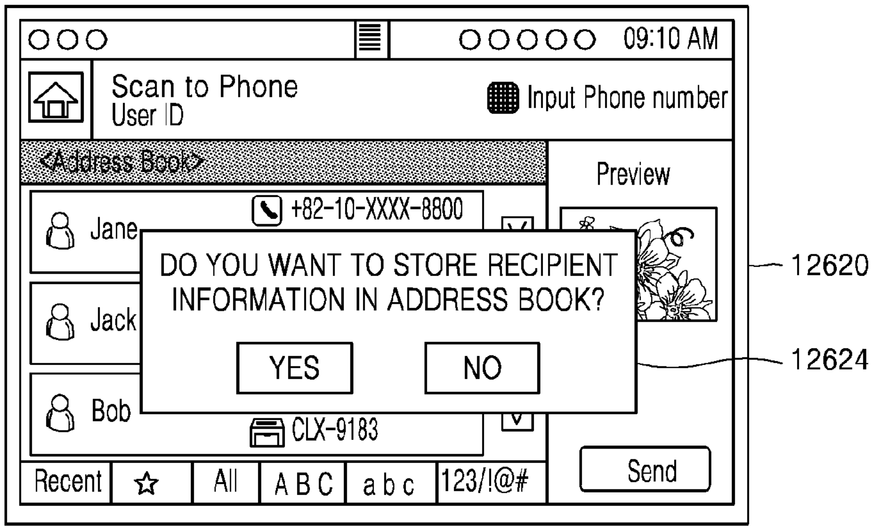
Figure 132:
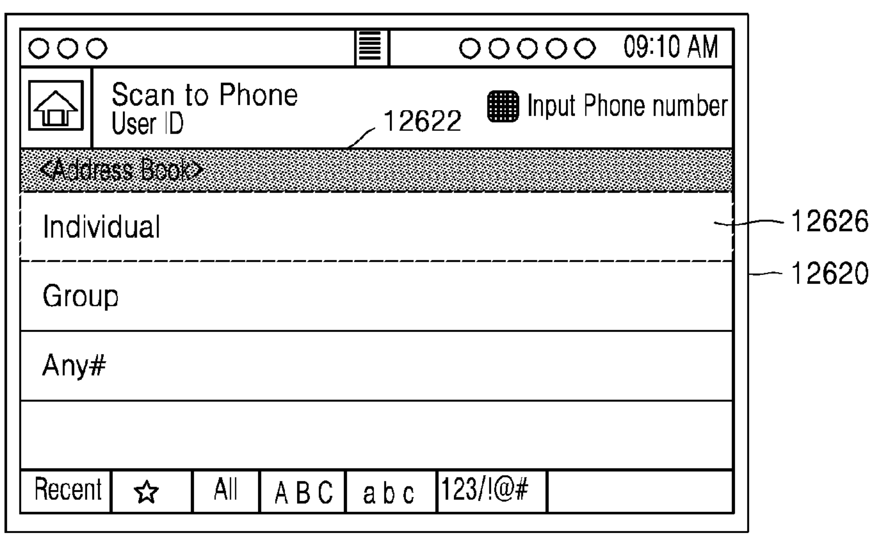
Figure 134:
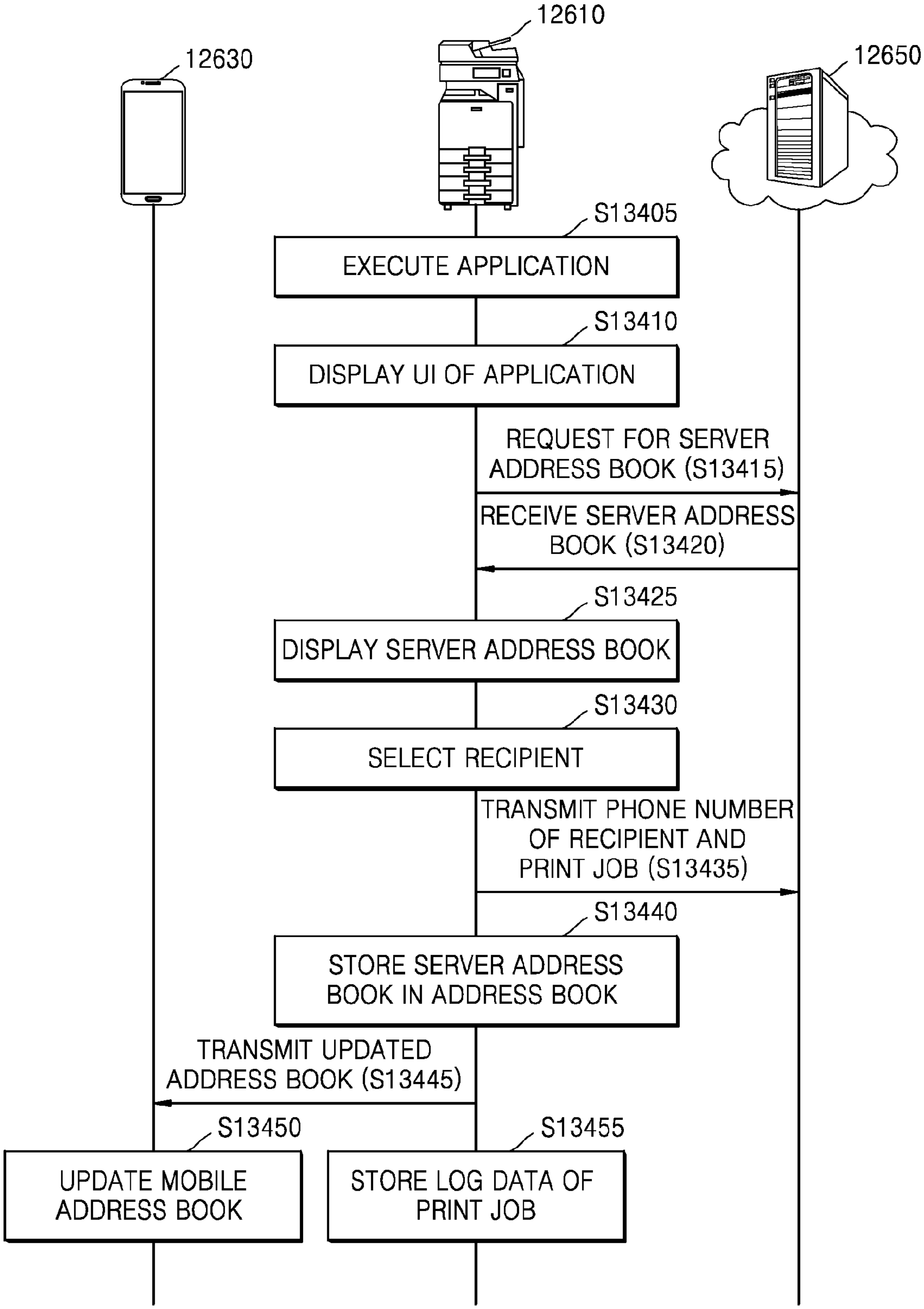
Figure 135:
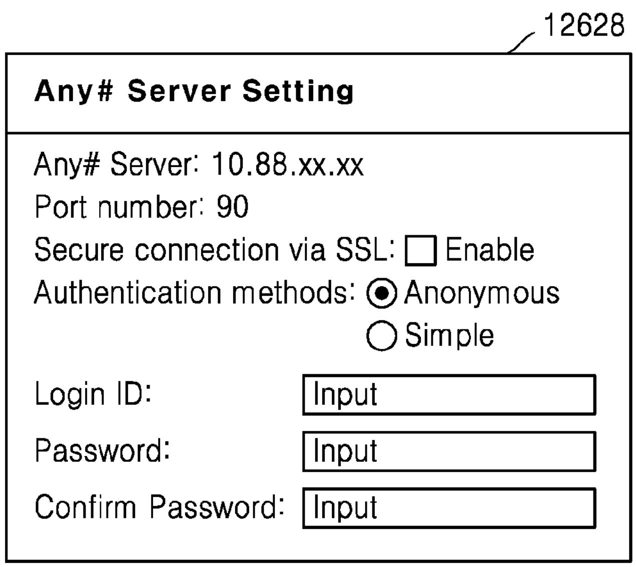
Figure 136:
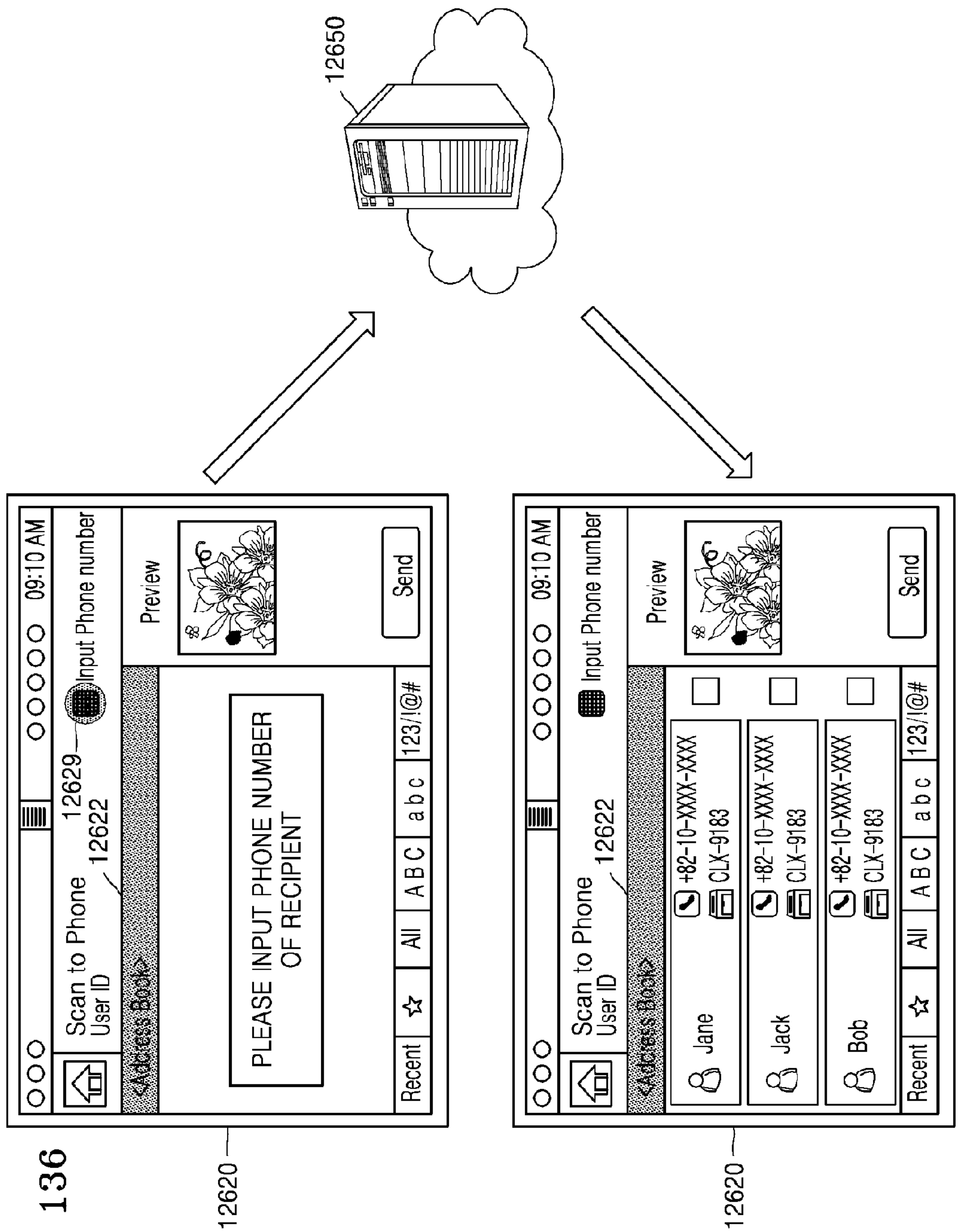
Figure 137:
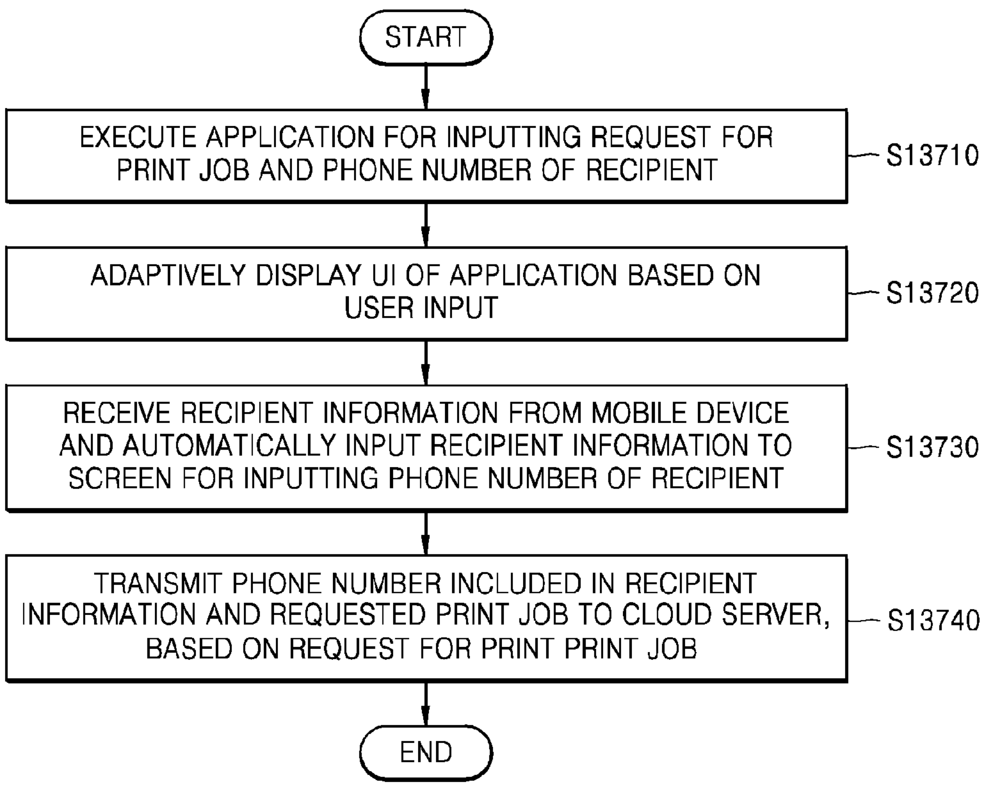
Figure 138:
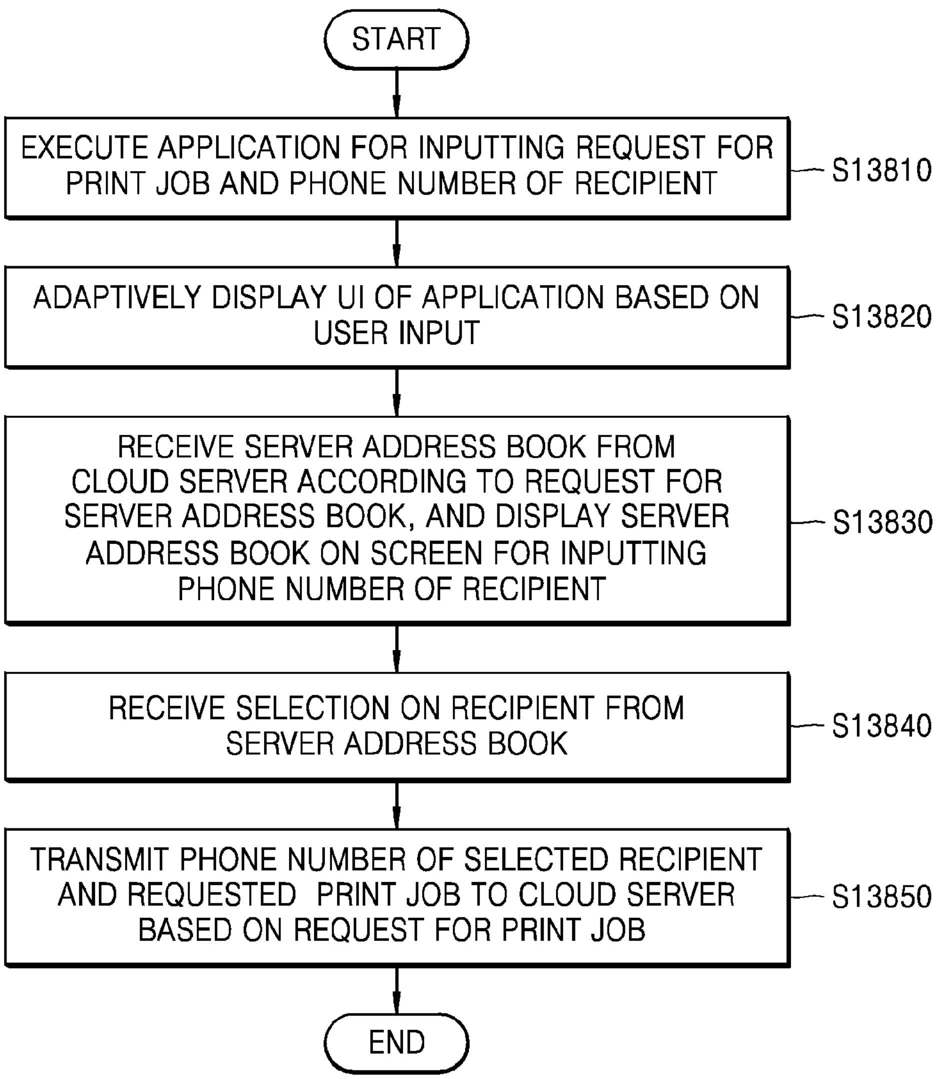
Figure 139:
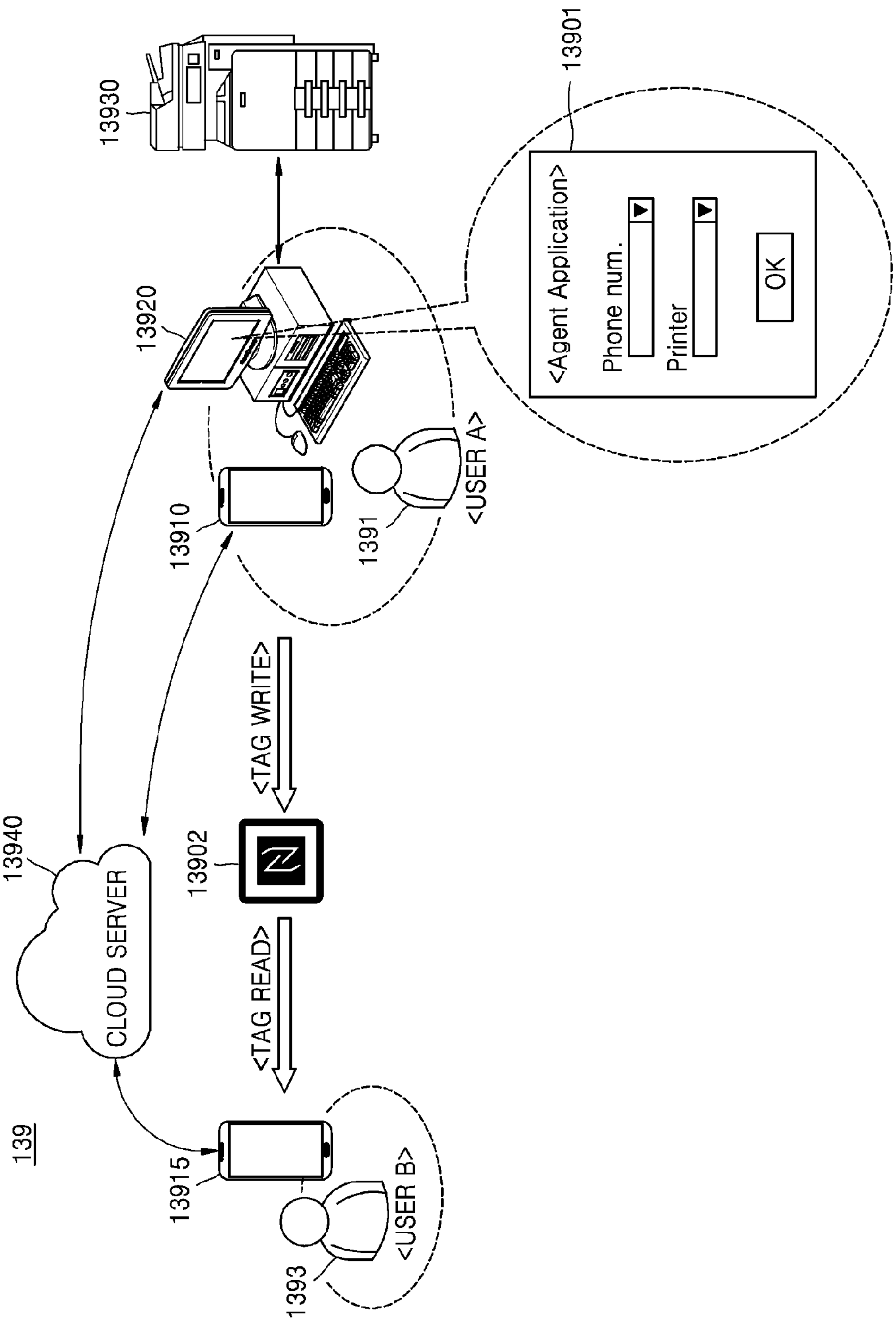
Figure 140:
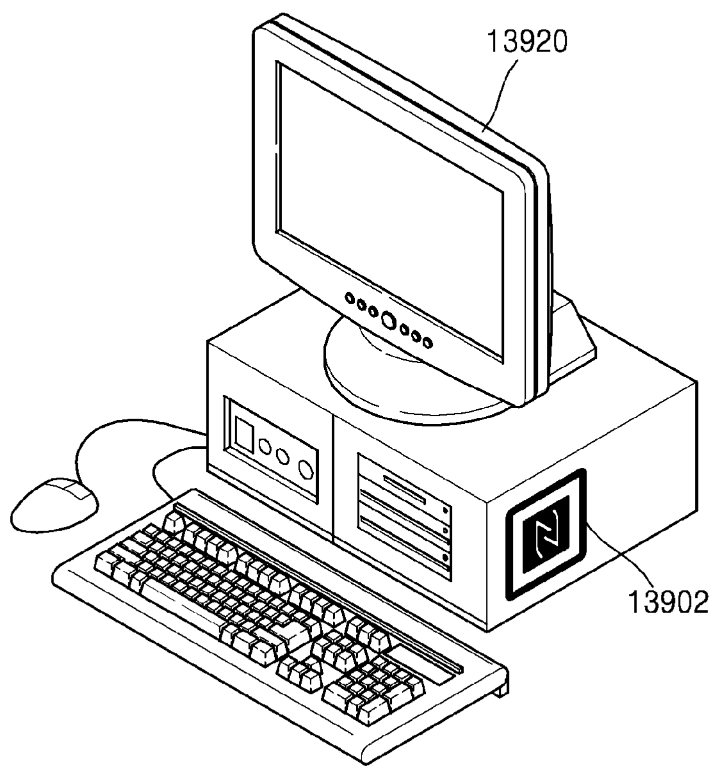
Figure 141A:
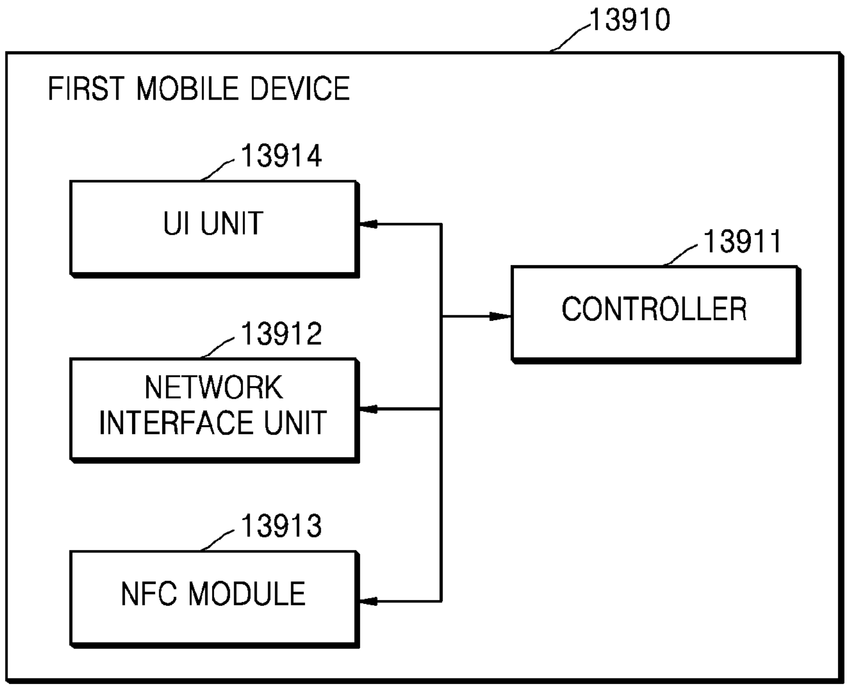
Figure 141B:
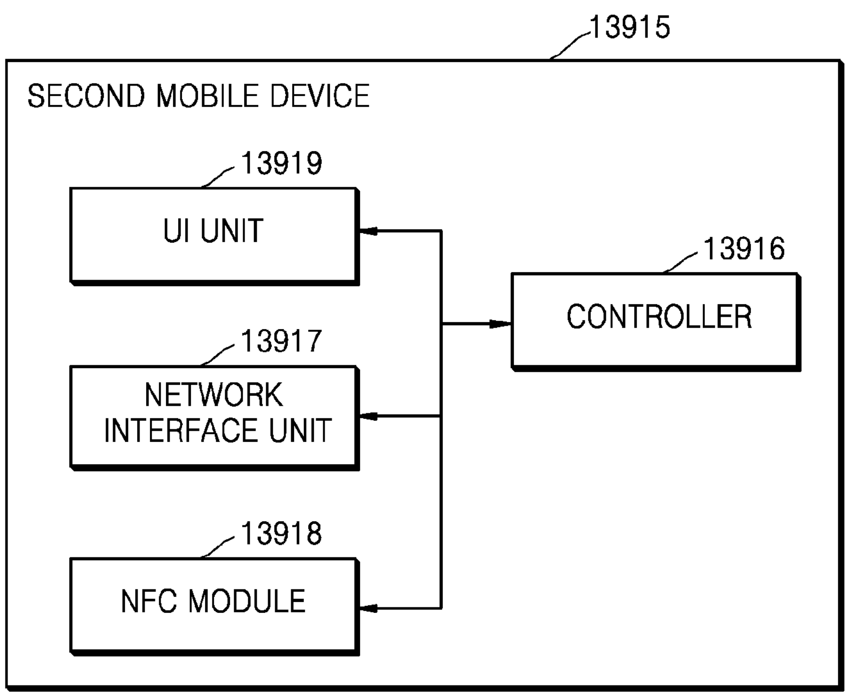
Figure 142:
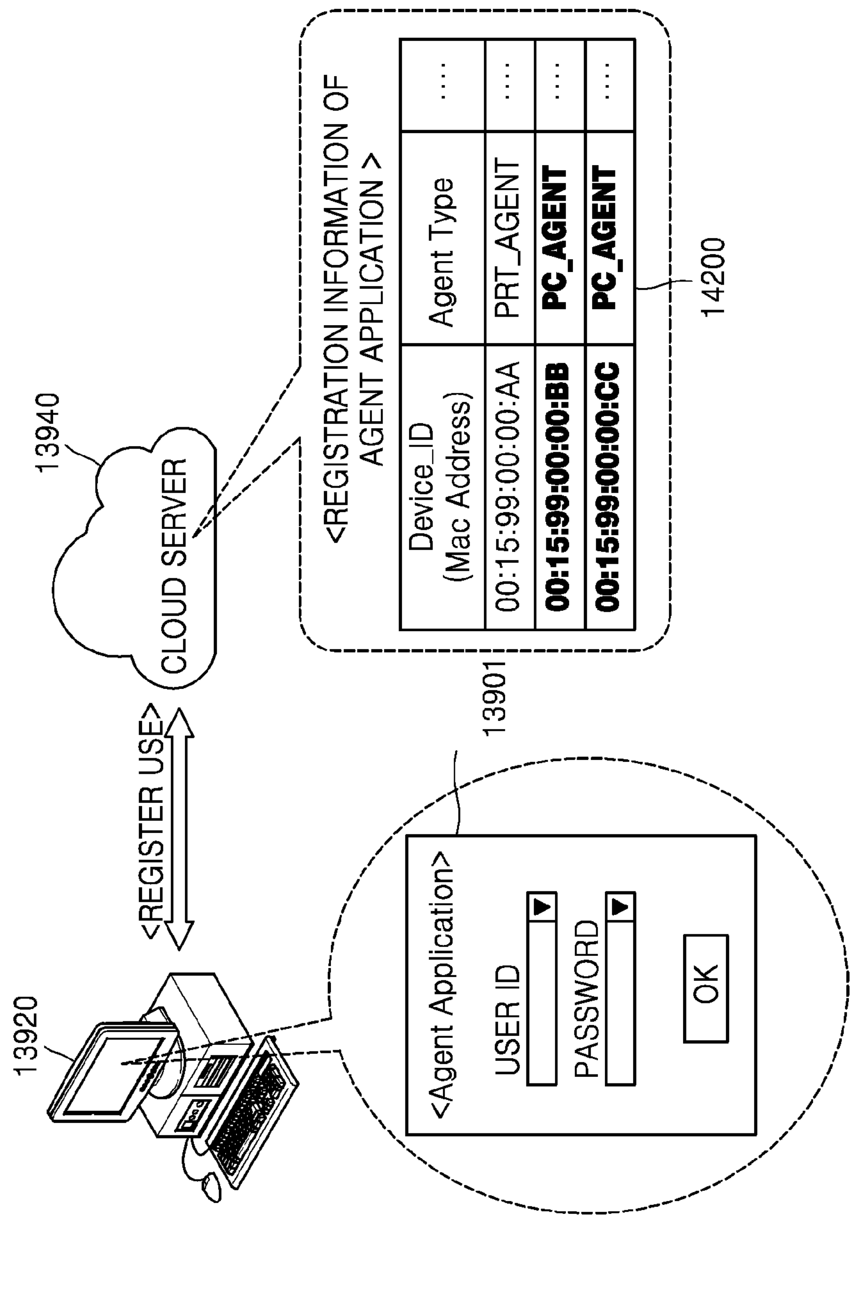
Figure 143:
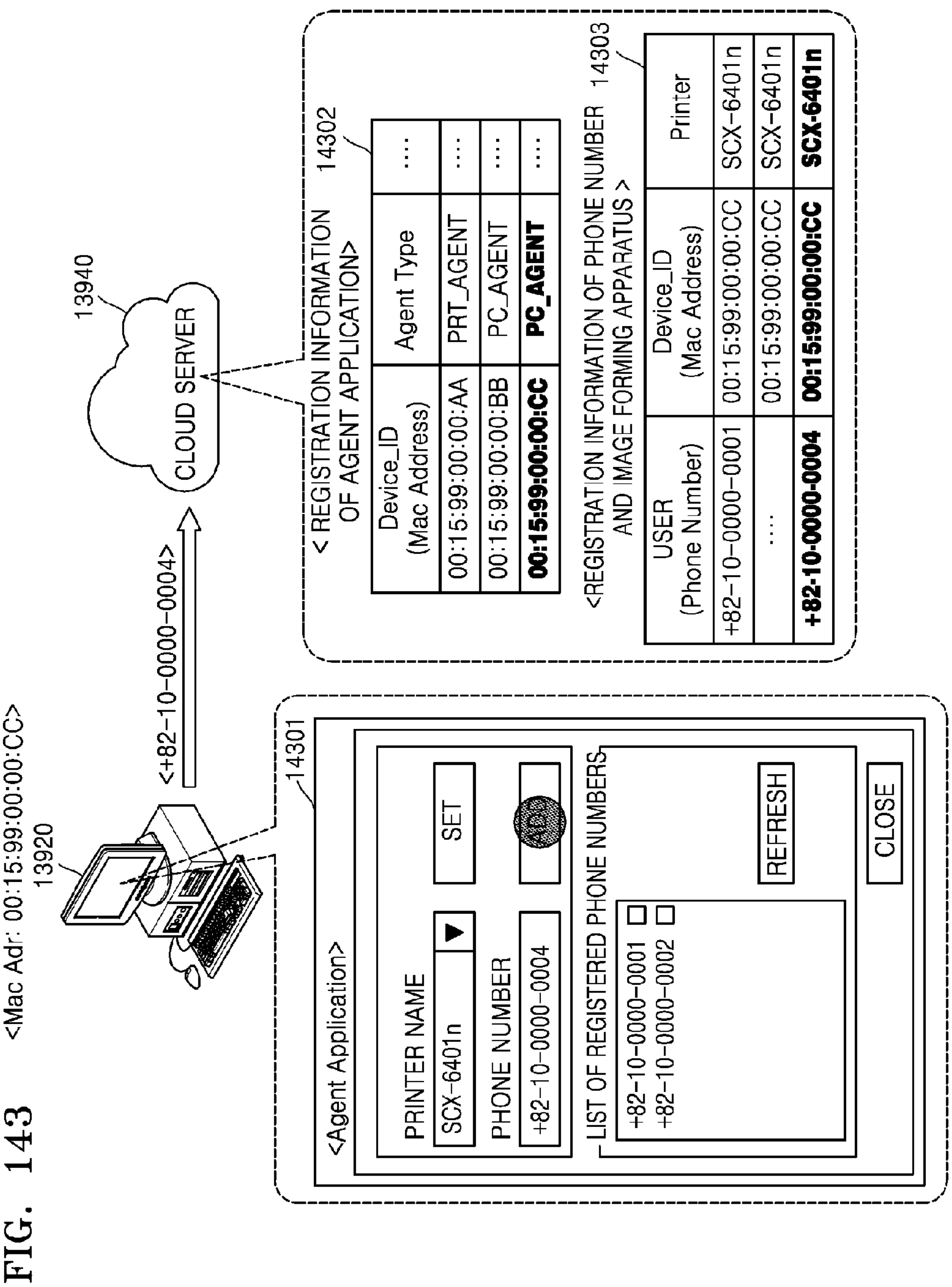
Figure 144:
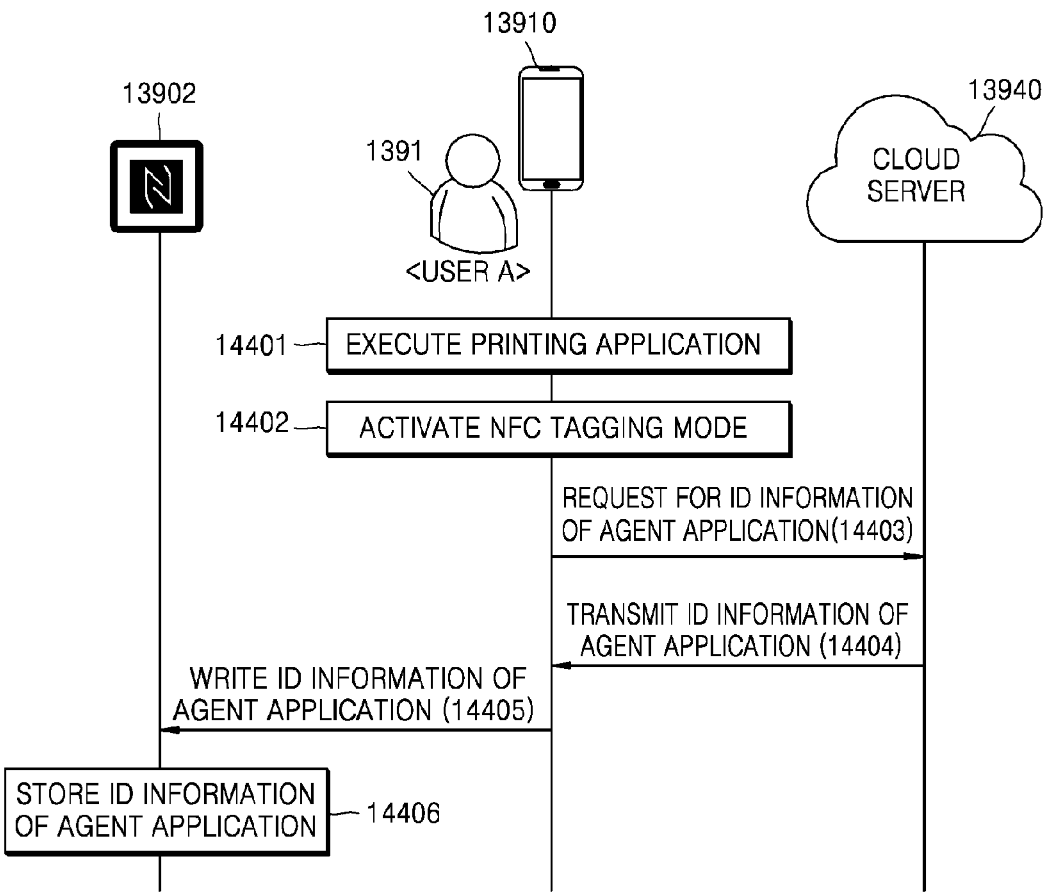
Figure 145:
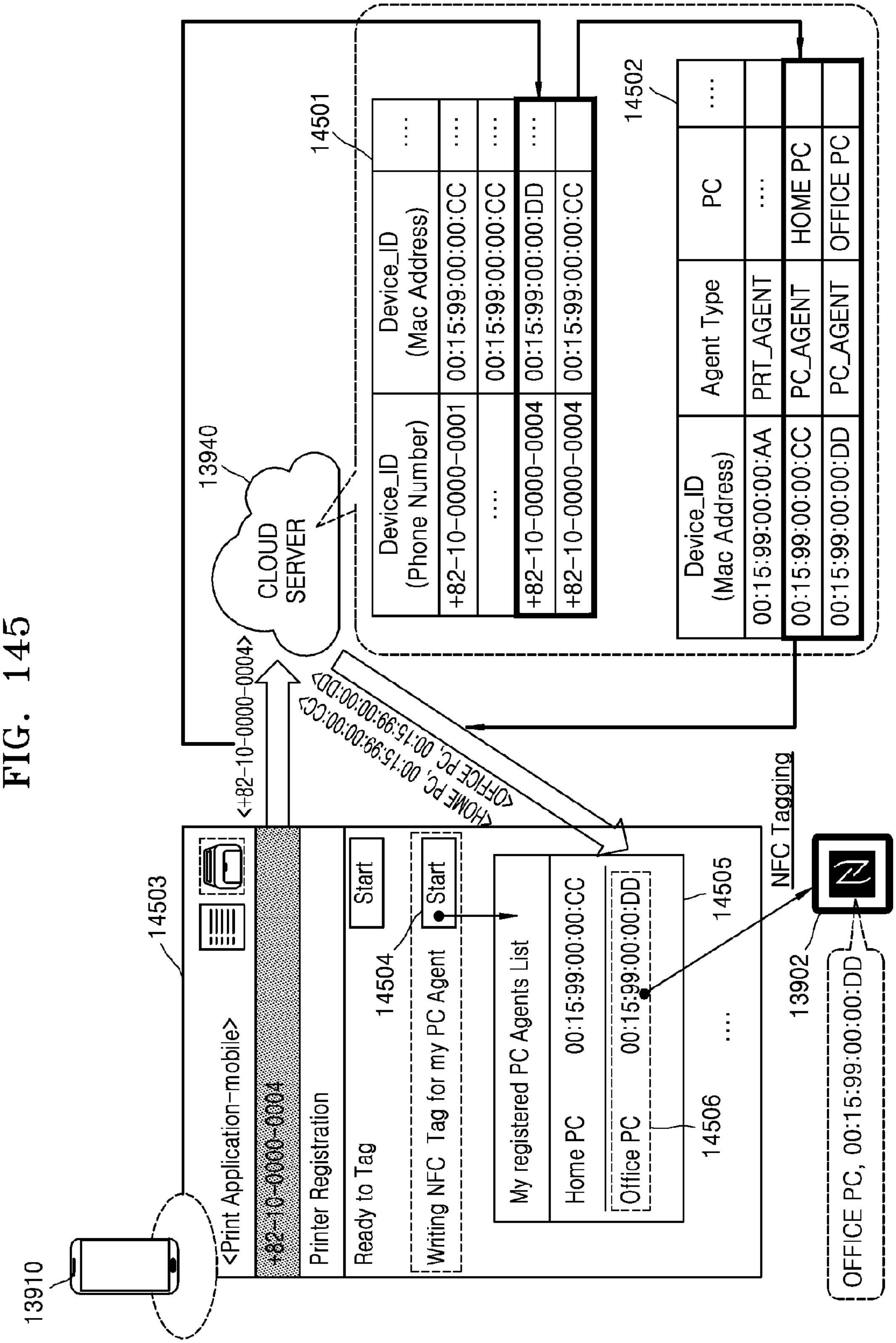
Figure 146:
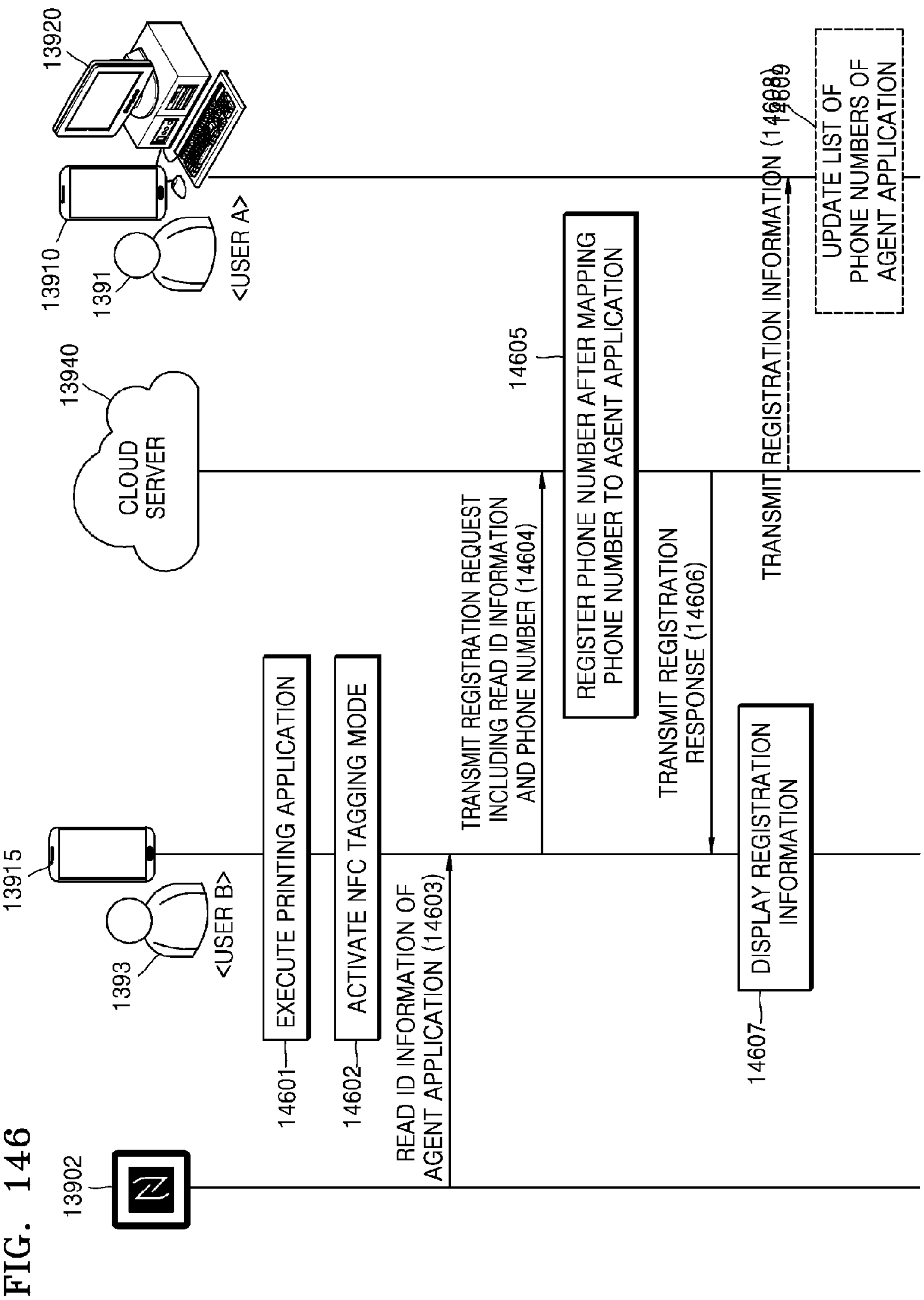
Figure 147:
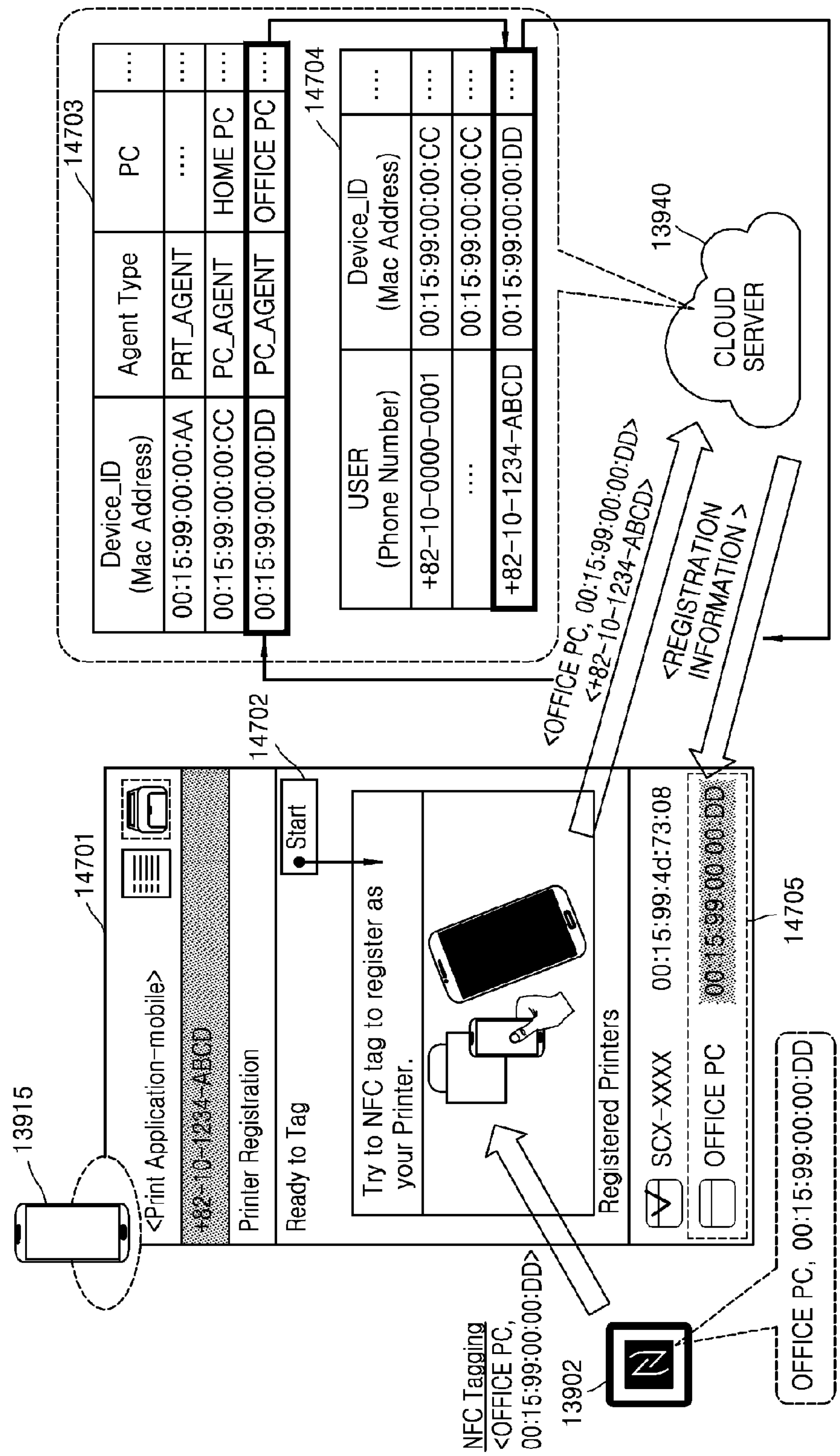
Figure 148:
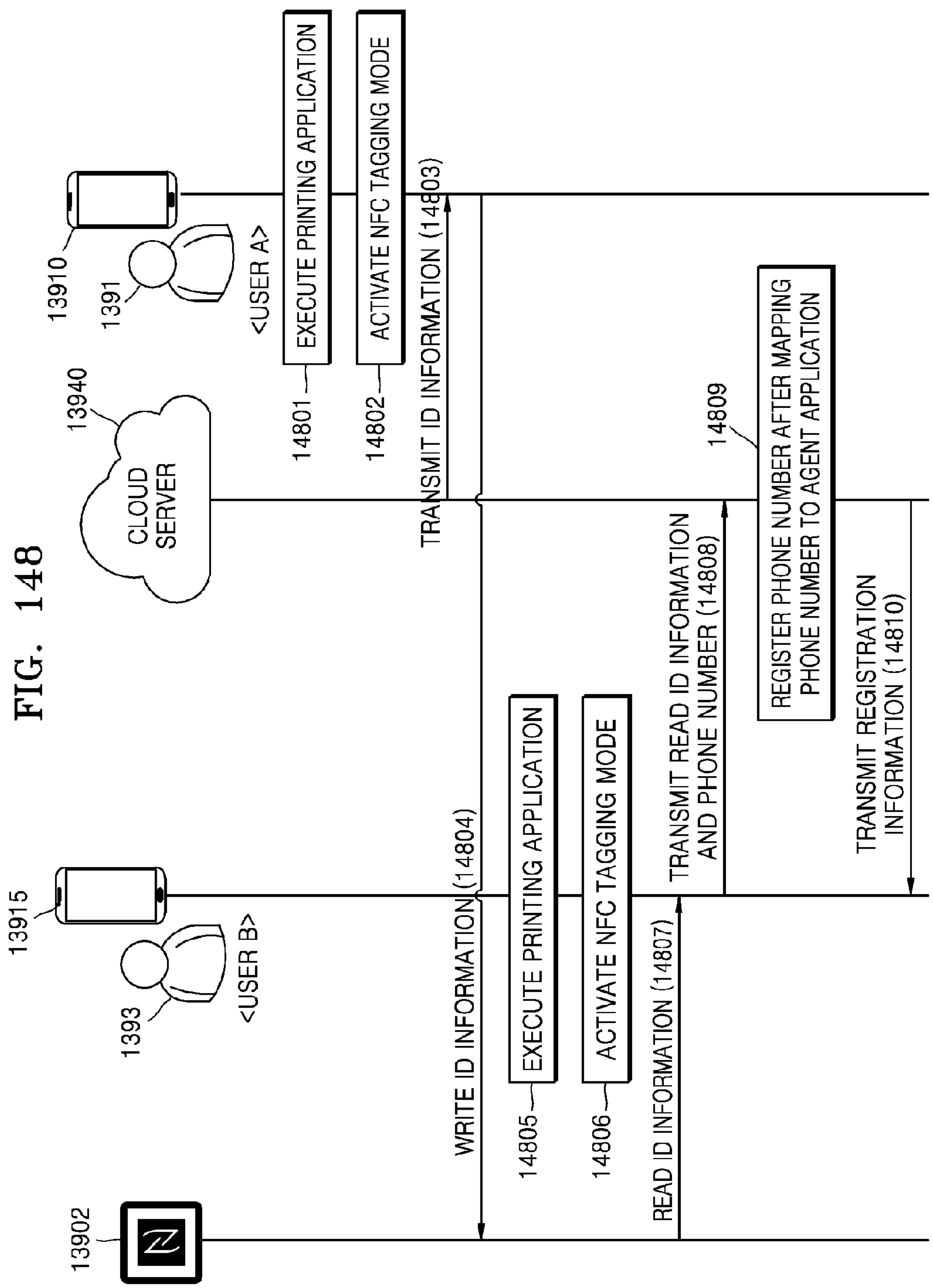
Figure 149:
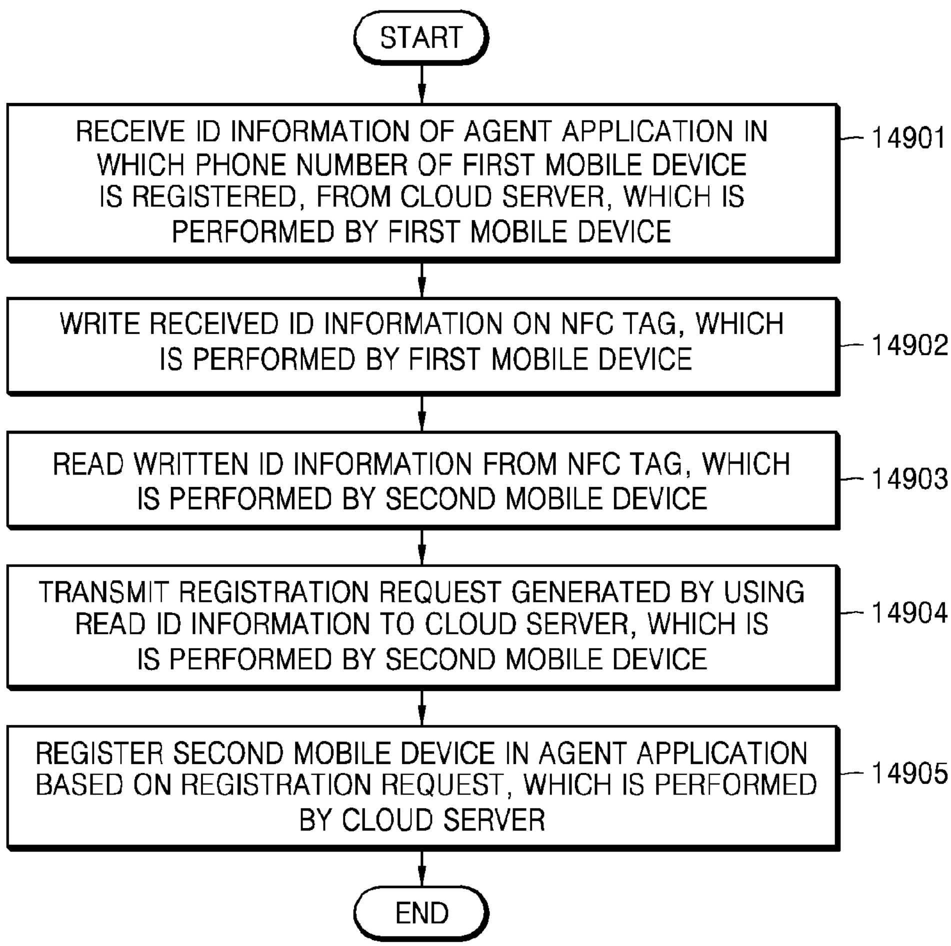
Figure 150:
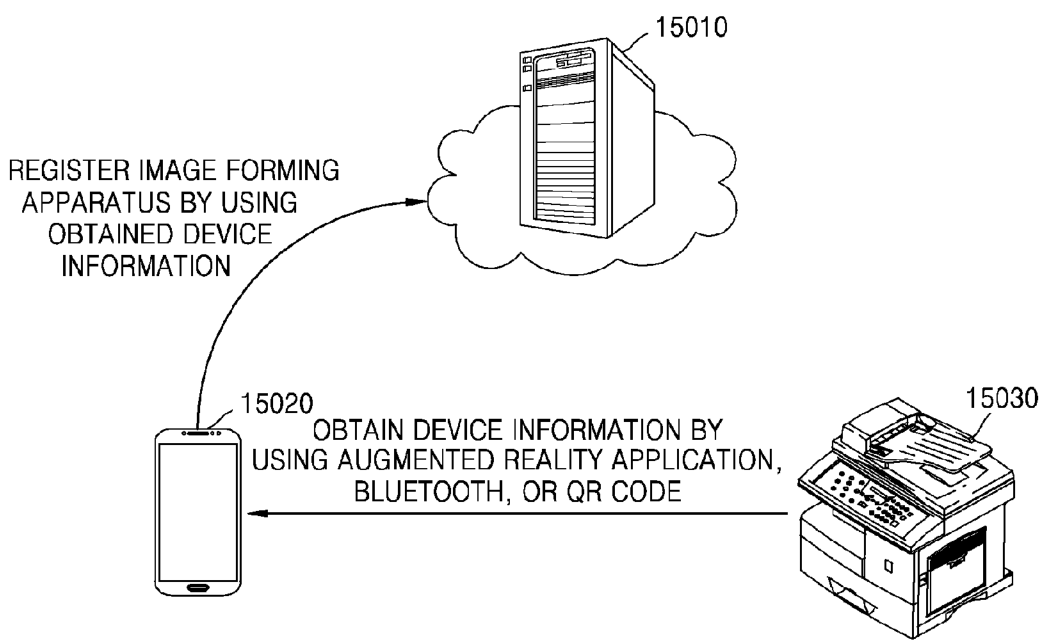
Figure 151:
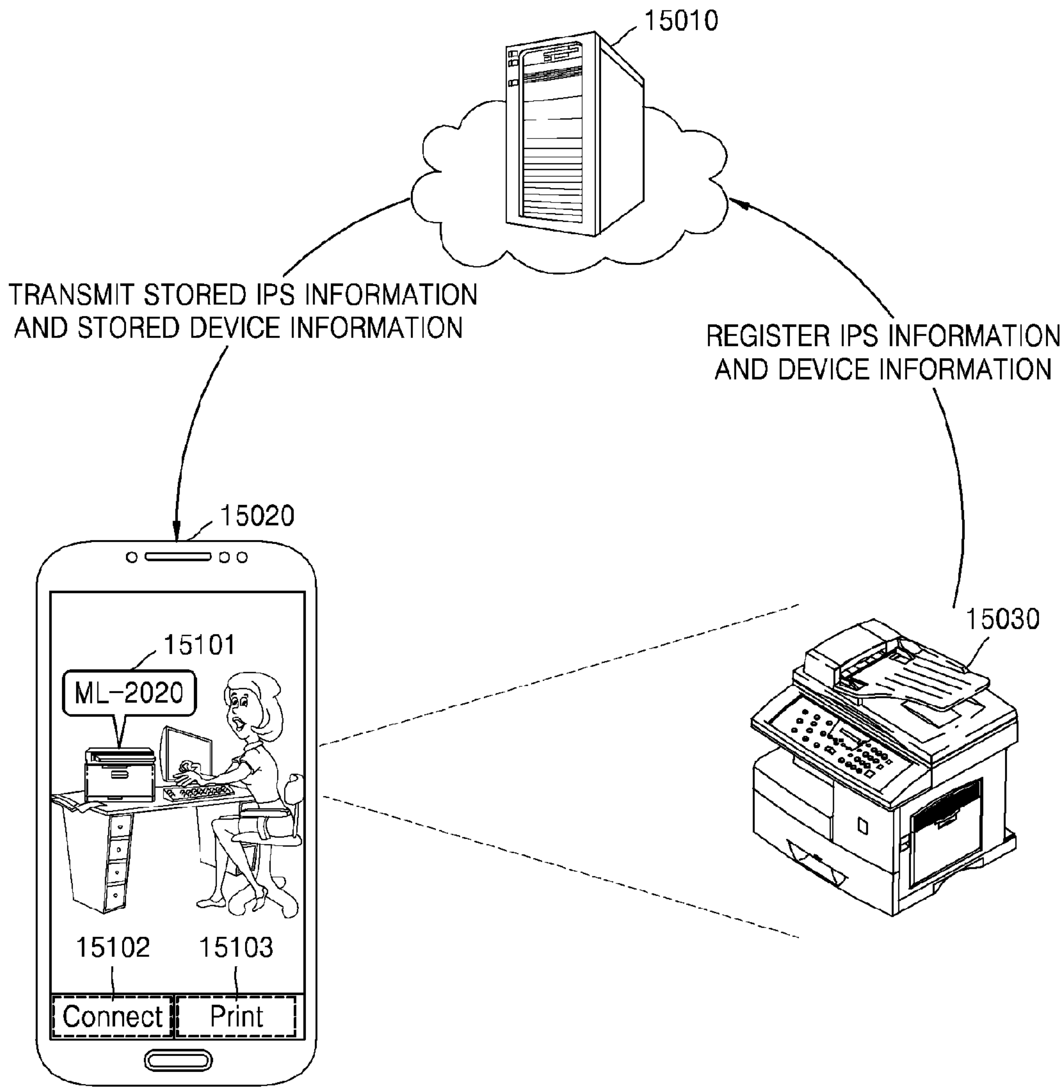
Figure 152:
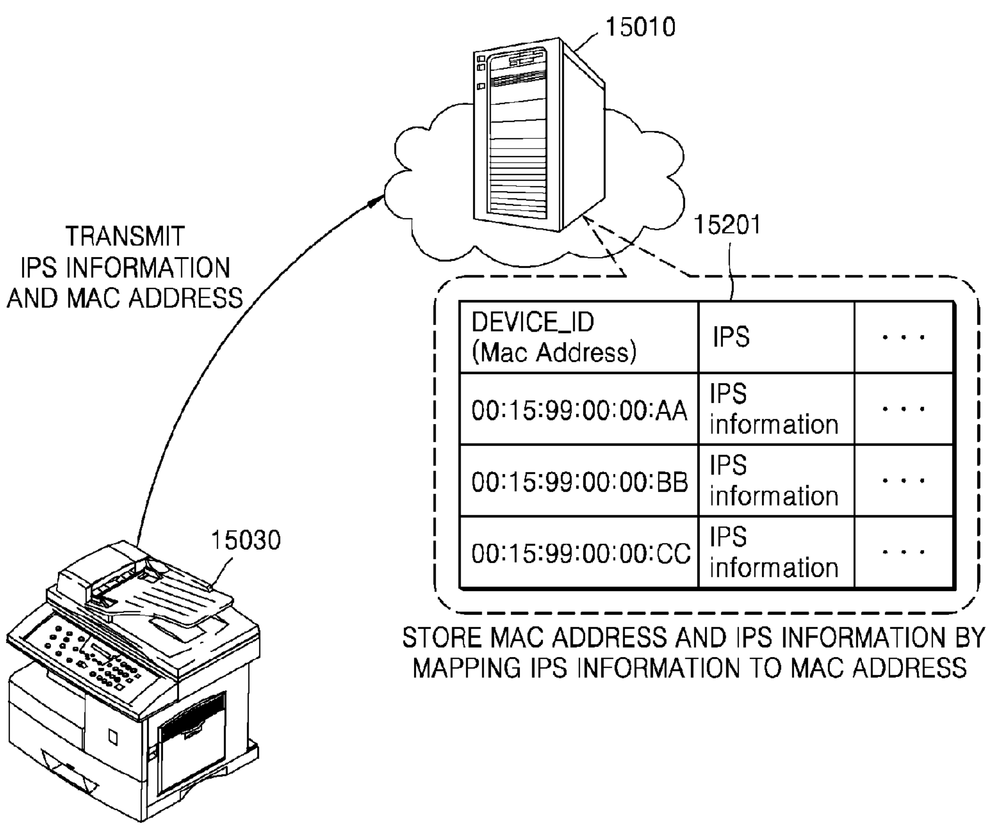
Figure 153:
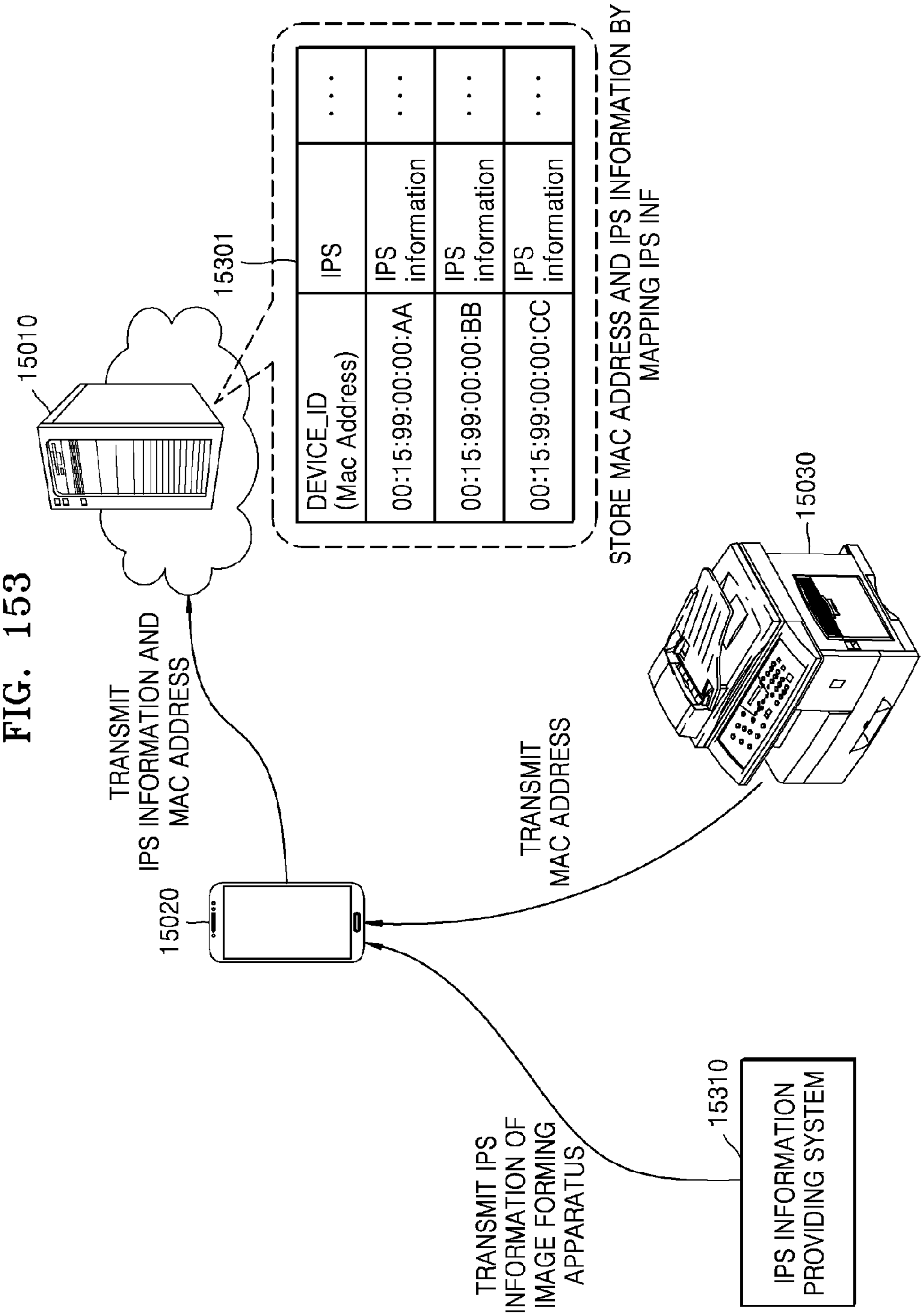
Figure 154:
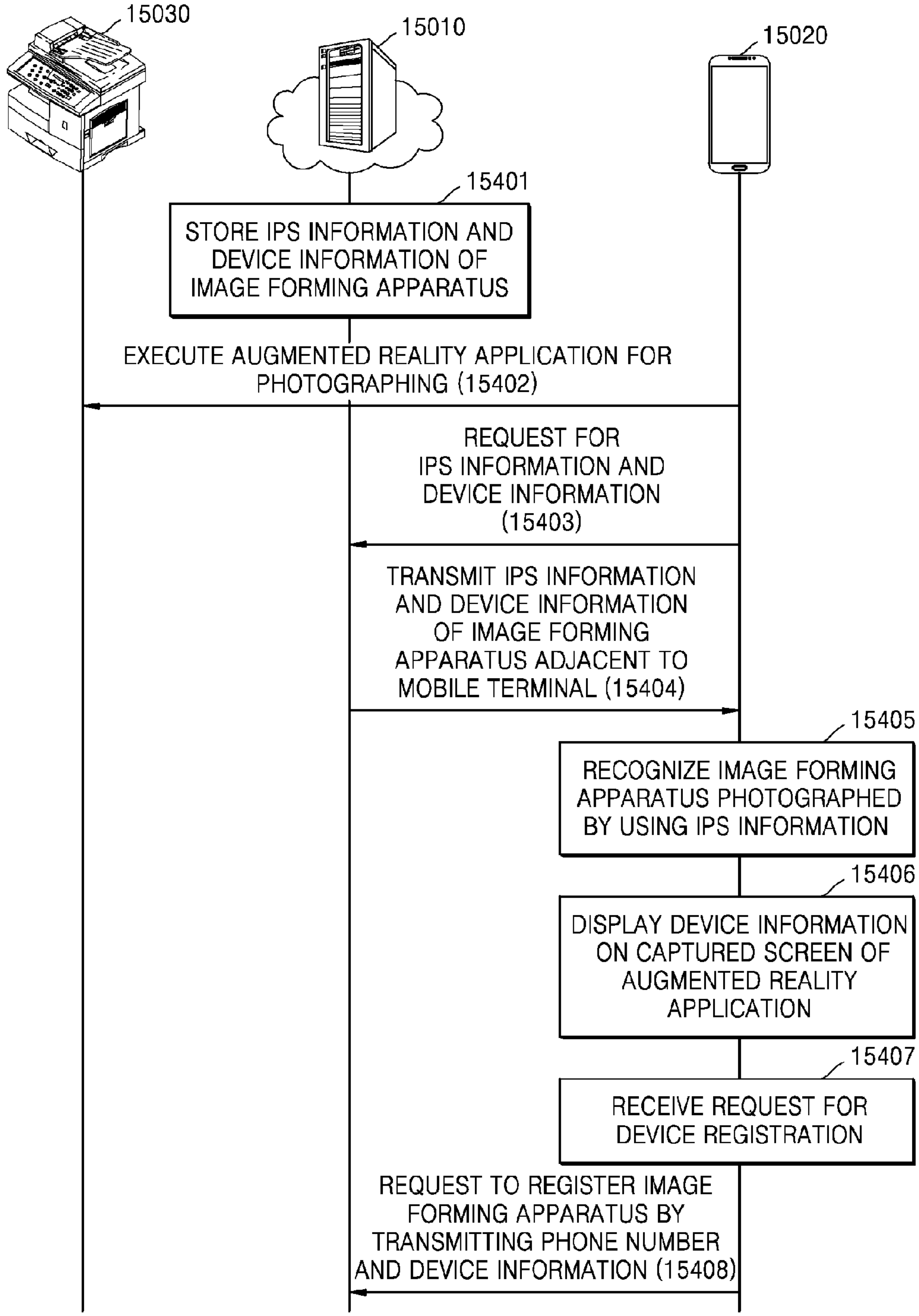
Figure 155:
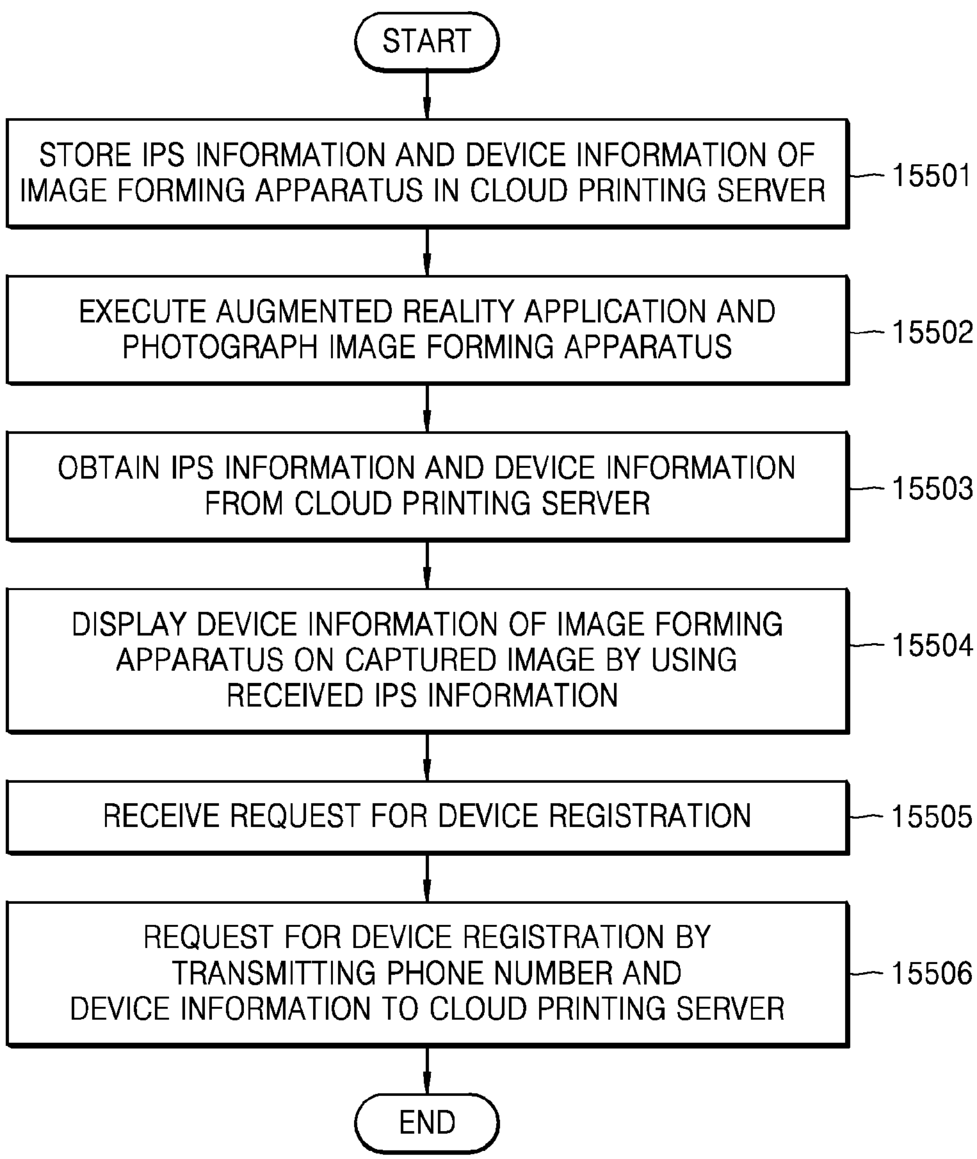
Figure 156:
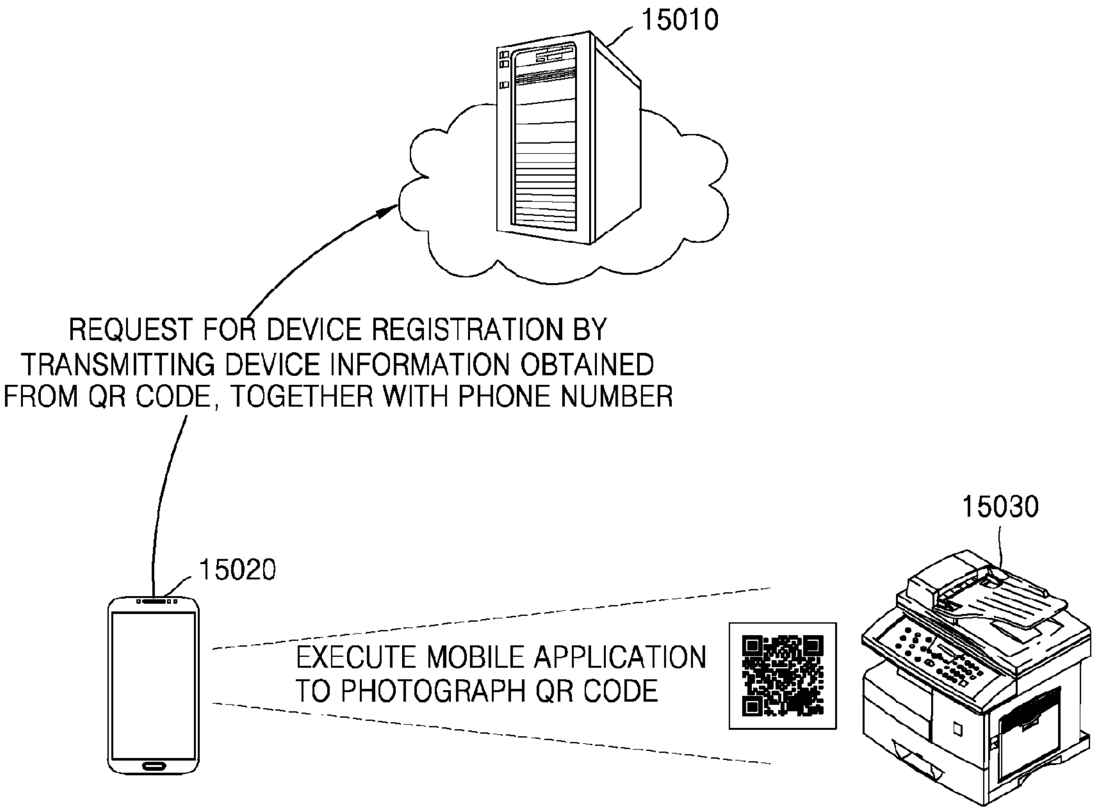
Figure 157:
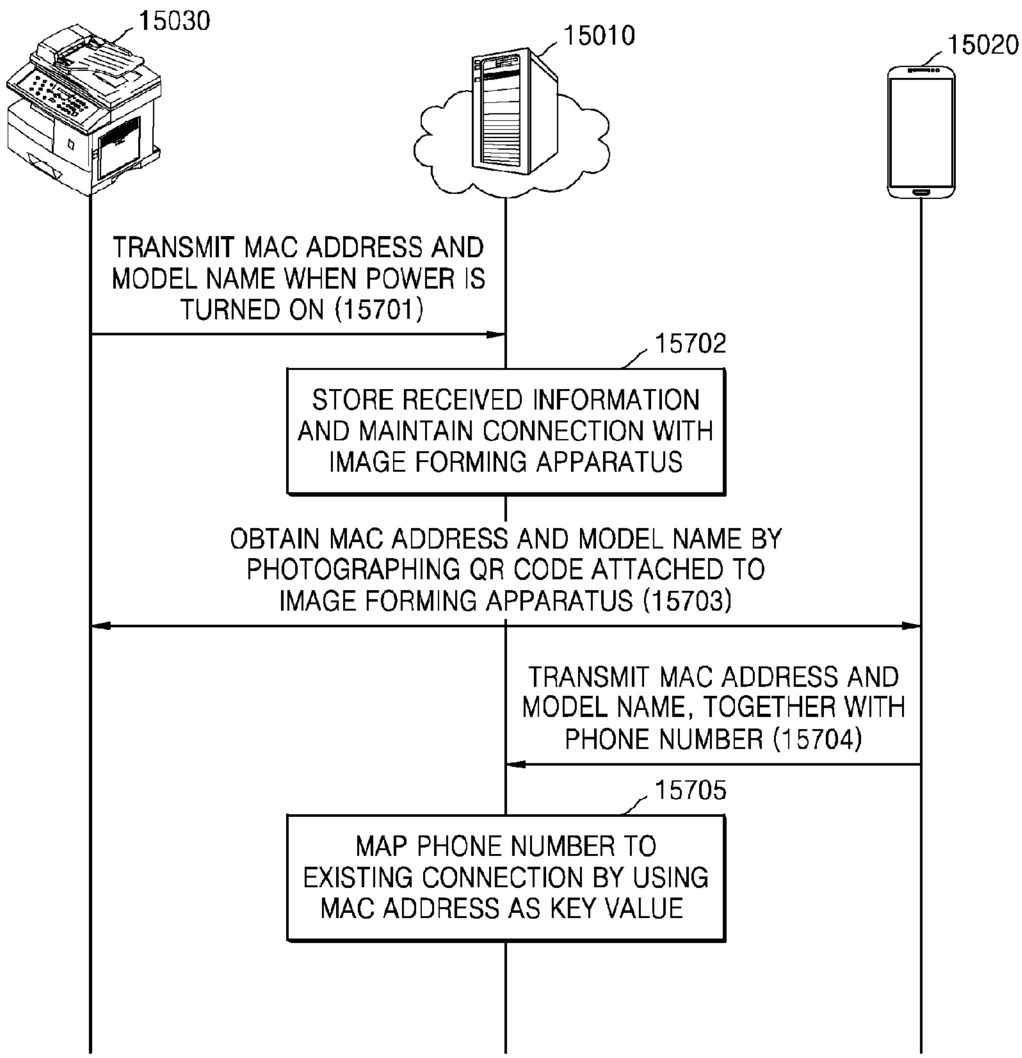
Figure 158:
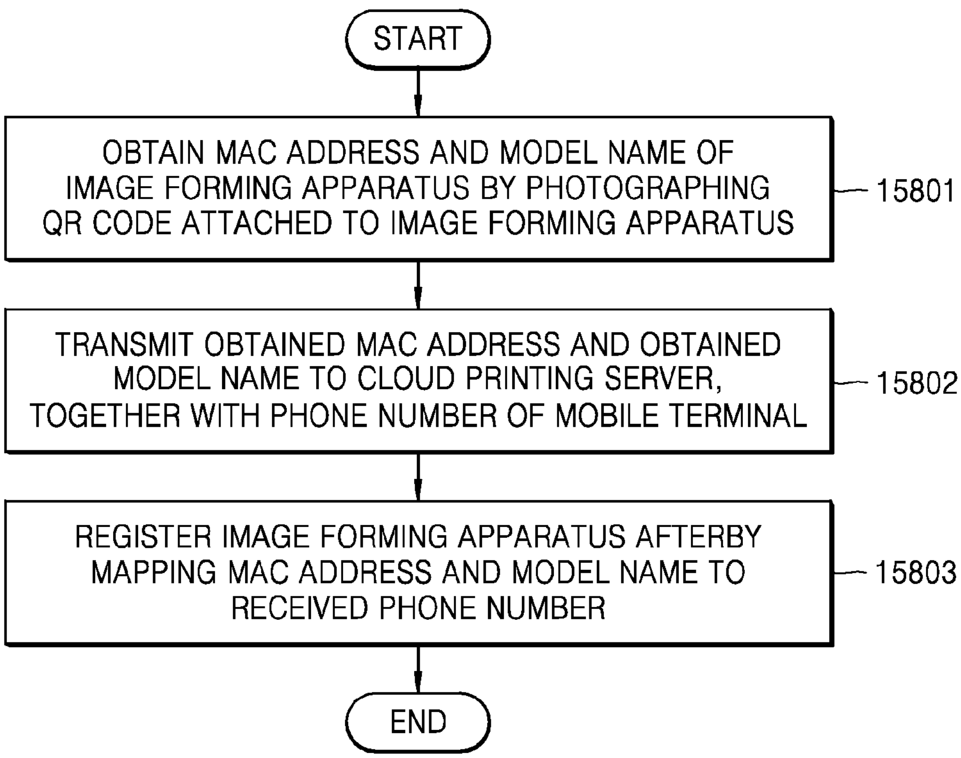
Figure 159:
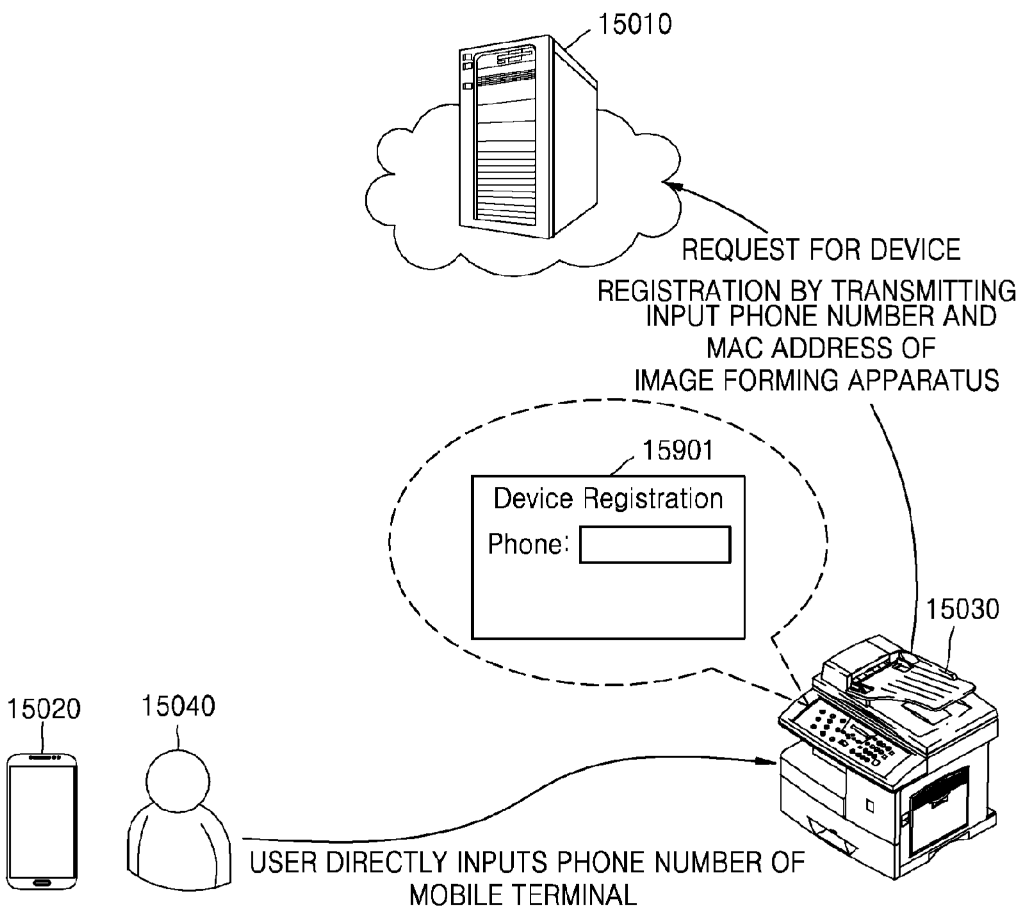
Figure 160:
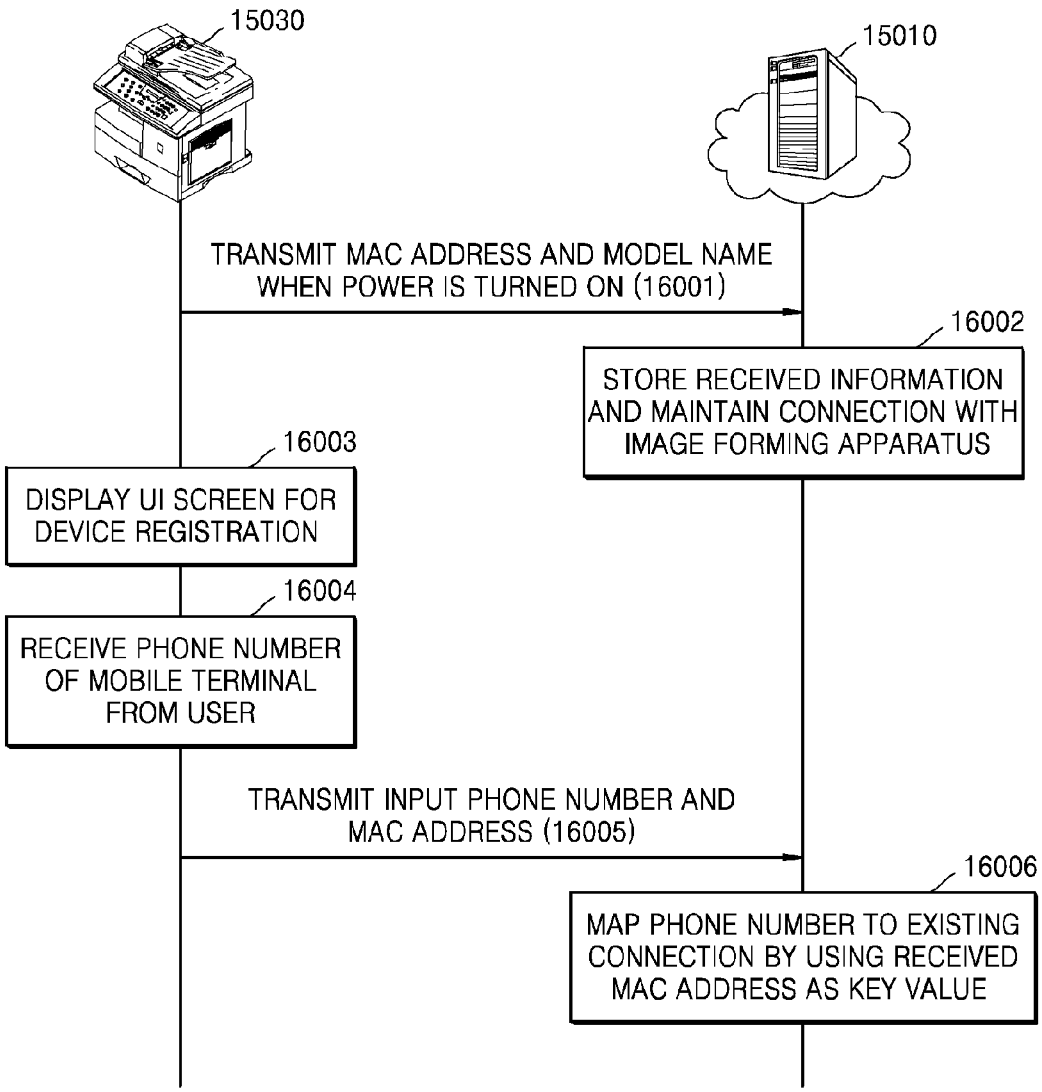
Figure 161:
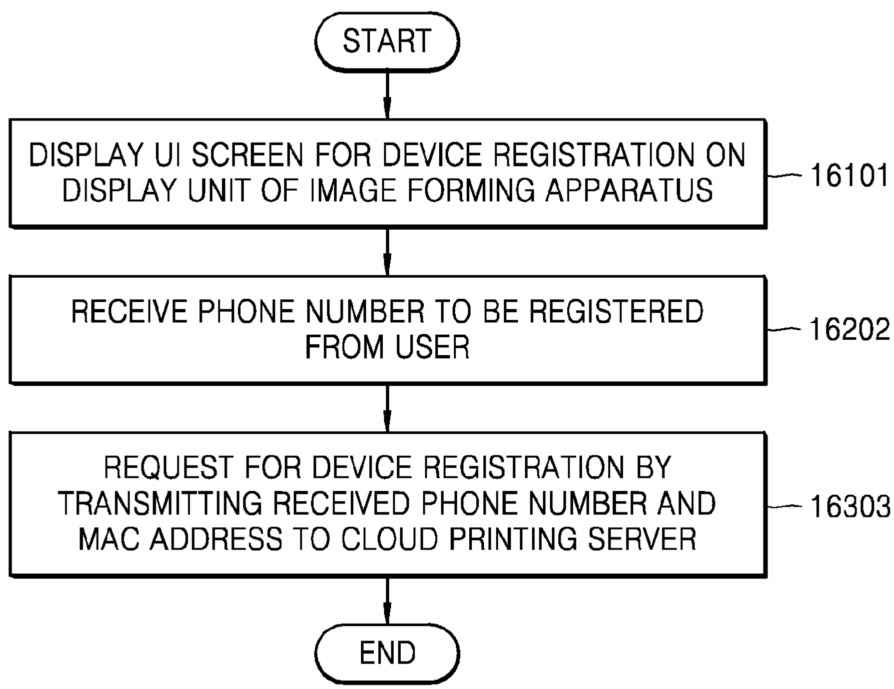
Figure 162:
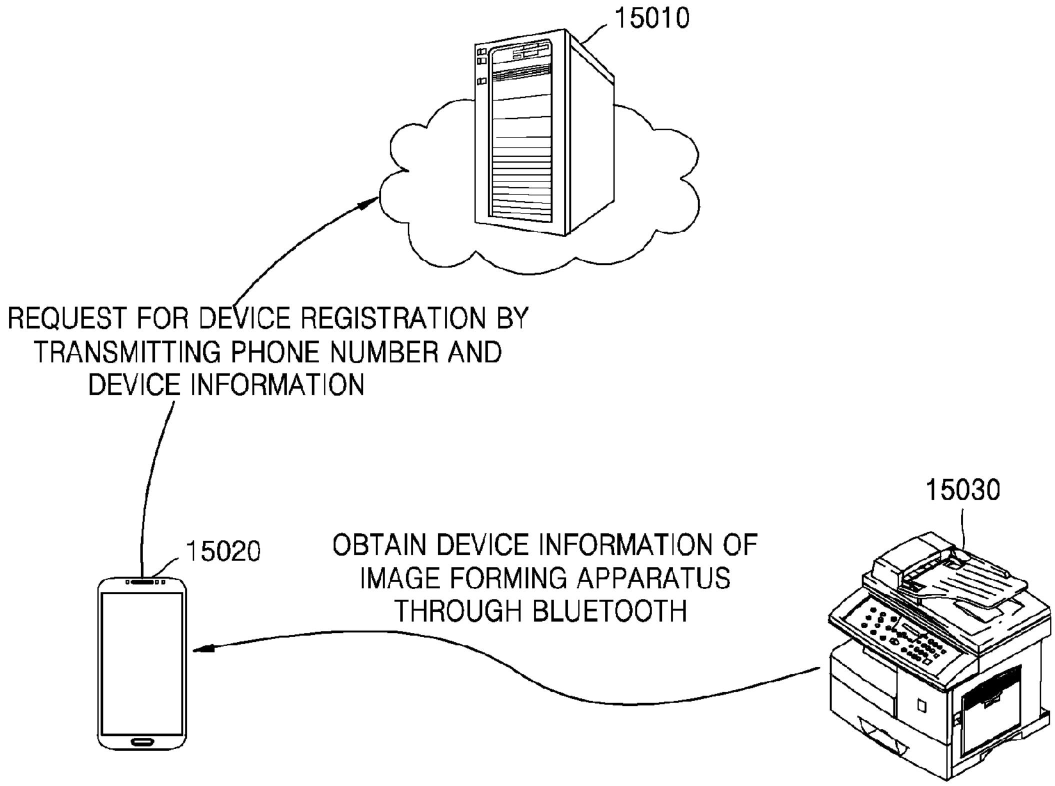
Figure 163:
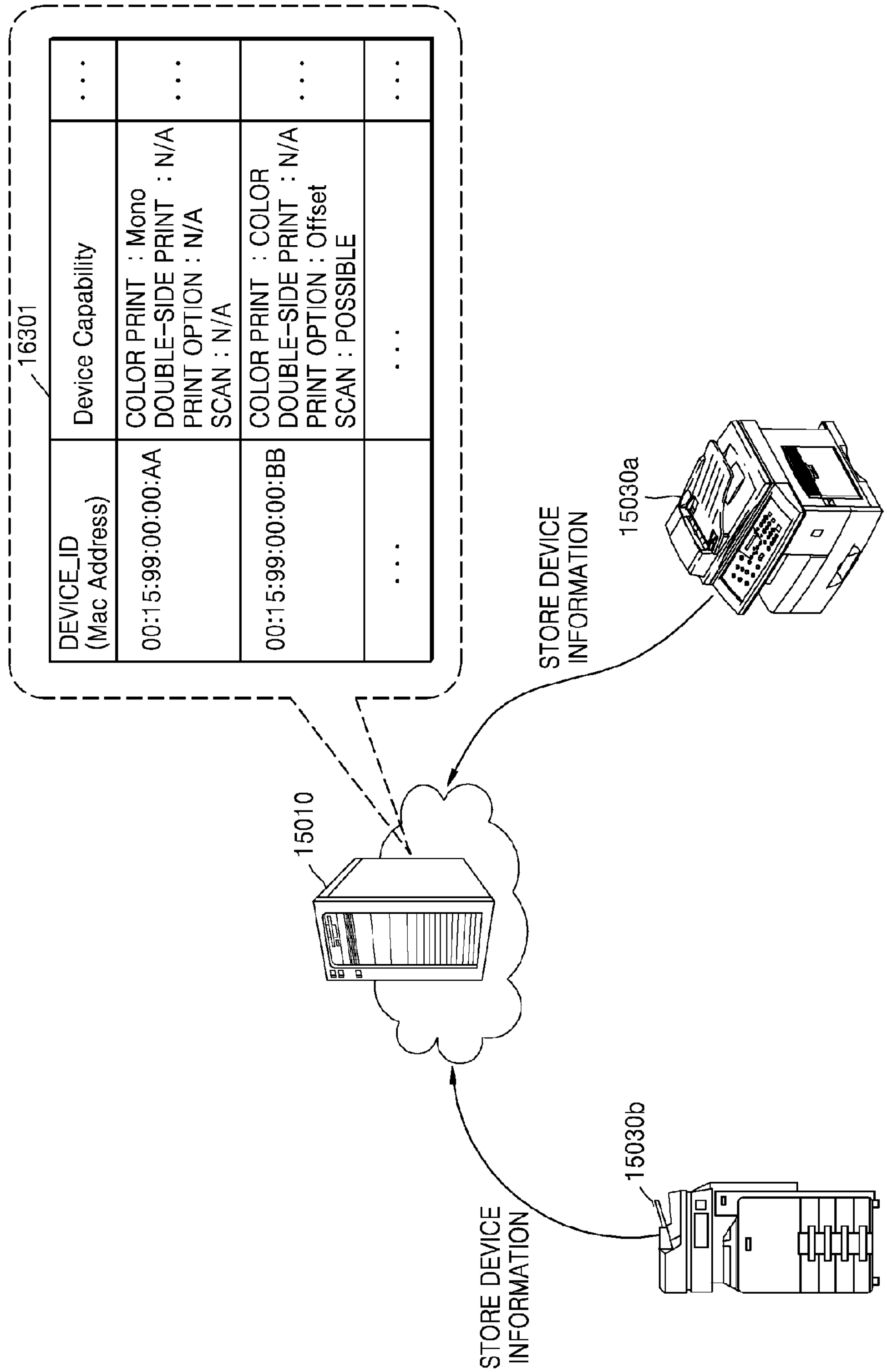
Figure 164:
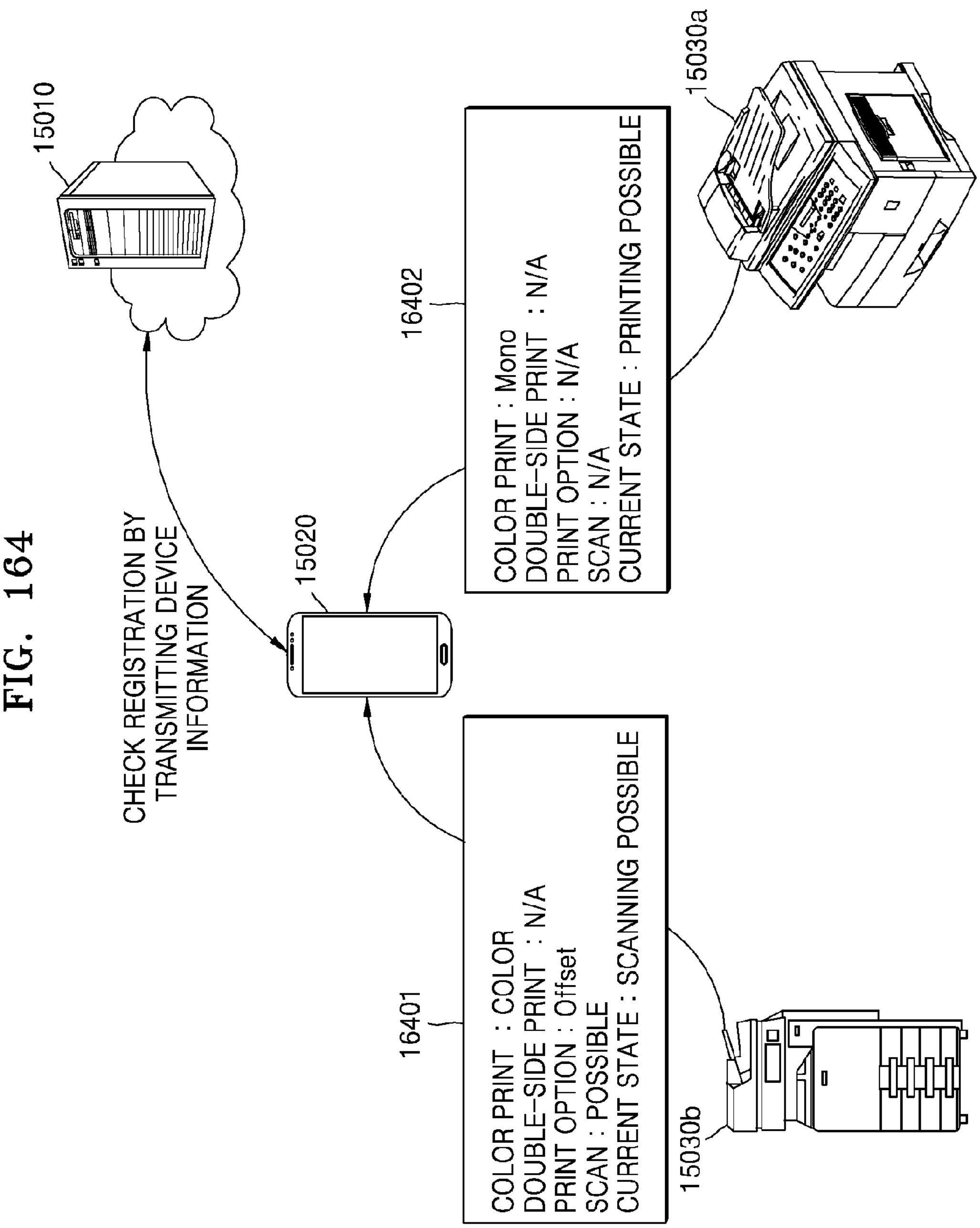
Figure 165:
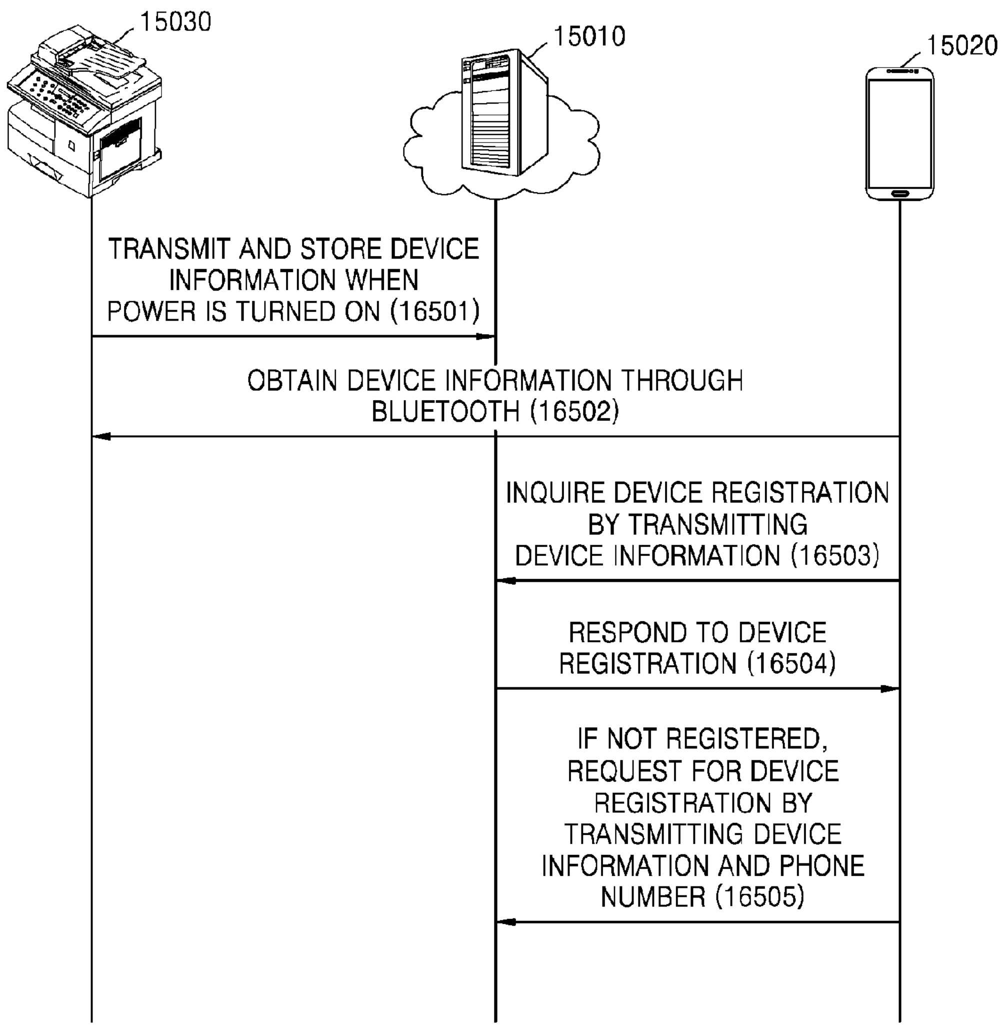
Figure 166:
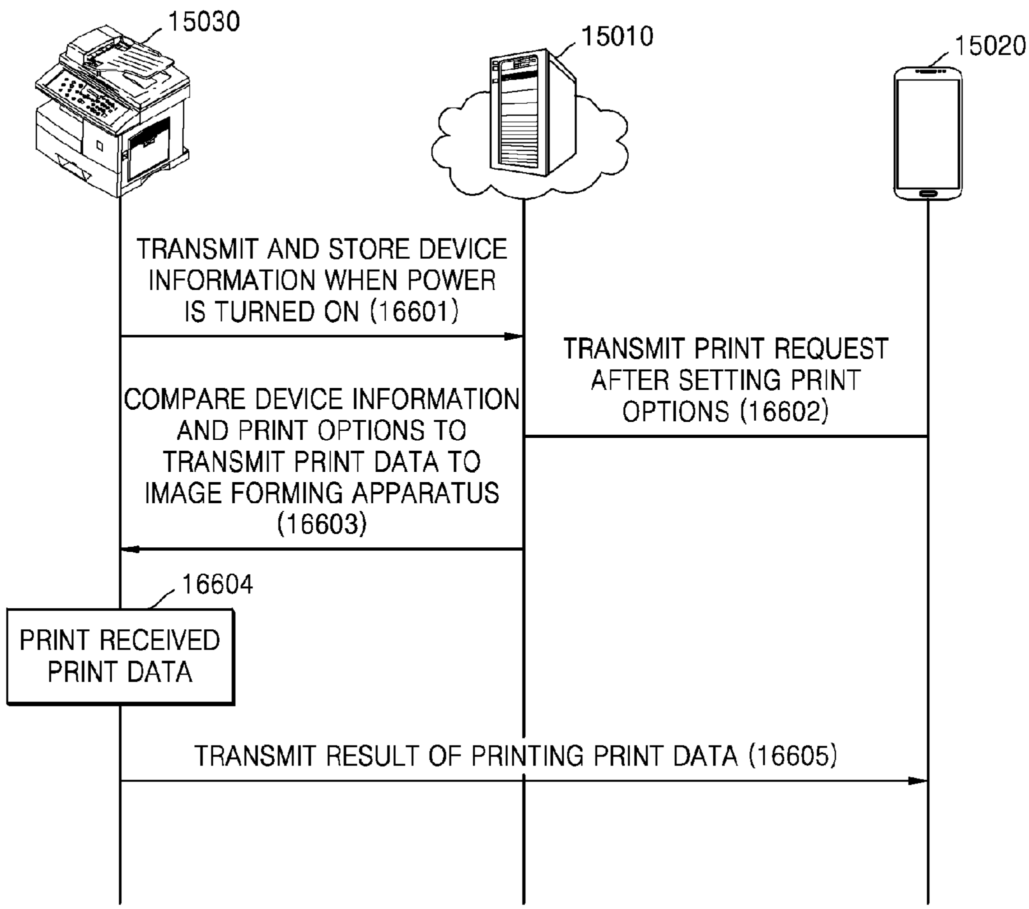
Figure 167:
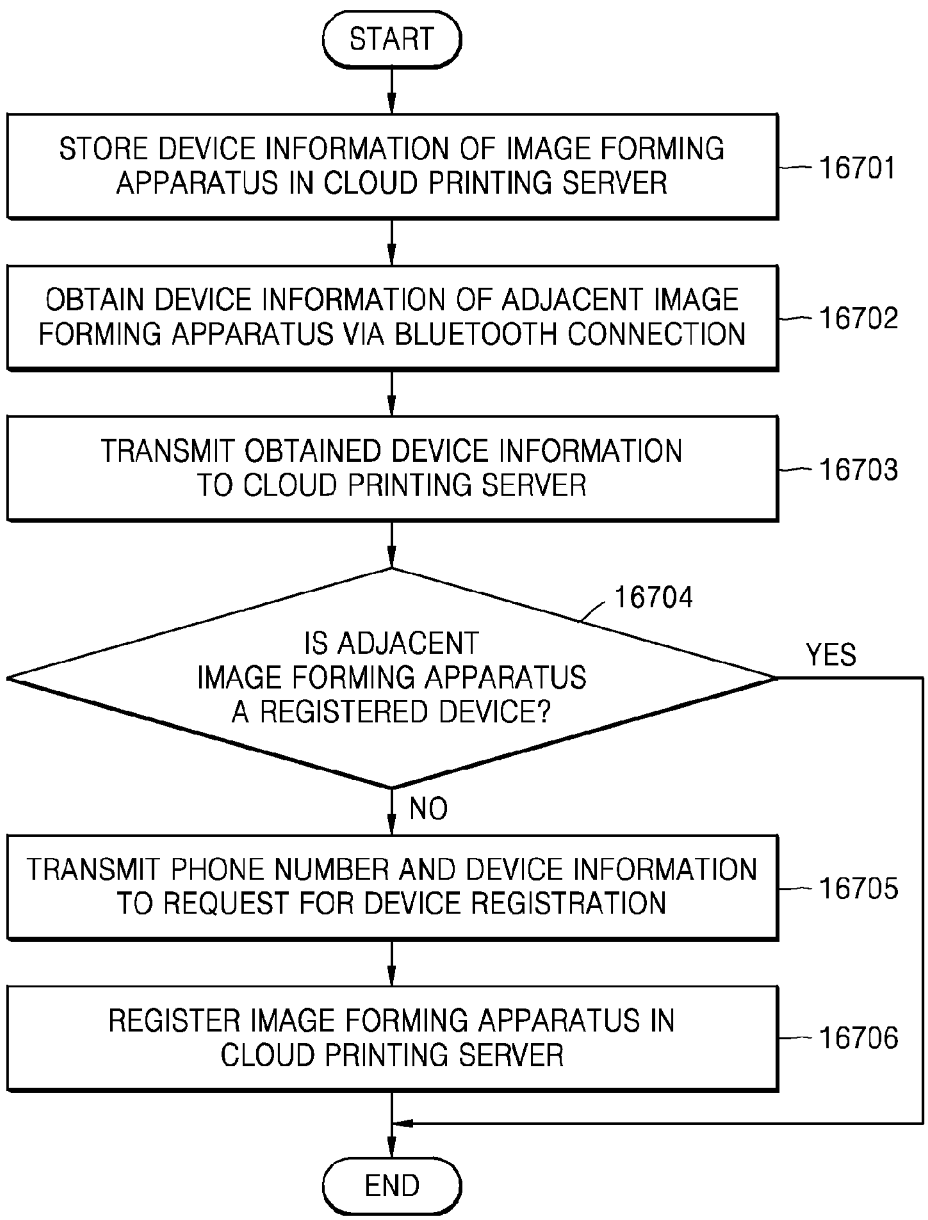
Figure 168:
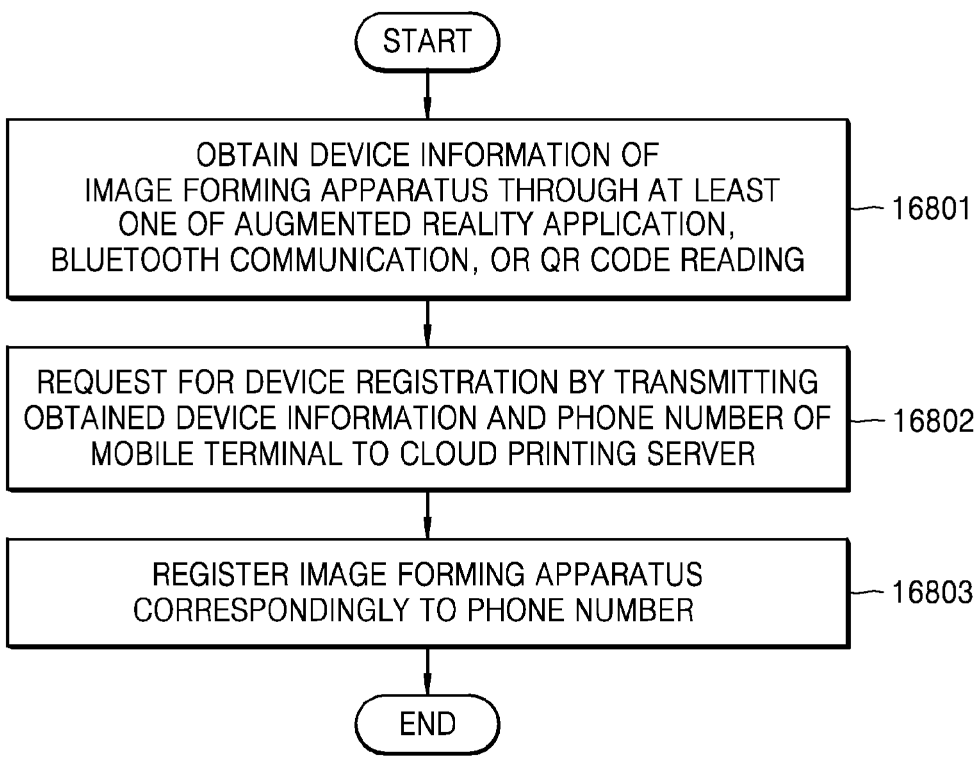
Figure 169:
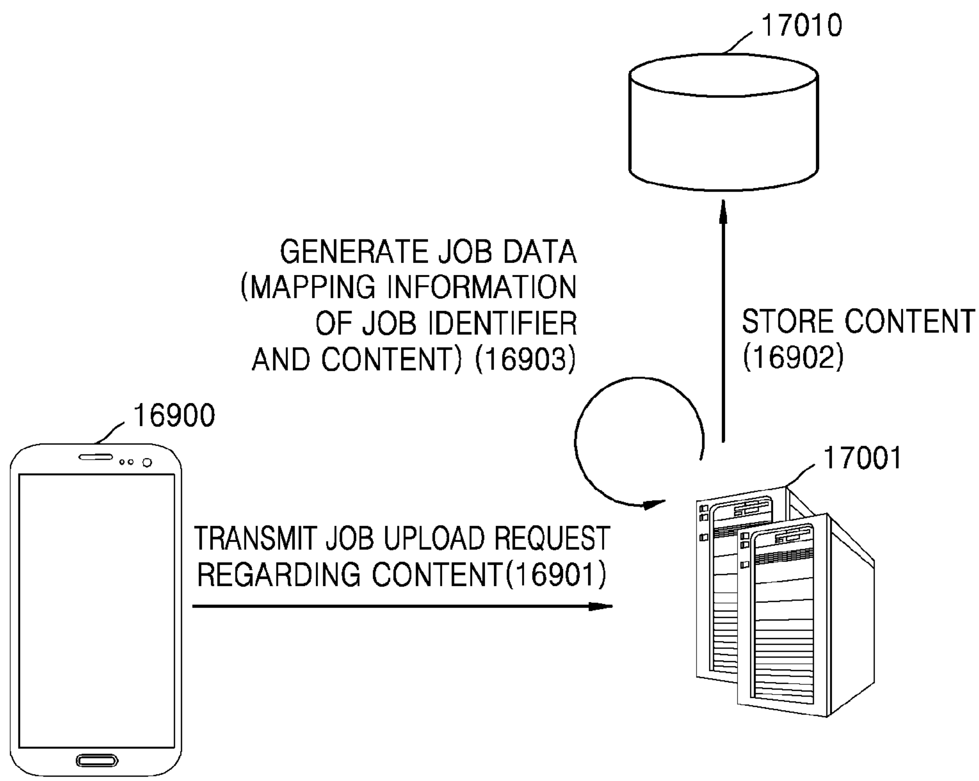
Figure 170:
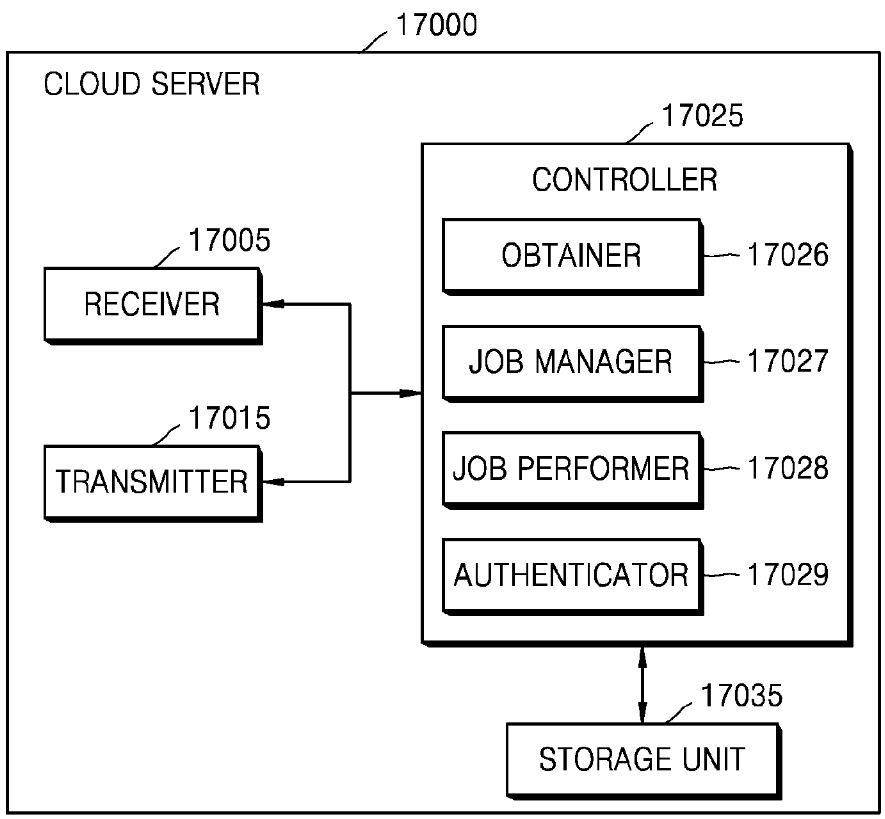
Figure 171:
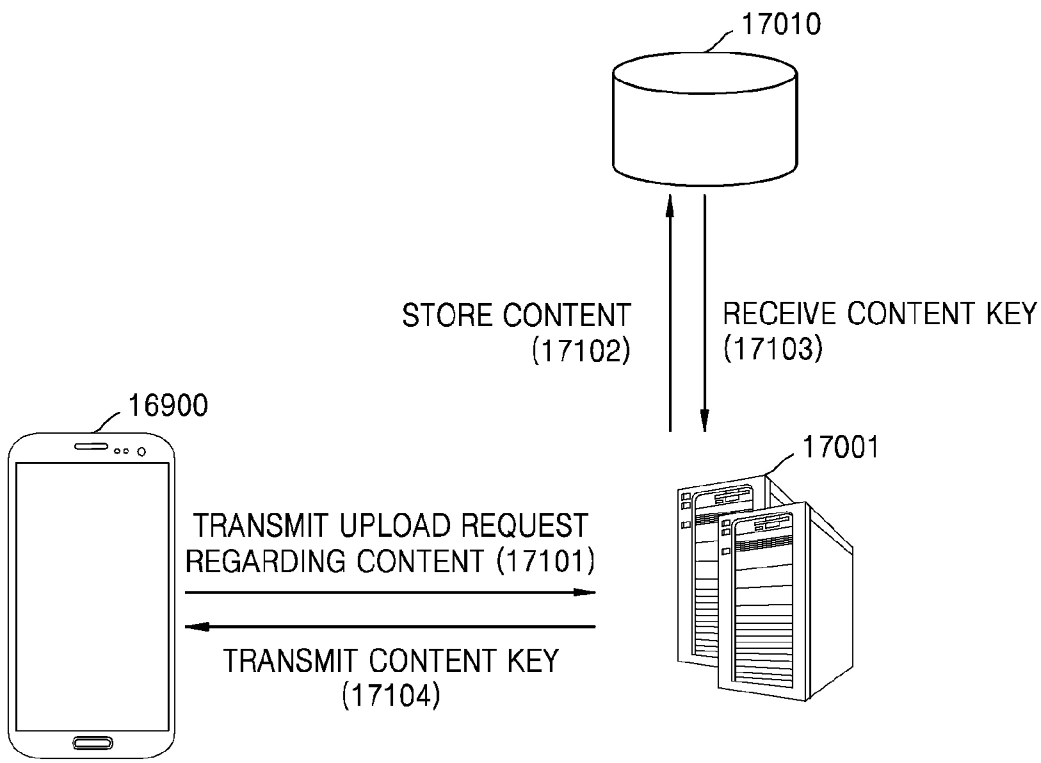
Figure 172:
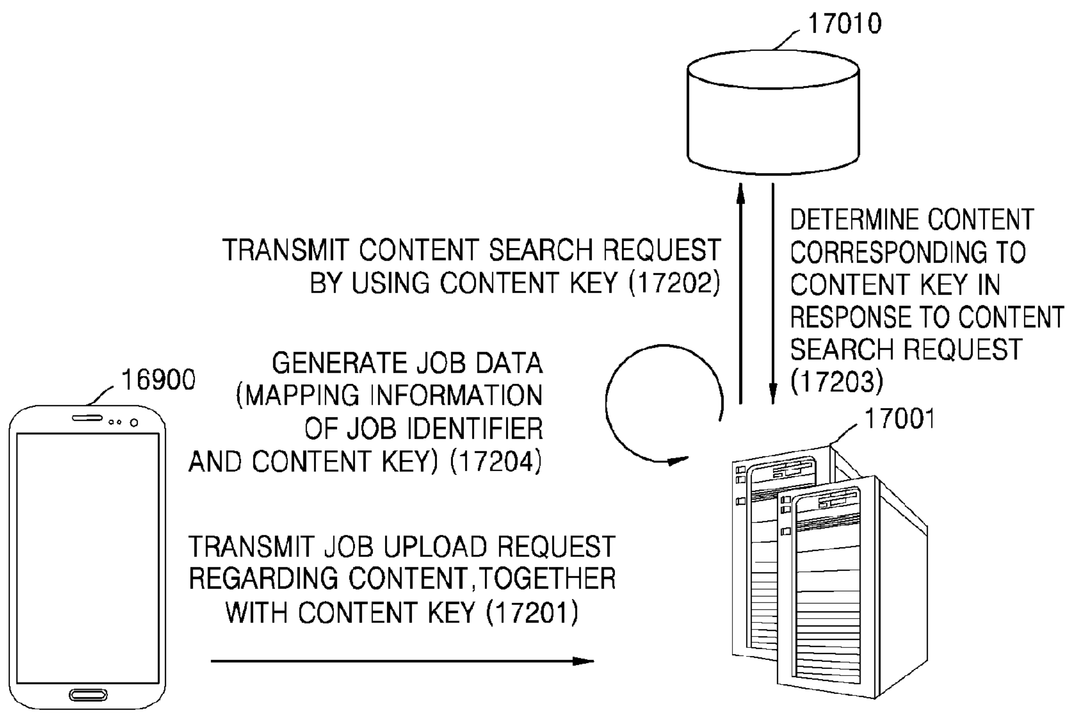
Figure 173:
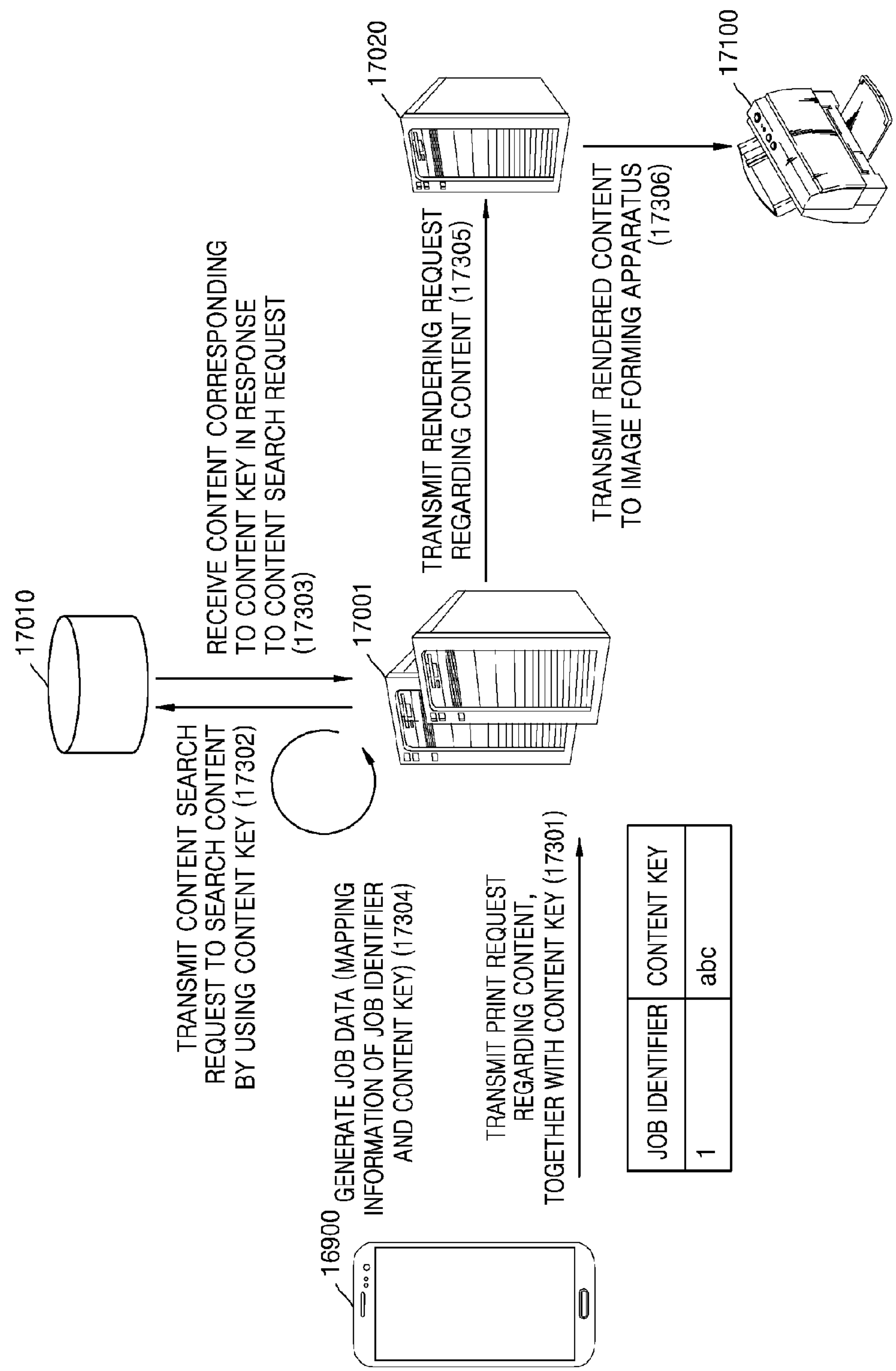
Figure 174:
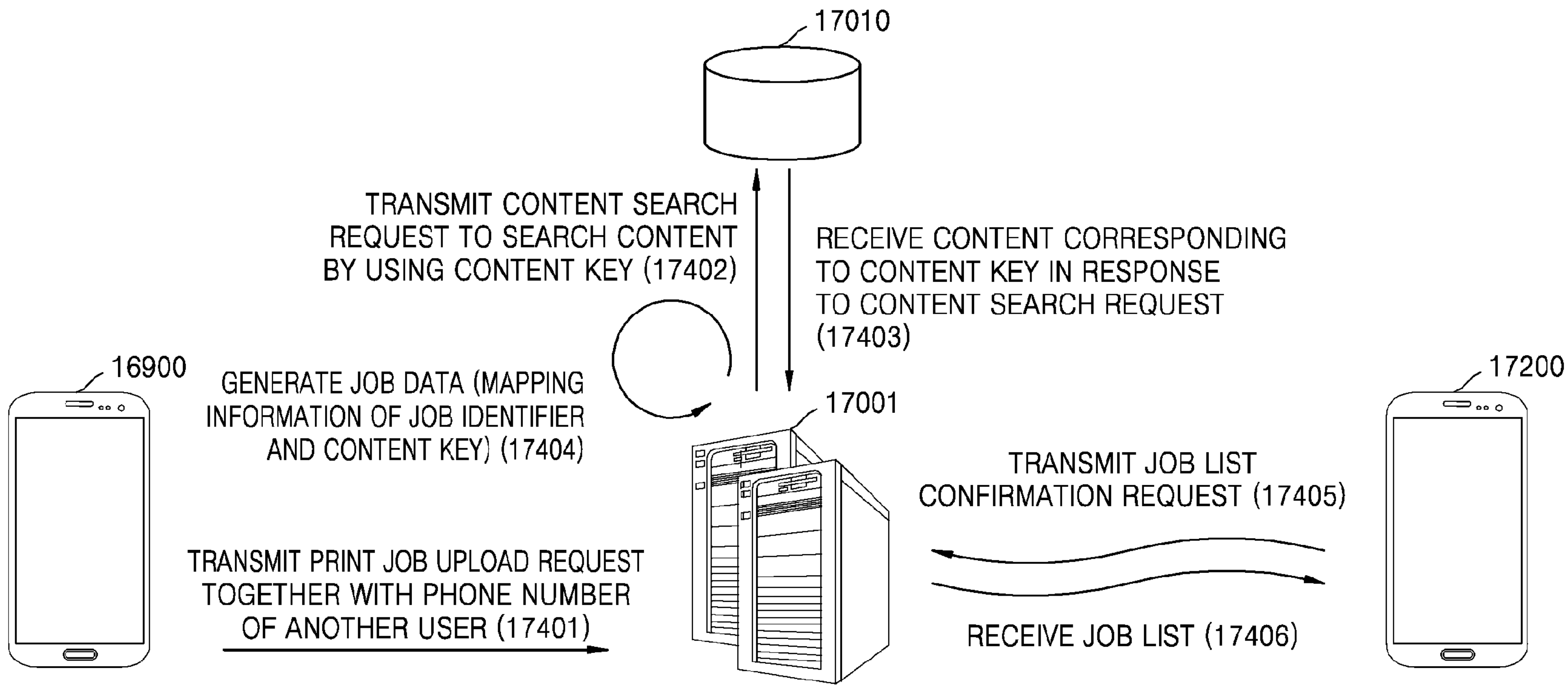
Figure 175:
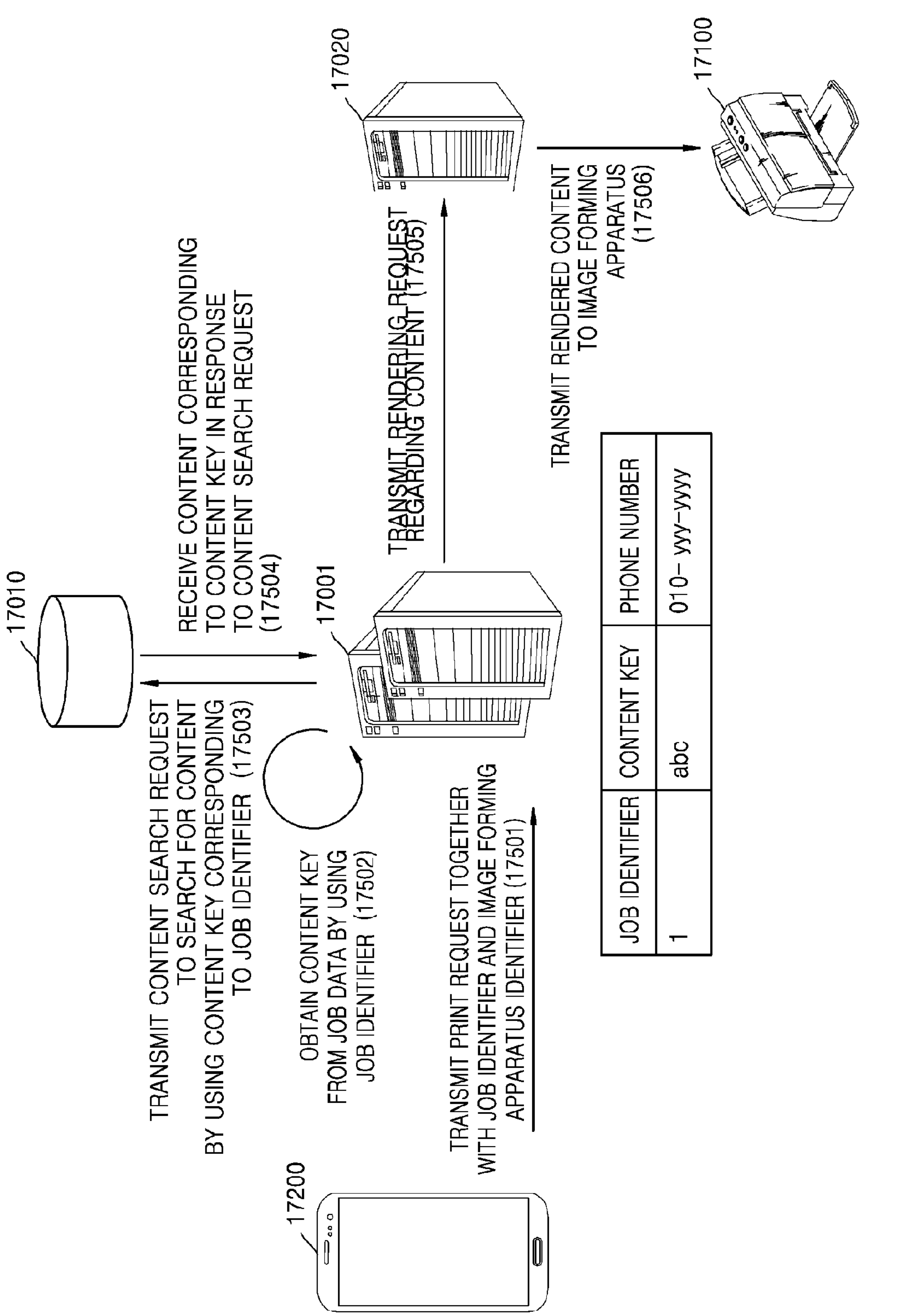
Figure 176:
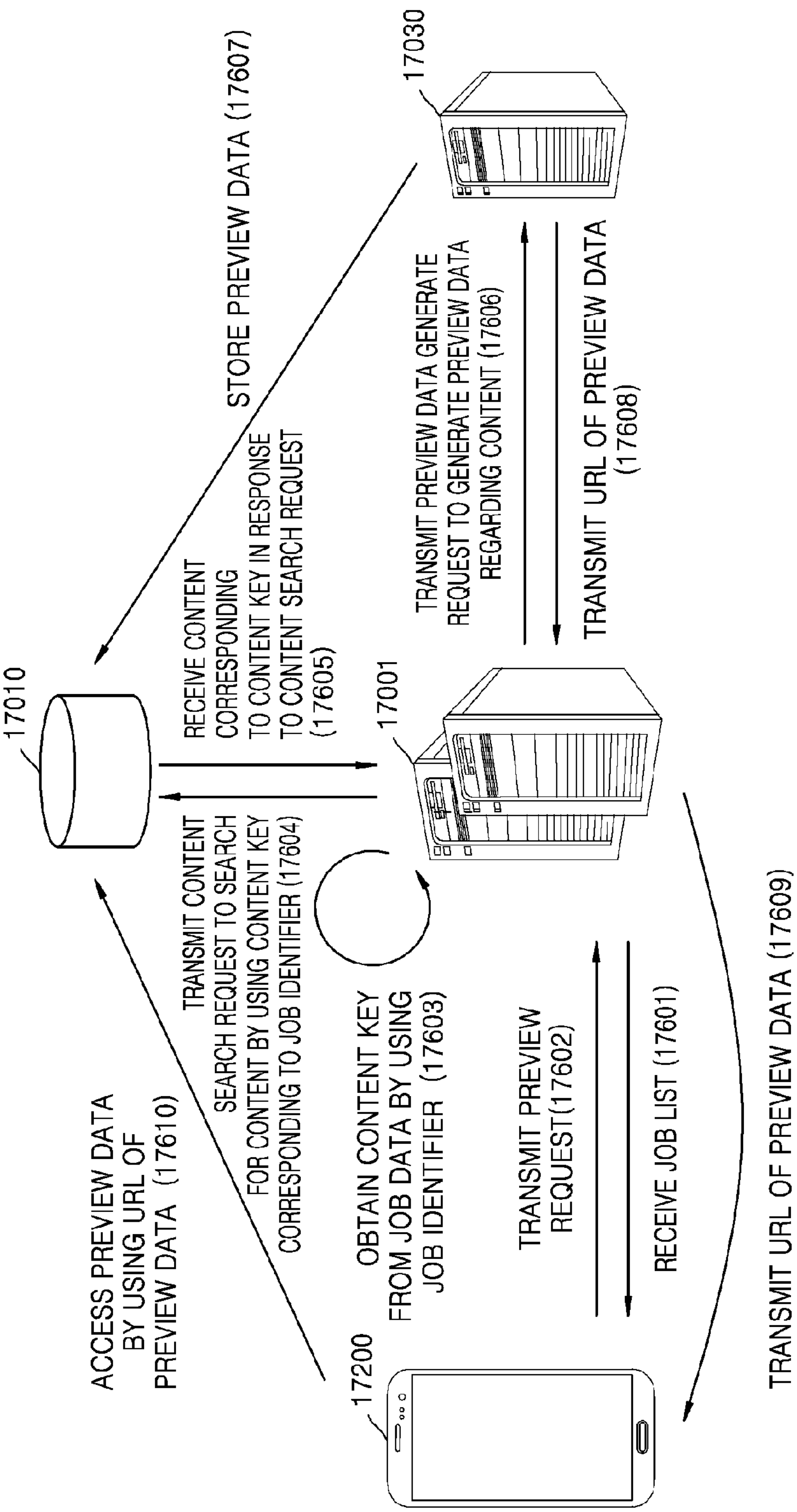
Figure 177:
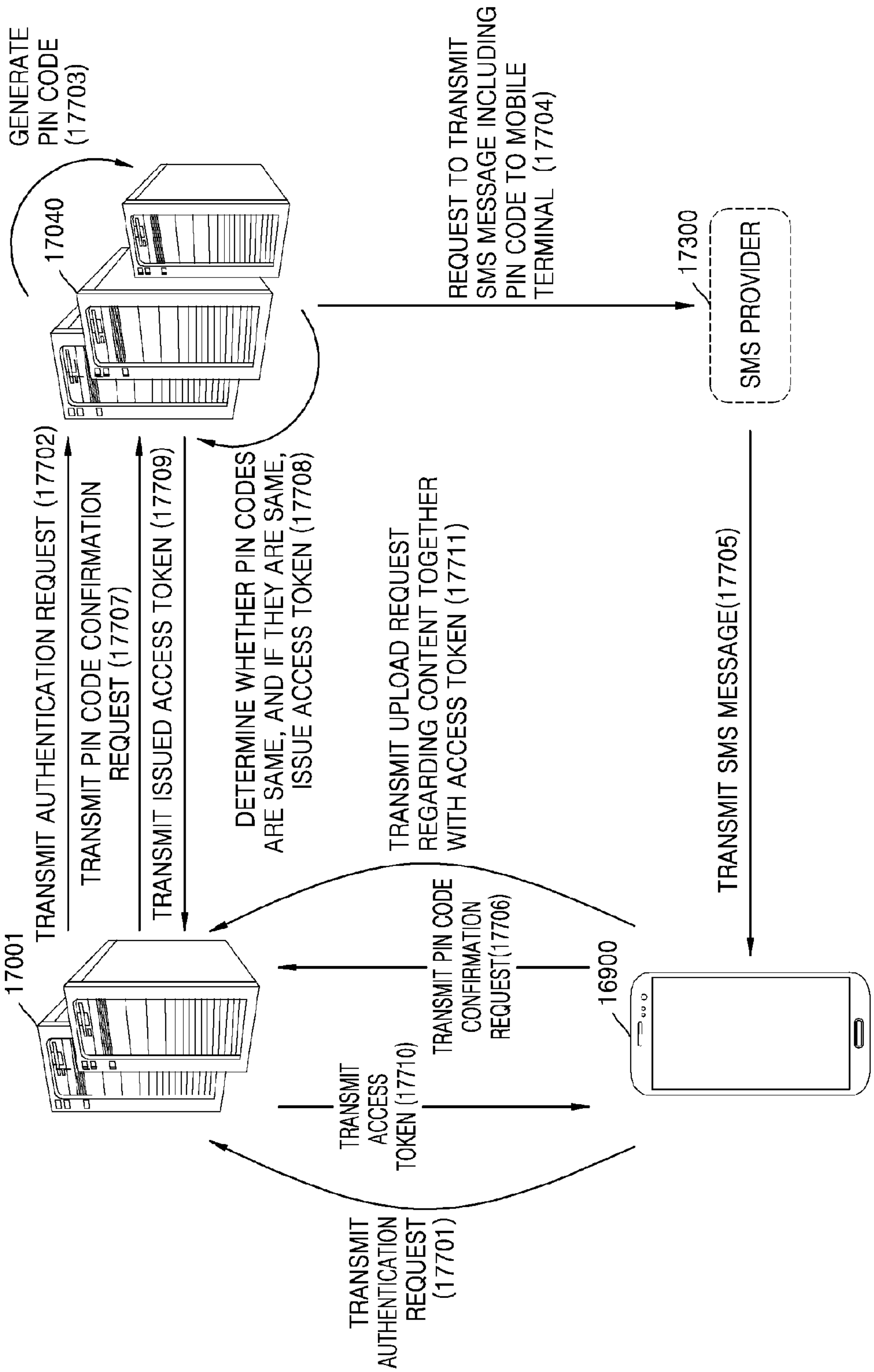
Figure 178:
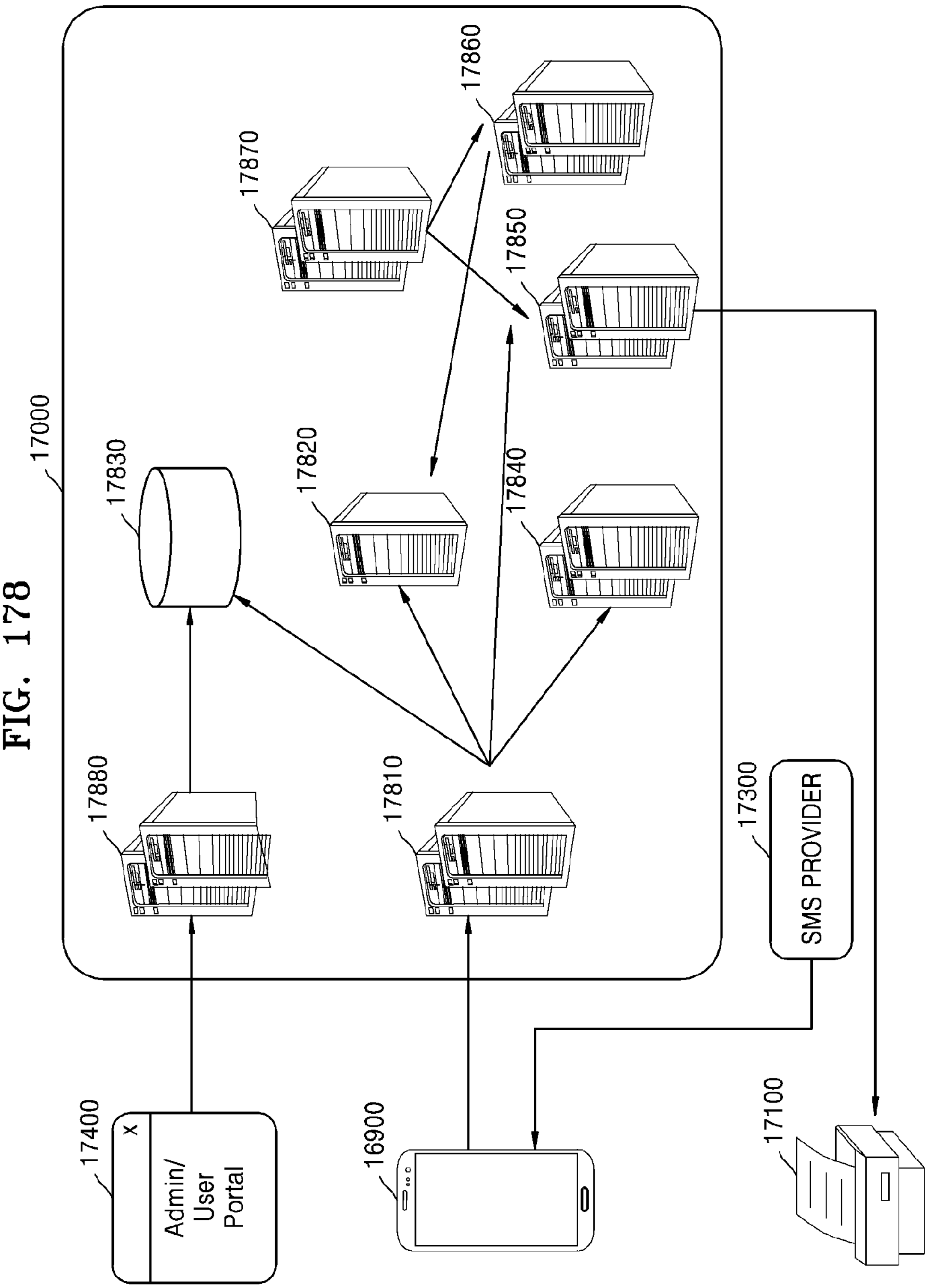
Figure 179:
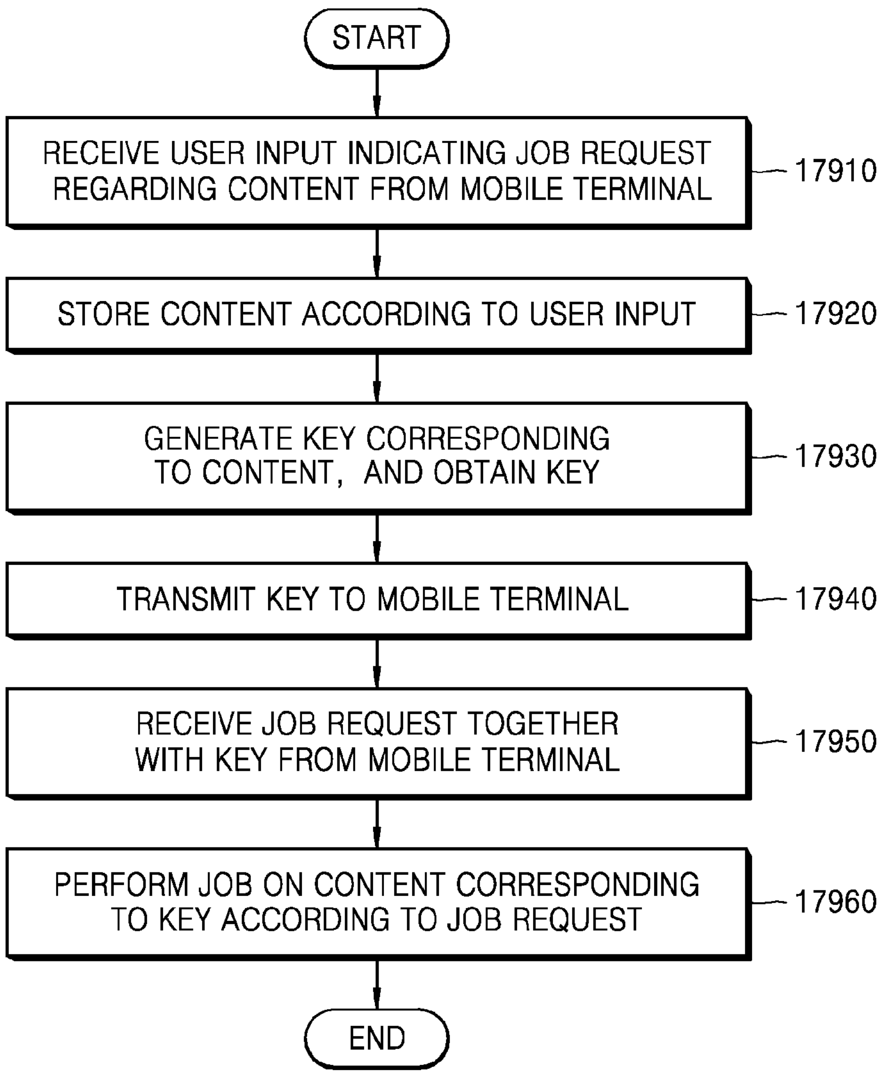
Figure 180:
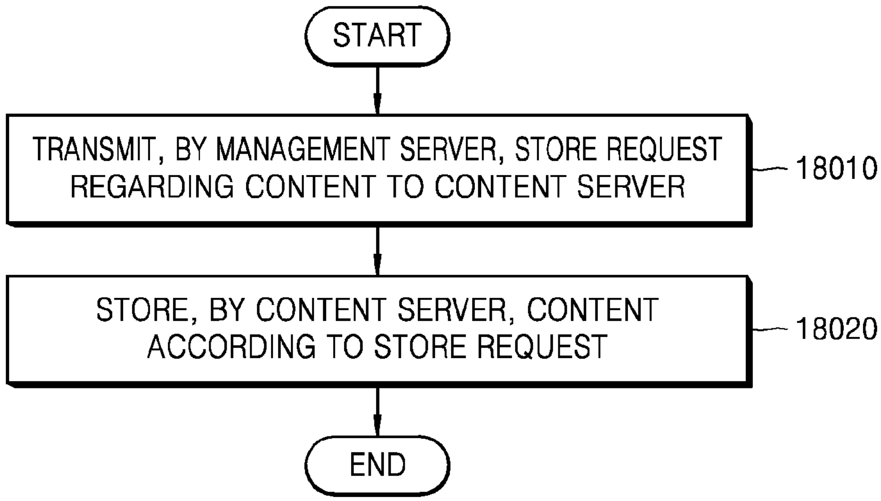
Figure 181:
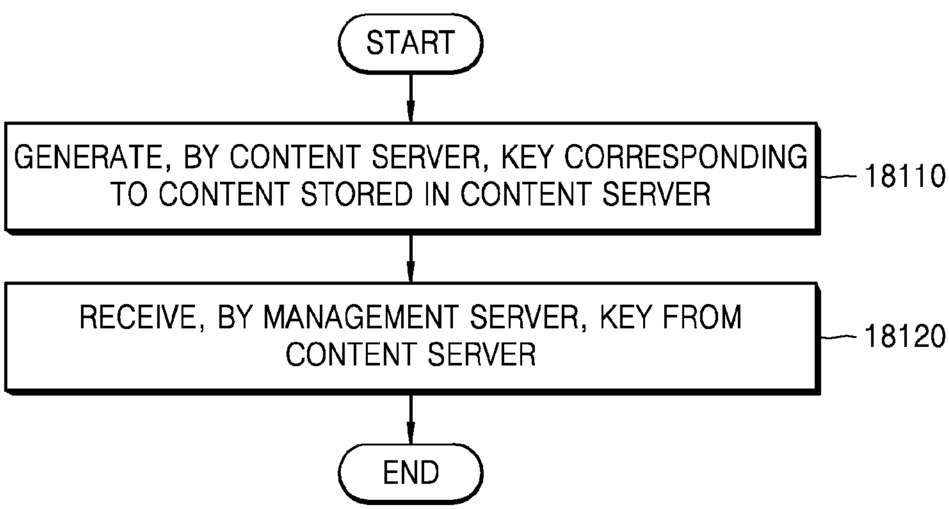
Figure 182:
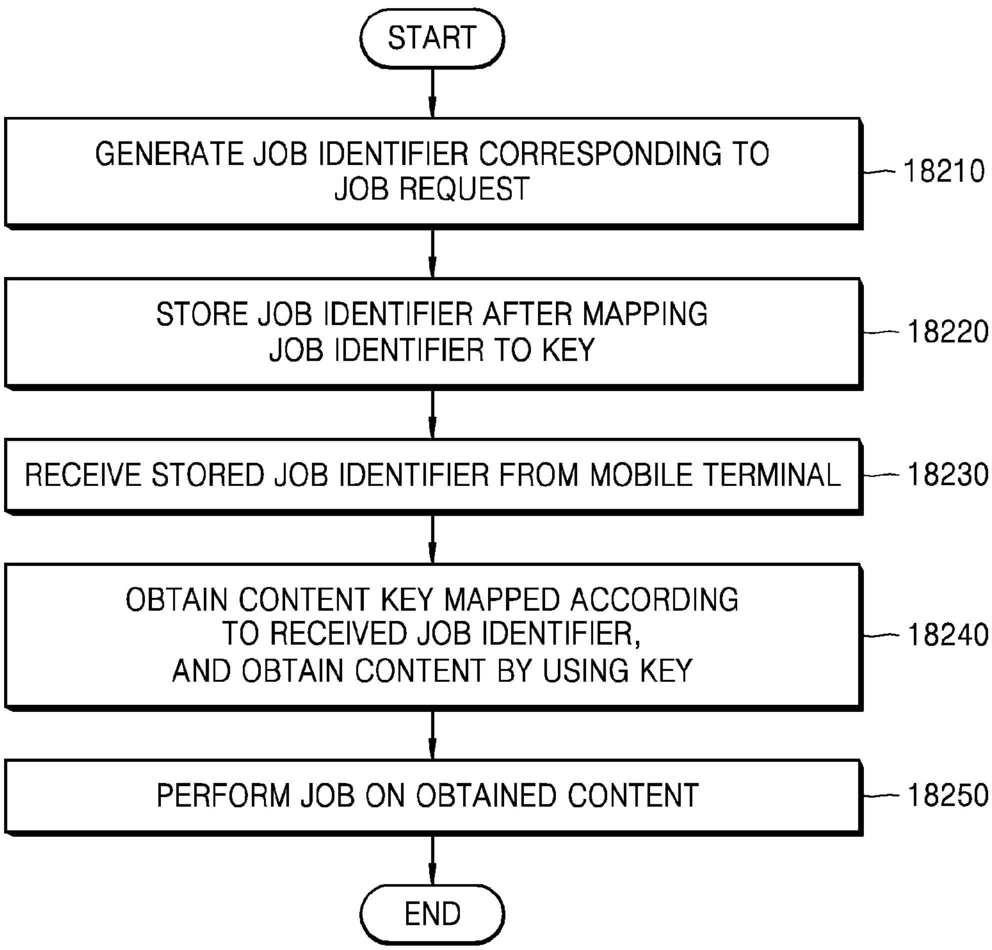
Figure 183:
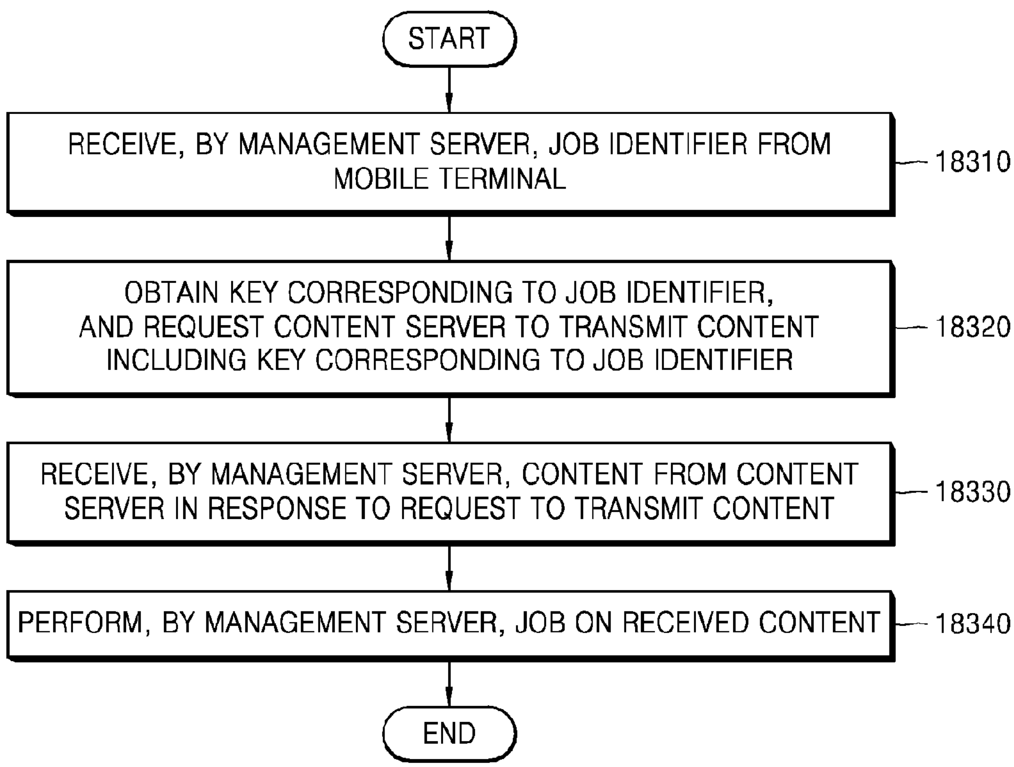
Figure 184:
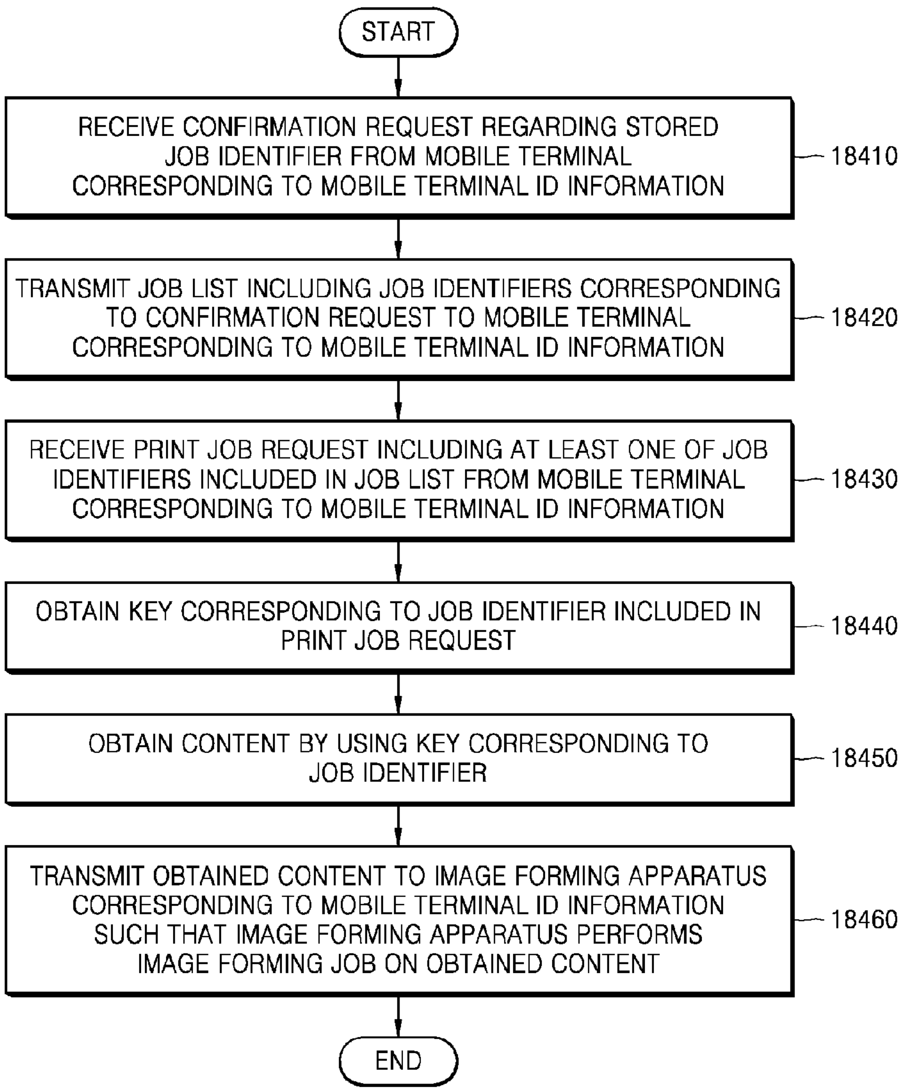
Figure 185:
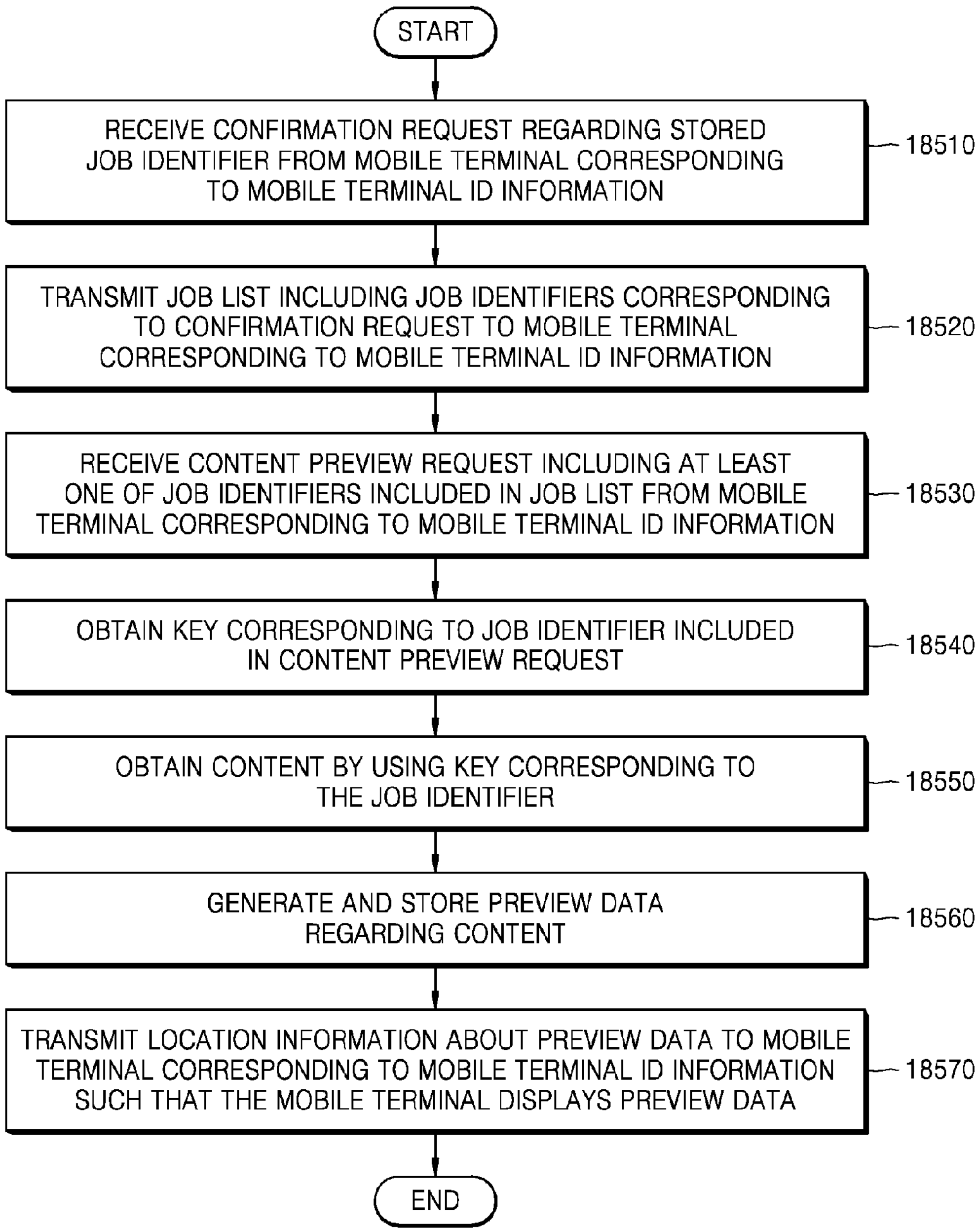
Figure 186:
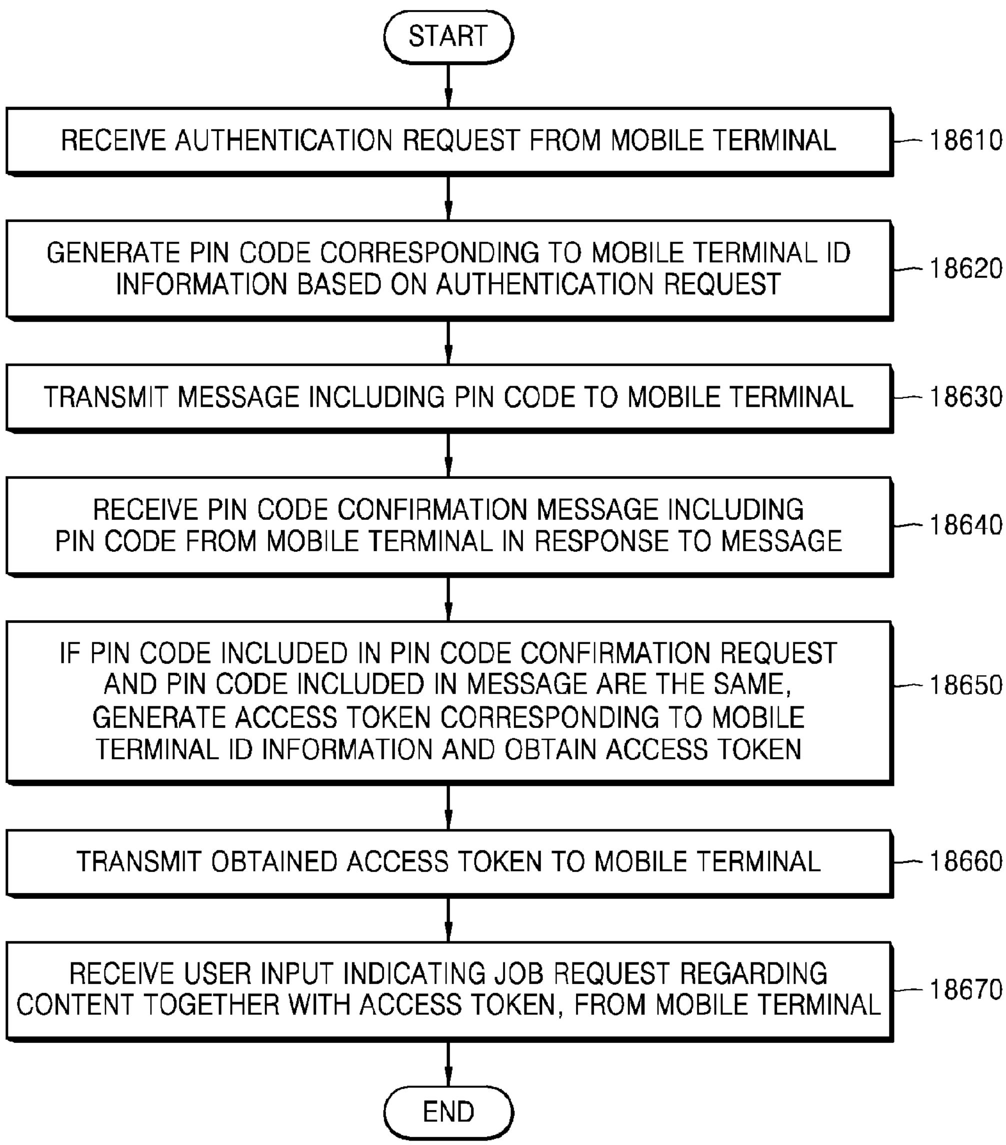
Figure 187:
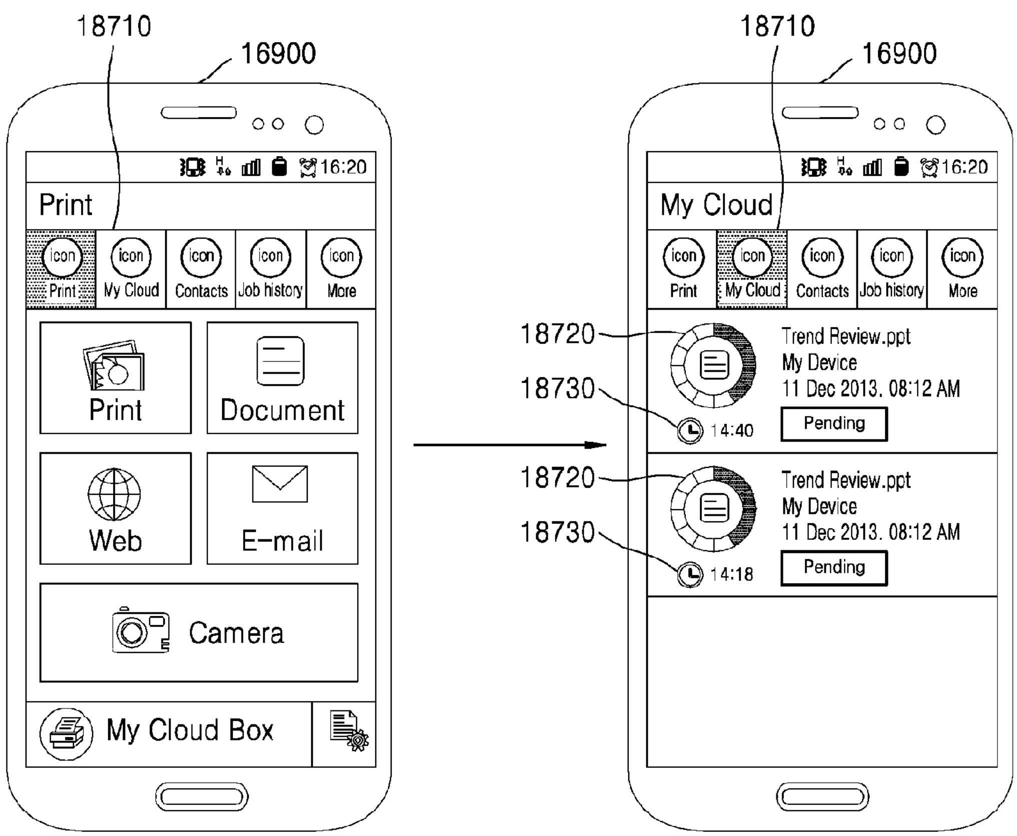
Figure 188:
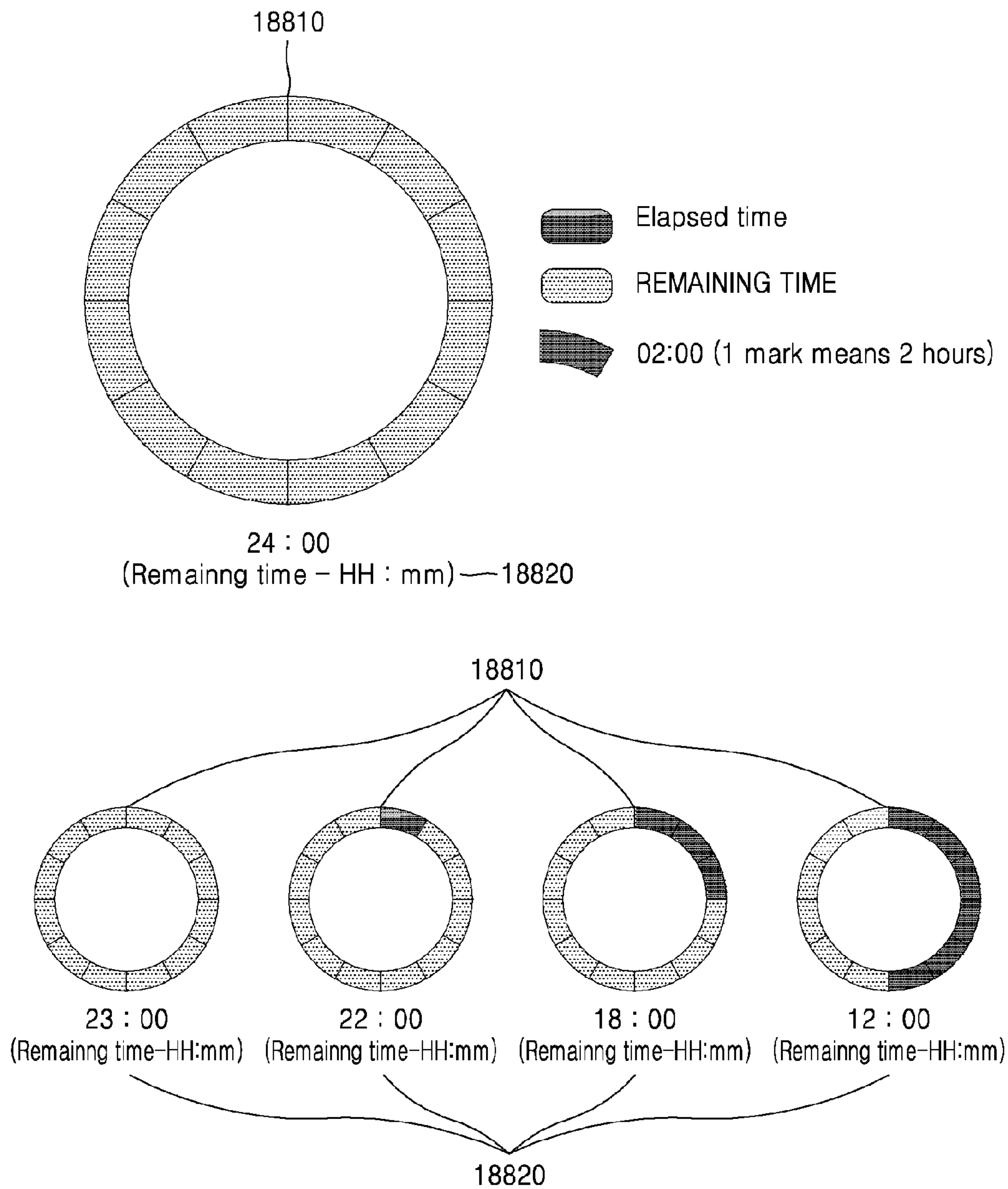
Figure 189:
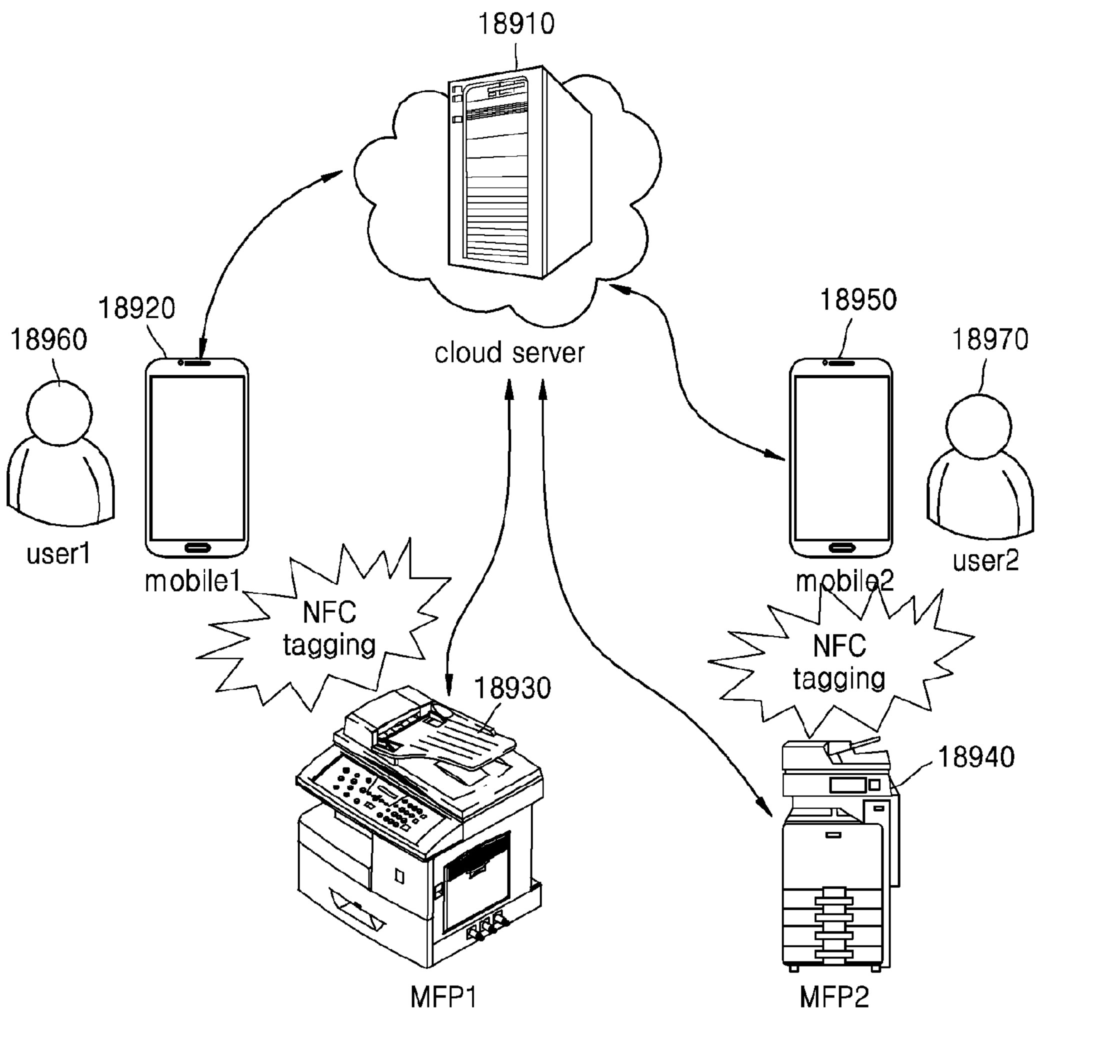
Figure 190:
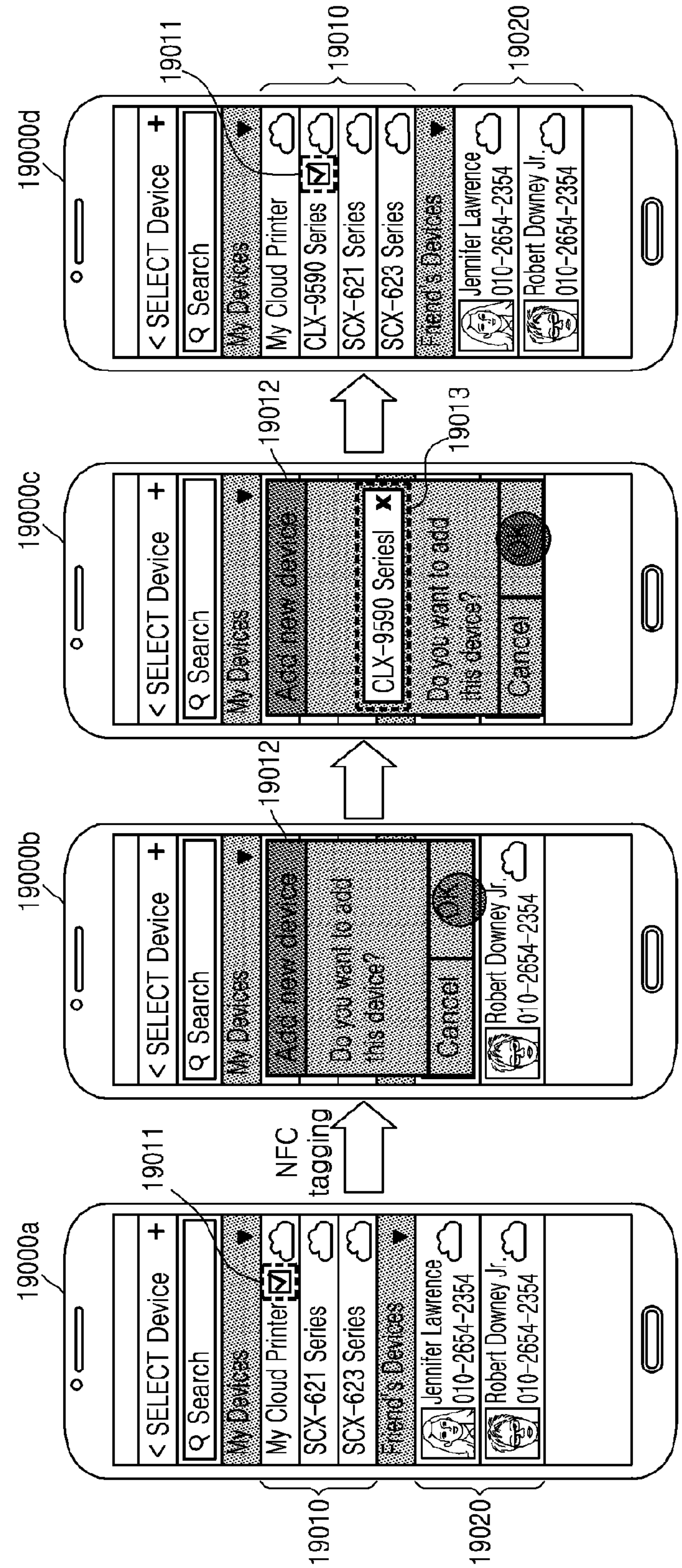
Figure 191:
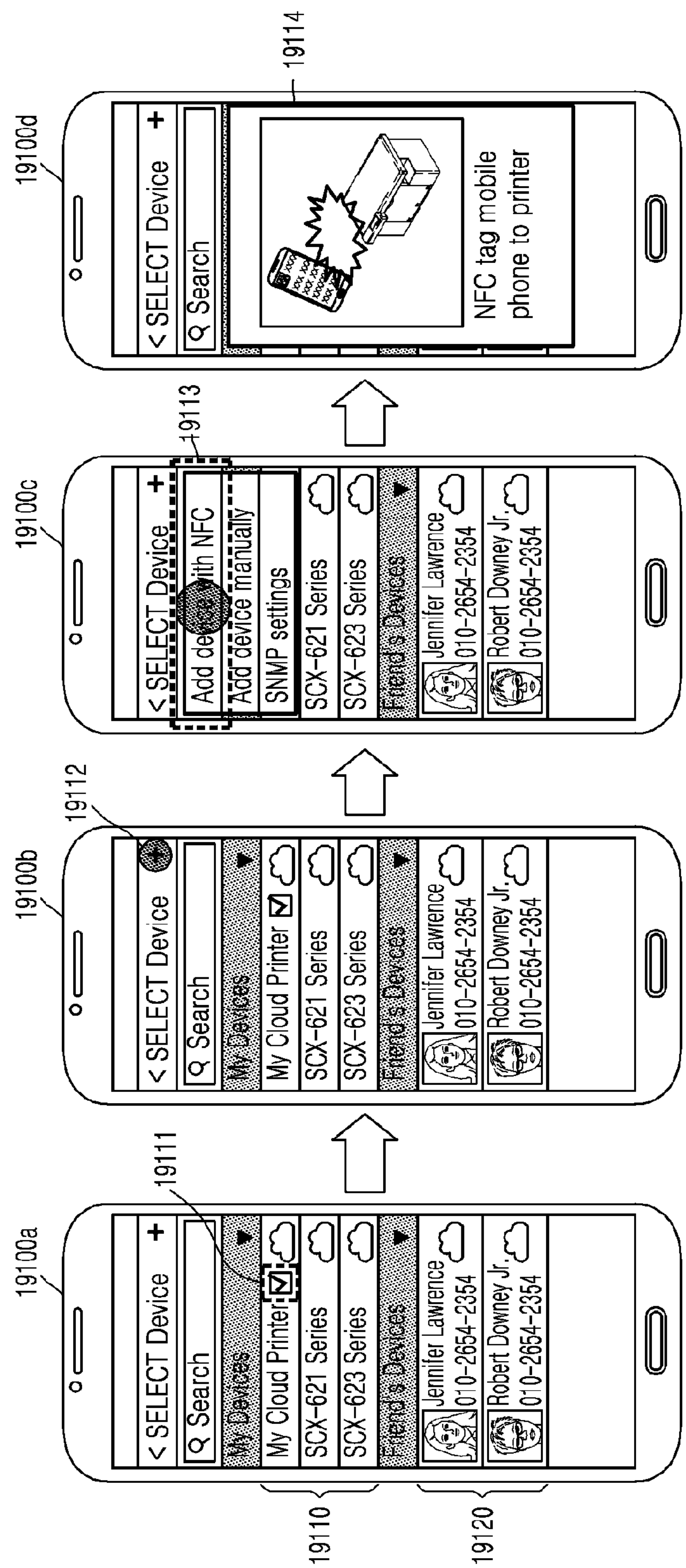
Figure 192A:
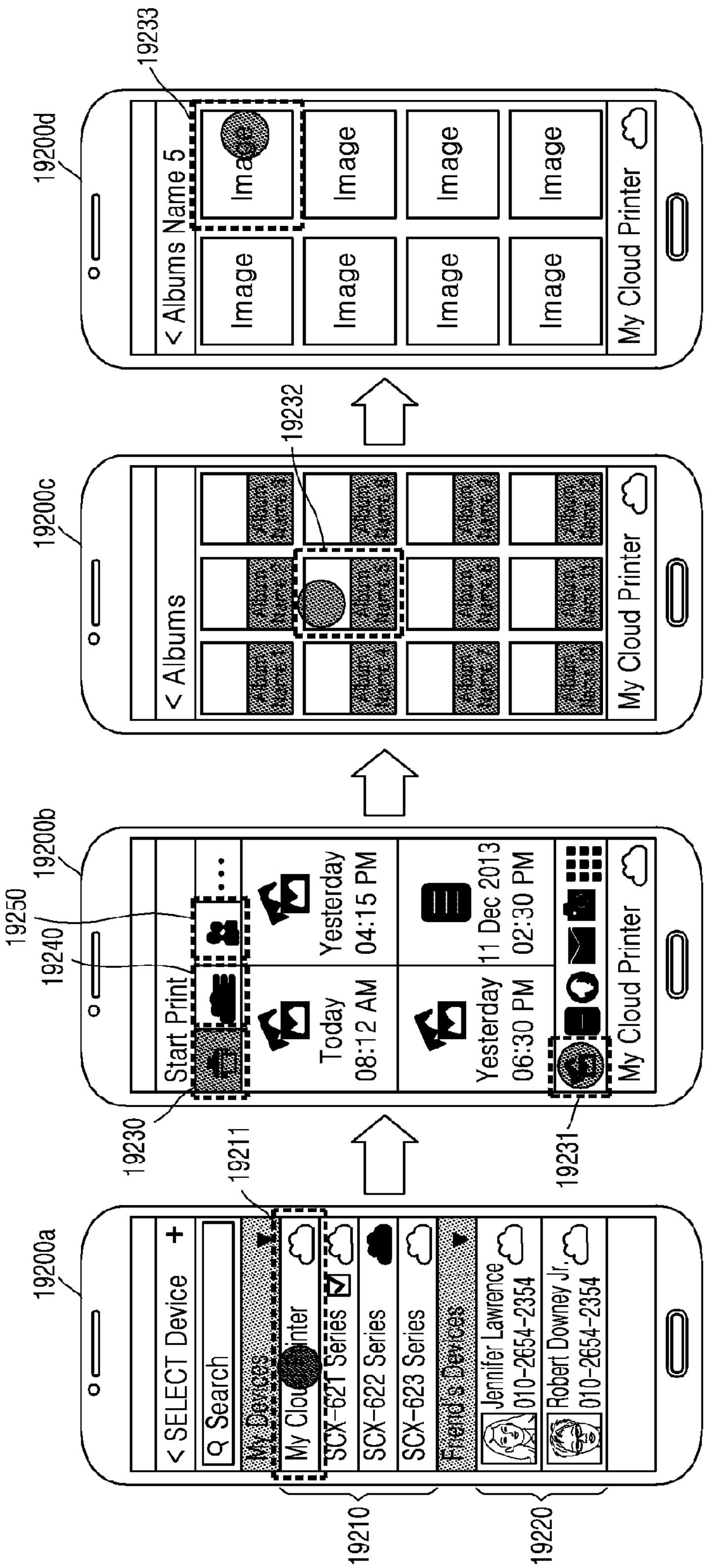
Figure 192B:
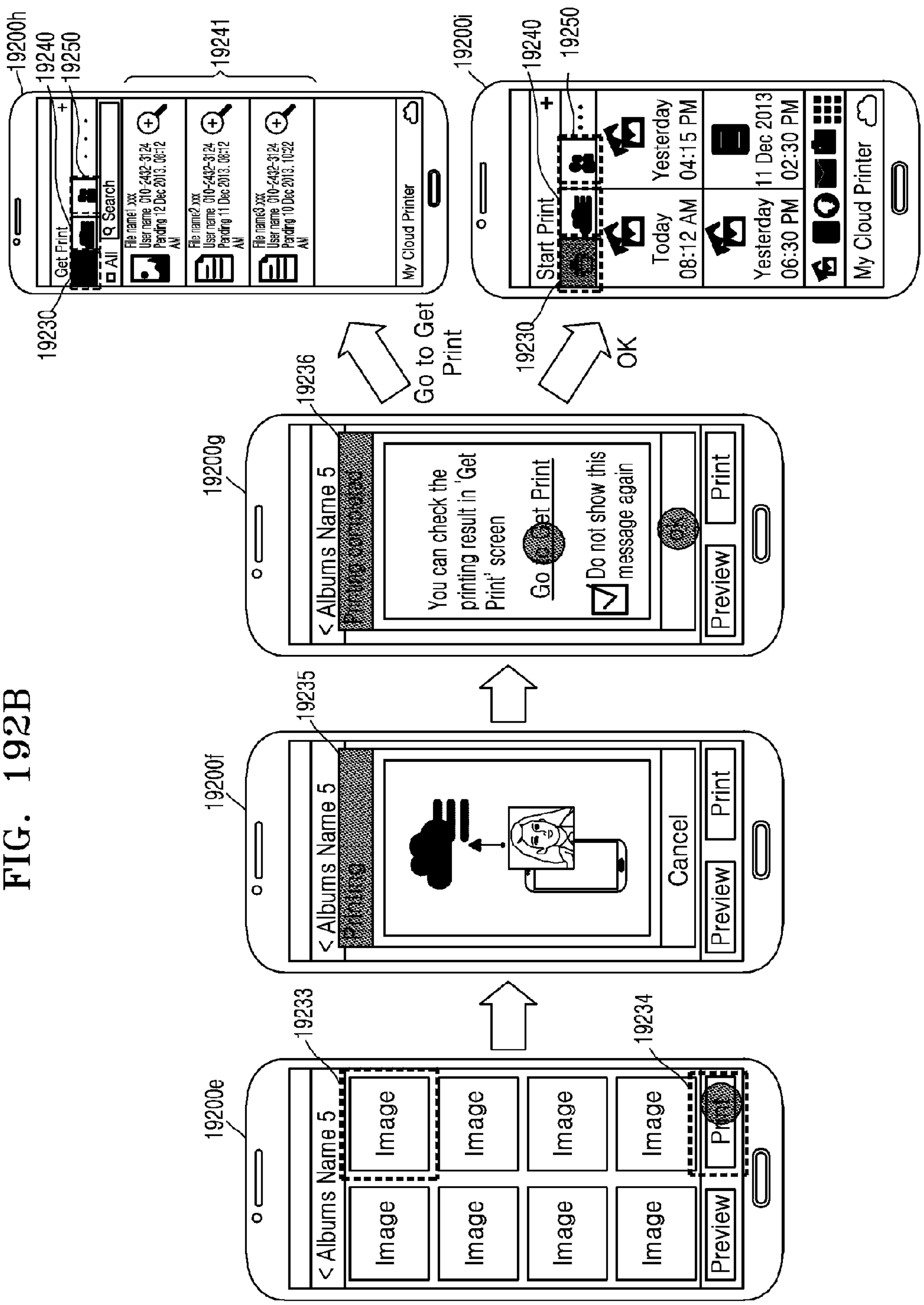
Figure 193A:
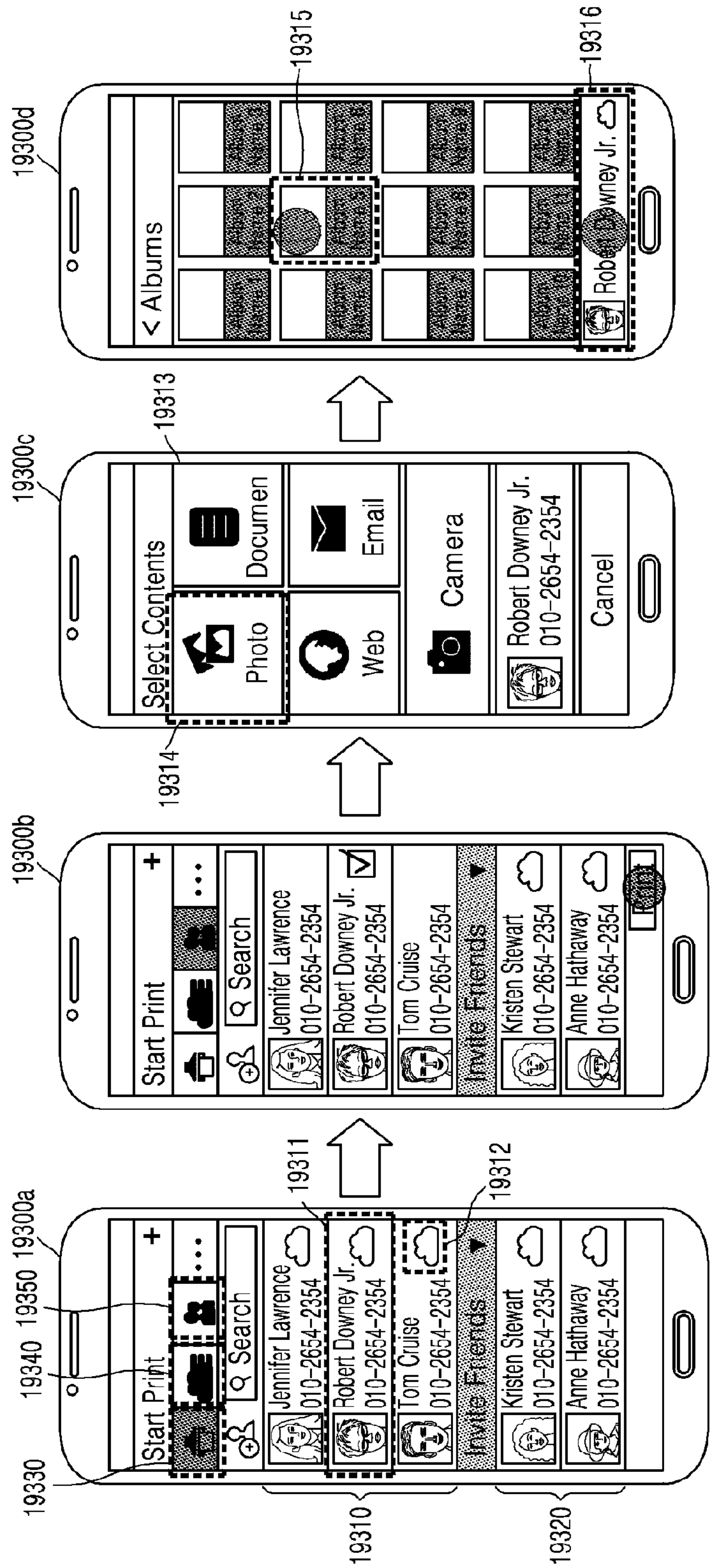
Figure 193B:
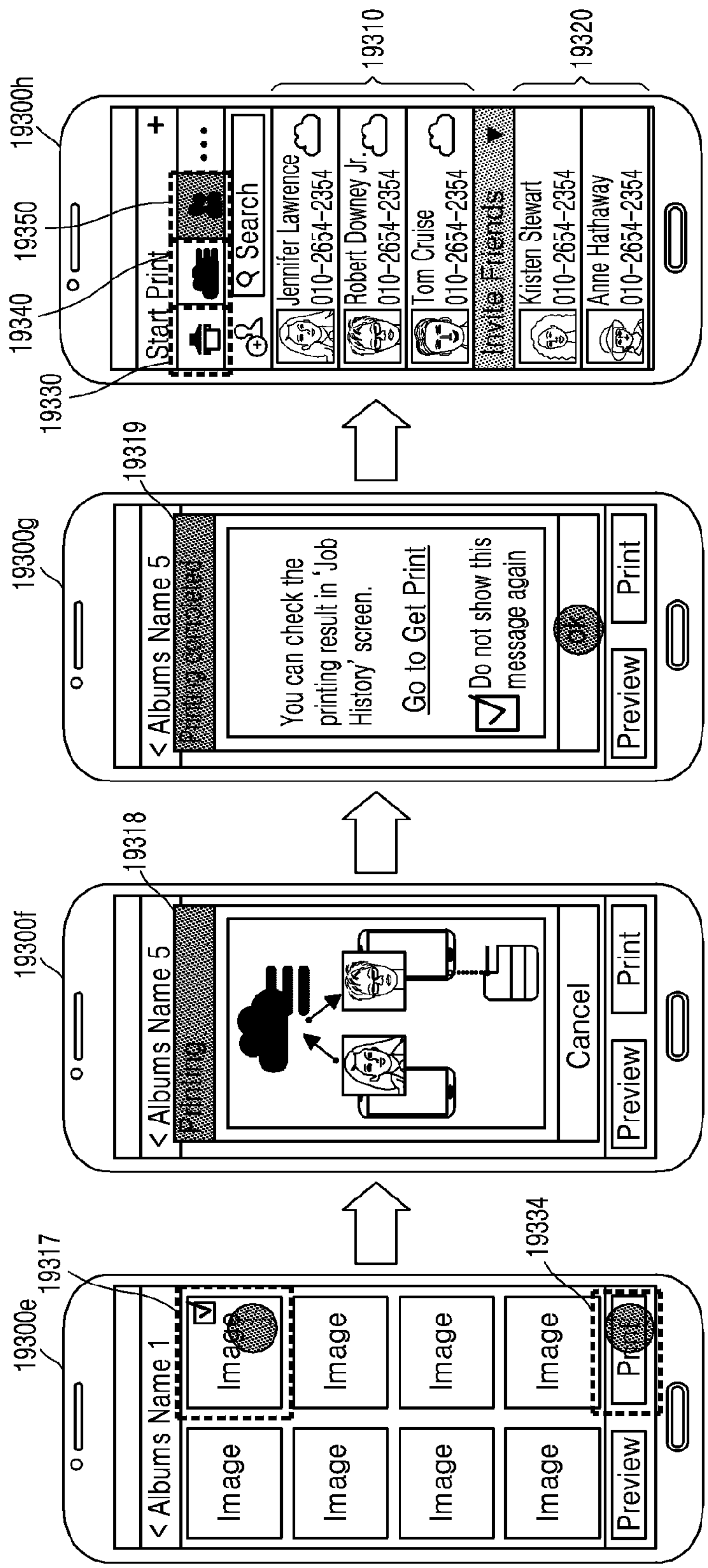
Figure 194:
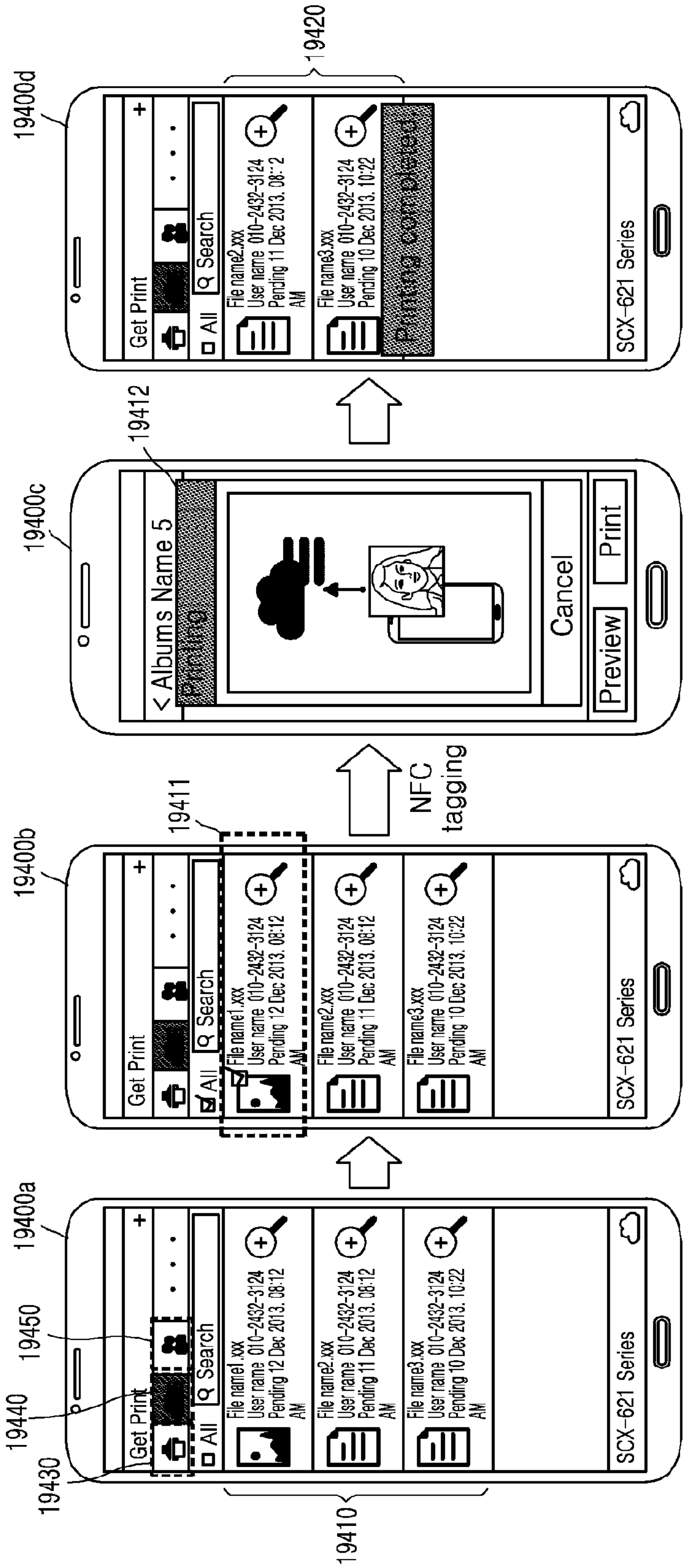
Figure 195:
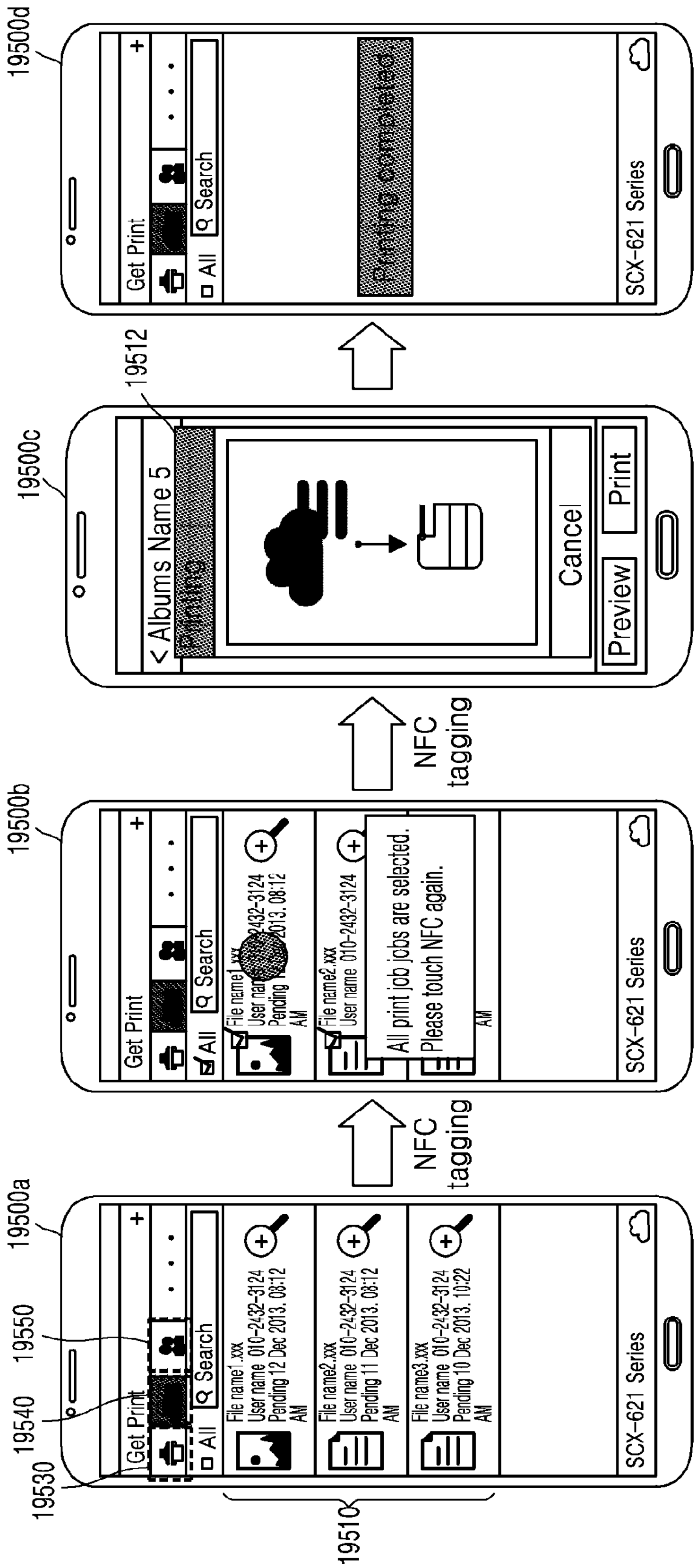
Figure 206:
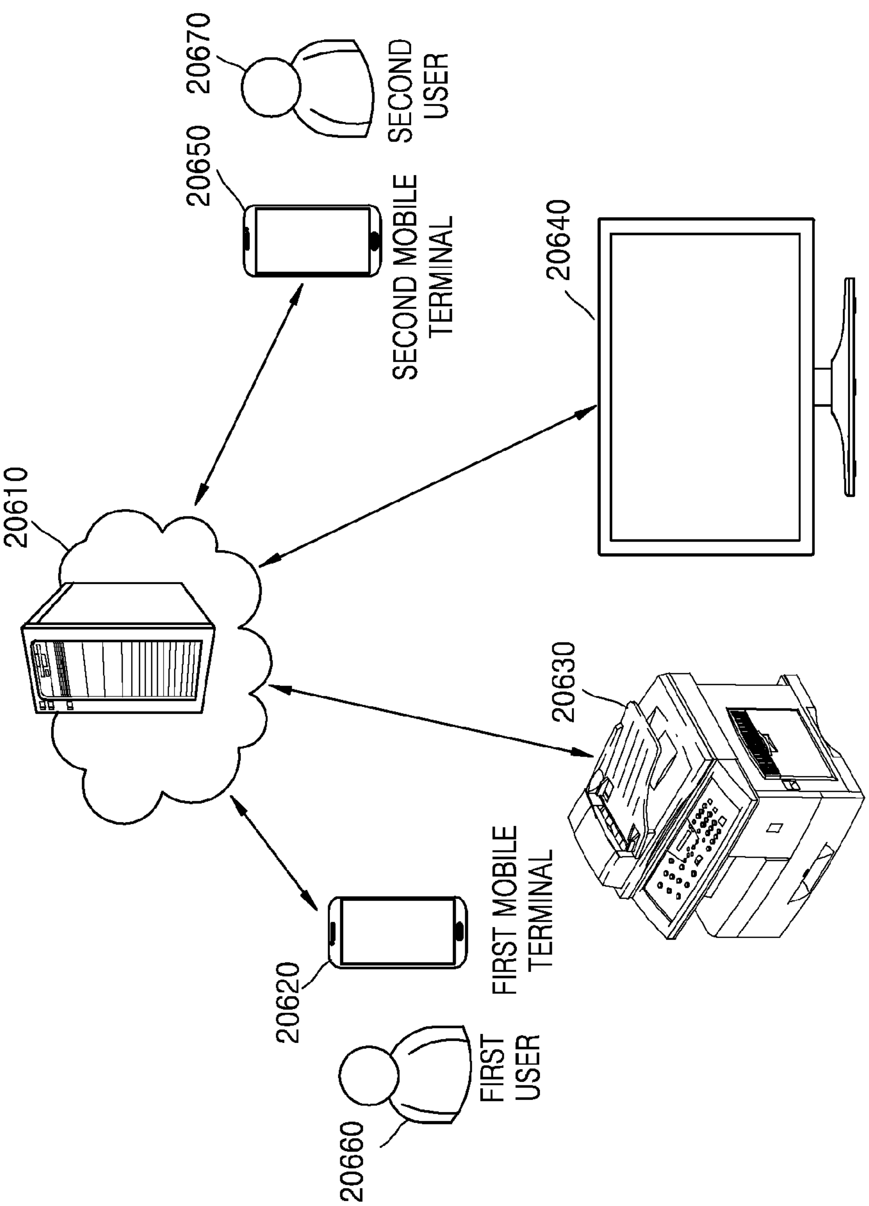
Figure 207:
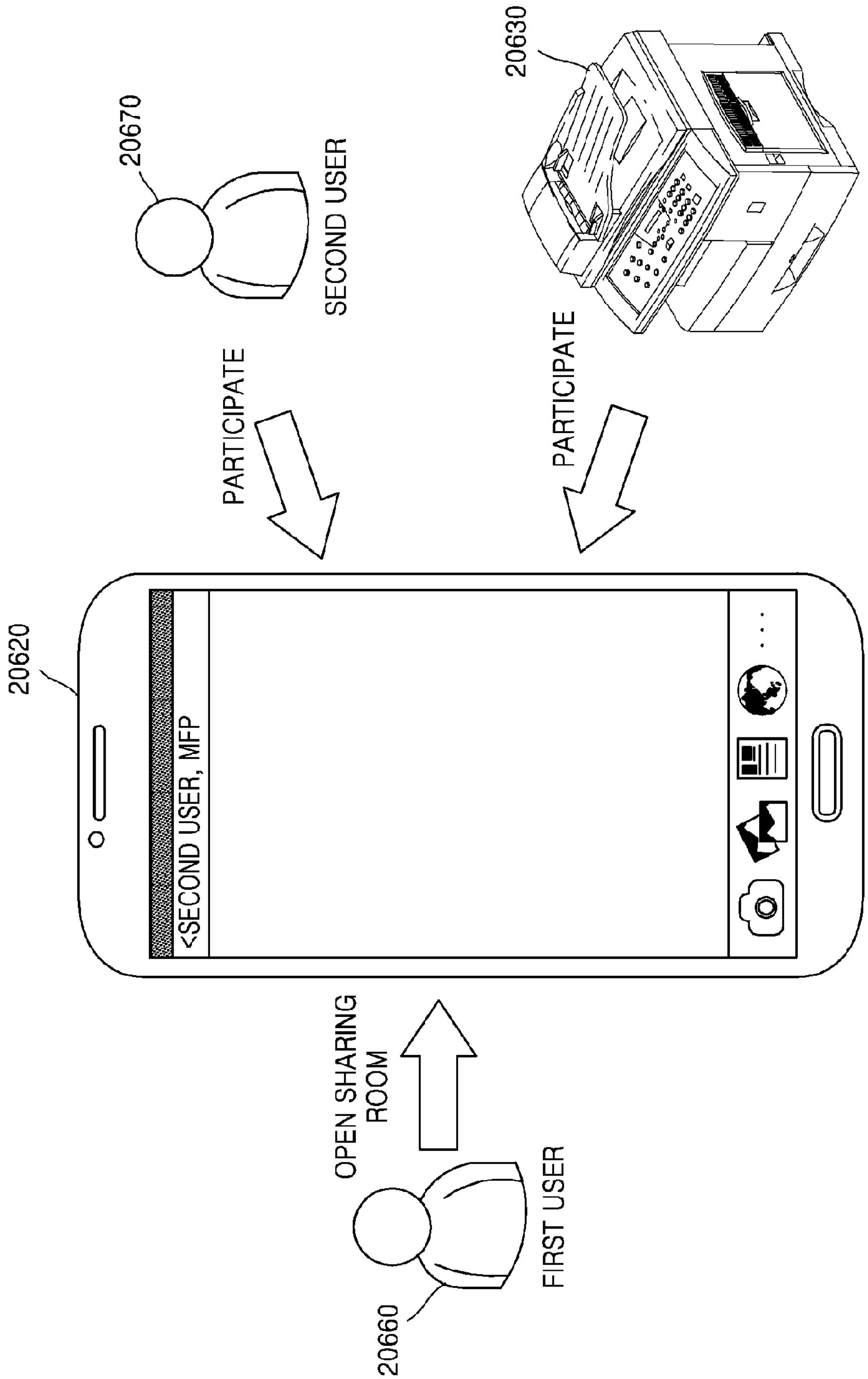
Figure 208:
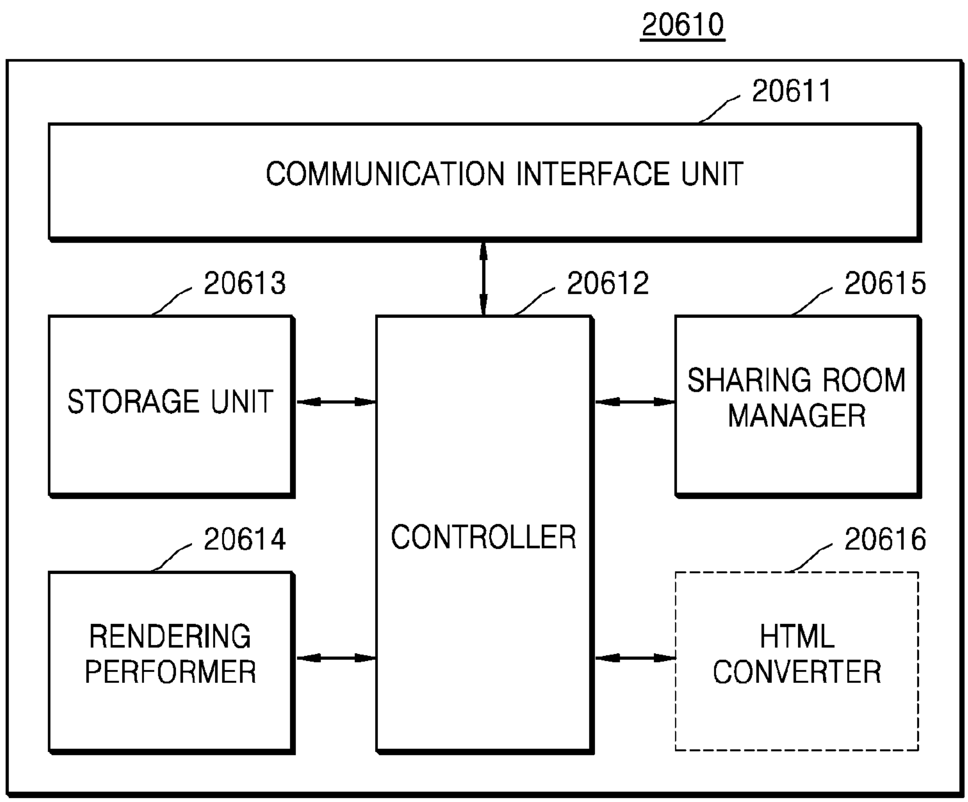
Figure 209:
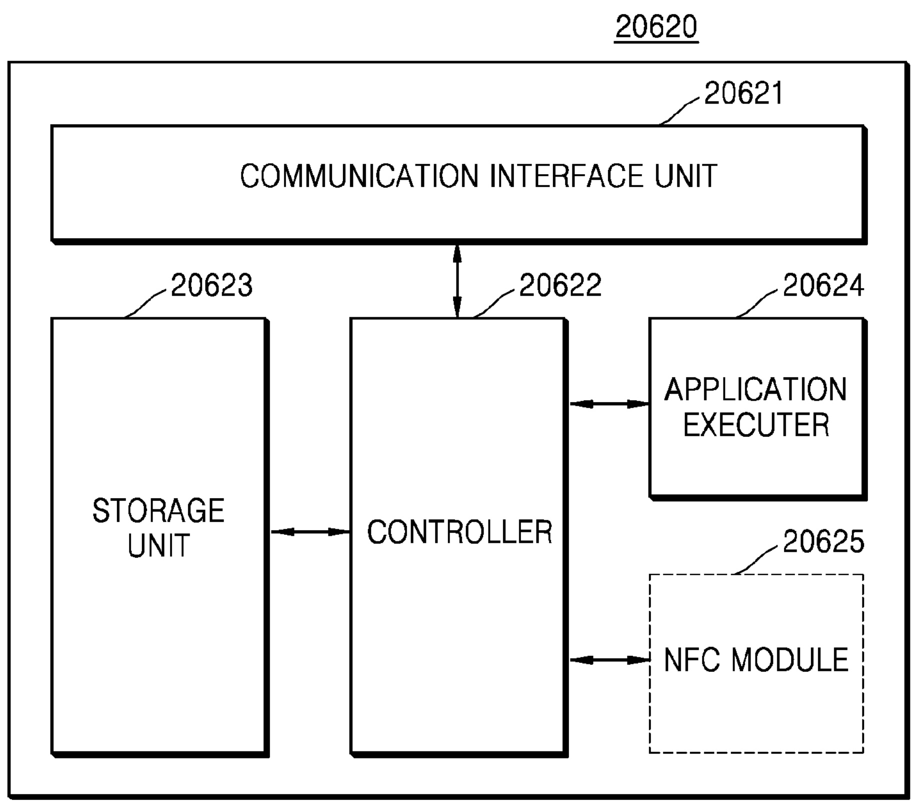
Figure 210:
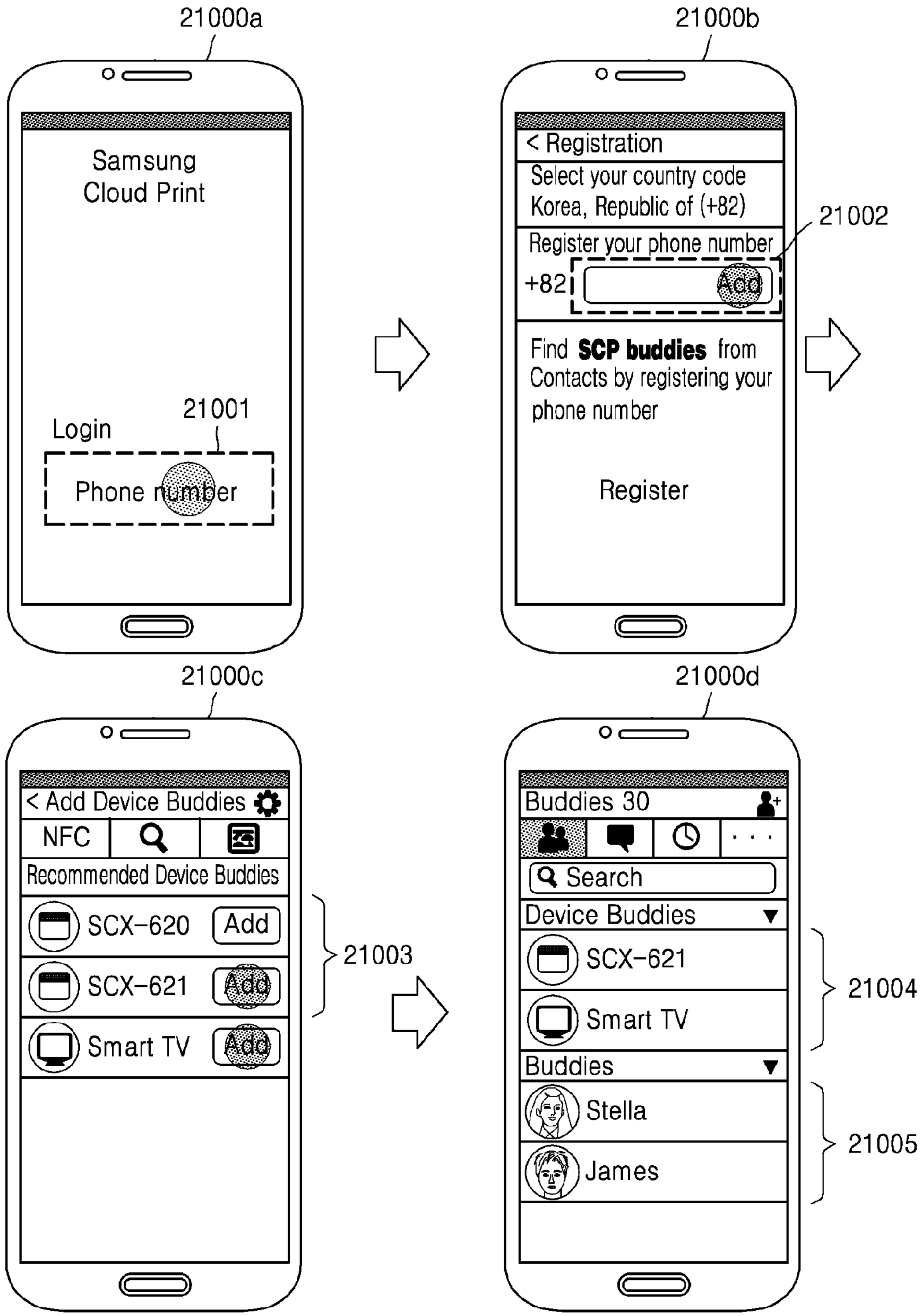
Figure 211:
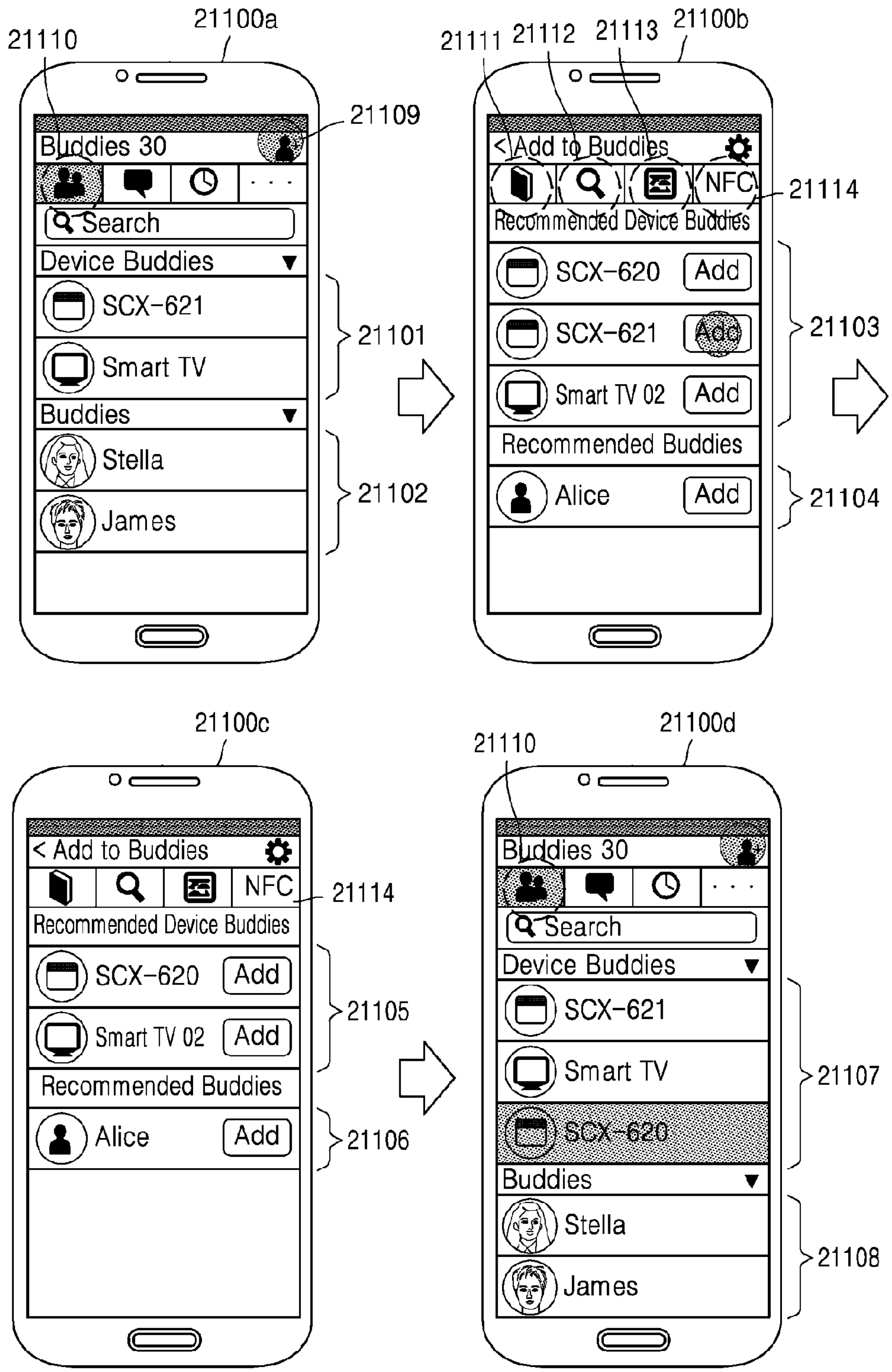
Figure 212:
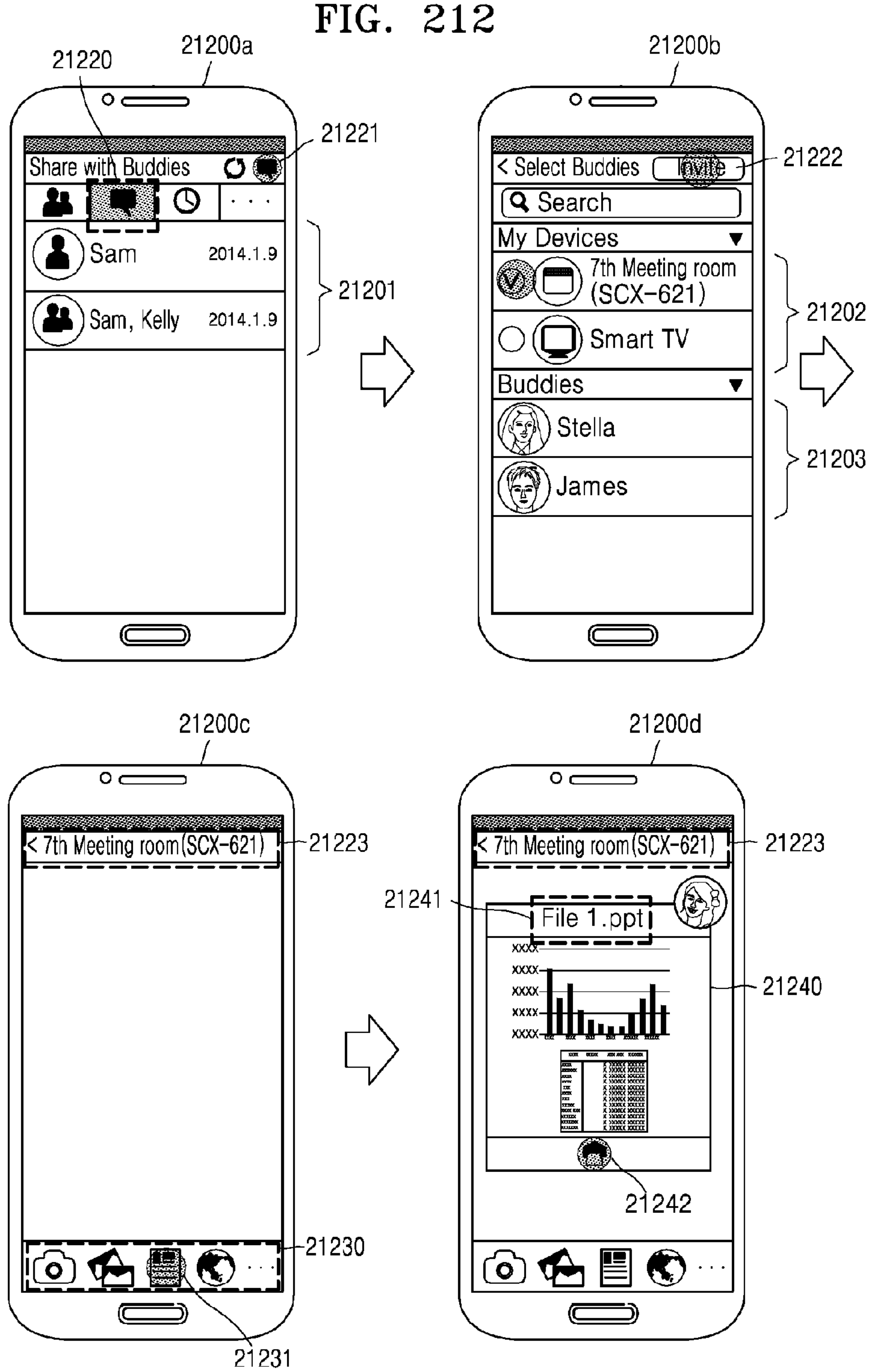
Figure 213A:
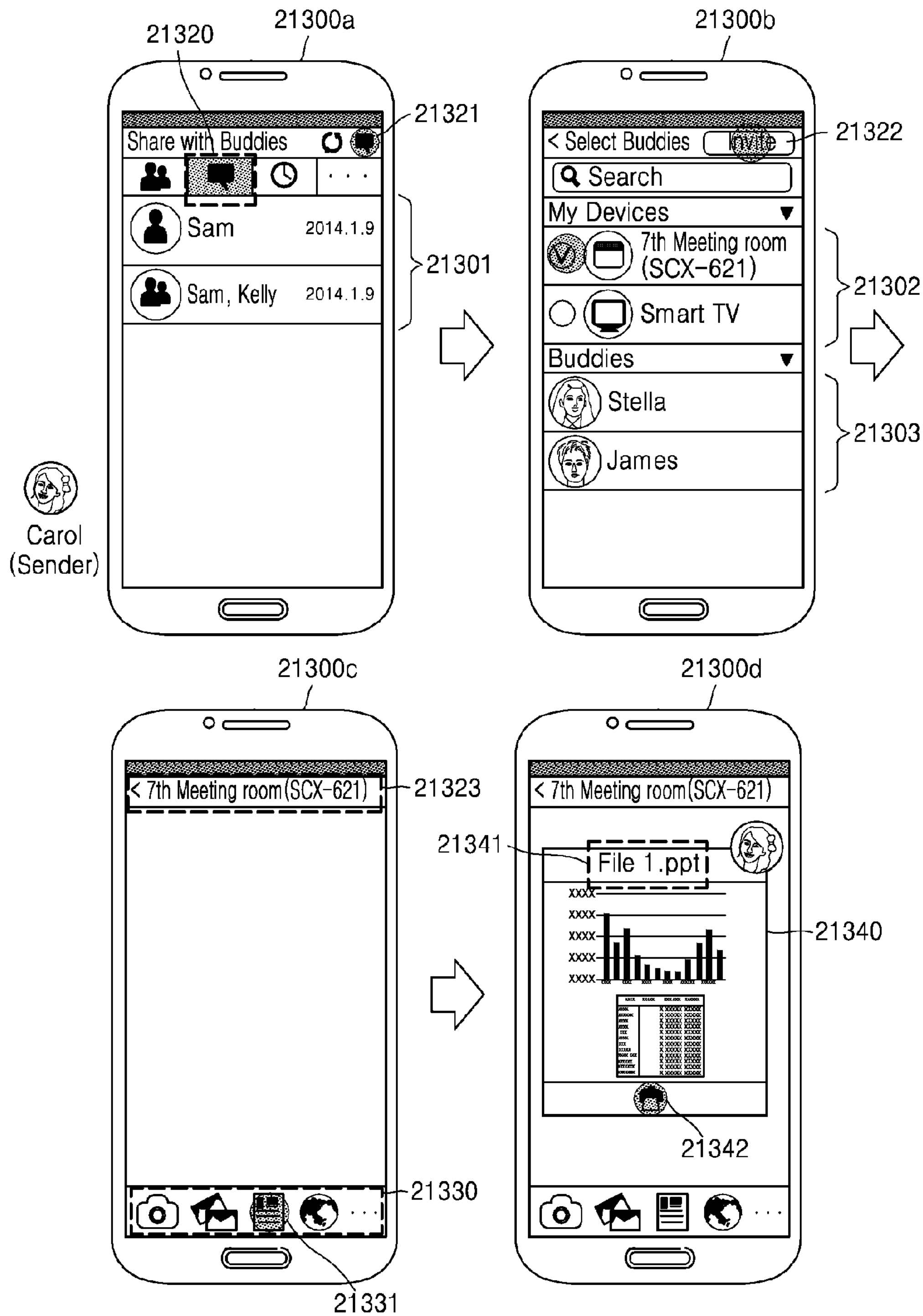
Figure 213B:
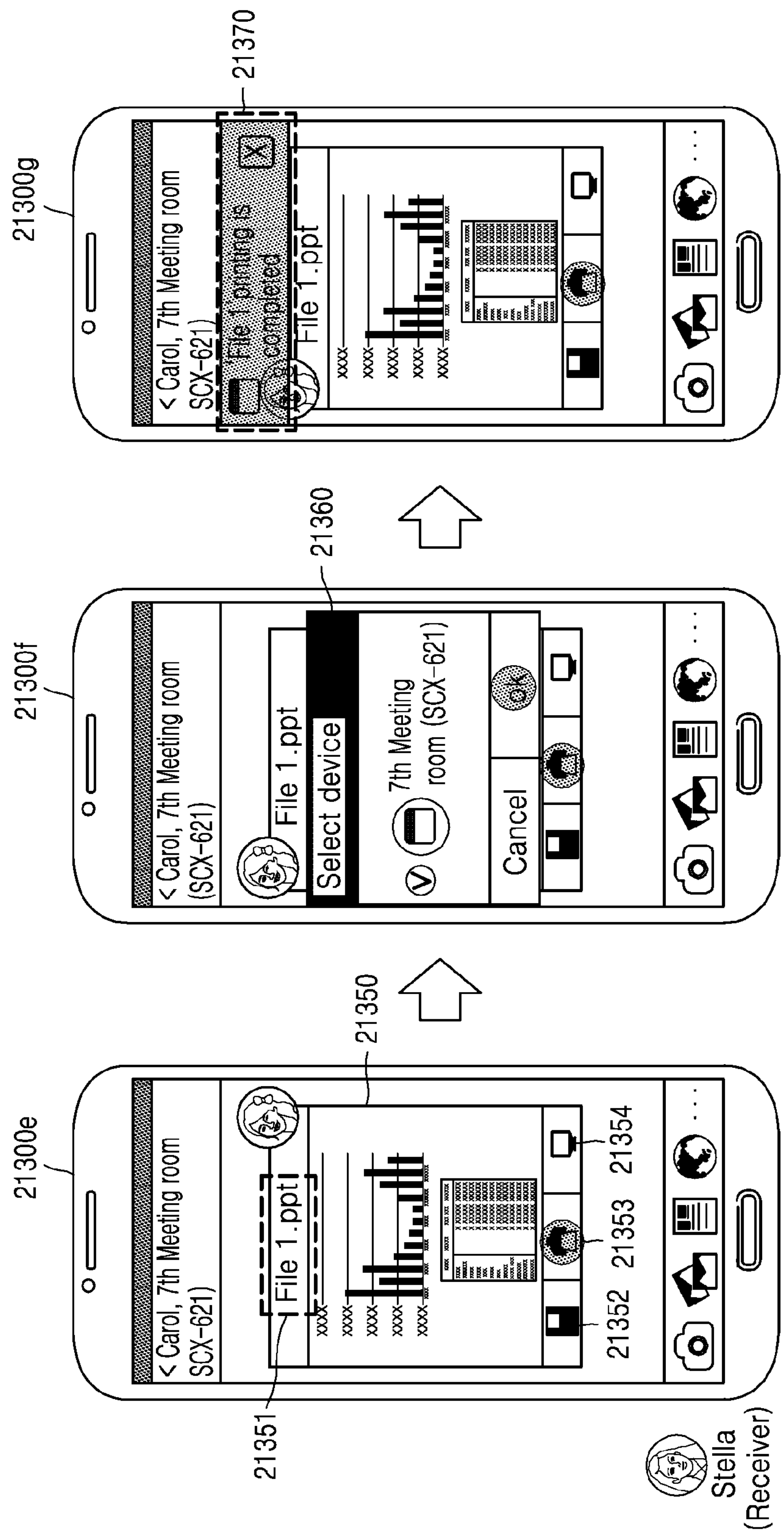
Figure 214:
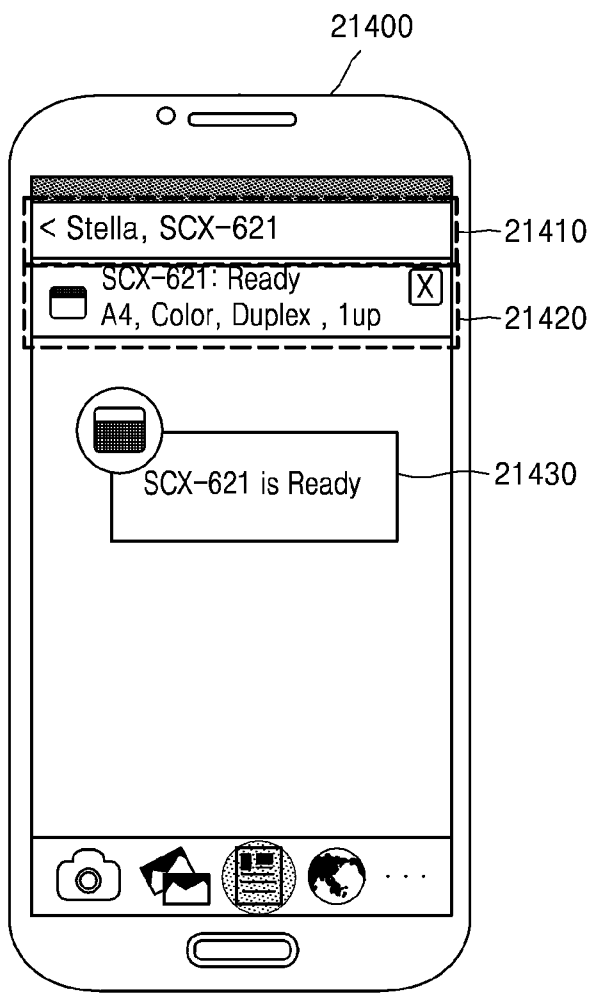
Figure 215:
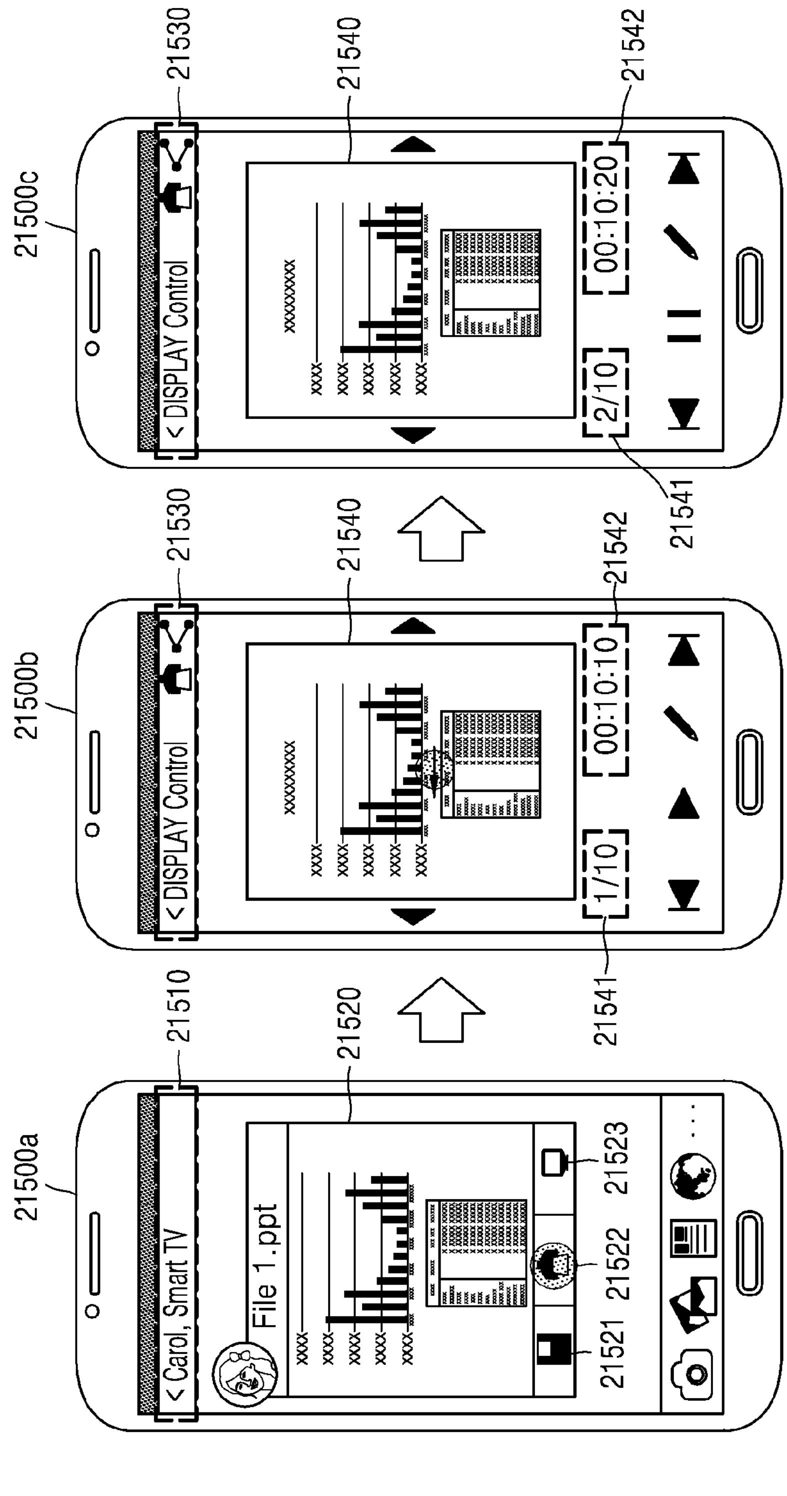
Figure 216:
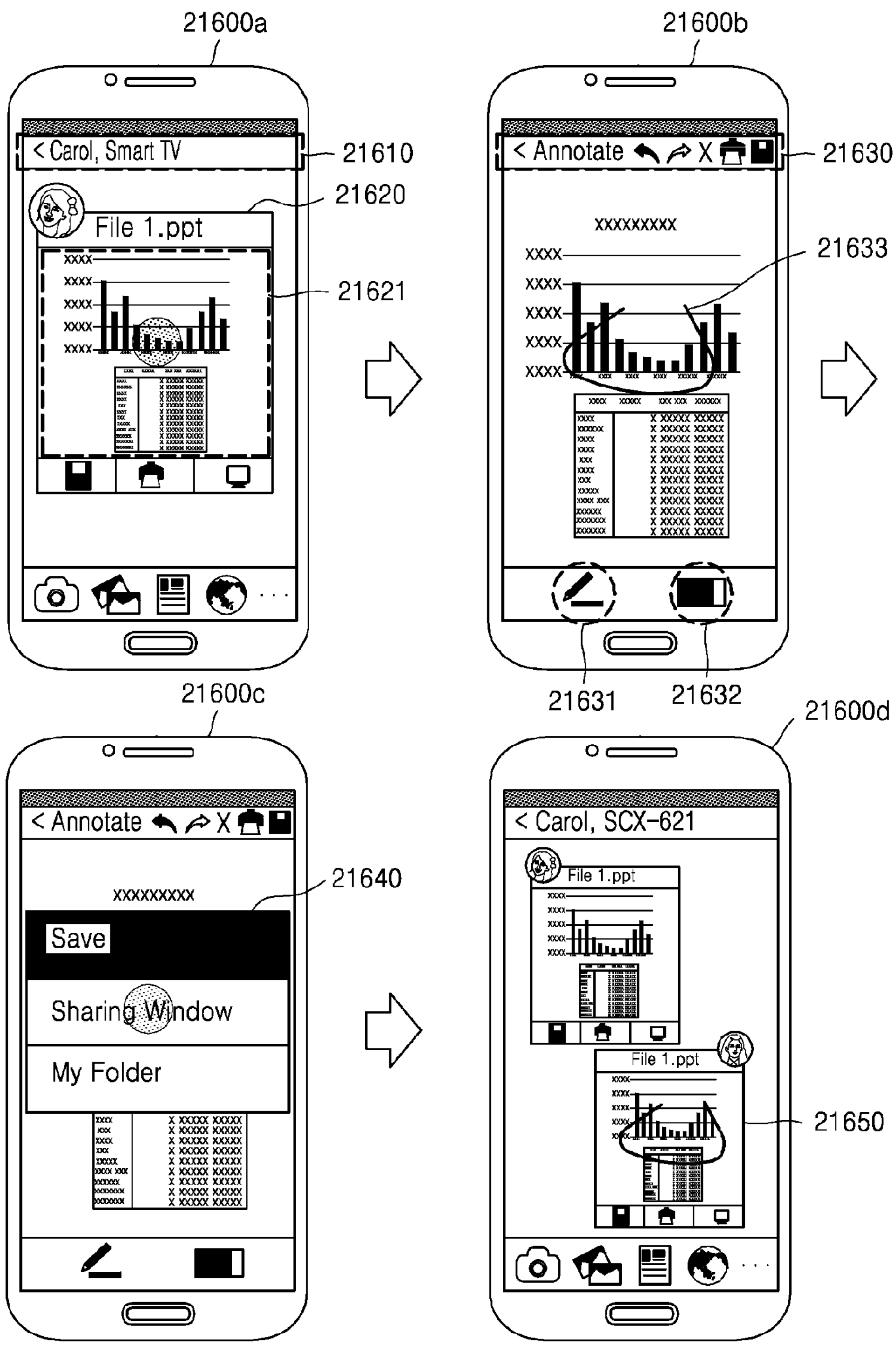
Figure 217:
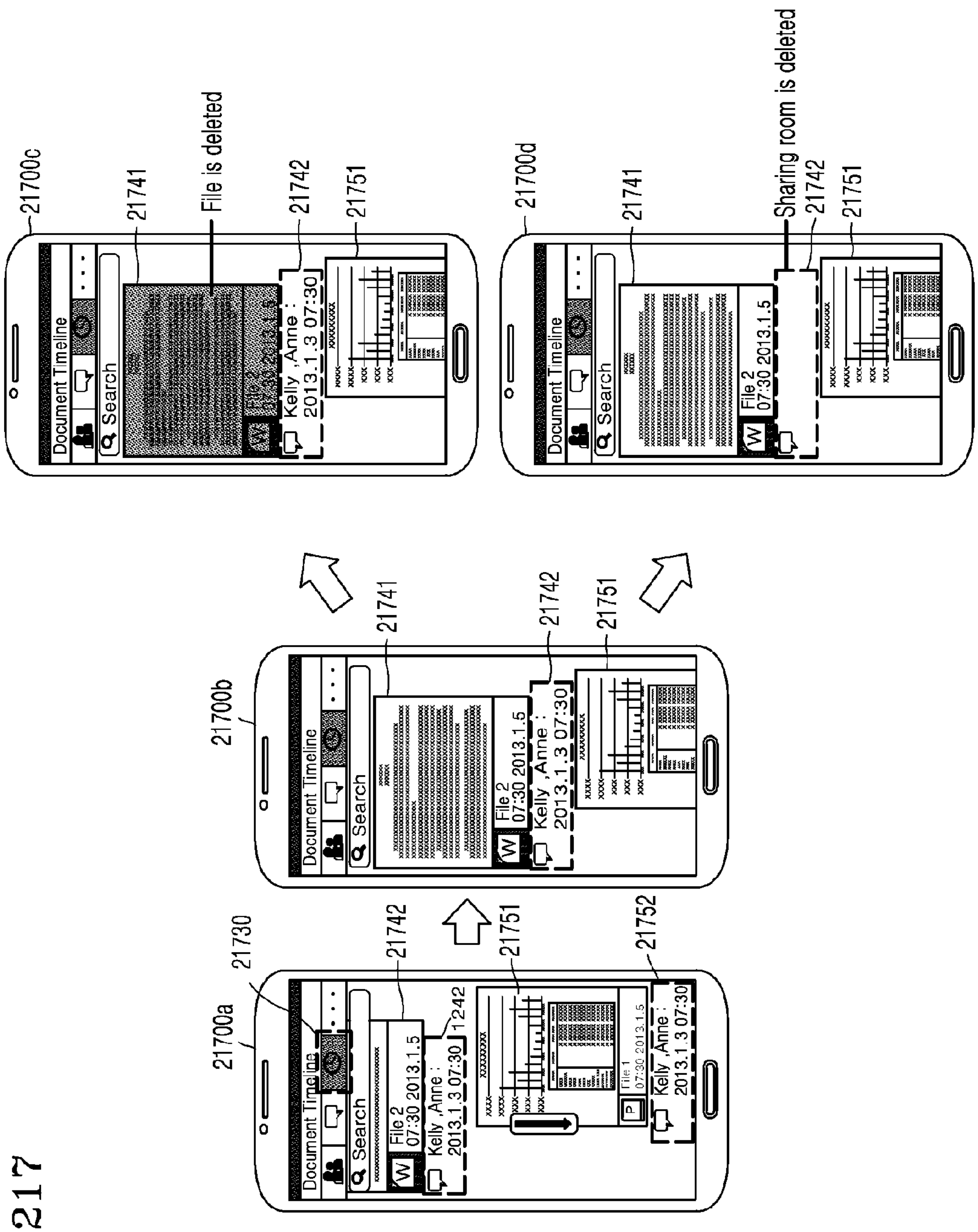

FIG. 125 is a diagram for describing a process of providing a cloud printing service, which is performed by a cloud server, according to an embodiment;

FIG. 126 is a diagram for describing an environment of a printing service of an image forming apparatus requesting for a phone number-based printing service;

FIG. 127 is a diagram for describing a structure of an image forming apparatus requesting for a phone number-based printing service, according to an embodiment;

FIG. 128 is a diagram for describing a process of requesting a print job upon receiving recipient information from a mobile device, which is performed by an image forming apparatus requesting for a phone number-based printing service, according to an embodiment;

FIG. 129 is a diagram for describing a process of selecting a recipient to receive a print job from a mobile address book of a mobile device, according to an embodiment;

FIG. 130 is a diagram for describing a process of automatically inputting recipient information on a screen for inputting a phone number of a recipient upon receiving the recipient information from a mobile device, which is performed by an image forming apparatus requesting for a phone number-based printing service, according to an embodiment;

FIGS. 131 and 132 are diagrams for describing processes of storing recipient information in an address book, which are performed by an image forming apparatus requesting for a phone number-based printing service, according to embodiments;

FIGS. 133A through 133C are diagrams of recipient information stored in an address book of an image forming apparatus requesting for a phone number-based printing service, according to categories, according to embodiments;

FIG. 134 is a diagram for describing a process of requesting for a print job upon receiving a server address book from a cloud server, which is performed by an image forming apparatus requesting for a phone number-based printing service, according to an embodiment;

FIG. 135 is a diagram of a screen for setting a connection with a cloud server, which is performed by an image forming apparatus requesting for a phone number-based printing service, according to an embodiment;

FIG. 136 is a diagram for describing a process of displaying a server address book on a screen for inputting a phone number of a recipient upon receiving the server address book from a cloud server, which is performed by an image forming apparatus requesting for a phone number-based printing service, according to an embodiment;

FIG. 137 is a flowchart illustrating a method of requesting for a phone number-based printing service, according to an embodiment;

FIG. 138 is a flowchart illustrating a method of requesting for a phone number-based printing service, according to an embodiment;

FIG. 139 is a diagram of a cloud printing system supporting a cloud printing service of an image forming apparatus by using a computing device in which an agent application is installed, according to an embodiment;

FIG. 140 is a diagram for describing a near field communication (NFC) tag attached to a computing device, according to an embodiment;

FIG. 141A is a block diagram of a first mobile device according to an embodiment;

FIG. 141B is a block diagram of a second mobile device according to an embodiment;

FIG. 142 is a diagram for describing registering a use of an agent application installed in a computing device, in a cloud server, according to an embodiment;

FIG. 143 is a diagram for describing registering a list of phone numbers and a list of image forming apparatuses, which are managed by an agent application, in a cloud server, according to an embodiment;

FIG. 144 is a diagram for describing a process of writing information on an NFC tag by using a first mobile device, according to an embodiment;

FIG. 145 is a diagram for describing a process of writing information on an NFC tag through a UI screen of a first mobile device, according to an embodiment;

FIG. 146 is a diagram for describing a process of reading information from an NFC tag by using a second mobile device, according to an embodiment;

FIG. 147 is a diagram for describing a process of reading information from an NFC tag through a UI screen of a second mobile device, according to an embodiment;

FIG. 148 is a diagram for describing a whole process of registering a second mobile device in a cloud printing service by using an NFC tag, according to an embodiment;

FIG. 149 is a flowchart illustrating a method of registering a second mobile device in a cloud printing service by using an NFC tag, according to an embodiment;

FIG. 150 is a diagram of a cloud printing system capable of device registration through an augmented reality application, a Bluetooth, or quick response (QR) code reading, according to an embodiment;

FIG. 151 is a diagram of a cloud printing system capable of registering an image forming apparatus by using an augmented reality application, according to an embodiment;

FIGS. 152 and 153 are diagrams illustrating examples of registering indoor positioning system (IPS) information and a media access control (MAC) address in a cloud printing server respectively when an image forming apparatus is able to generate the IPS information and unable to generate the IPS information;

FIG. 154 is a diagram illustrating a detailed process of a method of registering an image forming apparatus by using an augmented reality application, according to an embodiment;

FIG. 155 is a flowchart illustrating a method of registering an image forming apparatus by using an augmented reality application, according to an embodiment;

FIG. 156 is a diagram of a cloud printing system capable of registering an image forming apparatus through QR code reading, according to an embodiment;

FIG. 157 is a diagram for describing a detailed process of a method of registering an image forming apparatus through QR code reading, according to an embodiment;

FIG. 158 is a flowchart illustrating a method of registering an image forming apparatus through QR code reading, according to an embodiment;

FIG. 159 is a diagram of a cloud printing system capable of direct registration of an image forming apparatus, according to an embodiment;

FIG. 160 is a diagram for describing a detailed process of a method of directly registering an image forming apparatus, according to an embodiment;

FIG. 161 is a flowchart illustrating a method of directly registering an image forming apparatus, according to an embodiment;

FIG. 162 is a diagram of a cloud printing system capable of registering an image forming apparatus by using a Bluetooth, according to an embodiment;

FIG. 163 is a diagram for describing a process of storing device information of image forming apparatuses pre-registered in a cloud printing server during a method of registering an image forming apparatus by using a Bluetooth, according to an embodiment;

FIG. 164 is a diagram for describing a process of a mobile device obtaining device information from an image forming apparatus during a method of registering an image forming apparatus by using a Bluetooth, according to an embodiment;

FIG. 165 is a diagram for describing a detailed process of a method of registering an image forming apparatus by using a Bluetooth, according to an embodiment;

FIG. 166 is a diagram for describing a detailed process of a method of performing cloud printing by using a Bluetooth, according to an embodiment;

FIG. 167 is a flowchart illustrating a method of registering an image forming apparatus by using a Bluetooth, according to an embodiment;

FIG. 168 is a flowchart illustrating a method of registering an image forming apparatus through an augmented reality application, a Bluetooth, or QR code reading, according to an embodiment;

FIG. 169 is a diagram of an environment of a user uploading content to be printed and a print job to a cloud server by using a mobile terminal;

FIG. 170 is a block diagram of a cloud server according to an embodiment;

FIG. 171 is a diagram for describing a process of uploading content to a cloud server, according to an embodiment;

FIG. 172 is a diagram for describing a process of transmitting, by the mobile terminal, a job upload request regarding content, according to an embodiment;

FIG. 173 is a diagram for describing a process of transmitting, by the mobile terminal, a job upload request regarding content, according to an embodiment;

FIG. 174 is a diagram for describing a process of transmitting, by the user of the mobile terminal, a job regarding content to another user, according to an embodiment;

FIG. 175 is a diagram for describing a process of performing, by the image forming apparatus, an image forming job regarding content included in a print job as a user transmits the print job registered in the cloud server to the image forming apparatus;

FIG. 176 is a diagram for describing receiving preview data regarding content included in a print job as the user transmits a preview request regarding the print job registered in the cloud server;

FIG. 177 is a diagram for describing a process of receiving, by the mobile terminal, an access code as the phone number of the mobile terminal is authenticated by the authentication server before a job upload request regarding content is transmitted;

FIG. 178 is a diagram for describing a cloud printing system according to an embodiment;

FIG. 179 is a flowchart of a method of providing a cloud printing service, according to an embodiment;

FIG. 180 is a flowchart illustrating operation 17920 of FIG. 179 in detail, according to an embodiment;

FIG. 181 is a flowchart illustrating operation 17930 of FIG. 179 in detail, according to an embodiment;

FIG. 182 is a flowchart illustrating operation 17960 of FIG. 179 in detail, according to an embodiment;

FIG. 183 is a flowchart illustrating operations 18240 through 18250 of FIG. 182 in detail, according to an embodiment;

FIG. 184 is a flowchart of a method of providing a cloud service, according to an embodiment;

FIG. 185 is a flowchart of a method of providing a cloud service, according to an embodiment;

FIG. 186 is a flowchart illustrating operation 17910 of FIG. 179 in detail, according to an embodiment;

FIG. 187 is a diagram for describing a process of displaying, by the mobile terminal, a remaining time regarding an uploaded job, according to an embodiment;

FIG. 188 is a diagram for describing various remaining time graphics and remaining times displayed on the mobile terminal, according to an embodiment;

FIG. 189 illustrates an environment where a cloud print service is provided using a mobile application, according to an embodiment;

FIGS. 190 and 191 illustrates user interface (UI) screens which are displayed in the process of registering an image forming device in a cloud server via a mobile application, according to an embodiment;

FIGS. 192A and 192B illustrate UI screens which are displayed in the process of uploading print data in a cloud server via a mobile application, according to an embodiment;

FIGS. 193A and 193B illustrate UI screens which are displayed in the process of uploading print data in a cloud server by designating a receiver in a mobile application, according to an embodiment;

FIGS. 194 and 195 illustrate UI screens which are displayed in the process of printing print data which is stored in a cloud server via a mobile application, according to an embodiment;

FIGS. 196 to 199 illustrate animation screens which are displayed when performing each operation of a cloud print service via a mobile application, according to an embodiment;

FIGS. 200 to 205 are flowcharts illustrating operations of a method of providing a cloud print service by using a mobile application, according to embodiments;

FIG. 206 is a diagram of a cloud print system provided through a mobile application, according to an embodiment;

FIG. 207 is a diagram for describing an example of opening a sharing room and inviting another user and another device to the sharing room;

FIG. 208 is a block diagram of a cloud print server for providing a cloud print service using a mobile application, according to an embodiment;

FIG. 209 is a block diagram of a mobile terminal for providing a cloud print service using a mobile application, according to an embodiment;

FIG. 210 illustrates user interface (UI) screens displayed during a process of subscribing to a cloud print service through a mobile application, according to an embodiment;

FIG. 211 illustrates UI screens displayed during a process of additionally registering, by a mobile application, a device, according to an embodiment;

FIG. 212 illustrates UI screens displayed during a process of opening, by a mobile application, a sharing room by inviting an output device and outputting, by the output device, content through the sharing room, according to an embodiment;

FIGS. 213A and 213B illustrate UI screens displayed during a process of transmitting, by a mobile application, content to another user through a sharing room, and outputting, by the other user who received the content, the content by using a device participating in the sharing room, according to an embodiment;

FIG. 214 illustrates a UI screen displaying a state of a device participating in a sharing room of a mobile application, according to an embodiment;

FIG. 215 illustrates UI screens displayed during a process of controlling, by a mobile application, content displayed on an output device, according to an embodiment;

FIG. 216 illustrates UI screens displayed during a process of adding a memo to a document shared in a sharing room of a mobile application, according to an embodiment;

FIG. 217 illustrates UI screens displayed during a process of checking and managing, by a mobile application, a history of contents shared in a sharing room, according to an embodiment; and FIGS. 218 through 221 are flowcharts of a method of providing a cloud print service using a mobile application, according to embodiments.

Figure 222:
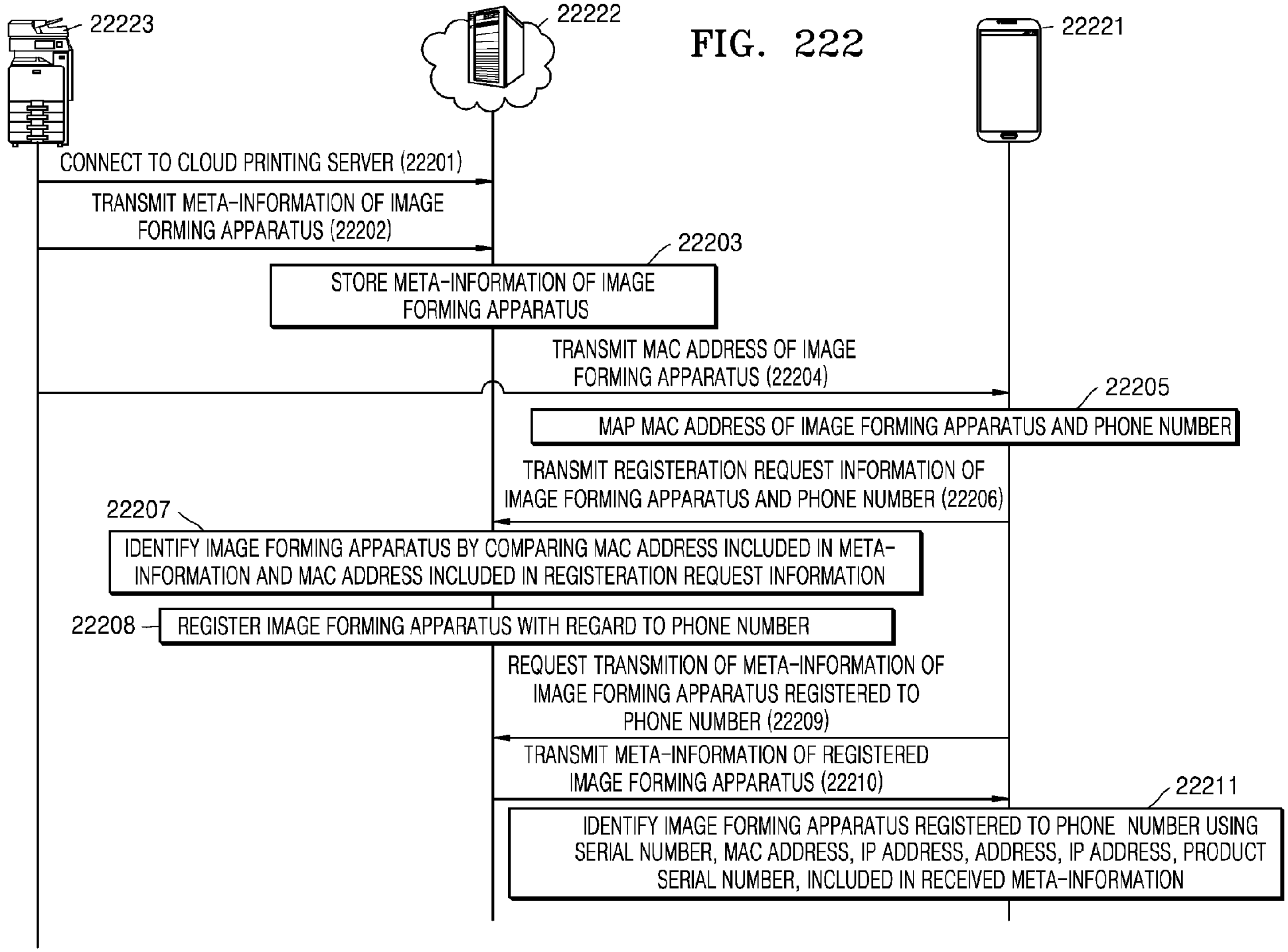

FIG. 222 is a diagram for describing a process of registering an image forming apparatus in a cloud printing server by using a mobile device, according to an embodiment.

Figure 223:
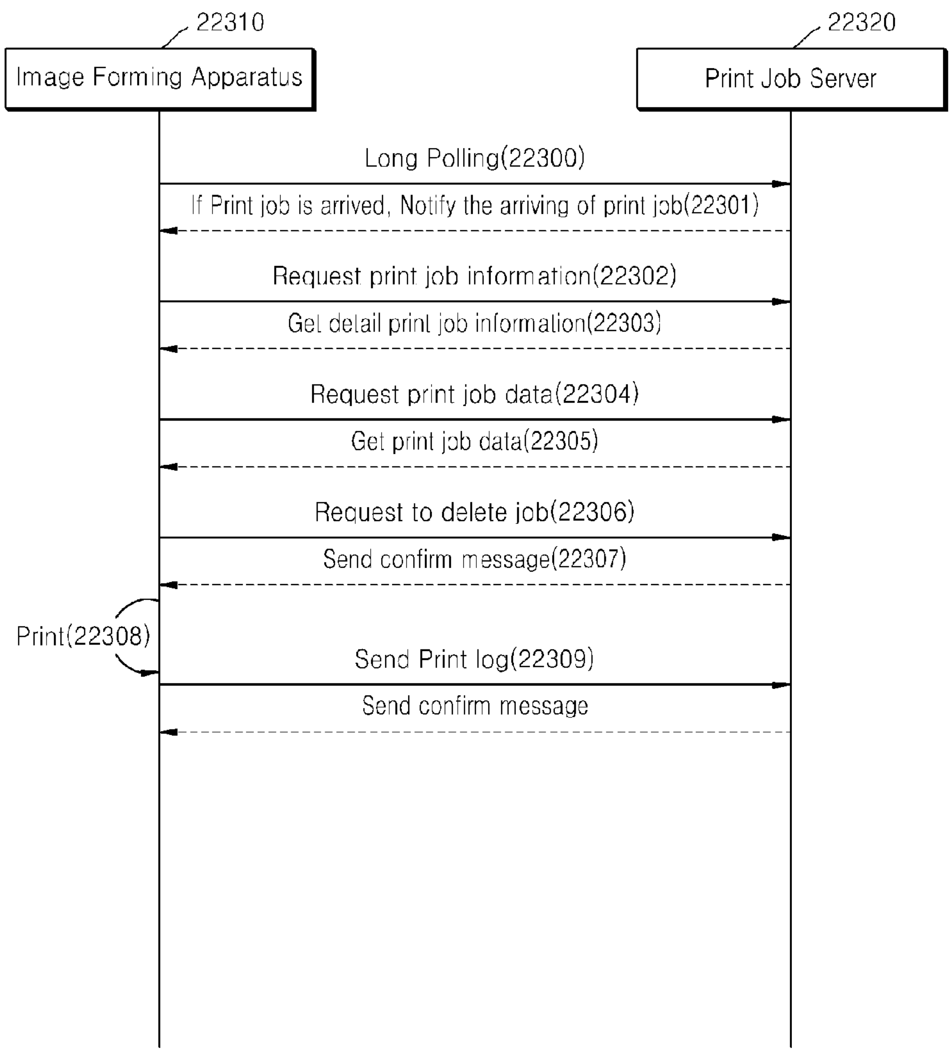

FIG. 223 is a diagram for describing a process of receiving a print job from a print job server and performing printing, which is performed by an image forming apparatus, according to an embodiment.

Figure 224:
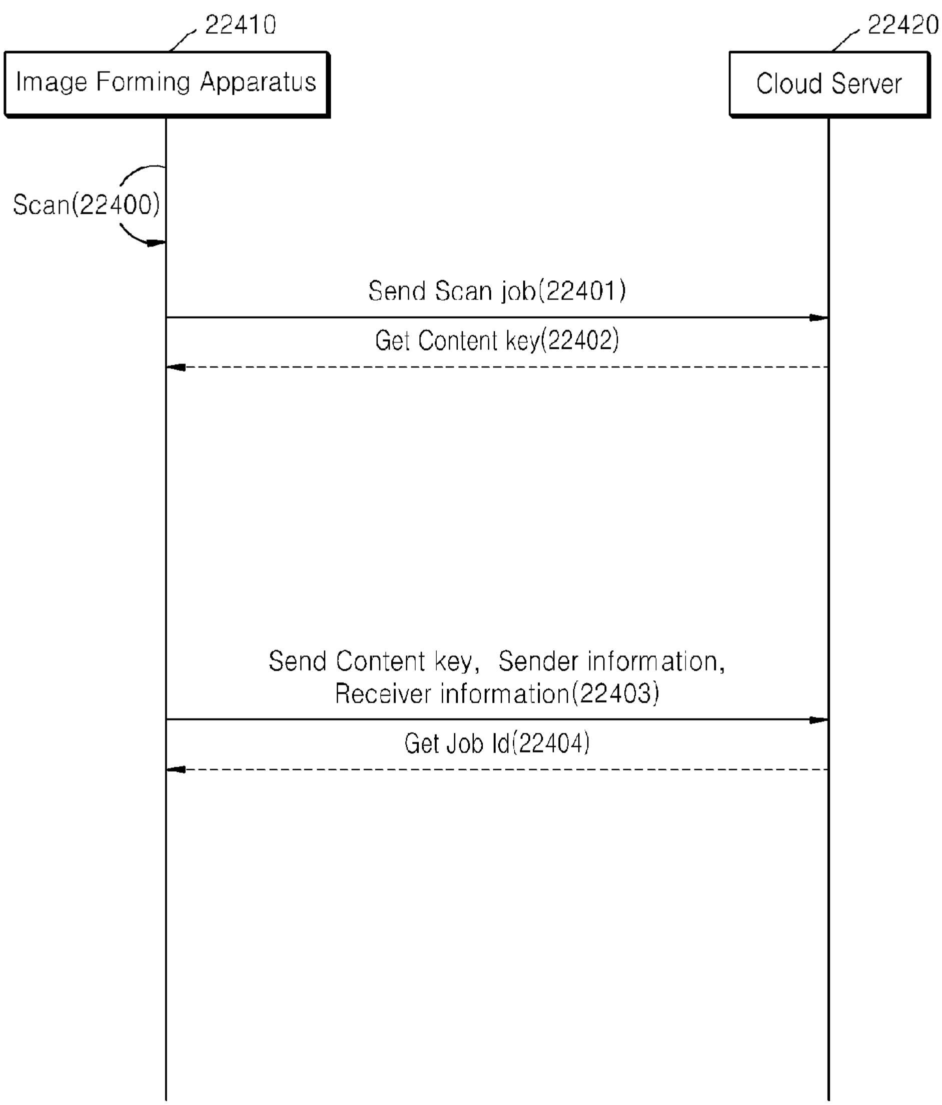

FIG. 224 is a diagram for describing a process of performing a scan job to upload a scan job file.

Figure 225:
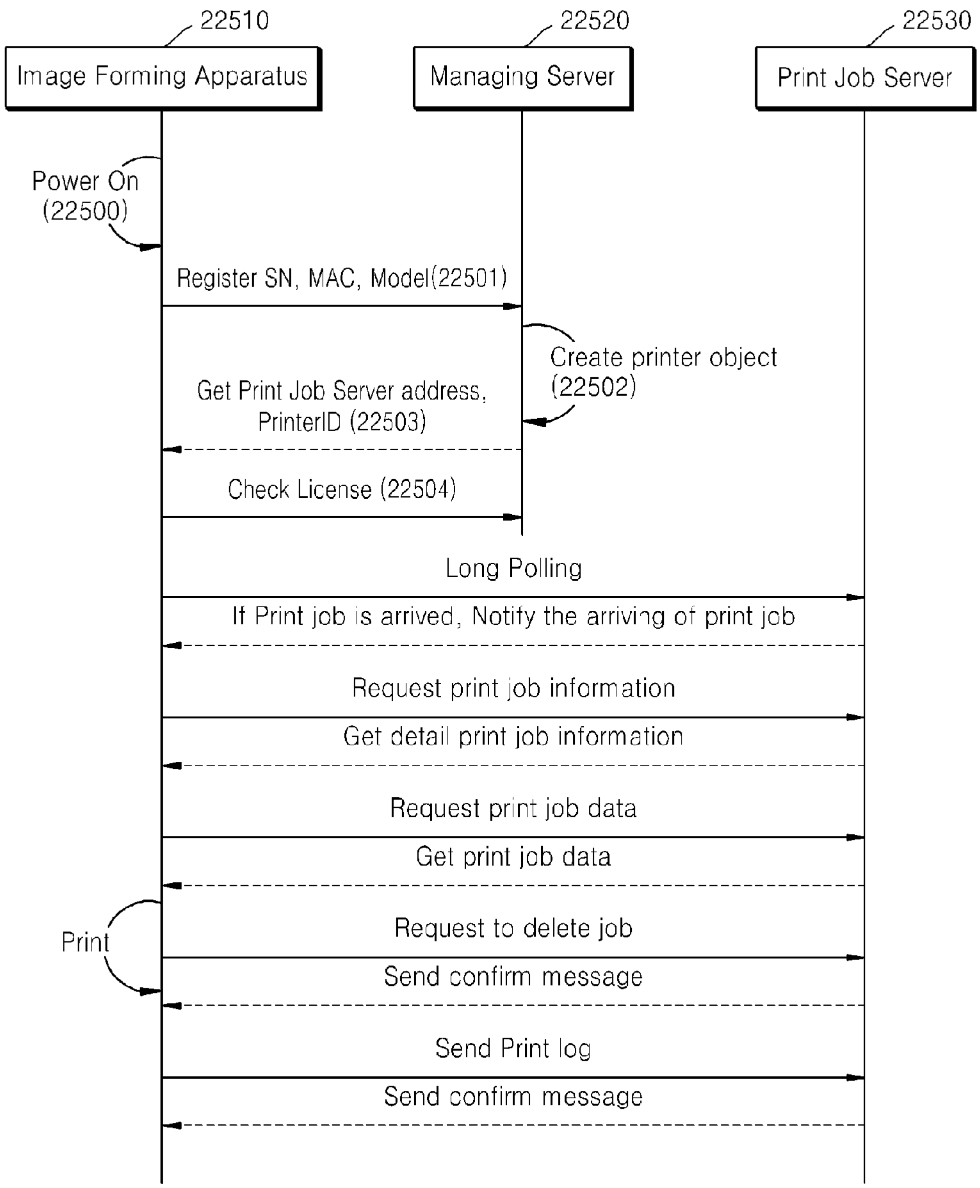

FIG. 225 is a diagram for describing a process of registering an image forming apparatus in a managing server and performing a print job, according to an embodiment.

Figure 226:
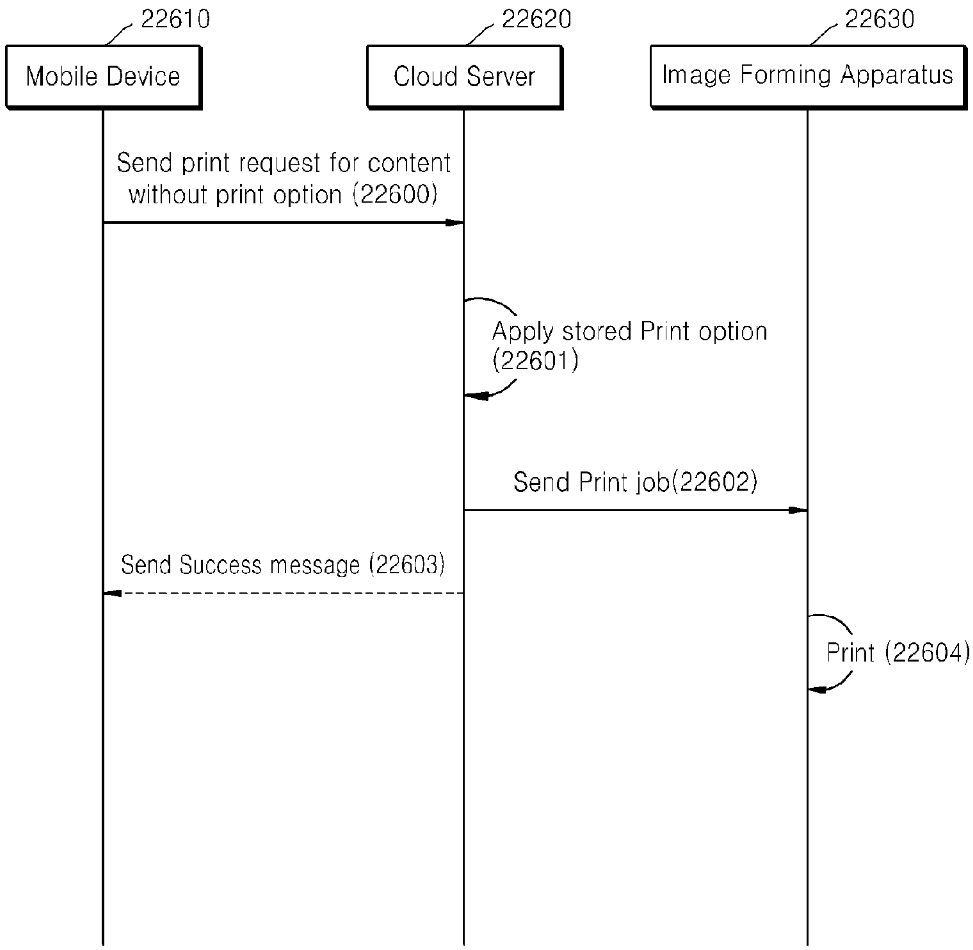

FIG. 226 is a diagram for describing a process of applying a print option stored in a cloud server to content, which is performed by the cloud server, according to an embodiment.

Figure 227:
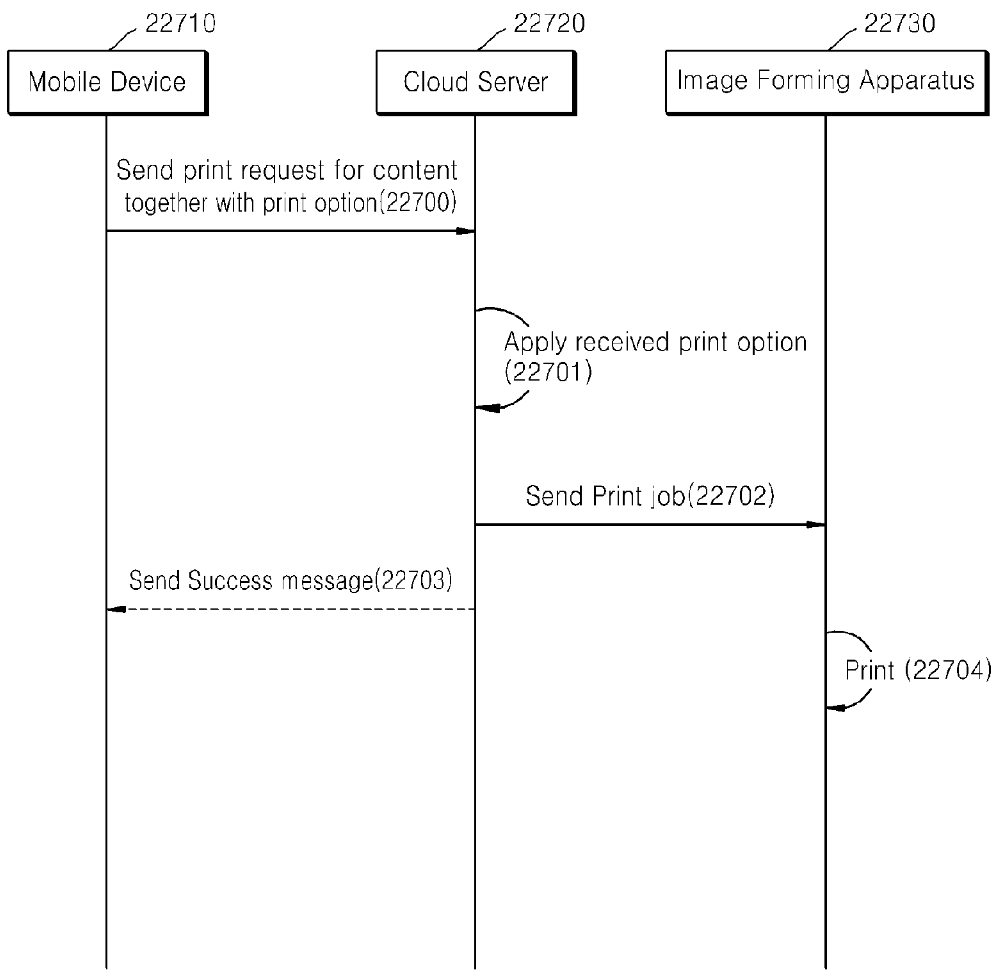

FIG. 227 is a diagram for describing a process of applying a print option received from a mobile device to content, which is performed by a cloud server, according to an embodiment.

Figure 228:
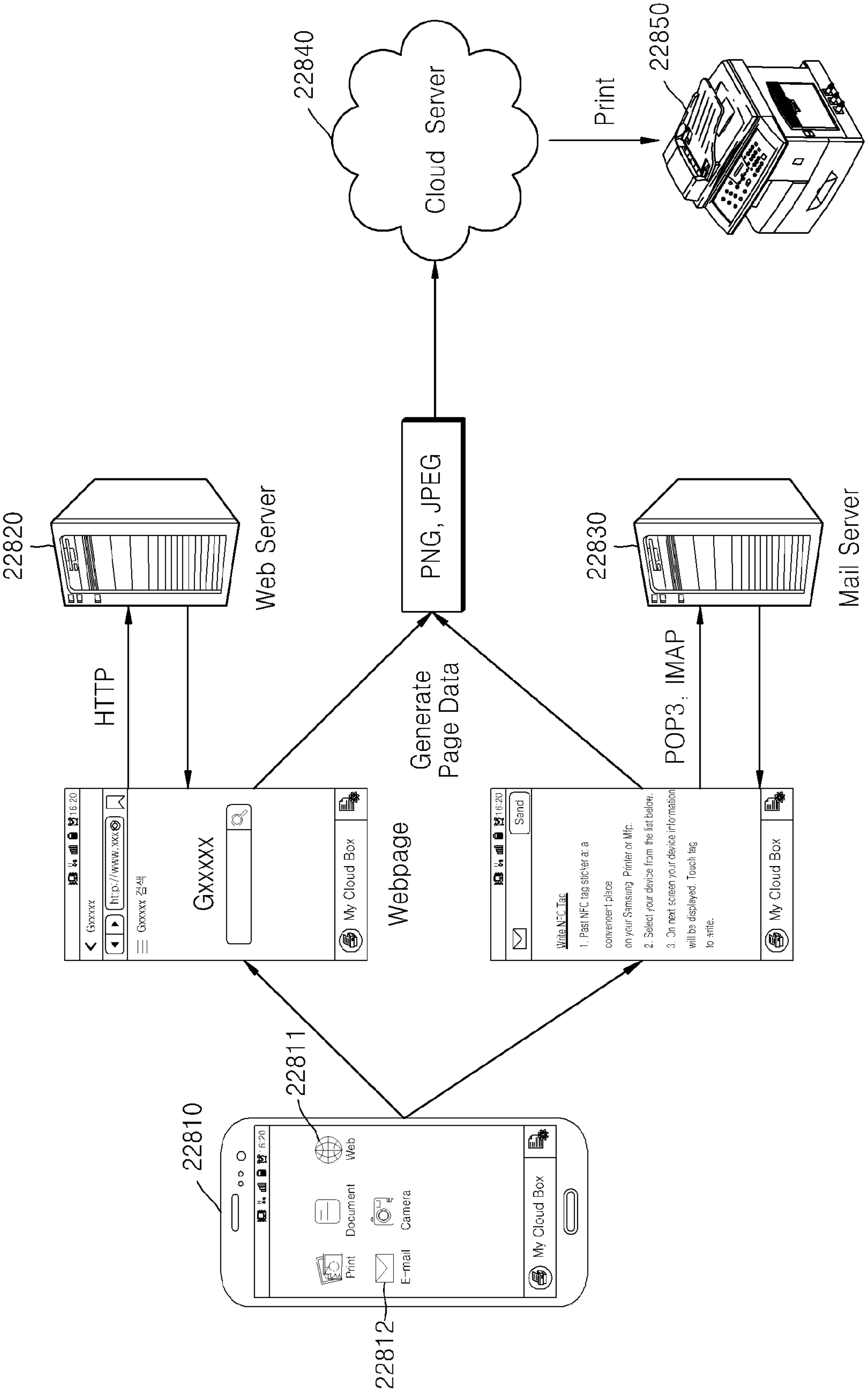

FIG. 228 is a diagram for describing a process of uploading content, including a webpage or an email, to a cloud server, according to an embodiment.

Figure 229A:
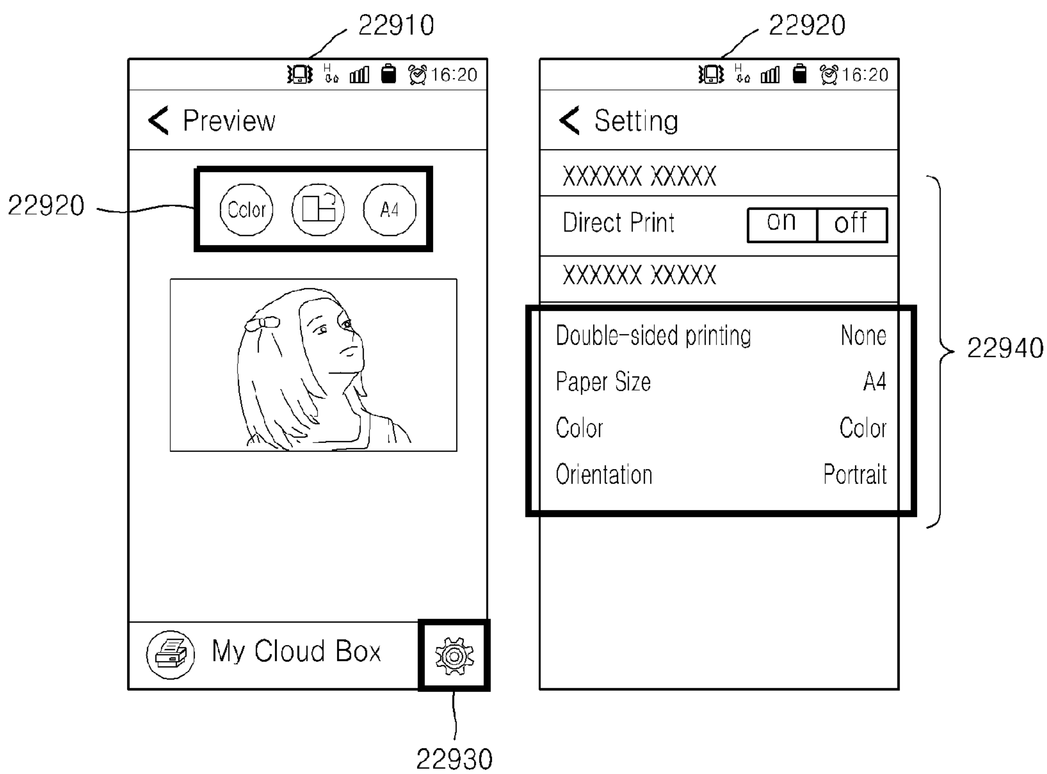

FIG. 229A is a diagram illustrating a user interface of a mobile device that sets a print option, according to an embodiment.

Figure 229B:
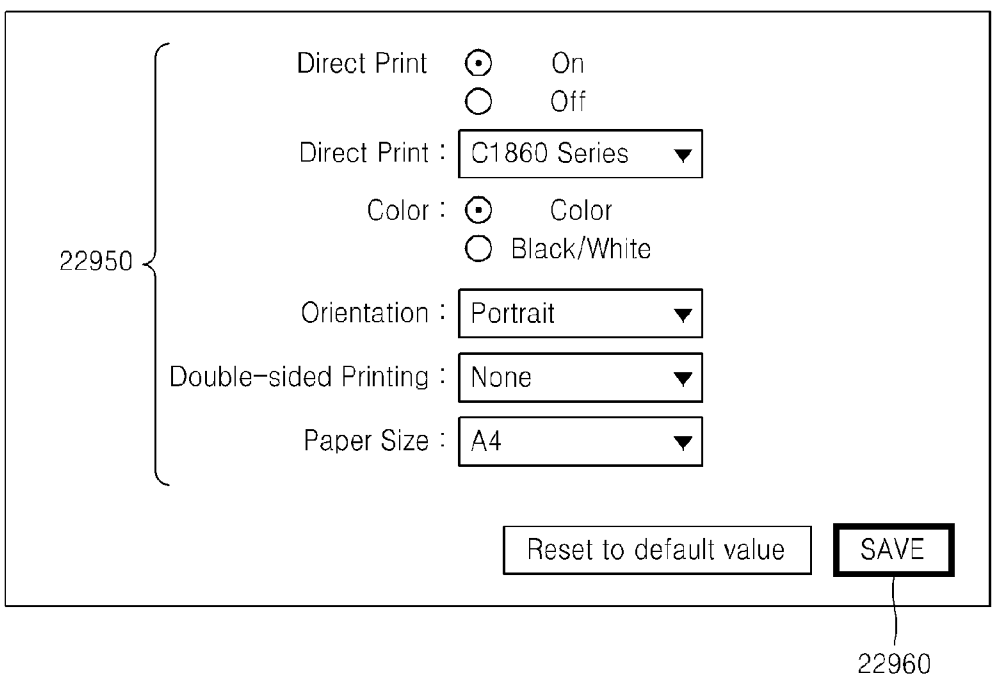

FIG. 229B is a diagram illustrating a user interface on a web that sets a print option, according to an embodiment.

DETAILED DESCRIPTION

Reference will now be made in detail to embodiments, examples of which are illustrated in the accompanying drawings, wherein like reference numerals refer to like elements throughout. Embodiments may have different forms and should not be construed as being limited to the disclosure set forth herein. Accordingly, embodiments are merely described below, by referring to the figures, to explain aspects of the present disclosure.

In the present disclosure, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While such terms as "first," "second," etc., may be used to describe various components, such components must not be limited to the above terms. The above terms are used only to distinguish one component from another.

Expressions such as "at least one of," when preceding a list of elements, modify the entire list of elements and do not modify the individual elements of the list.

One or more embodiments relate to a method and system for providing a cloud printing service, and a cloud server for supporting the cloud printing service, and detailed explanations of related art well known to one of ordinary skill in the art may be omitted.

Figure 1:
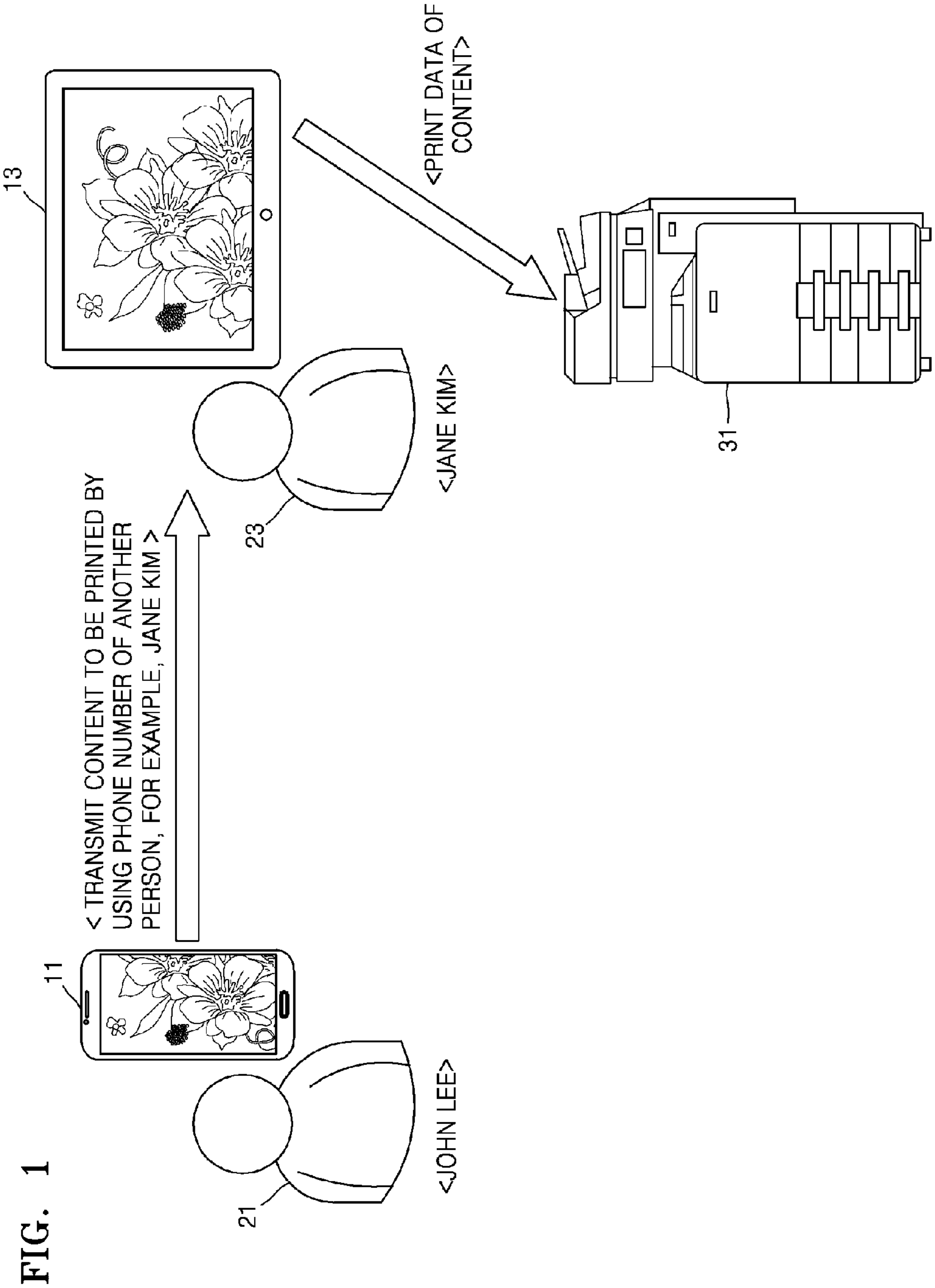
FIG. 1 is a diagram for describing a phone number-based cloud printing service, according to an embodiment.

FIG. 1 is a diagram for describing a phone number-based cloud printing service, according to an embodiment.

Referring to FIG. 1, a first individual 21, for example, John Lee, may transmit a content, such as an image or a document, stored in a mobile device 11 of the first individual 21 to a mobile device 13 of a second individual 23, for example, Jane Kim, so that the second individual 23 prints the content through an image forming apparatus 31.

The content stored in the mobile device 11 of the first individual 21 is transmitted to the mobile device 13 of the second individual 23 based on a phone number of the mobile device 13.

The mobile devices 11 and 13 herein may each be a portable mobile device or user device having a mobile communication function, such as a smart phone, a tablet device, portable media player (PMP), digital camera, personal computer, (PC), laptop computer notebook computer, portable game player, wearable device, or a personal digital assistant (PDA), but are not limited thereto. Further, it is understood that embodiments are also applicable to any device with which an apparatus, method, or medium of an embodiment can be used.

Such a portable mobile device having a mobile communication function is capable of a telephone call by using a well-known mobile communication technology, such as a second generation (2G) mobile communication, a third generation (3G) mobile communication, or a fourth generation (4G) mobile communication.

In detail, one intrinsic phone number is assigned to each portable mobile device by a telecommunication company, and the portable mobile devices are distinguished from each other via the intrinsic phone numbers.

Accordingly, one phone number is assigned to each of the mobile device 11 of the first individual 21 and the mobile device 13 of the second individual 23. In other words, the phone number may be an intrinsic identification (ID) number of the mobile device 11 or 13.

Referring to FIG. 1, the first individual 21 may transmit a content to the second individual 23 that is a subject to print the content by inputting the phone number of the second individual 23. Then, the second individual 23 may print the received content by using the image forming apparatus 31.

An image forming system for providing a phone number-based cloud printing service, according to an embodiment, will now be described in detail.

In an embodiment, types of the mobile devices 11 and 13 of the first and second individuals 21 and 23 are not limited to the above, and the mobile devices 11 and 13 may be any devices as long as they are user devices to which a phone number is assigned.

Figure 2:
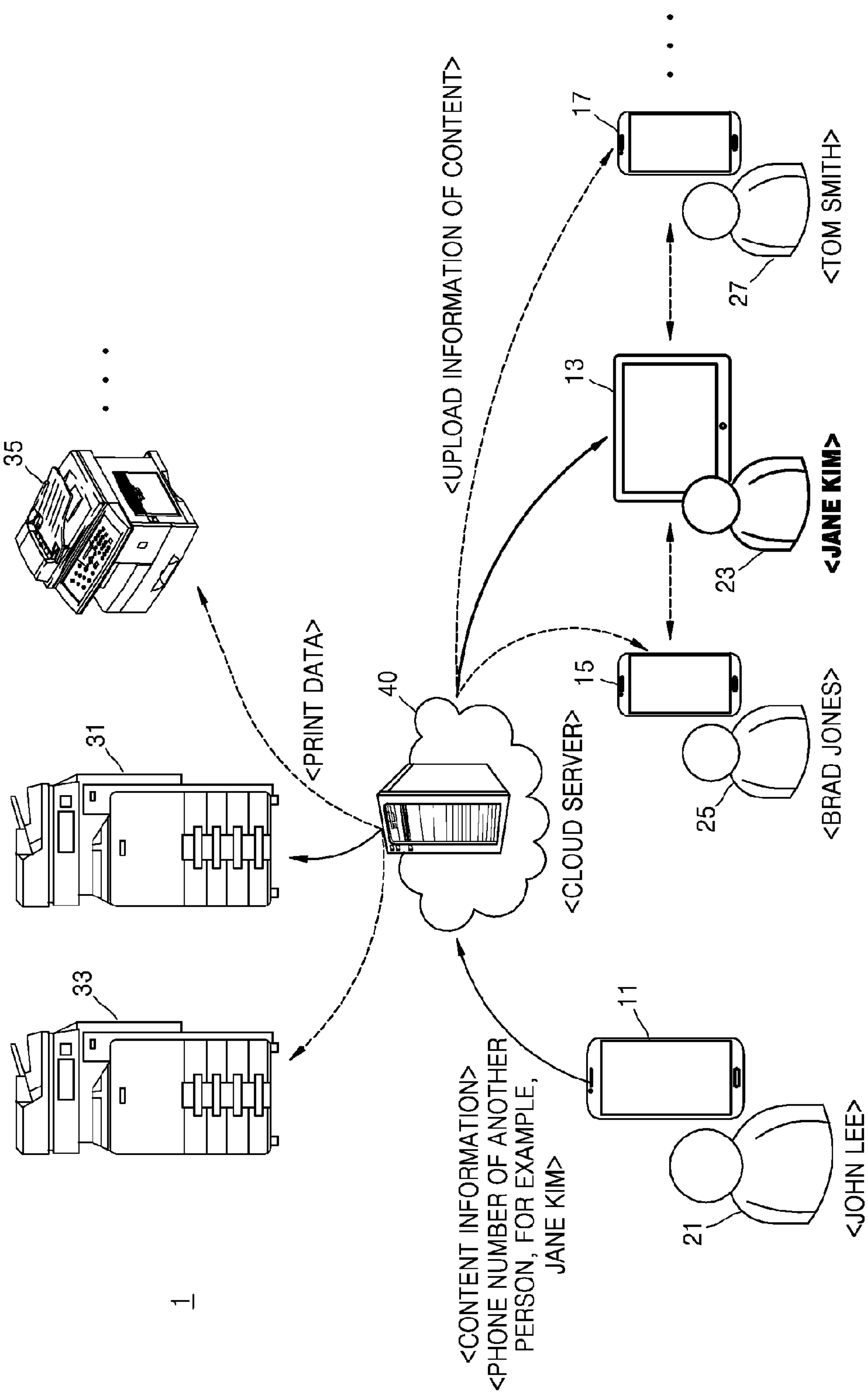
FIG. 2 is a diagram of an image forming system for providing a phone number-based cloud printing service, according to an embodiment.

FIG. 2 is a diagram of an image forming system 1 for providing a phone number-based cloud printing service, according to an embodiment.

Referring to FIG. 2, the image forming system 1 includes the mobile device 11 used by the first individual 21, for example, John Lee, the mobile device 13 used by the second individual 23, for example, Jane Kim, a mobile device 15 used by a third individual 25, for example, Brad Jones, a mobile device 17 used by a fourth individual 27, for example, Tom Smith, a plurality of image forming apparatuses 31, 33, and 35, and a cloud server 40.

The number of the first through fourth individuals 21 through 27 and the number of image forming apparatuses 31 through 35 included in the image forming system 1 are arbitrarily set for convenience of description, and thus are not limited thereto.

Also, the names of the first through fourth individuals 21 through 27 are arbitrarily determined for convenience of description, and thus are not limited thereto.

The first individual 21 may transmit print data of a content by inputting a phone number of at least one subject, for example, the second individual 23, from among subjects to print the content, to the mobile device 11. Also, the first individual 21 may transmit the print data of the content to another individual, for example, the third or fourth individual 25 or 27 by inputting a phone number of the other individual to the mobile device 11.

For example, let's assume that the first individual 21 is to transmit the print data of the content to the second individual 23 through the mobile device 11.

The first individual 21 may select a content stored in or being used by the mobile device 11, and input the phone number of the second individual 23 that is a subject to print the data to the mobile device 11.

Information about the selected content and the input phone number are transmitted to the cloud server 40.

The cloud server 40 is a server for managing the phone numbers of the mobile devices 11 through 17. In detail, the cloud server 40 may be a server for managing information about a mapping relationship between the phone numbers of the mobile devices 11 through 17 and the image forming apparatuses 31 through 35, and information about a mapping relationship between the phone numbers of the mobile devices 11 through 17 and contents transmitted from the mobile devices 11 through 17.

Also, the cloud server 40 may perform cloud rendering for rendering or converting a content that is not in a print data format to a print data format.

When the phone number of the second individual 23 and the information about the selected content are transmitted from the mobile device 11 of the first individual 21, the cloud server 40 renders or converts the received content to a print data format, and transmits print data of the content to the mobile device 13 of the second individual 23 based on the phone number of the second individual 23 mapped to the content.

When the mobile device 13 of the second individual 23 receives the information about the selected content from the cloud server 40, the print data of the content may be printed by at least one of the image forming apparatuses 31 through 25 assigned (mapped) by the mobile device 13.

In detail, when the second individual 23 pre-set a direct printing mode (or a direct printing function) regarding printing of the content in the mobile device 13, the print data of the content may be automatically printed by at least one of the image forming apparatuses 31 through 35. Such a direct printing mode will be described in detail later.

Alternatively, when the second individual 23 pre-set a pull printing mode (or a pull printing function) regarding printing of the content in the mobile device 13, the print data of the content is not automatically printed by at least one of the image forming apparatuses 31 through 25, but may be held (may stand by) until a process request is input to the mobile device 13 by the second individual 23. In other words, unlike the direct printing mode, in the pull printing mode, the mobile device 13 displays the information about the selected content to the second individual 23, and processes the content when the second individual 23 inputs the process request.

The second individual 23 may input a print request to the at least one of the image forming apparatuses 31 through 35 assigned (mapped) by the mobile device 13. Alternatively, the second individual 23 may input a forwarding request for forwarding the content to the other individual, for example, the third or fourth individual 25 or 27. Alternatively, when the second individual 23 does not want to print the content, the second individual 23 may input a delete request for deleting the information about the selected content stored in the cloud server 40. Such a pull printing mode will be described in detail later.

Pull printing and direct printing will be described in detail later with reference to corresponding descriptions.

The cloud server 40 may pre-manage information about the image forming apparatus 31 mapped to the mobile device 13 of the second individual 23. Accordingly, the cloud server 40 transmits the print data of the content transmitted to the mobile device 13 of the second individual 23 to the image forming apparatus 31 mapped to the mobile device 13. Then, the image forming apparatus 31 prints the content based on the print data of the content, and thus a request of the mobile device 11 of the first individual 21 to print the content is completed.

The same processes are performed when the print data of the content is to be transmitted from the mobile device 11 of the first individual 21 to the third or fourth individual 25 or 27.

The cloud server 40 may manage that only the image forming apparatus 31 is mapped to the mobile device 13 of the second individual 23, but the other image forming apparatus 33 or 35 may be additionally mapped thereto.

Alternatively, even when none of the image forming apparatuses 31 through 35 are currently mapped to the mobile device 13 of the second individual 23, registration information about a mapping relationship may be updated in the cloud server 40 by performing a registration process of the mobile devices 11 through 17 with respect to one of the image forming apparatuses 31 through 35 as described later.

The mobile devices 11 through 17, the image forming apparatuses 31 through 35, and the cloud server 40 in the image forming system 1 may be connected to each other through any one of currently well-known types of wired/wireless communication networks and mobile communication networks.

Referring back to FIG. 2, the image forming system 1 may transmit and receive a content to be printed by only using the phone numbers of the mobile devices 11 through 17, and may print a content by using the various image forming apparatuses 31 through 35.

A printing platform of the image forming system 1 may be provided to an open application programmer interface (API) for an application developer or a webpage manufacturer. Accordingly, the application developer or the webpage manufacturer may freely develop a print application executed in the mobile device 11, 13, 15, or 17, or the image forming apparatus 31, 33, or 35 by using the open API of the image forming system 1 based on the printing platform.

Operations and functions of components included in the image forming system 1 for providing a phone number-based cloud printing service will now be described in detail.

Figure 3:
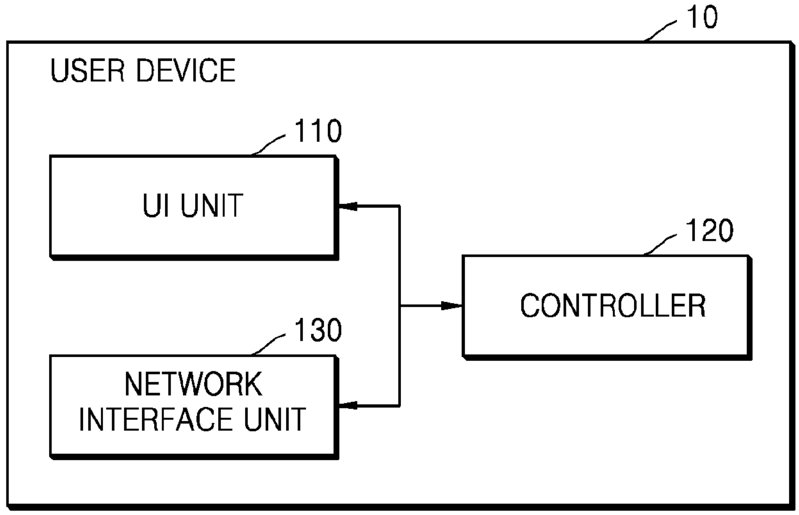
FIG. 3 is a block diagram of a user device of the image forming system, according to an embodiment.

FIG. 3 is a block diagram of a user device 10 of the image forming system 1, according to an embodiment.

Referring to FIG. 3, the user device 10 may correspond to at least any one of the mobile devices 11 through 17 of the image forming system 1 of FIG. 2. In other words, the user device 10 may be the mobile device 11 that is a transmitter terminal for transmitting a content to be printed, or the mobile device 13, 15, or 17 that is a receiver terminal for receiving a content to be printed. Alternatively, the user device 10 may be a computing device 19 of FIG. 8A or 8B connectable to an embedded webpage provided by the image forming apparatus 31, 33, or 35.

It is assumed that the mobile devices 11 through 17 include the components of the user device 10 of FIG. 3.

The user device 10 includes a user interface (UI) unit (user interface) 110, a controller 120, and a network interface unit (network interface 130. In order to prevent features of an embodiment from being blurred, only hardware components related to an embodiment are described in FIG. 3. However, general-purpose hardware components other that those shown in FIG. 3 may be included in the user device 10.

The UI unit 110 is a hardware component including an input device or a display device, and displays information to a user of the user device 10 or receives information from the user. The user interface 110 may include, for example, one or more of a keyboard, a keypad, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a pedal or footswitch, a virtual-reality device, and the like. The user interface 110 may further include a haptic device to provide haptic feedback to a user. The user interface 110 may also include a touchscreen display, for example. The touchscreen display may include a liquid crystal display (LCD), a light emitting diode (LED) display, an organic light emitting diode (OLED) display, active matrix organic light emitting diode (AMOLED), flexible display, 3D display, and the like, for example. However, the disclosure is not so limited thereto and may include other types of touchscreen displays. The disclosure may also include other types of user interfaces.

The user may select a content to be printed, which is received from, for example, outside the user device 10, or may set print options of the content. Also, the user may input a phone number that is an external destination, through the UI unit 110.

The controller 120 is a hardware component for controlling overall operations and functions of the user device 10. In detail, the controller 120 may execute a printing application for providing a phone number-based cloud printing service.

The controller 120 may be realized in at least one processor, such as a central processing unit (CPU), an application processor (AP), an arithmetic logic unit, a graphics processing unit (GPU), a digital signal processor (DSP), a microcomputer, a field programmable gate array, a programmable logic unit, an application-specific integrated circuit (ASIC), a microprocessor or any other device capable of responding to and executing computer-readable instructions.

The network interface unit 130 is a hardware component for supporting a wired or wireless communication function, and may support a wireless communication, such as Wi-Fi®, Wi-Fi Direct®, a near field communication (NFC), Zigbee®, infrared data association (IrDA) or Bluetooth®, a wired communication such as Ethernet, or a 2G mobile communication, a 3G mobile communication, or a 4G mobile communication.

Figure 4:
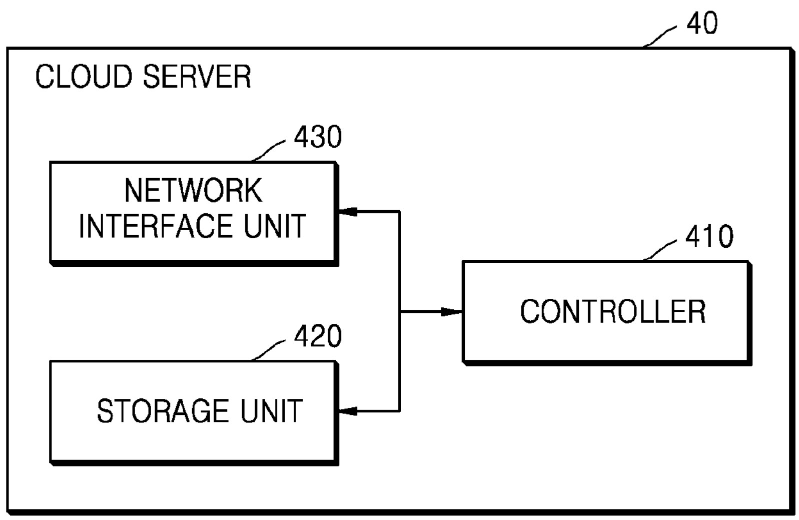
FIG. 4 is a block diagram of a cloud server of the image forming system, according to an embodiment.

FIG. 4 is a block diagram of the cloud server 40 of the image forming system 1, according to an embodiment.

Referring to FIG. 4, the cloud server 40 may correspond to the cloud server 40 of the image forming system 1 of FIG. 2. It is assumed that the cloud server 40 described hereinafter includes components of the cloud server 40 of FIG. 4.

The cloud server 40 includes a controller 410, a storage unit (storage) 420, and a network interface unit (network interface) 430. In order to prevent features of an embodiment from being blurred, only hardware components related to an embodiment are described in FIG. 4. However, general-purpose hardware components other that those shown in FIG. 4 may be included in the cloud server 40.

The controller 120 is a hardware component for controlling overall operations and functions of the cloud server 40. The controller 120 may manage and update mapping information of the phone numbers of the first through fourth individuals 11 through 17, or may operate as a renderer for rendering or converting a content.

The controller 120 may be realized in at least one processor, such as a CPU or an AP.

The storage unit 420 stores phone number registration information with respect to a list of the phone numbers of the first through fourth individuals 11 through 17, a list of contents mapped to the phone numbers, and a list of the image forming apparatuses 31 through 35 mapped to the phone numbers.

Also, the storage unit 420 stores print data of a content rendered or converted to a print data format.

The network interface unit (network interface) 430 is a hardware component for supporting a wired or wireless communication function, and may support a wireless communication, such as Wi-Fi®, Wi-Fi Direct®, an NFC, Zigbee®, infrared data association (IrDA), or Bluetooth®, a wired communication such as Ethernet, or a 2G mobile communication, a 3G mobile communication, or a 4G mobile communication.

Figure 5:
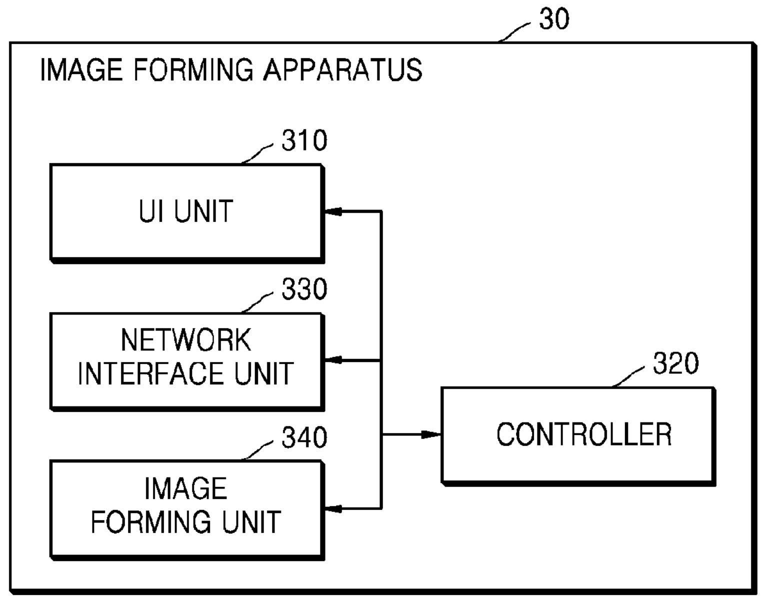
FIG. 5 is a block diagram of an image forming apparatus of the image forming system, according to an embodiment.

FIG. 5 is a block diagram of an image forming apparatus 30 of the image forming system 1, according to an embodiment.

Referring to FIG. 5, the image forming apparatus 30 may correspond to at least one of the image forming apparatuses 31 through 35 of the image forming system 1 of FIG. 2. It is assumed that the image forming apparatuses 31 through 35 include components of the image forming apparatus 30 of FIG. 5.

The image forming apparatus 30 includes a UI unit (user interface) 310, a controller 320, a network interface unit (network interface) 330, and an image forming unit (image forming apparatus) 340. In order to prevent features of an embodiment from being blurred, only hardware components related to an embodiment are described in FIG. 5. However, general-purpose hardware components other that those shown in FIG. 5 may be included in the image forming apparatus 30.

A printing application providing a phone number-based cloud printing service, which has similar functions as the printing application of the mobile device 11 of the first individual 21 described above may be pre-installed on an operating system (OS) of the image forming apparatus 30. Alternatively, even if such a printing application is not pre-installed in the image forming apparatus 30, a printing application may be newly installed on the OS of the image forming apparatus 30 by one of the first through fourth individuals 11 through 17 who wants to use the image forming apparatus 30.

The user interface (UI) unit 310 is a hardware component including an input device or a display device, and displays information to a user of the image forming apparatus 30 or receives information from the user. The user interface 310 may include, for example, one or more of a keyboard, a keypad, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a pedal or footswitch, a virtual-reality device, and the like. The user interface 310 may further include a haptic device to provide haptic feedback to a user. The user interface 310 may also include a touchscreen display, for example. The touchscreen display may include a liquid crystal display (LCD), a light emitting diode (LED) display, an organic light emitting diode (OLED) display, active matrix organic light emitting diode (AMOLED), flexible display, 3D display, and the like, for example. However, the disclosure is not so limited thereto and may include other types of touchscreen displays. The disclosure may also include other types of user interfaces.

The user may select a content to be scanned by the image forming apparatus 30 or may set print options of the content through the UI unit 310. Also, the user may input a phone number that is an external destination, through the UI unit 310.

The controller 320 is a hardware component for controlling overall operations and functions of the image forming apparatus 30. In detail, the controller 320 may execute a printing application for providing a phone number-based cloud printing service. Also, the controller 320 may control a print function, a copy function, or a scan function of the image forming unit (image forming apparatus) 340.

The controller 320 may be realized in at least one processor, such as a CPU or an AP.

The network interface unit 330 is a hardware component for supporting a wired or wireless communication function, and may support a wireless communication, such as Wi-Fi®, Wi-Fi Direct®, an NFC, Zigbee®, infrared data association (IrDA) or Bluetooth®, a wired communication such as Ethernet, or a 2G mobile communication, a 3G mobile communication, or a 4G mobile communication.

The image forming unit 340 is a hardware component for performing print and copy functions of a content, or a scan function of a document.

FIGS. 6A through 10B are diagrams for describing various methods of registering the image forming apparatus 31, 33, or 35 to print a received content, which are performed by the mobile device 13, 15, or 17 of one of the second through fourth individuals 23 through 27, for example, Jane Kim, Brad Jones, or Tom Smith, which corresponds to a receiver terminal in the image forming system 1 for providing a phone number-based cloud printing service.

FIGS. 6A through 10B are described mainly based on the mobile device 13 of the second individual 23 who is a recipient, but the details of FIGS. 6A through 10B may also be applied to the mobile device 15 or 17 of the third or fourth individual 25 or 27. Since the mobile device 11 of the first individual 21, for example, John Lee, may also correspond to a receiver terminal, the mobile device 11 may also perform a registration process in the similar manner as any one of the methods described with reference to FIGS. 6A through 10B.

Figure 6A:
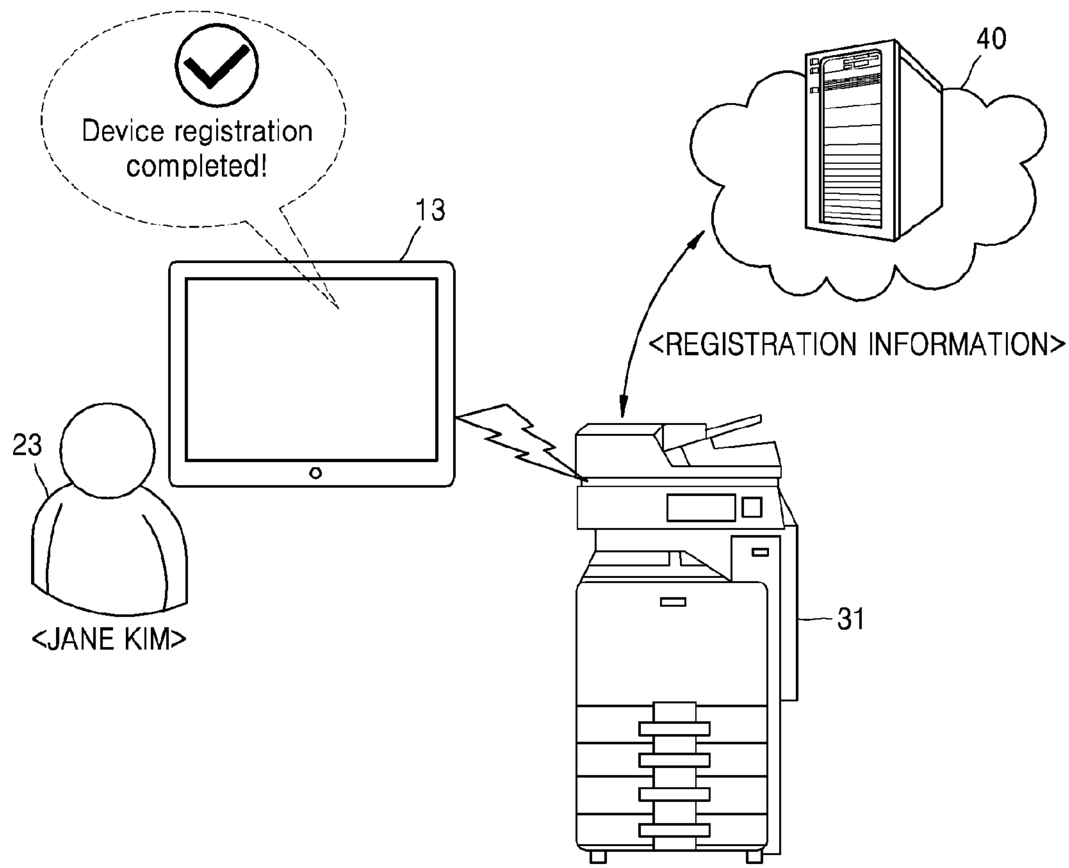
FIGS. 6A and 6B are diagrams for describing processes of mapping a phone number of a mobile device of a second individual to an image forming apparatus, and registering the phone number of the mobile device in a cloud server, according to an embodiment.
Figure 6B:
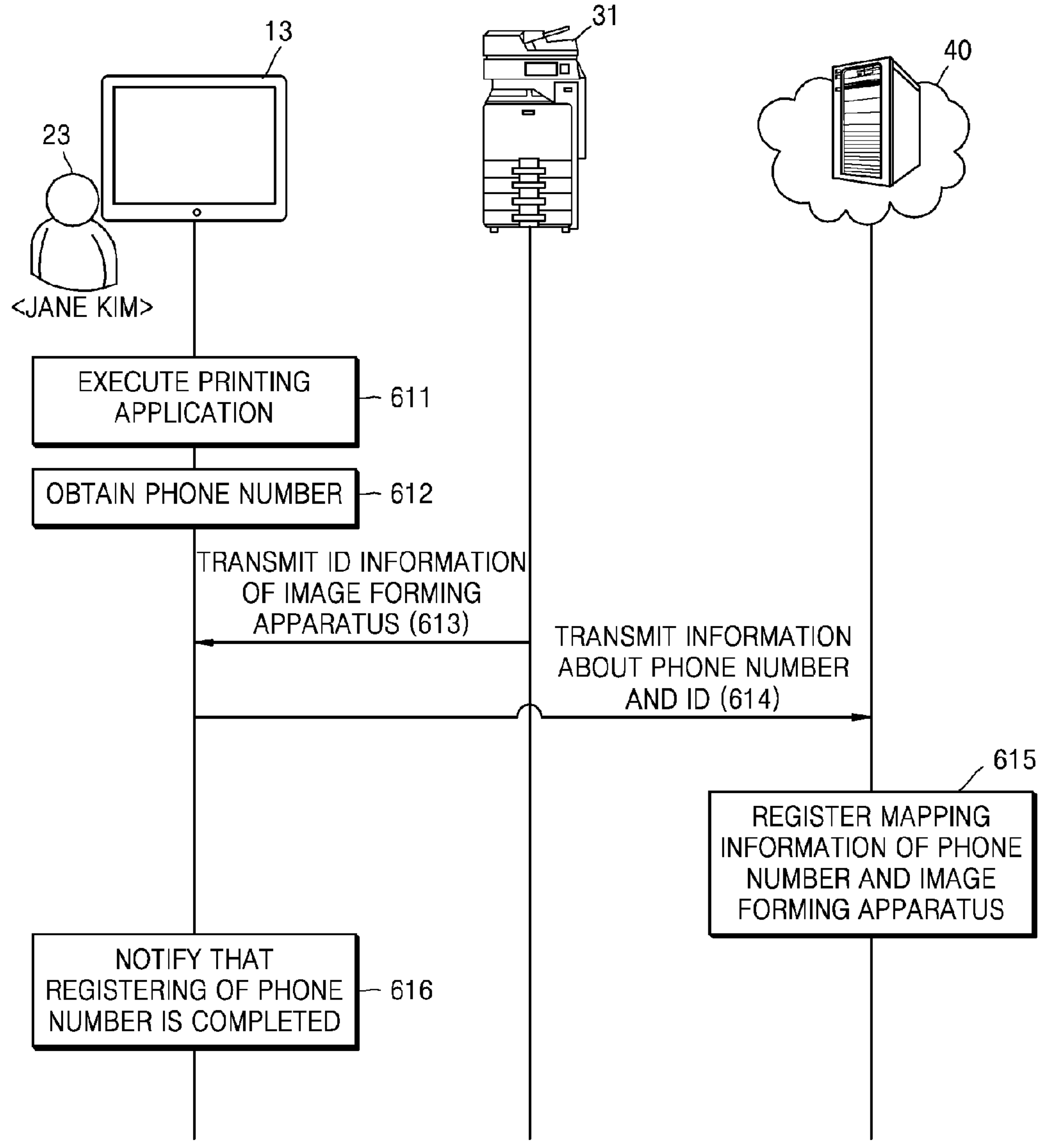

FIGS. 6A and 6B are diagrams for describing processes of mapping the phone number of the mobile device 13 of the second individual 23 to the image forming apparatus 31, and registering the phone number of the mobile device 13 in the cloud server 40, according to an embodiment.

Referring to FIGS. 6A and 6B, in operation 611, the controller 120 of the mobile device 13 executes a printing application.

In operation 612, the controller 120 of the mobile device 13 obtains the phone number of the mobile device 13 through the executed printing application.

In operation 613, the network interface unit 130 of the mobile device 13 is wirelessly connected to the network interface unit 330 of the image forming apparatus 31 to receive identification (ID) information of the image forming apparatus 31.

The ID information of the image forming apparatus 31 may include information about a network address of the image forming apparatus 31, for example, a media access control (MAC) address or an internet protocol (IP) address, and information about a serial number and product specification of the image forming apparatus 31.

The network interface unit 130 of the mobile device 13 and the network interface unit 330 of the image forming apparatus 31 may be connected to each other through a wireless network, such as Wi-Fi®, Wi-Fi Direct®, an NFC, or Zigbee®, infrared data association (IrDA) Bluetooth®.

For example, operation 613 may be performed by NFC-tagging the mobile device 13 to the image forming apparatus 31 by activating an NFC function.

In operation 614, the network interface unit 130 of the mobile device 11 is wirelessly connected to the network interface unit 430 of the cloud server 40, and transmits information about the phone number of the mobile device 13 and the ID information of the image forming apparatus 31 to the cloud server 40, as registration information of the mobile device 13.

In operation 615, the controller 410 of the cloud server 40 maps the phone number of the mobile device 13 and the ID information of the image forming apparatus 31 to each other, and stores such mapping information in the storage unit 420 as the registration information of the mobile device 13.

In operation 616, the UI unit 110 of the mobile device 13 notifies that the registering of the phone number of the mobile device 13 with respect to the image forming apparatus 31 is completed.

Figure 6C:
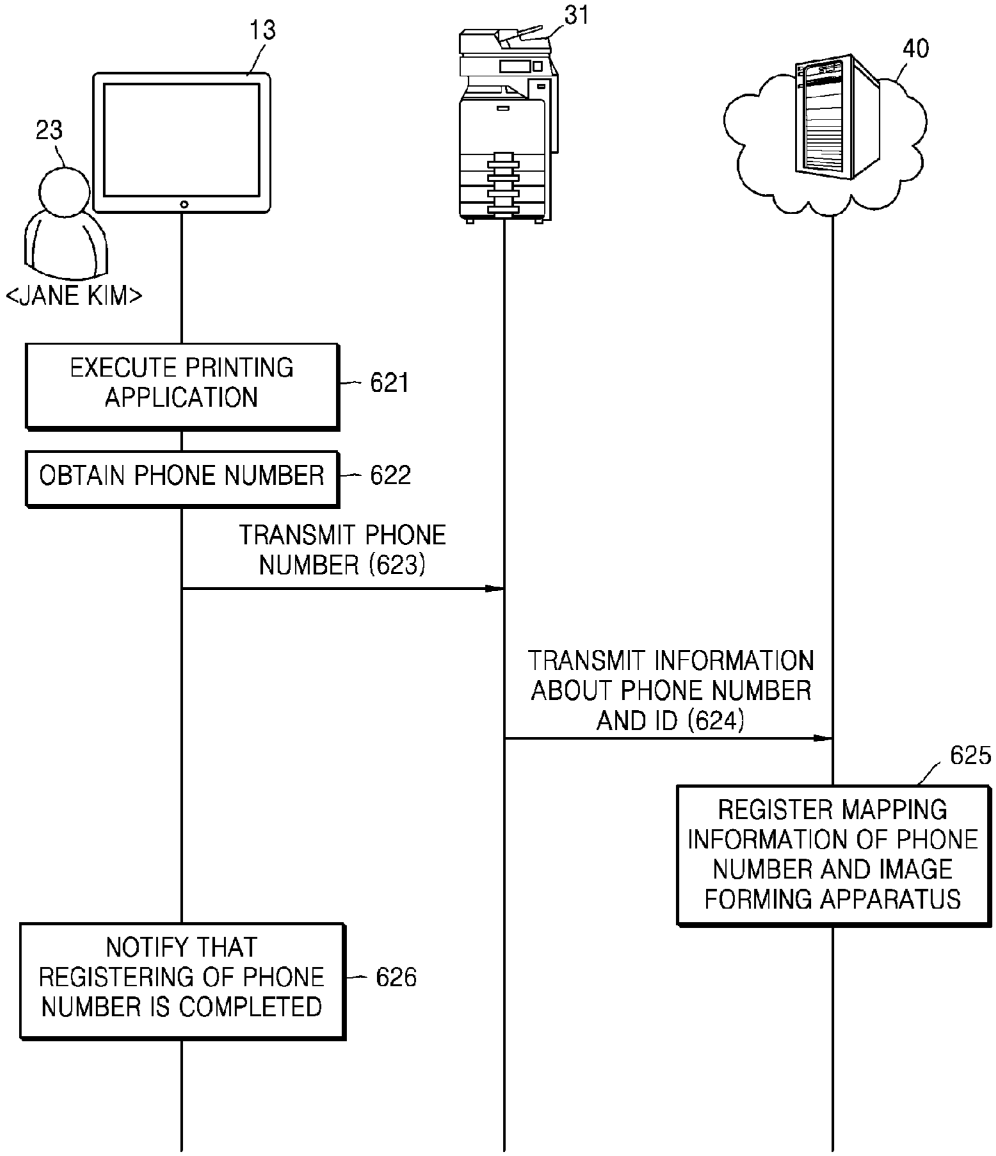
FIG. 6C is a diagram for describing processes of mapping the phone number of the mobile device of the second individual to the image forming apparatus, and registering the phone number of the mobile device in the cloud server, according to an embodiment.

FIG. 6C is a diagram for describing processes of mapping the phone number of the mobile device 13 of the second individual 23 to the image forming apparatus 31, and registering the phone number of the mobile device 13 in the cloud server 40, according to an embodiment.

Referring to FIGS. 6A and 6C, the controller 120 of the mobile device 13 executes the printing application in operation 621.

In operation 622, the controller 120 of the mobile device 13 obtains the phone number of the mobile device 13 through the executed printing application.

In operation 623, the network interface unit 130 of the mobile device 13 is wirelessly connected to the network interface unit 330 of the image forming apparatus 31 to transmit information about the obtained phone number to the image forming apparatus 31.

For example, operation 623 may be performed by NFC-tagging the mobile device 13 to the image forming apparatus 31 by activating an NFC function.

In operation 624, the network interface unit 330 of the image forming apparatus 31 is wirelessly connected to the network interface unit 430 of the cloud server 40 to transmit the information about the obtained phone number and the ID information of the image forming apparatus 31 to the cloud server 40, as the registration information of the mobile device 13.

The image forming apparatus 31 may be connected to the cloud server 40 by using an extensible messaging and presence protocol (XMPP), or alternatively, any other protocol.

In operation 625, the controller 410 of the cloud server 40 maps the phone number of the mobile device 13 and the ID information of the image forming apparatus 31 to each other, and stores such mapping information in the storage unit 420 as the registration information of the mobile device 13.

In operation 626, the UI unit 110 of the mobile device 13 notifies that registering of the phone number of the mobile device 13 with respect to the image forming apparatus 31 is completed.

Figure 6D:
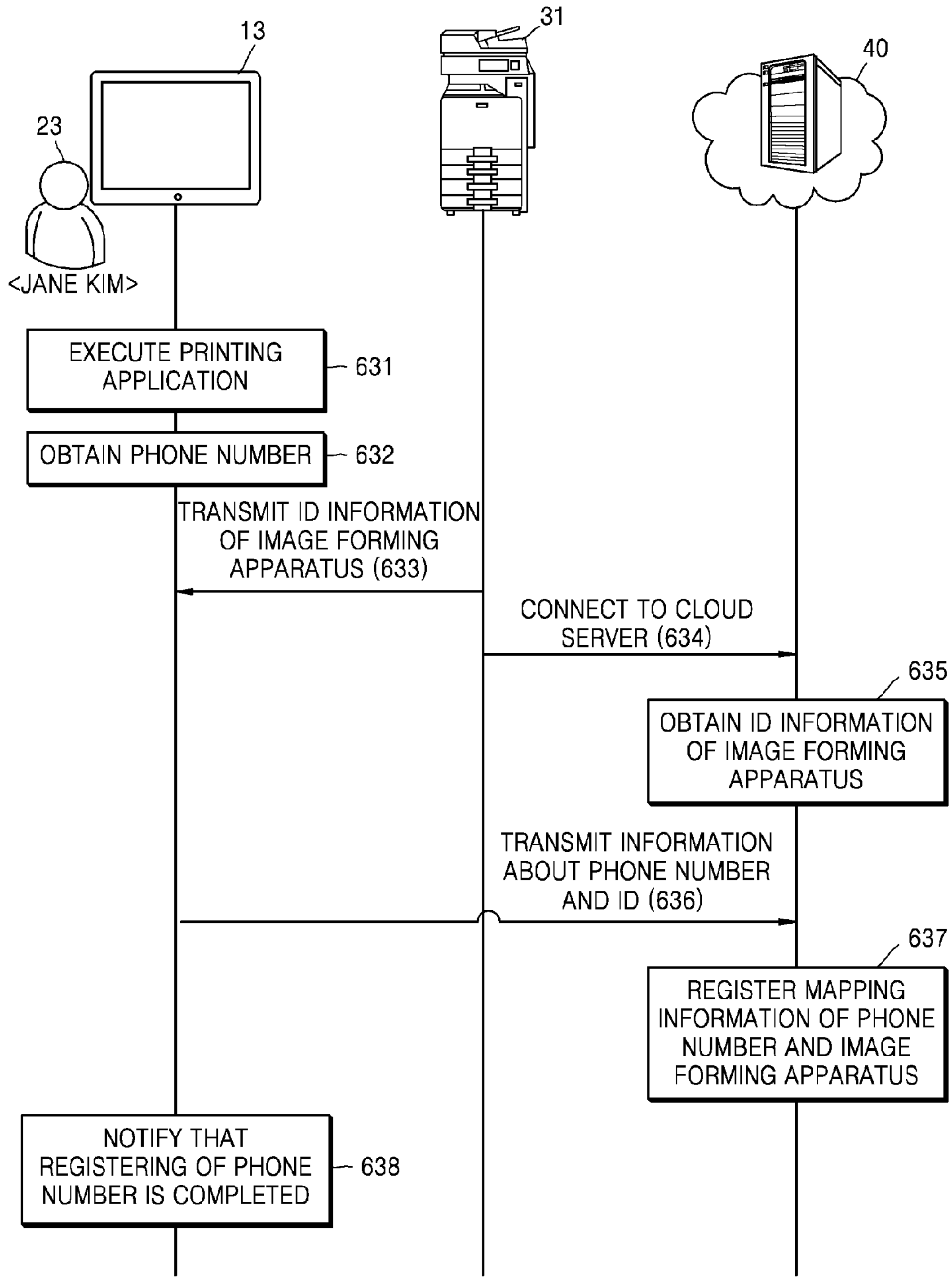
FIG. 6D is a diagram for describing processes of mapping the phone number of the mobile device of the second individual to the image forming apparatus, and registering the phone number of the mobile device in the cloud server, according to an embodiment.

FIG. 6D is a diagram for describing processes of mapping the phone number of the mobile device 13 of the second individual 23 to the image forming apparatus 31, and registering the phone number of the mobile device 13 in the cloud server 40, according to an embodiment.

Referring to FIGS. 6A and 6D, in operation 631, the controller 120 of the mobile device 13 executes a printing application.

In operation 632, the controller 120 of the mobile device 13 obtains the phone number of the mobile device 13 through the executed printing application.

In operation 633, the network interface unit 130 of the mobile device 13 is wirelessly connected to the network interface unit 330 of the image forming apparatus 31 to receive ID information of the image forming apparatus 31.

For example, operation 633 may be performed by NFC-tagging the mobile device 13 to the image forming apparatus 31 by activating an NFC function.

In operation 634, the network interface unit 330 of the image forming apparatus 31 connects to the cloud server 40. Operation 634 may be performed by a connection command of the mobile device 13. The image forming apparatus 31 may be connected to the cloud server 40 by using an XMPP, or alternatively, any other protocol.

In operation 635, the controller 410 of the cloud server 40 obtains the ID information of the image forming apparatus 31.

In operation 636, the network interface unit 130 of the mobile device 13 is wirelessly connected to the network interface unit 430 of the cloud server 40 to transmit the information about the phone number of the mobile device 13 and the ID information of the image forming apparatus 31 to the cloud server 40, as the registration information of the mobile device 13.

In operation 637, the controller 410 of the cloud server 40 maps the phone number of the mobile device 13 and the ID information of the image forming apparatus 31, and stores such mapping information in the storage unit 420 as the registration information of the mobile device 13.

In operation 638, the UI unit 110 of the mobile device 13 notifies that the registering of the phone number of the mobile device 13 with respect to the image forming apparatus 31 is completed.

Figure 6E:
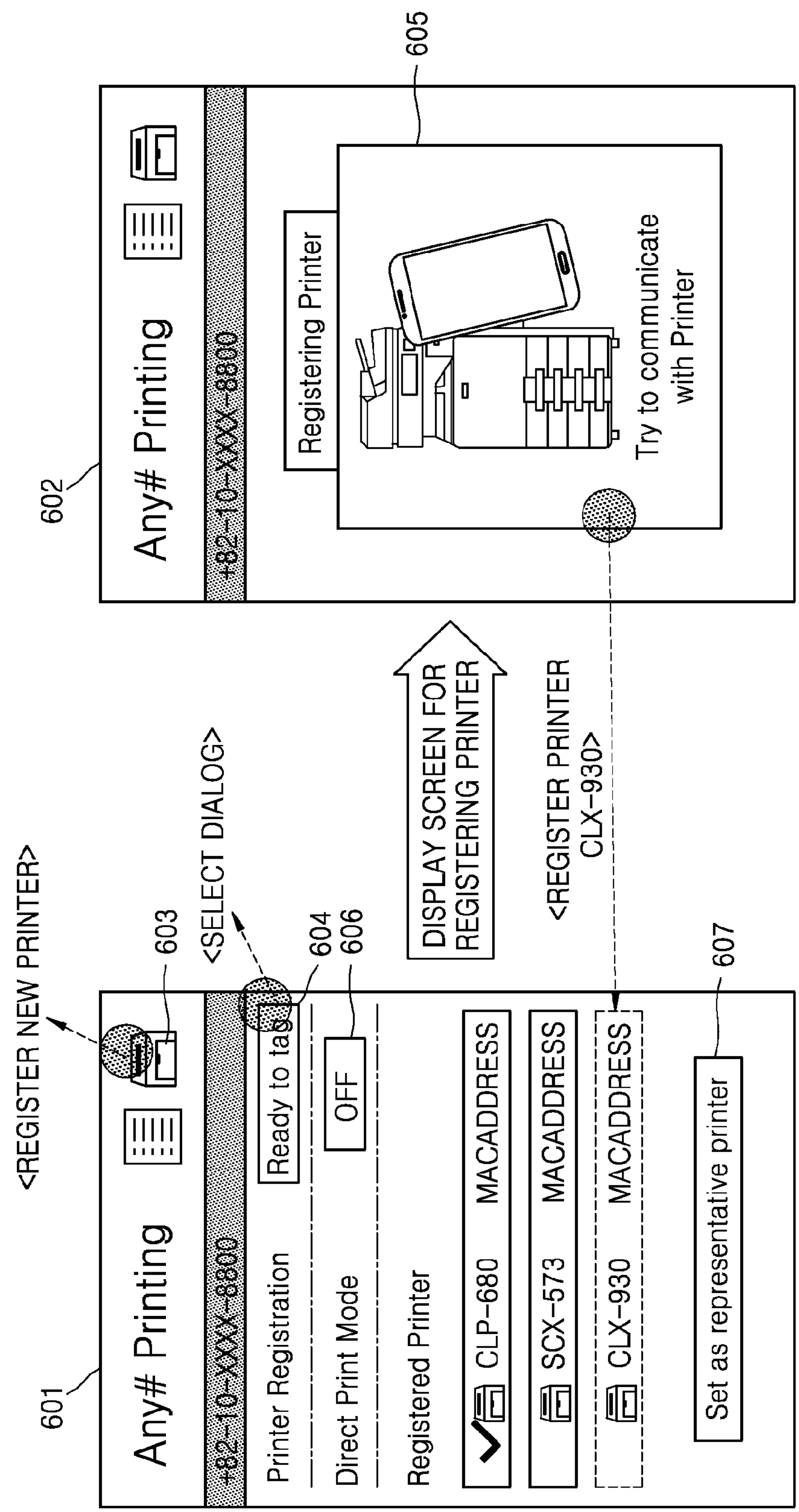
FIG. 6E illustrates user interface (UI) screens of a printing application executed in the mobile device to register the phone number of the mobile device in the cloud server, according to an embodiment.

FIG. 6E illustrates UI screens of the printing application executed in the mobile device 13 to register the phone number of the mobile device 13 in the cloud server 40, according to an embodiment.

The printing application is pre-installed in the mobile device 13.

When the second individual 23 wants to register the phone number of the mobile device 13 and the image forming apparatus 31 in the cloud server 40, the second individual 23 executes the printing application in the mobile device 13.

When the second individual 23 clicks a registration icon 603 to register a new printer while the printing application is being executed, a first screen 601 is displayed.

The first screen 601 may display an entry for requesting registration of the image forming apparatus 31, an entry for setting a direct printing mode, and a list of image forming apparatuses registered to the phone number of the mobile device 13.

When the second individual 23 clicks a dialog 604 in the entry for requesting registration, a second screen 602 is displayed.

The second screen 602 is a screen for guiding the registration of the image forming apparatus 31. When the second screen 602 is displayed, the second individual 23 may complete the registration of the image forming apparatus 31 by establishing a communication between the mobile device 13 and the image forming apparatus 31. The communication between the mobile device 13 and the image forming apparatus 31 may be established by NFC-tagging the mobile device 13 to the image forming apparatus 31. Alternatively, the communication between the mobile device 13 and the image forming apparatus 31 may be established by connecting them via any wireless communication method, such as Wi-Fi or Wi-Fi direct.

In other words, the mobile device 13 may register the information about the phone number of the mobile device 13 in the cloud server 40 through the first and second screens 601 and 602 of the pre-installed printing application. The first and second screens 601 and 602 may be differently configured, and an embodiment is not limited by the screen configurations of the printing application.

The mobile device 13 may activate or deactivate a direct printing function through an icon 606 in the entry for setting the direct printing mode of the printing application.

If the direct printing function is activated, the second individual 23 may select the image forming apparatus 31, for example, CLP-680, from the list of image forming apparatuses and click a set button 607 to assign the image forming apparatus 31 to perform the direct printing mode.

Information about the registration and direct printing mode performed by the printing application of the mobile device 13 may be transmitted to and stored in the cloud server 40.

Figure 7A:
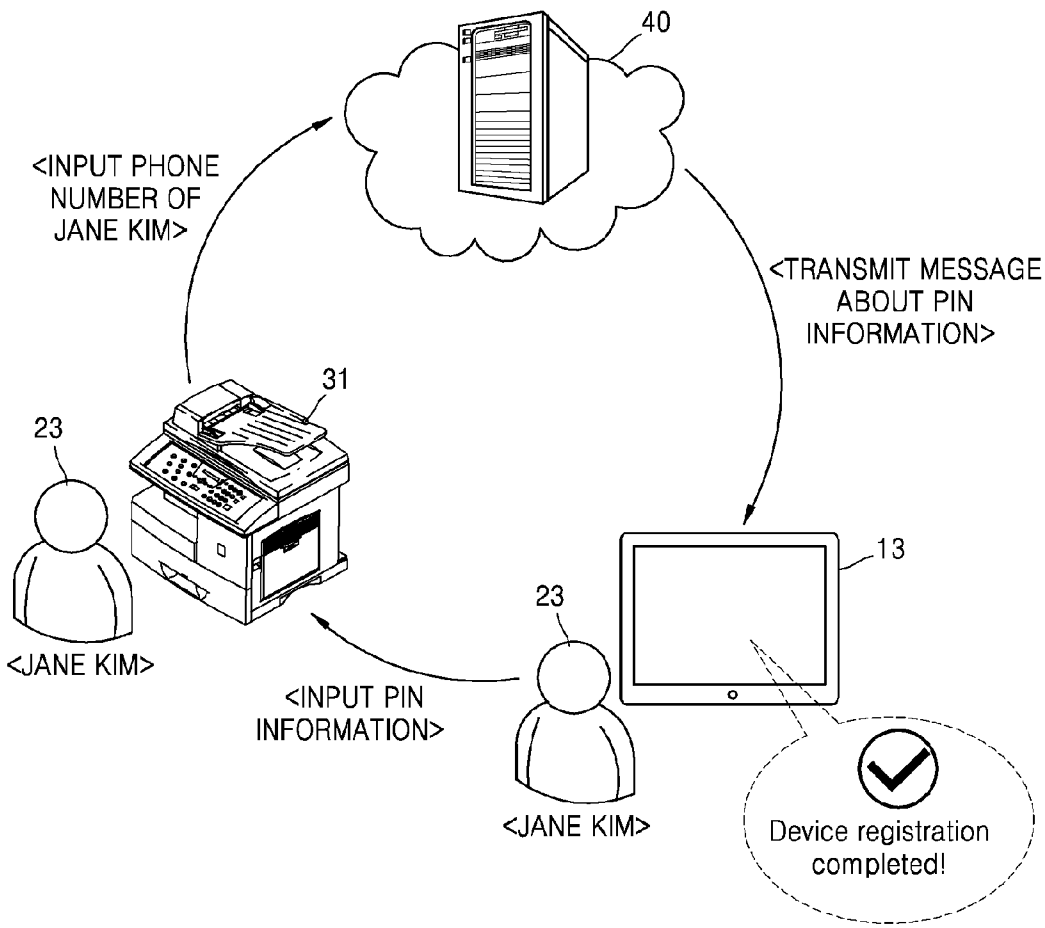
FIGS. 7A and 7B are diagrams for describing processes of mapping the phone number of the mobile device of the second individual to the image forming apparatus, and registering the phone number of the mobile device in the cloud server, according to an embodiment.
Figure 7B:
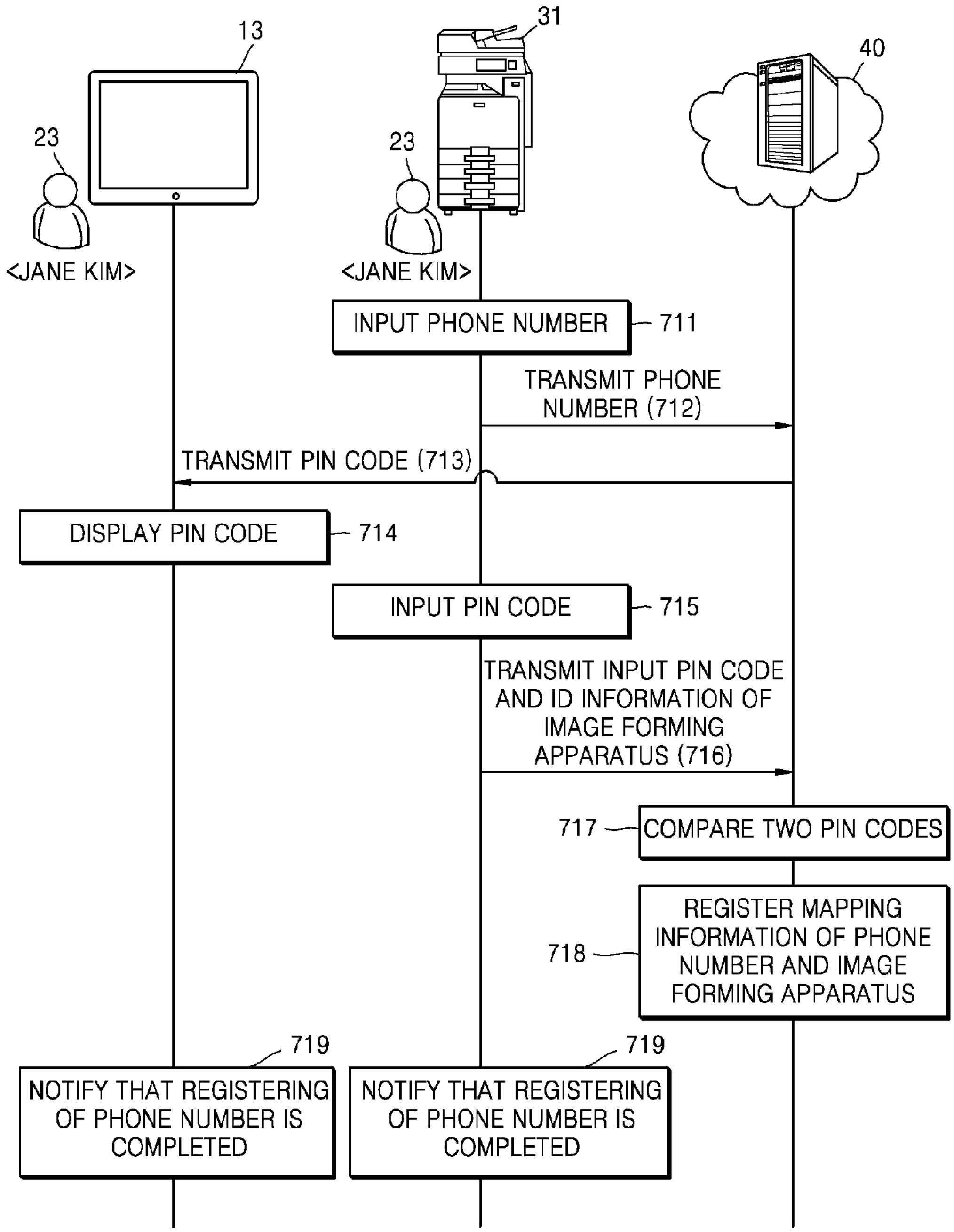

FIGS. 7A and 7B are diagrams for describing processes of mapping the phone number of the mobile device 13 of the second individual 23 to the image forming apparatus 31, and registering the phone number of the mobile device 13 in the cloud server 40, according to an embodiment.

Referring to FIGS. 7A and 7B, the second individual 23, i.e., Jane Kim, inputs the phone number of the mobile device 13 through the UI unit 310 of the image forming apparatus 31, in operation 711.

In operation 712, the network interface unit 330 of the image forming apparatus 31 is wirelessly connected to the network interface unit 430 of the cloud server 40 to transmit information about the input phone number to the cloud server 40.

In operation 713, the network interface unit 430 of the cloud server 40 transmits an arbitrary personal ID number (PIN) code to the mobile device 13 of the second individual 23 having the input phone number by using a short message service (SMS) or a multimedia message service (MMS). The cloud server 40 may transmit another type of an arbitrary code instead of the PIN code.

In operation 714, the UI unit 110 of the mobile device 13 displays the PIN code received by using the SMS or MMS.

In operation 715, the second individual 23 inputs the PIN code received from the mobile device 13 through the UI unit 310 of the image forming apparatus 31.

In operation 716, the network interface unit 330 of the image forming apparatus 31 transmits information about the input PIN code and the ID information of the image forming apparatus 31 to the cloud server 40.

In operation 717, the controller 410 of the cloud server 40 compares the PIN code transmitted from the image forming apparatus 31 and the PIN code transmitted from the mobile device 13 to determine whether the two PIN codes are the same.

If the two PIN codes are the same, the controller 410 of the cloud server 40 maps and registers the phone number of the mobile device 13 and the image forming apparatus 31, in operation 718.

If the two PIN codes are not the same, the controller 410 of the cloud server 40 denies the registration of the phone number of the mobile device 13.

In operation 719, the UI unit 110 of the mobile device 13 or the UI unit 310 of the image forming apparatus 31 notifies that the registering of the phone number of the mobile device 13 with respect to the image forming apparatus 31 is completed.

Referring to FIGS. 7A and 7B, the registering may be completed with only intermediation of the cloud server 40 while the mobile device 13 and the image forming apparatus 31 do not communicate with each other, unlike FIGS. 6A and 6B. Accordingly, the processes of FIGS. 7A and 7B may be used when any one of the mobile device 13 and the image forming apparatus 31 does not support an NFC, Wi-Fi®, Wi-Fi Direct®, Zigbee®, infrared data association (IrDA), or Bluetooth® for a wireless communication between the mobile device 13 and the image forming apparatus 31. However, the processes of FIGS. 7A and 7B may be used even when the mobile device 13 and the image forming apparatus 31 both support a wireless communication function described above with reference to FIGS. 6A and 6B.

Figure 8A:
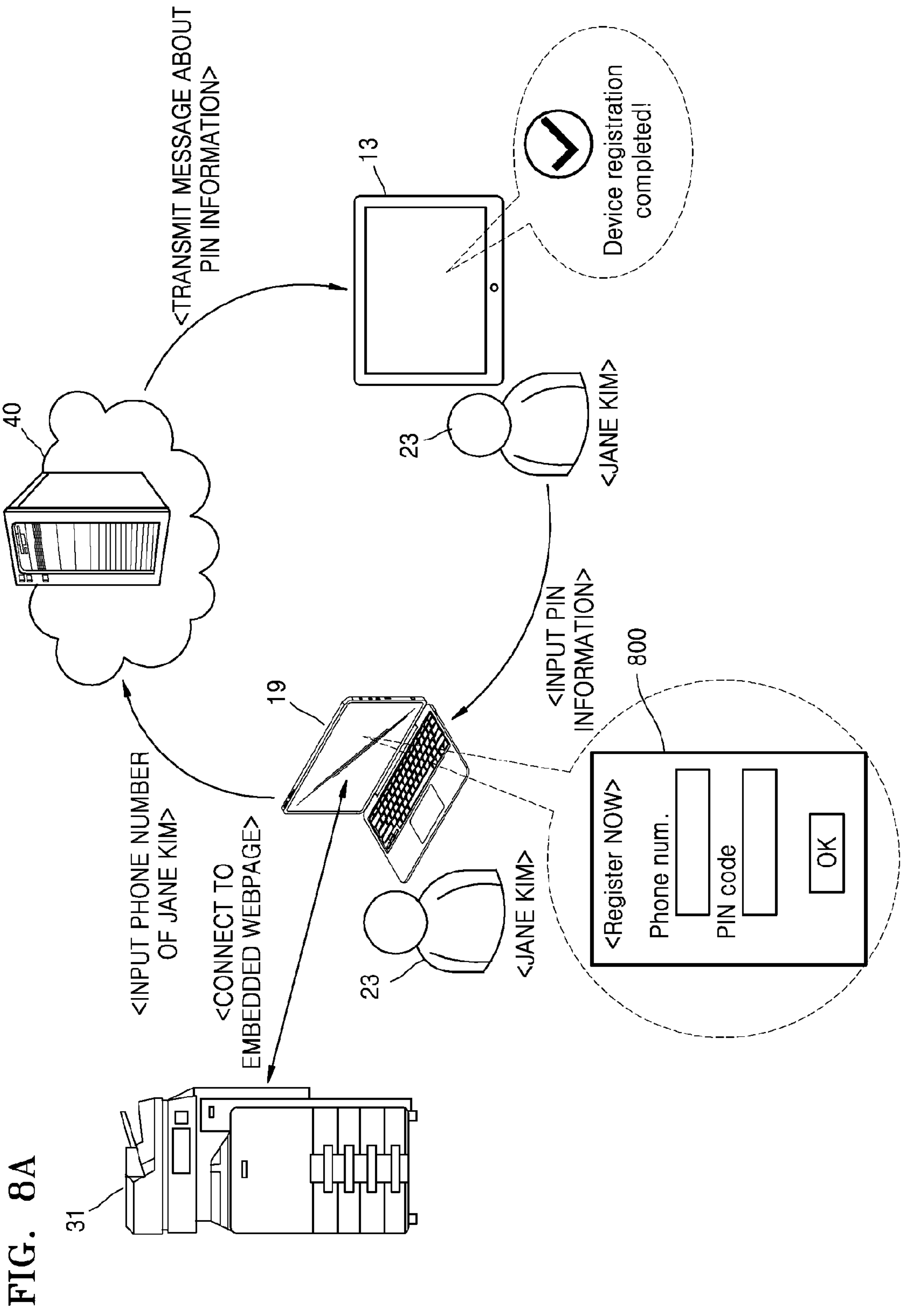
FIGS. 8A and 8B are diagrams for describing processes of mapping the phone number of the mobile device of the second individual to the image forming apparatus, and registering the phone number of the mobile device in the cloud server, according to an embodiment.
Figure 8B:
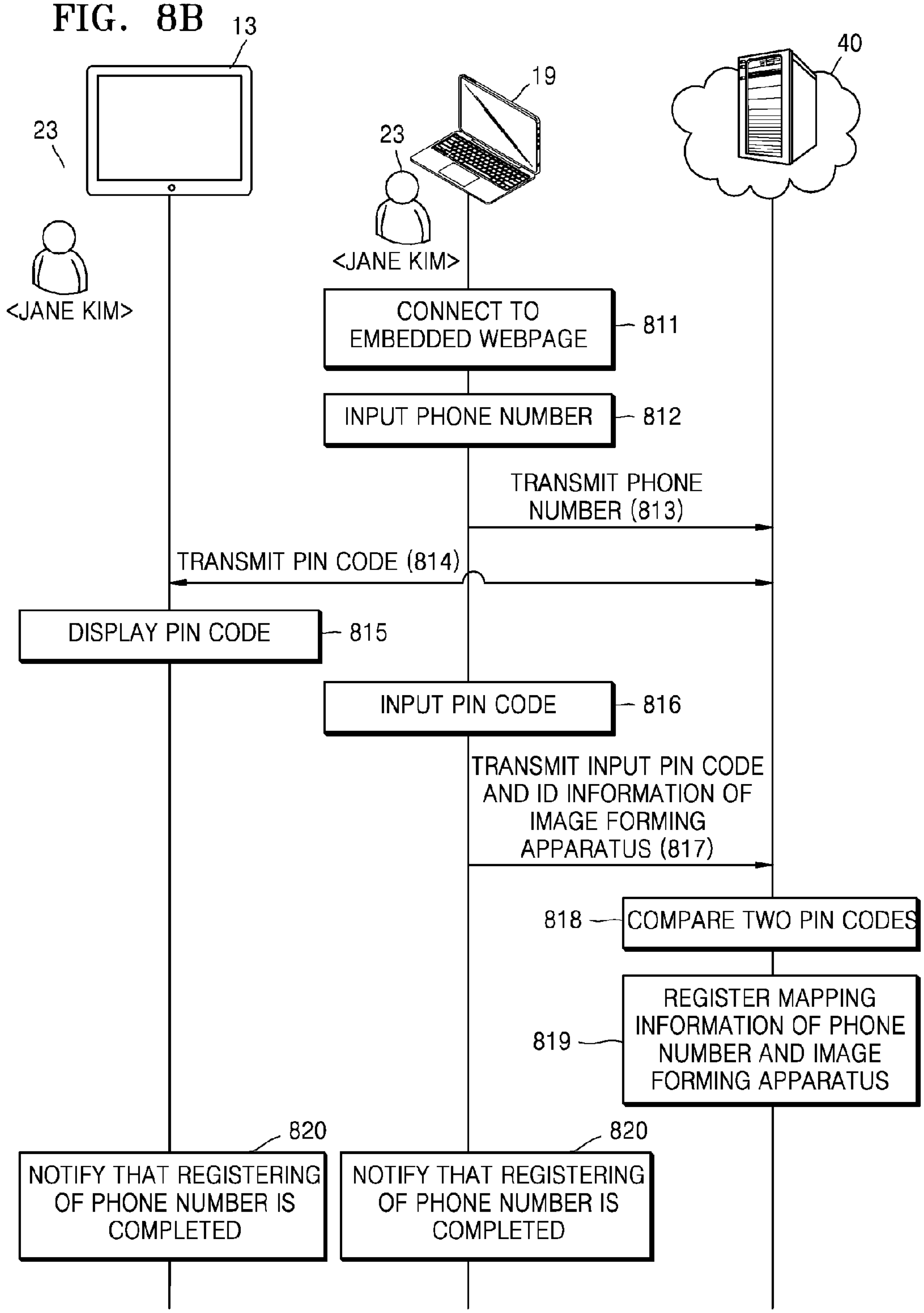

FIGS. 8A and 8B are diagrams for describing processes of mapping the phone number of the mobile device 13 of the second individual 23 to the image forming apparatus 31, and registering the phone number of the mobile device 13 in the cloud server 40, according to an embodiment.

Referring to FIGS. 8A and 8B, the second individual 23, i.e., Jane Kim, connects to an embedded webpage 800 provided by the image forming apparatus 31 by using the computing device 19, in operation 811. The computing device 19 corresponds to a PC or a laptop, and may be the user device 10 of FIG. 3. Accordingly, the computing device 19 includes the UI unit 110, the controller 120, and the network interface unit 130.

In operation 812, the second individual 23 inputs the phone number of the mobile device 13 through the embedded webpage 800.

In operation 813, the network interface unit 130 of the computing device 19 is wirelessly connected to the network interface unit 430 of the cloud server 40 to transmit information about the input phone number to the cloud server 40.

In operation 814, the network interface unit 430 of the cloud server 40 transmits an arbitrary PIN code to the mobile device 13 of the second individual 23 having the input phone number by using an SMS or MMS. The cloud server 40 may transmit another type of an arbitrary code instead of the PIN code.

In operation 815, the UI unit 110 of the mobile device 13 displays the PIN code received by using the SMS or MMS.

In operation 816, the second individual 23 inputs the PIN code received from the mobile device 13 through the embedded webpage 800.

In operation 817, the network interface unit 130 of the computing device 19 transmits information about the input PIN code and the ID information of the image forming apparatus 31 to the cloud server 40.

The computing device 19 may obtain the ID information of the image forming apparatus 31 by connecting to the embedded webpage 800 of the image forming apparatus 31.

In operation 818, the controller 410 of the cloud server 40 compares the PIN code transmitted from the computing device 19 and the PIN code transmitted to the mobile device 13 to determine whether the two PIN codes are the same.

If the two PIN codes are the same, the controller 410 of the cloud server 40 maps and registers the phone number of the mobile device 13 and the image forming apparatus 31, in operation 819.

If the two PIN codes are not the same, the controller 410 of the cloud server 40 denies the registration of the phone number of the mobile device 13.

In operation 820, the UI unit 110 of the mobile device 13 or the UI unit 110 of the computing device 19 notifies that the registering of the phone number of the mobile device 13 with respect to the image forming apparatus 31 is completed.

Figure 9A:
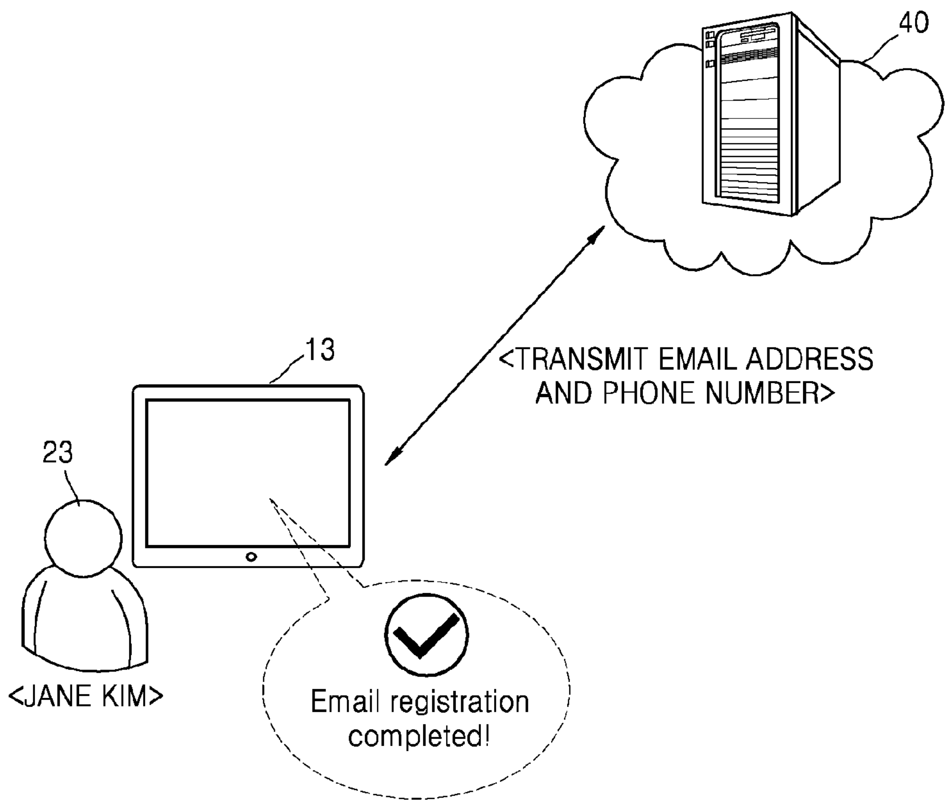
FIGS. 9A and 9B are diagrams for describing processes of mapping the phone number of the mobile device of the second individual to an email address, and registering the phone number of the mobile device in the cloud server, according to an embodiment.
Figure 9B:
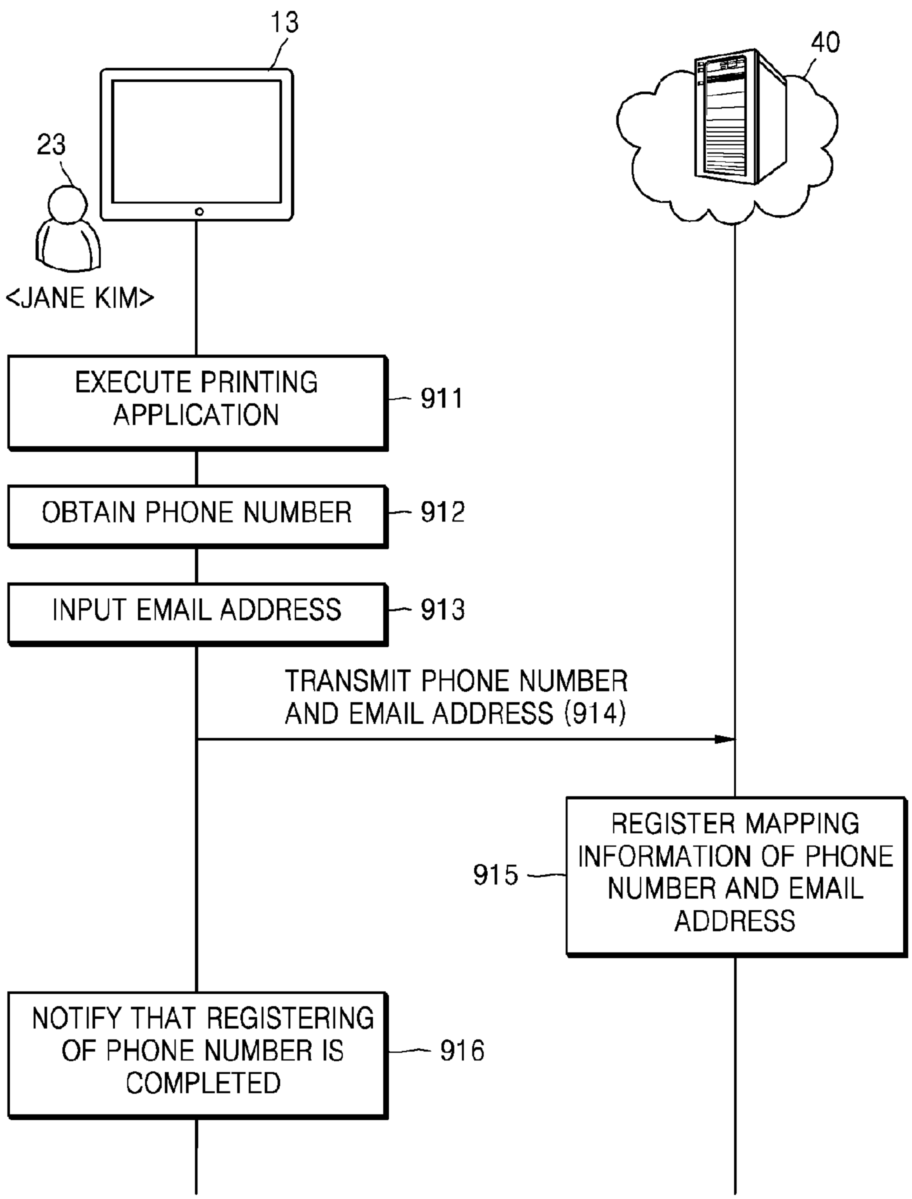

FIGS. 9A and 9B are diagrams for describing processes of mapping the phone number of the mobile device 13 of the second individual 23 to an email address, and registering the phone number of the mobile device 13 in the cloud server 40, according to an embodiment.

Referring to FIGS. 9A and 9B, the controller 120 of the mobile device 13 executes a printing application in operation 911.

In operation 912, the controller 120 of the mobile device 13 obtains the phone number of the mobile device 13 through the executed printing application.

In operation 913, the second individual 23, i.e., Jane Kim, inputs an email address through the executed printing application.

In operation 914, the network interface unit 130 of the mobile device 13 is wirelessly connected to the network interface unit 430 of the cloud server 40 to transmit information about the obtained phone number and input email address to the cloud server 40.

In operation 915, the controller 410 of the cloud server 40 maps the phone number and the email address, and stores such mapping information in the storage unit 420 as registration information of the mobile device 13.

In operation 916, the UI unit 110 of the mobile device 13 notifies that registering of the phone number of the mobile device 13 with respect to the email address is completed.

Referring to FIGS. 9A and 9B, the phone number and the mobile device 13 and the image forming apparatus 31 are not mapped, but the phone number of the mobile device 13 and the email address of the second individual 23 are mapped, unlike FIGS. 6A through 8B.

When the phone number of the mobile device 13 and the email address of the second individual 23 are mapped via the processes of FIGS. 9A and 9B, a content may be transmitted and printed according to processes described below with reference to FIG. 14.

Figure 10A:
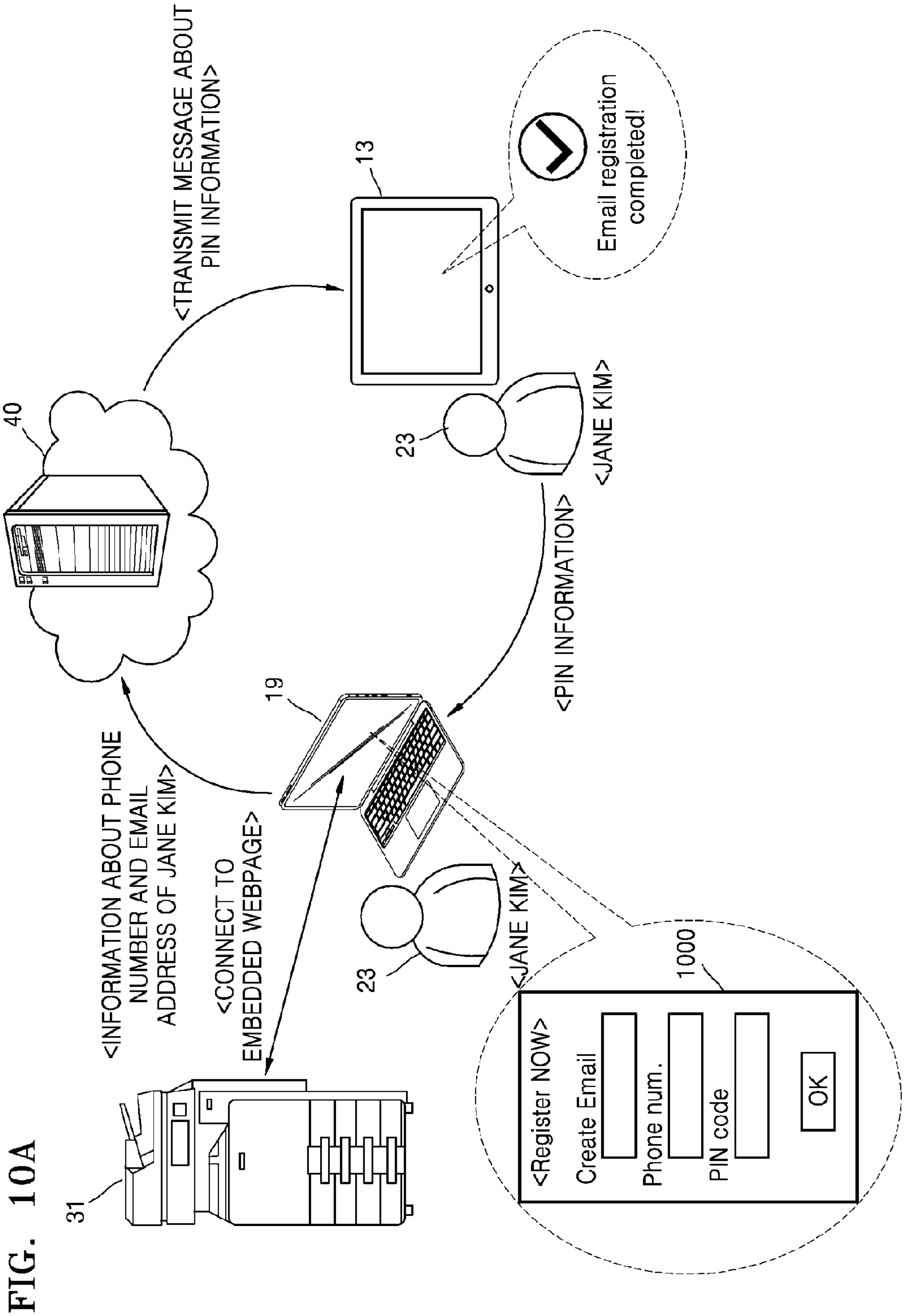
FIGS. 10A and 10B are diagrams for describing processes of mapping the phone number of the mobile device of the second individual to the email address, and registering the phone number of the mobile device in the cloud server, according to an embodiment.
Figure 10B:
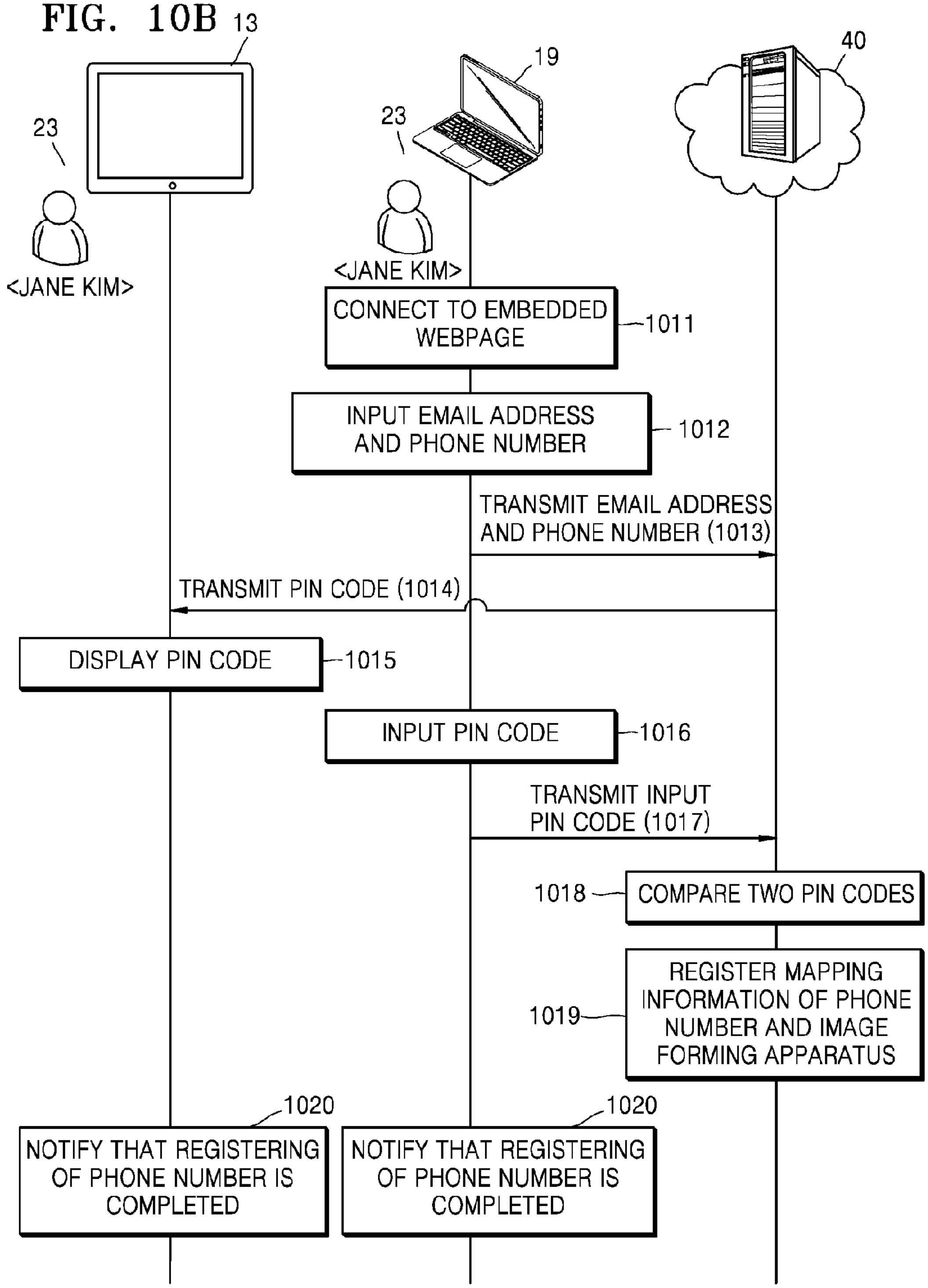

Referring to FIGS. 10A and 10B, the second individual 23, i.e., Jane Kim, connects to an embedded webpage 1000 provided by the image forming apparatus 31 by using the computing device 19, in operation 1011. The computing device 19 corresponds to a PC or a laptop, and may be the user device 10 of FIG. 3. Thus, the computing device 19 includes the UI unit 110, the controller 120, and the network interface unit 130.

In operation 1012, the second individual 23 inputs the email address and the phone number of the mobile device 13 through the embedded webpage 1000.

In operation 1013, the network interface unit 130 of the computing device 19 is wirelessly connected to the network interface unit 430 of the cloud server 40 to transmit information about the input phone number and email address to the cloud server 40.

In operation 1014, the network interface unit 430 of the cloud server 40 transmits an arbitrary personal identification number (PIN) code to the mobile device 13 of the second individual 23 having the input phone number by using an SMS or MMS. The cloud server 40 may transmit another type of an arbitrary code instead of the PIN code.

In operation 1015, the UI unit 110 of the mobile device 13 displays the PIN code received by using the SMS or MMS.

In operation 1016, the second individual 23 inputs the PIN code received from the mobile device 13 through the embedded webpage 1000.

In operation 1017, the network interface unit 130 of the computing device 19 transmits information about the input PIN code to the cloud server 40.

In operation 1018, the controller 410 of the cloud server 40 compares the PIN code transmitted from the computing device 19 and the PIN code transmitted to the mobile device 13 to determine whether the two PIN codes are the same.

If the two PIN codes are the same, the controller 410 of the cloud server 40 maps and registers the phone number of the mobile device 13 and the email address, in operation 1019.

If the two PIN codes are not the same, the controller 410 of the cloud server 40 denies the registration of the phone number of the mobile device 13.

In operation 1020, the UI unit 110 of the mobile device 13 or the UI unit 110 of the computing device 19 notifies that the registering of the phone number of the mobile device 13 with respect to the email address is completed.

Various methods of registering the image forming apparatus 31 to print a received content, the methods performed by the mobile device 13 of the second individual 23, i.e., Jane Kim, corresponding to a receiver terminal of the image forming system 1 have been described with reference to FIGS. 6A through 10B. In addition, various methods for registering an email address to receive a content have been described as additional methods. The processes of FIGS. 6A through 10B may be used to assign the image forming apparatus 31 to print a content when the content is transmitted from the mobile device 11 of the first individual 21, i.e., John Lee. Accordingly, the processes of FIGS. 6A through 10B may be performed before the content is transmitted from the mobile device 11 of the first individual 21, or alternatively, may be performed after the content is transmitted.

Various methods of transmitting (delivering) a content to be printed from the image forming system 1 to the cloud server 40, the methods performed by the first individual 21, i.e., John Lee, who is a sender, will now be described with reference to FIGS. 11A through 14. In other words, descriptions of FIGS. 11A through 14 may correspond to partial processes before a content transmitted from a sender (first individual 21, John Lee) reaches a recipient (the second individual 23, i.e., Jane Kim).

FIGS. 11A through 14 are described mainly based on the first individual 21, i.e., John Lee, who is a sender, but the details of FIGS. 11A through 14 may also be applied even when any one of the second through fourth individuals 23 through 27 is a sender.

Figure 11A:
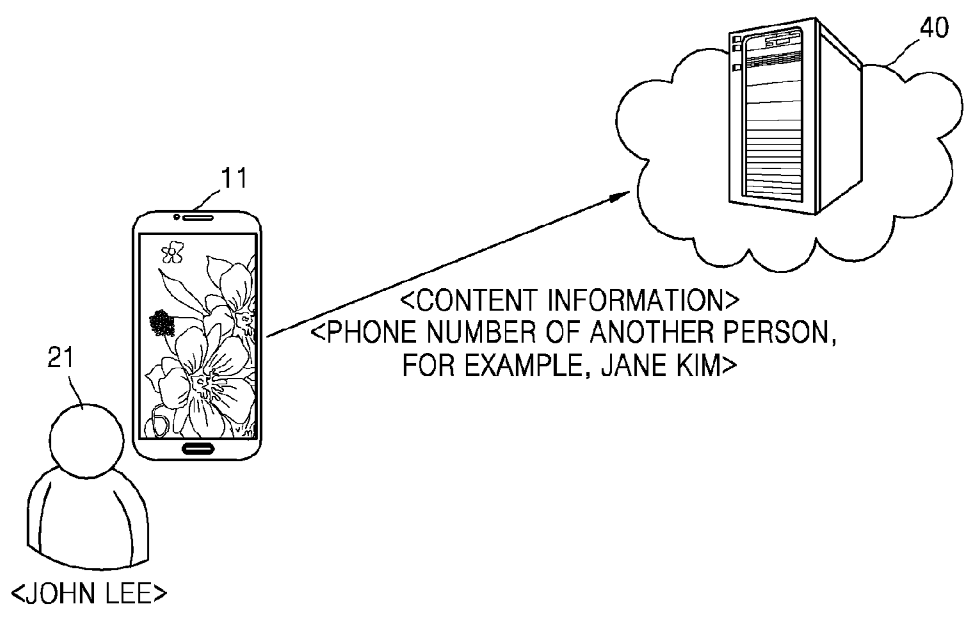
FIGS. 11A and 11B are diagrams for describing processes of transmitting a content to be printed based on a phone number from a mobile device of a first individual to the cloud server, according to an embodiment.
Figure 11B:
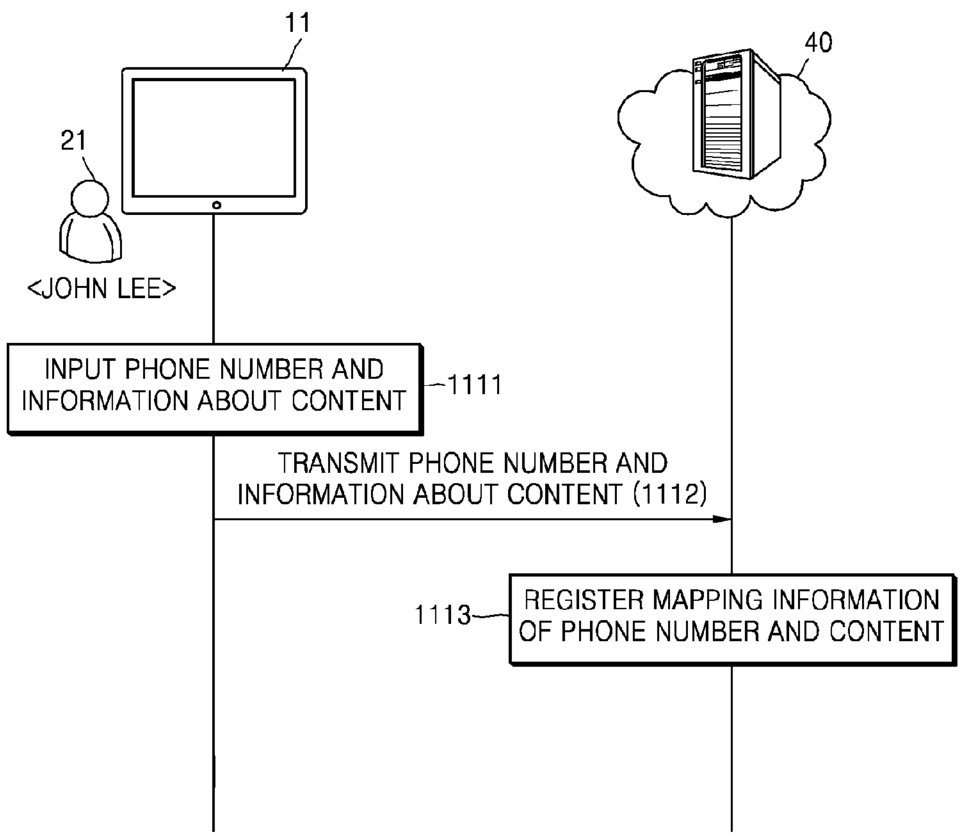

FIGS. 11A and 11B are diagrams for describing processes of transmitting a content to be printed based on a phone number from the mobile device 11 of the first individual 21 to the cloud server 40, according to an embodiment.

Referring to FIGS. 11A and 11B, the first individual 21, i.e., John Lee, inputs information about a content to be printed and information about the phone number of the mobile device 13 of the second individual 23, i.e., Jane Kim, which is a destination for receiving the content to be printed, through the UI unit 110 of the mobile device 11, in operation 1111.

The information about the content to be printed includes selection information about on a content to be transmitted to the second individual 23 and to be printed from among contents being used by the mobile device 11. Also, the information about the content to be printed may include information about print options of the content, which are pre-set by the first individual 21 in the mobile device 11, for example, general settings, such as a paper size and a color/white-and-black option.

In operation 1112, the network interface unit 130 of the mobile device 11 transmits the information about the content and the information about the phone number to the cloud server 40. In other words, the mobile device 11 transmits print job information including the information about the content and the information about the phone number to the cloud server 40.

In operation 1113, the controller 410 of the cloud server 40 maps and stores the information about the content and the information about the phone number in the storage unit 420.

Figure 11C:
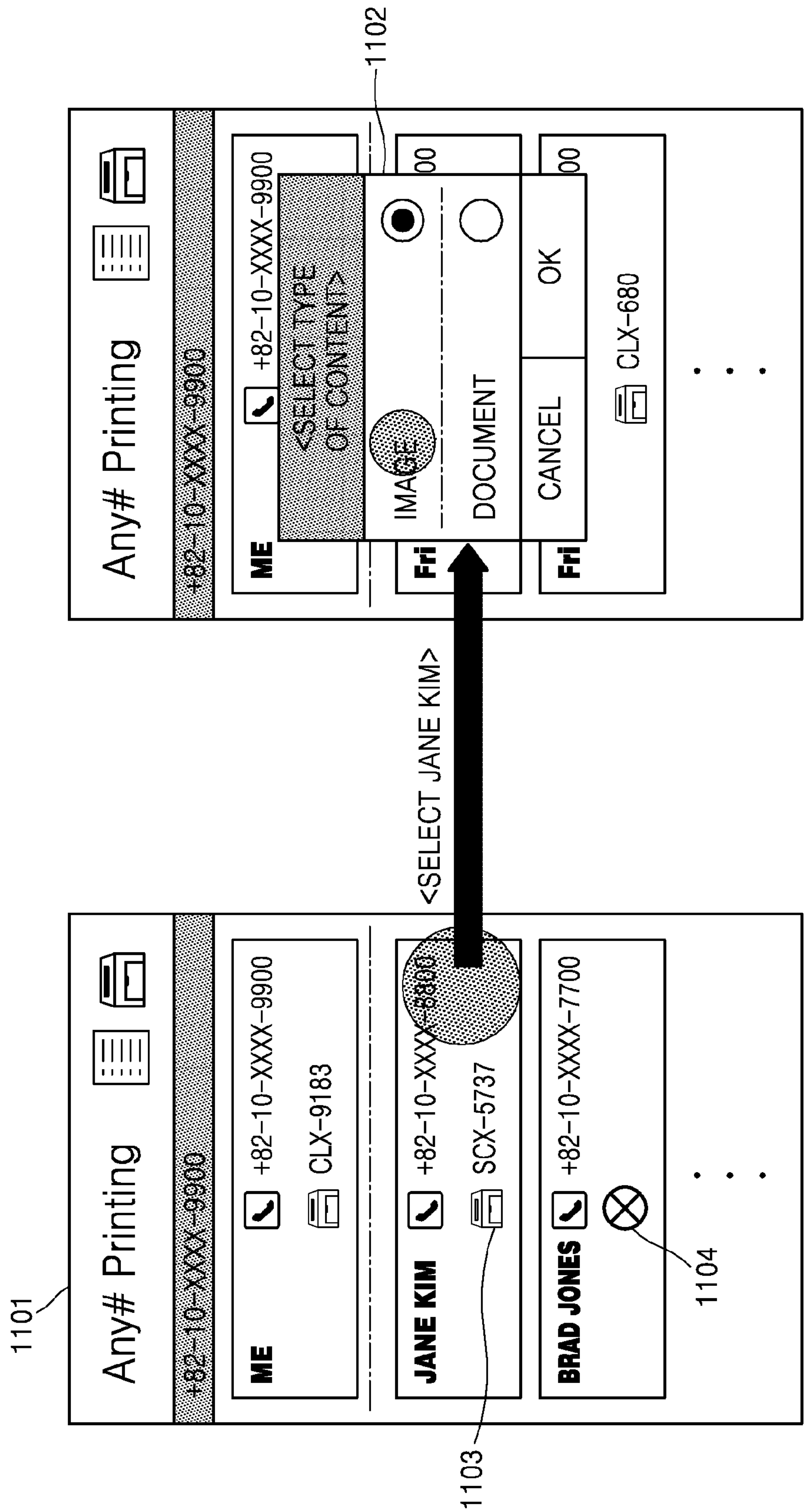
FIGS. 11C and 11D illustrate UI screens of the mobile device of the second individual for transmitting the content to be printed based on the phone number from the mobile device of the first individual to the cloud server, according to an embodiment.
Figure 11D:
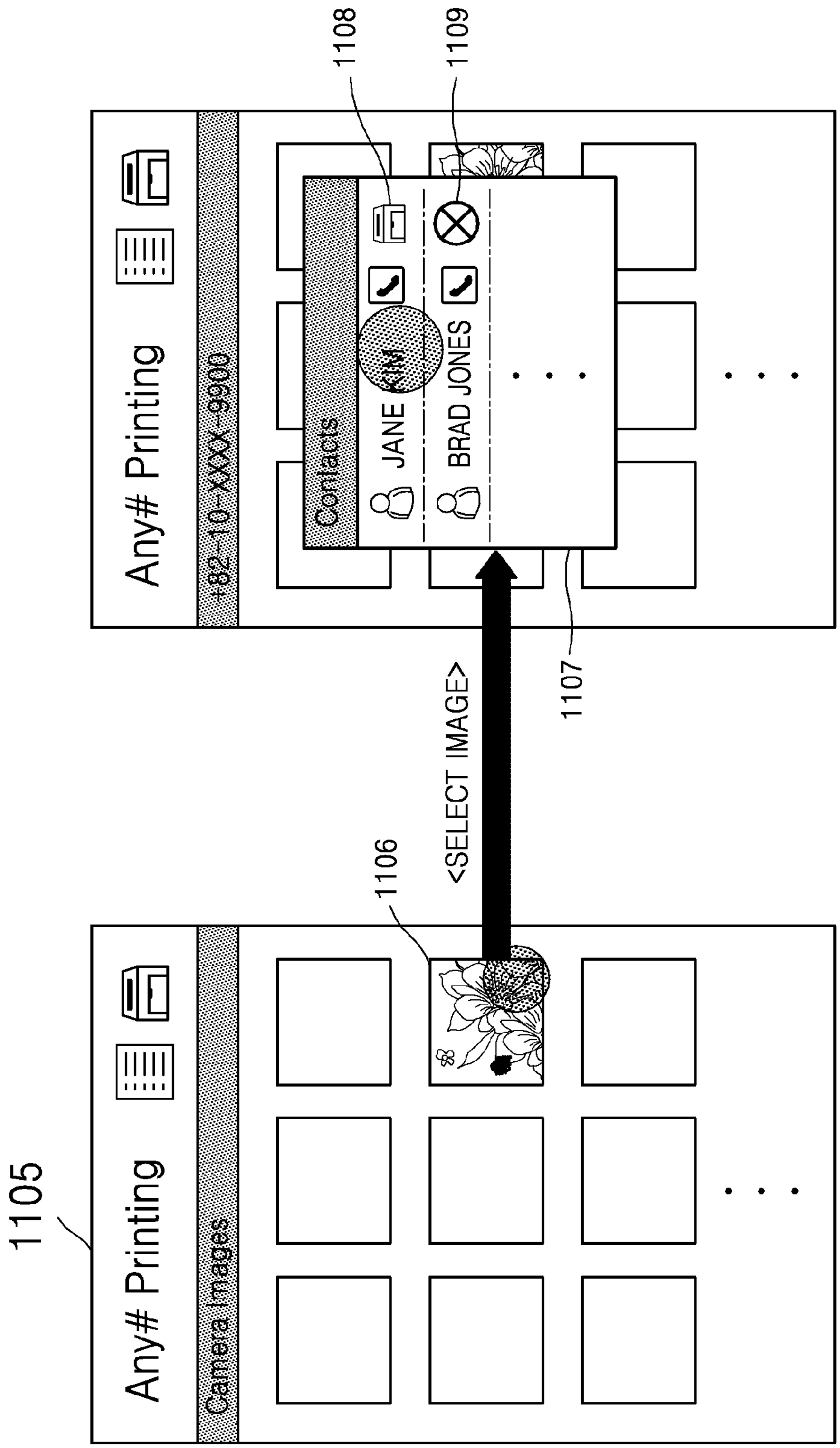

FIGS. 11C and 11D illustrate UI screens of the mobile device 13 of the second individual 23 for transmitting the content to be printed based on the phone number from the mobile device 11 of the first individual 21 to the cloud server 40, according to an embodiment.

First, referring to FIG. 11C, a contact list of names and phone numbers may be displayed on a contacts screen 1101 of the mobile device 11.

When the first individual 21, i.e., John Lee, wants to transmit a content to be printed to the second individual 23, i.e., Jane Kim, the first individual 21 selects the second individual 23 from the contact list. At this time, if contact information of the second individual 23 is not in the contact list, the first individual 21 may directly input and select the phone number of the second individual 23.

When the second individual 23 is selected, a content type screen 1102 for selecting a type of the content to be printed is displayed as a pop-up screen.

The first individual 21 selects an image entry when the content in an image type is to be transmitted.

As such, when information about the phone number of the second individual 23 and about the content to be printed is input through the contacts screen 1101 and the content type screen 1102, the mobile device 11 transmits the information about the phone number and about the content to the cloud server 40 as described above.

Then, referring to FIG. 11D, a list of images stored in the mobile device 11 may be displayed on a camera image screen 1105 of the mobile device 11.

When at least one image, for example, a flower image 1106, corresponds the content to be printed from the list of images, the first individual 21 selects the flower image 1106.

When the flower image 1106 is selected a contacts screen 1107 is displayed as a pop-up screen.

When the flower image 1106 is to be transmitted to the second individual 23, the first individual 21 selects the second individual 23 from the contacts screen 1107.

As such, when the information about the phone number of the second individual 23 and about the content to be printed (the flower image 1106) is input through the camera image screen 1105 and the contacts screen 1107, the mobile device 11 transmits the information about the phone number and the content to the cloud server 40 as described above.

Referring to FIGS. 11C and 11D, icons 1103, 1104, 1108, and 1109 indicating whether the image forming apparatus 31 is registered to each of the phone numbers of the second and third individuals 23 and 25, i.e., Jane Kim and Brad Jones, may be displayed on the contacts screens 1101 and 1107.

Information indicated by the icons 1103, 1104, 1108, and 1109 is based on mapping information transmitted from the cloud server 40. In other words, before the displaying of the contacts screens 1101 and 1107 is activated in the mobile device 11, the mobile device 11 pre-receives the mapping information of each of the phone numbers of the second and third individuals 23 and 25 from the cloud server 40. Accordingly, when the contacts screens 1101 and 1107 are displayed in the mobile device 11, the existence of the image forming apparatus 31 pre-registered to the second and third individuals 23 and 25 may also be displayed by using the icons 1103, 1104, 1108, and 1109.

According to FIG. 11C, the contacts screen 1101 is displayed first, and then the content type screen 1102 is displayed. In other words, according to FIG. 11C, the phone number is selected first and then the content is selected. However, according to FIG. 11D, the camera image screen 1105 is displayed first and then the contacts screen 1107 is displayed. In other words, according to FIG. 11D, the content is selected first and then the phone number is selected.

A difference between FIGS. 11C and 11D is an order of selecting the phone number and the content. Thus, according to an embodiment, it does not matter which one of the phone number and the content is selected first as shown in FIGS. 11C and 11D.

Configurations of the UI screens of FIGS. 11C and 11D are arbitrarily illustrated for convenience of description, and thus an embodiment is not limited to the configurations of the UI screens.

Figure 12A:
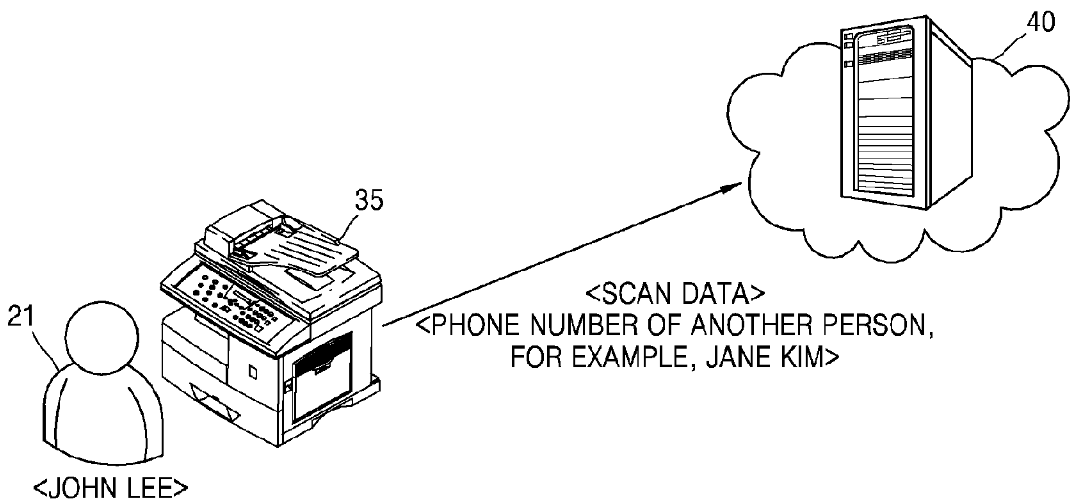
FIGS. 12A and 12B are diagrams for describing processes of transmitting a content to be printed based on a phone number from an image forming apparatus to the cloud server, according to an embodiment.
Figure 12B:
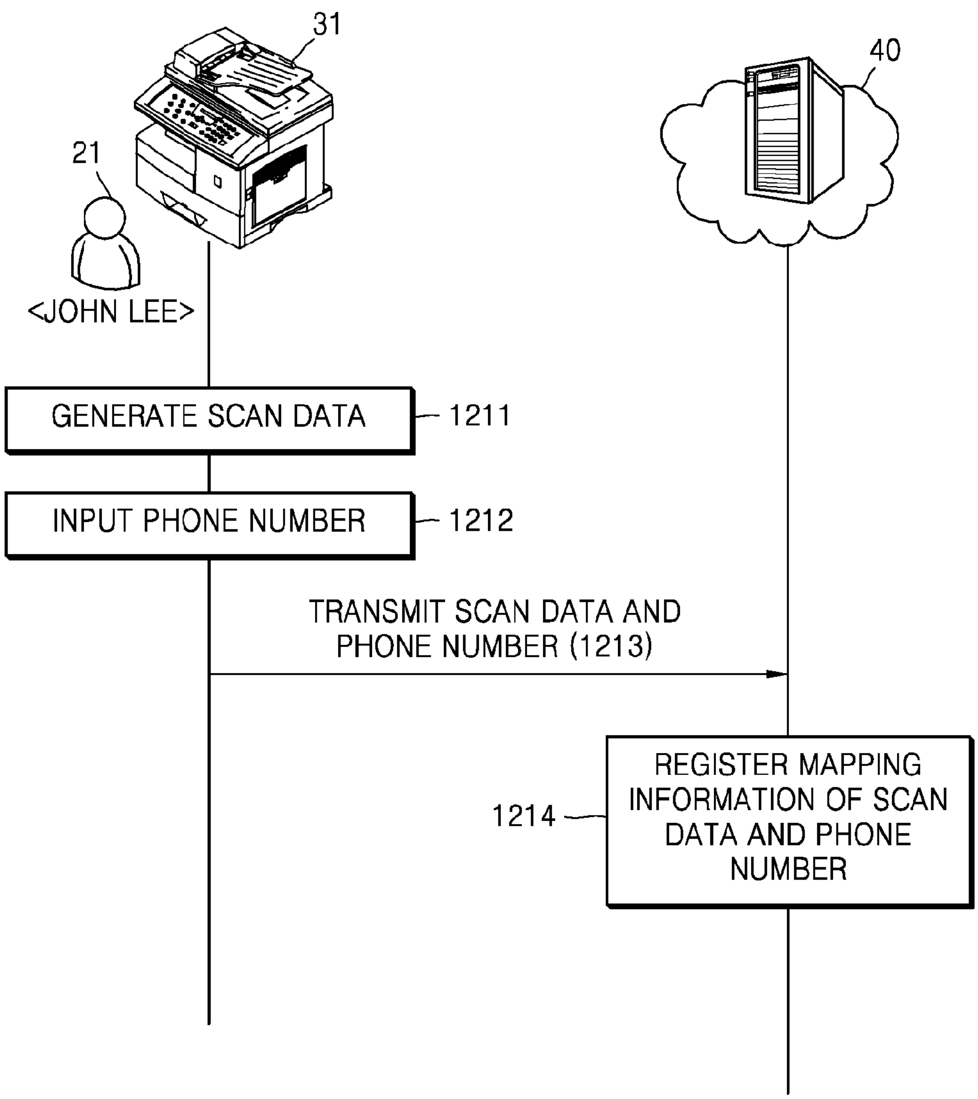

FIGS. 12A and 12B are diagrams for describing processes of transmitting a content to be printed based on the phone number from an image forming apparatus 35 to the cloud server 40, according to an embodiment.

Referring to FIGS. 12A and 12B, the image forming unit (image forming apparatus) 340 of the image forming apparatus 35 generates scan data by scanning a document, in operation 1211. The image forming apparatus 35 may be the image forming apparatus 30 of FIG. 5. Thus, the image forming apparatus 35 includes the UI unit 310, the controller 320, the network interface unit 330, and the image forming unit 340.

In operation 1212, the first individual 21, i.e., John Lee, inputs information about the phone number of the mobile device 13 of the second individual 23, i.e., Jane Kim, which is a destination for receiving the scan data to be printed, through the UI unit 310 of the image forming apparatus 35.

A printing application having the similar functions as that of the mobile device 11 of the first individual 21 described above may be pre-installed in the image forming apparatus 35. Alternatively, even when a printing application is not pre-installed in the image forming apparatus 35, the first individual 21 may newly install a printing application on the OS of the image forming apparatus 35.

Accordingly, the first individual 21 may input the information about the phone number of the mobile device 13 of the second individual 23, which is the destination for receiving the scan data to be printed, on the printing application displayed through the UI unit 310 of the image forming apparatus 35.

In other words, operation 1212 may be performed as the information about the phone number of the mobile device 13 of the second individual 23 is input through the UI unit 310 of the image forming apparatus 35 by the first individual 21 while the printing application is being executed by the controller 320 of the image forming apparatus 35.

In operation 1213, the network interface unit 330 of the image forming apparatus 35 transmits the information about the phone number and the scan data to the cloud server 40.

In operation 1214, the controller 410 of the cloud server 40 maps the information about the phone number and the scan data and stores such mapping information in the storage unit 420.

Referring to FIGS. 12A and 12B, the first individual 21 may transmit (deliver) the content (scan data) to be printed to the second individual 23 without having to use the mobile device 11, unlike FIGS. 11A and 11B.

Figure 12C:
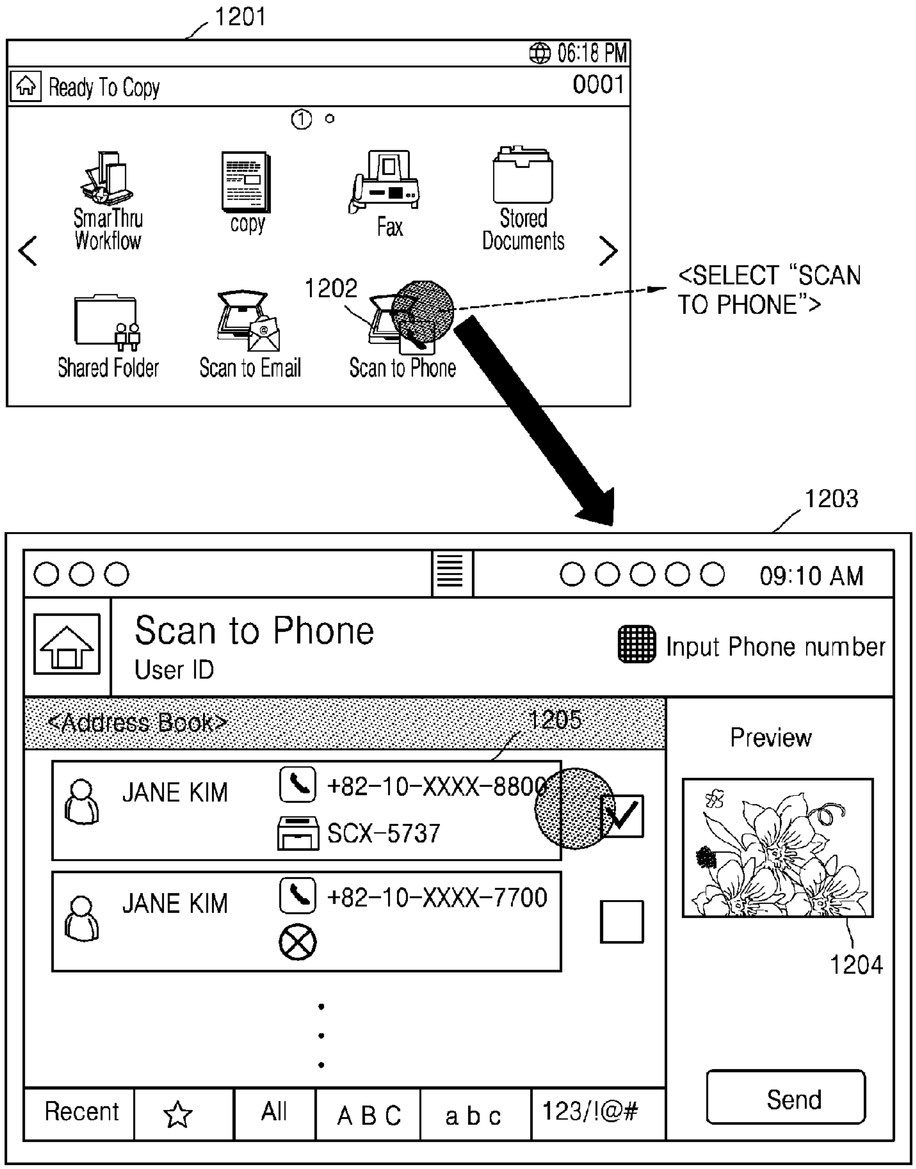
FIG. 12C illustrates UI screens of the image forming apparatus for transmitting the content to be printed based on the phone number from the image forming apparatus to the cloud server, according to an embodiment.

FIG. 12C illustrates first and second UI screens 1201 and 1203 of the image forming apparatus 35 for transmitting the content to be printed based on the phone number from the image forming apparatus 35 to the cloud server 40, according to an embodiment.

Referring to FIG. 12C, the first and second UI screens 1201 and 1203 may be screens provided by the printing application executed in the image forming apparatus 35.

The first individual 21, i.e., John Lee, may identify a list of image forming functions executable in the printing application through the first UI screen 1201 of the printing application displayed on the UI unit 310 of the image forming apparatus 35.

As described above with reference to FIGS. 12A and 12B, when the first individual 21 wants to transmit the scan data of the document to a phone number 1205 of the mobile device 13 of the second individual 23, the first individual 21 performs a "Scan to Phone" function by clicking a "Scan to Phone" icon 1202.

The second UI screen 1203 is a UI screen when the "Scan to Phone" function is performed. A preview 1204 of the scan data may be displayed on the second UI screen 1203, and an address book stored in the image forming apparatus 35 may be displayed on the second UI screen 1203.

The first individual 21 may click the phone number 1205 of the mobile device 13 that is a destination for receiving the scan data from a list displayed in the address book to determine the destination (the phone number 1205) through the "Scan to Phone" function.

However, when the phone number 1205 of the mobile device 13 is not in the address book of the second UI screen 1203, the first individual 21 may newly input the phone number 1205 of the mobile device 13 through the UI unit 310 of the image forming apparatus 35.

Configurations of the first and second UI screens 1201 and 1203 of FIG. 12C are illustrated for convenience of description, and an embodiment is not limited by the configurations of the first and second UI screens 1201 and 1203 of FIG. 12C. Also, a name of the "Scan to Phone" function may be changed as long as the "Scan to Phone" function is a function for providing a phone number-based cloud printing service.

Figure 13A:
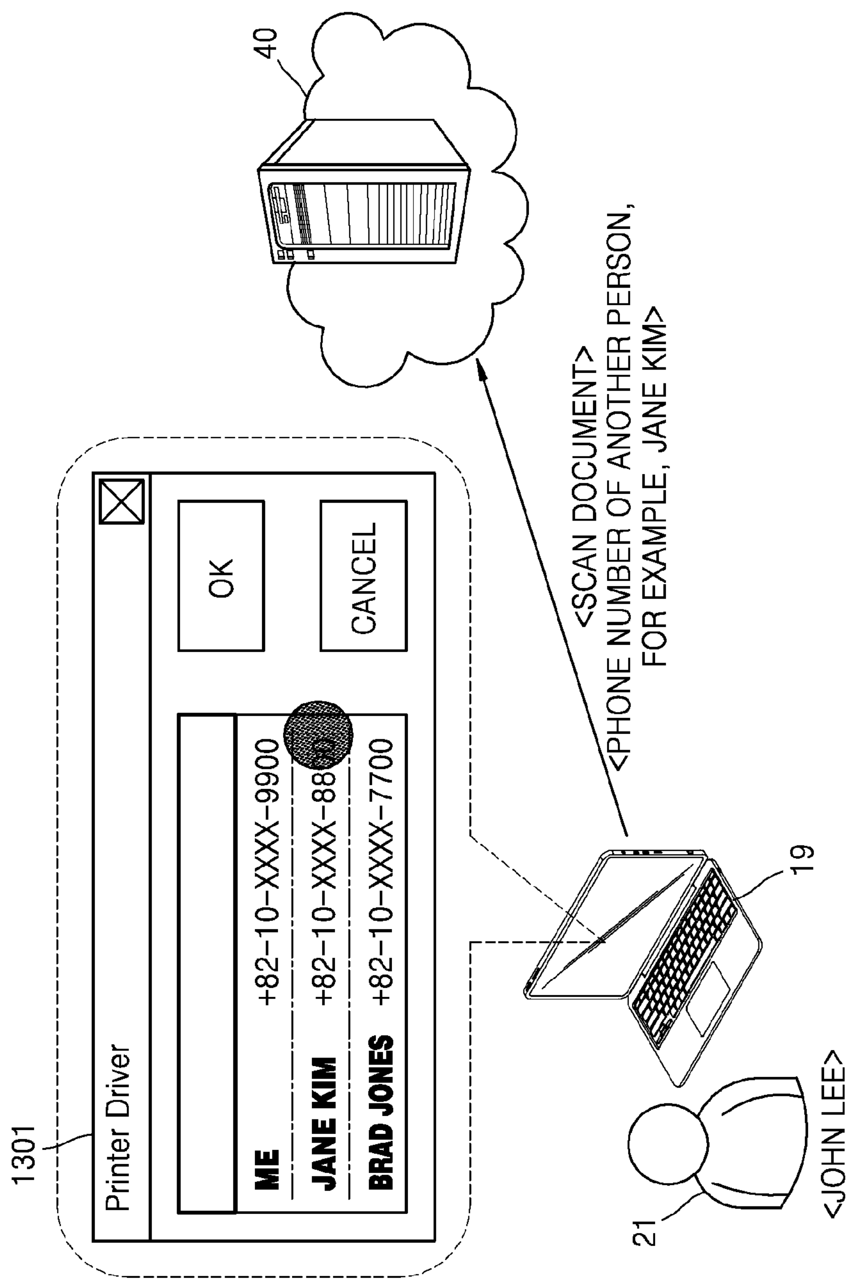
FIGS. 13A and 13B are diagrams for describing processes of transmitting a content to be printed based on a phone number from a computing device of the first individual to the cloud server, according to an embodiment.
Figure 13B:
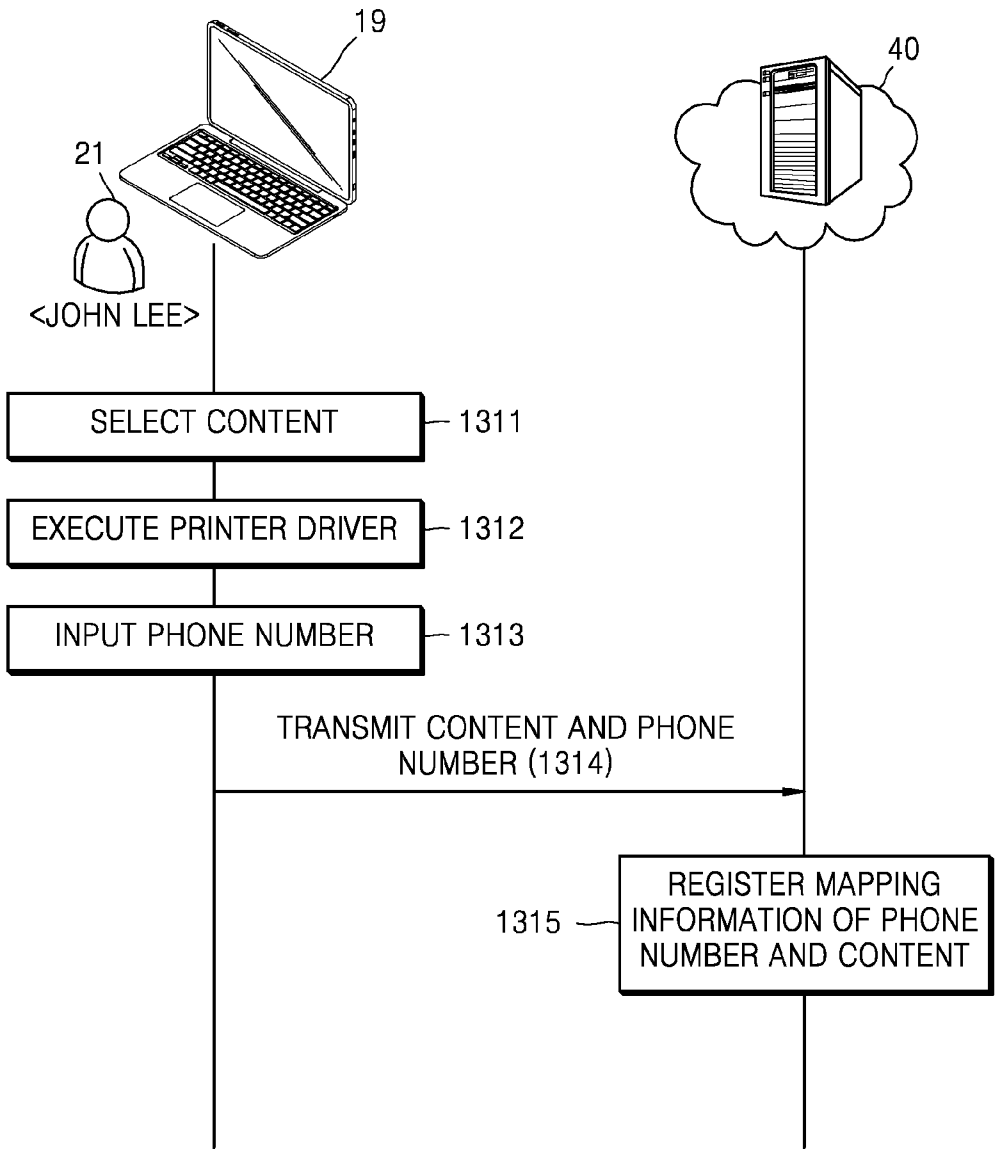

FIGS. 13A and 13B are diagrams for describing processes of transmitting a content to be printed based on a phone number from the computing device 19 of the first individual 21 to the cloud server 40, according to an embodiment.

Referring to FIGS. 13A and 13B, in operation 1311, the first individual 21, i.e., John Lee, selects a content to be printed through the UI unit 110 of the computing device 19. The computing device 19 corresponds to a PC or a laptop, and may be the user device 10 of FIG. 3. Thus, the computing device 19 includes the UI unit 110, the controller 120, and the network interface unit 130.

In operation 1312, the controller 120 of the computing device 19 executes a printer driver 1301 for providing a phone number-based cloud printing service. The printer driver 1301 executed by the computing device 19 may be a virtual driver, but is not limited thereto.

The printer driver 1301 does not select a printer as a destination for printing a content like a general printer driver. The printer driver 1301 displays s list of phone numbers as destinations, so as to provide a phone number-based cloud printing service.

For example, when a content to be printed is selected and the printer driver 1301 is executed, the printer driver 1301 displays "ME: +82-10-XXXX-9900" (the first individual 21), "JANE KIM: +82-10-XXXX-8800" (the second individual 23), and "BRAD JONES: +82-10-XXXX-7700" (the third individual 25) in the list of phone numbers.

Only the list of phone numbers is displayed in the printer driver 1301 of FIG. 13A, but alternatively, the printer driver 1301 may also include functions for setting general print options on the content to be printed.

In operation 1313, the first individual 21 selects the phone number ("+82-10-XXXX-8800") of the mobile device 13 of the second individual 23 to which the content is to be transmitted, through the UI unit 110 of the computing device 19. If the phone number of the mobile device 13 is not in the list of phone numbers in the printer driver 1301, the first individual 21 may directly input the phone number of the mobile device 13.

In operation 1314, the network interface unit 130 of the computing device 19 transmits information about the input phone number and about the selected content to the cloud server 40.

In operation 1315, the controller 410 of the cloud server 40 maps the information about the input phone number and the information about the selected content, and stores such mapping information in the storage unit 420.

Referring to FIGS. 13A and 13B, the first individual 21 may transmit (deliver) the content (scan data) to be printed to the second individual 23 without having to use the first device 11, unlike FIGS. 11A and 11B.

Figure 14:
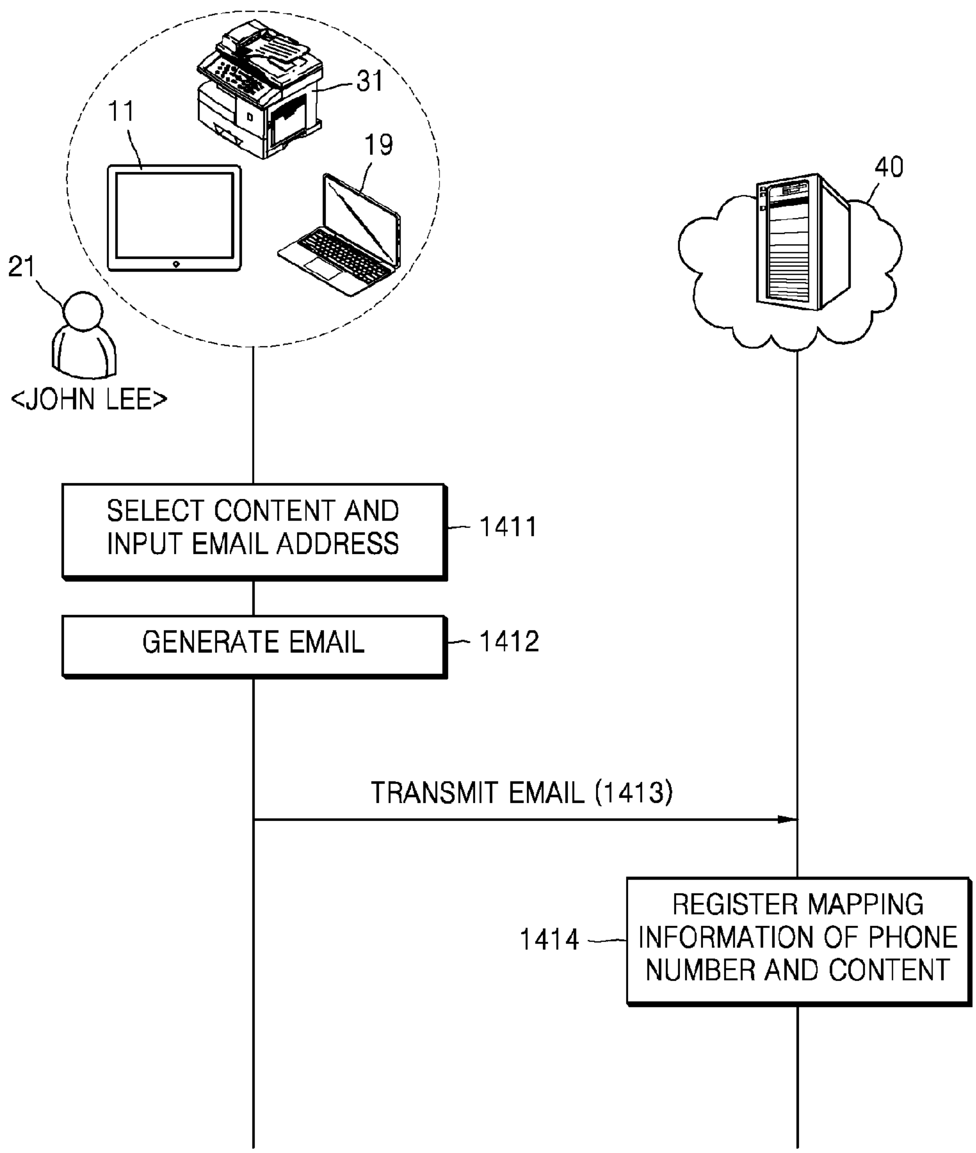
FIG. 14 is a diagram for describing processes of transmitting a content to be printed based on a phone number to the cloud server by using an email address of the second individual, according to an embodiment.

FIG. 14 is a diagram for describing processes of transmitting a content to be printed based on a phone number to the cloud server 40 by using an email address of the second individual 23, according to an embodiment.

The processes of FIG. 14 may be performed by the user device 10 or the image forming apparatus 30. The user device 10 may correspond to the mobile device 11, 13, 15, or 17 of FIG. 2 or the computing device 19 described above, and the image forming apparatus 30 may correspond to the image forming apparatus 31, 33, or 35 of FIG. 2.

In operation 1411, the first individual 21, i.e., John Lee selects a content to be printed through the UI unit 110 of the user device 10 or the UI unit 310 of the image forming apparatus 30, and inputs an email address of the second individual 23, i.e., Jane Kim. An order of selecting the content and inputting the email address may be switched.

In operation 1412, the controller 120 of the user device 10 or the controller 320 of the image forming apparatus 30 generates an email enclosed with the content.

In operation 1413, the network interface unit 130 of the user device 10 or the network interface unit 330 of the image forming apparatus 30 transmits the generated email to the cloud server 40 under the email address of the second individual 23.

The cloud server 40 may pre-store mapping information of the email address of the second individual 23 and the phone number of the mobile device 13 of the second individual 23 via the processes described above with reference to FIGS. 9A through 10B.

In operation 1414, the controller 410 of the cloud server 40 maps information about a phone number pre-mapped to an email address and information about the content enclosed in the email again, and stores such mapping information in the storage unit 420.

Various methods of transmitting (delivering) a content to be printed to the cloud server 40, the methods performed by the first individual 21, i.e., John Lee, who is a sender in the image forming system 1, have been described above with reference to FIGS. 11A through 14.

Various methods of receiving a content to be printed from the cloud 40 and printing the content, the methods performed by the second individual 23, i.e., Jane Kim, who is a recipient in the image forming system 1, will now be described with reference to FIGS. 15A through 19. In other words, descriptions of FIGS. 15A through 19 may correspond to partial processes before a content transmitted from a sender (first individual 21, i.e., John Lee) reaches a recipient (the second individual 23, i.e., Jane Kim). In other words, processes of FIGS. 15A through 19 may be performed after the processes of FIGS. 11A through 14.

FIGS. 15A through 19 will be described mainly based on the second individual 23, i.e., Jane Kim, who is a recipient, but descriptions of FIGS. 15A through 19 may also be applied even when the first, third, or fourth individual 21, 25, or 27 is a recipient.

Figure 15A:
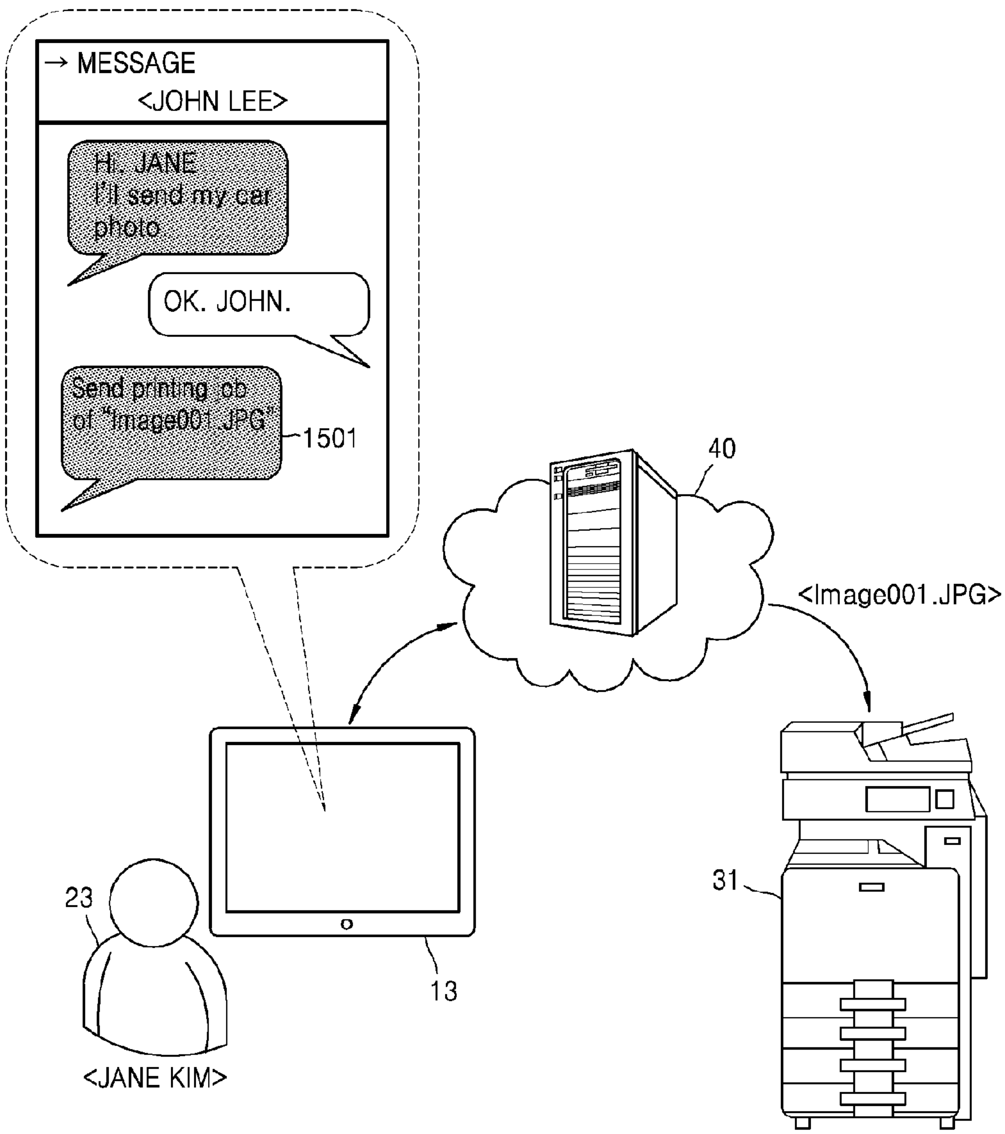
FIGS. 15A and 15B are diagrams for describing processes of the second individual printing a content received from the first individual through the image forming apparatus based on a phone number, according to an embodiment.
Figure 15B:
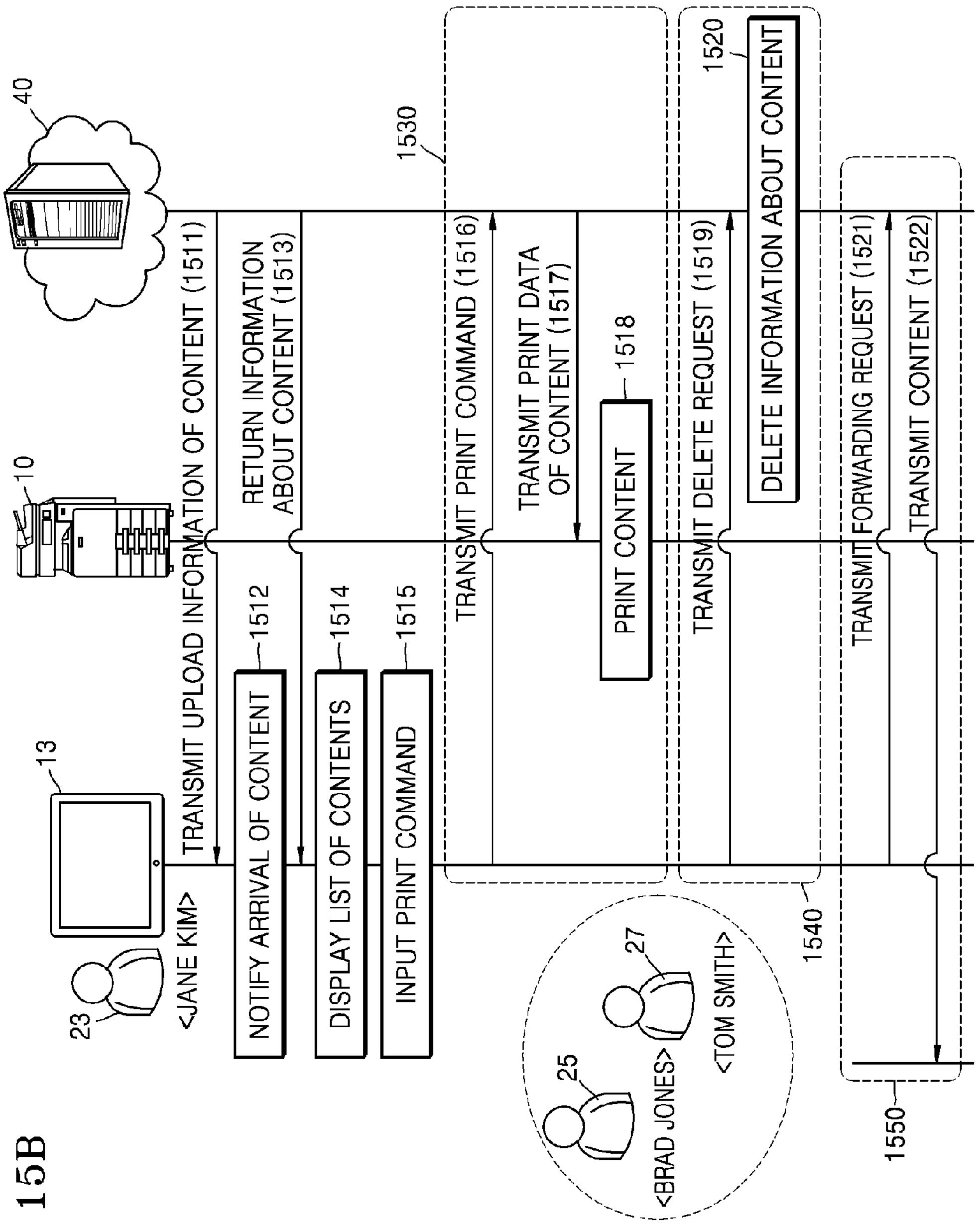

FIGS. 15A and 15B are diagrams for describing processes of the second individual 23 printing a content received from the first individual 21 through the image forming apparatus 31 based on a phone number, according to an embodiment.

Referring to FIGS. 15A and 15B, the network interface unit 130 of the mobile device 13 receives upload information of a content to be printed from the cloud server 40, in operation 1511. The content to be printed corresponds to a content uploaded by the first individual 21, i.e., John Lee, based on the phone number of the mobile device 13 of the second individual 23, i.e., Jane Kim.

The cloud server 40 may transmit the upload information by using an SMS or MMS, or via a wireless network, such as Internet.

In operation 1512, the UI unit 110 of the mobile device 13 notifies an arrival of the content to the phone number of the mobile device 13 of the second individual 23.

When the upload information of the content, for example, "Image001.JPG", is transmitted through a message, the UI unit 110 of the mobile device 13 may display an arrival message 1501, but is not limited thereto. In other words, the UI unit 110 of the mobile device 13 may notify the arrival to the second individual 23 via any one of various methods.

In operation 1513, when the second individual 23 requests to check the content ("Image001.JPG"), the cloud server 40 returns information about the content ("Image001.JPG") to the mobile device 13 of the second individual 23.

In operation 1514, the controller 120 of the mobile device 13 executes a printing application, and the UI unit 110 of the mobile device 13 displays a list of contents transmitted to the second individual 23, on the printing application. The list of contents includes the content ("Image001.JPG") transmitted from the first individual 21.

When the second individual 23 selects the content ("Image001.JPG") in operation 1514, the UI unit 110 of the mobile device 13 displays a preview of the content ("Image001.JPG") on the printing application. The second individual 23 may additionally set print options of the content ("Image001.JPG") through the printing application.

In operation 1515, the second individual 23 inputs a print command for printing the content ("Image001.JPG") in the image forming apparatus 31 that is pre-mapped, through the UI unit 110 of the mobile device 13.

In operation 1516, the network interface unit 130 of the mobile device 13 transmits the input print command to the cloud server 40.

In operation 1517, the network interface unit 430 of the cloud server 40 transmits print data of the content ("Image001.JPG") to the image forming apparatus 31.

In operation 1518, the image forming unit 340 of the image forming apparatus 31 prints the content ("Image001.JPG").

Operations 1515 through 1518 may be performed when the second individual 23 requests to print the content ("Image001.JPG") in operation 1530. However, the second individual 23 may deny to print the content ("Image001.JPG") in operation 1540.

When the second individual 23 requests to delete the content ("Image001.JPG") from the list of contents, the network interface unit 130 of the mobile device 130 may transmit a delete request of the content ("Image001.JPG") to the cloud server 40 in operation 1519.

In operation 1520, the controller 410 of the cloud server 40 deletes information about the content ("Image001.JPG") stored in the storage unit 420.

On the other hand, the second individual 23 may input a forwarding request 1550 for transmitting the content ("Image001.JPG") to the third or fourth individual 25 or 27.

When the second individual 23 input the forwarding request 1550, the network interface unit 130 of the mobile device 13 transmits the forwarding request 1550 to the cloud server 40 in operation 1521. The second individual 23 may command the forwarding request 1550 by inputting the phone number of the mobile device 15 or 17 of the third or fourth individual 25 or 27 through the UI unit 110 of the mobile device 13.

In operation 1522, the cloud server 40 forwards the content ("Image001.JPG") to the third or fourth individual 25 or 27 requested by the second individual 23.

Figure 16A:
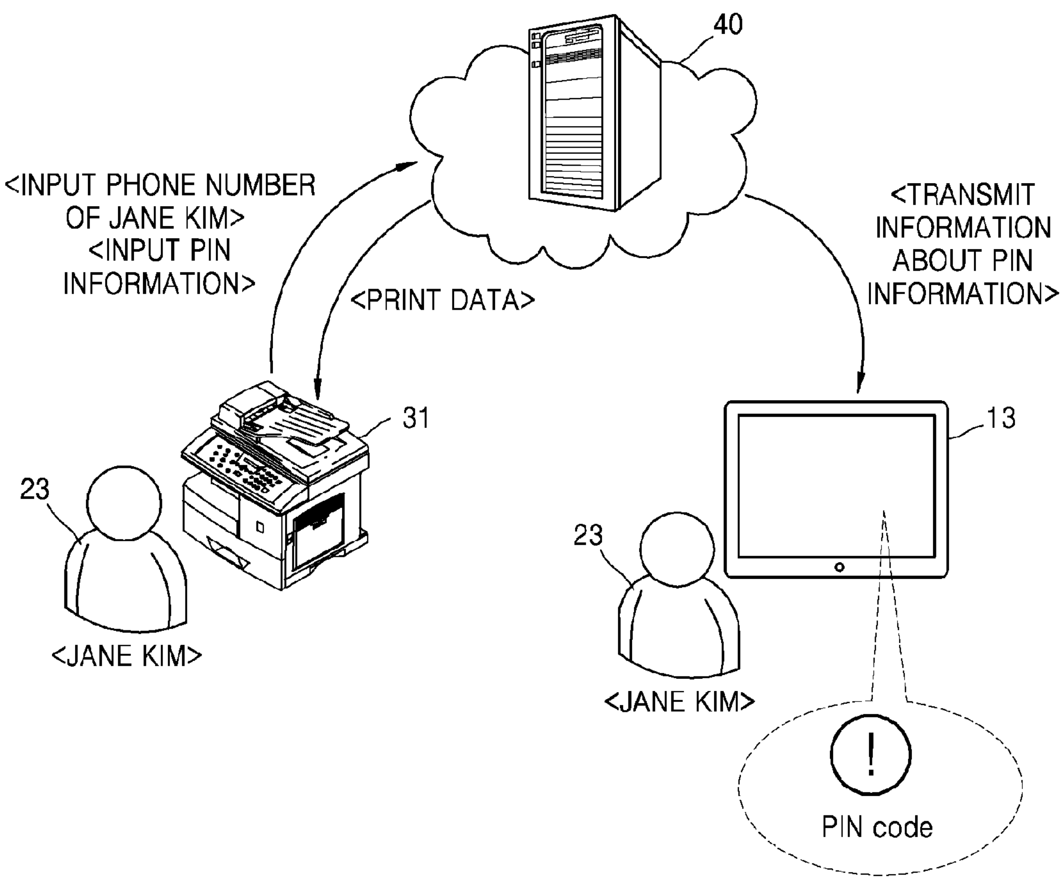
FIGS. 16A and 16B are diagrams for describing processes of the second individual printing a content received from the first individual through the image forming apparatus based on a phone number, according to an embodiment.
Figure 16B:
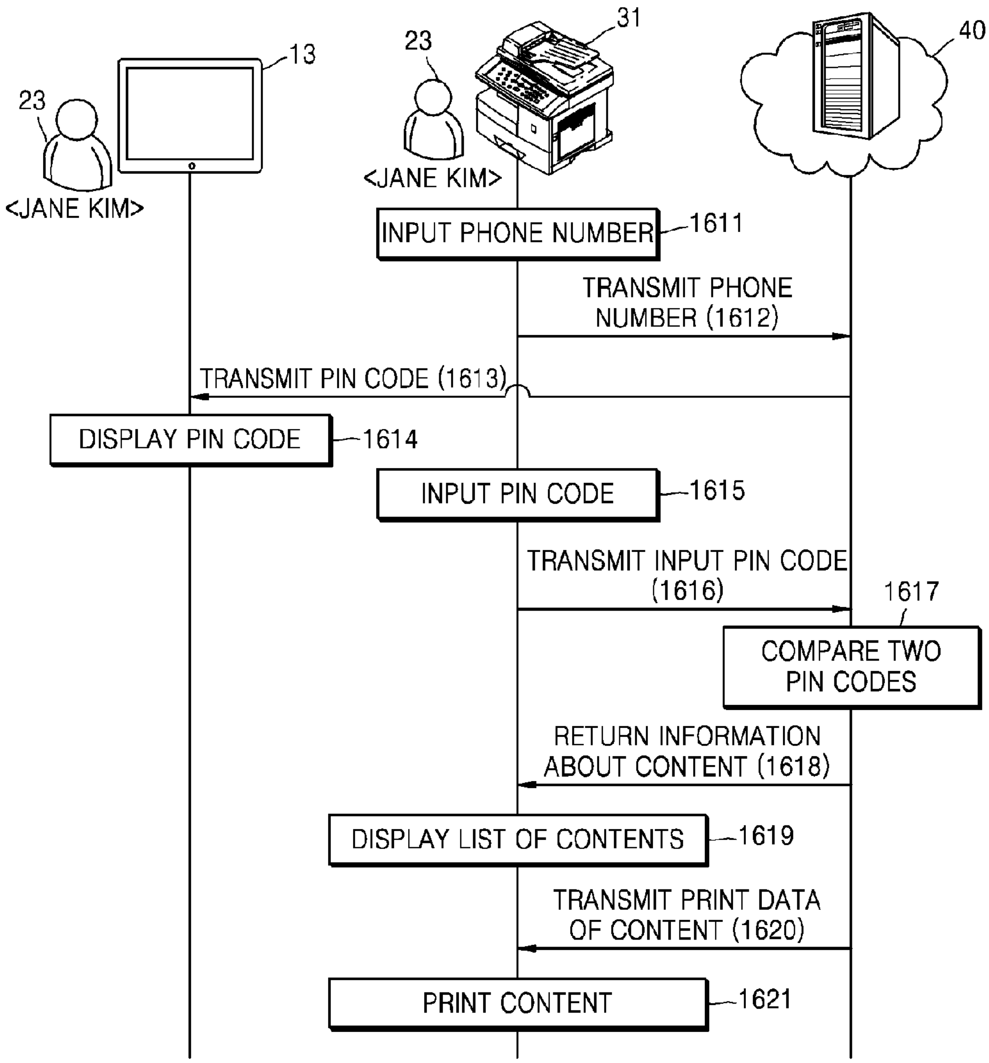

FIGS. 16A and 16B are diagrams for describing processes of the second individual 23 printing a content received from the first individual 21 through the image forming apparatus 31 based on a phone number, according to an embodiment.

Referring to FIGS. 16A and 16B, the second individual 23, i.e., Jane Kim, inputs the phone number of the mobile device 13 through the UI unit 310 of the image forming apparatus 31, in operation 1611.

In operation 1612, the network interface unit 330 of the image forming apparatus 31 is wirelessly connected to the network interface unit 430 of the cloud server 40 to transmit information about the input phone number to the cloud server 40.

In operation 1613, the network interface unit 430 of the cloud server 40 transmits an arbitrary PIN code to the mobile device 13 of the second individual 23 having the input phone number, by using an SMS or MMS. The cloud server 40 may transmit another type of an arbitrary code instead of the PIN code.

In operation 1614, the UI unit 110 of the mobile device 13 displays the PIN code received by using the SMS or MMS.

In operation 1615, the second individual 23 inputs the PIN code received from the mobile device 13 through the UI unit 310 of the image forming apparatus 31.

In operation 1616, the network interface unit 330 of the image forming apparatus 31 transmits information about the input PIN code to the cloud server 40.

In operation 1617, the controller 410 of the cloud server 40 compares the PIN code transmitted from the image forming apparatus 31 and the PIN code transmitted to the mobile device 13 to determine whether the two PIN codes are the same.

In operation 1618, if the two PIN codes are the same, the cloud server 40 returns information about a content mapped to the phone number of the mobile device 13 of the second individual 23 to the image forming apparatus 31.

If the two PIN codes are not the same, the controller 410 of the cloud server 40 denies return of the information about the content.

In operation 1619, the UI unit 310 of the image forming apparatus 31 displays a list of contents currently transmitted to the second individual 23.

In operation 1620, when the second individual 23 selects a content to be printed from the list of contents, the network interface unit 430 of the cloud server 40 transmits print data of the selected content to the image forming apparatus 31.

In operation 1621, the image forming unit 340 of the image forming apparatus 31 prints the content.

The second individual 23 printing the content through the image forming apparatus 31 has been described with reference to FIGS. 16A and 16B, but operations similar to at least one of operations 1514 through 1522 of FIG. 15B may be additionally performed between operations 1619 and 1621 performed by the image forming apparatus 31 and the cloud server 40. For example, the UI unit 310 of the image forming apparatus 31 may display the preview of the content to be printed, or the second individual 23 may receive the print options. Also, the second individual 23 may deny printing the content or perform pull printing. In other words, the processes of FIGS. 15A through 16B may be combined with each other.

Figure 17A:
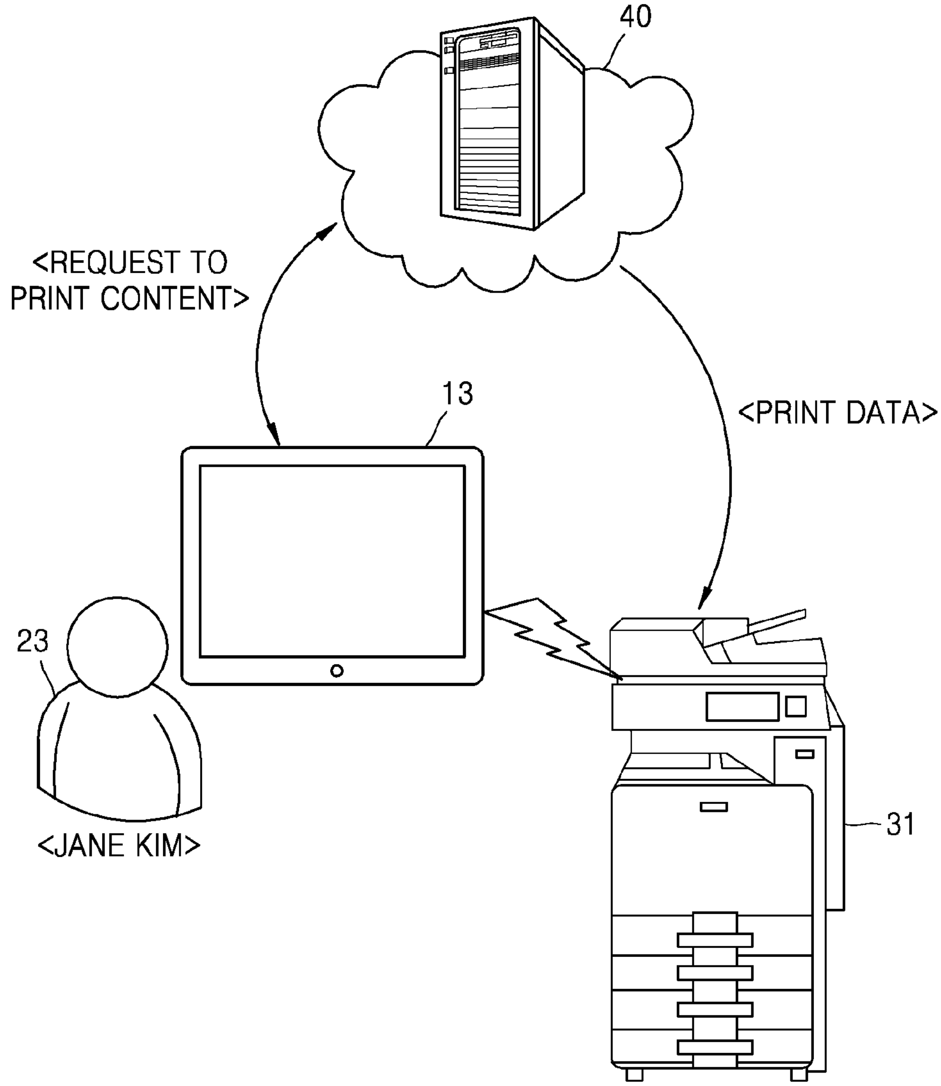
FIGS. 17A and 17B are diagrams for describing processes of the second individual printing a content received from the first individual through the image forming apparatus based on a phone number, according to an embodiment.
Figure 17B:
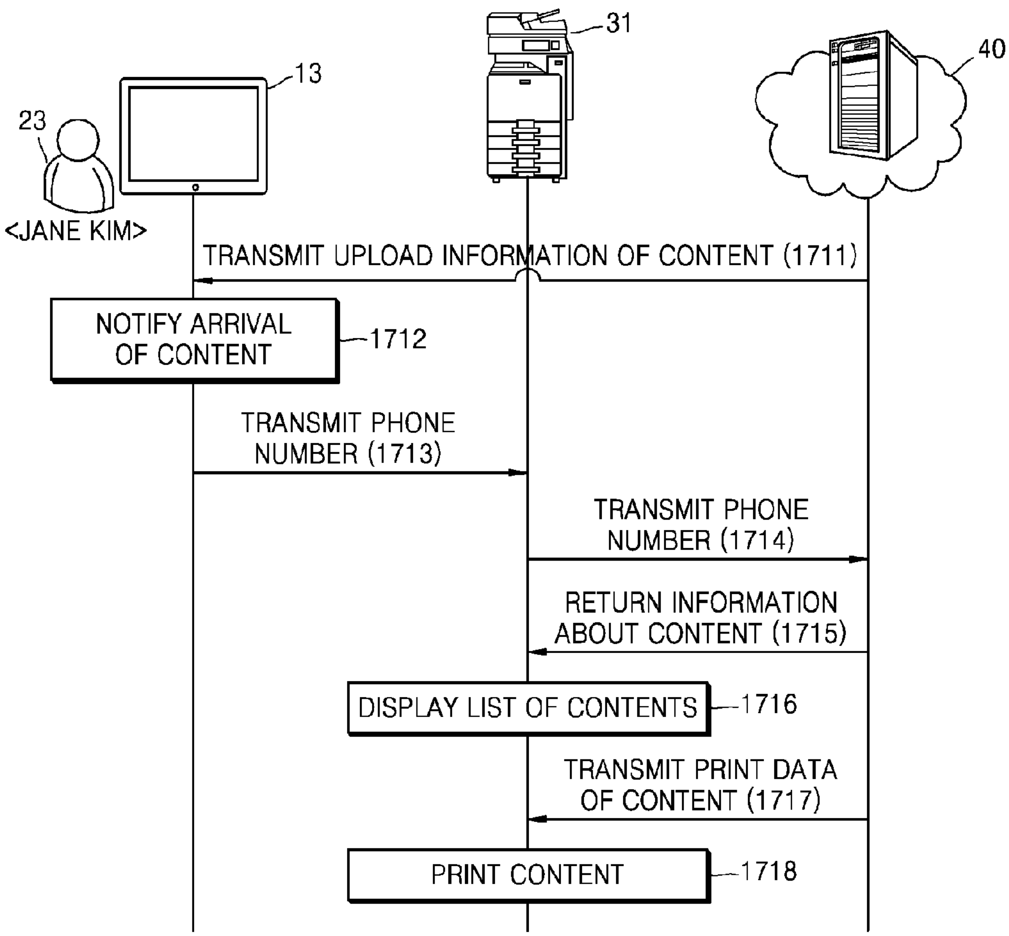

FIGS. 17A and 17B are diagrams for describing processes of the second individual 23 printing a content received from the first individual 21 through the image forming apparatus 31 based on a phone number, according to an embodiment.

Referring to FIGS. 17A and 17B, the cloud server 40 transmits upload information of a content to be printed to the mobile device 13 of the second individual 23, i.e., Jane Kim, in operation 1711.

In operation 1712, the UI unit 110 of the mobile device 13 notifies an arrival of the content to be printed to the phone number of the mobile device 13 of the second individual 23.

In operation 1713, the network interface unit 130 of the mobile device 13 is wirelessly connected to the network interface unit 330 of the image forming apparatus 31 to transmit information about the phone number of the mobile device 13 to the image forming apparatus 31.

The network interface unit 130 of the mobile device 13 may be connected to the network interface unit 330 of the image forming apparatus 31 through a wireless network, such as Wi-Fi®, Wi-Fi Direct®, an NFC, Zigbee®, infrared data association (IrDA), or Bluetooth®.

For example, operation 1713 may be performed by NFC-tagging the mobile device 13 to the image forming apparatus 31 by activating an NFC function.

In operation 1714, the network interface unit 330 of the image forming apparatus 31 is wirelessly connected to the network interface unit 430 of the cloud server 40 to transmit the information about the phone number obtained from the mobile device 13 to the cloud server 40.

In operation 1715, the network interface unit 430 of the cloud server 40 returns information about a content mapped to the phone number to the image forming apparatus 31.

In operation 1716, the UI unit 310 of the image forming apparatus 31 displays a list of contents currently transmitted to the second individual 23.

In operation 1717, when the second individual 23 selects a content to be printed from the list of contents, the network interface unit 430 of the cloud server 40 transmits print data of the selected content to the image forming apparatus 31.

In operation 1718, the image forming unit 340 of the image forming apparatus 31 prints the content.

Operations similar to at least one of operations 1514 through 1522 of FIG. 15B may be additionally performed between operations 1716 through 1718 of FIG. 17B. For example, the UI unit 310 of the image forming apparatus 31 may display the preview of the content to be printed or the second individual 23 may receive the print options. Also, the second individual 23 may deny printing the content or perform pull printing. In other words, the processes of FIGS. 15A through 17B may be combined with each other.

Figure 18A:
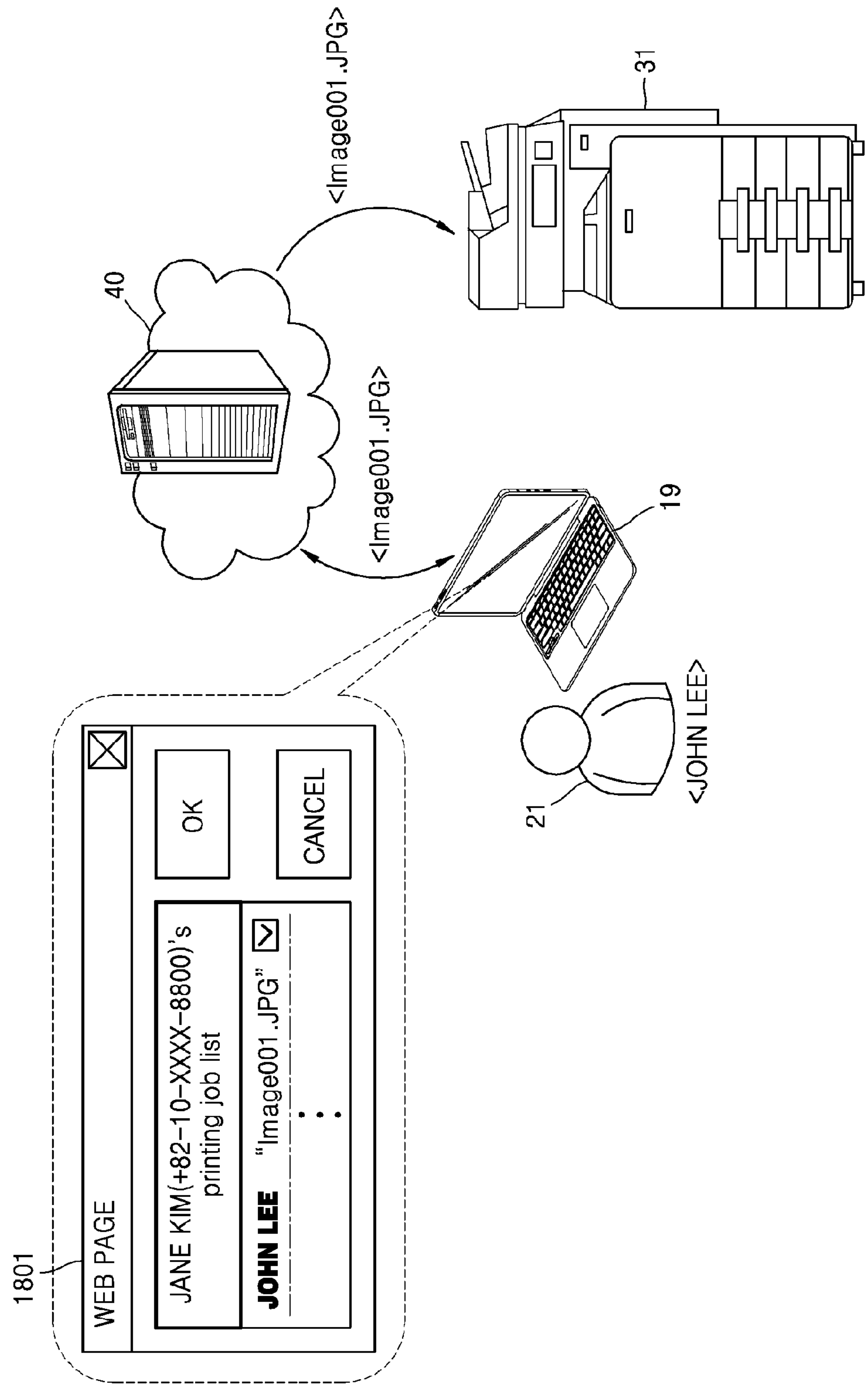
FIGS. 18A and 18B are diagrams for describing processes of the second individual printing a content received from the first individual through the image forming apparatus based on a phone number, according to an embodiment.
Figure 18B:
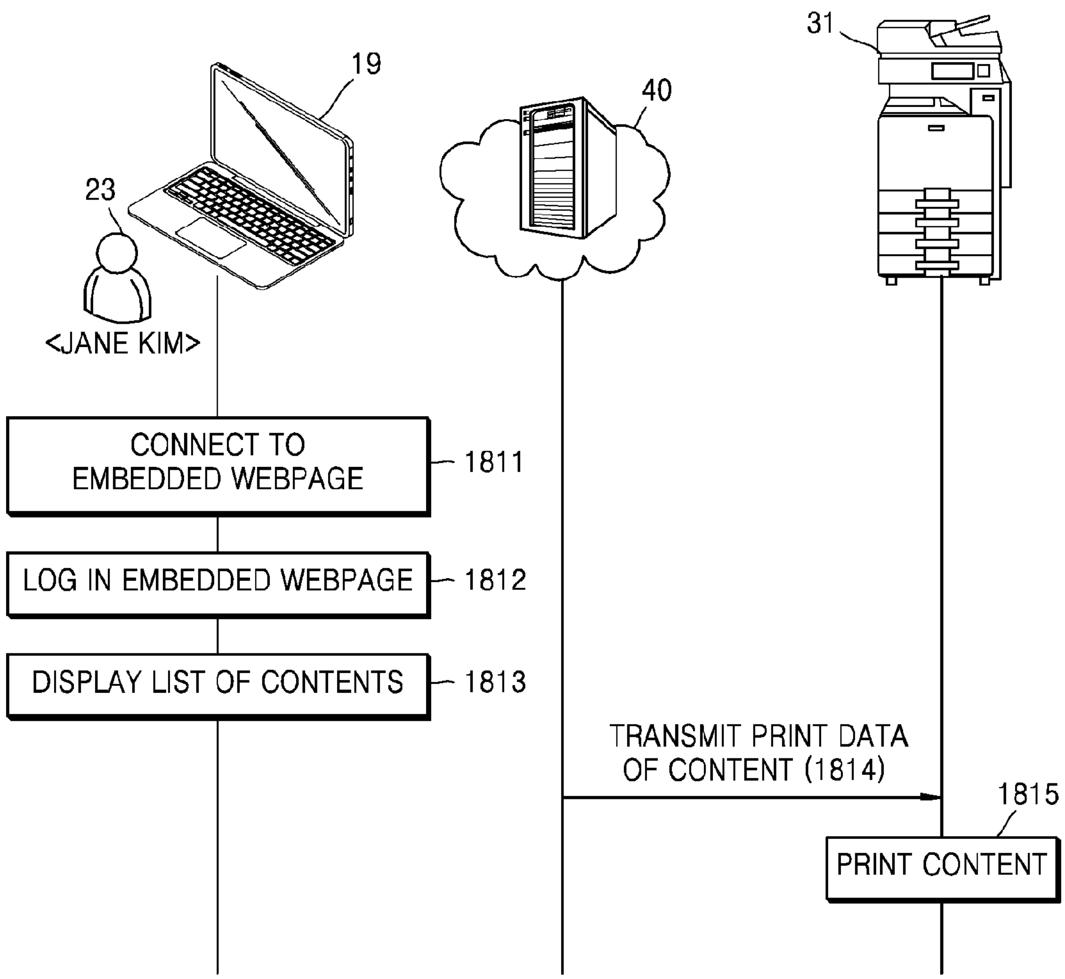

FIGS. 18A and 18B are diagrams for describing processes of the second individual 23 printing a content received from the first individual 21 through the image forming apparatus 31 based on a phone number, according to an embodiment.

Referring to FIGS. 18A and 18B, the second individual 23, i.e., Jane Kim, connects to an embedded webpage 1801 provided by the image forming apparatus 31, by using the computing device 19, in operation 1811. The computing device 19 corresponds to a PC or a laptop, and may be the user device 10 of FIG. 3. Thus, the computing device 19 includes the UI unit 110, the controller 120, and the network interface unit 130.

In operation 1812, the second individual 23 logs in the embedded webpage 1801.

In operation 1813, the UI unit 110 of the computing device 19 displays a list of contents currently transmitted to the second individual 23 through the embedded webpage 1801.

In operation 1814, when the second individual 23 selects a content to be printed from the list of contents, the network interface unit 430 of the cloud server 40 transmits print data of the selected content to the image forming apparatus 31.

In operation 1815, the image forming unit 340 of the image forming apparatus 31 prints the content.

Operations similar to at least one of operations 1514 through 1522 of FIG. 15B may be additionally performed between operations 1813 through 1815 of FIG. 18B. For example, the UI unit 110 of the computing device 19 may display the preview of the content to be printed or the second individual 23 may receive the print options. Also, the second individual 23 may deny printing the content or perform pull printing. In other words, the processes of FIGS. 15A through 18B may be combined with each other.

Figure 19:
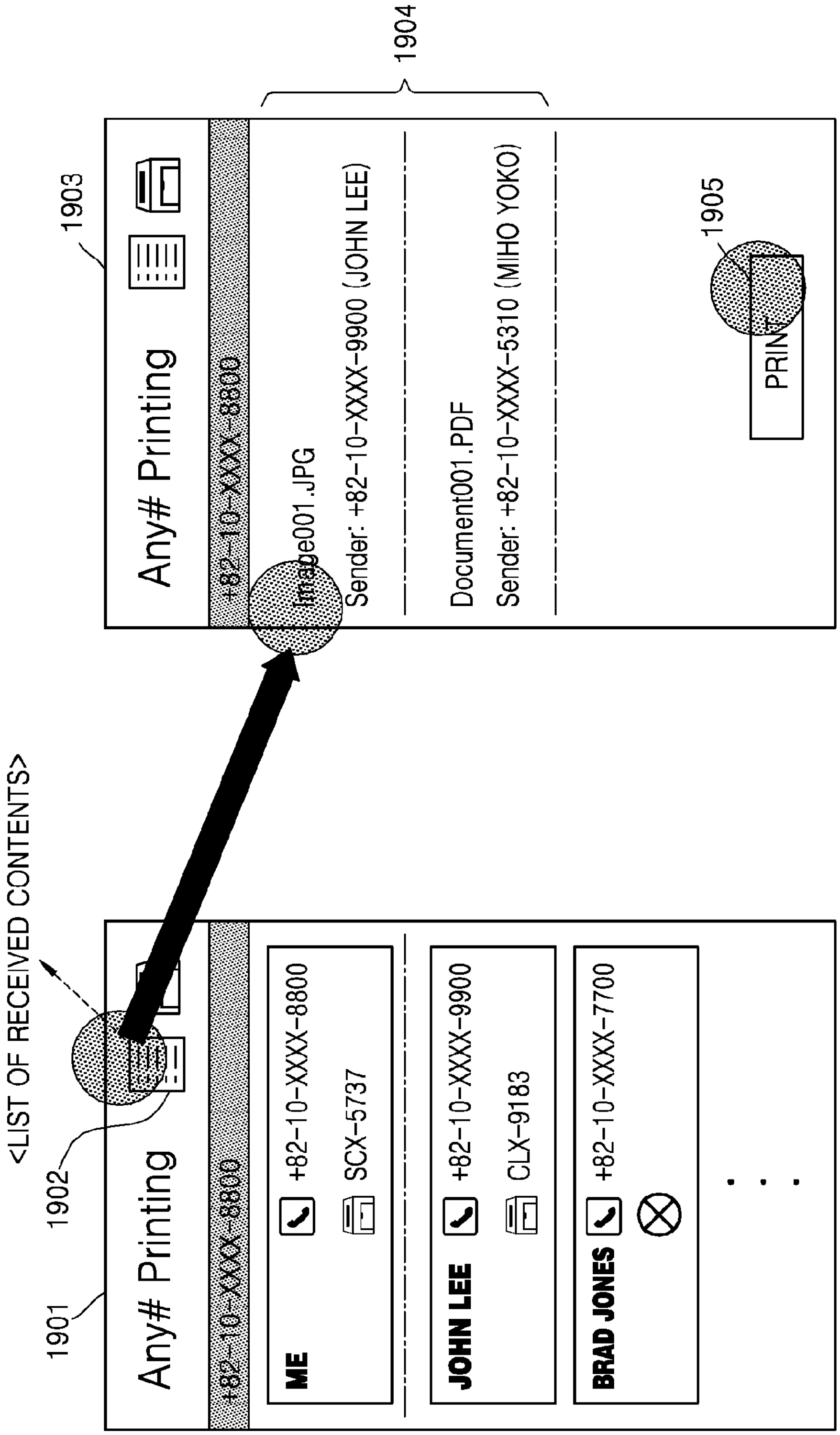
FIG. 19 illustrates UI screens of the mobile device of the second individual for the second individual to print a content received from the first individual through the image forming apparatus, according to an embodiment.

FIG. 19 illustrates UI screens of the mobile device 13 of the second individual 23 for the second individual 23 to print a content received from the first individual 21 through the image forming apparatus 31, according to an embodiment.

The controller 120 of the mobile device 13 of the second individual 23, i.e., Jane Kim, executes a printing application.

The second individual 23 clicks a received content list icon 1902 on a first screen 1901 of the printing application to display a second screen 1903.

A list 1904 of contents transmitted from the first individual 21, i.e., John Lee, and other individuals is displayed on the second screen 1903.

The second individual 23 may selects a content ("Image001.JPG") transmitted from the first individual 21 from the list 1904 and click a print icon 1905 to print the content ("Image001.JPG").

Configurations of the UI screens of FIG. 19 are arbitrarily illustrated for convenience of description, and an embodiment is not limited by the configurations of the UI screens.

When a content to be printed is transmitted from the first individual 21, i.e., John Lee, who is a sender, the cloud server 40 of FIGS. 11A through 19 generates print data of the content by rendering or converting the content to a print data format by using the controller 410. Then, the cloud server 40 transmits the print data of the content to the second individual 23 who is a recipient, in detail, the image forming apparatus 31 assigned by the second individual 23.

Various methods of printing a content transmitted from the first individual 21, i.e., John Lee, who is a sender by using the image forming apparatus 31, the methods performed by the second individual 23, i.e., Jane Lee, who is a recipient, have been described with reference to FIGS. 15A through 19.

Figure 20:
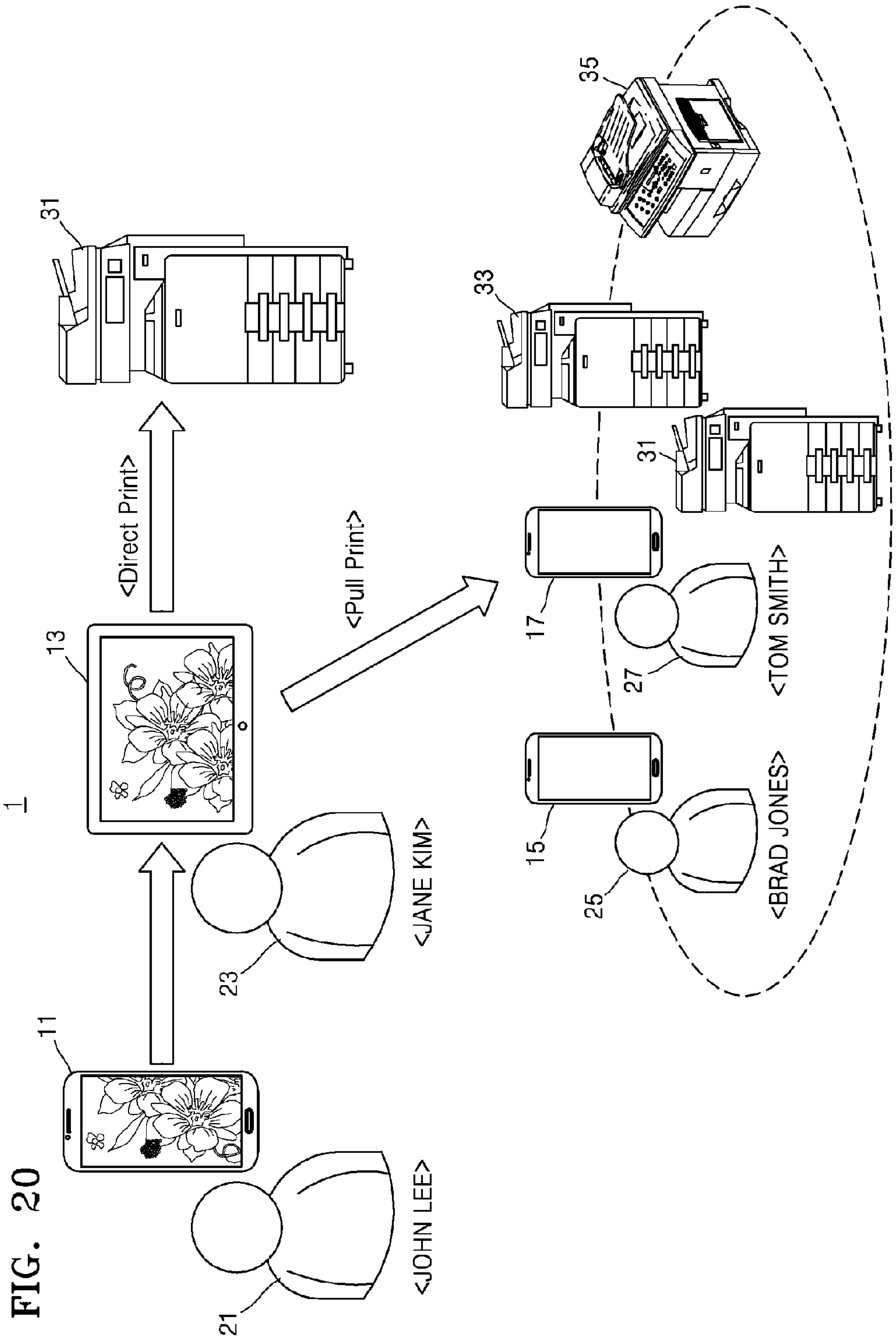
FIG. 20 is a diagram for describing concepts of direct printing and pull printing of the image forming system, according to an embodiment.

FIG. 20 is a diagram for describing concepts of direct printing and pull printing of the image forming system 1, according to an embodiment.

Referring to FIG. 20, the second individual 23, i.e., Jane Kim, who is a recipient, receives information about a content to be printed from the first individual 21, i.e., John Lee, who is a sender, by using the processes described above.

First, in the direct printing, a content to be printed is directly printed by the image forming apparatus 31 that is a representative printer set as a default, when the content reaches the second individual 23. In other words, print data of the content is directly transmitted from the cloud server 40 to the image forming apparatus 31 to be automatically printed, even when the second individual 23 does not manipulate the mobile device 13.

As described above with reference to FIG. 6E, the second individual 23 may turn on or off a direct printing function through the icon 606 for setting a direct printing mode of the print application.

When the direct printing function is turned on, the second individual 23 may assign the image forming apparatus 31 as a representative printer or a default printer by selecting the image forming apparatus 31 (for example, CLP-680) from a list of image forming apparatuses, and then clicking the set button 607.

Accordingly, when the direct printing function is turned on, the content that reached the second individual 23 may be directly printed by the image forming apparatus 31 without being checked by the second individual 23.

In the pull printing, when a content to be printed reaches the second individual 23, the content is not directly printed but exists in a held or standby state. In other words, the pull printing is performed when the direct printing function is turned off.

According to the pull printing, when the content to be printed reaches the second individual 23, the second individual 23 may input a print request, delete the content, newly assign one of the image forming apparatuses 31 through 35 to print the content, or forward the content to the third or fourth individual 25 or 27. In other words, the content is printed, deleted, or forwarded only when the second individual 23 inputs at least one process request to the mobile device 13.

In other words, the image forming apparatus 1 according to an embodiment supports both of the direct printing and the pull printing.

Figure 21:
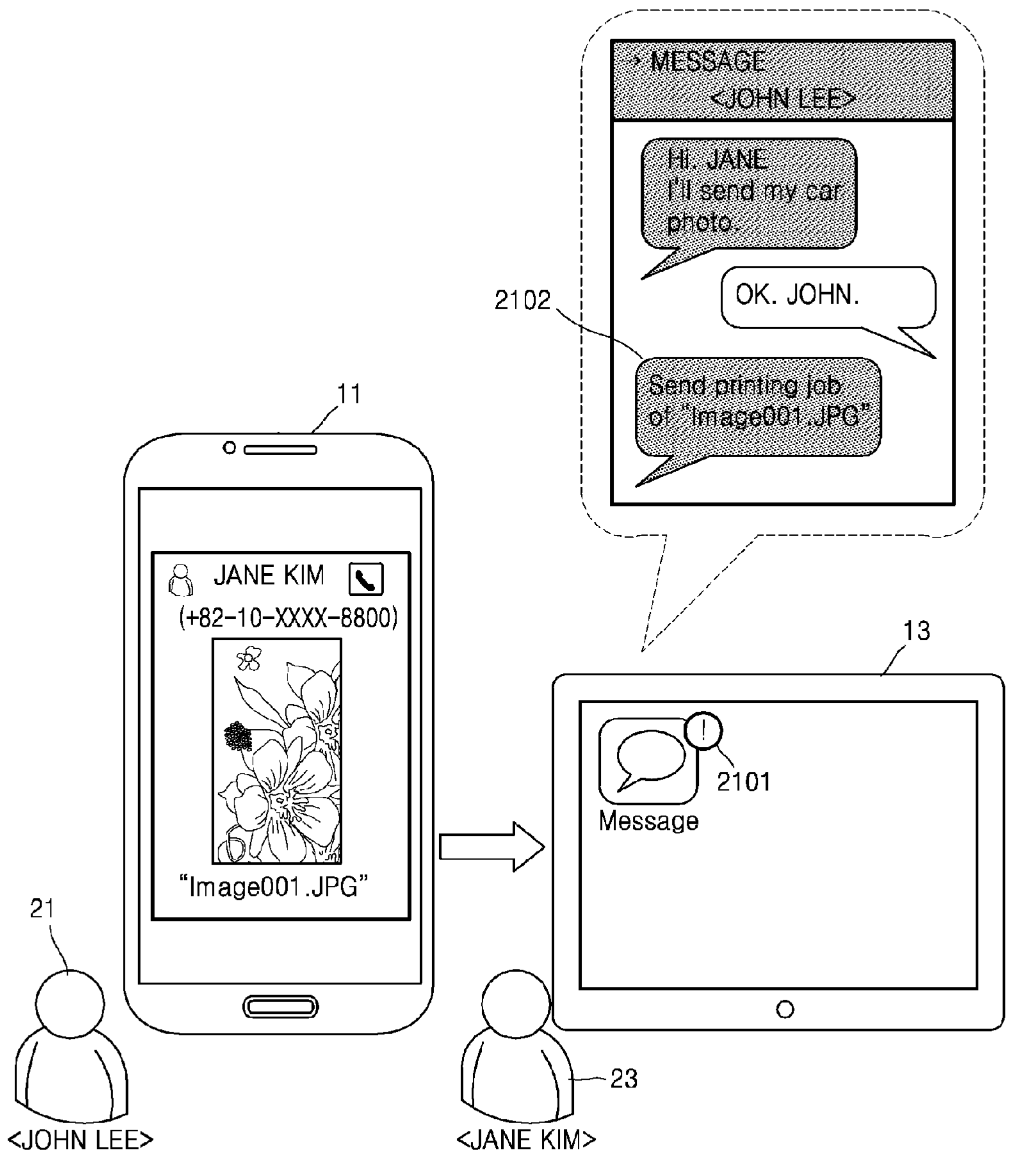
FIG. 21 is a diagram for describing notifying an arrival of a content to be printed when the content arrives the mobile device of the second individual, according to an embodiment.

FIG. 21 is a diagram for describing notifying an arrival of a content to be printed when the content arrives the mobile device 13 of the second individual 23, according to an embodiment.

Referring to FIG. 21, the first individual 21, i.e., John Lee, transmits a content to be printed to the phone number of the mobile device 13 of the second individual 23, i.e., Jane Kim.

As described above, the cloud server 40 may transmit information about the content in a message, such as an SMS or MMS, based on the phone number of the mobile device 13 of the second individual 23.

When the mobile device 13 of the second individual 23 receives the message, a message application installed in the mobile device 13 displays a notification 2101 about the arrival of the content.

Then, when the message application is executed in the mobile device 13, a content information message 2102 received from the cloud server 40 is displayed. The content information message 2102 includes information about the content ("Image001.JPG") transmitted from the first individual 21.

Figure 22:
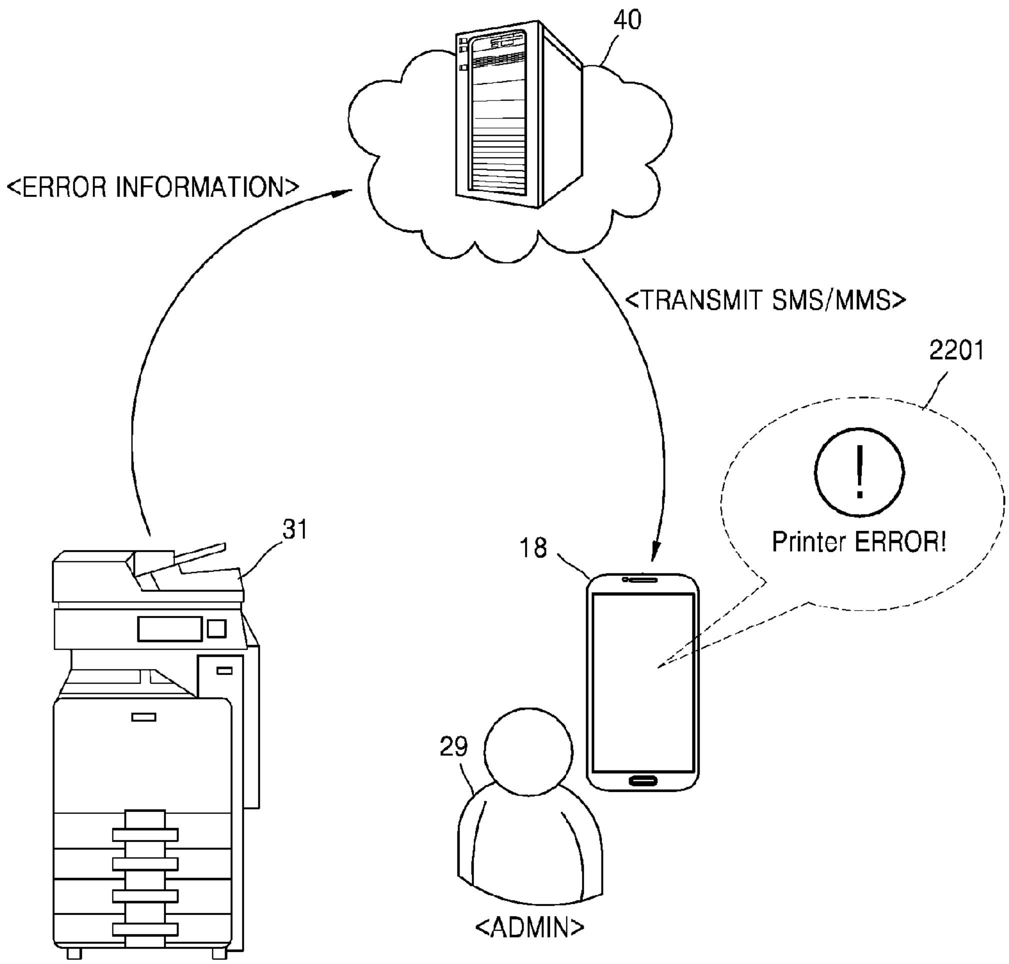
FIG. 22 is a diagram for describing a management service for monitoring a state of the image forming apparatus based on a phone number of an administrator, according to an embodiment.

FIG. 22 is a diagram for describing a management service for monitoring a state of the image forming apparatus 31 based on a phone number of an administrator 29, according to an embodiment.

Referring to FIG. 22, the cloud server 40 pre-maps and manages a phone number of a mobile device 18 of the administrator 29 and the ID information of the image forming apparatus 31, according to the processes described above with reference to FIGS. 6A through 10B. The administrator 29 and the mobile device 18 exist in the image forming system 1 of FIG. 2.

When an error, such as paper jam, no paper, or low toner, occurs in the image forming apparatus 31, the cloud server 40 collects error information about errors occurred in the image forming apparatus 31.

The cloud server 40 transmits the error information of the image forming apparatus 31 to the mobile device 18 of the administrator 29 mapped to the image forming apparatus 31. The cloud server 40 transmits the error information by transmitting a message 2201 in an SMS or MMS by using the phone number of the mobile device 18 of the administrator 29.

Figure 23:
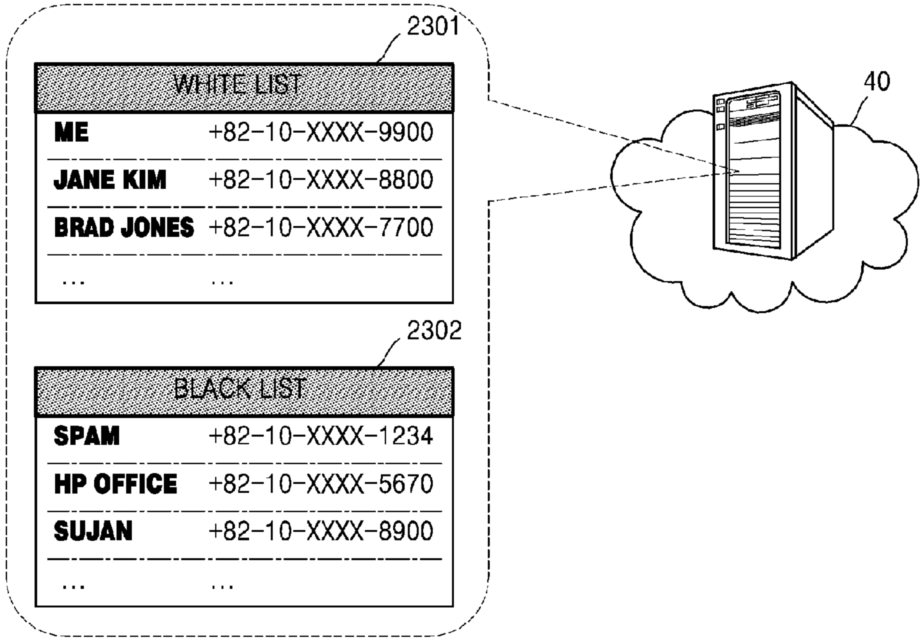
FIG. 23 is a diagram for describing the cloud server managing phone numbers of individuals, companies, or groups by classifying the phone numbers into a white list and a blacklist, according to an embodiment.

FIG. 23 is a diagram for describing the cloud server 40 managing phone numbers of individuals, companies, or groups by classifying the phone numbers into a white list 2301 and a black list 2302, according to an embodiment.

Referring to FIG. 23, the storage unit 420 of the cloud server 40 may manage the phone numbers in the white list 2301 and the black list 2302.

The white list 2301 and the black list 2302 may be stored in the cloud server 40 according to a request of the mobile device 13, 15, or 17 that is a receiver.

The white list 2301 is a management list for receiving contents only from allowed phone numbers. Thus, according to the white list 2301, a content transmitted from an unallowed (impermissible) phone number is not transmitted to the mobile device 13, 15, or 17.

The black list 2302 is a management list for rejecting contents only from unallowed phone numbers. Thus, according to the black list 2302, a content transmitted from a phone number not in the black list 2302 may be transmitted to the mobile device 13, 15, or 17.

As described above, the second individual 23, i.e., Jane Kim, who is a recipient, may pre-store the white list 2301 or the black list 2302 in the cloud server 40 by using the mobile device 13, the computing device 19, or the image forming apparatus 31, 33, or 35.

Figure 24:
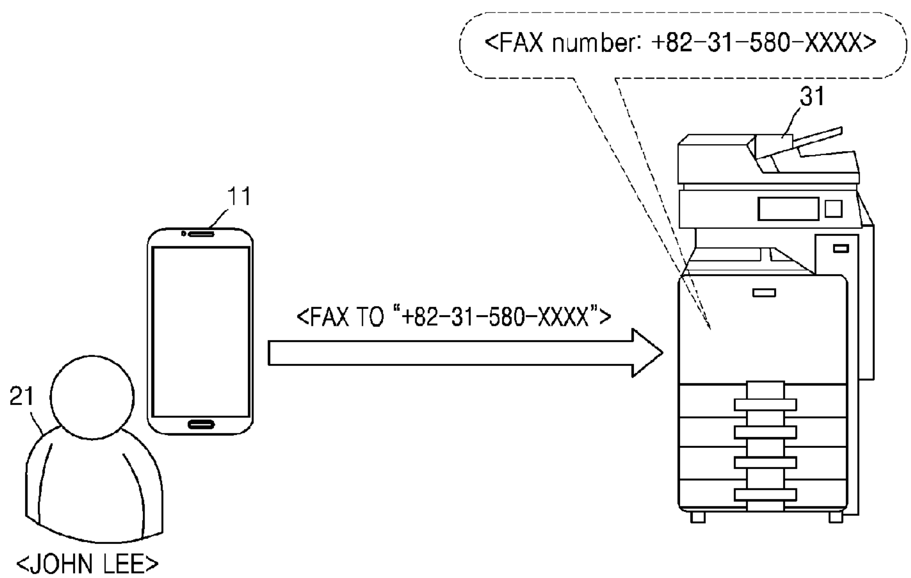
FIG. 24 is a diagram for describing faxing a content from the mobile device of the first individual based on a facsimile number of the image forming apparatus, according to an embodiment.

FIG. 24 is a diagram for describing faxing a content from the mobile device 11 of the first individual 21 based on a facsimile number of the image forming apparatus 31, according to an embodiment.

Referring to FIG. 24, the first individual 21, i.e., John Lee, selects a content to be faxed from the mobile device 11, and inputs the facsimile number, for example, +82-31-580-XXXX, of the image forming apparatus 31.

The cloud server 40 receives information about the content and about the facsimile number from the mobile device 11 of the first individual 21. The cloud server 40 may have a function of a facsimile server.

The cloud server 40 faxes the information about the content to the image forming apparatus 31 having the received facsimile number. Then, the image forming apparatus 31 prints the faxed content.

In other words, FIG. 24 is different from above-described drawings only in that a receiver terminal is changed to the image forming apparatus 31 and a content is faxed, and thus operations and functions described above when a receiver terminal is the mobile device 13, 15, or 17 may be similarly applied to FIG. 24.

Figure 25:
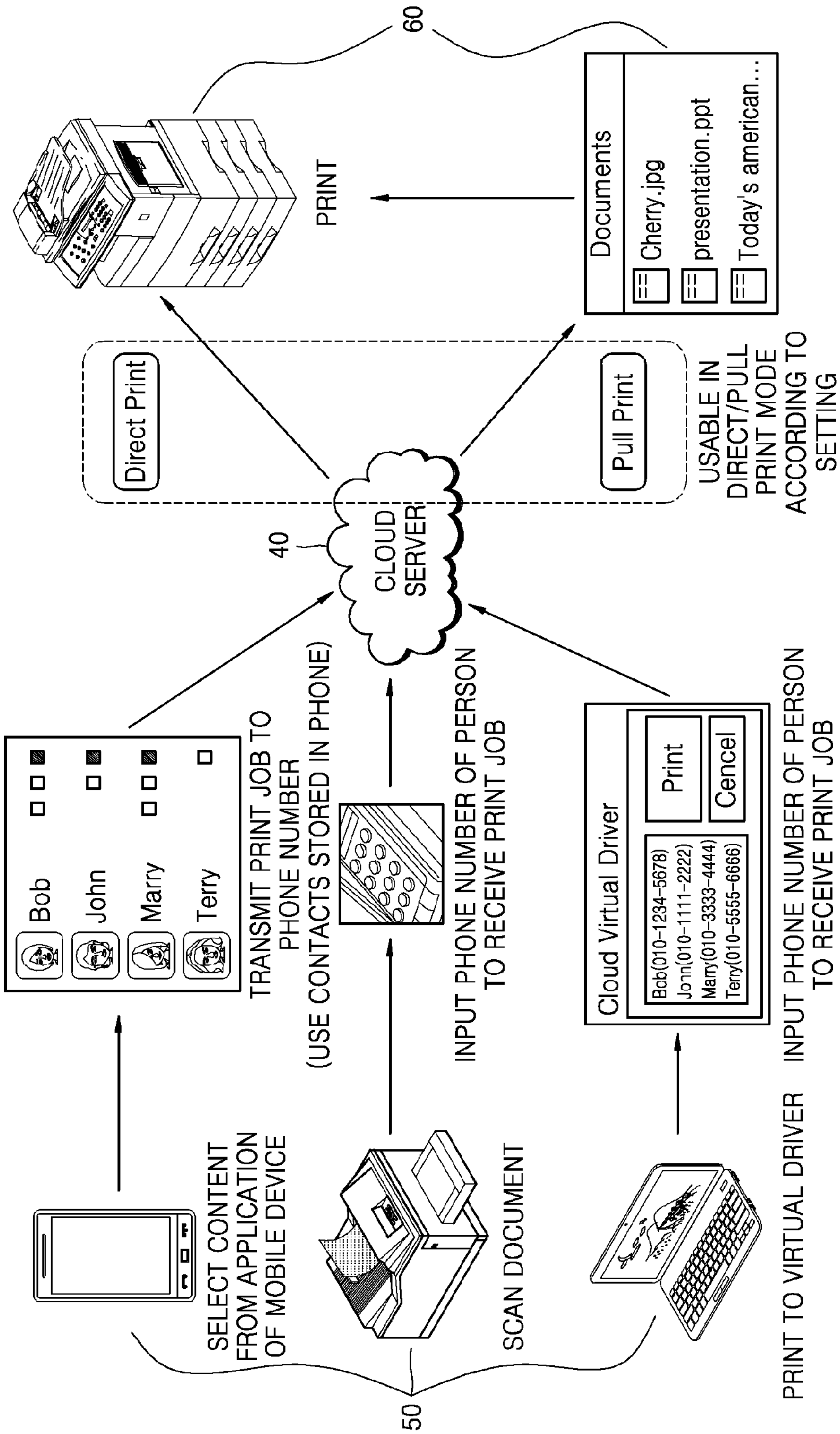
FIG. 25 is a diagram for describing an environment of a phone number-based cloud printing service.

FIG. 25 is a diagram for describing an environment of a phone number-based cloud printing service.

Referring to FIG. 25, the environment of the phone number-based cloud printing service is generally illustrated based on the cloud server 40. In order to support the phone number-based cloud printing service, the cloud server 40 may match and store phone numbers and various information. For example, the cloud server 40 may store information in which a phone number and information are matched, such as a phone number and information about a corresponding image forming apparatus, or a phone number, and a print job and ID information of the print job. In FIG. 25, sender devices 50 and recipient devices 60 are placed respectively on left and right of the cloud server 40.

Looking at the left of the cloud server 40 in FIG. 25, a sender who wants to transmit a print job registers the print job in the cloud server 40 by using various types of the sender devices 50. For example, the sender may generate the print job by selecting a content displayed on a screen after executing an application of a mobile device to assign a file, scanning a document to generate scan data, or assigning a content to be printed by using a print program in a user computer, such as a laptop or a desktop. The generated print job may be transmitted to the cloud server 40 supporting the phone number-based cloud printing service as the sender inputs a phone number of a recipient by using an UI of each of the sender devices 50.

Looking at the right of the cloud server 40 in FIG. 25, the recipient who wants to perform the print job receives the print job from the cloud server 40 by using various types of the recipient devices 60. The recipient devices 60 may receive the print job from the cloud server 40 in a direct print method or a pull print method. One of the direct print method and the pull print method may be determined by a user.

In the direct print method, a print job is performed as the print job is directly transmitted from the cloud server 40 to an image forming apparatus corresponding to a phone number of a recipient even when the recipient does not separately request the print job to be performed, since the cloud server 40 is pre-set to transmit the print job to the image forming apparatus corresponding to the phone number of the recipient. In the pull print method, a print job is performed as the print job is transmitted from the cloud server 40 to the recipient device 60 only when the print job transmitted from the sender device 50 to the cloud server 40 is registered in the cloud server 40, information about the registered print job is transmitted to a mobile device corresponding to a phone number of a recipient so as to notify the recipient that the print job is registered in the cloud server 40, and then the recipient requests the print job to be performed.

In detail, in the pull print method, the recipient may request the print job to be performed by selecting the print job to be performed from a list of print jobs displayed on a screen after executing an application of the mobile device. Information about an image forming apparatus that is to perform the print job may be additionally selected. When the recipient requests the print job to be performed, the cloud server 40 may transmit the requested print job to an image forming apparatus that is pre-set correspondingly to the phone number or selected by the recipient so that the print job is performed. Hereinafter, one or more embodiments are described based on the pull print method, but are not limited thereto.

Since a general cloud printing service using a management server, such as a company server, is based on a user account, the general cloud printing service is different from the phone number-based cloud printing service described above with reference to FIG. 25 in terms of a base. In other words, since an apparatus supporting the general cloud printing service based on a user account performs a print job via a user login using the user account, the apparatus does not use a phone number of a user while transmitting or managing the print job. Also, when information about the user is to be registered, the apparatus does not necessarily store the phone number of the user, and generally does not provide a field for storing the phone number. Accordingly, in order to provide the phone number-based cloud printing service described above while continuously using the apparatus supporting the general cloud printing service based on a user account, such as a user device usable via a user login using a user account and a management server, such as a general company server, the general cloud printing service based on a user account and the phone number-based cloud printing service need to be linked to each other. This will now be described with reference to accompanying drawings.

Figure 26:
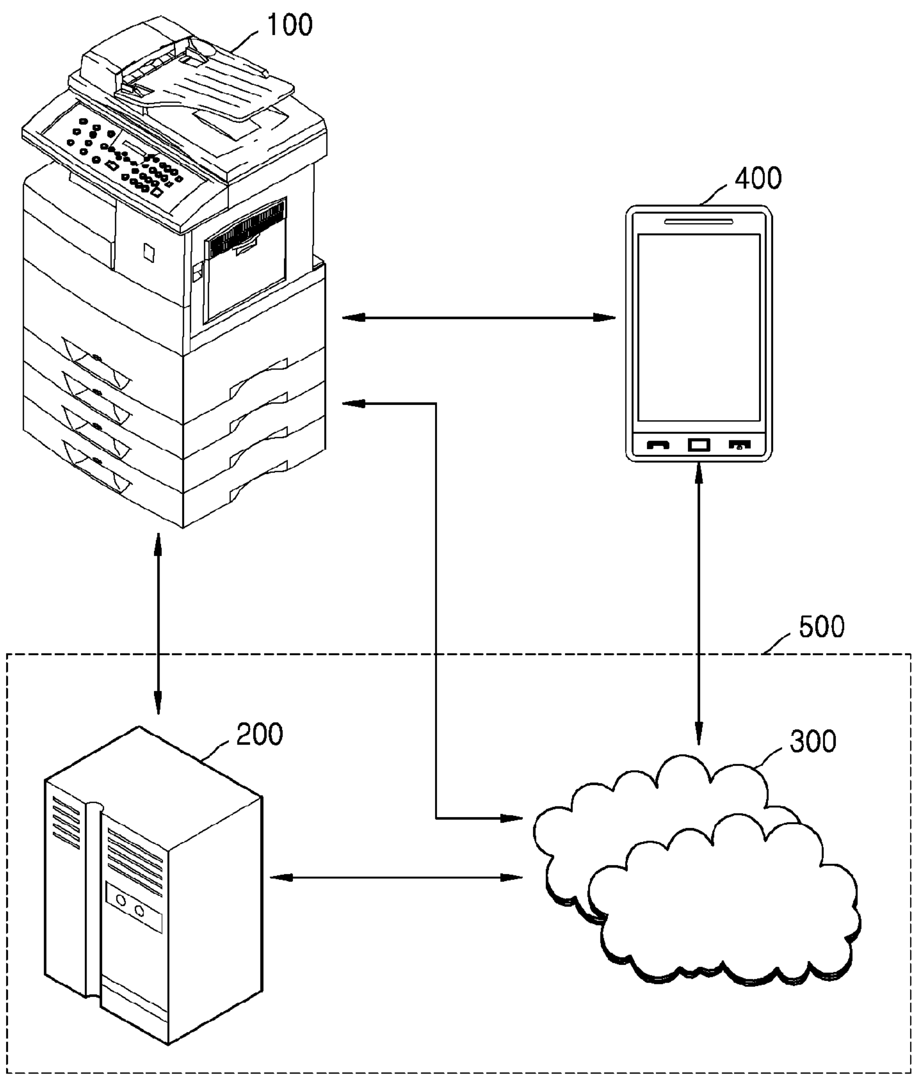
FIG. 26 is a diagram for describing a cloud printing service providing system in which a user account-based cloud printing service and a phone number-based cloud printing service are linked, according to an embodiment.

FIG. 26 is a diagram for describing a cloud printing service providing system 500 in which a user account-based cloud printing service and a phone number-based cloud printing service are linked, according to an embodiment.

FIG. 26 illustrates a relationship between a user device 100, a management server 200, a cloud server 300, and a mobile device 400 when the management server 200 supporting a user account-based cloud printing service and the cloud server 300 supporting a phone number-based cloud printing service are linked.

In following embodiments, it is assumed that the user device 100 and the management server 200 are apparatuses supporting the user account-based cloud printing service, and since the user account-based cloud printing service is supported, the user device 100 and the management server 200 do not include information about a phone number of a user, and thus do not provide the phone number-based cloud printing service.

The user device 100 may be any one of various types, such as an image forming apparatus, a user computer such as a desktop or a laptop, and a mobile device, and is not limited as long as the user is able to use the user device 100 via user authentication using the user account. Hereinafter, for convenience of description, it is assumed that the user device 100 is an image forming apparatus according to an embodiment.

When the user logs in the user device 100 by using the user account, the management server 200 may perform user authentication by using a user account database, and manage a usage, set authorization of the user, and manage a history of the user.

The cloud server 300 may intermediate an apparatus for supporting the user account-based cloud printing service and an apparatus for supporting the phone number-based cloud printing service. In other words, the cloud server 300 may communicate with the user device 100 and the management server 200, which are the apparatuses for supporting the user account-based cloud printing service, and communicate with the mobile device 400 that is the apparatus for supporting the phone number-based cloud printing service.

The mobile device 400 is the apparatus for supporting the phone number-based cloud printing service, which is capable of communicating with the cloud server 300, and may support the phone number-based cloud printing service, unlike the user device 100. The user device 100 may be a mobile type, but whereas the user device 100 is capable of transmitting a user account-based print job to the management server 200 or the cloud server 300, the mobile device 400 is capable of transmitting a phone number-based print job to the cloud server 300.

By linking the management server 200 supporting the user account-based cloud printing service and the cloud server 300 supporting the phone number-based cloud printing service, the cloud printing service providing system 500 in which the user account-based cloud printing service and the phone number-based printing cloud service are linked may be formed. The cloud server 300 may perform a server-client communication for maintaining security with the management server 200.

The cloud server 300 may be a public cloud server or a private cloud server. Accordingly, a location where a print job is registered may differ in the cloud printing service providing system 500 including the management server 200 and the cloud server 300. This is because a security level differs according to a type of the cloud server 300, as will be described in detail below with reference to FIGS. 27A and 27B.

Figure 27A:
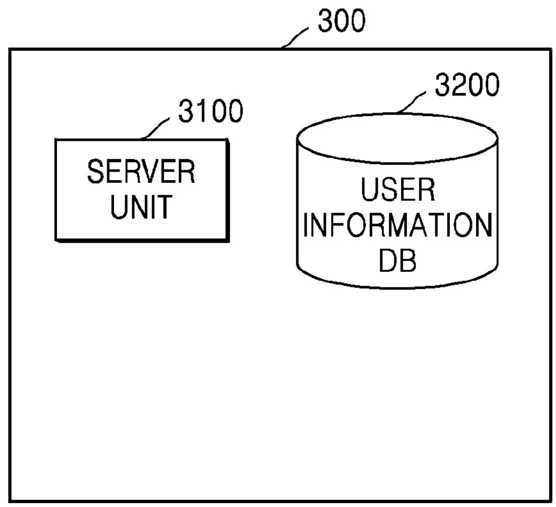
FIGS. 27A and 27B are diagrams of structures of a cloud server, according to embodiments.
Figure 27B:
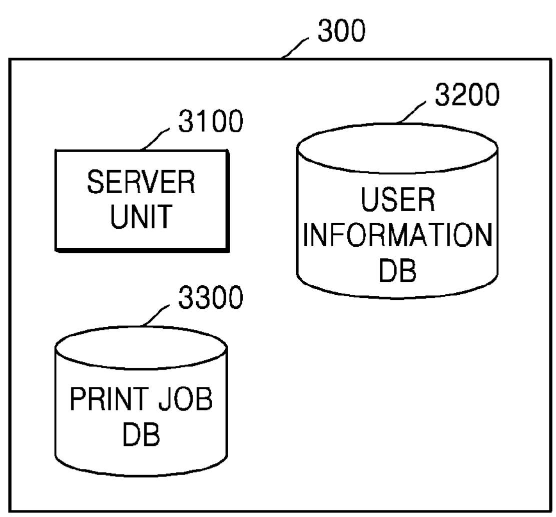

FIGS. 27A and 27B are diagrams of structures of the cloud server 300, according to one or more embodiments.

Referring to FIGS. 27A and 27B, the cloud server 300 of FIGS. 27A and 27B commonly includes a server unit (server) 3100 and a user information database (DB) 3200, and the cloud server 300 of FIG. 27B further includes a print job DB 3300. The cloud server 300 of FIGS. 27A and 27B may further include other general-purpose components.

There may be two types of the cloud server 300, i.e., a public cloud server and a private cloud server. When the cloud server 300 is public, the cloud server 300 is satisfactory in terms of costs but has weak security, and when the cloud server 300 is private, the cloud server 300 is unsatisfactory in terms of costs but has strong security and may provide a data storage space. Accordingly, when the cloud server 300 is public, the print job may be registered in the management server 200 of the cloud printing service providing system 500 including the management server 200 and the cloud server 300, in order to maintain security. On the other hand, when the cloud server 300 is private, the print job may be registered in the cloud server 300 of the cloud printing service providing system 500. In detail, a private cloud server is used mostly when there is no space in the management server 200 to store the print job, and thus the print job may be registered in the cloud server 300 when the cloud server 300 is private.

In FIG. 27A, the cloud server 300 is public, and does not include the print job DB 3300 for registering a print job.

The cloud server 300 of FIG. 27B is private, and may include the print job DB 3300 for registering a print job. In this case, the cloud server 300 may manage registration of a print job without registering the print job in the management server 200. For example, the cloud server 300 of FIG. 27B including the print job DB 3300 may be used when the management server 200 does not include the print job DB 3300 for registering a print job or when it is difficult to newly build the print job DB 3300 in the management server 200.

Figure 28:
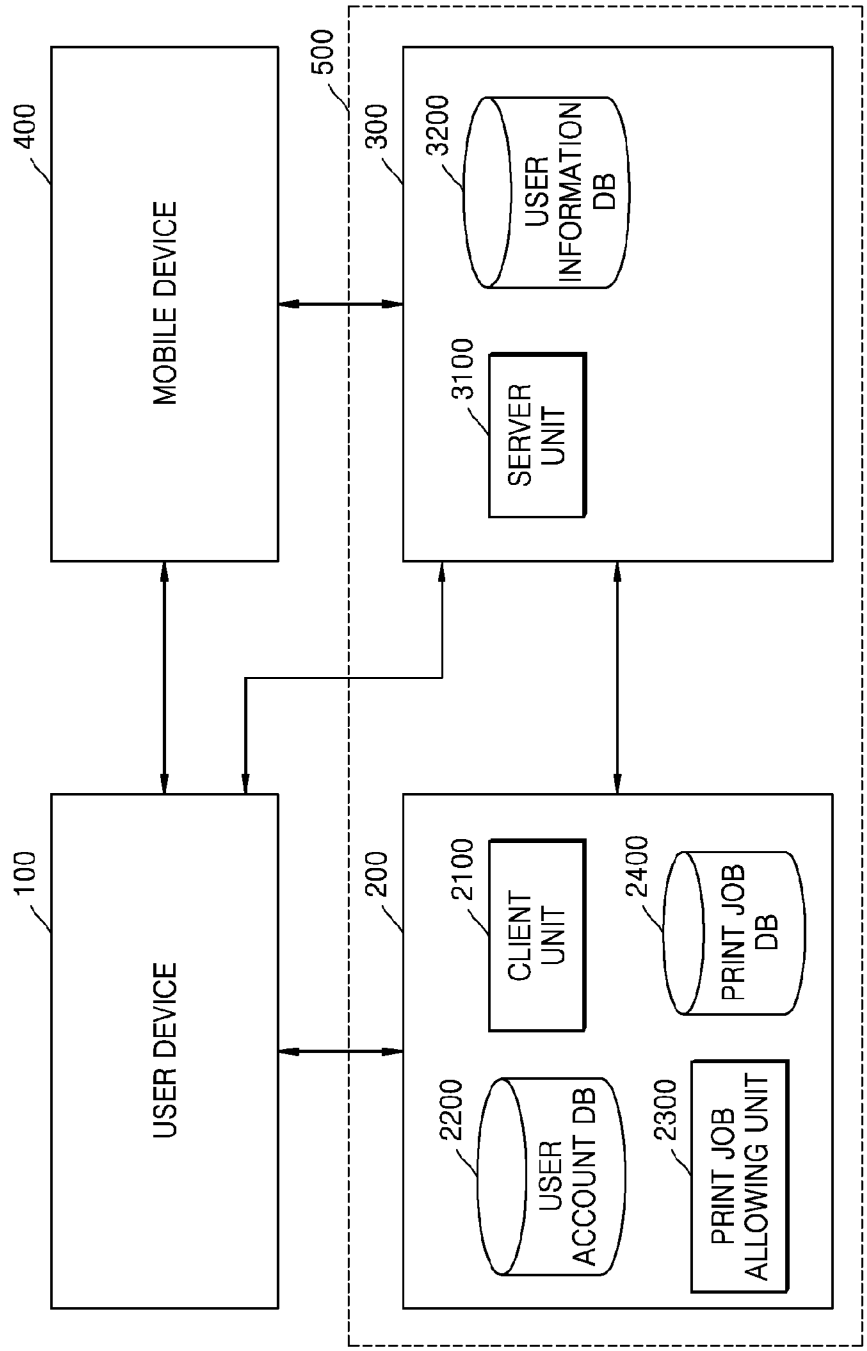
FIG. 28 is a diagram for describing a structure and operations of a cloud printing service providing system in which a user account-based cloud printing service and a phone number-based cloud printing service are linked, according to an embodiment.

Accordingly, hereinafter, it is assumed that the cloud server 300 of FIG. 27A is used when public, and the cloud server 300 of FIG. 28B is used when private. Structures and operations of the cloud printing service providing system 500 will now be described when the cloud server 300 is public and private respectively by using FIGS. 28 and 29.

FIG. 28 is a diagram for describing a structure and operations of the cloud printing service providing system 500 in which the user account-based cloud printing service and the phone number-based cloud printing service are linked, according to an embodiment. In detail, the cloud server 300 included in the cloud printing service providing system 500 is a public cloud server.

Referring to FIG. 28, the cloud printing service providing system 500 may include the management server 200 and the cloud server 300. The management server 200 supporting the user account-based cloud printing service may communicate with the user device 100, and the cloud server 300 supporting the phone number-based cloud printing service may communicate with not only the user device 100 but also the mobile device 400.

FIG. 28 shows components required to link the management server 200 and the cloud server 300.

The management server 200 may include a client unit (client) 2100, a user account data base (DB) 2200, a print job allowing unit (printer job allower) 2300, and a print job DB 2400. As described above with reference to FIG. 27A, the print job DB 2400 is included in the management server 200. The cloud server 300 may include the server unit (server) 3100 and the user information DB 3200.

The management server 200 may receive the print job from the user device 100. For example, when the user device 100 is an image forming apparatus, the management server 200 may receive scan data generated by scanning a document in the image forming apparatus. The user device 100 is usable via a user authentication using a user account, and may transmit a user account-based print job while transmitting a user account of a recipient.

The user account DB 2200 may store the user account as well as various types of information related to the user account. For example, the user account DB 2200 may store each user account and usage information or authorization information of a user corresponding to each user account.

The print job allowing unit 2300 may determine allowing of the user account-based print job included in the user account-based print job received by the management server 200. For example, the print job allowing unit 2300 may determine the allowing of the print job by checking whether the user account received with the print job in the management server 200 exists in the user account DB 2200. Also, the print job allowing unit (print job allower) 2300 may determine the allowing of the print job by further considering usage or authorization of the user corresponding to the user account.

The print job DB 2400 may register the print job allowed by the print job allowing unit 2300. For example, the print job received in the management server 200 may be matched to the user account of the recipient and stored.

The client unit (client) 2100 of the management server 200 is a communication module of the management server 200 capable of performing a server-client communication with the cloud server 300. In other words, the client unit 2100 is a communication module of the management server 200 for performing a communication maintaining security between the management server 200 supporting the user account-based cloud printing service and the cloud server 300 supporting the phone number-based cloud printing service.

The client unit (client) 2100 of the management server 200 may transmit information to be transmitted to the mobile device 400 through the cloud server 300 or information required to control the cloud server 300 to the cloud server 300, or receive information to be transmitted to the user device 100 or information required to control the management server 200 from the cloud server 300. For example, the client unit 2100 may transmit a result of determining the allowing of the print job by the print job allowing unit 2300 or a result of registering the allowed print job in the print job DB 2400 to the cloud server 300, or receive the print job from the cloud server 300 or information for requesting to perform the print job transmitted to the cloud server 300 from the mobile device 400.

The cloud server 300 may receive the print job from the mobile device 400. The mobile device 400 may transmit the phone number-based print job, wherein the phone number of the recipient is also transmitted while transmitting the print job to the cloud server 300. Also, the cloud server 300 may receive the information for requesting to perform the print job from the mobile device 400, wherein the information is based on a phone number, which is transmitted with the phone number.

The user information DB 3200 may store user information in which the phone number of the user and the user account are matched to each other. In other words, the phone number and the user account may be matched and stored in the user information DB 3200 so that the user account and the phone number are mutually switched. For example, the phone number may be used to be switched to the user account corresponding to the phone number, or the user account may be used to be switched to the phone number corresponding to the user account. The user information DB 3200 may store user information in which device information, such as an image forming apparatus, is further matched to the phone number and the user account.

The server unit (server) 3100 of the cloud server 300 is a communication module of the cloud server 300, which is capable of performing a server-client communication with the management server 200. In other words, the server unit 3100 is a communication module of the cloud server 300 for performing a communication maintaining security between the management server 200 supporting the user account-based cloud printing service and the cloud server 300 supporting the phone number-based cloud printing service.

The server unit 3100 of the cloud server 300 may receive information to be transmitted to the mobile device 400 through the cloud server 300 or information required to control the cloud server 300 from the management server 200, or transmit information to be transmitted to the user device 100 or information required to control the management server 200 to the management server 200. For example, the server unit 3100 may receive a result of determining the allowing of the print job by the print job allowing unit 2300 or a result of registering the allowed print job in the print job DB 2400 from the management server 200, or transmit the print job from the cloud server 300 or information for requesting to perform the print job transmitted to the cloud server 300 from the mobile device 400.

Information received from or transmitted to the management server 200 are information based on a user account and usable by the management server 200 because the management server 200 is an apparatus supporting the user account-based cloud printing service. While the server unit 3100 of the cloud server 300 performs the server-client communication with the client unit 2100 of the management server 200, the user account and the phone number may be mutually switched by using the user information DB 3200 so that the management server 200 and the cloud server 300 are linked, thereby intermediating the apparatus supporting the phone number-based cloud printing service and the apparatus supporting the user account-based cloud printing service.

Figure 29:
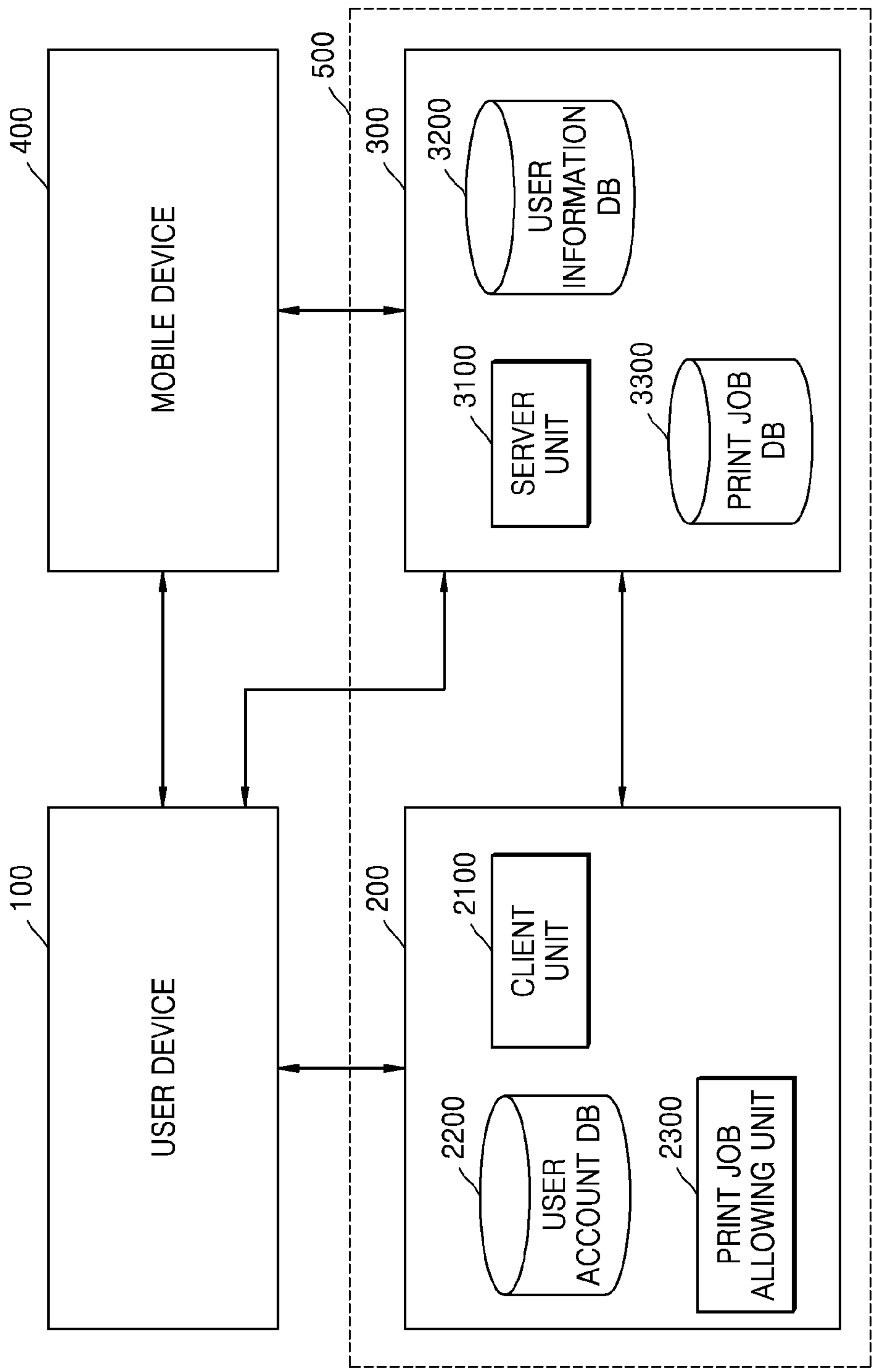
FIG. 29 is a diagram for describing a structure and operations of a cloud printing service providing system in which a user account-based cloud printing service and a phone number-based cloud printing service are linked, according to an embodiment.

FIG. 29 is a diagram for describing a structure and operations of the cloud printing service providing system 500 in which the user account-based cloud printing service and the phone number-based cloud printing service are linked, according to an embodiment. In detail, the cloud server 300 included in the cloud printing service providing system 500 is a private cloud server.

Referring to FIG. 29, the cloud printing service providing system 500 may include the management server 200 and the cloud server 300. The management server 200 supporting the user account-based printing service may communicate with the user device 100 and the cloud server 300 supporting the phone number-based cloud printing service may communicate not only with the user device 100 but also with the mobile device 400.

FIG. 29 shows components required to link the management server 200 and the cloud server 300.

The management server 200 may include the client unit 2100, the user account DB 2200, and the print job allowing unit 2300. Unlike FIG. 28, the management server 200 does not include the print job DB 2400. The cloud server 300 may include the server unit 3100, the user information DB 3200, and the print job DB 3300. As described above with reference to FIG. 27B, the print job DB 3300 is included in the cloud server 300. Details overlapping those of FIG. 28 are not repeated herein, and only differences generated as the print job DB 3300 is included in the cloud server 300 will now be described.

The print job DB 3300 of the cloud server 300 may register the print job allowed by the print job allowing unit 2300 of the management server 200. For example, the print job received in the cloud server 300 may be matched to the user account or the phone number of the recipient and then stored. The cloud server 300 may receive the user account-based print job from the user device 100, or receive the phone number-based print job from the mobile device 400. By matching and storing the phone number and the user account in the user information DB 3200, the user account and the phone number may be mutually switched, and thus the print job received in the cloud server 300 may also be matched to the user account or the phone number and then stored.

Unlike FIG. 28, since the print job DB 3300 is included in the cloud server 300, the result of registering the allowed print job may not be received from the management server 200, and since the print job received in the cloud server 300 is registered, the print job may not be transmitted to the management server 200.

Embodiments of the printing service provided by the cloud printing service providing system 500 in which the user account-based cloud printing service and the phone number-based cloud printing service are linked will now be described with reference to FIGS. 30 through 36.

Figure 30:
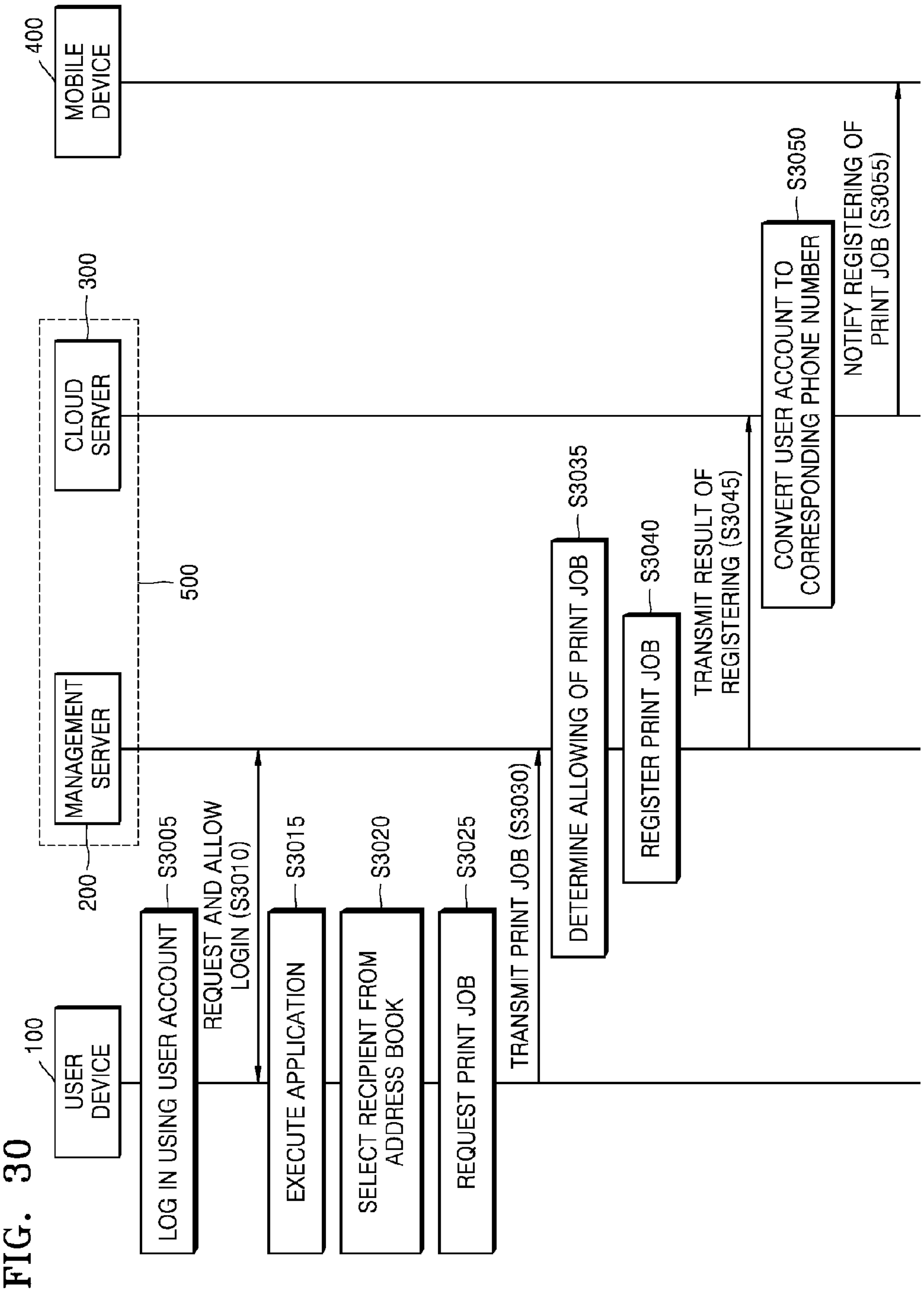
FIG. 30 is a diagram for describing a cloud printing service provided when a print job is requested by a user device, when a cloud printing service providing system in which a user account-based cloud printing service and a phone number-based cloud printing service are linked includes a public cloud server, according to an embodiment.

FIG. 30 is a diagram for describing a cloud printing service provided when a print job is requested by the user device 100, when the cloud printing service providing system 500 in which a user account-based cloud printing service and a phone number-based cloud printing service are linked includes a public cloud server, according to an embodiment. For convenience of description, it is assumed that the user device 100 is an image forming apparatus that is an example of the user device 100. In other words, operations of the user device 100, the management server 200, the cloud server 300, and the mobile device 400 are described when a user, as a sender, transmits a print job from an image forming apparatus that is an example of the user device 100 to the cloud printing service providing system 500 including the management server 200 and the cloud server 300.

The user may log in the user device 100 by using a user account, in operation S3005. The user device 100 is an apparatus usable via a user authentication using the user account. For example, since the user may use an image forming apparatus in a company by logging in using the user's user account, the image forming apparatus is an example of the user device 100.

The user device 100 transmits a login request to the management server 200 by using the user account received from the user, and the management server 200 may allow the login via user authentication for checking the user account, in operation S3010. When the login is allowed, the user may start processes for receiving a cloud printing service by using the user device 100.

The user device 100 may execute an application supporting the cloud printing service according to an input of the user, in operation S3015. In other words, the user may execute the application supporting the cloud printing service in the user device 100. The application supporting the cloud printing service may operate as an interface connecting the cloud printing service providing system 500 and the user device 100. If the application executed by the user device 100 guarantees a connection only to the management server 200 supporting the user account-based cloud printing service, instead of the entire cloud printing service providing system 500, the management server 200 may set a trigger so that a print job is retransmitted to the cloud server 300.

In order to transmit the print job to another user, the user, as a sender, may select a recipient from an address book of the user device 100, in operation S3020. The address book may store a plurality user accounts of users to display the user accounts so that the user who is a sender may select the user account of the recipient.

The user may generate a print job by using the user device 100 and may request the print job to be performed, in operation S3025. For example, the user may scan a document by using the image forming apparatus that is an example of the user device 100 to generate a scan data, and request the print job to be performed by transmitting the generated scan data to the other user.

The user device 100 may transmit the print job requested from the user to the management server 200, in operation S3030. In other words, the management server 200 may receive the print job. The print job received by the management server 200 from the user device 100 may be a user account-based print job that includes a user account and a print job.

The management server 200 may determine allowing of the print job based on the user account, in operation S3035. The management server 200 may determine the allowing of the print job based on the user account included in the user account-based print job transmitted from the user device 100. For example, the management server 200 may check whether the user account of the recipient included in the user account-based print job is capable of receiving a cloud printing service, thereby determining the allowing of the print job.

The management server 200 may register the allowed print job in operation S3040 according to the result of allowing. Since the cloud server 300 included in the cloud printing service providing system 500 is a public cloud server, the print job is registered in the management server 200 as described above with reference to FIG. 28. The management server 200 may match the print job to ID information of the print job and then store the print job. Thus, when a plurality of print jobs exist in the same user account, the management server 200 may manage the print jobs by using ID information of the print jobs. If the print job is not allowed, the print job transmitted to the management server 200 may be deleted.

The management server 200 may transmit the result of registering the print job to the cloud server 300 in operation S3045. In other words, the cloud server 300 may receive the result of registering from the management server 200. The management server 200 and the cloud server 300 may perform a server-client communication, and data transferred therebetween may be in a format encoded by using a key. The result of registering may include the user account of the recipient and the ID information of the print job for identifying the print job.

By transmitting the result of registering to the cloud server 300, the cloud server 300 may convert the user account of the recipient included in the result of registering to a phone number corresponding to the user account, in operation S3050. In order to be connected to the mobile device 400 supporting the phone-number based cloud printing service, the user account included in the result of registering is converted to the corresponding phone number, thereby performing a process of linking the user account-based cloud printing service and the phone number-based cloud printing service. Accordingly, the cloud server 300 may include the user information DB 3200 for storing the user information in which phone numbers of users and user accounts are matched to each other, as described above.

The cloud server 300 may notify the mobile device 400 about the registering of the print job, in operation S3055. The cloud server 300 may transmit the ID information of the print job to the phone number converted from the user account so as to notify the registering of the print job.

As described above, the user account-based print job requested to be performed through the user device 100 by using the user account is transmitted to the phone number corresponding to the user account of the recipient through the cloud printing service providing system 500 including the management server 200 and the cloud server 300. Accordingly, the user account-based cloud printing service is linked to the phone number-based cloud printing service, and at this time, the cloud server 300 may convert the user account to the corresponding phone number.

Then, the recipient may check the registered print job through the mobile device 400 of the recipient, and may select the print job to be performed according to a pull print method.

Figure 31:
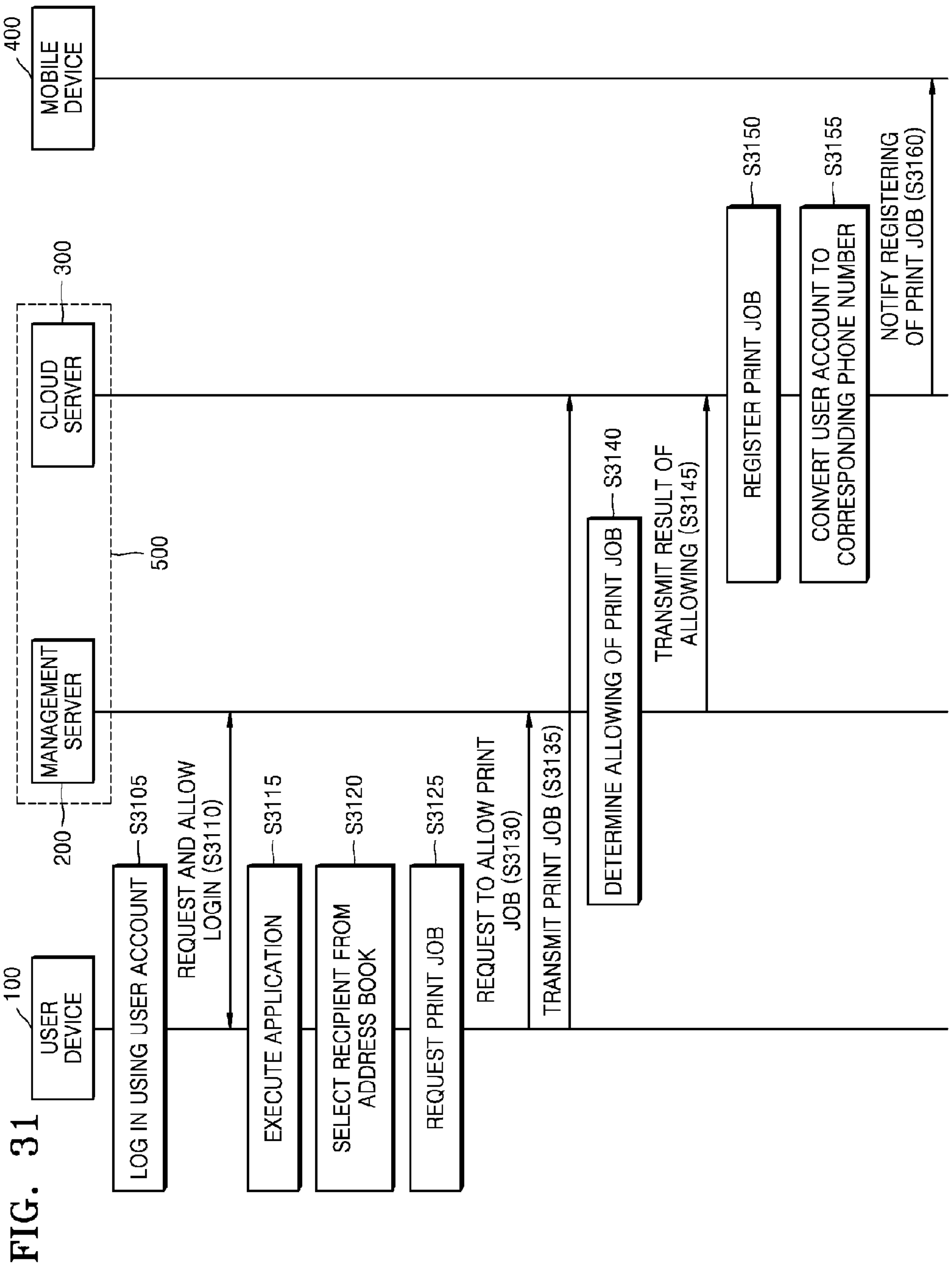
FIG. 31 is a diagram for describing a cloud printing service provided when a print job is requested by the user device, when a cloud printing service providing system in which a user account-based cloud printing service and a phone number-based cloud printing service are linked includes a private cloud server, according to an embodiment.

FIG. 31 is a diagram for describing a cloud printing service provided when a print job is requested by the user device 100, when the cloud printing service providing system 500 in which a user account-based cloud printing service and a phone number-based cloud printing service are linked includes a private cloud server, according to an embodiment. For convenience of description, it is assumed that the user device 100 is an image forming apparatus that is an example of the user device 100. In other words, operations of the user device 100, the management server 200, the cloud server 300, and the mobile device 400 are described when a user, as a sender, transmits a print job from an image forming apparatus that is an example of the user device 100 to the cloud printing service providing system 500 including the management server 200 and the cloud server 300.

Since FIG. 31 is different from FIG. 30 only in the type of the cloud server 300, overlapping descriptions are briefly described, and descriptions of FIG. 30 may be applied to FIG. 31 even if omitted.

The user may log in the user device 100 by using a user account, in operation S3105.

The user device 100 transmits a login request to the management server 200 by using the user account received from the user, and the management server 200 may allow the login via user authentication for checking the user account, in operation S3010.

The user device 100 may execute an application supporting the cloud printing service according to an input of the user, in operation S3115.

In order to transmit the print job to another user, the user, as a sender, may select a recipient from an address book of the user device 100, in operation S3120.

The user may generate a print job by using the user device 100 and may request the print job to be performed, in operation S3125.

Operations S3105 through 3125 are respectively the same as operations S3005 through S3025 of FIG. 30.

The user device 100 may transmit a request to allow the print job requested by the user to the management server 200, in operation S3130. The request transmitted from the user device 100 to the management server 200 may include a user account. In other words, by transmitting the user account of the recipient to the management server 200, the management server 200 may determine whether the print job is allowable.

The user device 100 may transmit the print job requested by the user to the cloud server 300, in operation S3135. The print job transmitted from the user device 100 to the cloud server 300 is a user account-based print job that includes a user account and a print job. Operation S3135 may be simultaneously performed with operation S3130, or may be performed after operation S3140.

The management server 200 may determine allowing of the print job based on the user account in operation S3140. The management server 200 may determine the allowing of the print job based on the user account received from the user device 100, according to the request received in operation S3130. For example, the management server 200 may check whether the user account of the recipient is capable of receiving the cloud printing service to determine the allowing of the print job.

The management server 200 may transmit the result of allowing to the cloud server 300 in operation S3145. In other words, the cloud server 300 may receive the result of allowing from the management server 200. The management server 200 and the cloud server 300 may perform a server-client communication, and data transferred therebetween may be in a format encoded by using a key. The result of allowing may include the user account of the recipient and a value indicating the result of allowing.

The cloud server 300 may register the allowed print job in operation S3150 according to the result of allowing. In other words, the cloud server 300 may register the allowed print job by checking the result of allowing transmitted from the management server 200. Since the cloud server 300 included in the cloud printing service providing system 500 is a private cloud server, the print job may be registered in the cloud server 300 as described above with reference to FIG. 29. The cloud server 300 may match the print job to ID information of the print job and then store the print job. If a plurality of print jobs exist in the same user account, the management server 200 may manage the print job by using the ID information of the print job. If the print job is not allowed, the print job transmitted to the cloud server 300 may be deleted.

The cloud server 300 may convert the user account of the recipient regarding the registered print job to a phone number corresponding to the user account, in operation S3155. In order to be connected to the mobile device 400 supporting the phone-number based cloud printing service, the user account of the recipient regarding the registered print job is converted to the corresponding phone number, thereby performing a process of linking the user account-based cloud printing service and the phone number-based cloud printing service. Accordingly, the cloud server 300 may include the user information DB 3200 for storing the user information in which phone numbers of users and user accounts are matched to each other, as described above.

The cloud server 300 may notify the mobile device 400 about the registering of the print job, in operation S3160. The cloud server 300 may transmit the ID information of the print job to the phone number converted from the user account so as to notify the registering of the print job.

As described above, the user account-based print job requested to be performed through the user device 100 by using the user account is transmitted to the phone number corresponding to the user account of the recipient through the cloud printing service providing system 500 including the management server 200 and the cloud server 300. Accordingly, the user account-based cloud printing service is linked to the phone number-based cloud printing service, and at this time, the cloud server 300 may convert the user account to the corresponding phone number.

Then, the recipient may check the registered print job through the mobile device 400 of the recipient, and may select the print job to be performed according to a pull print method.

Figure 32:
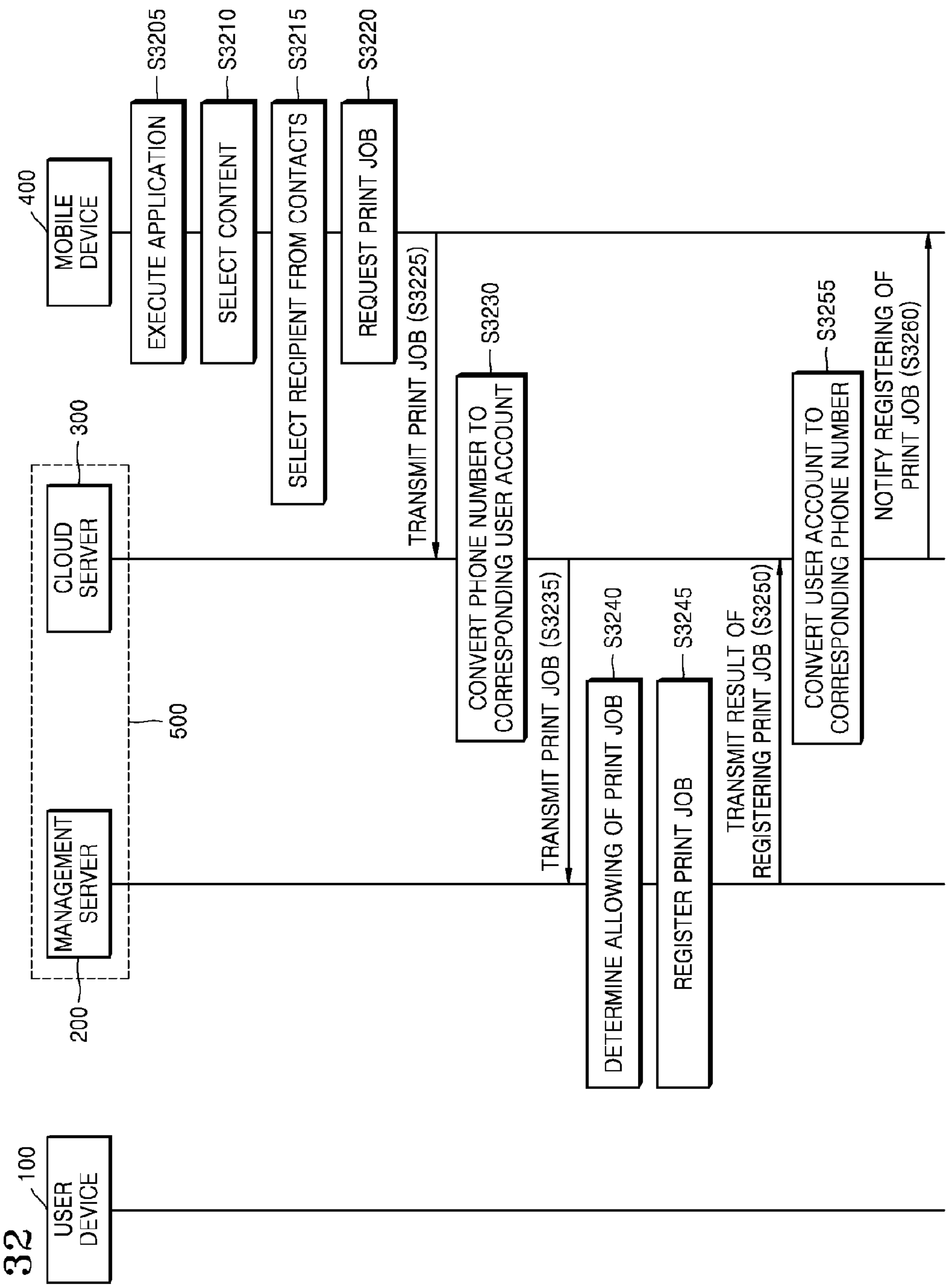
FIG. 32 is a diagram for describing a cloud printing service provided when a print job is requested by a mobile device, when a cloud printing service providing system in which a user account-based cloud printing service and a phone number-based cloud printing service are linked includes a public cloud server, according to an embodiment.

FIG. 32 is a diagram for describing a cloud printing service provided when a print job is requested by the mobile device 400, when the cloud printing service providing system 500 in which a user account-based cloud printing service and a phone number-based cloud printing service are linked includes a public cloud server, according to an embodiment. In other words, operations of the user device 100, the management server 200, the cloud server 300, and the mobile device 400 are described when a user, as a sender, transmits a print job from the mobile device 400 to the cloud printing service providing system 500 including the management server 200 and the cloud server 300.

The mobile device 400 may execute an application supporting a cloud printing service according to an input of the user, in operation S3205. In other words, the user may execute the application supporting the cloud printing service in the mobile device 400. The application may operate as an interface connecting the mobile device 400 and the cloud printing service providing system 500 in which the user account-based cloud printing service and the phone number-based cloud printing service are linked.

The user may select a content to be transmitted for a print job from the mobile device 400 in operation S3210. The mobile device 400 may obtain a file corresponding to the selected content so that the user may externally transmit the selected content.

The user, as a sender, may select a recipient from contacts of the mobile device 400 in operation S3215, in order to transmit the print job to another user. The contacts may be phone numbers of users, and may display a plurality of phone numbers for the user to select a phone number of the recipient.

The user may request the print job to be performed by using the mobile device 400, in operation S3220. In other words, the mobile device 400 may request the print job to be performed such that the selected recipient prints the file of the selected content.

The mobile device 400 may transmit the print job requested by the user to the cloud server 300, in operation S3225. In other words, the cloud server 300 may receive the print job. The print job received from the mobile device 400 to the cloud server 300 may be a phone number-based print job including a phone number and a print job.

The cloud server 300 may convert the phone number of the recipient included in the phone number-based print job transmitted from the mobile device 400 to a user account corresponding to the phone number, in operation S3230. In order to be connected to the management server 200 supporting the user account-based cloud printing service, the cloud server 300 converts the phone number included in the received print job to the user account corresponding to the phone number, thereby linking the phone number-based cloud printing service to the user account-based cloud printing service. Accordingly, the cloud server 300 may include the user information DB 3200 storing user information in which phone numbers of users and user accounts are matched to each other, as described above.

The cloud server 300 may transmit a user account-based print job including the user account converted from the phone number to the management server 200, in operation S3235. In other words, the management server 200 may receive the user account-based print job from the cloud server 300. The cloud server 300 and the management server 200 may perform a server-client communication, and data transferred therebetween may be in a format encoded by using a key. The print job transmitted from the cloud server 300 to the management server 200 may be the user account-based print job including the user account and the print job.

The management server 200 may determine allowing of the print job based on the user account, in operation S3240. The management server may determine the allowing of the print job based on the user account included in the user account-based print job. For example, the management server 200 may determine the allowing of the print job by checking the user account of the recipient obtained by converting the phone number of the recipient is a user account capable of receiving the cloud printing service.

The management server 200 may register the allowed print job according to a result of the allowing in operation S3245. Since the cloud server 300 included in the cloud printing service providing system 500 is a public cloud server, the print job is registered in the management server 200 as described above with reference to FIG. 28. The management server 200 may match a print job to ID information of the print job, and register the print job. When a plurality of print jobs exist in the same user account, the management server 200 may manage the print job by using the ID information. If the print job is not allowed, the user account-based print job transmitted to the management server 200 may be deleted.

The management server 200 may transmit a result of registering the print job to the cloud server 300, in operation S3250. In other words, the cloud server 300 may receive the result of registering from the management server 200. The management server 200 and the cloud server 300 may perform a server-client communication, and data transferred therebetween may be in a format encoded by using a key. The result of registering may include the user account of the recipient and the ID information for identifying the print job.

By transmitting the result of registering from the management server 200 to the cloud server 300, the cloud server 300 may again convert the user account of the recipient included in the result of registering to the phone number corresponding to the user account, in operation S3255. By converting the user account included in the result of registering back to the phone number in order to be connected to the mobile device 400 supporting the phone number-based cloud printing service, the user account-based cloud printing service and the phone number-based cloud printing service may be linked. Accordingly, the cloud server 300 may include the user information DB 3200 storing user information in which phone numbers of users and user accounts are matched, as described above.

The cloud server 300 may notify the mobile device 400 about the registering of the print job in operation S3260. The cloud server 300 may notify the registering of the print job by transmitting the ID information of the print job to the phone number converted back from the user account obtained in operation S3230.

As described above, the phone number-based print job requested to be performed through the mobile device 400 using the phone number by the sender is transmitted to the phone number of the recipient through the cloud printing service providing system 500 including the management server 200 and the cloud server 300, via processes of converting the phone number to the user account and converting the user account back to the phone number. At this time, the phone number-based cloud printing service is linked to the user account-based cloud printing service, and accordingly, the cloud server 300 may perform the processes of converting the phone number to the user account and converting the user account back to the phone number.

Then, the recipient may check the registered print job through the mobile device 400, and select the print job according to a pull print method to be performed.

Figure 33:
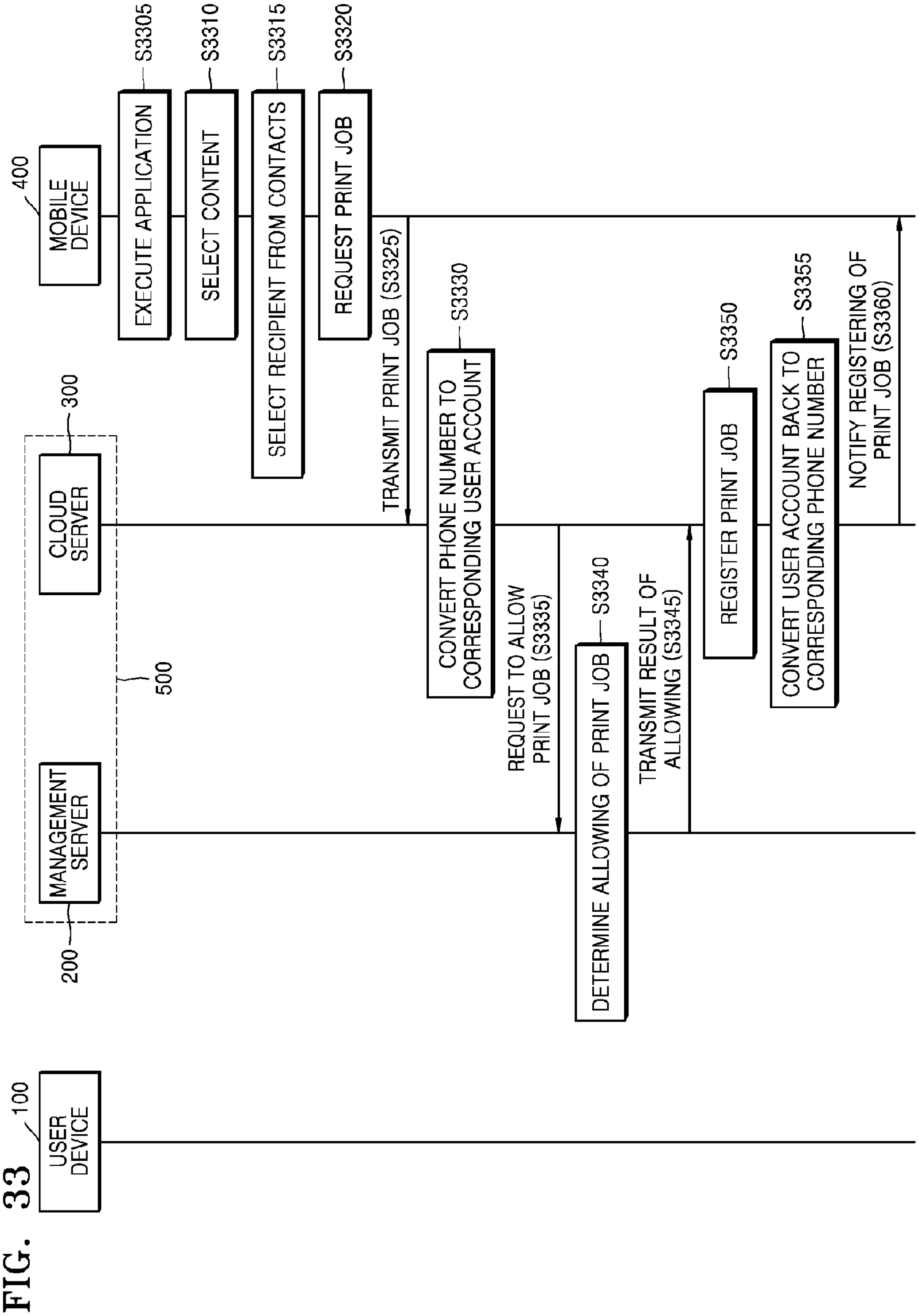
FIG. 33 is a diagram for describing a cloud printing service provided when a print job is requested by the mobile device, when a cloud printing service providing system in which a user account-based cloud printing service and a phone number-based cloud printing service are linked includes a private cloud server, according to an embodiment.

FIG. 33 is a diagram for describing a cloud printing service provided when a print job is requested by the mobile device 400, when the cloud printing service providing system 500 in which a user account-based cloud printing service and a phone number-based cloud printing service are linked includes a private cloud server, according to an embodiment. In other words, operations of the user device 100, the management server 200, the cloud server 300, and the mobile device 400 are described when a user, as a sender, transmits a print job from the mobile device 400 to the cloud printing service providing system 500 including the management server 200 and the cloud server 300.

Since FIG. 33 is different from FIG. 32 only in the type of the cloud server 300, overlapping descriptions are briefly described, and descriptions of FIG. 32 may be applied to FIG. 33 even if omitted.

The mobile device 400 may execute an application supporting a cloud printing service according to an input of the user, in operation S3305.

The user may select a content to be transmitted for a print job from the mobile device 400 in operation S3310.

The user, as a sender, may select a recipient from contacts of the mobile device 400 in operation S3315, in order to transmit the print job to another user.

The user may request the print job to be performed by using the mobile device 400, in operation S3320.

The mobile device 400 may transmit the print job requested by the user to the cloud server 300, in operation S3325. The print job received from the mobile device 400 to the cloud server 300 may be a phone number-based print job including a phone number and a print job.

The cloud server 300 may convert the phone number of the recipient included in the phone number-based print job transmitted from the mobile device 400 to a user account corresponding to the phone number, in operation S3330.

Operations S3305 through 3330 are respectively the same as operations S3205 through S3230 of FIG. 32.

The cloud server 300 may transmit a request to allow the print job requested by the user to the management server 200, in operation S3335. In other words, the management server 200 may receive the request to allow the print job from the cloud server 300. The cloud server 300 and the management server 200 may perform a server-client communication, and data transferred therebetween may be in a format encoded by using a key. The request transmitted from the cloud server 300 to the management server 200 may include the converted user account. In other words, the user account of the recipient is transmitted to the management server 200 so that the management server 200 determines whether the print job is allowed.

The management server 200 may determine allowing of the print job based on the user account, in operation S3340. The management server 200 may determine the allowing of the print job based on the converted user account. For example, the management server 200 may determine the allowing of the print job by checking whether the user account of the recipient converted from the phone number of the recipient is capable of receiving the cloud printing service.

The management server 200 may transmit a result of allowing to the cloud server 300, in operation S3345. In other words, the cloud server 300 may receive the result of allowing from the management server 200. The management server 200 and the cloud server 300 may perform a server-client communication, and data transferred therebetween may be in a format encoded by using a key. The result of allowing may include the user account of the recipient and a value indicating the result of allowing.

The cloud server 300 may register the allowed print job in operation S3350, according to the result of allowing. Since the cloud server 300 included in the cloud printing service providing system 500 is a private cloud server, the print job may be registered in the cloud server 300 as described above with reference to FIG. 29. The cloud server 300 may match a print job to ID information of the print job and store the print job. When a plurality of print jobs exist in the same user account, the cloud server 300 may manage the print job by using ID information of the print jobs. If the print job is not allowed, the print job transmitted to the cloud server 300 may be deleted.

The cloud server 300 may convert the user account of the recipient regarding the registered print job back to the phone number corresponding to the user account, in operation S3355. By converting the user account of the recipient regarding the print job registered in the cloud server 300 back to the phone number in order to be connected to the mobile device 400 supporting the phone number-based cloud printing service, the user account-based cloud printing service and the phone number-based cloud printing service may be linked. Accordingly, the cloud server 300 may include the user information DB 3200 storing user information in which phone numbers of users and user accounts are matched, as described above.

The cloud server 300 may notify the mobile device 400 about the registering of the print job in operation S3360. The cloud server 300 may notify the registering of the print job by transmitting the ID information of the print job to the phone number converted back from the user account obtained in operation S3330.

As described above, the phone number-based print job requested to be performed through the mobile device 400 using the phone number by the sender is transmitted to the phone number of the recipient through the cloud printing service providing system 500 including the management server 200 and the cloud server 300, via processes of converting the phone number to the user account and converting the user account back to the phone number. At this time, the phone number-based cloud printing service is linked to the user account-based cloud printing service, and accordingly, the cloud server 300 may perform the processes of converting the phone number to the user account and converting the user account back to the phone number.

Then, the recipient may check the registered print job through the mobile device 400, and select the print job according to a pull print method to be performed.

Figure 34:
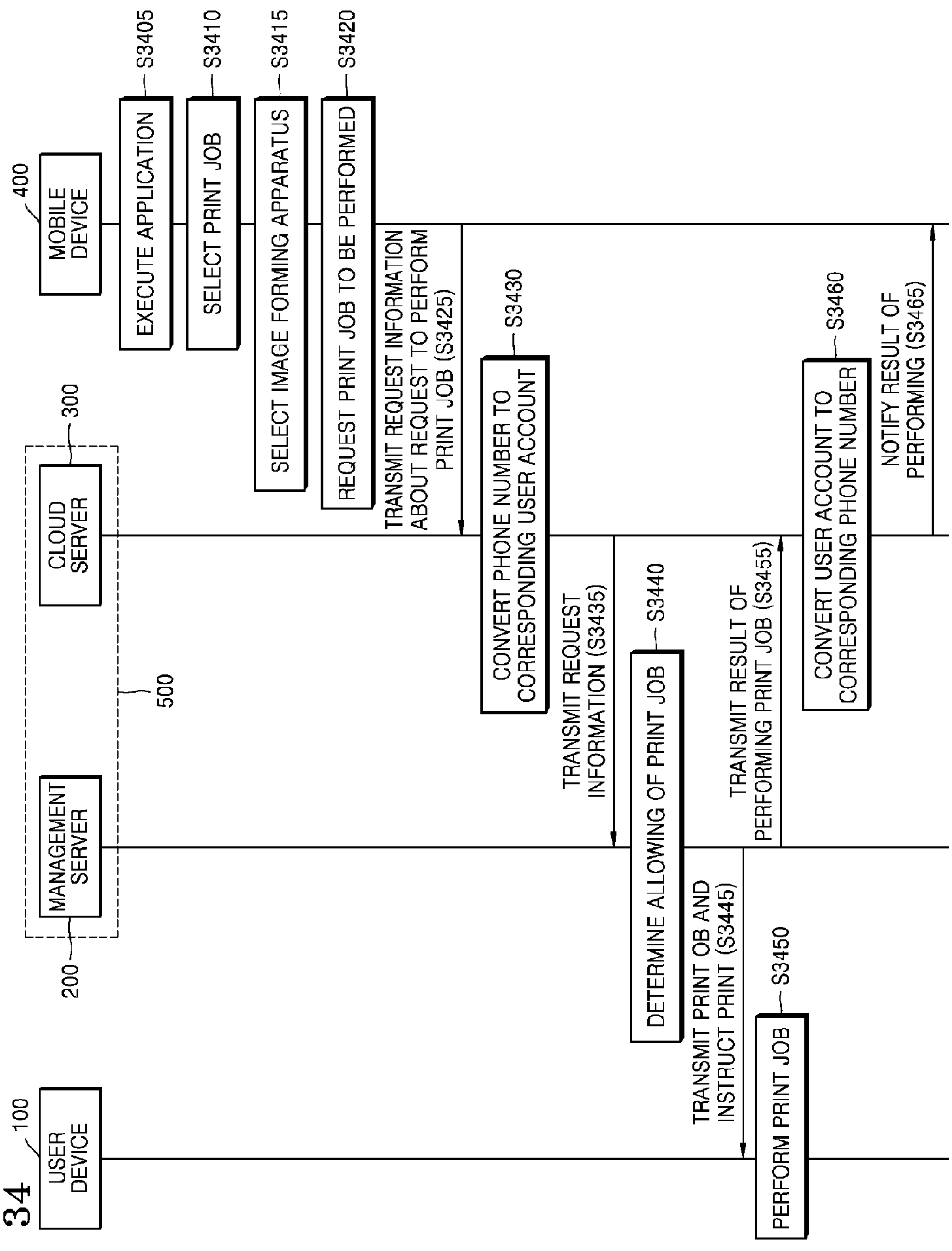
FIG. 34 is a diagram for describing a cloud printing service for a mobile device of a recipient requesting to perform a print job according to a pull printing method, when a cloud printing service providing system in which a user account-based cloud printing service and a phone number-based cloud printing service are lined includes a public cloud server, according to an embodiment.

FIG. 34 is a diagram for describing a cloud printing service for the mobile device 400 of the recipient requesting to perform a print job according to a pull printing method, when the cloud printing service providing system 500 in which a user account-based cloud printing service and a phone number-based cloud printing service are lined includes a public cloud server, according to an embodiment. In other words, operations of the user device 100, the management server 200, the cloud server 300, and the mobile device 400 are described when the user checks that the print job is registered in the mobile device 400 and transmits the request to perform the print job to the cloud printing service providing system 500 including the management server 200 and the cloud server 300.

The mobile device 400 may execute an application supporting the cloud printing service according to an input of the user, in operation S3405. In other words, the user may execute the application supporting the cloud printing service in the mobile device 400. The application supporting the cloud printing service may operate as an interface connecting the mobile device 400 and the cloud printing service providing system 500 in which the user account-based cloud printing service and the phone number-based cloud printing service are linked.

In operation S3410, the user may select a print job in the mobile device 400. The mobile device 400 may display a list of print jobs related to the registered print job for the user, and the user may select a print job.

In operation S3415, the user may further select an image forming apparatus to be used for the print job in the mobile device 400.

The user may request the print job to be performed by using the mobile device 400, in operation S3420. In other words, the print job may be requested to be performed so that the image forming apparatus selected in the mobile device 400 performs the selected print job.

The mobile device 400 may transmit request information about the request to perform the print job from the user to the cloud server 300, in operation S3425. In other words, the cloud server 300 may receive the request information. The request information received from the mobile device 400 to the cloud server 300 may include a phone number and ID information of the print job for identifying the print job selected by the user. If the image forming apparatus is selected by the user, the request information may further include ID information of the image forming apparatus for identifying the selected image forming apparatus.

The cloud server 300 may convert the phone number of the recipient included in the request information received from the mobile device 400 to a user account corresponding to the phone number, in operation S3430. The cloud server 300 converts the phone number to the user account corresponding to the phone number in order to be connected to the management server 200 supporting the user account-based cloud printing service, thereby linking the phone number-based cloud printing service and the user account-based cloud printing service. Accordingly, the cloud server 300 may include the user information DB 3200 storing user information in which phone numbers of users and user accounts are matched, as described above.

The cloud server 300 may transmit the request information including the user account converted from the phone number to the management server 200, in operation S3435. In other words, the management server 200 may receive the request information including the converted user account from the cloud server 300. The cloud server 300 and the management server 200 may perform a server-client communication, and data transferred therebetween may be in a format encoded by using a key.

The management server 200 may determine allowing of the print job based on the user account included in the request information, in operation S3440. For example, the management server 200 may determine the allowing of the print job by checking whether the user account of the recipient converted from the phone number of the recipient is capable of receiving the cloud printing service.

The management server 200 may instruct the print job to be performed in operation S3445, according to a result of allowing. Since the cloud server 300 included in the cloud printing service providing system 500 is a public cloud server, the print job may be registered in the management server 200. If the print job is allowed, the print job corresponding to the ID information of the print job may be transmitted to the image forming apparatus connected to the management server 200, and then instructed to be performed. The image forming apparatus is usable via user authentication using the user account, and may be an example of the user device 100 connected to the management server 200.

The image forming apparatus that is an example of the user device 100 may perform the print job in operation S3450, upon receiving the instruction from the management server 200.

The management server 200 may transmit a result of performing the print job to the cloud server 300, in operation S3455. In other words, the cloud server 300 may receive the result of performing from the management server 200. The management server 200 and the cloud server 300 may perform a server-client communication, and data transferred therebetween may be in a format encoded by using a key. The result of performing may include the user account of the recipient and a value indicating the result of performing.

By transmitting the result of performing from the management server 200 to the cloud server 300, the cloud server 300 may convert the user account of the recipient included in the result of performing back to the phone number corresponding to the user account, in operation S3460. In order to be connected to the mobile device 400 supporting the phone number-based cloud printing service, the user account included in the result of performing is converted back to the phone number so that the user account-based cloud printing service and the phone number-based cloud printing service are linked to each other. Accordingly, the cloud server 300 includes the user information DB 3200 storing user information in which phone numbers of users and user accounts are matched, as described above.

The cloud server 300 may notify the result of performing the print job to the mobile device 400, in operation S3465. The cloud server 300 may transmit the value indicating the result of performing to the phone number converted back from the user account in operation S3430 to notify the user about the result of performing through the mobile device 400.

Figure 35:
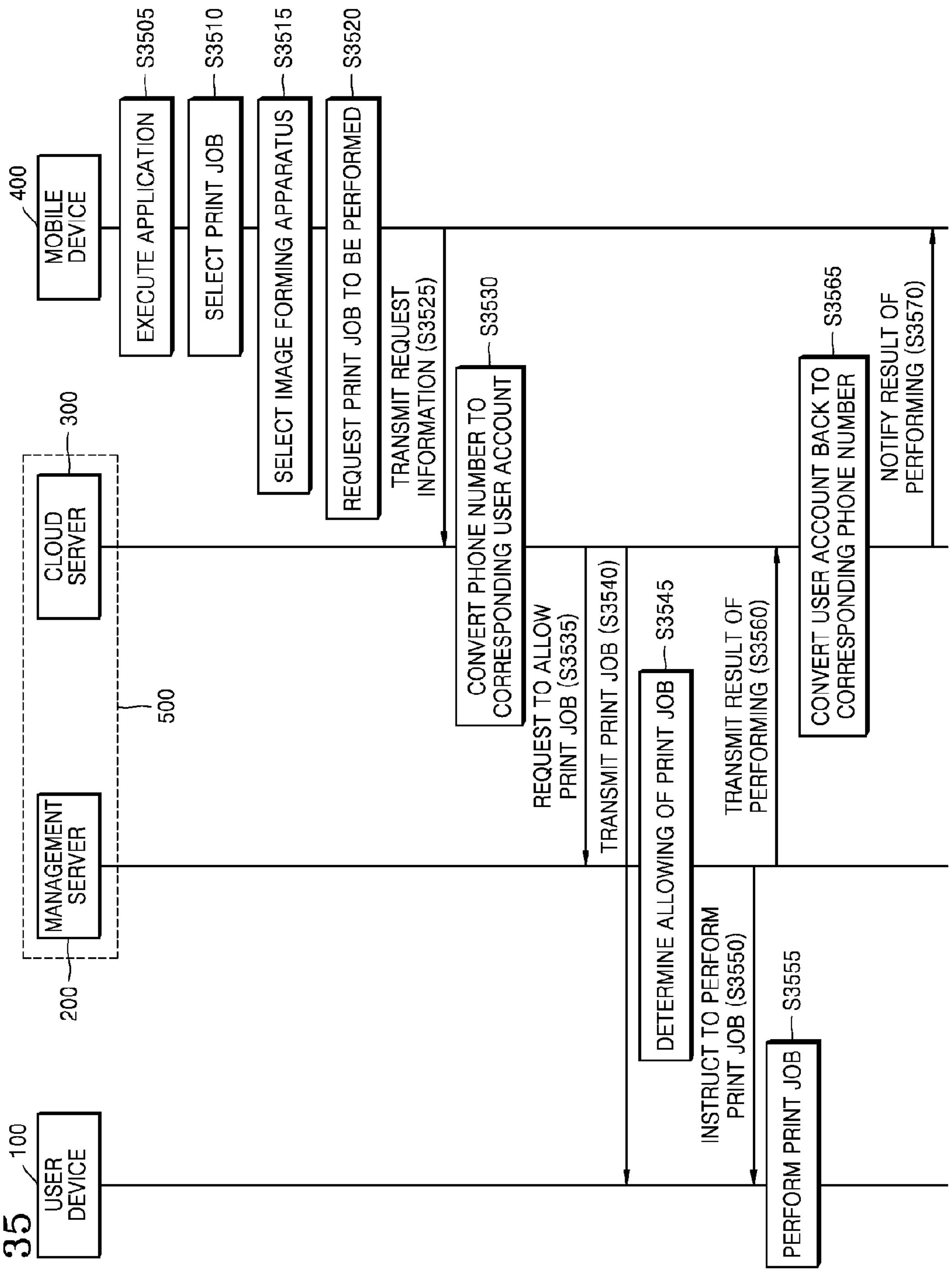
FIG. 35 is a diagram for describing a cloud printing service for a mobile device of a recipient requesting to perform a print job according to a pull printing method, when a cloud printing service providing system in which a user account-based cloud printing service and a phone number-based cloud printing service are lined includes a private cloud server, according to an embodiment.

FIG. 35 is a diagram for describing a cloud printing service for the mobile device 400 of the recipient requesting to perform a print job according to a pull printing method, when the cloud printing service providing system 500 in which a user account-based cloud printing service and a phone number-based cloud printing service are lined includes a private cloud server, according to an embodiment. In other words, operations of the user device 100, the management server 200, the cloud server 300, and the mobile device 400 are described when the user checks that the print job is registered in the mobile device 400 and transmits the request to perform the print job to the cloud printing service providing system 500 including the management server 200 and the cloud server 300.

Since FIG. 35 is different from FIG. 34 only in the type of the cloud server 300, overlapping descriptions are briefly described, and descriptions of FIG. 34 may be applied to FIG. 35 even if omitted.

The mobile device 400 may execute an application supporting the cloud printing service according to an input of the user, in operation S3505.

In operation S3510, the user may select a print job in the mobile device 400.

In operation S3515, the user may further select an image forming apparatus to be used for the print job in the mobile device 400.

The user may request the print job to be performed by using the mobile device 400, in operation S3520.

The mobile device 400 may transmit request information about the request to perform the print job from the user to the cloud server 300, in operation S3525.

The cloud server 300 may convert the phone number of the recipient included in the request information received from the mobile device 400 to a user account corresponding to the phone number, in operation S3530.

Operations S3505 through 3530 are respectively the same as operations S3405 through S3430 of FIG. 34.

The cloud server 300 may transmit a request to allow the print job from the user to the management server 200, in operation S3535. The request to allow the print job received from the cloud server 300 to the management server 200 may include a user account. In other words, by transmitting the user account converted from the phone number to the management server 200, the management server 200 may determine whether the print job is allowed. The cloud server 300 and the management server 200 may perform a server-client communication, and data transferred therebetween may be encoded by using a key.

The cloud server 300 may transmit the print job requested by the user to the image forming apparatus that is an example of the user device 100, in operation S3540. Since the cloud server 300 included in the cloud printing service providing system 500 is a private cloud server, the print job may be registered in the cloud server 300. Operation 3540 may be performed simultaneously with operation S3535 or after operation S3545.

The management server 200 may determine allowing of the print job based on the user account included in the request information, in operation S3545. For example, the management server 200 may check whether the user account of the recipient converted from the phone number of the recipient is capable of receiving the cloud printing service to determine the allowing of the print job.

The management server 200 may instruct the print job to be performed in operation S3550, according to a result of allowing.

The image forming apparatus that is an example of the user device 100 may perform the print job in operation S3555, upon receiving the instruction from the management server 200.

The management server 200 may transmit a result of performing the print job to the cloud server 300, in operation S3560. In other words, the cloud server 300 may receive the result of performing from the management server 200. The management server 200 and the cloud server 300 may perform a server-client communication, and data transferred therebetween may be in a format encoded by using a key. The result of performing may include the user account of the recipient and a value indicating the result of performing.

By transmitting the result of performing from the management server 200 to the cloud server 300, the cloud server 300 may convert the user account of the recipient included in the result of performing back to the phone number corresponding to the user account, in operation S3565. In order to be connected to the mobile device 400 supporting the phone number-based cloud printing service, the user account included in the result of performing is converted back to the phone number so that the user account-based cloud printing service and the phone number-based cloud printing service are linked to each other. Accordingly, the cloud server 300 includes the user information DB 3200 storing user information in which phone numbers of users and user accounts are matched, as described above.

The cloud server 300 may notify the result of performing the print job to the mobile device 400, in operation S3570. The cloud server 300 may transmit the value indicating the result of performing to the phone number converted back from the user account in operation S3530 to notify the user about the result of performing through the mobile device 400.

Figure 36:
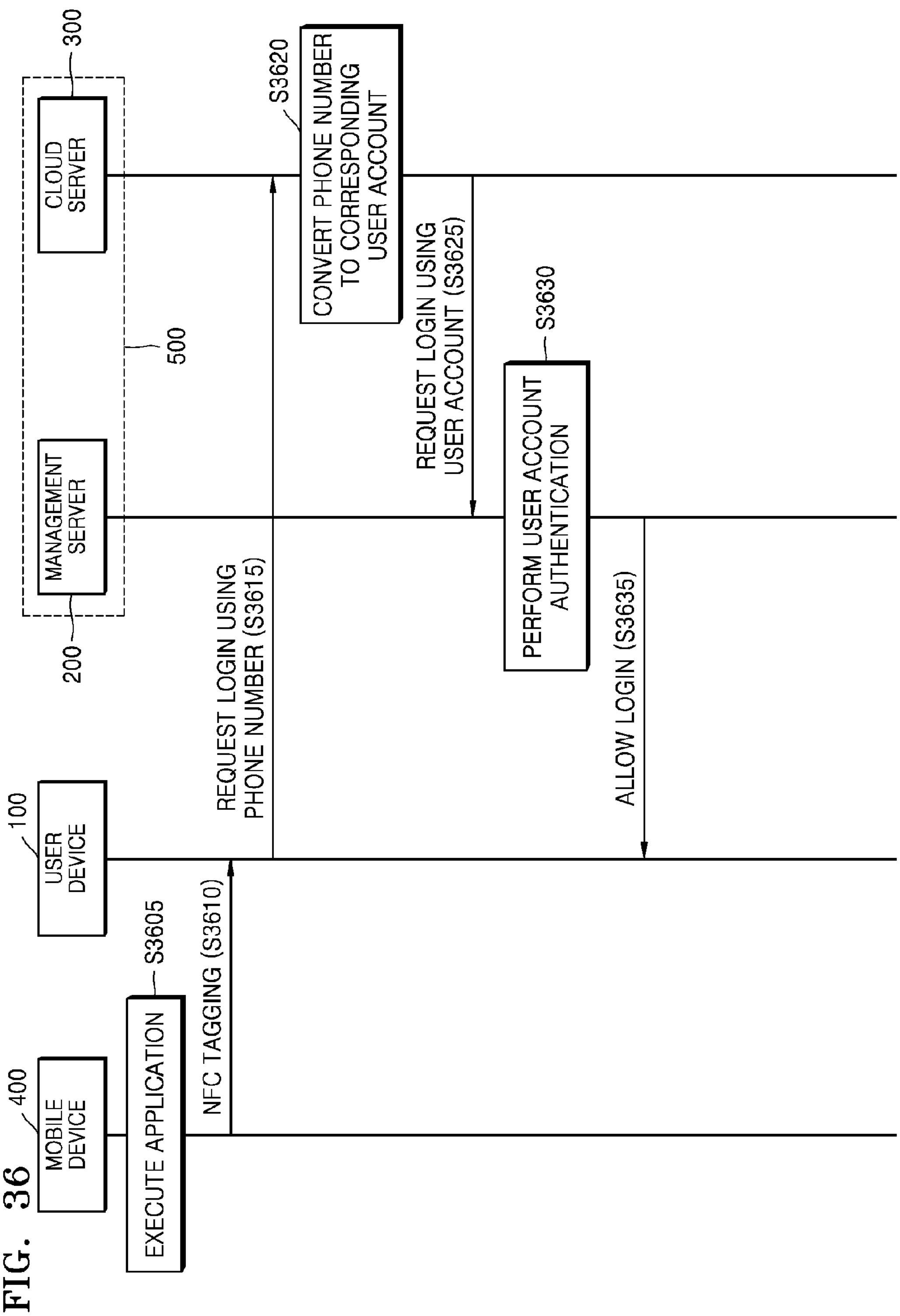
FIG. 36 is a diagram for describing logging in of the user device based on a phone number, by using a cloud printing service providing system in which a user account-based cloud printing service and a phone number-based cloud printing service are linked, according to an embodiment.

FIG. 36 is a diagram for describing logging in of the user device 100 based on a phone number, by using the cloud printing service providing system 500 in which a user account-based cloud printing service and a phone number-based cloud printing service are linked, according to an embodiment. In other words, operations of the user device 100, the management server 200, the cloud server 300, and the mobile device 400 are described when the user transmits the phone number to the cloud printing service providing system 500 including the management server 200 and the cloud server 300 through the user device 100 by using the mobile device 400, in order to log in the user device 100.

The mobile device 400 may execute an application supporting the cloud printing service according to an input of the user, in operation S3605. In other words, the user may execute the application supporting the cloud printing service in the mobile device 400. In order to be provided with the cloud printing service of the cloud printing service providing system 500, the user device 100 first needs to be logged in, and thus the user may try to log in the user device 100 by using the mobile device 400 where the application is being executed.

The mobile device 400 may transmit the phone number to the user device 100 via an NFC-tagging with the user device 100, in operation S3610. A data communication between the mobile device 400 and the user device 100 may not only be performed via the NFC-tagging, but also via any one of various wireless communications, such as a near-infrared ray communication, Zigbee®, Bluetooth®, infrared data association (IrDA) and Wi-Fi Direct®. By transmitting user information, such as a phone number, to the user device 100, the user device 100 may obtain information for user authentication. Since the management server 200, allows a login and user authentication based on a user account, the user authentication is not obtained from the management server 200 by using a phone number. Accordingly, the phone number is converted to the user account so that the user device 100 is logged in.

The user device 100 may transmit the phone number received from the mobile device 400 again to the cloud server 300 to request the login of the user device 100, in operation S3615. Here, ID information of the user device 100 to be logged in may also be transmitted.

The cloud server 300 may transmit the phone number transmitted from the user device 100 to the user account corresponding to the phone number, in operation S3620. Accordingly, the cloud server 300 may include the user information DB 3200 storing user information in which phone numbers of users and user accounts are matched.

The cloud server 300 may transmit the user account converted from the phone number to the management server 200, instead of the user device 100, so as to request the login of the user device 100, in operation S3625. The ID information of the user device 100 to be logged in may also be transmitted.

The management server 200 may perform user account authentication on the user account received from the cloud server 300, in operation S3630. Accordingly, the management server 200 may include the user account DB 220 for storing and managing user accounts capable of receiving a cloud printing service. The management server 200 checks whether the user account received from the cloud server 300 exists in the user account DB 220 to perform the user account authentication.

When the user account received from the cloud server 300 exists in the user account DB 2200, the management server 200 may allow the login of the user device 100 corresponding to the user account, in operation S3635. Then there are a plurality of the user devices 100 corresponding to the user account, the user device 100 that requested the login may be determined based on the ID information of the user device 100 transmitted with the user account.

By performing the login of the user device 100 as such, the cloud printing service may be provided by using the user device 100.

Figure 37:
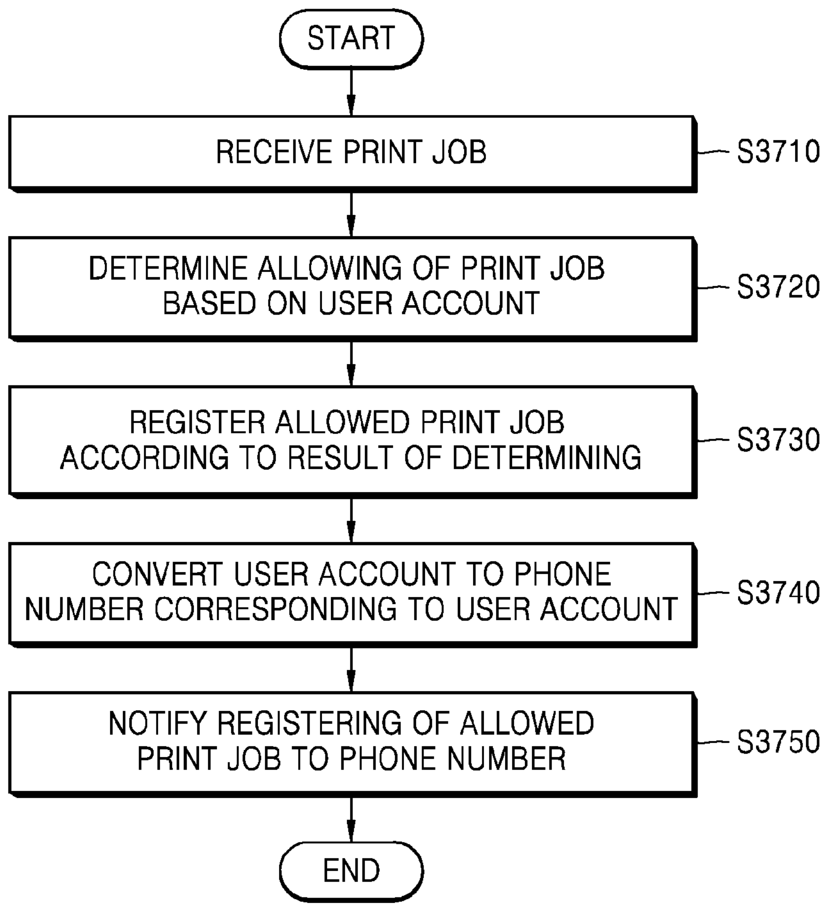
FIG. 37 is a flowchart of a method of providing a cloud printing service, according to an embodiment.

FIG. 37 is a flowchart of a method of providing a cloud printing service, according to an embodiment. The descriptions about the cloud printing service providing system 500 may be applied to the method of FIG. 37 even if omitted.

FIG. 37 shows processes performed when the user requests another use to transmit a print job through the cloud printing service providing system 500.

First, in operation S3710, the cloud printing service providing system 500 may receive the print job. For example, the management server 200 included in the cloud printing service providing system 500 may receive a user account-based print job from the user device 100. Alternatively, the cloud server 300 included in the cloud printing service providing system 500 may receive a user account-based print job from the user device 100 or a phone number-based print job from the mobile device 400. When the phone number-based print job is received, an operation of converting a phone number to a user account corresponding to the phone number may be further performed for following operations.

In operation S3720, the cloud printing service providing system 500 may determine allowing of the print job based on the user account. Since the allowing of the print job is determined by the management server 200 supporting the user account-based cloud printing service, the allowing of the print job may be determined by using the user account included in the received print job or the user account converted from the phone number.

In operation S3730, the cloud printing service providing system 500 may register the allowed print job according to a result of the determining. A location of registering the allowed print job may differ based on a type of the cloud server 300 included in the cloud printing service providing system 500. For example, when the cloud server 300 is a public cloud server, the allowed print job may be stored in the management server 200. On the other hand, when the cloud server 300 is a private cloud server, the allowed print job may be stored in the cloud server 300. In detail, when the cloud server 300 is a private cloud server, the management server 200 may transmit the result of determining to the cloud server 300 so that the allowed print job is registered in the cloud server 300.

In operation S3740, the cloud printing service providing system 500 may convert the user account to the phone number corresponding to the user account so as to notify the registering of the print job in the mobile device 400 supporting the phone number-based cloud printing service. Accordingly, the cloud server 300 may include the user information DB 3200 storing user information in which phone numbers of users and user accounts are matched. However, when the cloud server 300 is a public cloud server, the result of registering is transmitted from the management server 200 to the cloud server 300 so that the cloud server 300 converts the user account to the corresponding phone number.

In operation S3750, the cloud printing service providing system 500 may notify the registering of the allowed print job to the phone number converted from the user account.

The user account-based cloud printing service is linked to the phone number-based cloud printing service through operations S3710 through S3750, and at this time, the cloud server 300 may convert the user account to the phone number corresponding to the user account.

Figure 38:
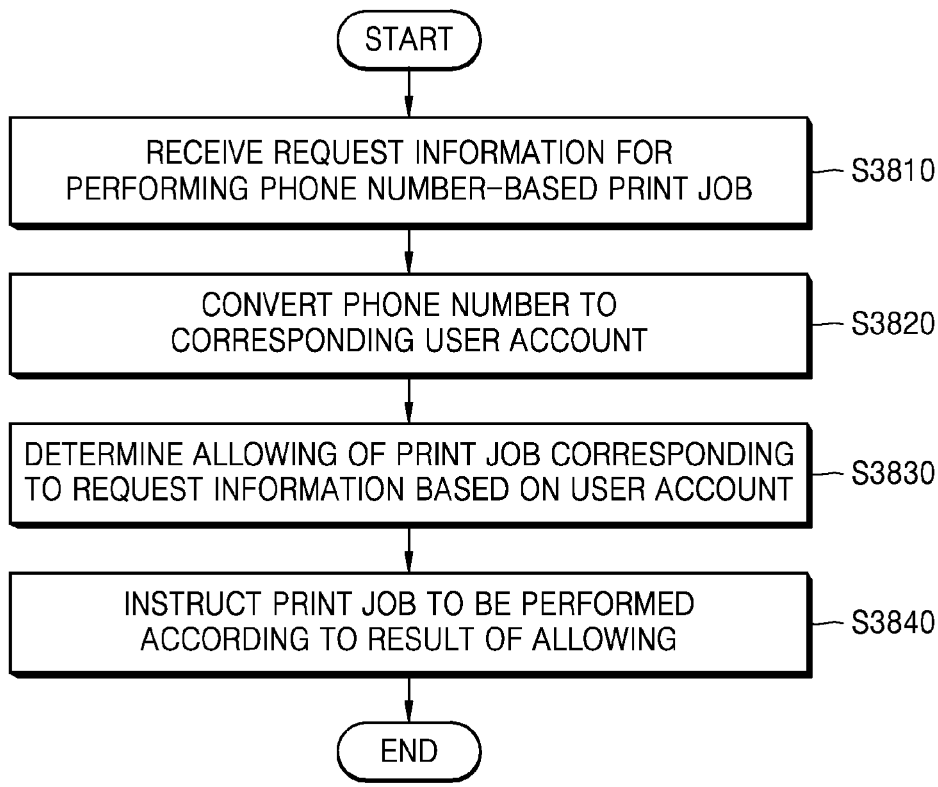
FIG. 38 is a flowchart of a method of providing a cloud printing service, according to an embodiment.

FIG. 38 is a flowchart of a method of providing a cloud printing service, according to an embodiment. The descriptions about the cloud printing service providing system 500 may be applied to the method of FIG. 38 even if omitted.

FIG. 38 shows processes performed when a user requests the cloud printing service providing system 500 to perform a print job in a pull print method by using the mobile device 400.

First, in operation S3810, the cloud printing service providing system 500 may receive request information for performing a phone number-based print job. In detail, the cloud server 300 supporting a phone number-based cloud printing service and included in the cloud printing service providing system 500 may receive the request information including a phone number and ID information of a print job for identifying a print job selected by the user from the mobile device 400. If the user selected an image forming apparatus through the mobile device 400, the request information may further include ID information of the image forming apparatus.

In operation S3820, the cloud printing service providing system 500 may convert the phone number to a user account corresponding to the phone number. In detail, the cloud server 300 supporting the phone number-based cloud printing service and included in the cloud printing service providing system 500 may convert the phone number included in the request information received from the mobile device 400 to the user account corresponding to the phone number. Accordingly, the cloud server 300 may include the user information DB 3200 storing user information in which phone numbers of users and user accounts are matched. As such, the phone number-based cloud printing service and the user account-based cloud printing service may be linked.

In operation S3830, the cloud printing service providing system 500 may determine allowing of the print job corresponding to the request information based on the converted user account. In detail, the management server 200 supporting the user account-based cloud printing service and included in the cloud printing service providing system 500 may determine the allowing of the print job by receiving the request information from the cloud server 300 or receiving a request to allow the print job using the converted user account. For example, when the cloud server 300 included in the cloud printing service providing system 500 is a public cloud server, since the print job is registered in the management server 200, the request information including the converted user account and the ID information of the print job is transmitted to the management server 200, and thus the management server 200 may determine the allowing of the print job. Alternatively, when the cloud server 300 included in the cloud printing service providing system 500 is a private cloud server, since the print job is registered in the cloud server 300, the print job is allowed by using the converted user account, and thus the management server 200 may determine the allowing of the print job.

In operation S3840, the cloud printing service providing system 500 may instruct the allowed print job to be performed according to a result of allowing the print job. In detail, the management server 200 supporting the user account-based cloud printing service and included in the cloud printing service providing system 500 may instruct the image forming apparatus to perform the allowed print job. When the cloud server 300 included in the cloud printing service providing system 500 is a public cloud server, since the print job is registered in the management server 200, the management server 200 may transmit the allowed print job to the image forming apparatus to instruct the image forming apparatus to perform the allowed print job. On the other hand, when the cloud server 300 included in the cloud printing service providing system 500 is a private cloud server, since the print job is registered in the cloud server 300, the cloud server 300 may transmit the allowed print job to the image forming apparatus and the management server 200 may instruct the image forming apparatus to perform the allowed print job.

Then, in order to transmit a result of performing the print job to the mobile device 400, the management server 200 may transmit the result of performing to the mobile device 400 through the cloud server 300. The cloud server 300 converts the user account back to the phone number to transmit the result of performing to the mobile device 400 corresponding to the phone number.

The phone number-based cloud printing service is linked to the user account-based cloud printing service through operations S3810 through S3840, and at this time, the cloud server 300 may convert the phone number to the user account corresponding to the phone number.

According to an embodiment, a recipient may set print job conditions in a cloud server, and the cloud server may transmit a print job to at least one of electronic devices connected according to the set print job conditions such that the print job is performed.

Generally, when it is not suitable for a recipient to receive a print job or for an image forming apparatus to perform a print job in a cloud printing service provided by a cloud server, and a sender transmits a content to be printed, the recipient is unable to check the print job or the image forming apparatus is unable to perform the print job.

Accordingly, one or more embodiments provide a method enabling a recipient to set print job conditions and a cloud server to transmit a print job to at least one of electronic devices connected according to the set print job conditions such that the print job is performed. An embodiment will now be described in detail with reference to FIGS. 39 through 50.

Figure 39:
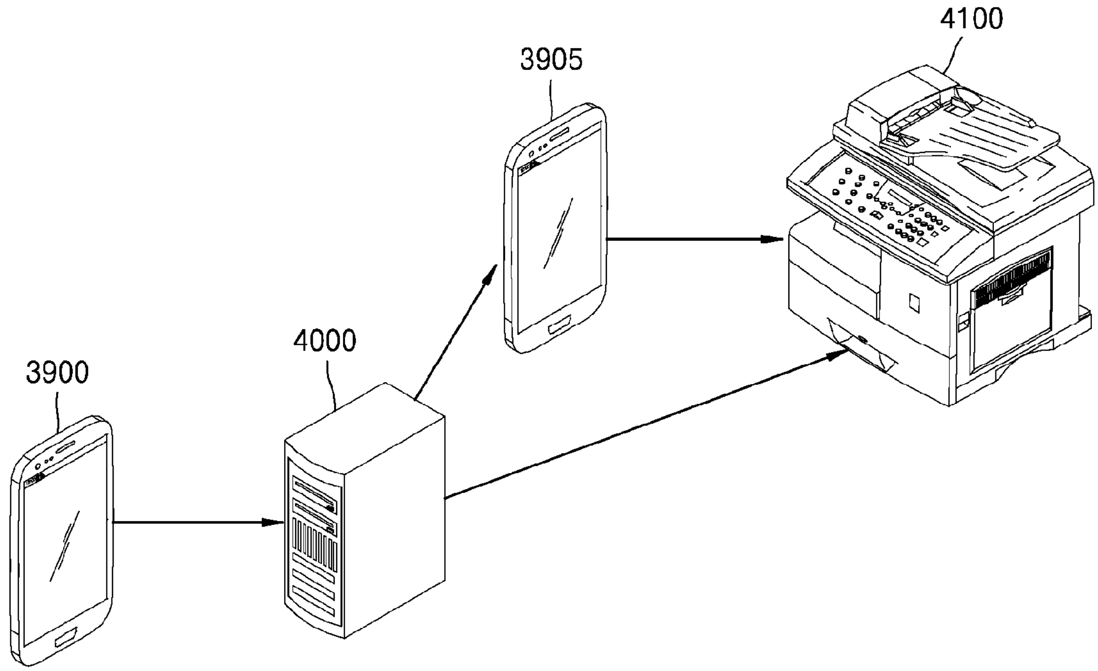
FIG. 39 is a diagram of an environment of a cloud printing system.

FIG. 39 is a diagram of an environment of a cloud printing system.

The cloud printing system may include a mobile terminal 3900, a cloud server 4000, an image forming apparatus 4100, and a mobile terminal 3905. Any one of various electronic devices, such as a laptop, a tablet, a personal computer (PC), portable media player (PMP), digital camera, laptop computer, notebook computer, portable game player, wearable device, and a personal digital assistant (PDA) may replace a mobile terminal to perform the same functions as the mobile terminal.

In the cloud printing system, a user uploads data in the mobile terminal 3900 to the cloud server 4000. Then, the user may request the cloud server 4000 to print the data any time at any place. For example, the user may request the cloud server 4000 for the data by using the mobile terminal 3905 or the image forming apparatus 4100, and the data may be printed by the image forming apparatus 4100.

A storage space may be provided in the cloud server 4000 according to users, and each storage space may be mapped to correspond to a phone number of a mobile device of each user.

Then, the user transmits a print job destined for a phone number of the mobile terminal 3905 to the cloud server 4000 by using the mobile terminal 3900. The cloud server 4000 stores a print job in the storage space mapped to correspond to the phone number of the mobile terminal 3905.

The user checks the print job in the storage space by using the mobile terminal 3905. The cloud server 4000 transmits the print job to the mobile terminal 3905 according to a request of the user. The mobile terminal 3905 receives the print job, and the user checks details of the print job through a preview by using the mobile terminal 3905. The user may enable the image forming apparatus 4100 to perform the print job by transmitting the print job to the image forming apparatus 4100 connected to the mobile terminal 3905. The cloud server 4000 may map a phone number to each image forming apparatus included in the cloud printing system, and use the mapped phone number as a destination address for data transmission. The cloud server 4000 may include a storage space according to image forming apparatuses, and each storage space may be mapped to correspond to each of phone numbers of the image forming apparatuses. For example, a phone number (031-xxx-yyyy) may be mapped to correspond to the image forming apparatus 4100, and the mapped phone number (031-xxx-yyyy) may be used as a destination address. Accordingly, when the user requests the cloud server 4000 for the print job destined for the mapped phone number by using the mobile terminal 3900, the cloud server 4000 stores the print job in the storage space for the image forming apparatus 4100. Then, the cloud server 4000 may transmit the stored print job to the image forming apparatus 4100. The image forming apparatus 4100 receives the print job and performs the received print job.

The user may check the storage space for the image forming apparatus 4100 in the cloud server 4000 by using the image forming apparatus 4100. The cloud server 4000 transmits the print job stored in the storage space according to a request of the user. The image forming apparatus 4100 may receive and perform the print job.

Also, the cloud server 4000 may map the image forming apparatus 4100 to correspond to a phone number of the mobile terminal 3905 of the user, and may use the mapped phone number as a destination address for data transmission. As described above, since the cloud server 4000 may include the storage space according to users, the storage space may be mapped to correspond to the phone number of the mobile terminal 3905.

When the user transmits the print job destined for the phone number of the mobile terminal 3905 to the cloud server 4000 by using the mobile terminal 3900, the cloud server 4000 stores the print job in the storage space of the user. The cloud server 4000 transmits the print job stored in the storage space to the image forming apparatus 4100. The image forming apparatus 4100 receives and performs the print job.

In the environment of the cloud printing system based on a phone number, it is difficult to perform the print job if the user is unable to check the print job. In other words, it is difficult to perform the print job when the user of the mobile terminal 3905 is absent and thus unable to check the print job.

Also, when the print job is transmitted to the image forming apparatus 4100 mapped to a certain phone number but the image forming apparatus 4100 is not suitable for performing the print job, the print job may be difficult to be performed. In other words, when the image forming apparatus 4100 is malfunctioning or only supports black and white whereas the print job is in color, the print job may be difficult to be performed.

Figure 40:
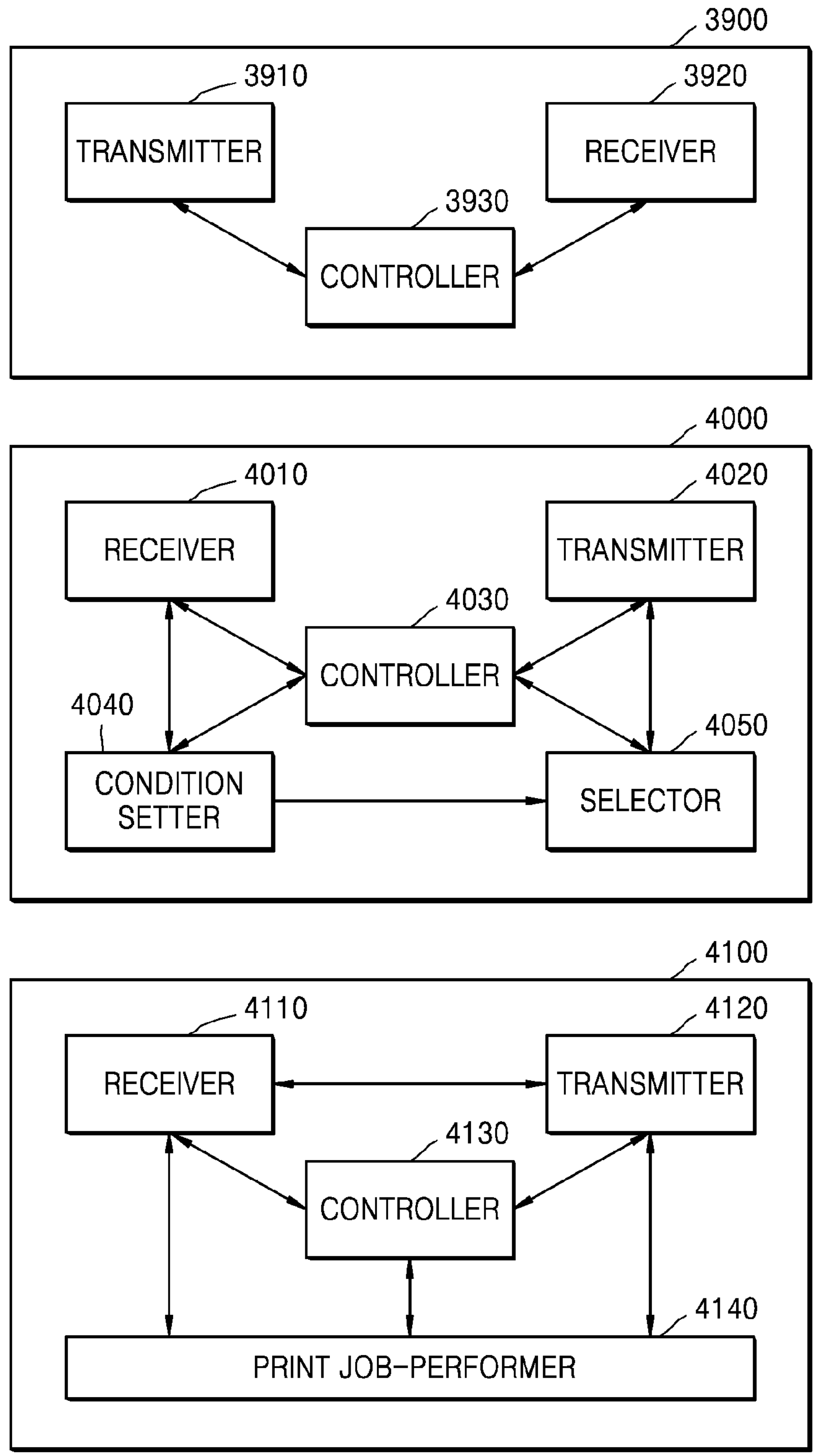
FIG. 40 is a block diagram of the cloud printing system, according to an embodiment.

FIG. 40 is a block diagram of the cloud printing system, according to an embodiment.

Referring to FIG. 40, the cloud printing system includes the mobile terminal 3900, the cloud server 4000, and the image forming apparatus 4100.

The mobile terminal 3900 included in the cloud printing system transmits the print job to the cloud server 4000. The cloud server 4000 receives the print job, and selects the image forming apparatus 4100 from among image forming apparatuses connected according to print job conditions. The cloud server 4000 transmits the print job to the image forming apparatus 4100. The image forming apparatus 4100 receives and performs the print job.

The mobile terminal 3900 includes a transmitter 3910, a receiver 3920, and a controller 3930.

The transmitter 3910 transmits data. In detail, the transmitter 3910 transmits data including the print job, and the receiver 3920 receives the data.

The controller 3930 may control the transmitter 3910 to transmit the print job destined for at least one phone number.

The mobile terminal 3900 may further include an interface unit (not shown) for receiving an input from the user.

The controller 3930 controls the transmitter 3920 to receive information indicating print job conditions from the interface unit and to transmit the information indicating the print job conditions to the cloud server 4000.

The cloud server 4000 includes a receiver 4010, a transmitter 4020, a controller 4030, a condition setter 4040, and a selector 4050.

The receiver 4010 receives the data. In detail, the receiver 4010 may receive the print job. Also, the receiver 4010 may receive the information indicating the print job conditions. Also, the receiver 4010 may include an ARS connector and receive the information indicating the print job conditions from an ARS server.

The transmitter 4020 transmits the data. In detail, the transmitter 4020 may transmit the print job.

The controller 4030 may control the receiver 4010 to receive the print job destined for at least one phone number. In detail, the controller 4030 may control the receiver 4010 to receive the print job destined for a group of a plurality of phone numbers. Also, the controller 4030 may control the transmitter 4020 to transmit the print job to a selected image forming apparatus. The controller 4030 may control the receiver 4010 to receive the information indicating the print job conditions from the mobile terminal 3900. The controller 4030 may control the receiver 4010 to receive the information indicating the print job conditions from the ARS server. Also, the controller 4030 may control the condition setter 4040 to set the print job conditions based on the received information indicating the print job conditions.

The condition setter 4040 sets the print job conditions and the selector 4050 selects at least one of image forming apparatuses corresponding to the plurality of phone numbers included in the group. Also, the selector 4050 checks the print job conditions set by the condition setter 4040 to determine whether the print job conditions are suitable for receiving the print job by the image forming apparatus corresponding to the phone number. If it is determined that the print job conditions are not suitable, the selector 4050 may select another image forming apparatus different from the image forming apparatus corresponding to the phone number. The other image forming apparatus may be pre-assigned by the condition setter 4040. The selector 4050 may determine whether the print job conditions are suitable by controlling the transmitter 4020 to transmit a request for checking print job conditions set in the image forming apparatus corresponding to the phone number, and controlling the receiver 4010 to receive a response to the request. The selector 4050 determines whether the print operation conditions are suitable for the image forming apparatuses corresponding to the plurality of phone numbers to perform the print job by checking capability information of the image forming apparatuses, and selects at least one of the image forming apparatuses based on a result of the determining. Capability information may include at least one of a current state of an image forming apparatus and information about whether the image forming apparatus supports color or black-and-white printing.

The selector 4050 controls the receiver 4010 to receive the capability information of the image forming apparatuses corresponding to the plurality of phone numbers. Also, the selector 4050 determines whether the print job conditions of the image forming apparatuses corresponding to the plurality of phone numbers are suitable for performing the print job by checking the set print job conditions based on the capability information received by the receiver 4010. If it is determined that the print job conditions of the image forming apparatuses corresponding to the plurality of phone numbers are not suitable, the selector 4050 may select another image forming apparatus different from the image forming apparatuses corresponding to the plurality of phone numbers. The other image forming apparatus may be pre-assigned by the condition setter 4040.

The image forming apparatus 4100 includes a receiver 4110, a transmitter 4120, a controller 4130, and a print operation performer 4140.

The receiver 4110 receives the data. In detail, the receiver 4110 receives the print job. Also, the receiver 4110 may receive a request on the capability information of the image forming apparatus 4100. The receiver 4110 may receive a request for checking the set print job conditions.

The transmitter 4120 transmits the data. The transmitter 4120 may transmit the capability information of the image forming apparatus 4100. Also, the transmitter 4120 may transmit a response to the request for checking the set print job conditions.

The controller 4130 controls the receiver 4110 and the transmitter 4120. The controller 4130 may control the print job performer 4140. The controller 4130 controls the receiver 4110 to receive the print job from a server. The controller 4130 may control the receiver 4110 to receive the request on the capability information of the image forming apparatus 4100 or the request for checking the set print job conditions. The controller 4130 may control the transmitter 4120 to transmit the capability information of the image forming apparatus 4100 to the cloud server 4000. The controller 4130 may control the transmitter 4120 to transmit a response to the request for checking the print job conditions.

The print operation performer 4140 performs the print job based on the data received by the receiver 4110.

The cloud printing system is not limited to directly receiving and performing the print job in the image forming apparatus 4100, but the print job may be first transmitted to an electronic device, such as the mobile terminal 3905, and the image forming apparatus 4100 may receive and perform the print job from the electronic device.

Figure 41:
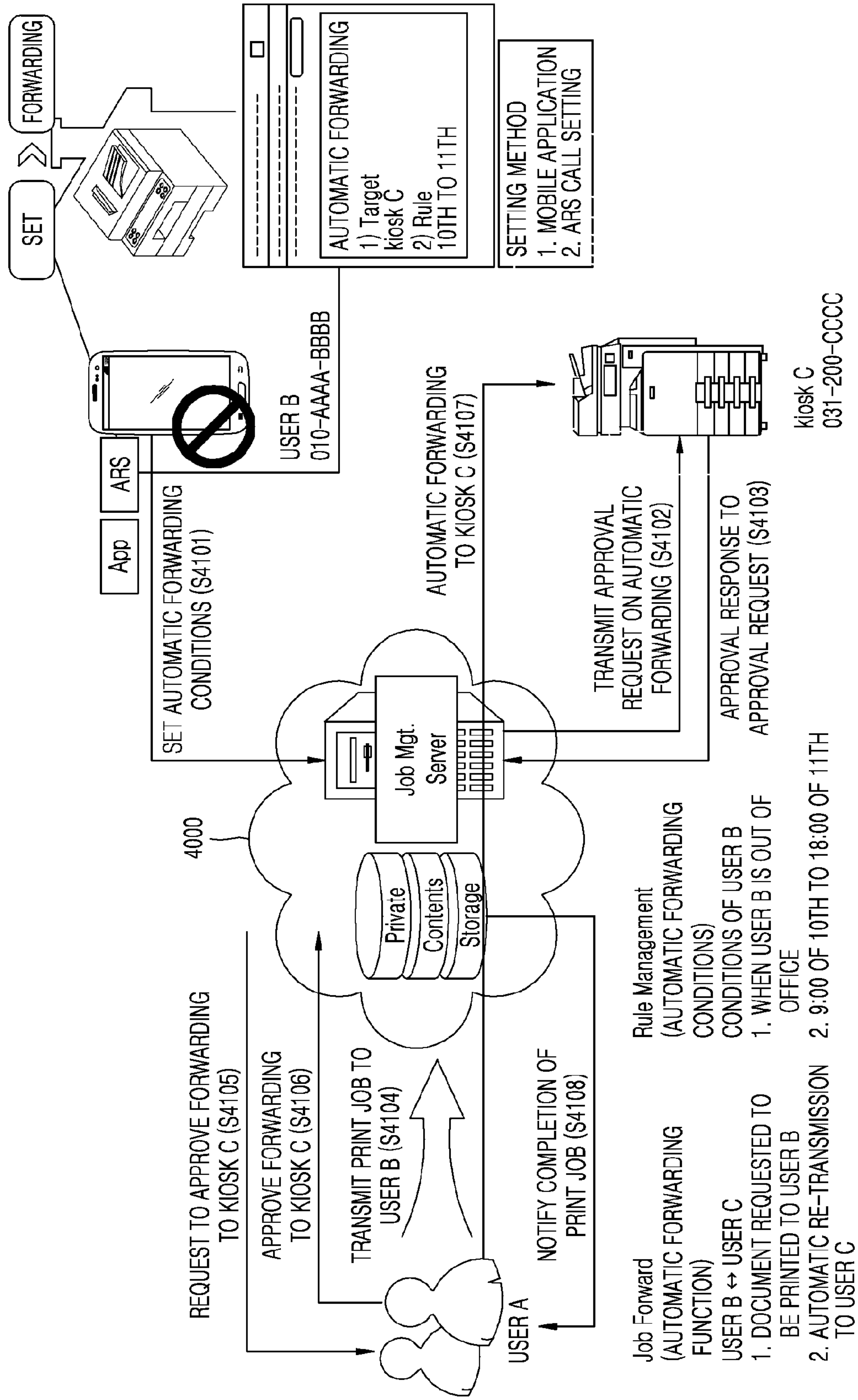
FIG. 41 is a diagram for describing a method of performing a phone number-based print operation, according to an embodiment.

FIG. 41 is a diagram for describing a method of performing a phone number-based print job, according to an embodiment.

According to an embodiment, a user pre-sets print job conditions in a server, and a suitable printer performs a print job according to the set print job conditions.

Referring to FIG. 41, the user sets the print job conditions in the server, in operations S4101, S4102, and S4103.

In operation S4101, a user B sets automatic forwarding conditions. The automatic forwarding conditions are basic conditions for selecting an electronic device to transmit a print job from among electronic devices connected to a cloud server. For example, the automatic forwarding conditions may include conditions that are not suitable for a mobile terminal to receive a print job or for a printer to perform a print job. A user B may assign an electronic device to receive a print job when automatic forwarding conditions are satisfied while setting the automatic forwarding conditions.

A user B may set automatic forwarding conditions through a mobile application executed in a mobile terminal, through a UI of an image forming apparatus, or through an ARS.

In an embodiment, the user B set the automatic forwarding conditions such that a print job received by the cloud server 4000 during 9:00 of 10th to 18:00 of 11th is transmitted to a kiosk C. At the same time, the user B set the automatic forwarding conditions such that a print job received by the cloud server 4000 while the user B is out of office is transmitted to the kiosk C. The user B sets a print job received by the cloud server 4000 to be limited to that destined for a phone number (010-AAAA-BBBB) of the user B.

In operation S4102, the cloud server 4000 may transmit an approval request to the kiosk C such that a print job is transmitted to the kiosk C according to the set automatic forwarding conditions.

In operation S4103, the kiosk C transmits an approval response to the approval request to the cloud server 4000. Upon receiving the approval response, the automatic forwarding conditions on the print job destined for the phone number of the user B is set in the cloud server 4000.

However, the cloud server 4000 may complete the setting of the automatic forwarding conditions without having to perform operations S4102 and S4103.

Referring to FIG. 41, a user A transmits a print job to the cloud server 4000, the cloud server 4000 transmits the print job to a suitable printer, and the suitable printer performs the print job, in operations S4104 through S4108.

In operation S4104, the user A transmits the print job destined for the phone number (010-AAAA-BBBB) of the user B.

In operation S4105, the cloud server 4000 checks the automatic forwarding conditions set in operations S4101 through S4103. In an embodiment, the print job is transmitted by the user A at 10:00 of 10th. Thus, the cloud server 4000 determines that the automatic forwarding conditions are satisfied. The cloud server 4000 may transmit a message to the user A for checking whether to transmit the print job to the kiosk C.

In operation S4106, the user A transmits a message to the cloud server 4000 approving the print job to be transmitted to the kiosk C by using a mobile terminal.

In operation S4107, the cloud server 4000 transmits the print job to the kiosk C. The kiosk C may receive and perform the print job.

In operation S4108, after the kiosk C performs the print job, the cloud server 4000 transmits a notification that the print job is completed in the kiosk C.

Alternatively, the cloud server 4000 may directly transmit the print job to the kiosk C without separately transmitting an approval request to the user A.

Figure 42A:
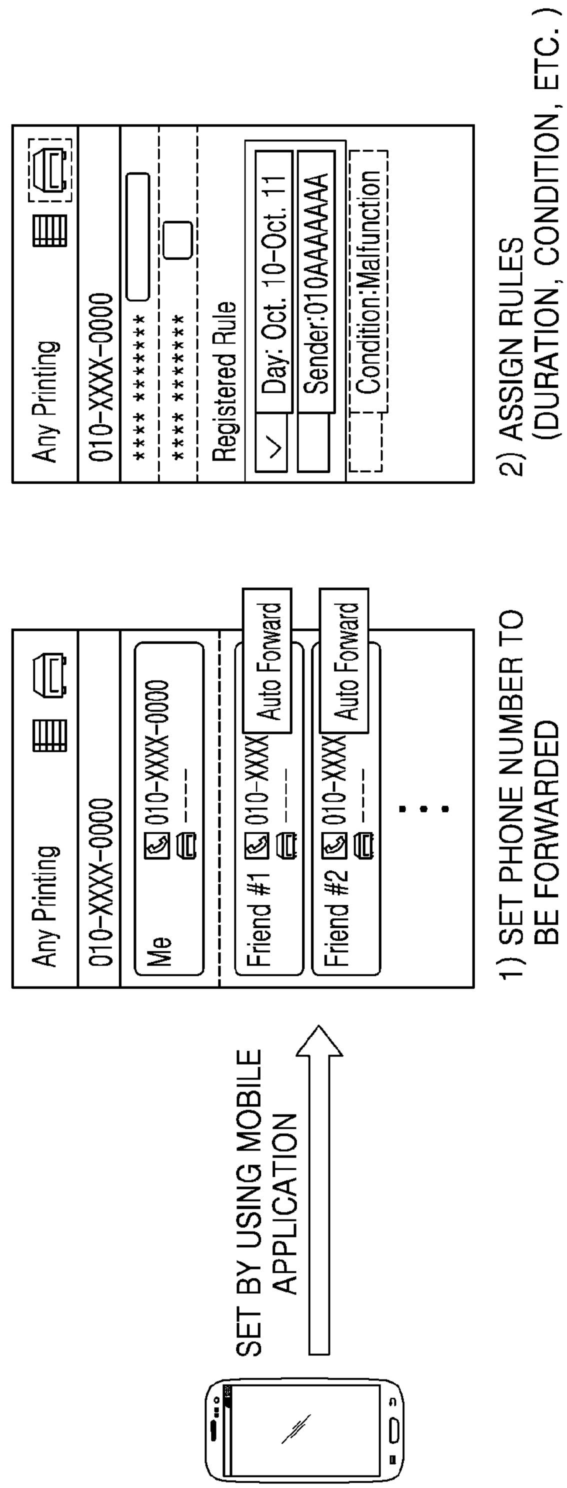
FIGS. 42A and 42B are diagrams for describing processes of setting print operation conditions in a server, according to embodiments.
Figure 42B:
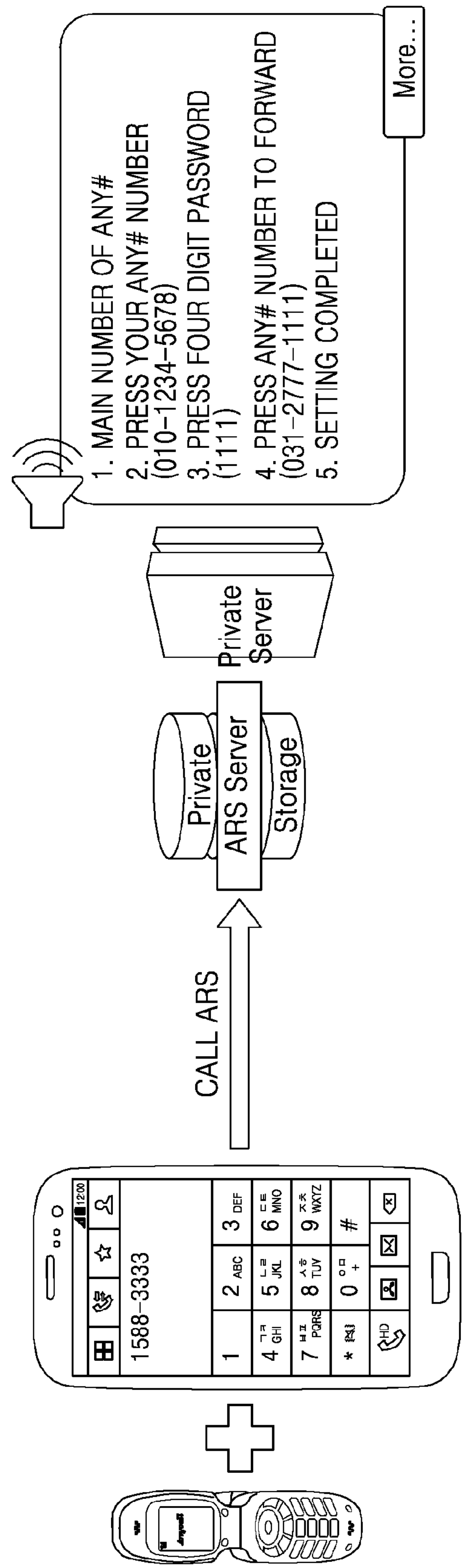

FIGS. 42A and 42B are diagrams for describing processes of setting print job conditions in a server, according to an embodiment.

Referring to FIG. 42A, a user executes a mobile application in a mobile terminal, and selects the user's phone number and a phone number to which a print job is automatically distributed according to conditions. Also, the user sets print job conditions. The print job conditions may be variously set according to times (from one day to another day) or according to states (absence) of the user using the mobile terminal. Also, the print job conditions may be variously set based on whether an image forming apparatus is capable of performing a print job, for example, based on whether the image forming apparatus malfunctions or whether the image forming apparatus supports color printing.

After the setting is completed, the print job conditions are transmitted to and stored in a cloud server. The user may set a phone number assigned to an image forming apparatus, a phone number to which a print job is to be distributed, and print job conditions through a UI of the image forming apparatus, and may similarly transmit the print job conditions to the cloud server to be stored.

Referring to FIG. 42B, when print job conditions are to be set via an ARS, the user dials a main ARS number by using a general phone. The user is guided by a voice in an ARS server, and sets the print job conditions by pressing buttons on the general phone. The setting is performed similarly to a mobile application. After the setting is completed, the print job conditions are transmitted to and stored in the cloud server from the ARS server through an ARS connector of the cloud server.

Figure 43:
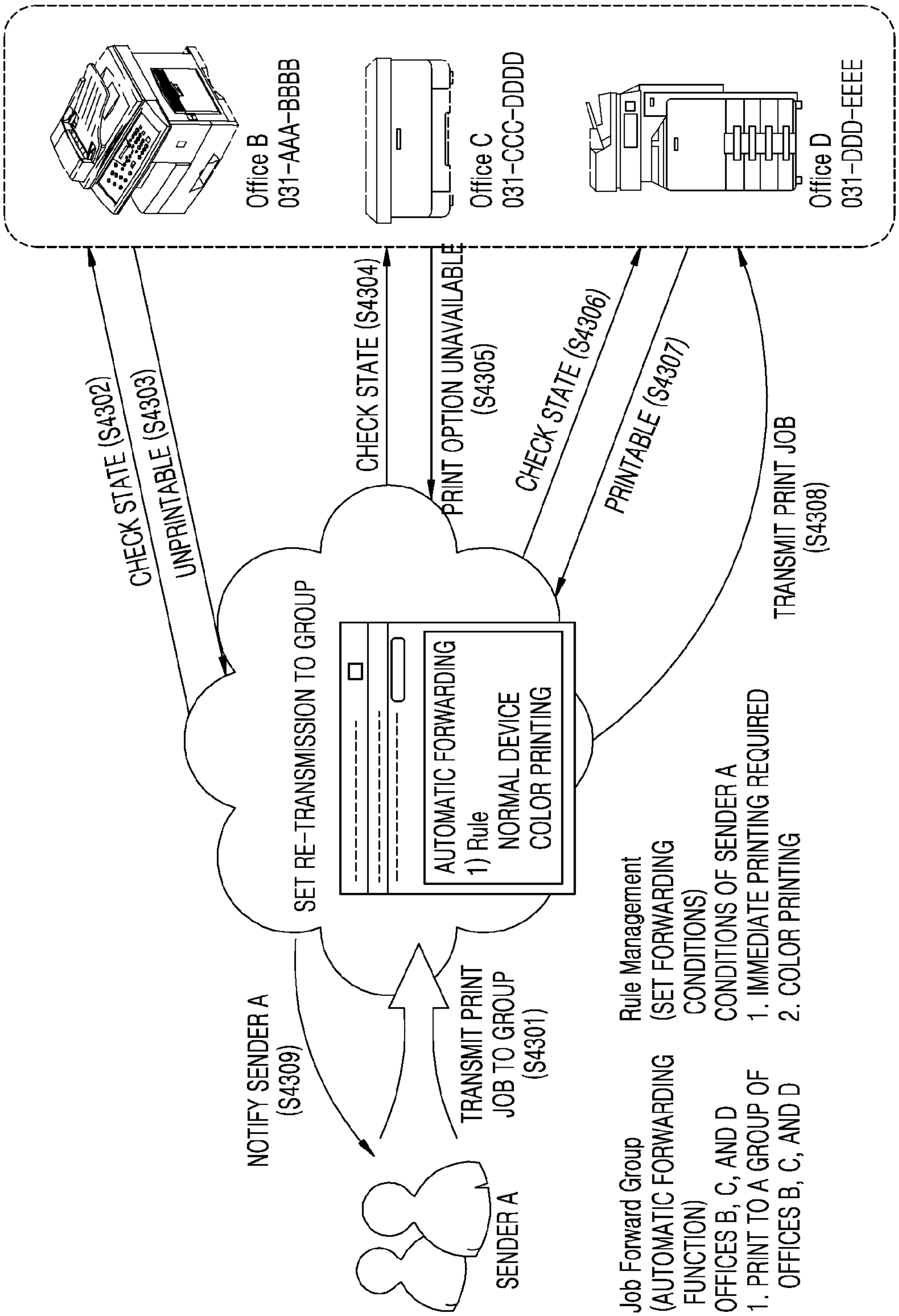
FIG. 43 is a diagram for describing processes of a sender setting print operation conditions and requesting a print operation to perform the print operation, according to an embodiment.

FIG. 43 is a diagram for describing processes of a sender A setting print job conditions and requesting a print job to perform the print job, according to an embodiment.

Referring to FIG. 43, the sender A may set print job conditions similarly to the recipient B of FIG. 41.

The sender A pre-sets the print job conditions before transmitting the print job. In other words, the sender A sets a group of phone numbers to transmit the print job. A group of phone numbers of image forming apparatuses in offices B, C, and D is set through a mobile application or an ARS. Then, the sender A sets the print job conditions, in detail, direct performance of a print job and a print job in a color document, in the cloud server 4000.

In operation S4301, the sender A transmits a print job destined for the group of phone numbers of the image forming apparatuses of the offices B, C, and D to the cloud server 4000.

The cloud server 4000 examines states of the image forming apparatuses in the group to check an image forming apparatus matching the print job conditions set by the sender A. In an embodiment, it is assumed that the image forming apparatus of the office B is unprintable, the image forming apparatus of the office C does not support a color print option, and the image forming apparatus of the office D matches the print job conditions.

The cloud server 4000 may check whether the print job conditions are suitable by receiving capability information from each image forming apparatus. In detail, the cloud server 4000 may transmit a message to each image forming apparatus for checking a state of each image forming apparatus in operations S4302, S4304, and S4306, and may receive capability information in operations S4303, S4305, and S4307 in response, so as to check the state of each image forming apparatus.

Then, in operation S4308, the cloud server 4000 selects the image forming apparatus of the office D to transmit the print job. The image forming apparatus of the office D receives and performs the print job.

Figure 44:
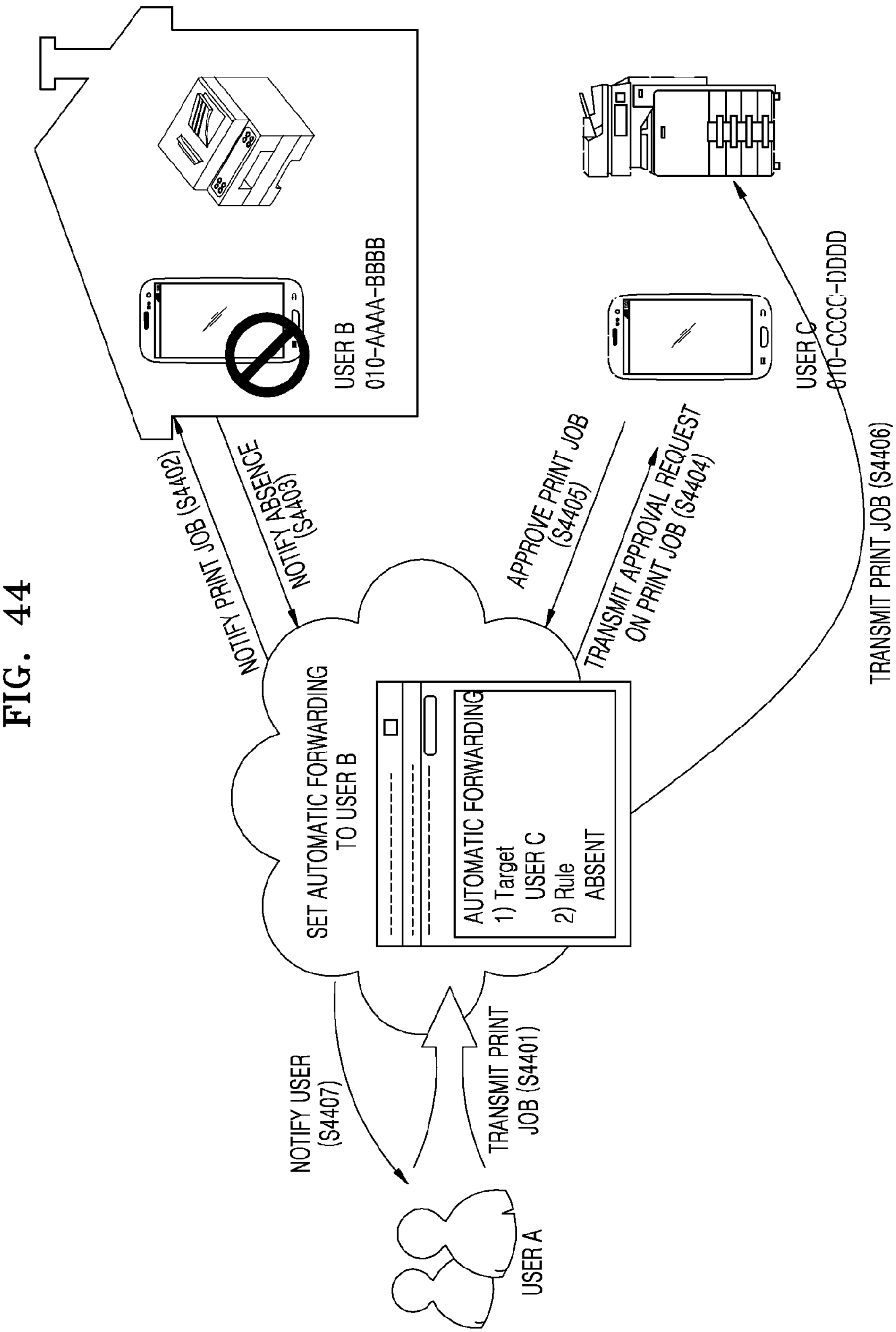
FIG. 44 is a diagram for describing a method of performing a phone number-based print operation, according to an embodiment.

FIG. 44 is a diagram for describing a method of performing a phone number-based print job, according to an embodiment.

In an embodiment, a user B pre-sets print job conditions by executing a mobile application in the user B's mobile terminal. In detail, the user B set a phone number to which a print job destined for the user B's phone number is to be forwarded to a phone number (010-CCCC-DDDD) of a user C. Also, the user B sets the print job to be forwarded when the user B is not home.

In operation S4401, the user A transmits a print job destined for a phone number (010-AAAA-BBBB) of the user B to a cloud server, by using an electronic device.

In operation S4402, the cloud server transmits a message notifying the print job to the mobile terminal of the user B.

In operation S4403, the mobile terminal of the user B transmits a message to the cloud server about absence at home in response to the message notifying the print operation.

In operation S4404, the cloud server receives the message from the mobile terminal of the user B to check that the user B is not at home, and transmits an approval request on the print job to the mobile terminal of the user C.

In operation S4405, the user C transmits a message approving the print job to the cloud server, by using the user C's mobile terminal.

In operation S4406, the cloud server transmits the print job to an image forming apparatus mapped to the phone number of the user C's mobile terminal. The image forming apparatus receives and performs the print job.

In operation S4407, the cloud server may transmit a message to the user A that the print job destined for the phone number of the user C's mobile terminal has been performed.

Figure 45:
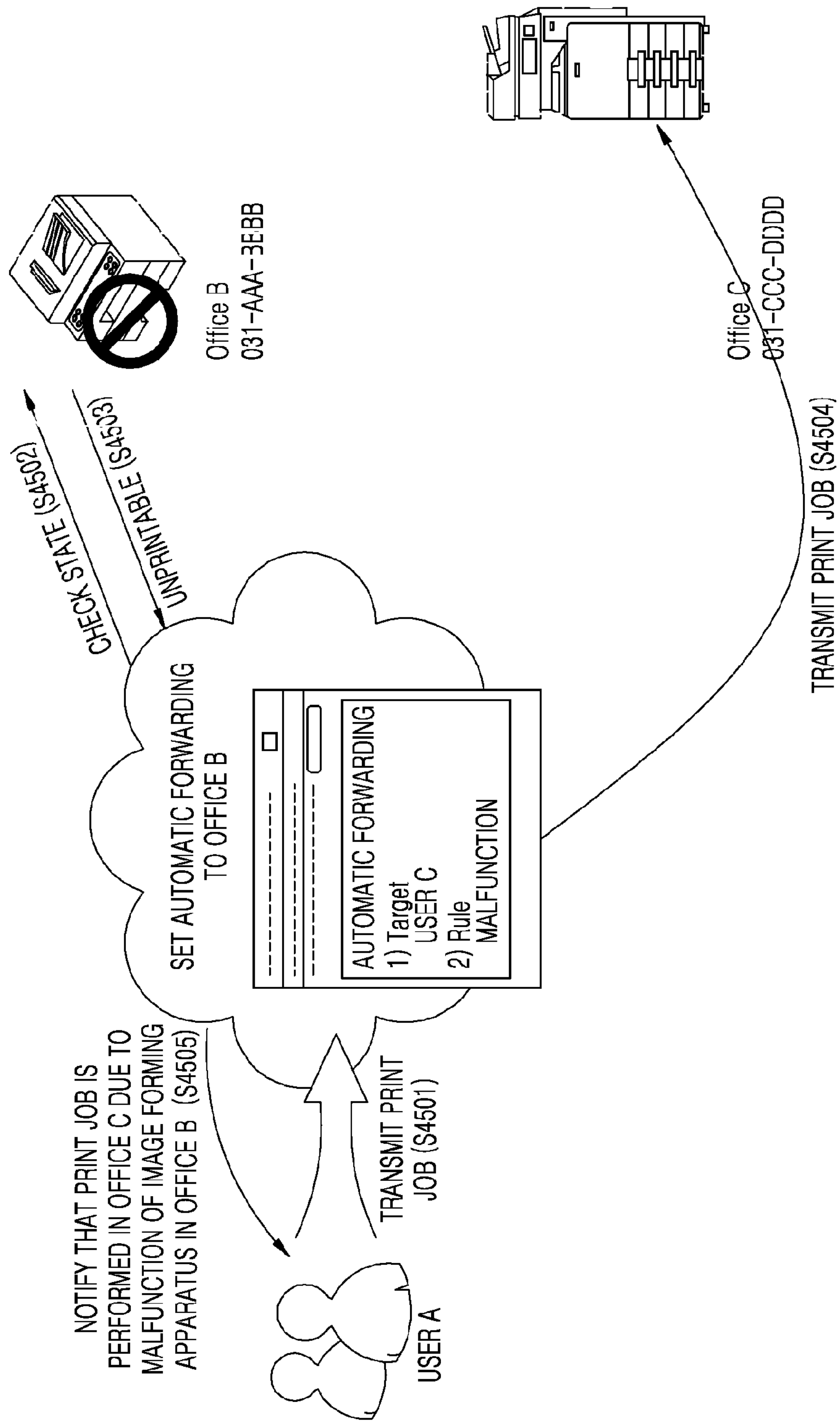
FIG. 45 is a diagram for describing a method of performing a phone number-based print operation, according to an embodiment.

FIG. 45 is a diagram for describing a method of performing a phone number-based print job, according to an embodiment.

In an embodiment, a user A sets print job conditions through a UI of an image forming apparatus, and stores the print job conditions in a cloud server by transmitting the print job conditions to the cloud server. It is assumed that the user A set the print job conditions such that a print job is destined for a phone number of an office C if an image forming apparatus of an office B is broken.

In operation S4501, the user A transmits the print job destined for a phone number (031-AAA-BBBB) of the image forming apparatus of the office B to the cloud server, by using the user A's mobile terminal.

In operation S4502, the cloud server transmits a request to check the print job conditions to the image forming apparatus of the office B.

In operation S4503, the image forming apparatus of the office B transmits a message about a malfunction to the cloud server, in response to the request to check the print job conditions.

In operation S4504, the cloud server receives the message from the image forming apparatus of the office B. The cloud server checks that the image forming apparatus of the office B is malfunctioning through the received message. Accordingly, the cloud server transmits the print job to a phone number (031-CCC-DDDD) of the image forming apparatus in the office C. In other words, the cloud server transmits the print job to the image forming apparatus of the office C. The image forming apparatus of the office C may receive and perform the print operation.

In operation S4505, the cloud server transmits a notification that the print job is performed in the image forming apparatus of the office C because of the malfunction of the image forming apparatus in office B.

Figure 46:
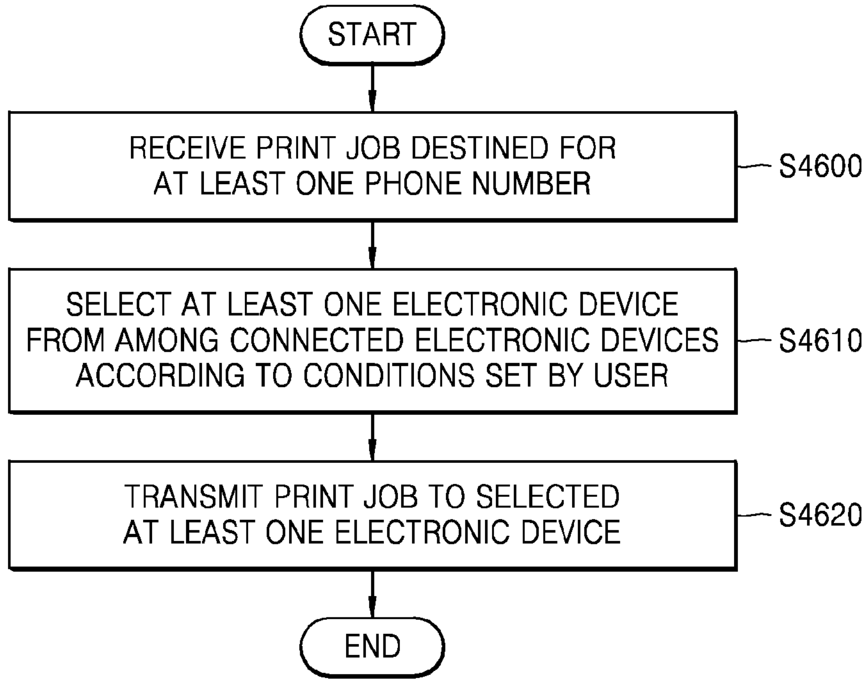
FIG. 46 is a flowchart of a method of performing a phone number-based print operation, according to an embodiment.

FIG. 46 is a flowchart of a method of performing a phone number-based print job, according to an embodiment.

In operation S4600, a cloud server receives a print job request destined for at least one phone number.

In operation S4610, the cloud server selects at least one electronic device from among connected electronic devices, according conditions set by a user. The cloud server checks capability information of an electronic device corresponding to a phone number to determine whether the electronic device is suitable for performing a print job, and if it is determined that the electronic device is not suitable, may select another electronic device different from the electronic device corresponding to the phone number. The other electronic device may be pre-set by the user.

In operation S4620, the cloud server transmits the print job request to the selected at least one electronic device.

Figure 47:
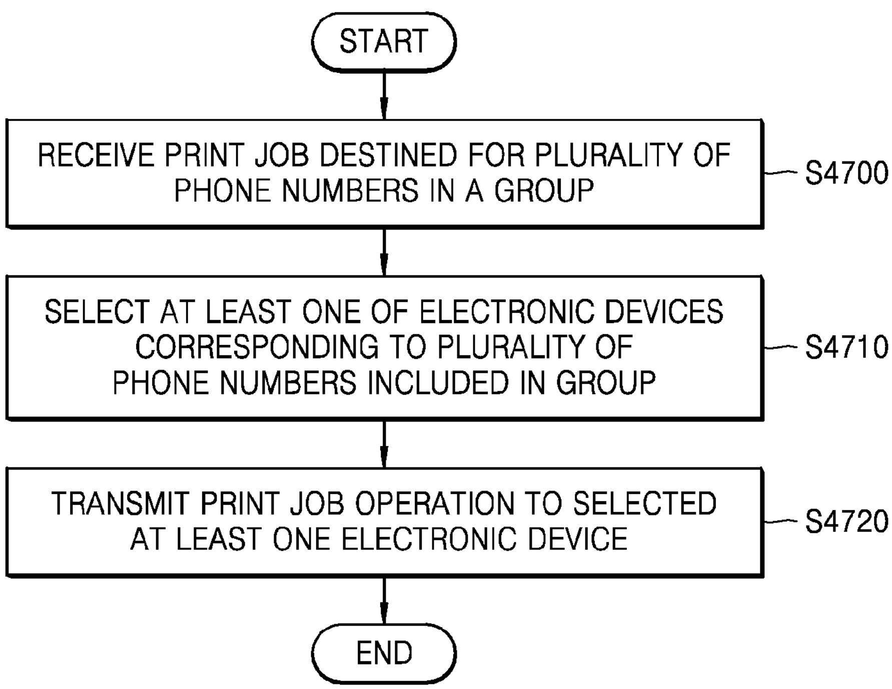
FIG. 47 is a flowchart of a method of performing a phone number-based print operation, according to an embodiment.

FIG. 47 is a flowchart of a method of performing a phone number-based print job, according to an embodiment.

In operation S4700, a cloud server receives a print job request destined for a plurality of phone numbers assigned to a group.

In operation S4710, the cloud server selects at least one of electronic devices corresponding to the plurality of phone numbers included in the group.

In operation S4720, the cloud server transmits the print job request to the selected at least one electronic device.

Figure 48:
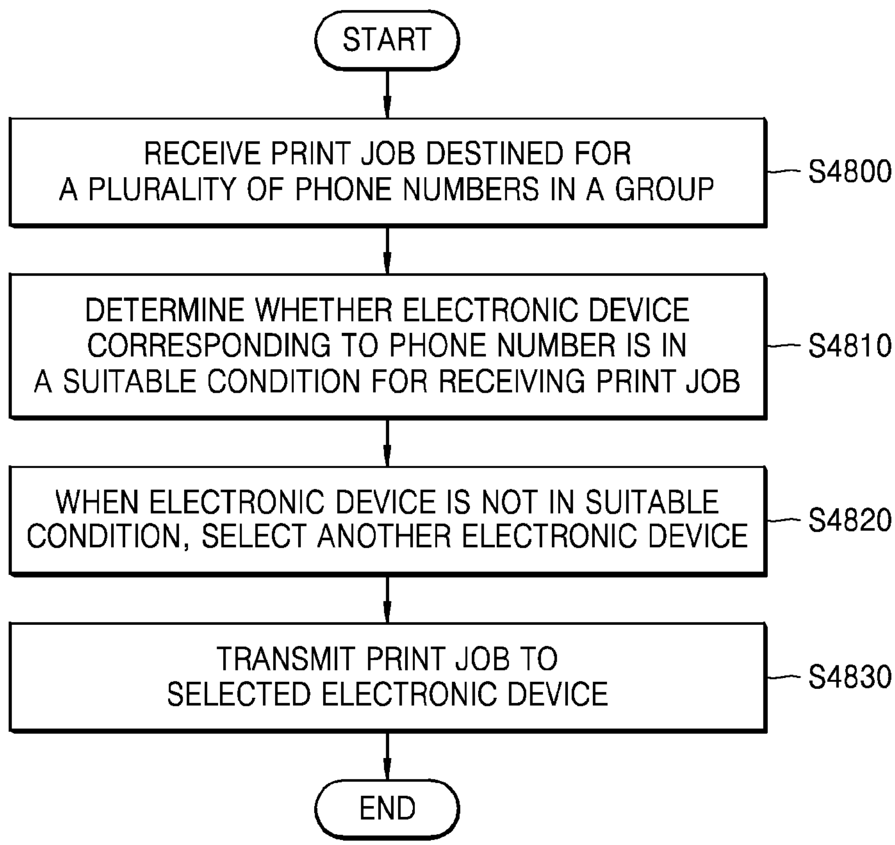
FIG. 48 is a flowchart of a method of performing a phone number-based print operation, according to an embodiment.

FIG. 48 is a flowchart of a method of performing a phone number-based print job, according to an embodiment.

In operation S4800, a cloud server receives a print job request destined for a plurality of phone numbers assigned to a group.

In operation S4810, the cloud server determines whether an electronic device corresponding to a phone number is in a suitable condition for receiving the print job request.

In operation S4820, when it is determined that the electronic device is not in the suitable condition, the cloud server selects another electronic device. The other electronic device different from the electronic device corresponding to the phone number may be an electronic device pre-set by a user.

In operation S4830, the cloud server transmits the print job request to the selected electronic device.

Figure 49:
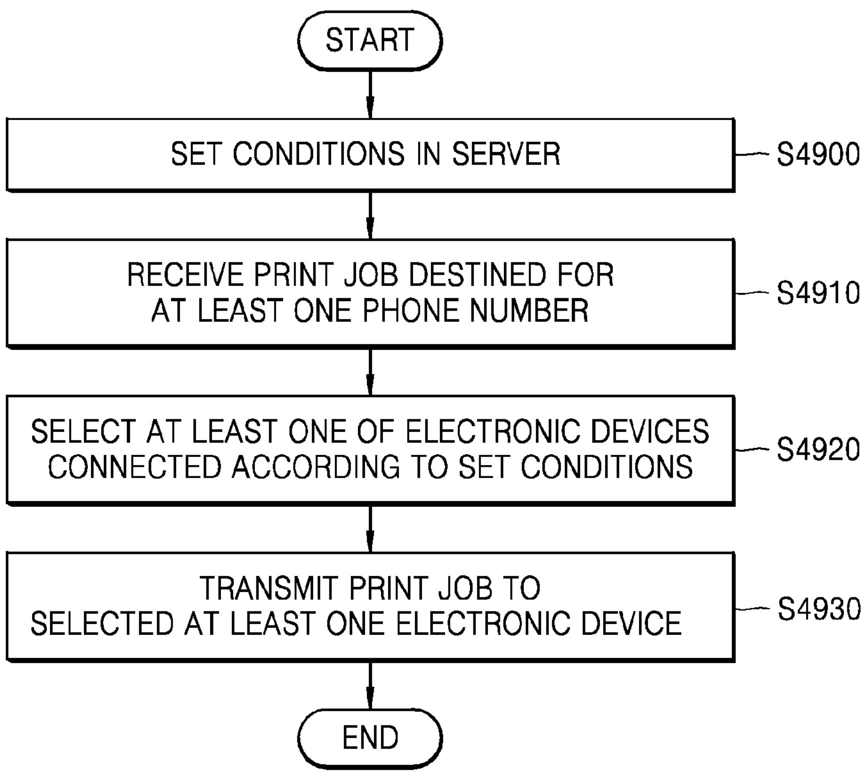
FIG. 49 is a flowchart of a method of performing a phone number-based print operation, according to an embodiment.

FIG. 49 is a flowchart of a method of performing a phone number-based print job, according to an embodiment.

In operation S4900, a cloud server sets print job conditions in the cloud server. In detail, the print job conditions may be set as a mobile terminal or a host executes an application or calls an ARS server connected to the cloud server via an ARS.

In operation S4910, the cloud server receives a print job destined for at least one phone number.

In operation S4920, the cloud server selects at least one of electronic devices connected according to the set print job conditions.

In operation S4930, the cloud server transmits the print job to the selected at least one electronic device.

Figure 50:
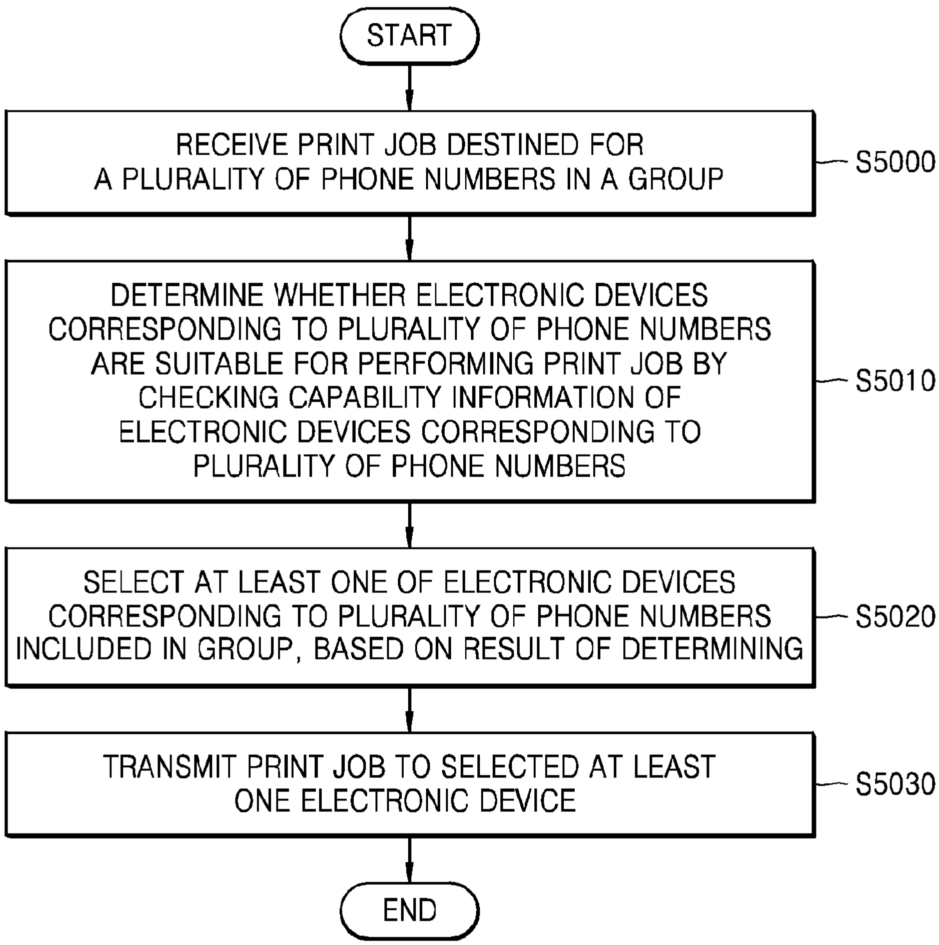
FIG. 50 is a flowchart of a method of performing a phone number-based print operation, according to an embodiment.

FIG. 50 is a flowchart of a method of performing a phone number-based print job, according to an embodiment.

In operation S5000, a cloud server receives a print job request destined for a plurality of phone numbers assigned to a group.

In operation S5010, the cloud server checks capability information of electronic devices corresponding to the plurality of phone numbers to determine whether the electronic devices are suitable for performing the print job. The cloud server may receive the capability information and check conditions set based on the received capability information to determine whether the electronic devices corresponding to the plurality of phone numbers are suitable for performing the print job.

In operation S5020, the cloud server selects at least one of the electronic devices corresponding to the plurality of phone numbers included in the group, based on a result of the determining.

In operation S5030, the cloud server transmits the print job request to the selected at least one electronic device.

According to an embodiment, a sender may transmit the same print jobs having different destinations only once to a cloud server, together with life information of the print jobs, to store the print jobs in the cloud server, and transmit the print jobs to electronic devices according to the life information of the print jobs to perform the print jobs.

In a general cloud printing service provided by a cloud server, a sender transmits the same print jobs having different destinations several times. Accordingly, unnecessary transmission traffics are generated, and since the same print jobs are individually stored in several storage spaces, the storage spaces are unnecessarily wasted.

Accordingly, one or more embodiments provide a method enabling, when a sender transmits the same print jobs having different destinations only once, together with life information of the print jobs, a cloud server to determine whether a content is transmittable based on the life information of the print jobs and transmit the print jobs to electronic devices such that the print job is performed. An embodiment will now be described in detail with reference to FIGS. 51 through 64.

Figure 51A:
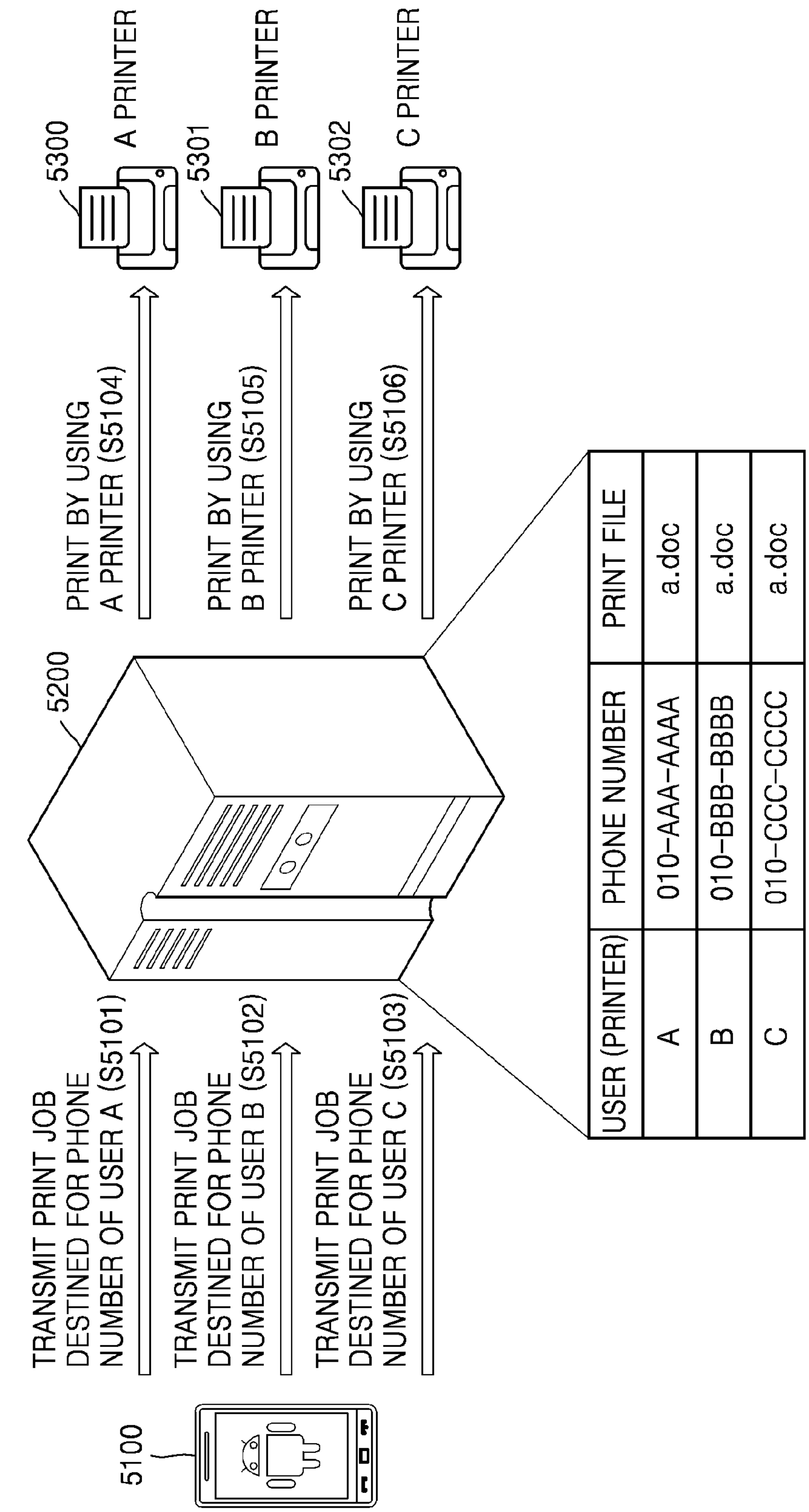
FIG. 51A is a diagram of an environment of a cloud printing system.

FIG. 51A is a diagram of an environment of a cloud printing system.

Referring to FIG. 51A, the cloud printing system includes a mobile terminal 5100, a cloud server 5200, and image forming apparatuses 5300 through 5302. The mobile terminal 5100 may be replaced by any one of various electronic devices, such as a laptop, a tablet, a personal computer (PC), portable media player (PMP), digital camera, laptop computer, notebook computer, portable game player, wearable device, or a personal digital assistant (PDA) to perform the same functions as the mobile terminal 5100. Further, it is understood that embodiments are also applicable to any device with which an apparatus, method, or medium of an embodiment can be used In the cloud printing system, a user uploads data stored in the mobile terminal 5100 to the cloud server 5200. Then, the user may request the cloud server 5200 to print the data any time at any place.

The cloud server 5200 may map a phone number to each image forming apparatus, and use the mapped phone number as a destination address for data transmission. The cloud server 5200 may include a storage space according to image forming apparatuses, and each storage space may be mapped to correspond to each of phone numbers of the image forming apparatuses. For example, a phone number (031-xxx-yyyy) may be mapped to correspond to the image forming apparatus 5300, and the mapped phone number may be used as a destination address. Accordingly, when the user requests the cloud server 5200 for a print job destined for the mapped phone number by using the mobile terminal 5100, the cloud server 5200 stores the print job in the storage spaces for the image forming apparatuses 5300 through 5302. Then, the cloud server 5100 may transmit the stored print job to the image forming apparatuses 5300 through 5302. The image forming apparatuses 5300 through 5302 receive the print job and perform the received print job.

Alternatively, the cloud server 5200 may include storage spaces according to phone numbers, and may map printers to respectively correspond to the storage spaces according to phone numbers. For example, A printer may be mapped to correspond to a storage space of a phone number of a mobile terminal of a user A. Such a storage space may be accessed by a person corresponding to the phone number. For example, the storage space of the phone number of the mobile terminal of the user A may be accessed by the user A using the mobile terminal of the user A.

In an embodiment, the user transmits a print job destined for phone numbers of users A through C. It is assumed that printers are respectively mapped to storage spaces of phone numbers of mobile terminals of the users A through C.

In operation S5101, the user transmits the print job destined for the phone number of the user A by using the mobile terminal 5100 to the cloud server 5200.

In operation S5102, the user transmits the print job destined for the phone number of the user B.

In operation S5103, the user transmits the print job destined for the phone number of the user C.

Upon receiving the print job, the cloud server 5200 stores the print job in the storage spaces provided according to phone numbers. Print files included in the print jobs may be stored. The print jobs have the same print file despite of different destinations. However, since the print jobs are separately requested, the same print file is stored separately in the storage spaces according to phone numbers.

In an embodiment, since the user requested to print a print file "a.doc", the print file "a.doc" is stored in the storage spaces according to phone numbers.

Accordingly, the user has to transmit the print jobs having different destinations several times, thereby causing unnecessary transmission traffics. Also, since the same print file is separately stored in the storage spaces according to phone numbers, the storage spaces are unnecessarily wasted.

Figure 51B:
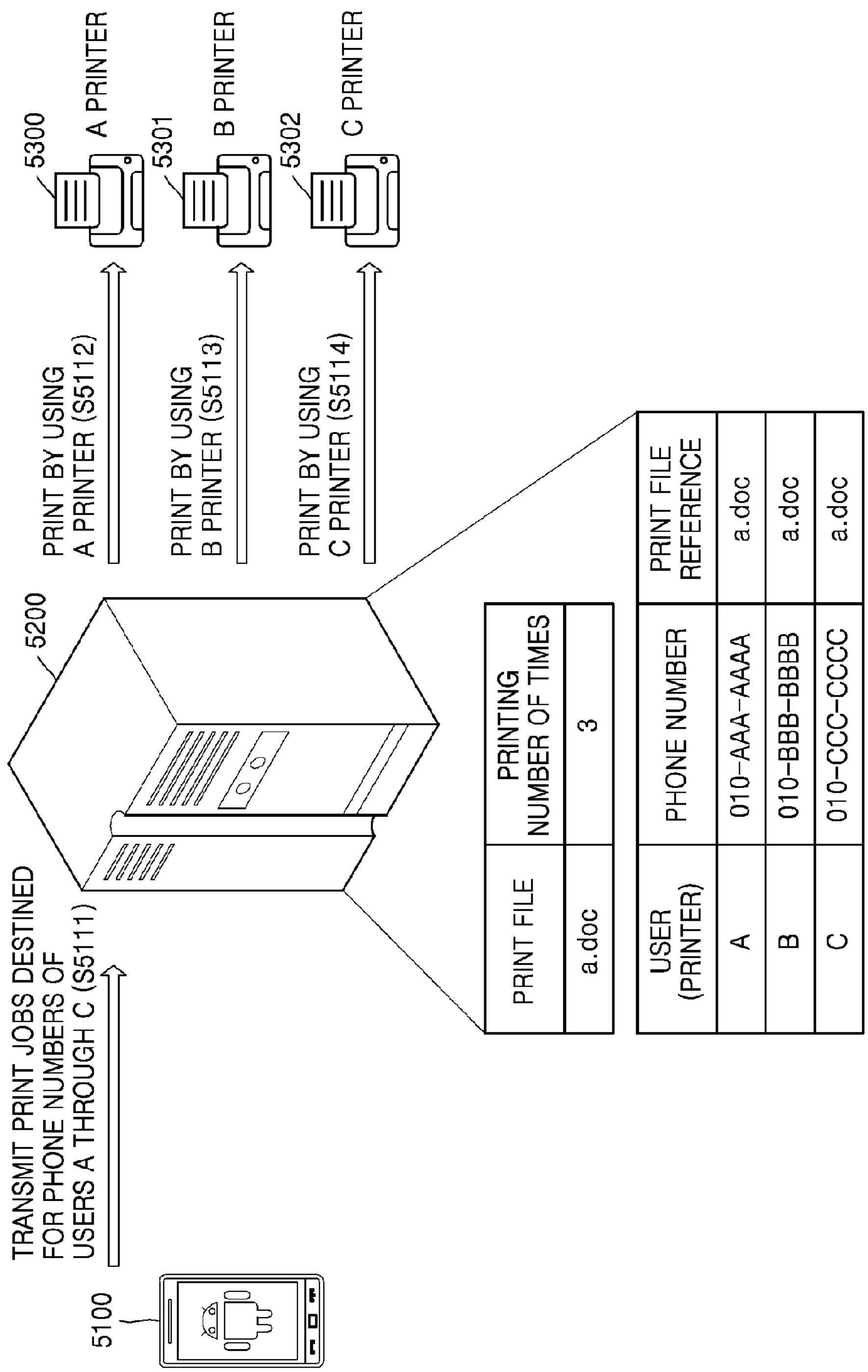
FIG. 51B is a diagram of an environment of a cloud printing system, according to an embodiment.

FIG. 51B is a diagram of an environment of a cloud printing system, according to an embodiment.

In operation S5111, a user transmits print operations destined for phone numbers of users A through C to the cloud server 5200 by using the mobile terminal 5100.

The cloud server 5200 may store only one of print files included in the print jobs, set a printing number of times by mapping the printing number of times to the print file, and store the set printing number of times. The print file and the printing number of times may be stored in a table form in which the print file and the printing number of times are mapped. For example, a table in which a printing number of times "3" is mapped to a print file "a.doc" may be stored.

Unlike FIG. 51A, the cloud server 5200 may map print file reference which references one print file to a phone number. A table in which a print file reference is mapped to a phone number may be stored. For example, a table in which a print file reference indicating the print file "a.doc", and a phone number are mapped may be stored. Phone numbers of users are mapped to correspond to storage spaces according to phone numbers.

Thus, according to an embodiment, when a mobile terminal transmits print jobs on the same print file destined for a plurality of phone numbers, only one print job may be transmitted so as to prevent unnecessary transmission traffic. In addition, since the same print file is stored once, a cloud server may not waste storage spaces according to phone numbers and efficiently use resources.

Figure 52:
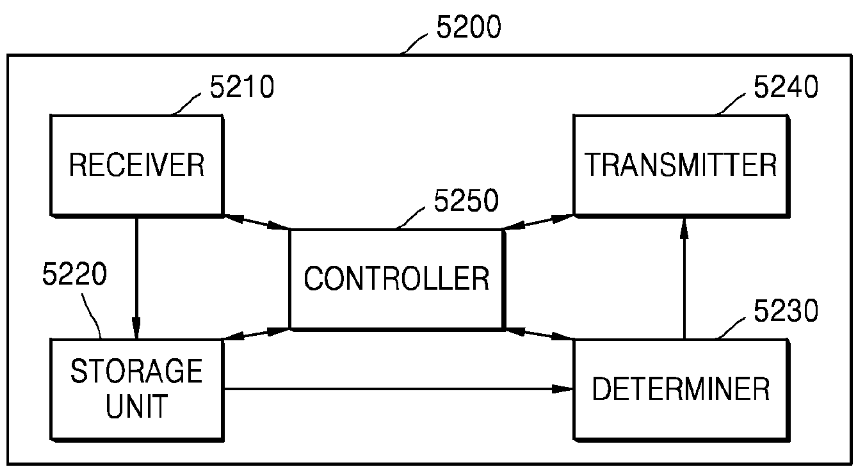
FIG. 52 is a block diagram of a cloud server according to an embodiment.

FIG. 52 is a block diagram of the cloud server 5200 according to an embodiment.

Referring to FIG. 52, the cloud server 5200 according to an embodiment includes a receiver 5210, a storage unit 5220, a determiner 5230, a transmitter 5240, and a controller 5250.

The cloud server 5200 receives a print job from outside the cloud server 5200, and transmits the print job based on determining whether the print job is transmittable according to a life of the print job.

The receiver 5210 receives data and the transmitter 5240 transmits the data. In detail, the receiver 5210 receives the print job and the transmitter 5240 transmits the print job.

The storage unit 5220 stores data. In detail, the storage unit 5220 stores a content and the life of the print job.

The determiner 5230 determines whether the content is transmittable according to the life of the print job.

The controller 5250 controls the receiver 5210 to receive the print job destined for a plurality of phone numbers. The controller 5250 controls the storage unit 5220 to store the content included in the print job as one file. Also, the controller 5250 controls the storage unit 5220 to map the life of the print job according to the stored content, and to store the life of the print job. The controller 5250 controls the transmitter 5240 to transmit the content to at least one of a plurality of electronic devices corresponding to the plurality of phone numbers, based on a result of determining by the determiner 5230.

The controller 5250 may control the storage unit 5220 to map a printable number of times to correspond to the stored content and to store the printable number of times of the print job. The determiner 5230 may determine that the content is transmittable when the printable number of times is not 0. Also, when the content is transmitted, the controller 5250 may control the storage unit 5220 to adjust the printable number of times. The controller 5250 may delete the stored content when the printable number of times is 0.

The controller 5250 may control the storage unit 5220 to map a printable duration to correspond to the stored content and to store the printable duration of the print operation. The determiner 5230 may determine whether the printable duration is passed, and determine that the content is transmittable when the printable duration is not passed.

When the printable duration is passed, the controller 5250 may delete the stored content.

The controller 5250 controls the receiver 5210 to receive a request on the content from at least one of the plurality of electronic devices. Upon receiving the request, the determiner 5230 determines whether the content is transmittable based on the life of the print job. The controller 5250 may control the transmitter 5240 to transmit the content to the at least one of the plurality of electronic devices based on a result of the determining.

The controller 5250 may control the storage unit 5220 to map the plurality of phone numbers to the content and store the plurality of phone numbers according to the content. Also, when the print job is transmitted destined for at least one phone number, the controller 5250 controls the storage unit 5220 to delete a phone number to which the print job is transmitted from stored phone numbers. Then, the controller 5250 may control the transmitter 5240 to transmit the content to electronic devices corresponding to the stored phone numbers. In other words, the content is not repeatedly transmitted to one electronic device.

However, an embodiment is not limited to mapping a phone number to a content, and the controller 5250 may store contents of print jobs having a plurality of destinations only once in any one of various methods, and print the contents once at each destination.

The controller 5250 may control the storage unit 5220 to set and store the printable number of times according to the number of phone numbers that are destinations of the print job. For example, when a print job destined for three phone numbers is received, the controller 5250 may control the storage unit 5220 to set and store a printable number of times to three.

Figure 53:
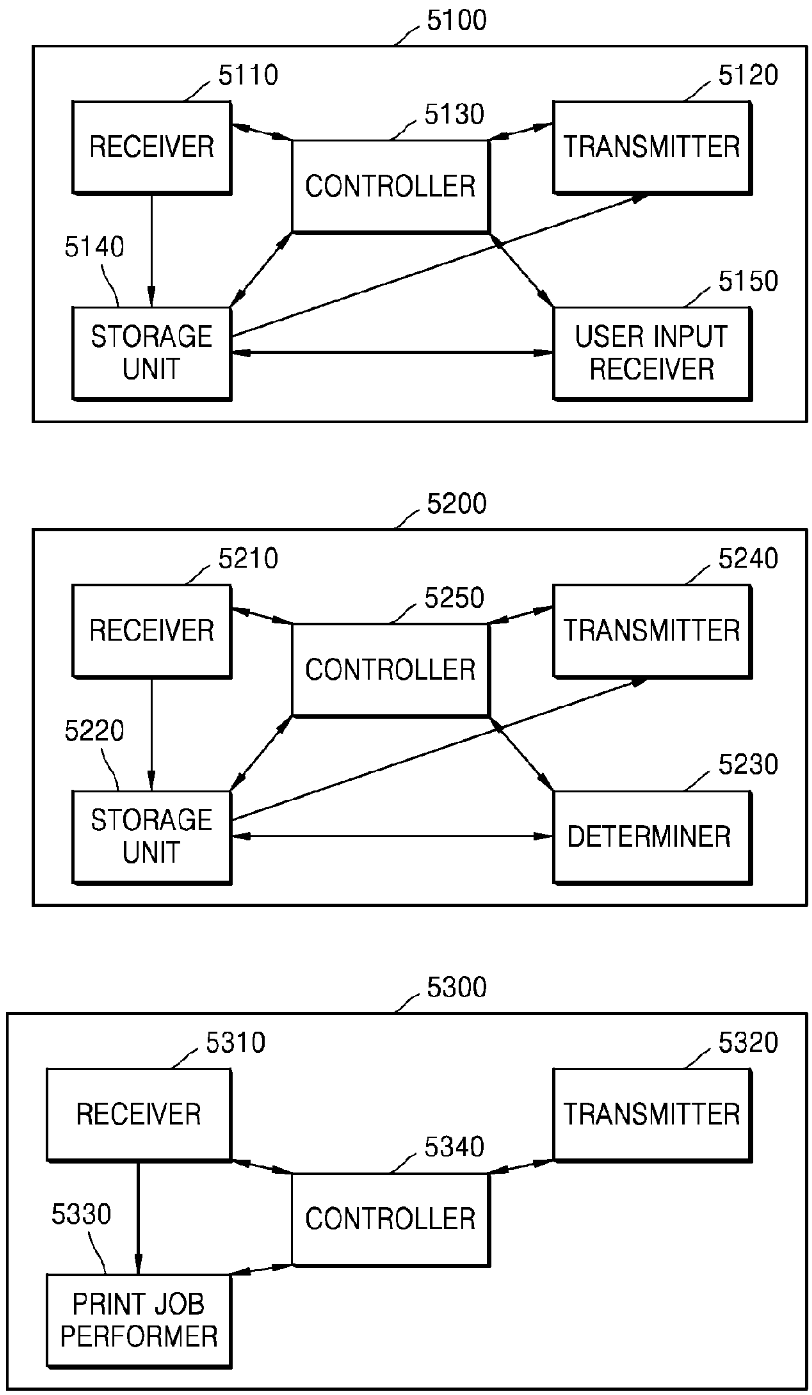
FIG. 53 is a block diagram of a cloud printing system according to an embodiment.

FIG. 53 is a block diagram of a cloud printing system according to an embodiment.

The cloud printing system according to an embodiment includes the mobile terminal 5100, the cloud server 5200, and the image forming apparatus 5300.

The mobile terminal 5100 included in the cloud printing system of an embodiment transmits a print job to the cloud server 5200. Upon receiving the print job, the cloud server 5200 sets a life of the print job, and transmits the print job to the image forming apparatus 5300 according to the life of the print job. The image forming apparatus 5300 receives and performs the print job.

The mobile terminal 5100 includes a receiver 5110, a transmitter 5120, a controller 5130, a storage unit 5140, and a user input receiver 5150.

The receiver 5110 receives data and the transmitter 5120 transmits the data. In detail, a print job may be transmitted.

The storage unit 5140 stores the data. In detail, the storage unit 5140 stores a content.

The user input receiver 5150 receives an input for controlling various operations of the mobile terminal 5100 from a user. In detail, the user input receiver 5150 receives an input for selecting a plurality of phone numbers from the user. Also, the user input receiver 5150 may receive an input for selecting a content to be included in a print job from contents stored in the storage unit 5140 from the user.

The controller 5130 controls the user input receiver 5150 to receive the input for selecting the plurality of phone numbers and the input for selecting the content to be included in the print job from the user, and controls the transmitter 5120 to transmit the print job including the selected contents to the plurality of phone numbers.

Since the cloud server 5200 performs the same operations as the cloud server 5200 of FIG. 52, details thereof are not repeated here.

The image forming apparatus 5300 includes a receiver 5310, a transmitter 5320, a print operation performer 5330, and a controller 5340.

The receiver 5310 receives data and the transmitter 5320 transmits the data. In detail, the receiver 5310 receives a print job and the transmitter 5320 may transmit a request for a content.

The controller 5340 controls the receiver 5310 to receive the content from the cloud server 5200. The controller 5340 may control the transmitter 5320 to transmit the request for the content to the cloud server 5200, and control the receiver 5310 to receive the content from the cloud server 5200 in response to the request.

The print job performer 5330 performs the print job based on the content received from the receiver 5310.

The cloud printing system is not limited to performing the print job as the image forming apparatus 5300 directly receives the content, but alternatively, the content may be first transmitted to an electronic device, such as the mobile terminal 5100, and the image forming apparatus 5300 may receive and perform the print job including the content from the electronic device.

Figure 54:
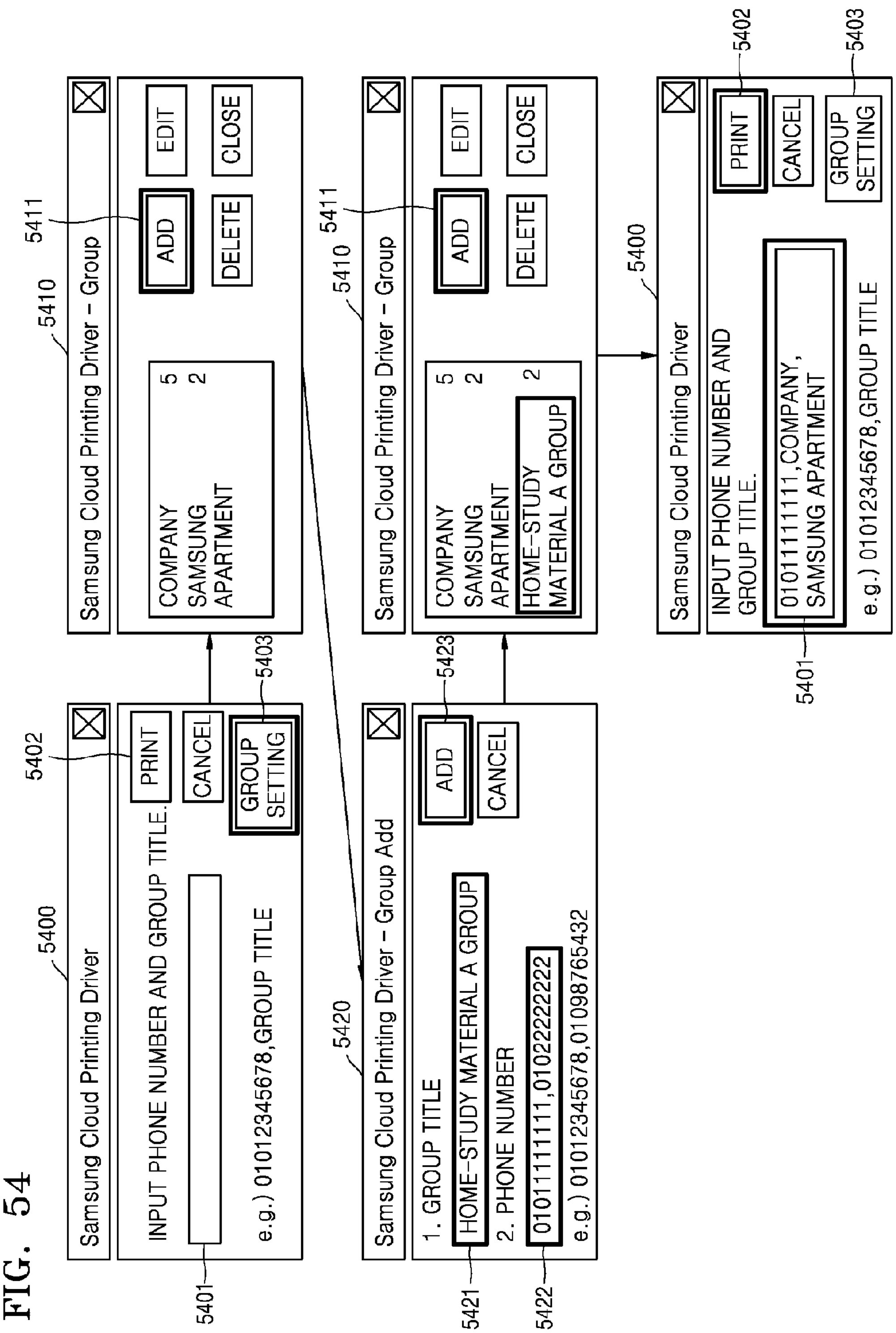
FIG. 54 is a diagram for describing processes of setting a group in a mobile terminal and transmitting a print operation destined for a plurality of phone numbers, according to an embodiment.

FIG. 54 is a diagram for describing processes of setting a group in a mobile terminal and transmitting a print job destined for a plurality of phone numbers, according to an embodiment.

Referring to FIG. 54, a user may set a group including a plurality of phone numbers by using a mobile terminal, and generate a print job destined for the plurality of phone numbers. In detail, the mobile terminal may receive an input from the user to set the group and generate the print job.

In order to set the group including the plurality of phone numbers, the user selects "Group Setting" 5403 from a print request screen 5400 displayed on the mobile terminal. The user selects "Add" 5411 from a group management screen 5410 displayed on the mobile terminal. The user inputs a name of the group to be generated and phone numbers to be included in the group respectively to a group name input box 5421 and a phone number input box 5422 in a group addition screen 5420 displayed on the mobile terminal. For example, in an embodiment, the user generates a "home-study material A group" including phone numbers "010-1111-1111" and "010-2222-2222". Then, the user selects "Add" 5423 to generate the group. Accordingly, the "home-study material A group" is added to the group management screen 5410. The user inputs a destination phone number or group to a destination input box 5401 in the print request screen 5400. For example, the user inputs the phone number "010-1111-1111", a group "company", and a group "Samsung Apartment". Then, when the user selects "Print" 5402, a print job destined for the destination phone number or group input in the destination input box 5401 is generated and transmitted to a cloud server.

Figure 55:
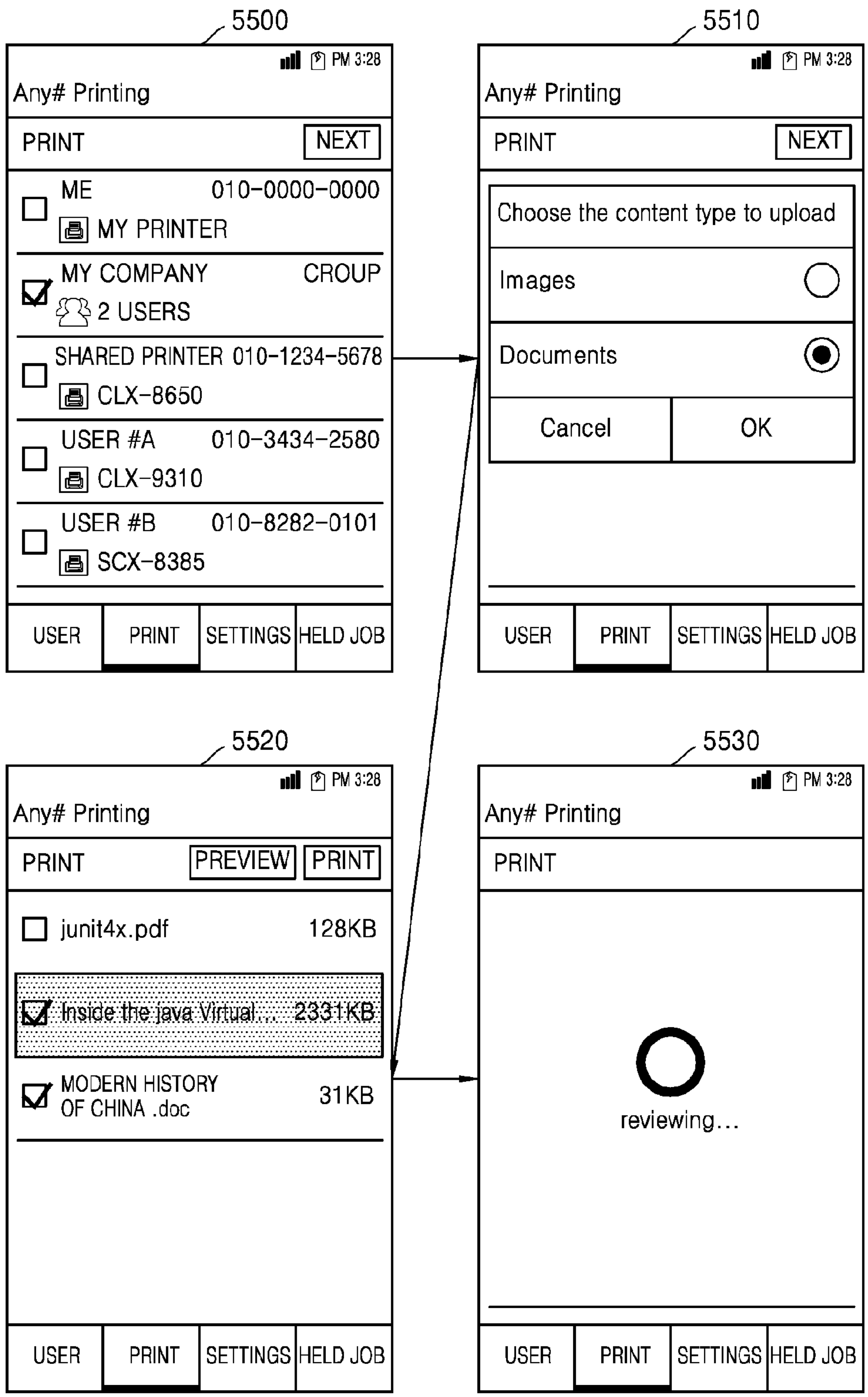
FIG. 55 is a diagram for describing processes of transmitting a print operation destined for a plurality of phone numbers, according to an embodiment.

FIG. 55 is a diagram for describing processes of transmitting a print job destined for a plurality of phone numbers, according to an embodiment.

A user may select a destination by checking a box in a destination select screen 5500 displayed on a mobile terminal. In an embodiment the user selects a "My Company" group as a destination of a print job.

Then, the user may select a content type through a content type select screen 5510. In an embodiment, the user selects "Documents" to print a document.

Then, the user selects a file to be printed through a print file select screen 5520. The print file select screen 5520 may display various files stored in the mobile terminal, and the user may select one file by checking a box. In order to transmit such a print job, the user may pre-check data to be printed through a preview screen 5530.

Figure 56:
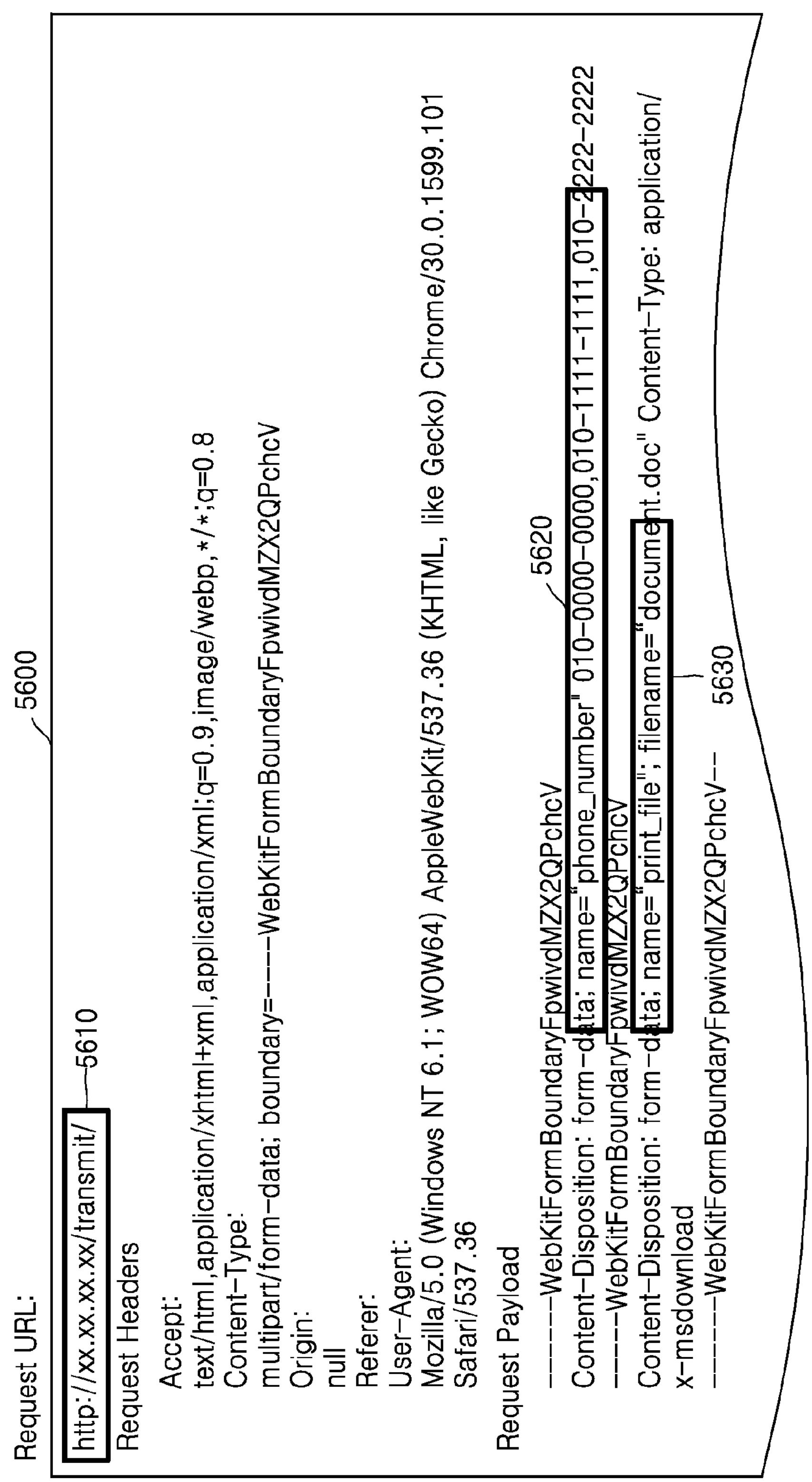
FIG. 56 is a diagram of a hypertext transfer protocol (HTTP) packet for transmitting a print operation destined for a plurality of phone numbers, according to an embodiment.

FIG. 56 is a diagram of a hypertext transfer protocol (HTTP) packet 5600 for transmitting a print job destined for a plurality of phone numbers, according to an embodiment.

The HTTP packet 5600 for transmitting a print job in a mobile terminal may include contents related to a request uniform resource locator (URL) 5610, a phone number 5620, and a print file 5630.

In an embodiment, it is assumed that a user transmits a print job regarding a print file "document.doc" and destined for phone numbers "010-0000-0000", "010-1111-1111", and "010-2222-2222" to "http://xx.xx.xx.xx/transmit/" that is an address of a cloud server.

The mobile terminal generates the HTTP packet 5600 by setting the request URL 5610 to be "http://xx.xx.xx.xx/transmit/" that is the address of the cloud server. Also, the mobile terminal generates the HTTP packet 5600 by setting the phone number 5620 to be the phone numbers "010-0000-0000", "010-1111-1111", and "010-2222-2222". Also, the mobile terminal generates the HTTP packet 5600 by setting the print file 5630 to be the print file "document.doc". As such, the mobile terminal may generate the HTTP packet 5600 including the contents relates to the request URL 5610, the phone number 5620, and the print file 5630, and transmit the print job destined for the plurality of phone numbers to the cloud server.

However, a format of transmitting the print job is not limited to the HTTP packet 5600, and may vary.

Figures 57, 58A:
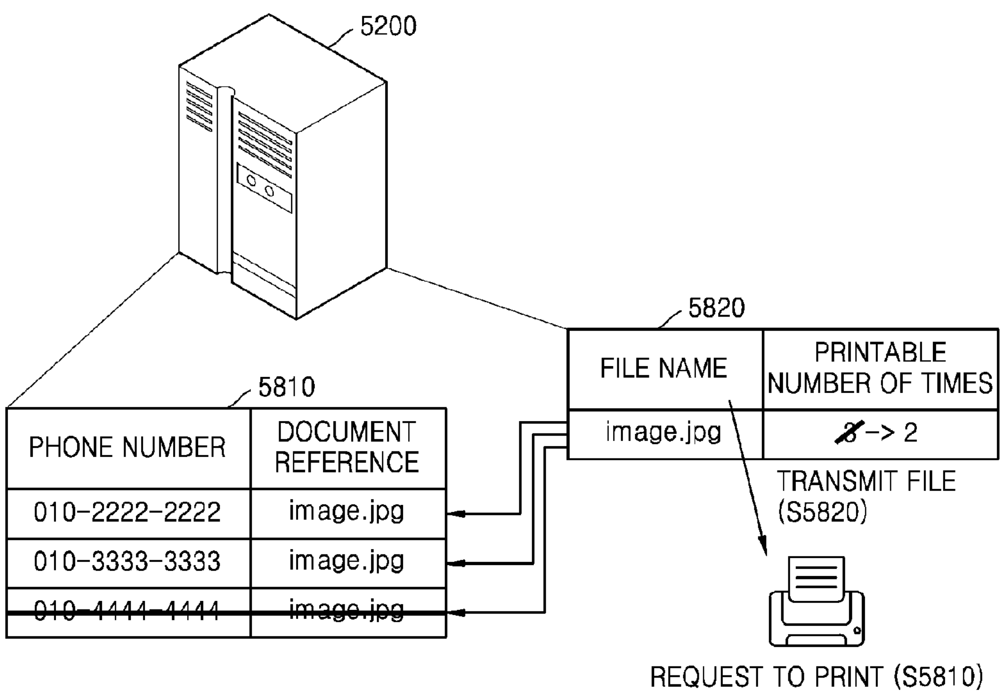
FIG. 57 illustrates a document and count table, and a phone number and document reference table for managing a print operation, according to an embodiment.
FIG. 58A is a diagram for describing processes of a cloud server managing a stored print operation when the print operation is external, according to an embodiment.

FIG. 57 illustrates a document and count table 5700, and a phone number and document reference table 5710 for managing a print job, according to an embodiment.

Referring to FIG. 57, a cloud server stores the document and count table 5700 and the phone number and document reference table 5710, and may manage an job request received by using the document and count table 5700 and the phone number and document reference table 5710.

The document and count table 5700 maps and stores a "file name" and a "printable number of times". For example, when a request to print a "image.jpg" file destined for three phone numbers is received from outside the cloud server, the document and count table 5700 stores the "image.jpg" file as the "file name" and "3" as the "printable number of times" in one row.

The phone number and document reference table 5710 maps and stores a "phone number" and a "document reference". Phone numbers may be mapped to correspond to storage spaces according to phone numbers.

For example, when the request to print the "image.jpg" file destined for the three phone numbers is received from outside the cloud server, the phone number and document reference table 5710 stores the "image.jpg" file as the "document reference". In the phone number and document reference table 5710, the three phone numbers are stored as the "phone number" in three rows.

Only one "image.jpg" file to be printed is stored in the cloud server. In other words, the cloud server does not store the "image.jpg" file according to phone numbers. The "image.jpg" stored as the "document reference" and the "file name" indicates one "image.jpg" file. In other words, the "document reference" and the "file name" may be mapped to correspond to a stored document file.

FIG. 58A is a diagram for describing processes of the cloud server 5200 managing a stored print job, according to an embodiment Referring to FIG. 58A, in operation S5810, a printer requests for a print job regarding an "image.jpg" file. In operation S5820, the cloud server 5200 transmits the "image.jpg" file to the printer. A phone number set according to the printer that requested for the print is "010-4444-4444". The cloud server 5200 deletes a row where a phone number is "010-4444-4444" and a document reference is "image.jpg" from a phone number and document reference table 5810. Then, the cloud server 5200 reduces a "printable number of times" in a row where a file name is "image.jpg" by 1 from a document and count table 5800. In an embodiment, the "printable number of times" is reduced from 3 to 2.

Figure 58B:
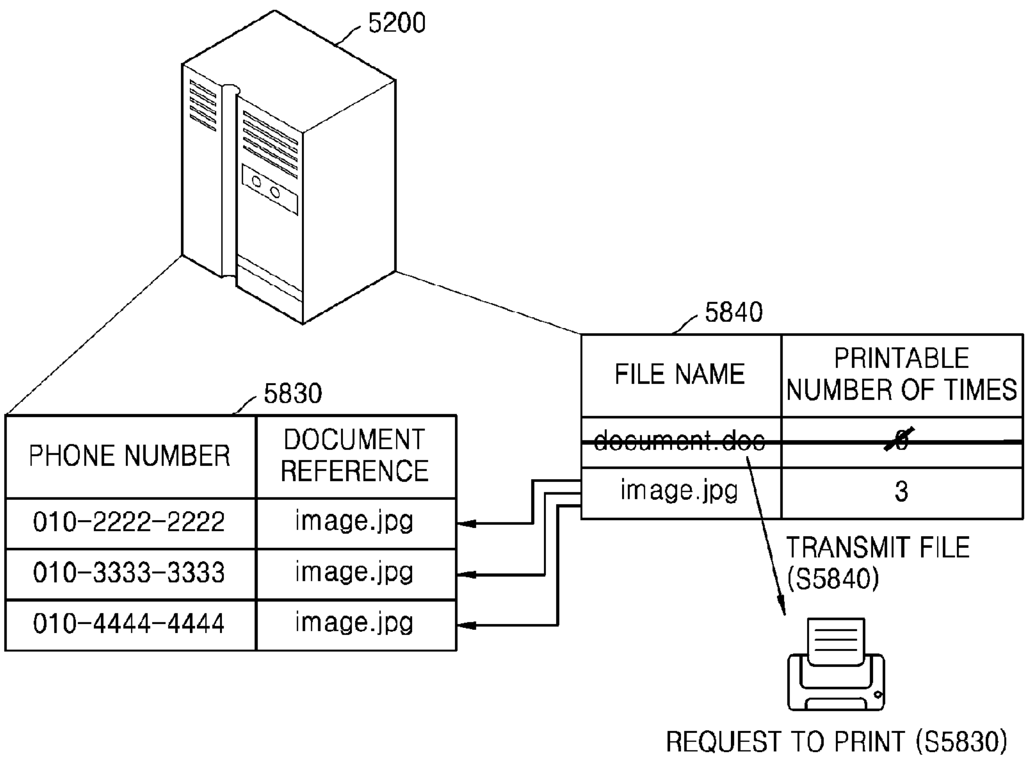
FIG. 58B is a diagram for describing processes of a cloud server managing a stored print operation when the print operation is external, according to an embodiment.

FIG. 58B is a diagram for describing processes of the cloud server 5200 managing a stored print job according to an embodiment.

Referring to FIG. 58B, a printer requests for a print job regarding a "document.doc" file in operation S5830. In operation S5840, the cloud server 5200 transmits the "document.doc" file to the printer. A phone number set according to the printer that requested for the print is "010-4444-4444". The cloud server 5200 deletes a row where a phone number is "010-4444-4444" and a document reference is "document-.doc" from a phone number and document reference table 5830. In FIG. 58B, such a row is already deleted from the phone number and document reference table 5830.

Then, the cloud server 5200 reduces a "printable number of times" in a row where a file name is "document.doc" by 1 from a file name and count table 5840. In an embodiment, since the reduced "printable number of times" is 0, a row where a file name is "document.doc" is deleted from the file name and count table 5840.

Figures 59, 60:
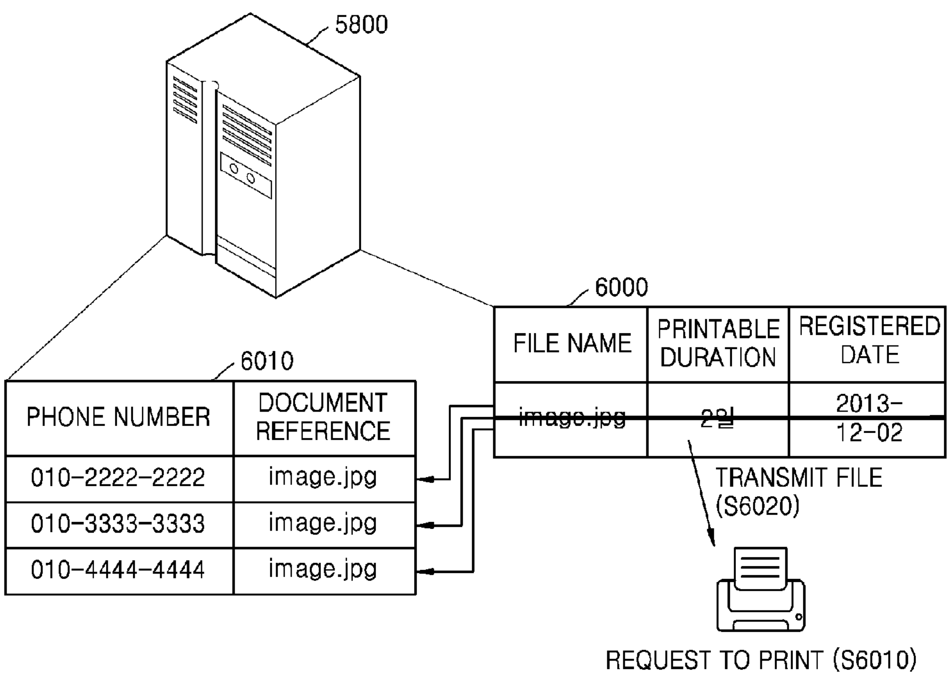
FIG. 59 illustrates a document and printable duration table, and a phone number and document reference table for managing a print operation, according to an embodiment.
FIG. 60 is a diagram for describing processes of a cloud server managing a stored print operation when the print operation is external, according to an embodiment.

FIG. 59 illustrates a document and printable duration table 5900, and a phone number and document reference table 5910 for managing a print job, according to an embodiment.

Referring to FIG. 59, a cloud server stores the document and printable duration table 5900 and the phone number and document reference table 5910, and may manage job requests by using the document and printable duration table 5900 and the phone number and document reference table 5910.

The document and printable duration table 5900 maps and stores a "file name", a "printable duration" and a "registered date". The "printable duration" may be pre-set in the cloud server. In an embodiment, it is assumed that printable durations are 2 days throughout files. For example, when a request to print an "image.jpg" file destined for three phone numbers is received from outside the cloud server, the "image.jpg" file is stored as the "file name" and "2 days" are stored as the "printable duration" in one row of the document and printable duration table 5900. When the print job is registered (stored) in the cloud server, information about the date and time may be obtained, and a registered date may be registered together with the print job. In an embodiment, the registered date is "02 December 2013".

FIG. 60 is a diagram for describing processes of the cloud server 5200 managing a stored print job according to an embodiment.

Referring to FIG. 60, in operation S6010, a printer requests for a print job regarding an "image.jpg" file. A phone number corresponding to the printer that requested for the print job is "010-4444-4444". The cloud server 5200 checks a "printable duration" in a row where a file name is "image.jpg" from a document and printable duration table 6000. When a point of time the print job is requested is 3 Dec. 2013, two days are not passed from the registered date of "2 Dec. 2013". Thus, in operation S6020, the cloud server 5200 transmits the print job to the printer.

However, when the point of time the print operation is requested is "5 Dec. 2013", the cloud server 5200 determines that the printable duration is already passed. Accordingly, operation S6020 is not performed, and the row where the "file name" is "image.jpg" is deleted from the document and printable duration table 6000. At this time, a row where a "file reference" is "image.jpg" may also be deleted from a phone number and file reference table 6010.

Figure 61:
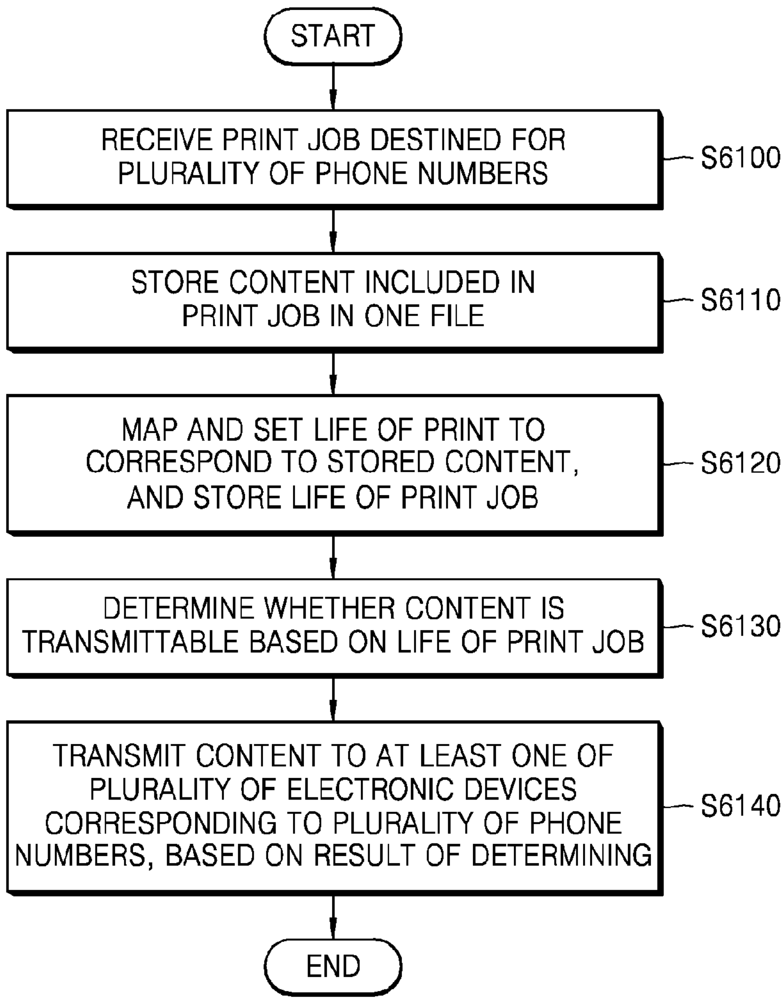
FIG. 61 is a flowchart of a method of performing a phone number-based print operation, according to an embodiment.

FIG. 61 is a flowchart of a method of performing a phone number-based print job, according to an embodiment.

In operation S6100, a server receives a print job destined for a plurality of phone numbers.

In operation S6110, the server stores a content as one file included in the print job.

In operation S6120, the server maps and sets a life of the print job to correspond to the stored content, and stores the life of the print job.

In operation S6130, the server determines whether the content is transmittable according to the life of the print job. The server receives a request on the content from at least one of a plurality of electronic devices, and upon receiving the request, may determine whether the content is transmittable to the at least one electronic device based on the life of the print job.

In operation S6140, the server transmits the content to the at least one electronic device corresponding to the plurality of phone numbers based on a result of the determining. The server may transmit the content to an electronic device that requested for the content, based on the result of determining.

Figure 62:
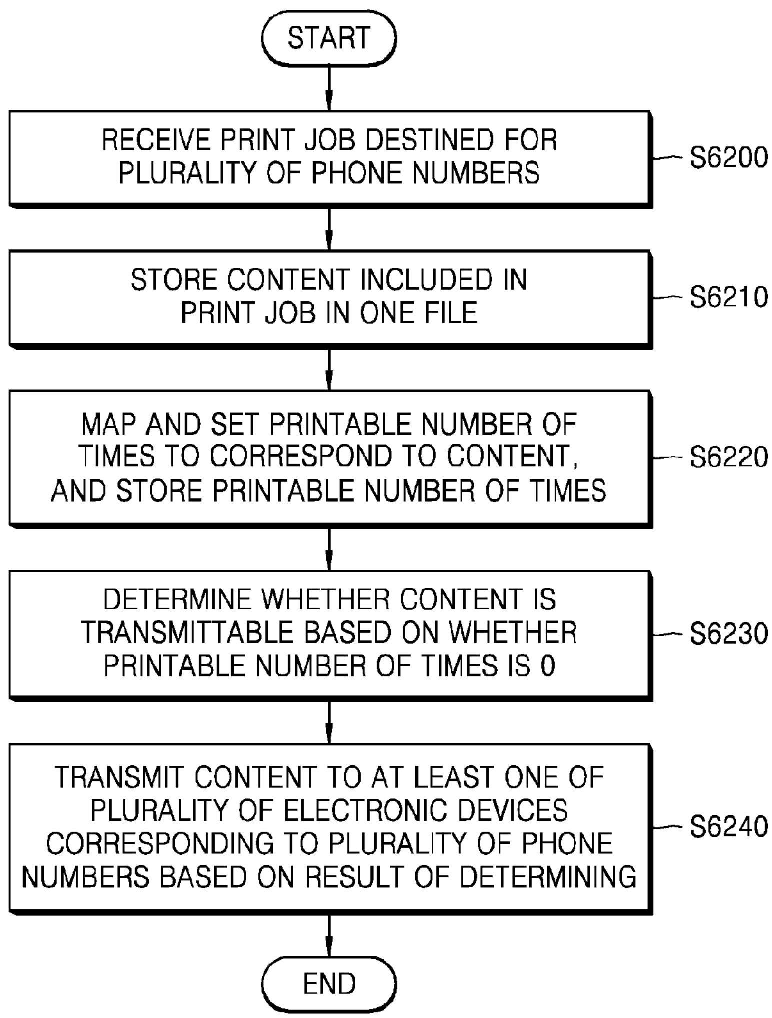
FIG. 62 is a flowchart of a method of performing a phone number-based print operation, according to an embodiment.

FIG. 62 is a flowchart of a method of performing a phone number-based print job, according to an embodiment.

In operation S6200, a server receives a print job destined for a plurality of phone numbers.

In operation S6210, the server stores a content as one file included in the print job.

In operation S6220, the server maps and sets a printable number of times to correspond to the stored content, and stores the printable number of times. The printable number of times may be set to correspond to the number of plurality of phone numbers that are destinations of the print job.

In operation S6230, the server determines whether the content is transmittable based on whether the printable number of times is 0. In other words, the server may determine that the content is transmittable when the printable number of times is not 0.

In operation S6240, the server transmits the content to at least one of a plurality of electronic devices corresponding to the plurality of phone numbers, based on a result of the determining.

When the content is transmitted, the printable number of times may be additionally adjusted. Also, when the printable number of times is 0, the content may be deleted.

Figure 63:
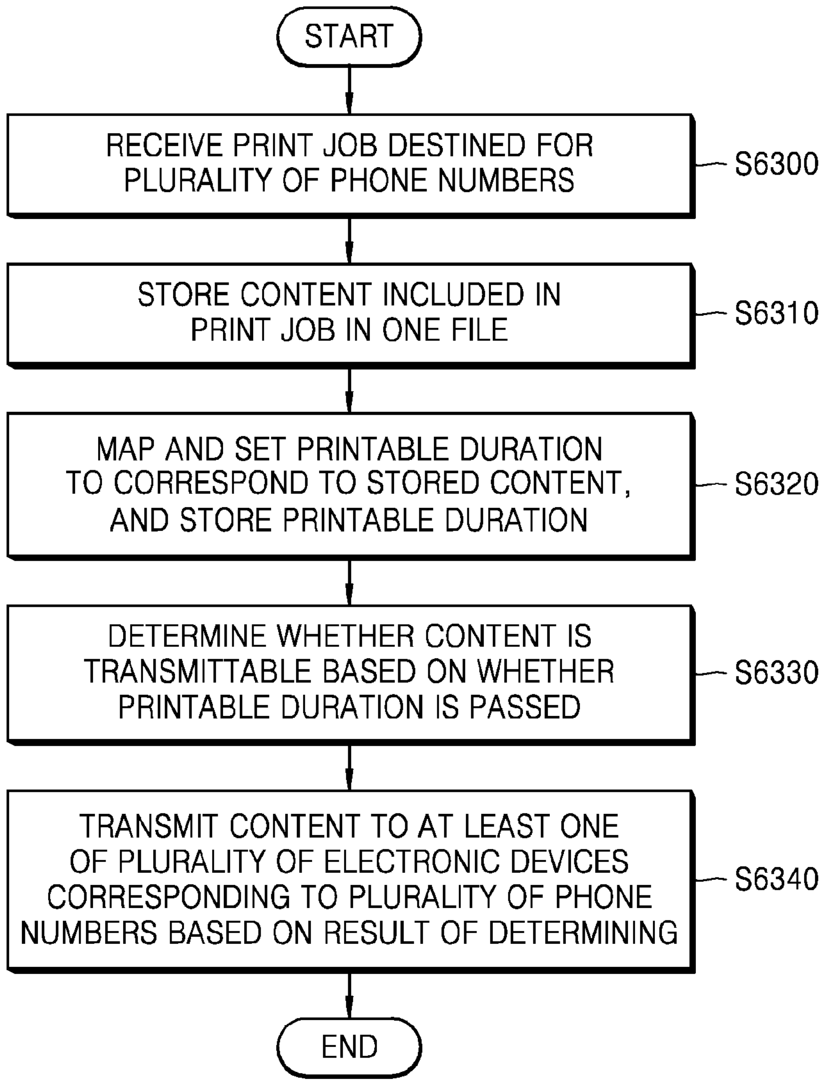
FIG. 63 is a flowchart of a method of performing a phone number-based print operation, according to an embodiment.

FIG. 63 is a flowchart of a method of performing a phone number-based print job, according to an embodiment.

In operation S6300, a server receives a print job destined for a plurality of phone numbers.

In operation S6310, the server stores a content as one file included in the print job.

In operation S6320, the server maps and sets a printable duration to correspond to the stored content, and stores the printable duration.

In operation S6330, the server determines whether the content is transmittable based on whether the printable duration is passed. In other words, the server may determine that the content is transmittable when the printable duration is not passed.

In operation S6340, the server transmits the content to at least one of a plurality of electronic devices corresponding to the plurality of phone numbers based on a result of the determining.

The server may delete the content if the printable duration is passed.

Figure 64:
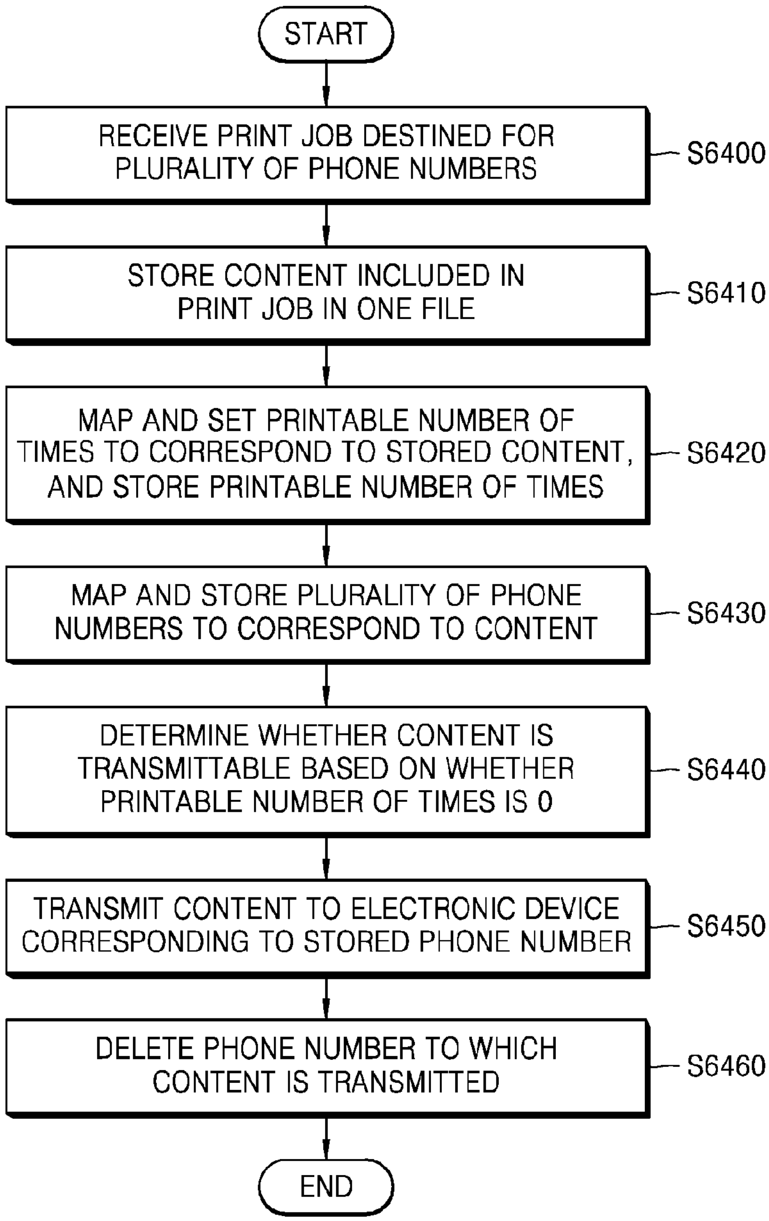
FIG. 64 is a flowchart of a method of performing a phone number-based print operation, according to an embodiment.

FIG. 64 is a flowchart of a method of performing a phone number-based print job, according to an embodiment.

In operation S6400, a server receives a print job destined for a plurality of phone numbers.

In operation S6410, the server stores a content as one file included in the print job.

In operation S6420, the server maps and sets a printable number of times to correspond to the stored content, and stores the printable number of times.

In operation S6430, the server maps and stores the plurality of phone numbers to correspond to the content.

In operation S6440, the server determines whether the content is transmittable based on whether the printable number of times is 0.

In operation S6450, the server transmits the content to an electronic device corresponding to the stored phone number.

In operation S6460, after the content is transmitted, the server deletes the phone number to which the content is transmitted.

According to an embodiment, a sender may transmit a content to a person who does not subscribe to a cloud printing service, and at this time, an invitation message may be transmitted to a non-subscriber to induce the non-subscriber to subscribe the cloud printing service and receive the content.

A cloud printing service provided by a cloud server is generally provided only to users subscribed to the cloud printing service. Accordingly, a sender is unable to transmit a content to be printed if a recipient is not a user subscribed to the cloud printing service, and the user has to subscribe to the cloud printing service to be provided with the cloud printing service. Accordingly, one or more embodiments provide a method enabling a sender to transmit a content to be printed even to a person who does not subscribe to a cloud printing service, and at this time, an invitation message is transmitted to a non-subscriber to induce the non-subscriber to subscribe to the cloud printing service and receive the content. An embodiment will be described in detail with reference to FIGS. 65 through 80.

Figure 65:
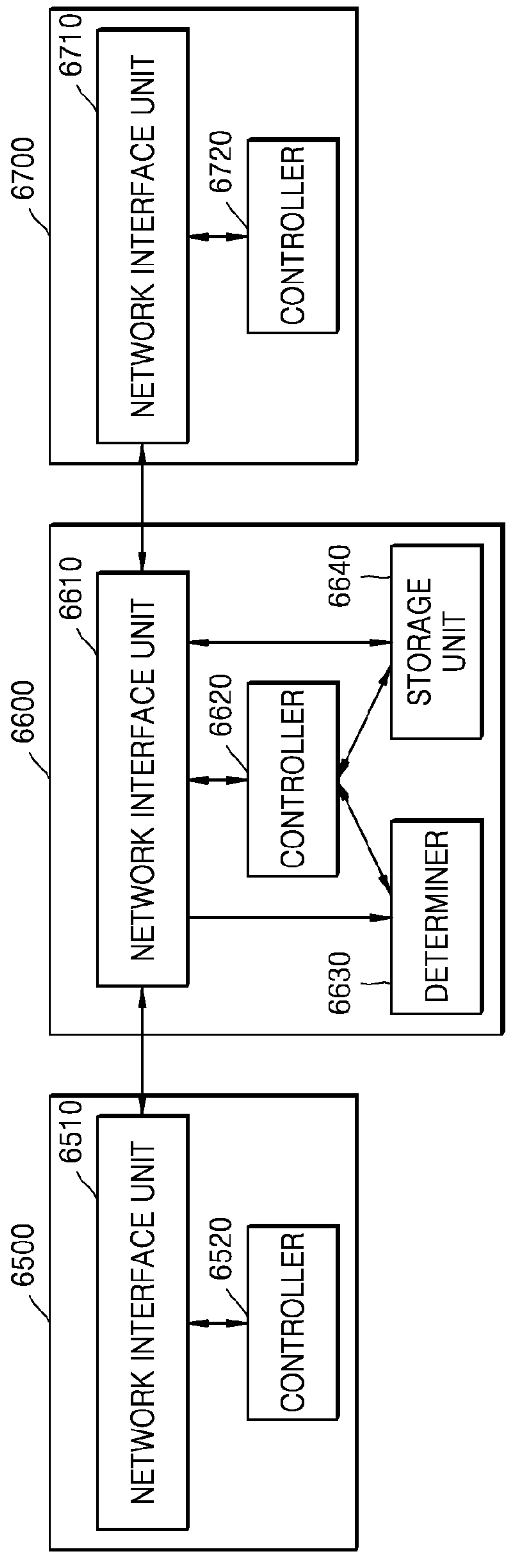
FIG. 65 is a block diagram of a cloud printing system according to an embodiment.

FIG. 65 is a block diagram of a cloud printing system according to an embodiment.

Referring to FIG. 65, the cloud printing system includes a user device 6500, a cloud server 6600, and a device 6700.

According to the cloud printing system, the user device 6500 transmits a content and a phone number to which the content is to be transmitted, to the cloud server 6600. The cloud server 6600 determines whether the received phone number is registered in the cloud server 6600, and if the received phone number is not registered, transmits a server registration induction message to the received phone number and stores the content correspondingly to the received phone number. The device 6700 transmits a server registration request corresponding to the server registration induction message to the cloud server 6600, and the cloud server 6600 transmits the stored content to the device 6700.

Thus, according to an embodiment, a user of the user device 6500 may transmit the content and the phone number regardless of whether the phone number is registered in the cloud server 6600.

A user of the device 6700 mapped to a phone number that is not registered in the cloud server 6600 receives a server registration induction message from the cloud server 6600, and transmits a server registration request to the cloud server 6600 in response. Based on the transmitted server registration request, the phone number is registered in the cloud server 6600. As such, a non-subscriber is induced to easily subscribe a phone number-based printing service.

After the registration, the user of the device 6700 may receive contents stored before the registration from the cloud server 6600. In other words, the user may receive the contents stored before the phone number of the device 6700 is registered, and thus the user may experience a seamless service.

The user of the user device 6500 may transmit the content regardless of whether the phone number is registered in the cloud server 6600. Accordingly, the user of the user device 6500 may have confidence that content shall be transmitted to a desired phone number.

Referring to FIG. 65, the user device 6500 includes a network interface unit (network interface) 6510 and a controller 6520.

The network interface unit (network interface) 6510 transmits the content and the phone number to which the content is to be transmitted. Also, the network interface unit 6510 may receive a message indicating whether to transmit the server registration induction message, and transmit a response to the message.

The controller 6520 controls the network interface unit 6510 to transmit the content and the phone number. The controller 6520 may control the network interface unit 6510 to receive the message indicating whether to transmit the server registration induction message from the cloud server 6600 and to transmit the response to the message to the cloud server 6600.

The user device 6500 may include a UI unit (not shown). The UI unit may receive inputs indicating the content and the phone number from a user. The UI unit may receive the response to the message indicating whether to transmit the server registration induction message from the user.

The cloud server 6600 includes a network interface unit (network interface) 6610, a controller 6620, a determiner 6630, and a storage unit (storage) 6640.

The network interface unit 6610 receives the content and the phone number to which the content is to be transmitted. The network interface unit 6610 transmits the server registration induction message to the received phone number, and transmits the content stored in the storage unit 6640 to the device 6700 mapped correspondingly to the received phone number.

The storage unit (storage) 6640 stores the content and the phone number. Also, the storage unit 6640 may store a user identifier.

The determiner 6630 determines whether the phone number received by the network interface unit 6610 is registered in the cloud server 6600. Also, the determiner 6630 may determine whether a predetermined period is passed from a point of time when the content is stored.

If the determiner 6630 determines that the phone number is not registered in the cloud server 6600, the controller 6620 transmits the server registration induction message to the phone number, receives the server registration request corresponding to the server registration induction message, and controls the network interface unit 6610 to transmit the stored content to the device 6700 mapped correspondingly to the phone number.

Also, the controller 6620 controls the storage unit 6640 to store the content correspondingly to the received phone number. When the determiner 6630 determines that the predetermined period is passed, the controller 6620 may control the storage unit 6640 to delete the stored content.

The cloud server 6600 may further include an authenticator (not shown). The authenticator may perform authentication on the phone number upon receiving the server registration request.

The controller 6620 may control the storage unit 6640 to map and register a plurality of phone numbers correspondingly to the user identifier.

The controller 6620 may control the network interface unit 6610 to transmit the message indicating whether to transmit the server registration induction message to the device 6600, receive a response to the message from the cloud server 6600, and transmit the server registration induction message based on the response.

The device 6700 includes a network interface unit (network interface) 6710 and a controller 6720.

The network interface unit 6710 receives the server registration induction message. Also, the network interface unit 6710 transmits the server registration request in response to the server registration induction message.

The controller 6720 controls the network interface unit 6710 to receive the server registration induction message, transmit the server registration request correspondingly to the server registration induction message, and receive the content.

The device 6700 may further include a UI unit (not shown). The UI unit may receive the server registration request correspondingly to the server registration induction message from the user, and display the received content to the user.

The device 6700 may further include a print operation performer (not shown). The print operation performer performs a printing operation of the received content. For example, the device 6700 may be a mobile terminal. The mobile terminal stores an intrinsic phone number in a universal subscriber identity module (USIM) chip, and thus is communicable by using a mobile network based on the intrinsic phone number. Accordingly, even when a phone number is not registered in the cloud server 6600, the cloud server 6600 may transmit a server registration induction message to the phone number via an MMS. The user may receive the content from the cloud server 6600 by using the mobile terminal, pre-check the content via a display or the like, and print the content by directly transmitting the content to an image forming apparatus connected to the mobile terminal. Alternatively, the user may map and register an image forming apparatus correspondingly to a phone number registered in the cloud server 6600, and the mobile terminal may request the cloud server 6600 to transmit the content to the mapped image forming apparatus.

However, alternatively, the device 6700 may be an apparatus including a print operation performer, such as an image forming apparatus. For example, when the device 6700 is a kiosk that is a public image forming apparatus, the device 6700 is communicable through a phone network based on an intrinsic phone number. Accordingly, the cloud server 6600 is able to transmit a message to the image forming apparatus, and the user is able to transmit a server registration request through a UI unit of the image forming apparatus to register the image forming apparatus and receive a content.

Figure 66:
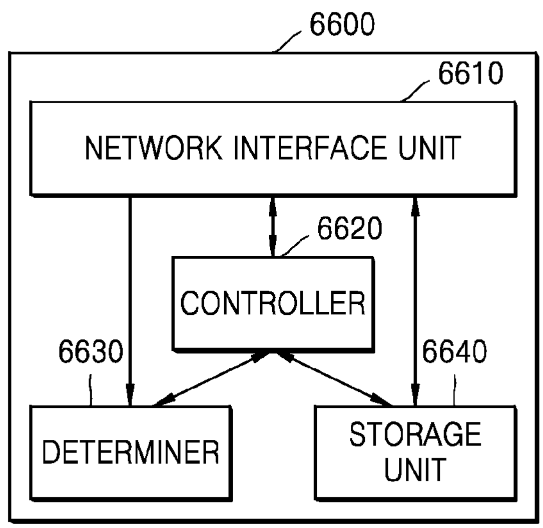
FIG. 66 is a block diagram of a cloud server according to an embodiment.

FIG. 66 is a block diagram of the cloud server 6600 according to an embodiment.

Since the cloud server 6600 of FIG. 66 performs the same operations as the cloud server 6600 of FIG. 65, details thereof are not repeated here.

Figure 67:
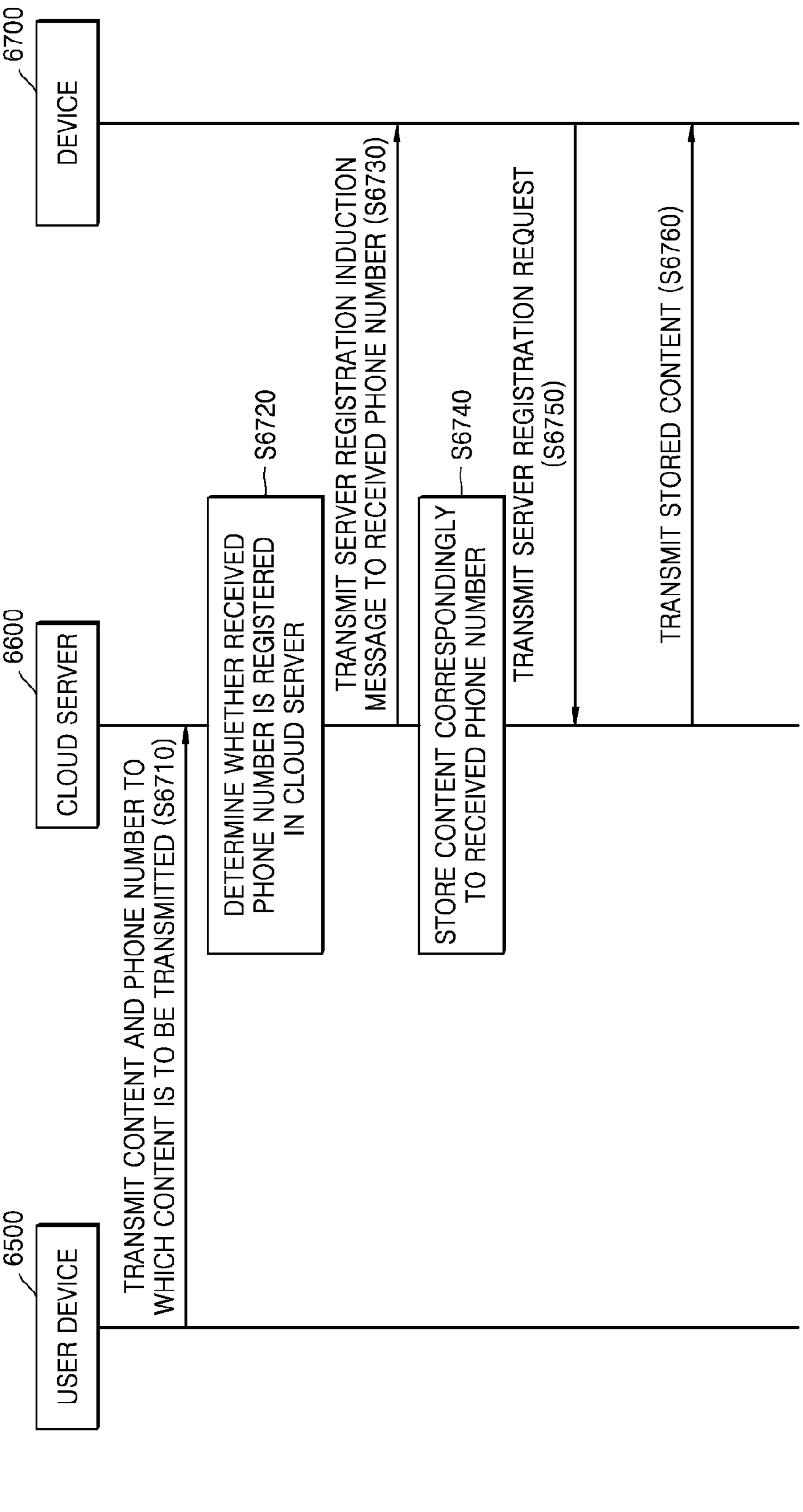
FIG. 67 is a diagram for describing a method of providing a phone-number based cloud printing service, which is performed by a cloud printing system, according to an embodiment.

FIG. 67 is a diagram for describing a method of providing a phone-number based cloud printing service, which is performed by the cloud printing system, according to an embodiment.

In operation S6710, the user device 6500 transmits the content and the phone number to which the content is to be transmitted to the cloud server 6600. The cloud server 6600 receives the content and the phone number.

In operation S6720, the cloud server 6600 determines whether the received phone number is registered in the cloud server 6600.

In operation S6730, when it is determined that the received phone number is not registered, the cloud server 6600 transmits the server registration induction message to the received phone number. The device 6700 receives the server registration induction message from the cloud server 6600.

In operation S6740, the cloud server 6600 stores the content correspondingly to the received phone number.

In operation S6750, the device 6700 may transmit the server registration request to the cloud server 6600 in response to the server registration induction message.

In operation S6760, the cloud server 6600 may transmit the stored content to the device 6700 mapped correspondingly to the phone number.

Figure 68:
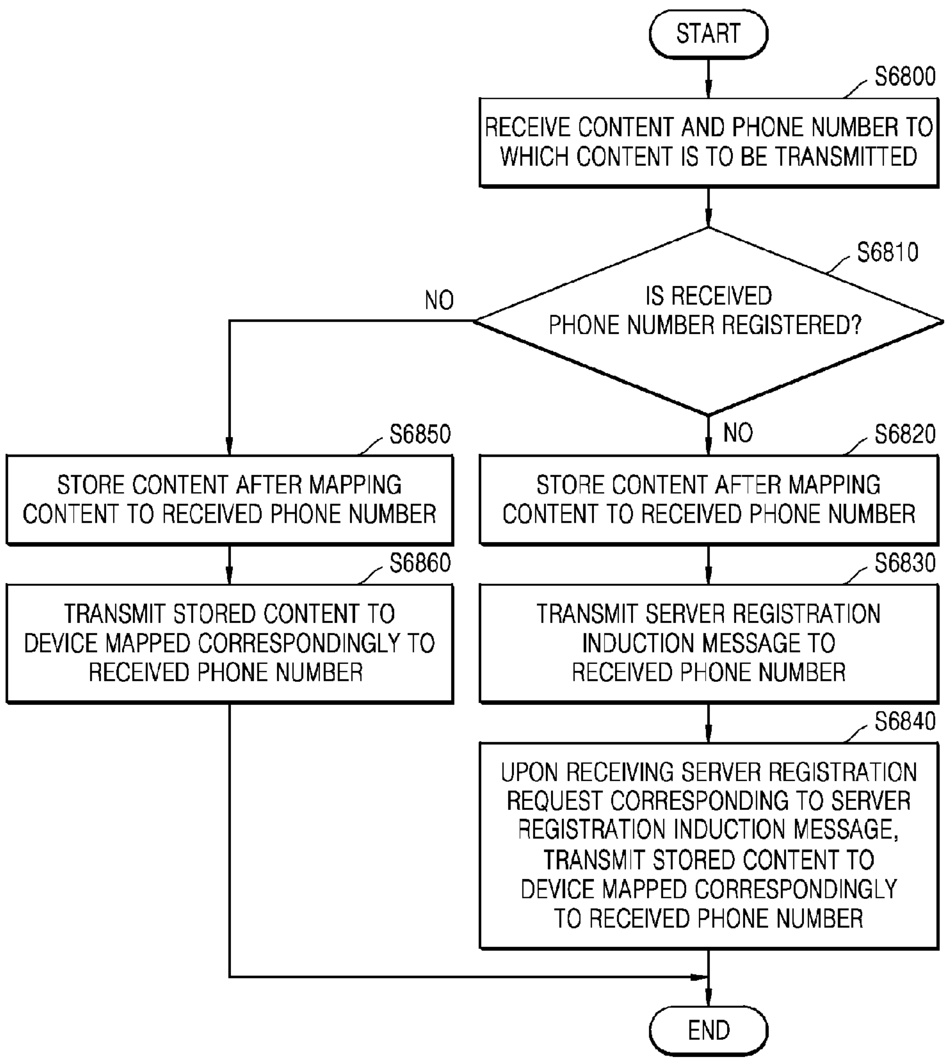
FIG. 68 is a flowchart illustrating a method of providing a phone number-based cloud printing service, according to an embodiment.

FIG. 68 is a flowchart illustrating a method of providing a phone number-based cloud printing service, according to an embodiment.

In operation S6800, the cloud server 6600 receives the content and the phone number to which the content is to be transmitted.

In operation S6810, the cloud server 6600 determines whether the received phone number is registered in the cloud server 6600.

In operation S6820, when it is determined that the received phone number is not registered, the cloud server 6600 stores the content after mapping the content to the received phone number.

In operation S6830, the cloud server 6600 transmits the server registration induction message to the device 6700 based on the received phone number.

In operation S6840, the cloud server 6600 receives the server registration request corresponding to the server registration induction message from the device 6700. Upon receiving the server registration request, the cloud server 6600 transmits the stored content to the device 6700 mapped correspondingly to the received phone number.

In operation S6850, when it is determined that the received phone number is registered, the cloud server 6600 stores the content after mapping the content to the received phone number.

In operation S6860, the cloud server 6600 transmits the stored content to the device 6700 mapped correspondingly to the received phone number.

Figure 69:
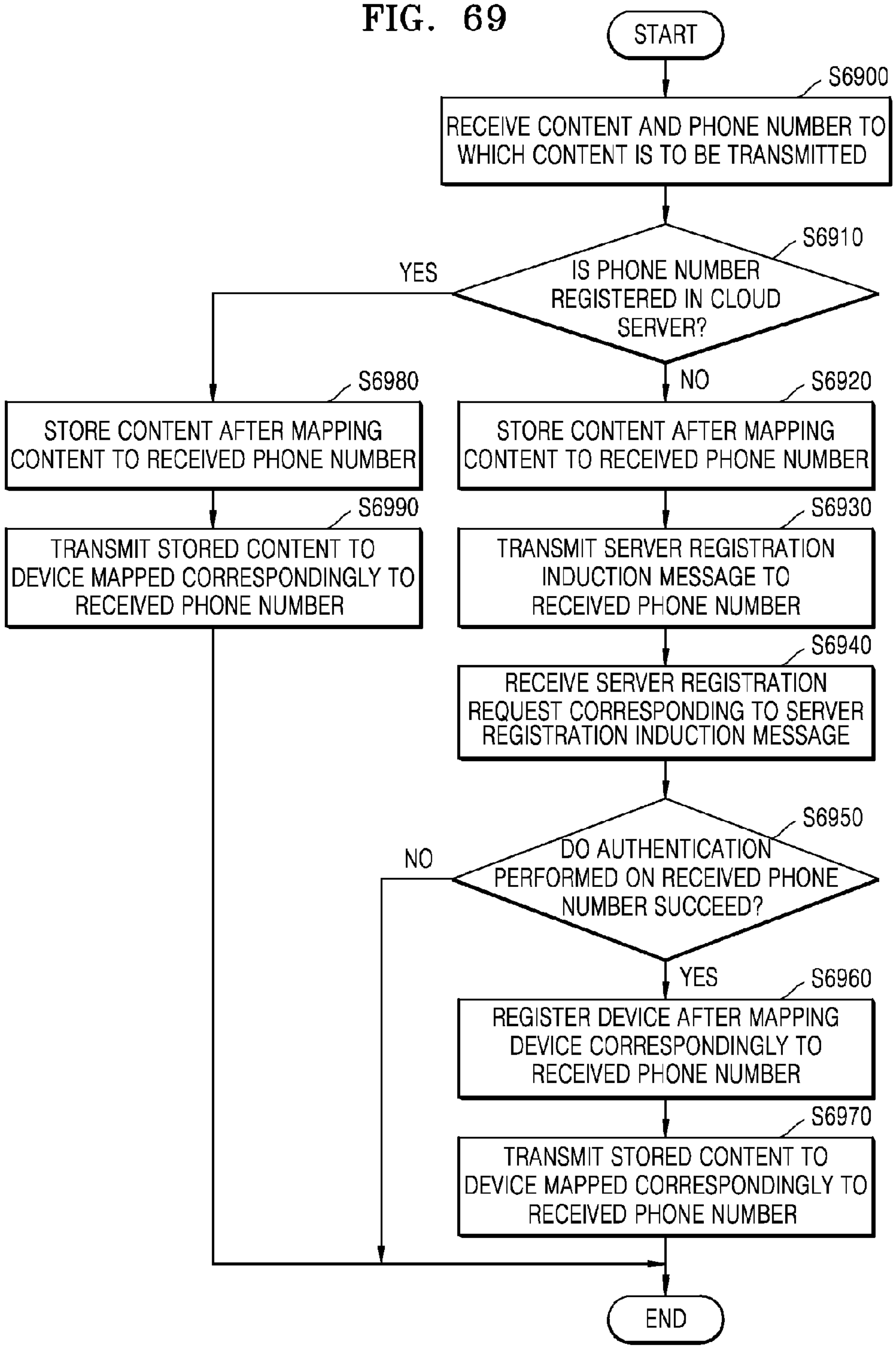
FIG. 69 is a flowchart illustrating a method of providing a phone number-based cloud printing service, according to an embodiment.

FIG. 69 is a flowchart illustrating a method of providing a phone number-based cloud printing service, according to an embodiment.

In operation S6900, the cloud server 6600 receives the content and the phone number to which the content is to be transmitted.

In operation S6910, the cloud server 6600 determines whether the received phone number is registered in the cloud server 6600.

In operation S6920, when it is determined that the received phone number is not registered, the cloud server 6600 stores the content after mapping the content to the received phone number.

In operation S6930, the cloud server 6600 transmits the server registration induction message to the received phone number.

In operation S6940, the cloud server 6600 receives the server registration request corresponding to the server registration induction message.

In operation S6950, the cloud server 6600 determines whether authentication performed on the received phone number succeeded.

In operation S6960, when the authentication succeeded, the cloud server 6600 registers the device 6700 after mapping the device 6700 correspondingly to the received phone number.

In operation S6970, the cloud server 6600 transmits the stored content to the device 6700 mapped correspondingly to the received phone number.

In operation S6980, when it is determined that the received phone number is registered in the cloud server 6600, the cloud server 6600 stores the content after mapping the content to the received phone number.

In operation S6990, the cloud server 6600 transmits the stored content to the device 6700 mapped correspondingly to the received phone number.

Figure 70:
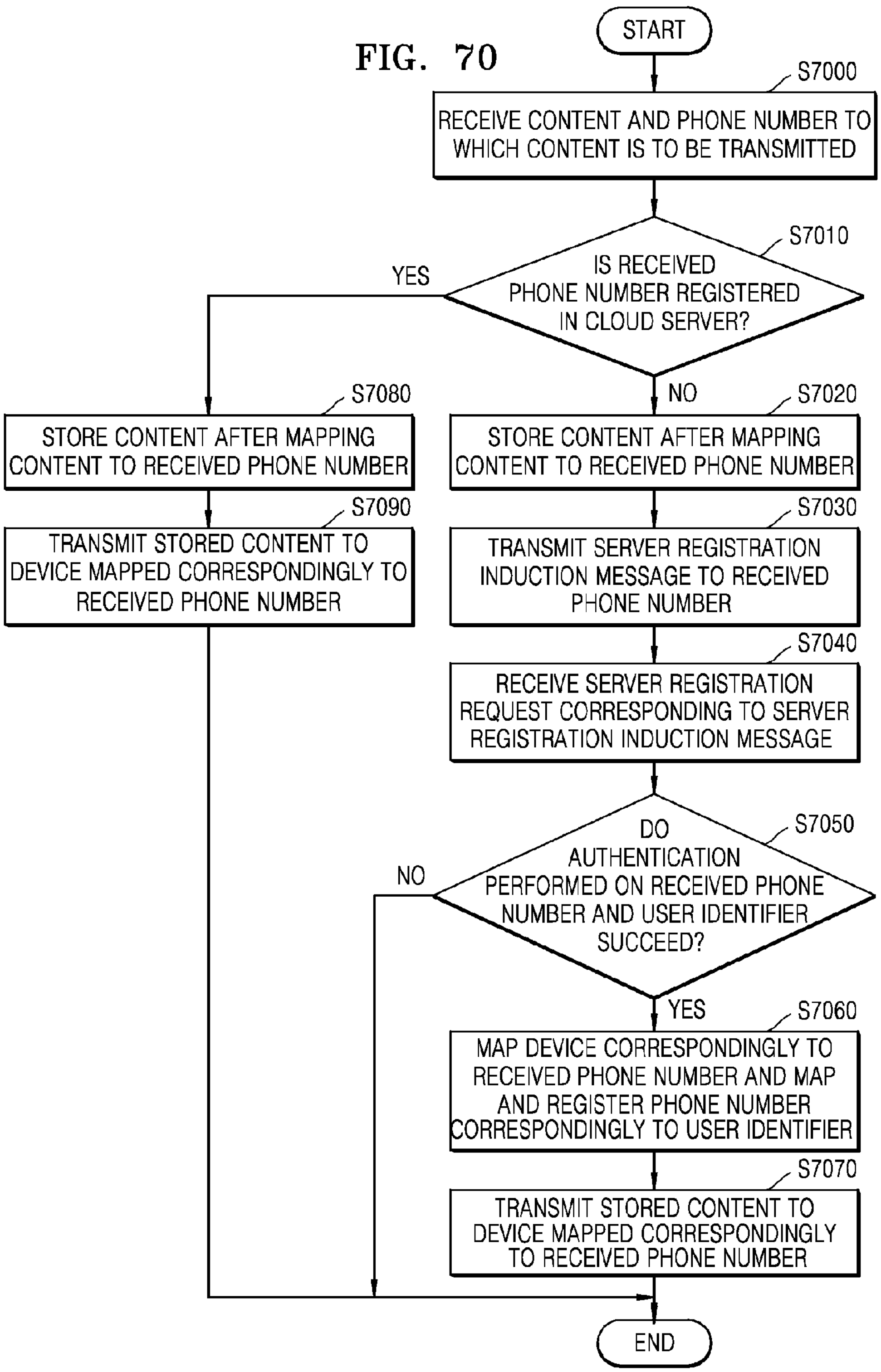
FIG. 70 is a flowchart illustrating a method of providing a phone number-based cloud printing service, according to an embodiment.

FIG. 70 is a flowchart illustrating a method of providing a phone number-based cloud printing service, according to an embodiment.

In operation S7000, the cloud server 6600 receives the content and the phone number to which the content is to be transmitted.

In operation S7010, the cloud server 6600 determines whether the received phone number is registered in the cloud server 6600.

In operation S7020, when the received phone number is not registered in the cloud server 6600, the cloud server 6600 stores the content after mapping the content to the received phone number.

In operation S7030, the cloud server 6600 transmits the server registration induction message to the received phone number. For example, the cloud server 6600 transmits the server registration induction message to the device 6700 mapped correspondingly to the received phone number.

In operation S7040, the cloud server 6600 receives the server registration request corresponding to the server registration induction message.

In operation S7050, the cloud server 6600 determines whether authentication performed on the received phone number succeeded. Also, the cloud server 6600 may determine whether authentication performed on the user identifier succeeded.

In operation S7060, the cloud server 6600 maps and registers the device 6700 correspondingly to the received phone number. Also, the cloud server 6600 maps and registers the phone number correspondingly to the user identifier. The cloud server 6600 may map and register a plurality of phone numbers correspondingly to the user identifier.

In operation S7070, the cloud server 6600 transmits the stored content to the device 6700 mapped correspondingly to the received phone number.

In operation S7080, when the received phone number is registered in the cloud server 6600, the cloud server 6600 stores the content after mapping the content to the received phone number.

In operation S7090, the cloud server 6600 transmits the stored content to the device 6700 mapped correspondingly to the received phone number.

If a plurality of phone numbers are mapped and registered correspondingly to a user identifier, a user is able to check all contents destined for the plurality of phone numbers mapped correspondingly to the user identifier when the user logs in via authentication on the user identifier. For example, when the cloud server 6600 provides a webpage providing a printing service to a user, and the user logs in the webpage by performing authentication on a user identifier, the user is able to check all contents destined for a plurality of phone numbers mapped correspondingly to the user identifier.

However, if a user checks a content transmitted to his/her phone number by using a mobile terminal, the user is able to check only a content mapped correspondingly to his/her phone number. In other words, even when a plurality of phone numbers are mapped correspondingly to a user identifier, only the content mapped correspondingly to his/her phone number is received if the mobile terminal is used. However, alternatively, the user may pre-set the mobile terminal to receive a content destined for a plurality of phone numbers mapped correspondingly to the user identifier.

Figure 71:
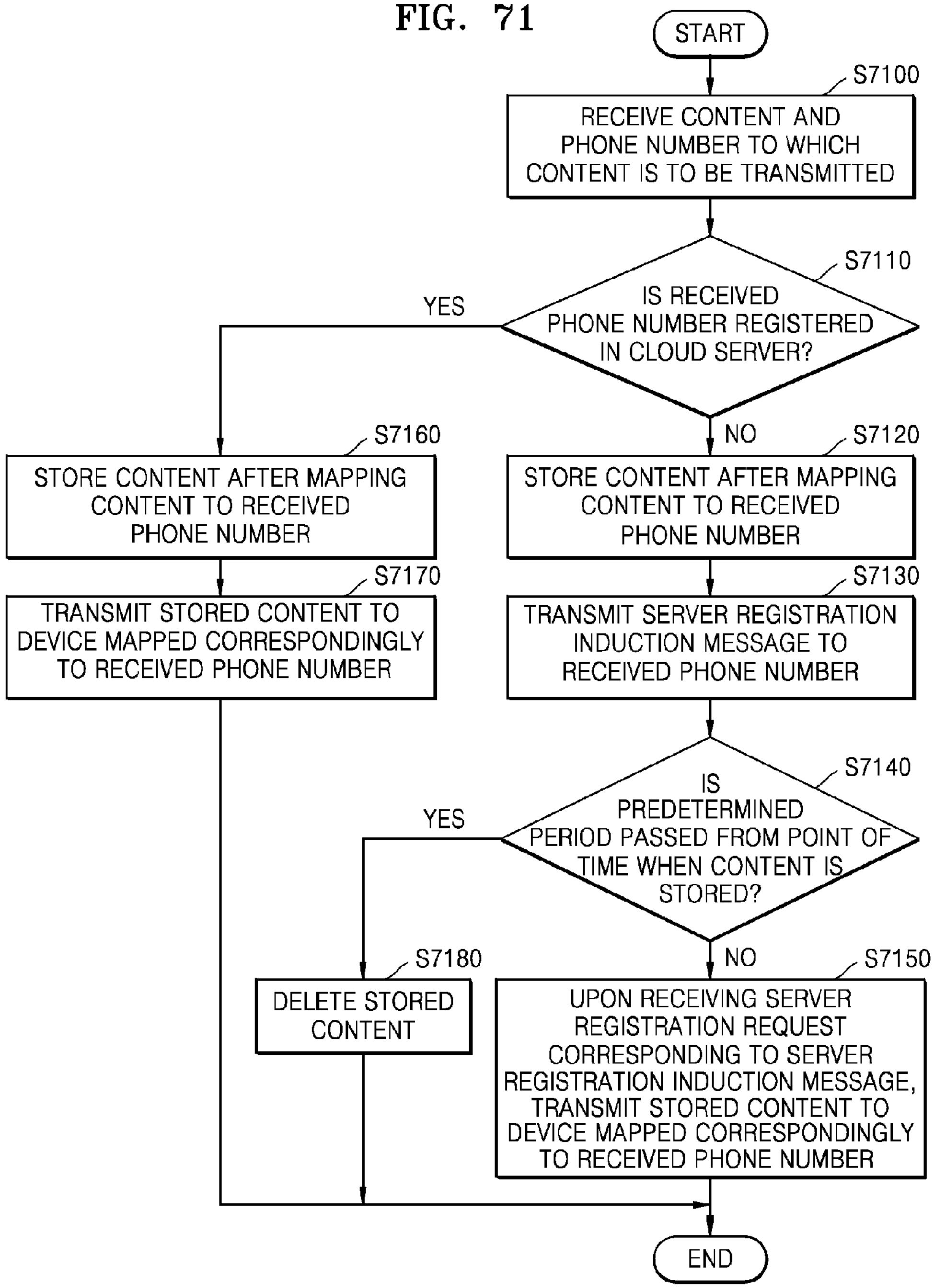
FIG. 71 is a flowchart illustrating a method of providing a phone number-based cloud printing service, according to an embodiment.

FIG. 71 is a flowchart illustrating a method of providing a phone number-based cloud printing service, according to an embodiment.

In operation S7100, the cloud server 6600 receives the content and the phone number to which the content is to be transmitted.

In operation S7110, the cloud server 6600 determines whether the received phone number is registered in the cloud server 6600.

In operation S7120, when it is determined that the received phone number is not registered, the cloud server 6600 stores the content after mapping the content to the received phone number.

In operation S7130, the cloud server 6600 transmits the server registration induction message to the received phone number. For example, the cloud server 6600 transmits the server registration induction message to the device 6700 mapped correspondingly to the received phone number.

In operation S7140, the cloud server 6600 determines whether a predetermined period is passed from a point of time when the content is stored.

In operation S7150, when it is determined that the predetermined period is not passed and the cloud server 6600 receives the server registration request corresponding to the server registration induction message from the device 6700, the cloud server 6600 transmits the stored content to the device 6700 mapped correspondingly to the received phone number.

In operation S7160, when it is determined that the received phone number is registered, the cloud server 6600 stores the content after mapping the content to the received phone number.

In operation S7170, the cloud server 6600 transmits the stored content to the device 6700 mapped correspondingly to the received phone number.

In operation S7180, when it is determined that the predetermined period is passed, the cloud server 6600 deletes the stored content.

Figure 72:
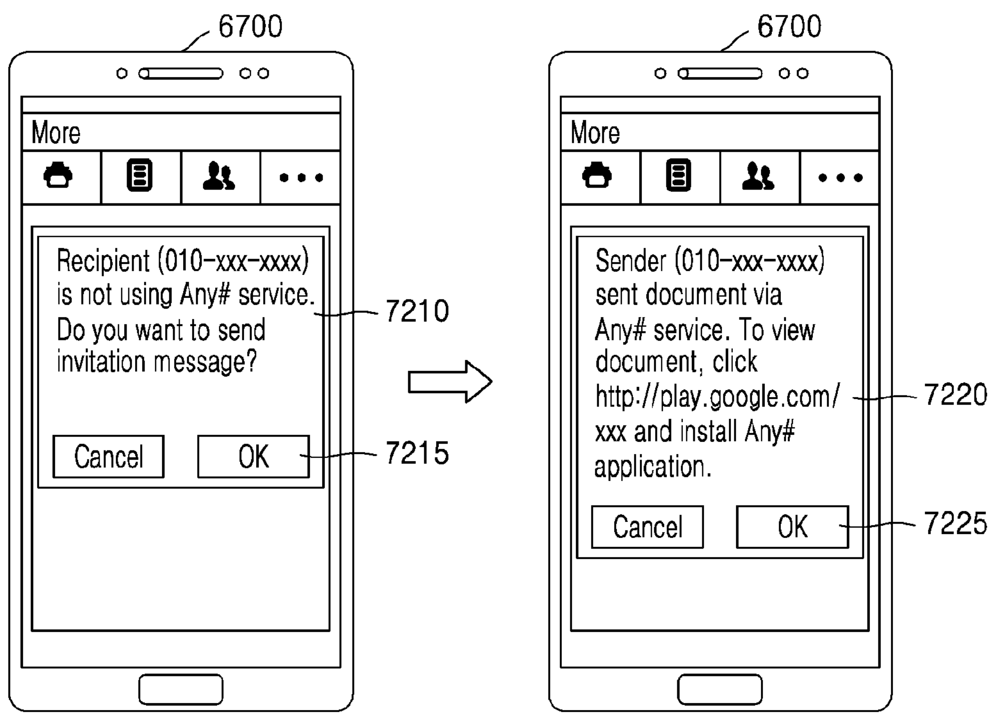
FIG. 72 is a diagram for describing a process of transmitting a service subscription invitation message to a phone number to which a content is to be transmitted, according to an embodiment.

FIG. 72 is a diagram for describing a process of transmitting a service subscription invitation message 7220 to a phone number to which a content is to be transmitted, according to an embodiment.

Referring to FIG. 72, a user transmits the content by inputting the phone number to which the content is to be transmitted by using the user device 6500. When the cloud server 6600 determines that the phone number is not registered, the cloud server 6600 transmits a message 7210 to the user device 6500. The message 7210 is about whether to transmit the service subscription invitation message 7220 to a person using the phone number. When the user selects OK 7215 from the message 7210, the cloud server 6600 transmits the service subscription invitation message 7220 to the phone number. For example, the cloud server 6600 transmits the service subscription invitation message 7220 to the device 6700. The device 6700 may be a device using an intrinsic phone number, such as a mobile terminal. However, instead of transmitting the service subscription invitation message 7220 from the cloud server 6600, the user device 6500 may directly transmit the service subscription invitation message 7220 in an SMS form to the device 6700 if the user device 6500 is a mobile terminal.

The device 6700 may download and install an application from an address shown in the service subscription invitation message 7220, and transmit a service subscription request to the cloud server 6600 through the application. However, alternatively, a user of the device 6700 may transmit the service subscription request to the cloud server 6600 without having to install the application.

Figure 73A:
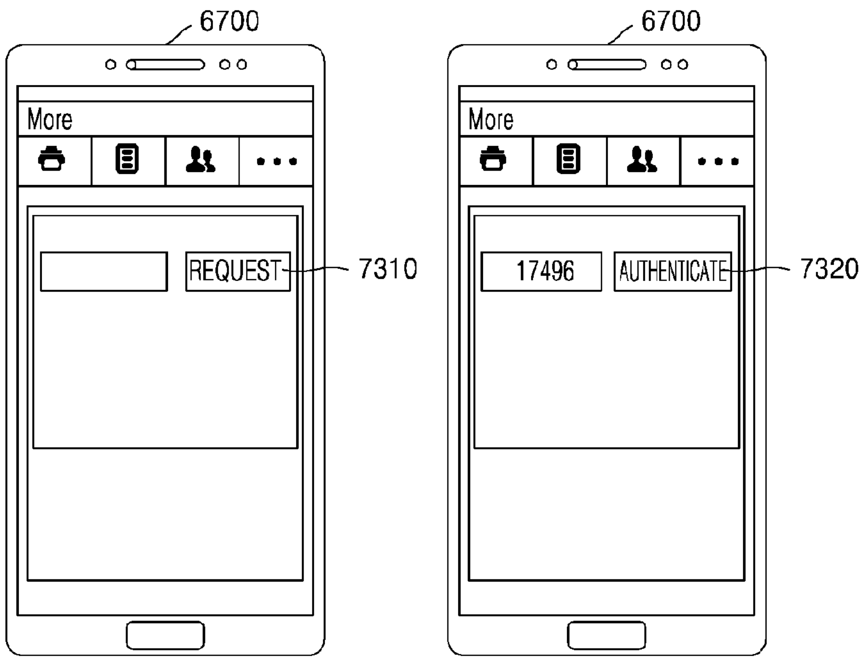
FIGS. 73A and 73B are diagrams for describing a process of performing authentication for a service non-subscriber to subscribe a service.
Figure 73B:
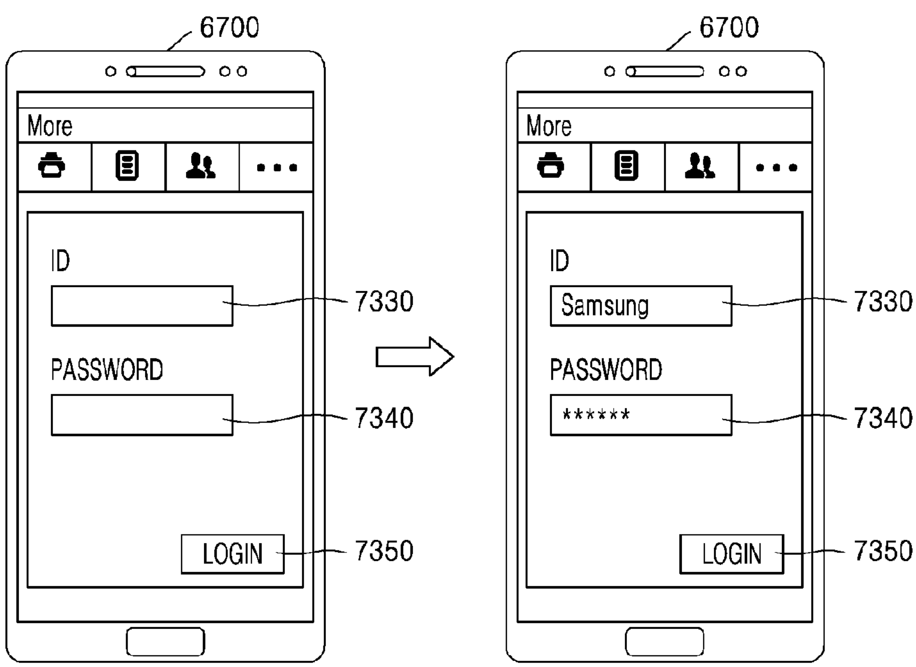

FIGS. 73A and 73B are diagrams for describing a process of performing authentication for a service non-subscriber to subscribe a service.

Referring to FIG. 73A, the device 6700 is a mobile terminal. Since a mobile terminal uses an intrinsic phone number, the mobile terminal may receive an SMS and perform authentication on the intrinsic phone number.

The device 6700 selects "Request" 7310 on an application providing a service for authenticating a phone number to request the cloud server 6600 to transmit an authentication number. Accordingly, the cloud server 6600 generates a PIN code. When the cloud server 6600 transmits the generated PIN code to the device 6700, the user of the device 6700 checks and inputs the PIN code, and selects "Authenticate" 7320. Then, the device 6700 transmits the inputted PIN code the cloud server 6600, and the cloud server 6600 compares the inputted PIN code and the generated PIN code. When the inputted PIN code and the generated PIN code match, the authentication is completed.

Referring to FIG. 73B, authentication is performed on a user account used in a service, according to an embodiment.

In FIG. 73B, when a user inputs a user account into an input box 7330, inputs a password into an input box 7340, and selects "Login" 7350, information including the user account and the password is transmitted to the cloud server 6600 for authentication.

For example, in an embodiment, the user inputs "Samsung" as the user account into the input box 7330, inputs four digit password "**" into the input box 7340, and selects "Login" 7350** to authenticate the user account.

The cloud server 6600 completes authentication when a stored user account and a stored password match the user account and the password input by the user.

Figure 74:
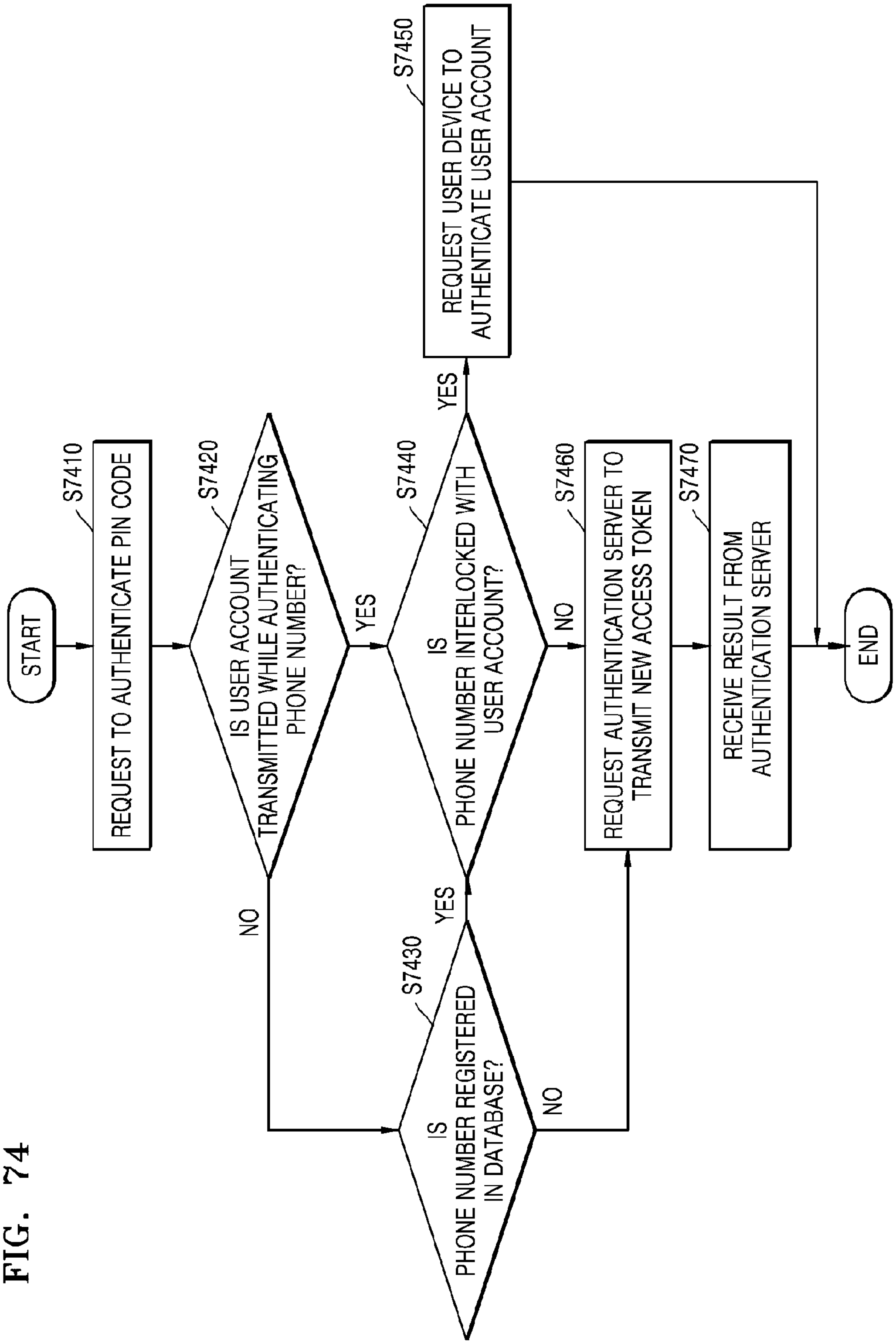
FIG. 74 is a flowchart illustrating a process of performing authentication, which is performed by an application program interface (API) server that is a part of a cloud server, according to an embodiment.

FIG. 74 is a flowchart illustrating a process of performing authentication, which is performed by an API server that is a part of the cloud server 6600, according to an embodiment.

Referring to FIG. 74, in operation S7410, the device 6700 requests the API server to authenticate a PIN code.

In operation S7420, the API server determines whether a user account is also transmitted while authenticating a phone number. In other words, the user of the device 6700 may request the API server to authenticate the phone number while authenticating the user account, and the API server may determine whether the user account is also transmitted while authenticating the phone number to determine whether the user account is to be authenticated.

In operation S7430, when it is determined that the user account is not transmitted while authenticating the phone number, the API server determines whether the phone number is registered in a database. In other words, when it is determined that the user account is not requested to be authenticated while authenticating the phone number, the API server determines whether the phone number is registered in the database.

In operation S7440, when it is determined that the phone number is registered in the database, the API server determines whether the phone number is interlocked with the user account.

In operation S7450, when it is determined that the phone number is interlocked with the user account, the API server requests the device 6700 to determine whether to authenticate the user account determined to be interlocked with the phone number of the device 6700. When a request to authenticate the user account is received, the API server requests an authentication server to transmit an access token for the user account by transmitting the user account with the request. On the other hand, when a request not to authenticate the user account is received, the API server does not transmit the user account so as to authenticate the phone number without the user account and requests the authentication server to transmit a new access token.

In operation S7460, when it is determined that the phone number is not interlocked with the user account, the API server requests the authentication server to transmit a new access token. In other words, the API server requests the authentication server to transmit an access token so as to obtain authority to use a service by registering the phone number. In operation S7470, the API server receives a result of the request from the authentication server. For example, when the request is successfully authenticated, the API server receives the access token, and when the request is failed, the API server receives a value indicating an authentication failure instead of the access token.

Figure 75:
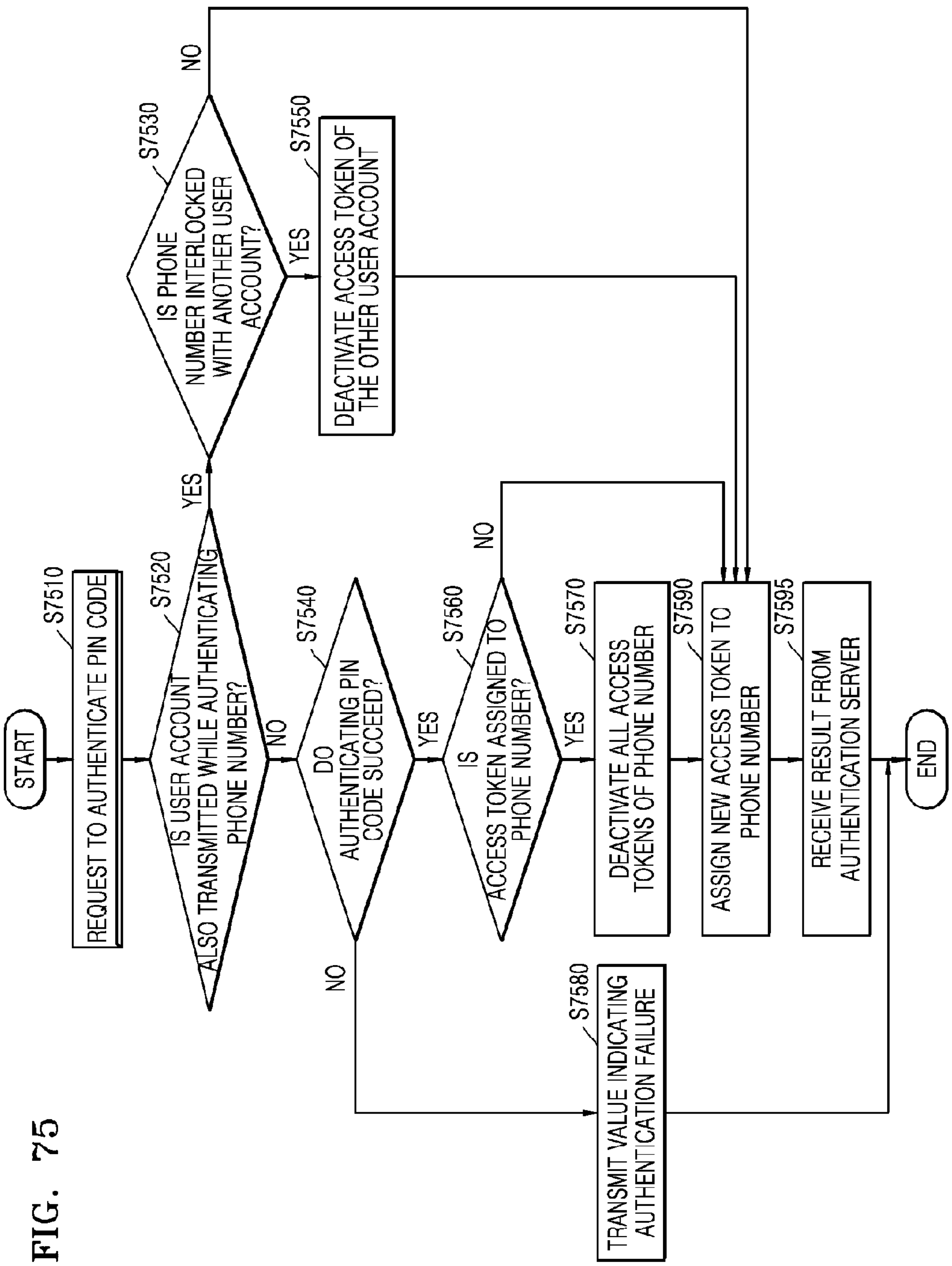
FIG. 75 is a flowchart illustrating a process of performing authentication, which is performed by an authentication server that is a part of the cloud server, according to an embodiment.

FIG. 75 is a flowchart illustrating a process of performing authentication, which is performed by an authentication server that is a part of the cloud server 6600, according to an embodiment.

In operation S7510, the authentication server receives a request to authenticate a PIN code from the API server.

In operation S7520, the authentication server determines whether a user account is also transmitted while authenticating a phone number.

In operation S7530, when it is determined that the user account is also transmitted, the authentication server determines whether the phone number is interlocked with another user account.

In operation S7550, when it is determined that the phone number is interlocked with the other user account, the authentication server authenticates the transmitted user account. At the same time, the authentication server may authenticate the PIN code. When the authenticating succeeds, the authentication server deactivates an access token of the other user account.

In operation S7540, the authentication server determines whether the authenticating of the PIN code succeeded.

In operation S7560, when it is determined that the PIN code is successfully authenticated, the authentication server determines whether an access token is assigned to the phone number.

In operation S7570, when it is determined that the access token is assigned to the phone number, all access tokens of the phone number are deactivated.

In operation S7590, when it is determined that the access token is not assigned to the phone number, the authentication server assigns a new access token to the phone number. Also, when it is determined that the access token is assigned to the phone number, the authentication server assigns a new access token to the phone number. When the access token of the other user account is deactivated, the authentication server may assign a new access token to the phone number. Also, when it is determined that the phone number is not interlocked with the other user account, the authentication server requests the device 6700 to authenticate the other user account. Also, the authentication server may also authenticate the PIN code. When the authenticating of the PIN code succeeds, the authentication server assigns a new access token to the phone number.

In operation S7580, when the authenticating of the PIN code fails, the authentication server transmits a value indicating an authentication failure to the API server.

Figure 76A:
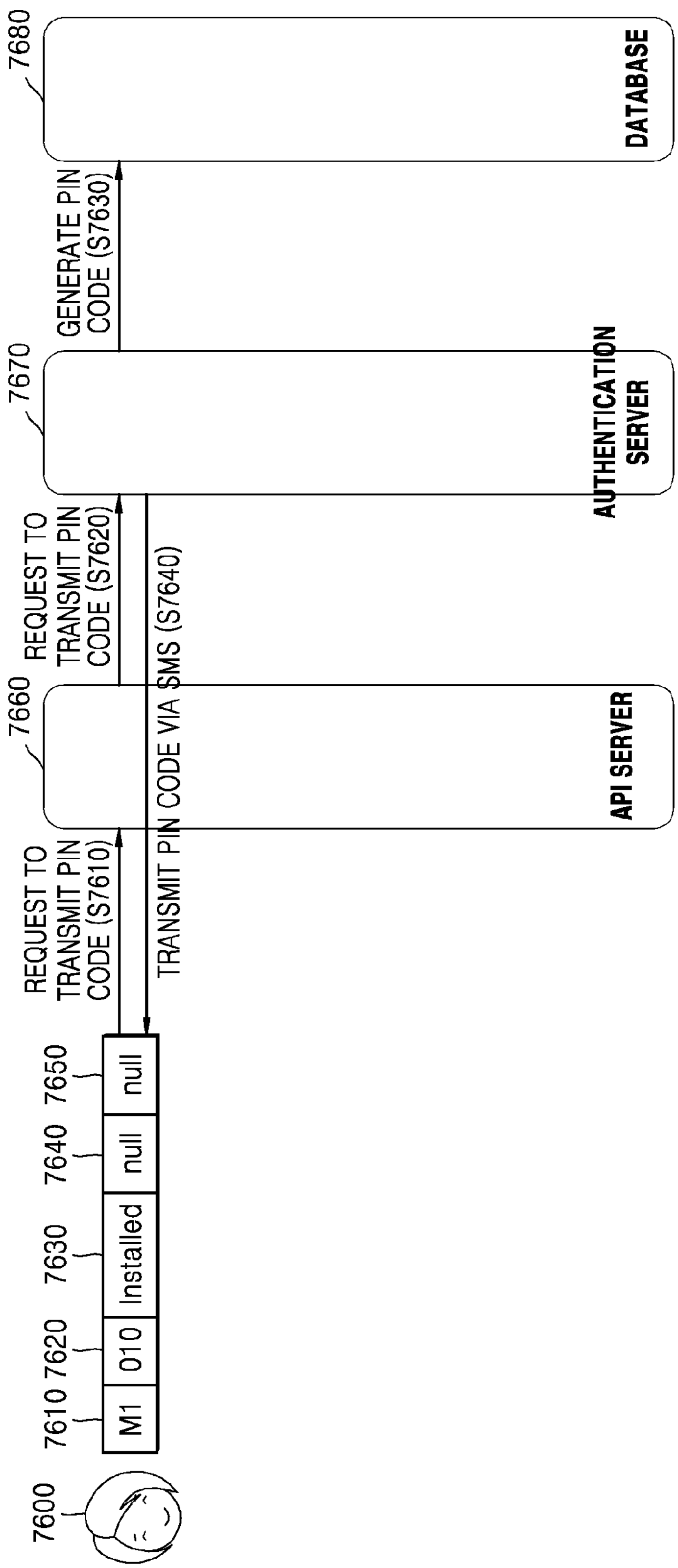
FIGS. 76A and 76B are diagrams for describing processes of performing authentication on a phone number in response to a service subscription inducement message, which are performed by a service non-subscriber.
Figure 76B:
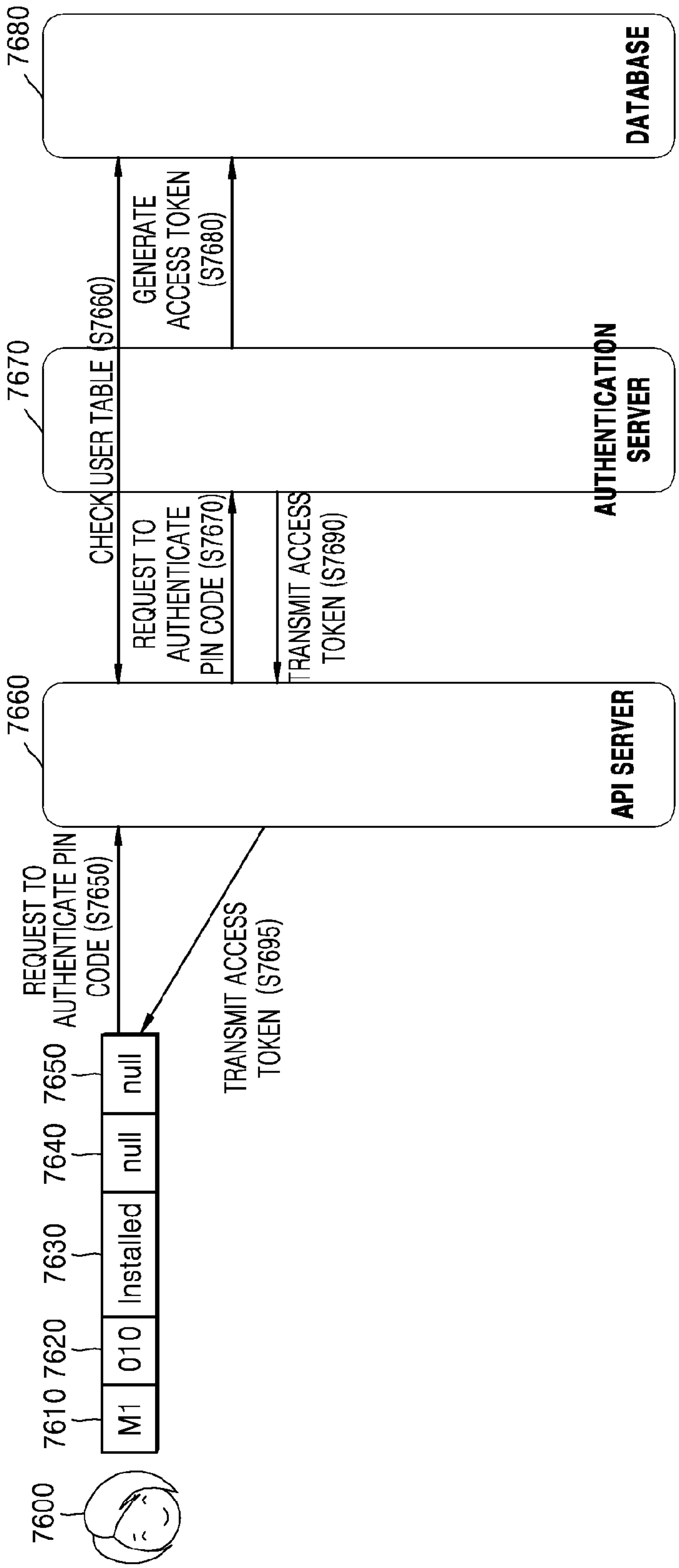

In operation S7595, the authentication server assigns a new access token to the phone number, the authentication server transmits the new access token to the API server. FIGS. 76A and 76B are diagrams for describing processes of performing authentication on a phone number in response to a service subscription inducement message, which are performed by a service non-subscriber.

FIG. 76A is a diagram for describing a process of requesting a PIN code, which is performed by a service non-subscriber.

A user A 7600 uses a mobile terminal M1 as a usage device 7610, uses 010 as a phone number 7620, a service application is installed in the usage device 7610 based on a service subscription message received from a server regarding an application installation state 7630, the phone number 7620 is not interlocked with any ID regarding a user account interlocking state 7640, and the usage device 7610 did not obtain an access token regarding an access token obtain state 7650.

In operation S7610, the user A 7600 requests an API server 7660 to transmit a PIN code, by using the mobile terminal M1 as the usage device 7610.

In operation S7620, the API server 7660 requests an authentication server 7670 to transmit the PIN code.

In operation S7630, the authentication server 7670 generates the PIN code and stores the PIN code in a database 7680.

In operation S7640, the authentication server 7670 transmits the generated PIN code to the mobile terminal M1 , via an SMS.

Accordingly, the user A 7600 may receive the PIN code via the SMS from the authentication server 7670 by requesting the PIN code by using the mobile terminal M1 as the usage device 7610.

FIG. 76B is a diagram for describing a process of performing authentication as the service non-subscriber requests to authenticate the received PIN code.

In operation S7650, the user A 7600 requests the API server 7660 to authenticate the PIN code by using the mobile terminal M1.

In operation S7670, the API server 7660 checks a user table stored in the database 7680. In the user table, user identifiers, phone numbers, and devices are correspondingly mapped to each other.

In operation S7670, when there is no user registered in a requested phone number, the API server 7660 requests the authentication server 7670 to authenticate the PIN code.

In operation S7680, the authentication server 7670 generates an access token with respect to the request to authenticate the PIN code, and stores the access token in the database 7680.

In operation S7690, the authentication server 7670 transmits the generated access token to the API server 7660.

In operation S7695, the API server 7660 transmits the access token to the mobile terminal M1.

Accordingly, the user A 7600 may access a content stored in a cloud server by using the access token as the phone number 7620 is registered in the cloud server such that the mobile terminal M1 is able to use a service of the cloud server.

Figure 77A:
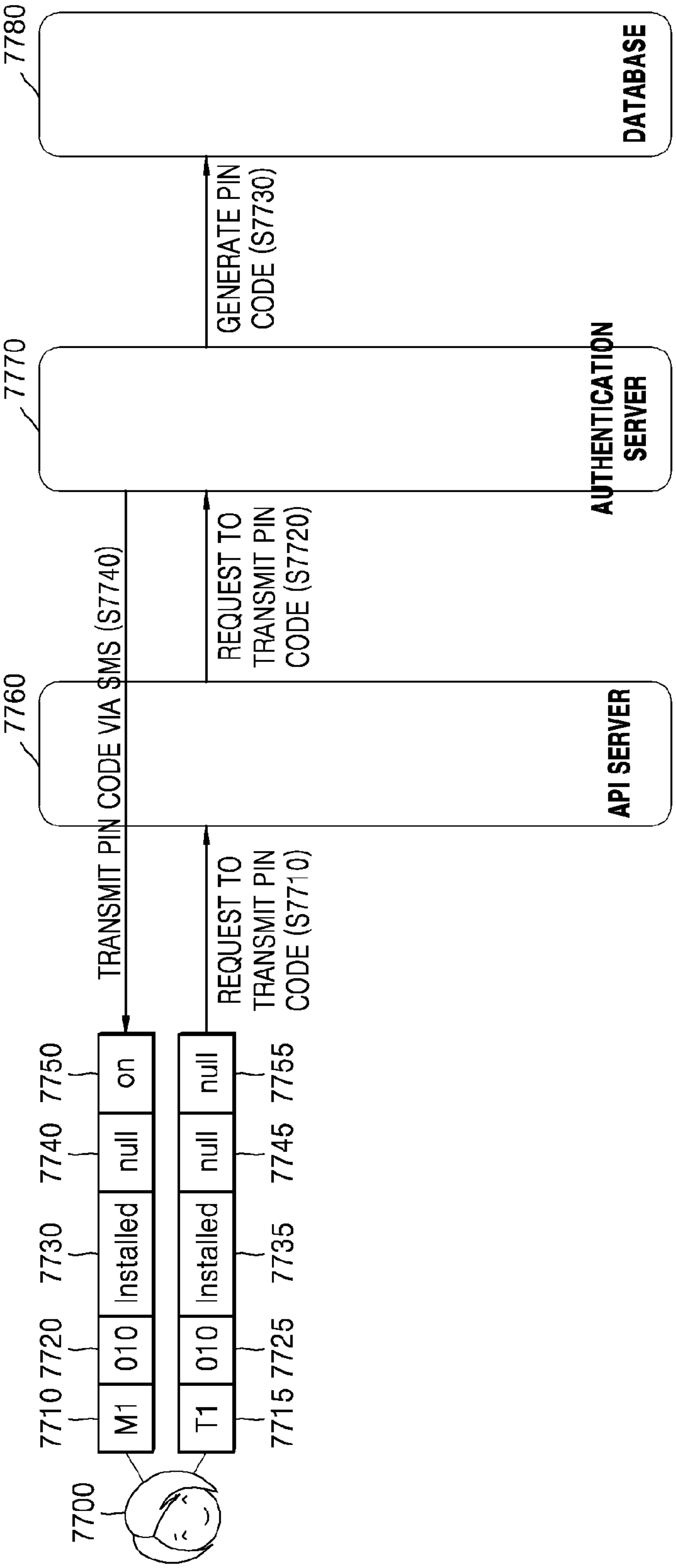
FIGS. 77A and 77B are diagrams for describing processes of performing an authentication request on a phone number such that a service subscriber is able to use a service by using another device.
Figure 77B:
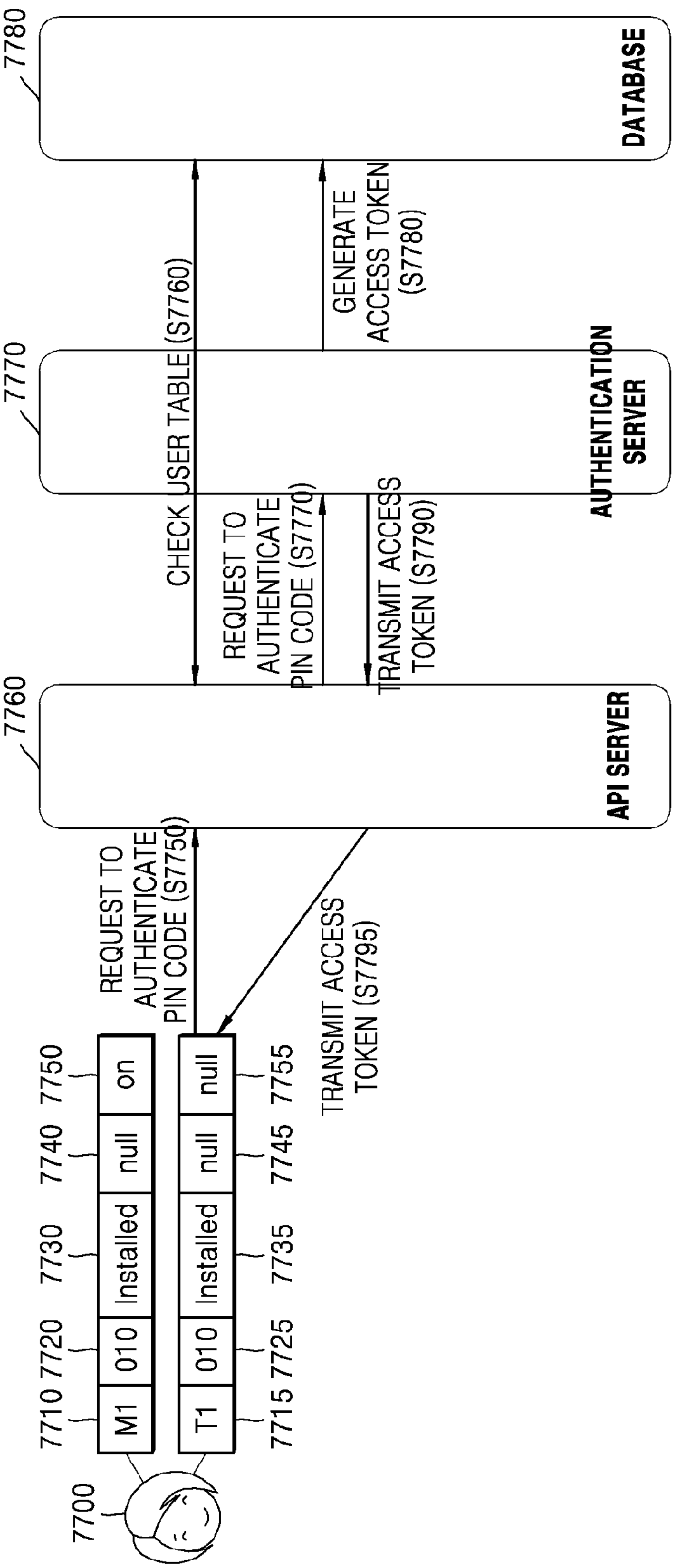

FIGS. 77A and 77B are diagrams for describing processes of performing an authentication request on a phone number such that a service subscriber is able to use a service by using another device.

In an embodiment, it is assumed that a user A 7700 is able to use a service by using a mobile terminal M1 as a usage device 7710, as the mobile terminal M1 obtains an access token as shown in FIGS. 77A and 77B.

The user A 7700 uses a tablet T1 as a usage device 7715, uses 010 as a phone number 7725, a service application is installed in the usage device 7715 regarding an application installation state 7735, the phone number 7725 is not interlocked with any ID regarding a user account interlocking state 7745, and the usage device 7715 did not obtain an access token regarding an access token obtain state 7755.

FIG. 77A is a diagram for describing a process of requesting a PIN code, according to an embodiment.

In operation S7710, the user A 7700 requests an API server 7760 to transmit a PIN code by using the tablet T1.

In operation S7720, the API server 7760 requests an authentication server 7770 to transmit the PIN code.

In operation S7730, the authentication server 7770 generates the PIN code in response to the request, and stores the generated PIN code in a database 7780.

In operation S7740, the authentication server 7770 transmits the generated PIN code to the mobile terminal M1 via an SMS. However, if the tablet T1 has an intrinsic phone number different from the mobile terminal M1, the PIN code may be transmitted to the tablet T1.

FIG. 77B is a diagram for describing a process of requesting to authenticate a PIN code, according to an embodiment.

In operation S7750, the user A 7700 may request the API server 7760 to authenticate the PIN code by checking the PIN code received by the mobile terminal M1 and inputting the PIN code by using the tablet T1.

In operation S7760, the API server 7760 checks a user table stored in the database 7780. The API server 7760 determines that the phone number 7720, i.e., "010" is already registered correspondingly to the mobile terminal M1.

In operation S7770, the API server 7760 transmits a request to authenticate the PIN code to the authentication server 7770.

In operation S7780, the authentication server 7770 generates an access token and stores the generated access token in the database 7780.

In operation S7790, the authentication server 7770 transmits the generated access token to the API server 7760.

In operation S7795, the API server 7760 transmits the access token to the tablet T1.

The tablet T1 is able to use the service by receiving the access token. However, since an access token pre-transmitted to the mobile terminal M1 is deactivated, the user A 7700 is unable to use the service by using the mobile terminal M1.

In this case, in order for the user A 7700 to use the service again by using the mobile terminal M1, the user A 7700 may request for a PIN code by using the mobile terminal M1, request to authenticate the received PIN code, and obtain an access token again for the mobile terminal M1. At this time, the authentication server 7770 deactivates the access token transmitted to the tablet T1 , and thus the user A 7700 is unable to use the service by using the tablet T1.

Figure 78A:
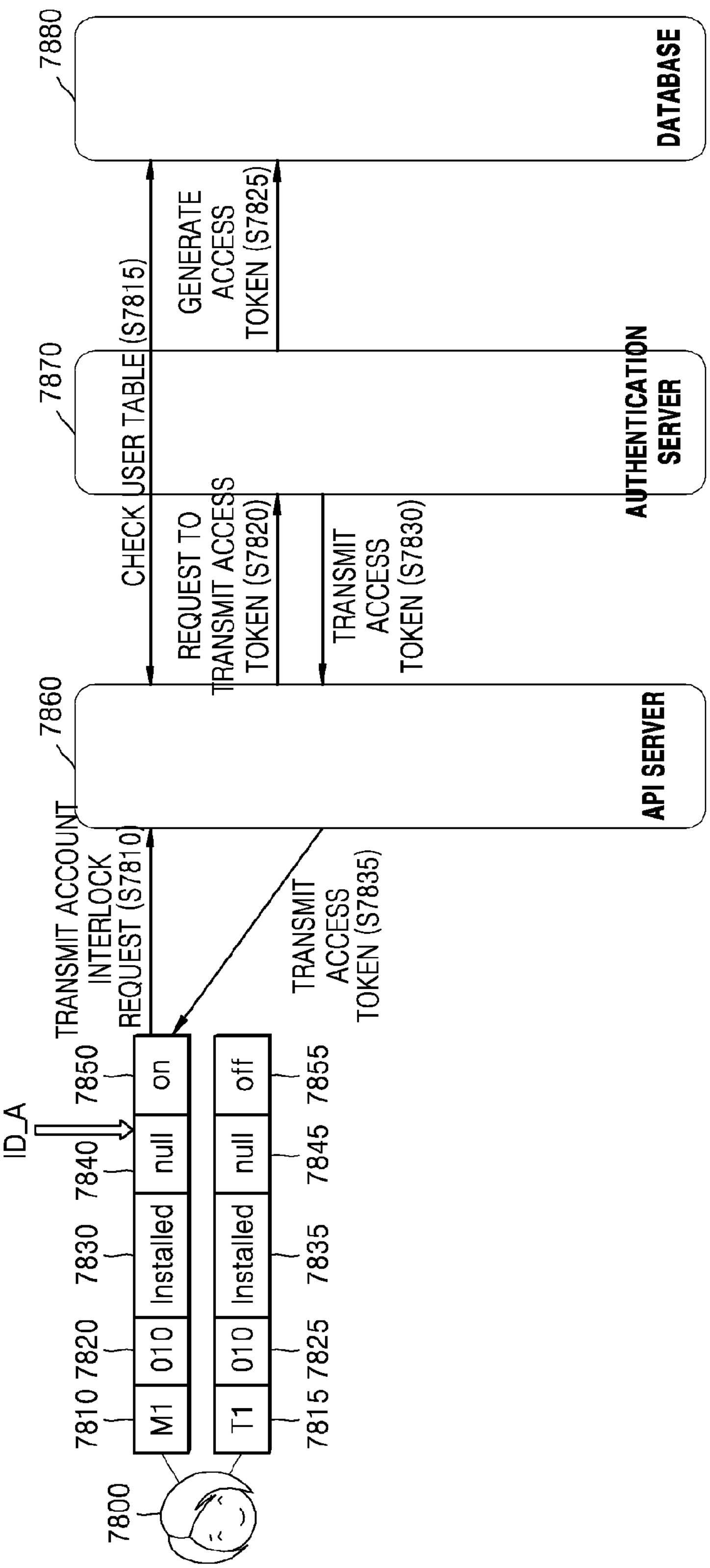
FIGS. 78A through 78C are diagrams for describing processes of interlocking a user account to a registered phone number, which are performed by a service subscriber.
Figure 78B:
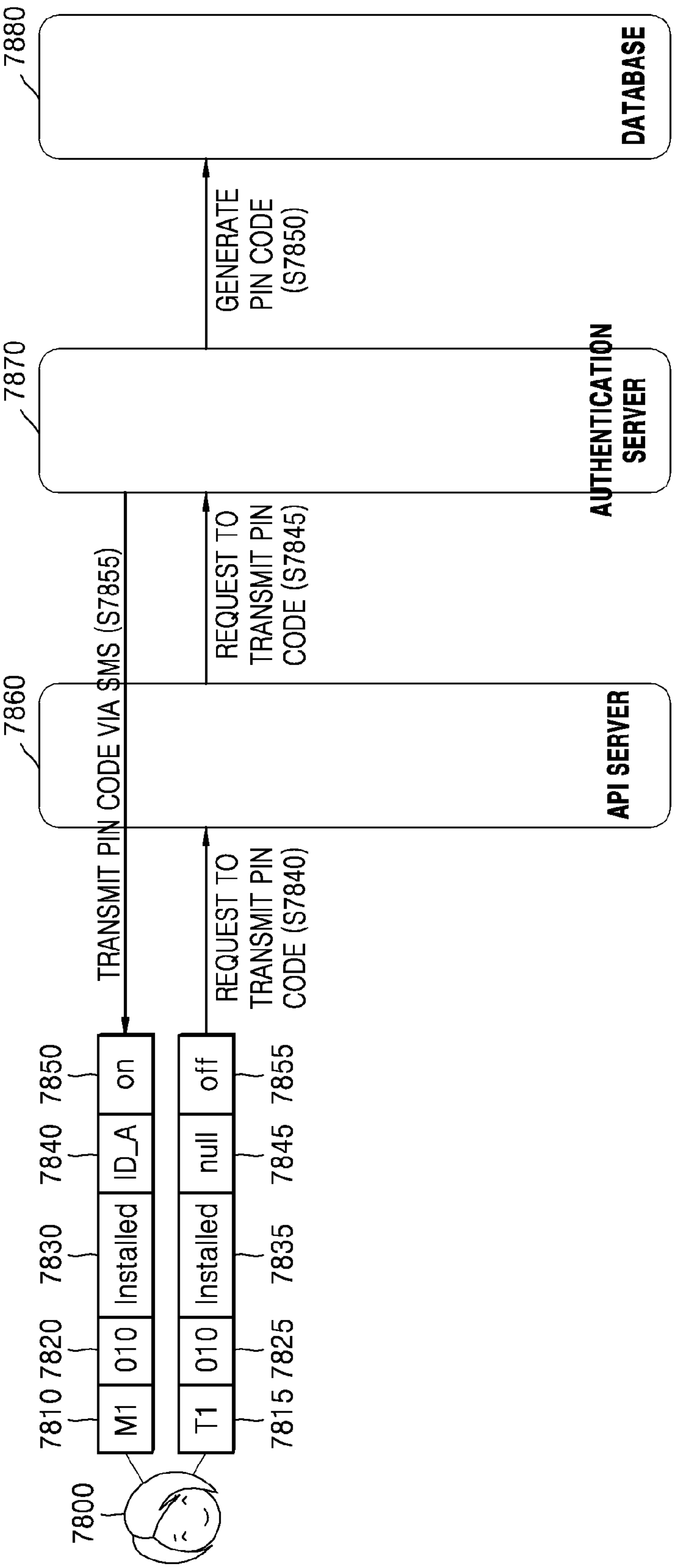
Figure 78C:
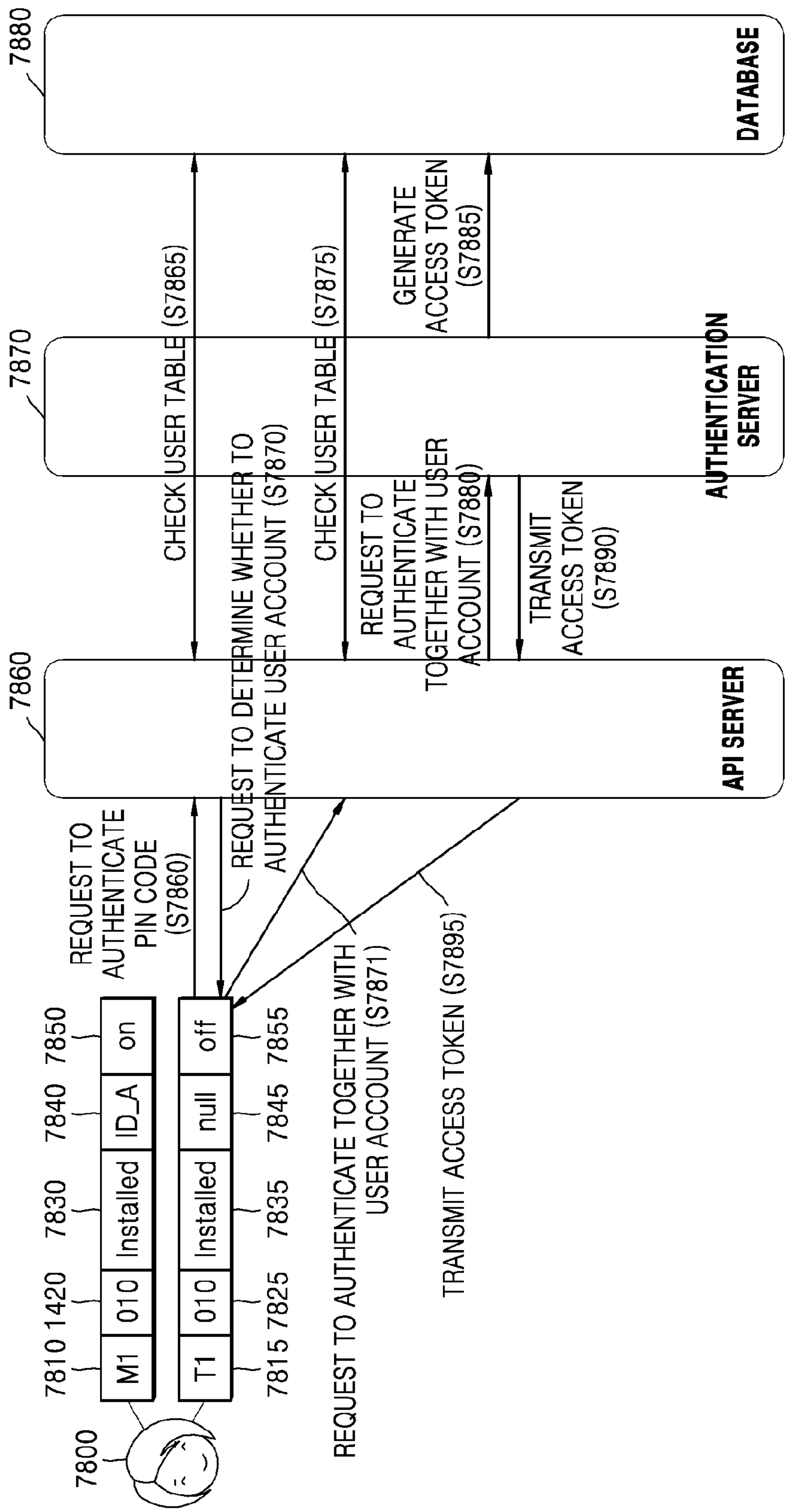

FIGS. 78A through 78C are diagrams for describing processes of interlocking a user account to a registered phone number, which are performed by a service subscriber.

A user A 7800 may interlock a user account with a registered phone number.

The user A 7800 uses a mobile terminal M1 as a usage device 7810, uses 010 as a phone number 7820, a service application is installed in the usage device 7810 regarding an application installation state 7830, the phone number 7820 is not interlocked with any ID regarding a user account interlocking state 7840, and the usage device 7810 obtained an access token regarding an access token obtain state 7850.

FIG. 78A is a diagram for describing a process of interlocking a user ID with a phone number in the mobile terminal M1.

In operation S7810, the user A 7800 transmits an account interlock request to an API server 7860 by using the mobile terminal M1. In the account interlock request, a user account is transmitted together with a phone number, as one parameter.

In operation S7815, the API server 7860 checks a user table stored in a database 7880.

In operation S7820, when there is no user account registered in the phone number based on the stored user table, the API server 7860 requests an authentication server 7870 to transmit an access token for the user account.

In operation S7825, all access tokens for phone numbers registered in the authentication server 7870 are deactivated, and an access token for a new user account is generated. The generated access token is stored in the database 7880.

In operation S7830, the authentication server 7870 transmits the generated access token to the API server 7860.

In operation S7835, the API server 7860 transmits the generated access token to the mobile terminal M1.

Accordingly, a user account "A" and the phone number 7820 are interlocked with each other in the mobile terminal M1.

FIG. 78B is a diagram for describing a process of requesting for and receiving a PIN code so as to authenticate a tablet T1 , according to an embodiment.

In operation S7840, the user A 7800 requests the API server 7860 to transmit the PIN code, by using the tablet T1.

In operation S7845, the API server 7860 requests the authentication server 7870 to transmit the PIN code.

In operation S7850, the authentication server 7870 generates the PIN code and stores the generated PIN code in the database 7880.

In operation S7855, the authentication server 7870 transmits the generated PIN code to the mobile terminal M1 , via an SMS.

FIG. 78C is a diagram for describing a process of authenticating the PIN code upon a request, according to an embodiment.

In operation S7860, the user A 7800 inputs the PIN code received by the mobile terminal M1to request the API server 7860 to authenticate the PIN code.

In operation S7865, the API server 7860 checks a user table stored in the database 7880. The API server 7860 determines that a phone number "010 " and a user account "A" are interlocked with each other by using the mobile terminal M1, by checking the user table.

In operation S7870, the API server 7860 may request the tablet T1 to determine whether to authenticate the user account "A". Since the user A 7800 owns the user account "A", the user A 7800 transmits a request to authenticate the PIN code again to the API server 7860, together with the user account "A", by using the tablet T1.

In operation S7875, the API server 7860 checks the user table stored in the database 7880. The API server 7860 determines whether a requested phone number and user account match those that are pre-registered.

In operation S7880, when it is determined that the requested phone number and user account match those that are pre-registered, the API server 7860 requests the authentication server 7870 to authenticate the PIN code together with the user account "A".

In operation S7885, the authentication server 7870 authenticates the PIN code and the user account "A", and additionally generates an access token for the tablet T1 without deactivating an existing access token, when the user account "A" and the phone number "010" are interlocked with each other. The additionally generated access token is stored in the database 7880.

In operation S7890, the authentication server 7870 transmits the additionally generated access token to the API server 7860.

In operation S7895, the API server 7860 transmits the additionally generated access token to the tablet T1.

In an embodiment, since the existing access token is not deactivated, the user A 7800 is able to use the service not only by using the tablet T1 and also by using the mobile terminal M1.

Figure 79A:
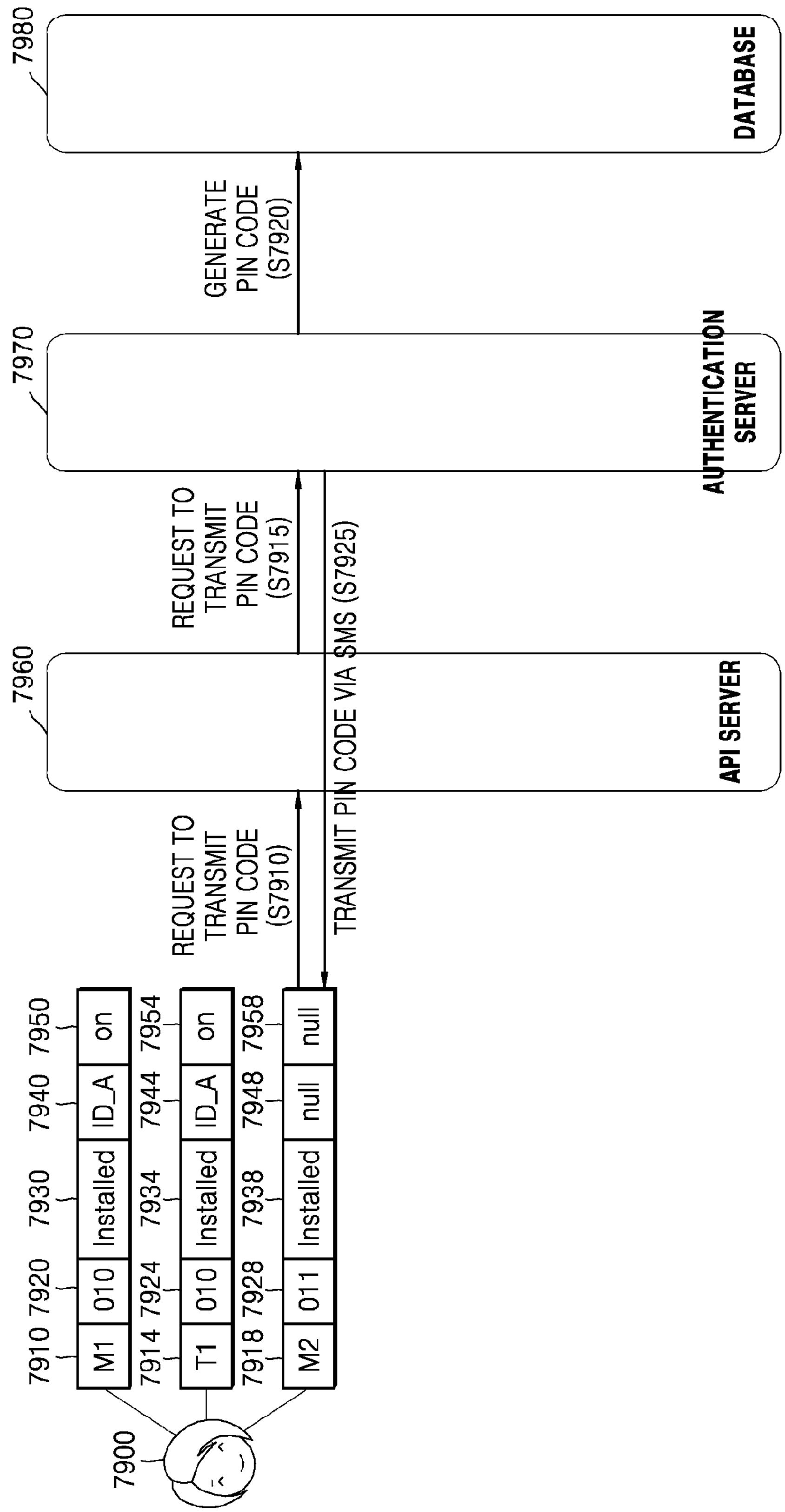
FIGS. 79A through 79C are diagrams for describing processes of performing authentication so as to use a service by using a mobile terminal using a different phone number.
Figure 79B:
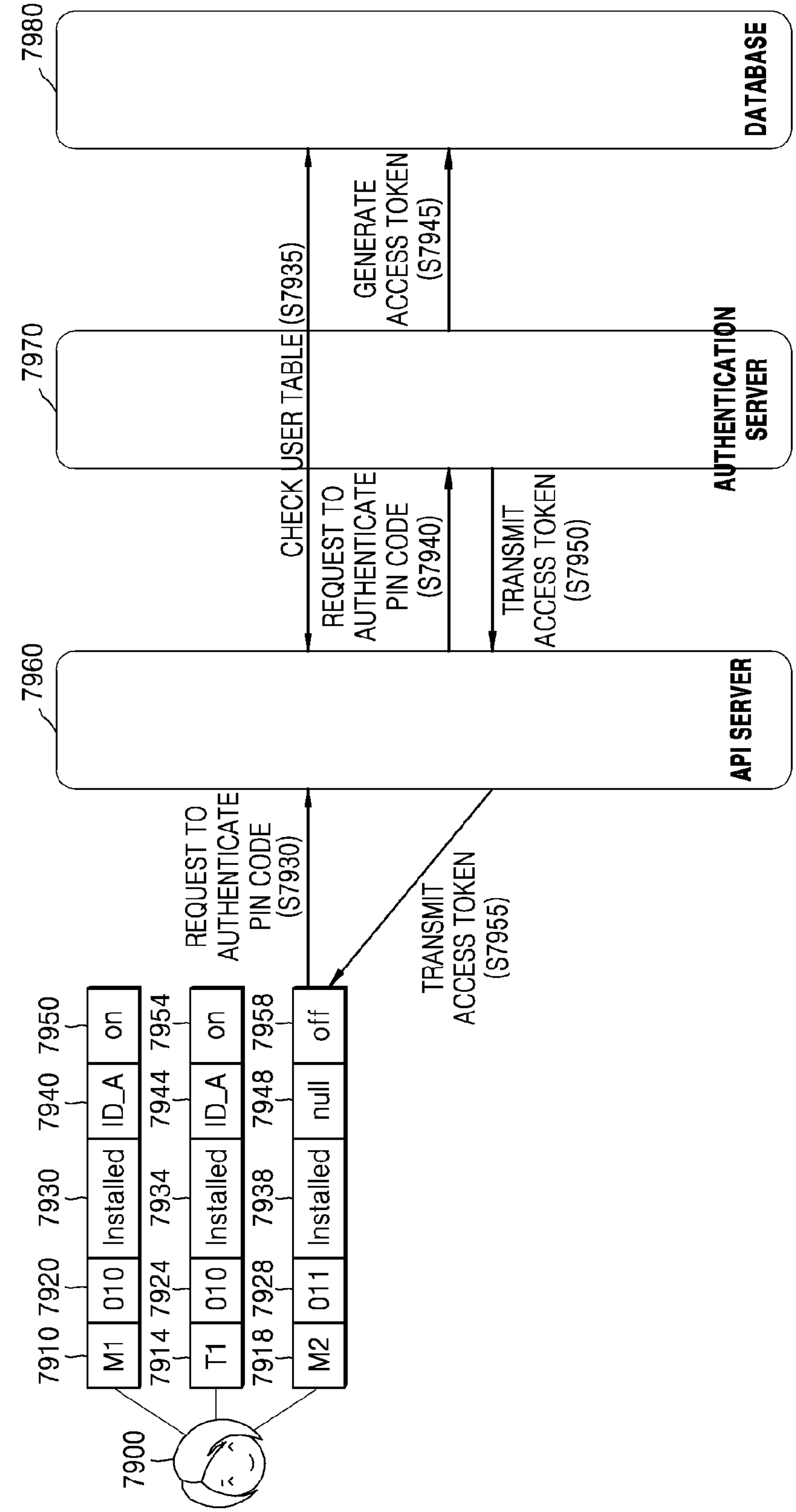
Figure 79C:
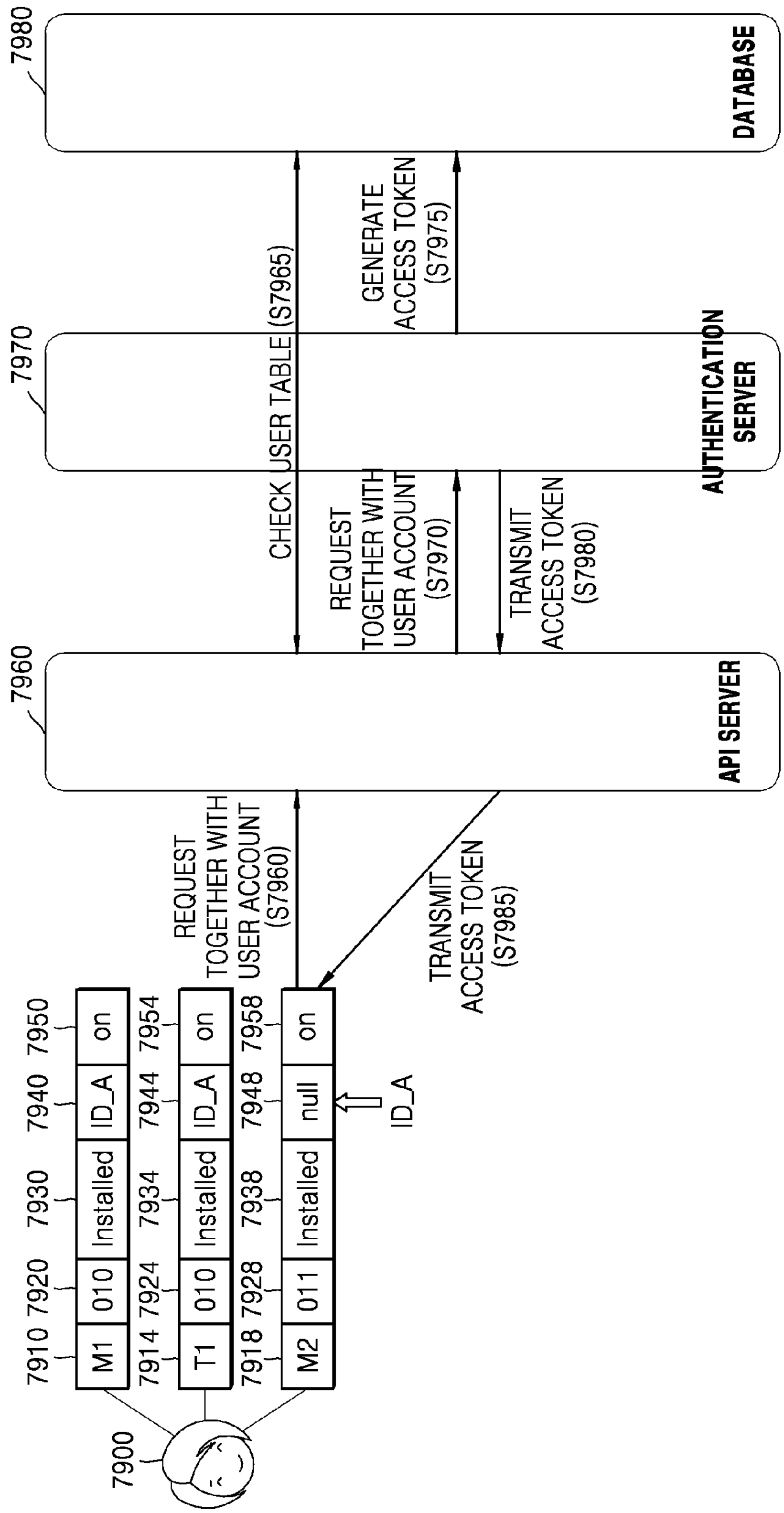

FIGS. 79A through 79C are diagrams for describing processes of performing authentication so as to use a service by using a mobile terminal M1 using a different phone number.

A user A 7900 uses a service by using the mobile terminal M2. In other words, the user A 7900 uses the mobile terminal M2 as a usage device 7918, uses 011 as a phone number 7928, a service application is not installed in the usage device 7918 regarding an application installation state 7938, the phone number 7928 is not interlocked with any ID regarding a user account interlocking state 7948, and the usage device 7918 did not obtain an access token regarding an access token obtain state 7958.

FIG. 79A is a diagram for describing a process of receiving a PIN code to use a service by using the mobile terminal M2, upon a request.

In operation S7910, the user A 7900 requests an API server 7960 to transmit a PIN code, by using the mobile terminal M2.

In operation S7915, the API server 7960 requests an authentication server 7970 to transmit the PIN code.

In operation S7920, the authentication server 7970 generates the PIN code upon the request, and stores the generated PIN code in a database 7980.

In operation S7925, the authentication server 7970 transmits the generated PIN code to the mobile terminal M2 via an SMS.

FIG. 79B is a diagram for describing a process of obtaining an access token by requesting to authenticate the PIN code by using the mobile terminal M2.

In operation S7930, the user A 7900 inputs the received PIN code by using the mobile terminal M2 to request the API server 7960 to authenticate the PIN code.

In operation S7935, the API server 7960 checks a user table stored in the database 7980.

In operation S7940, it is determined that there is no user registered in a requested phone number "011 ", and the API server 7960 requests the authentication server 7970 to authenticate the PIN code.

In operation S7945, the authentication server 7970 receives the request to authenticate the PIN code, and when authenticating the PIN code succeeds, generates and stores an access token in the database 7980.

In operation S7950, the authentication server 7970 transmits the generated access token to the API server 7960.

In operation S7955, the API server 7960 transmits the access token to the mobile terminal M2.

Accordingly, the user A 7900 receives the access token by using the mobile terminal M2 , and is able to use the service by using the mobile terminal M2. The user A 7900 is able to use the service also by using the mobile terminal M1 and the tablet T1 , which are registered in different phone numbers "010", since access tokens of the mobile terminal M1 and the tablet T1 are not deactivated.

FIG. 79C is a diagram for describing a process of interlocking a phone number with a user account by using the mobile terminal M2.

In operation S7960, the user A 7900 transmits an authentication request to the API server 7960, together with a user account "A", by using the mobile terminal M2.

In operation S7965, the API server 7960 checks a user table stored in the database 7980. When it is determined that a requested phone number "011" is not interlocked with a user account, the API server 7960 transmits the authentication request to the authentication server 7970, together with the user account "A", in operation S7970.

In operation S7975, the authentication server 7970 authenticates a user account and a phone number based on the authentication request, and when the authenticating succeeds, generates an access token. At this time, an existing access token is deactivated, and the access token is newly generated. The generated access token is stored in the database 7980.

In operation S7980, the authentication server 7970 transmits the generated access token to the API server 7960.

In operation S7985, the API server 7960 transmits the access token to the mobile terminal M2.

Accordingly, the user A 7900 is able to use the service by using the mobile terminal M2.

Figure 80A:
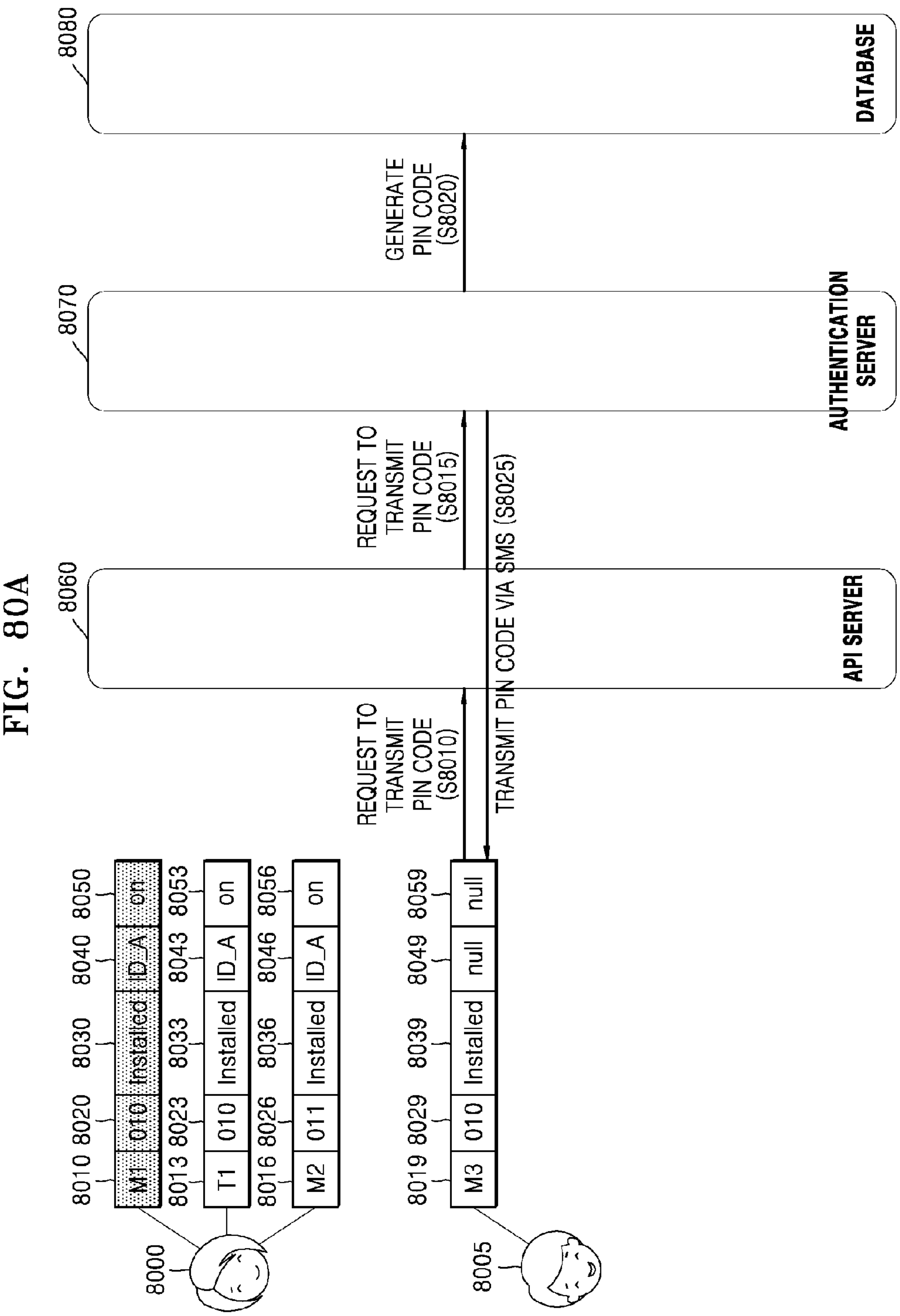
FIGS. 80A through 80C are diagrams for describing processes of performing authentication so as to use a service by using a mobile terminal, which are performed by another user.
Figure 80B:
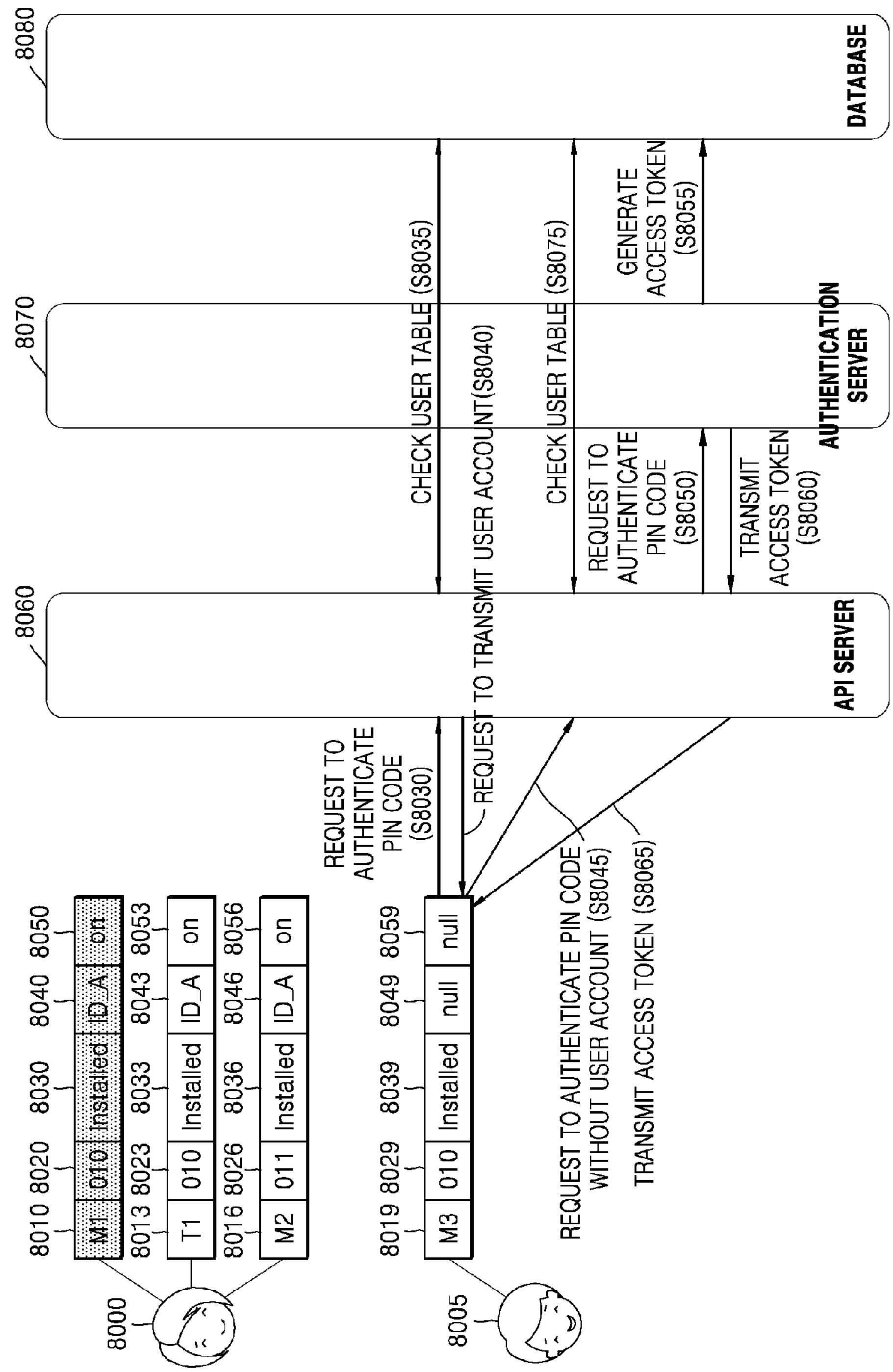
Figure 80C:
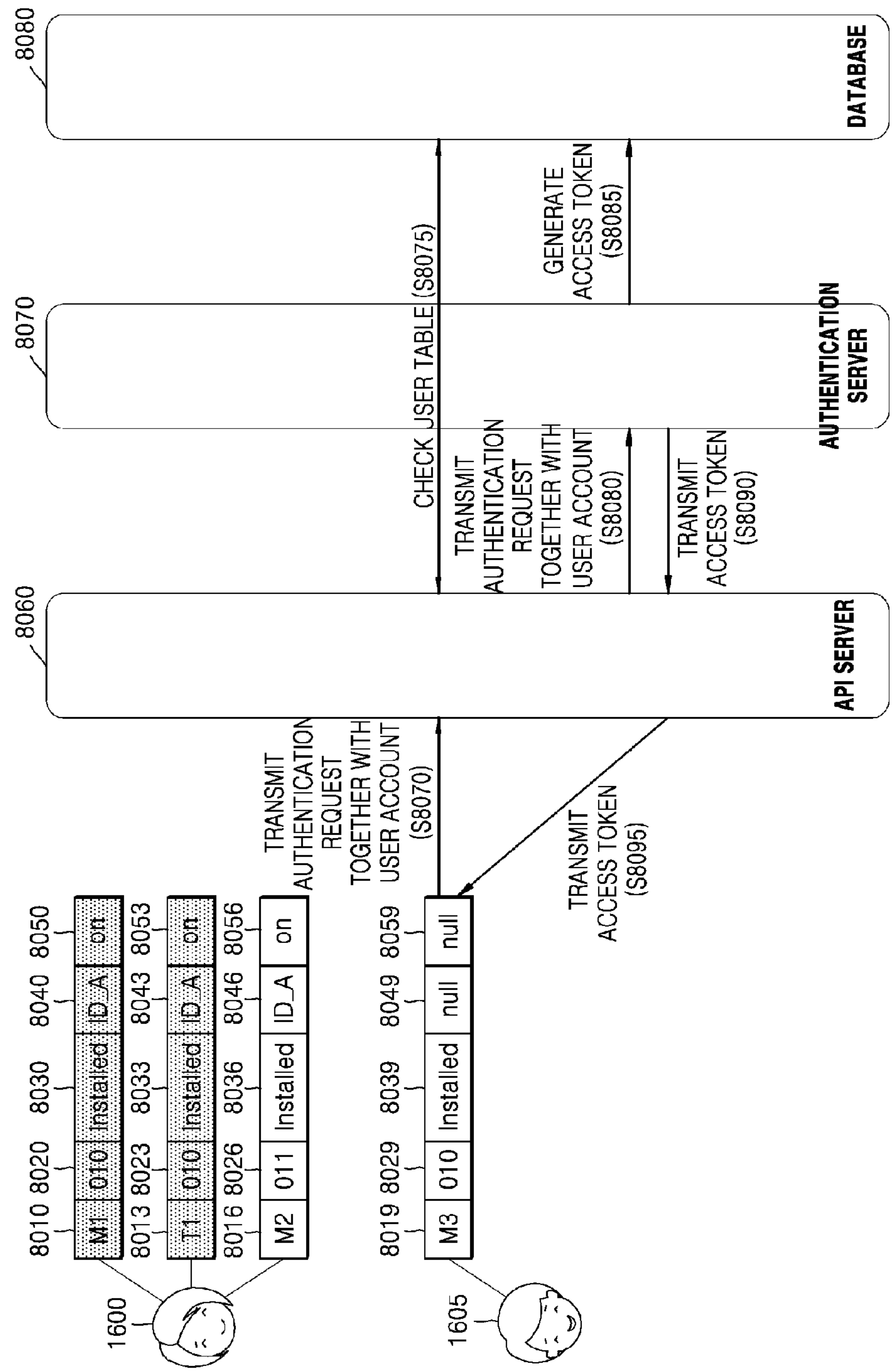

FIGS. 80A through 80C are diagrams for describing processes of performing authentication so as to use a service by using a mobile terminal M3, which are performed by another user B 8005.

FIG. 80A is a diagram for describing a process of receiving a PIN code after requesting for the PIN code by using the mobile terminal M3, which is performed by the other user B 8005.

Referring to FIG. 80A, a user A 8000 applied to cancel the mobile terminal M1. Accordingly, the user A 8000 is no longer able to use the mobile terminal M1. Thus, the phone number "010" is able to be used by another person, and thus the other user B 8005 opened the mobile terminal M3 with the phone number "010".

The other user B 8005 uses the mobile terminal M3 as a usage device 8019, uses "010 " as a phone number 8029, a service application is installed in the usage device 8019 regarding an application installation state 8039, the phone number 8029 is not interlocked with any ID regarding a user account interlocking state 8049, and the usage device 8019 did not obtain an access token regarding an access token obtain state 8059.

In operation S8010, the other user B 8005 requests an API server 8060 to transmit a PIN code by using the mobile terminal M3.

In operation S8015, the API server 8060 requests an authentication server 8070 to transmit the PIN code.

In operation S8020, the authentication server 8070 receives the request, generates the PIN code upon the request, and stores the generated PIN code in a database 8080.

In operation S8025, the authentication server 8070 transmits the generated PIN code to the mobile terminal M3 via an SMS.

FIG. 80B is a diagram for describing a process of requesting the PIN code to be authenticated and obtaining an access token, by using the mobile terminal M3, which is performed by the other user B 8005.

In operation S8030, the other user B 8005 checks and inputs the received PIN code to request the API server 8060 to authenticate the PIN code.

In operation S8035, the API server 8060 checks a user table stored in the database 8080.

In operation S8040, since the phone number "010 " is interlocked with a user account "A" based on the user table, the API server 8060 requests the mobile terminal M3 whether to authenticate the user account "A".

In operation S8045, since the other user B 8005 does not have a user account, the other user B 8005 requests the API server 8060 to authenticate a PIN code without a user account, by using the mobile terminal M3.

In operation S8050, the API server 8060 requests the authentication server 8070 to authenticate the PIN code.

In operation S8055, the authentication server 8070 authenticates the PIN code, and when the authenticating succeeds, generates an access token. Here, since all access tokens for devices mapped correspondingly to the phone number "010 " are deactivated, the access token for the tablet T1 used by the user A 8000 is deactivated, and thus the user A 8000 is no longer able to use a service by using the tablet T1.

The generated access token is stored in the database 8080.

In operation S8060, the authentication server 8070 transmits the generated access token to the API server 8060.

In operation S8065, the API server 8070 transmits the received access token to the mobile terminal M3.

Accordingly, the mobile terminal M3 obtains the access token, and thus the other user B 8005 is able to use the service by using the mobile terminal M3.

FIG. 80C is a diagram for describing a process of interlocking a phone number and a user account by using the mobile terminal M3 , which is performed by the other user B 8005.

In an embodiment, the other user B 8005 interlocks the phone number "010 " with a user account "B".

The other user B 8005 uses the mobile terminal M3 as the usage device 8019, uses "010" as the phone number 8029, a service application is installed in the usage device 8019 regarding the application installation state 8039, the phone number 8029 is not interlocked with any ID regarding the user account interlocking state 8049, and the usage device 8019 obtained the access token regarding the access token obtain state 8059.

In operation S8070, the other user B 8005 transmits an authentication request together with the user account "B" to the API server 8060 by using the mobile terminal M3.

In operation S8075, the API server 8060 checks the user table stored in the database 8080.

In operation S8080, since the phone number "010 " is not interlocked with any user account, the API server 8070 transmits the authentication request together with the user account "B" to the authentication server 8070.

In operation S8085, when the authentication server 8070 successfully authenticates the user account "B" and the phone number "010 ", the authentication server 8070 deactivates an existing access token and generates a new access token. The generated new access token is transmitted to the database 8080.

In operation S8090, the authentication server 8070 transmits the new access token to the API server 8070.

In operation S8095, upon receiving the new access token, the API server 8070 transmits the new access token to the mobile terminal M3.

The mobile terminal M3 obtains the new access token, and thus the other user B 8005 is able to use the service by using the mobile terminal M3.

According to an embodiment, since not only an invitation message but also a content are transmitted to a non-subscriber, the content may not be transmitted several times regardless of a subscription to a service. Also, since a service may be used regardless of a recipient's subscription state, anyone may send a document, and thus the service may be easily spread. Also, a recipient, after subscribing to the service, is able to view a document received before he/she subscribed to the service, and thus does not need to request a sender to re-transmit the document.

In FIG. 2, it has been described that the image forming apparatus 31 of the image forming system 1 supports a function of providing the phone number-based cloud printing service. However, the image forming apparatus 31 may not support a network connection function to communicate with the cloud server 40 or may only include a USB port to communicate one on one with a PC via a USB connection, based on specifications of the image forming apparatus 31. In this case, the image forming apparatus 31 is unable to independently connect to the cloud server 40, the image forming apparatus 31 is unable to participate in the phone number-based cloud printing service. Hereinafter, a method of providing a phone number-based cloud printing service under an environment when the image forming apparatus 31 is unable to directly connect to the cloud server 40 since the image forming apparatus 31 does not support a network connection function will be described.

Figure 81:
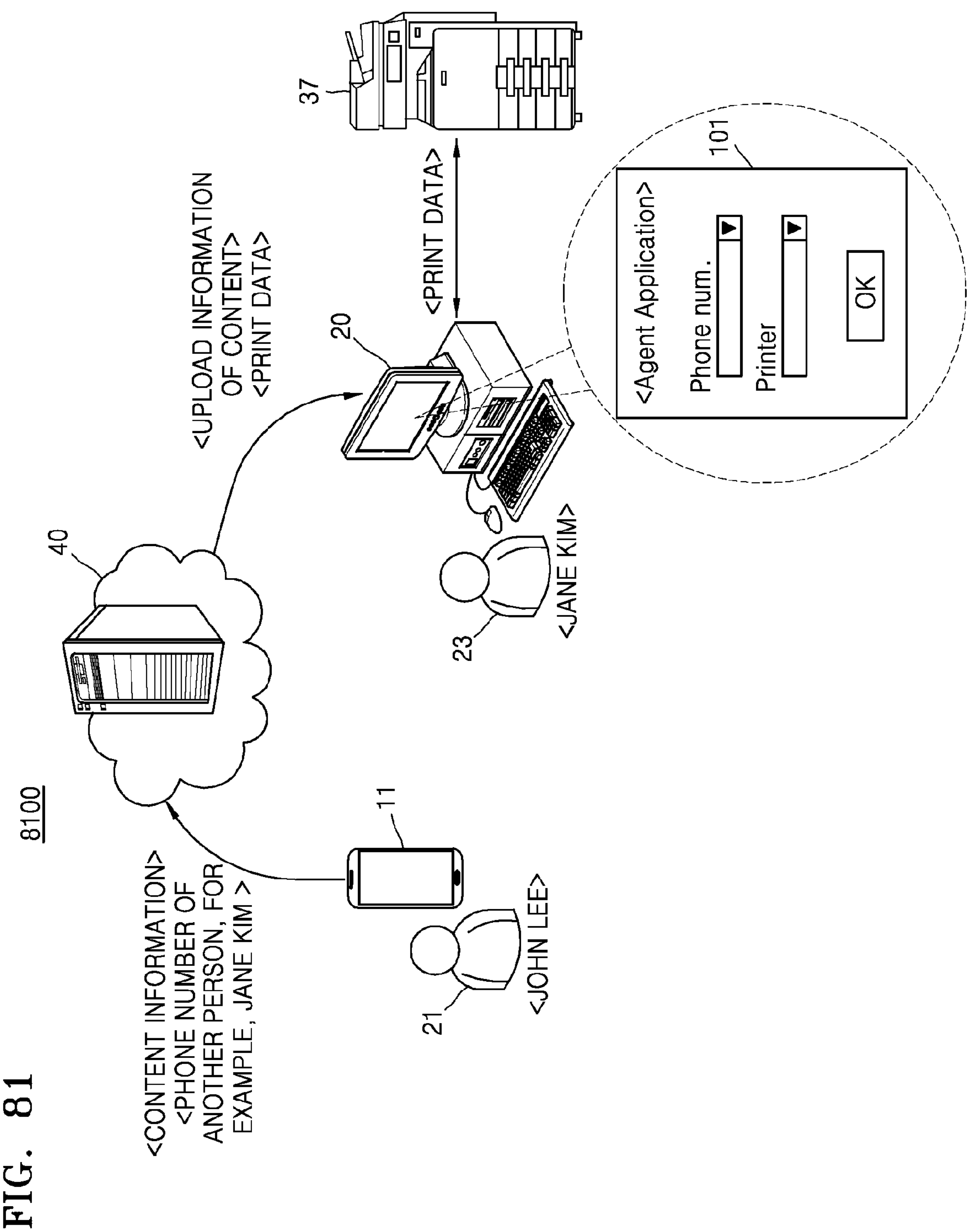
FIG. 81 is a diagram illustrating an image forming system supporting a cloud printing service of an image forming apparatus by using a computing device in which an agent application is installed, according to an embodiment.

FIG. 81 is a diagram illustrating an image forming system 8100 supporting a cloud printing service of an image forming apparatus 37 by using a computing device 20 in which an agent application 101 is installed, according to an embodiment.

Unlike the image forming system 1 described above with reference to FIG. 2, the image forming system 8100 further includes the computing device 20 in which the agent application 101 is installed. It is assumed that the image forming apparatus 37 of the image forming system 8100 does not support a network connection function and thus is able to independently connect to the cloud server 40. Accordingly, different reference numerals are used to classify the image forming apparatus 37 of FIG. 81 and the image forming apparatus 31 of FIG. 2.

Referring to FIG. 81, the first individual 21, for example, John Lee, selects a content used by or stored in the mobile device 11, and inputs the phone number of the second individual 23, for example, Jane Kim, who is to receive the content, to the mobile device 11. Information about the content and the phone number of the second individual 23 are transmitted from the mobile device 11 to the cloud server 40.

The cloud server 40 maps and stores the information about the content and the phone number of the second individual 23 received from the mobile device 11.

As described above, the cloud server 40 manages phone numbers subscribed to a cloud printing service and registration information of image forming apparatuses respectively assigned to the phone numbers. The cloud server 40 determines that a subject to print the content requested by the phone number of the second individual 23 is the image forming apparatus 37 based on the registration information.

In addition, the cloud server 40 manages path information about paths for transmitting print data of contents to the image forming apparatuses assigned to the phone numbers. The path information is information about whether to transmit print data from the cloud server 40 directly to an image forming apparatus, for example, the image forming apparatus 31 of FIG. 2, or to an image forming apparatus, for example, the image forming apparatus 37 of FIG. 81, through a computing device, for example, the computing device 20 of FIG. 81 connected to the image forming apparatus 37. In other words, the path information managed by the cloud server 40 may be information for determining whether an image forming apparatus is capable of a direct network connection with the cloud server 40.

In FIG. 81, it is assumed that the image forming apparatus 37 is not capable of a direct network connection with the cloud server 40, and thus the cloud server 40 determines that a content to be printed by the image forming apparatus 37 assigned to the phone number of the second individual 23 is processed through the computing device 20 in which the agent application 101 is installed, based on the path information.

The cloud server 40 transmits the information about the content received from the mobile device 11 to the computing device 20 where the agent application 101 is being executed.

The agent application 101 manages lists of phone numbers and image forming apparatuses, which are subscribed to the cloud printing service. For example, the agent application 101 may map and manage the phone number of the second individual 23 and the image forming apparatus 37.

The computing device 20 transmits print data of the content transmitted by the phone number of the second individual 23 to the image forming apparatus 37 based on the lists managed by the agent application 101.

The image forming apparatus 37 prints the received print data. When the image forming apparatus 37 completes the printing of the print data of the content, the cloud printing service requested by the mobile device 11 of the first individual 21 to the phone number of the second individual 23 is completed.

Hereinafter, functions of the agent application 101 and operations of the computing device 20 for intermediating between the phone number-based cloud printing service requested from the cloud server 40 and the image forming apparatus 37 that does not have a network connection function will be described in detail.

Even the image forming apparatus 31 of FIG. 2 that has a network connection function may provide the phone number-based cloud printing service by using the agent application 101 as described above. In detail, when the image forming apparatus 31 uses the agent application 101 installed in the computing device 20, data related to the phone number-based cloud printing service, which is to be performed by the image forming apparatus 31, may be distributed to the agent application 101, and thus throughput of the image forming apparatus 31 may be reduced.

Figure 82:
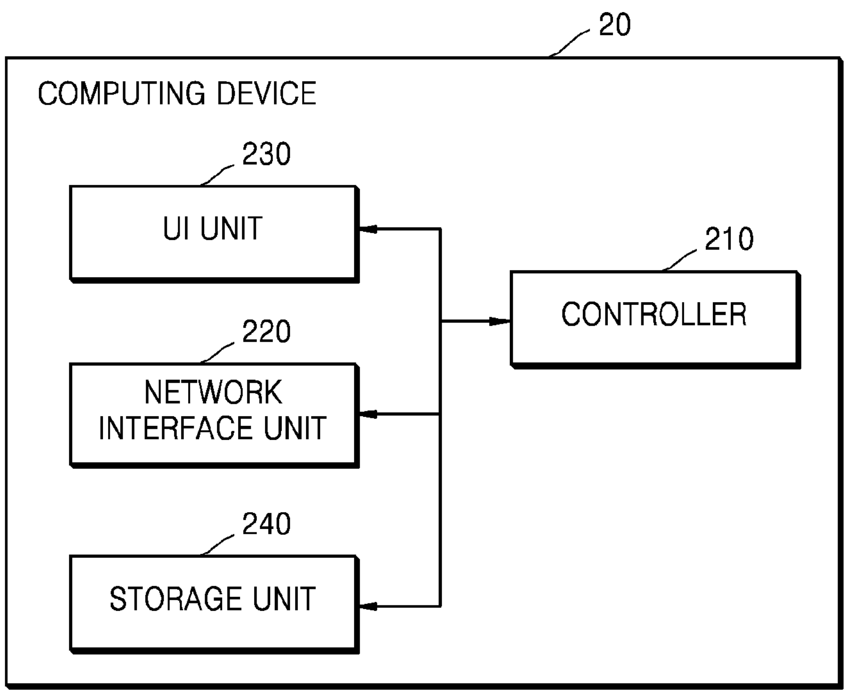
FIG. 82 is a block diagram illustrating in detail a computing device supporting a phone number-based cloud printing service, according to an embodiment.

FIG. 82 is a block diagram illustrating in detail the computing device 20 supporting the phone number-based cloud printing service, according to an embodiment.

Referring to FIG. 82, the computing device 20 is connected between the cloud server 40 and the image forming apparatus 37 so as to support the phone number-based cloud printing service of the image forming apparatus 37 in the image forming system 8100 of FIG. 81.

The computing device 20 is a general computer, such as a PC or a laptop, and includes a controller 210, a network interface unit (network interface) 220, a UI unit 230, and a storage unit (storage) 240. In order to prevent features of an embodiment from being blurred, only hardware components related to an embodiment are described in FIG. 82. However, general-purpose hardware components other that those shown in FIG. 82 may be included in the computing device 20.

The controller 210 is a hardware component controlling overall operations and functions of the computing device 20. In detail, the controller 210 may execute the agent application 101 supporting the phone number-based cloud printing service.

The agent application 101 is software for controlling the image forming apparatus 37 assigned to a target phone number, for example, the phone number of the second individual 23, subscribed to the cloud printing service to print the content when the content requested to the target phone number is uploaded to the cloud server 40.

As described above, the agent application 101 manages the lists of phone numbers and image forming apparatuses subscribed to the cloud printing service. Accordingly, the target phone number may be included in the list of phone numbers managed by the agent application 101. Also, the image forming apparatus 37 may be included in the list of image forming apparatuses managed by the agent application 101. In addition, a mapping relationship is assigned between the lists of phone numbers and the lists of image forming apparatuses, which are managed by the agent application 101.

The agent application 101 may perform the functions of the printer driver 1301 described above with reference to FIGS. 13A and 13B.

The controller 210 may be realized by at least one processor, such as a CPU and an AP.

The network interface unit (network interface) 220 is a hardware component supporting a wired or wireless communication function, and may support a wireless communication, such as Wi-Fi®, Wi-Fi Direct®, an NFC, Zigbee®, infrared data association (IrDA), or Bluetooth®, a wired communication such as Ethernet, or a 2G mobile communication, a 3G mobile communication, or a 4G mobile communication.

The network interface unit 220 receives the print data of the content transmitted to the target phone number from the cloud server 40. Then, the network interface unit 220 transmits the print data to the image forming apparatus 37 assigned to the target phone number by the agent application 101.

The UI unit 230 is a hardware component including an input device or a display device, and displays information to or receives information from a user of the computing device 20. The user interface 230 may include, for example, one or more of a keyboard, a keypad, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a pedal or footswitch, a virtual-reality device, and the like. The user interface 230 may further include a haptic device to provide haptic feedback to a user. The user interface 230 may also include a touchscreen display, for example. The touchscreen display may include a liquid crystal display (LCD), a light emitting diode (LED) display, an organic light emitting diode (OLED) display, active matrix organic light emitting diode (AMOLED), flexible display, 3D display, and the like, for example. However, the disclosure is not so limited thereto and may include other types of touchscreen displays. The disclosure may also include other types of user interfaces.

The UI unit 230 displays a UI screen of the agent application 101 to the user. Also, the user may input information on the UI screen of the agent application 101 being executed in the computing device 20 through the UI unit 230.

The storage unit 240 is a hardware component capable of storing data, such as a memory, a hard disk drive (HDD), or a solid state drive (SSD). In detail, the agent application 101 may be installed in the storage unit 240. Also, the storage unit 240 stores information about the lists of phone numbers and image forming apparatuses managed by the agent application 101.

Figure 83:
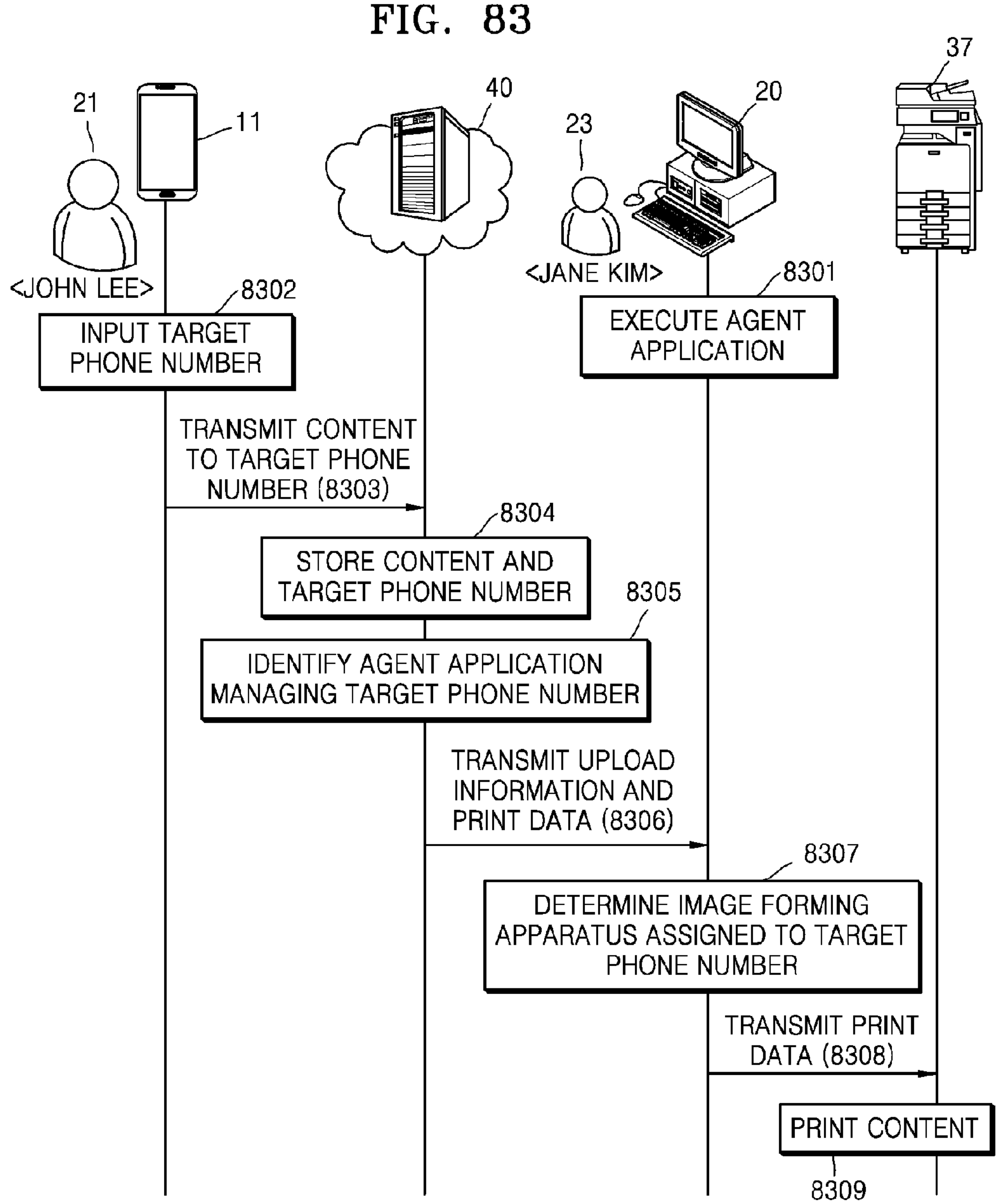
FIG. 83 is a diagram for describing a process of supporting a phone number-based cloud service by using an agent application installed in a computing device, according to an embodiment.

FIG. 83 is a diagram for describing a process of supporting a phone number-based cloud service by using the agent application 101 installed in the computing device 20, according to an embodiment.

In operation 8301, the controller 210 of the computing device 20 executes the agent application 101. It is assumed that the agent application 101 is already registered in the cloud server 40 for use.

In operation 8302, the first individual 21, i.e., John Lee, inputs information about a content to be printed and information about the phone number of the second individual 23, i.e., Jane Kim, which is a destination for receiving the content to be printed, through the mobile device 11. The phone number of the second individual 23 may be a phone number assigned to the mobile device 13 of the second individual 23 described above with reference to FIG. 2.

In operation 8303, the mobile device 11 transmits the content input to the phone number of the second individual 23. In other words, the mobile device 11 uploads the information about the content and the information about the phone number of the second individual 23 to the cloud server 40.

In operation 8304, the cloud server 40 maps and stores the information about the content and the information about the phone number of the second individual 23.

In operation 8305, the cloud server 40 determines that a subject to print the content requested to the phone number of the second individual 23 is the image forming apparatus 37 based on the registration information between phone numbers and image forming apparatuses. Also, the cloud server 40 determines that the content to be printed by the image forming apparatus 37 is processed through the computing device 20 where the agent application 101 is installed, based on the path information about paths for transmitting print data of contents to image forming apparatuses.

In other words, the cloud server 40 identifies that the phone number of the second individual 23 is registered by the agent application 101 installed in the computing device 20.

In operation 8306, the cloud server 40 transmits upload information about the content requested from the mobile device 11 to the computing device 20 where the agent application 101 is installed. Then, the cloud server 40 transmits print data of the content to the computing device 20.

According to an embodiment, a print approval process of the computing device 20 may exist between a point of time when the upload information is transmitted and a point of time when the print data is transmitted. For example, the cloud server 40 may transmit the print data of the content only when the computing device 20 replied to the cloud server 40 about a request to print the content after the upload information is transmitted. However, according to an embodiment, the print data may be transmitted immediately after the upload information is transmitted without a print approval process of the computing device 20. In other words, operation S8306 may be performed unlimitedly to any embodiment.

The cloud server 40 provides a URL address for downloading the upload information and the print data to the computing device 20. Accordingly, the network interface unit 220 of the computing device 20 connects to the URL address to receive the upload information and the print data from the cloud server 40.

The storage unit 240 of the computing device 20 stores the upload information and the print data received from the cloud server 40.

In operation 8307, the controller 210 of the computing device 20 determines the image forming apparatus 37 assigned to the phone number of the second individual 23, as the subject to print the content transmitted to the phone number of the second individual 23, based on the lists of phone numbers and image forming apparatuses managed by the agent application 101.

In operation 8308, the network interface unit 220 of the computing device 20 transmits the print data of the content received from the cloud server 40 to the image forming apparatus 37.

The controller 210 of the computing device 20 may transmit the print data via an FIFO method. When the transmitting of the print data is completed, the controller 210 of the computing device 20 may control the storage unit 240 to immediately delete the stored print data. However, alternatively, the controller 210 of the computing device 20 may control the storage unit 240 to delete the stored image data after a predetermined period of time such that the image forming apparatus 35 may re-print the print data.

In operation 8309, the image forming apparatus 37 prints the content by using the received print data, thereby completing the phone number-based cloud printing service requested to the phone number of the second individual 23.

As such, when the computing device 20 in which the agent application 101 is installed is used, the phone number-based cloud printing service may be supported even by the image forming apparatus 37 that is not capable of a direct network connection with the cloud server 40.

Figure 84:
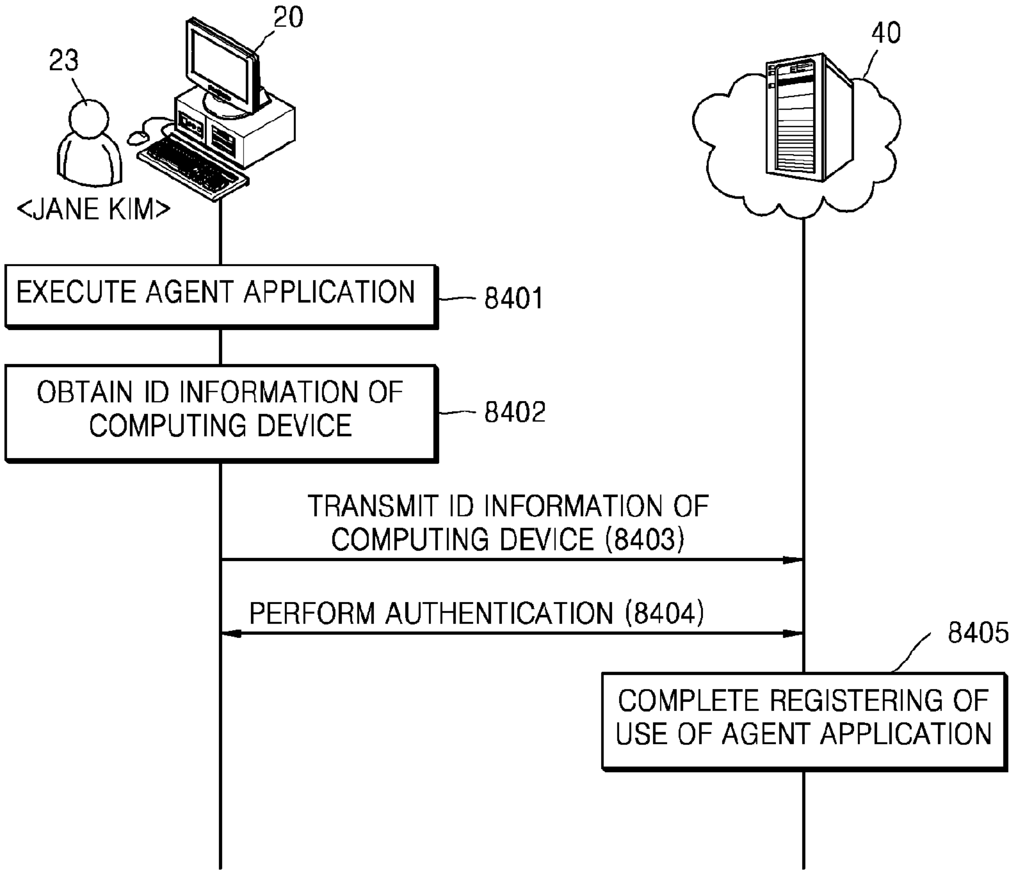
FIG. 84 is a diagram for describing a process of registering a use of an agent application in a cloud server, according to an embodiment.

FIG. 84 is a diagram for describing a process of registering a use of the agent application 101 in the cloud server 40, according to an embodiment.

After the agent application 101 is installed in the computing device 20, the process of FIG. 84 needs to be performed for the agent application 101 to support a cloud printing service of the cloud server 40.

In operation 8401, the controller 210 of the computing device 20 executes the agent application 101. In operation 8401, the agent application 101 may be executed for the first time after being installed in the computing device 20, or after the registering of the use is initialized.

In operation 8402, the agent application 101 obtains ID information of the computing device 20. The ID information of the computing device 20 may be intrinsic information existing only in the computing device 20, for example, a medium access control (MAC) address or an internet protocol (IP) address. In other words, the agent application 101 obtains an MAC address by accessing system information of the computing device 20. The MAC address may be used as information for identifying the agent application 101 on the cloud server 40. If a plurality of MAC addresses are assigned to the computing device 20, the agent application 101 may obtain all MAC addresses.

In operation 8403, the network interface unit 220 of the computing device 20 transmits the ID information, for example, the MAC address, obtained by the agent application 101, to the cloud server 40.

In operation 8404, the computing device 20 and the cloud server 40 perform authentication of the agent application 101.

According to an embodiment of the authentication of the agent application 101, when a user already subscribed to the cloud printing service provided by the cloud server 40, the user may input login information including a user account and a password to the agent application 101, thereby performing the authentication.

According to another embodiment of the authentication of the agent application 101, the user may input an authentication key issued from the cloud server 40 to the agent application 101, thereby performing the authentication.

Alternatively, any one of various general methods for authenticating a use of commercial software may be applied to the authentication of the agent application 101.

In operation 8405, the cloud server 40 completes the registering of the use of the agent application 101 installed in the computing device 20. When the registering of the use is completed, information about a list of phone numbers or image forming apparatuses to subscribe to a cloud printing service may be added to the agent application 101.

If an existing MAC address of the computing device 20 is changed, the process of FIG. 84 may be performed again to register the use of the agent application 101.

Figure 85:
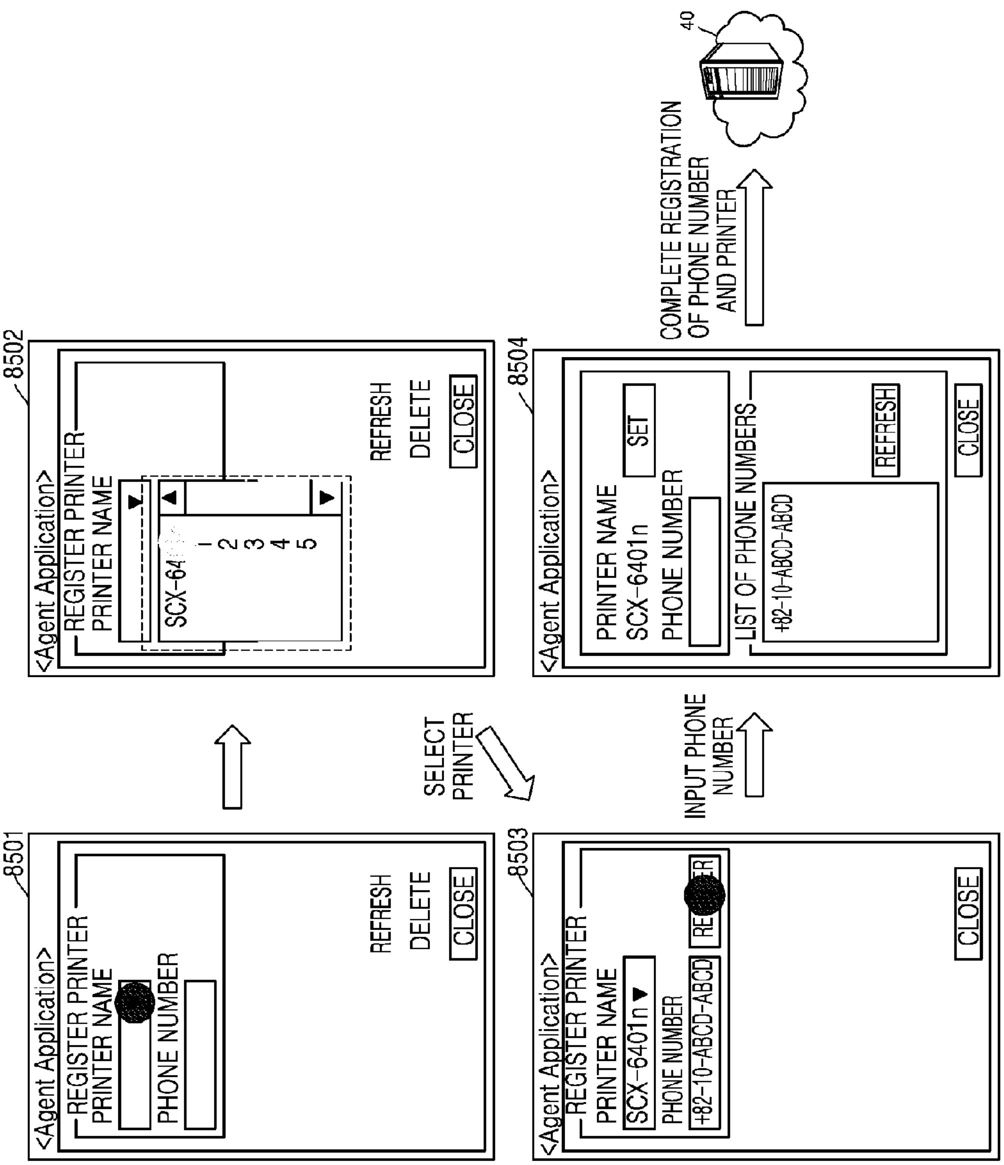
FIG. 85 is a diagram of UI screens for an agent application to set a phone number or an image forming apparatus to subscribe to a cloud printing service, according to an embodiment.

FIG. 85 is a diagram of UI screens 8501 through 8504 for the agent application 101 to set a phone number or an image forming apparatus to subscribe to a cloud printing service, according to an embodiment.

Referring to FIG. 85, the UI screens 8501 through 8504 of the agent application 101 are screens displayed through the UI unit 230 of the computing device 20. Since no phone number and no image forming apparatus are registered in the UI screen 8501, it may be assumed that the UI screen 8501 is a screen displayed immediately after the use of the agent application 101 is registered as described above with reference to FIG. 84, but embodiments are not limited thereto.

In FIG. 85, it is assumed that the user of the computing device 20 is the second individual 23, i.e., Jane Kim, but embodiments are not limited thereto.

The second individual 23 activates a dialog for displaying a list of image forming apparatuses connectable to the computing device 20, from the UI screen 8501. Then, the UI screen 8502 displays a list of image forming apparatuses addible to the agent application 101, as the image forming apparatuses connectable to the computing device 20.

The second individual 23 selects the image forming apparatus 37, for example, "SCX-6401n", from the list of image forming apparatuses.

When the image forming apparatus 37 is selected, the second individual 23 inputs the phone number, for example, "+82-10-ABCD-ABCD", of the second individual 23 on the UI screen 8503, and clicks a "Register" button.

After the image forming apparatus 37 and the phone number of the second individual 23 are input, the UI screen 8504 displays registration information indicating that the phone number of the second individual 23 is assigned to the image forming apparatus 37.

After the image forming apparatus 37 and the phone number of the second individual 23 are registered in the agent application 101, the computing device 20 transmits such registration information to the cloud server 40. The agent application 101 may manage a list of image forming apparatuses by using a name of the image forming apparatus 37, i.e., "SCX-6401n".

Since the phone number ("+82-10-ABCD-ABCD) of the second individual 23 and the image forming apparatus 37 ("SCX-6401n") are mapped by the agent application 101, the cloud server 40 may request the computing device 20 where the agent application 101 for controlling the image forming apparatus 37 is installed, for the cloud printing service, when the cloud printing service is requested to the phone number of the second individual 23.

Figure 86:
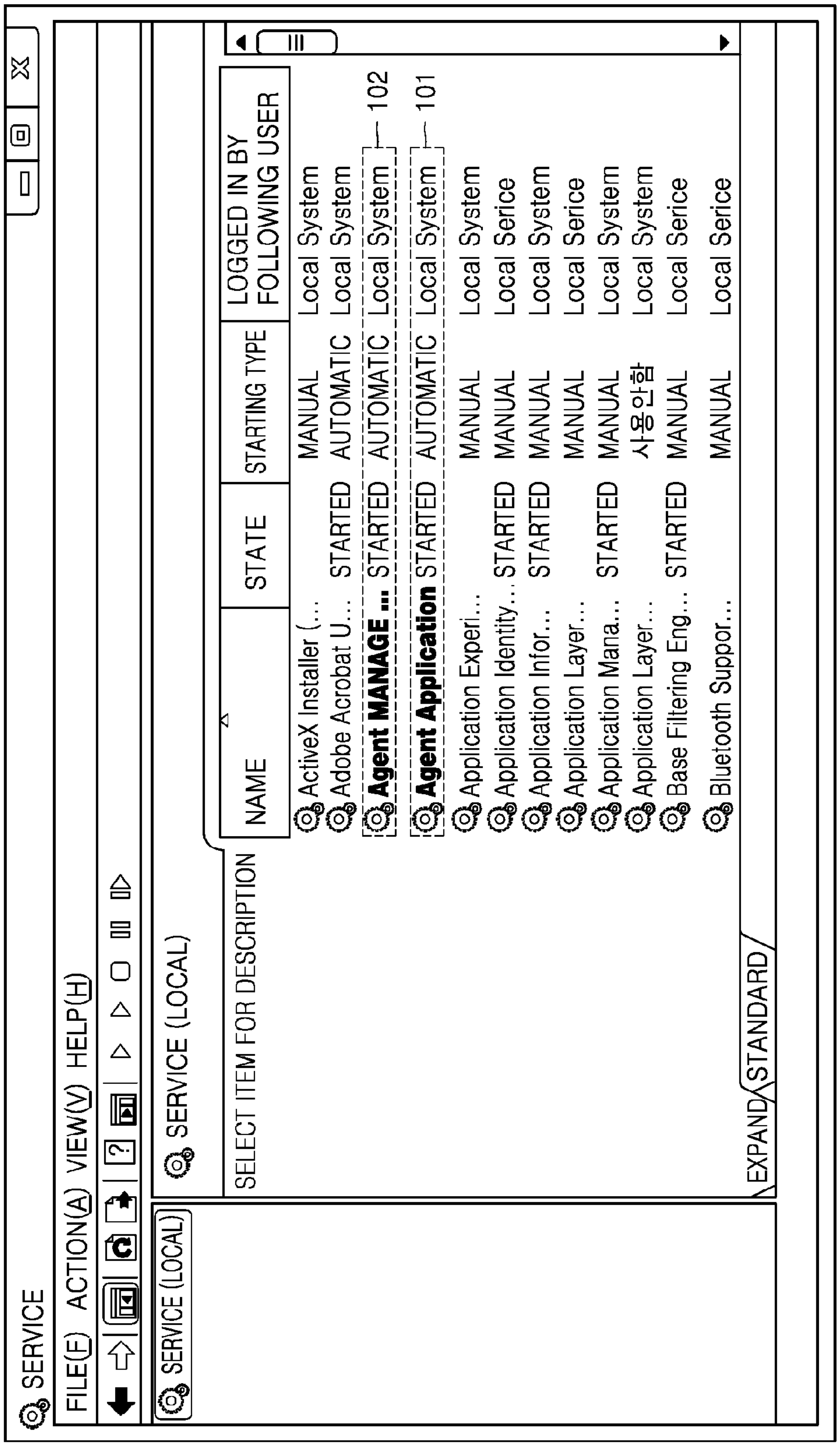
FIG. 86 is a diagram for describing an agent application that is executed as a system service on an operating system (OS), according to an embodiment.

FIG. 86 is a diagram for describing the agent application 101 that is executed as a system service on an OS, according to an embodiment.

Referring to FIG. 86, the agent application 101 is registered as the system service on the OS installed in the computing device 20. Accordingly, after the computing device 20 is booted, the agent application 101 may be always executed regardless of login/off of a user account. In other words, when the computing device 20 is booted and the OS starts to run, the agent application 101 may automatically start. Accordingly, the user of the computing device 20 may not have to inconveniently execute the agent application 101 every time after logging in to the OS.

Information about lists of phone numbers and image forming apparatuses that are newly registered while using the agent application 101 may be information processed after the login of the user account to the OS. However, as described above, the agent application 101 may be executed regardless of the login/off of the user account since the agent application 101 corresponds to the system service. Accordingly, information processed by the agent application 101 executed before the login of the user account may be transmitted to the agent application 101 executed after the login of the user account, by using a PIPE communication method that does not have a limitation to user authority. Also, the processes processed by the agent application 101 may be stored in a partial region of the storage unit 240 capable of being accessed by a system account of the OS installed in the computing device 20.

An agent management application 102 for monitoring an operation state of the agent application 101 may be executed as a system service, together with the agent application 101. The agent management application 102 is software pre-installed in the storage unit 240, like the agent application 101. The agent management application 102 controls the agent application 101 to be restored or re-executed if the agent application 101 does not normally operate.

In FIG. 86, it is described that the agent application 101 is executed as the system service, but alternatively, the agent application 101 may be executed as a general commercial application executed after the login of the user account, instead of as the system service. In other words, a method of executing the agent application 101 according to an embodiment is not limited.

Figure 87:
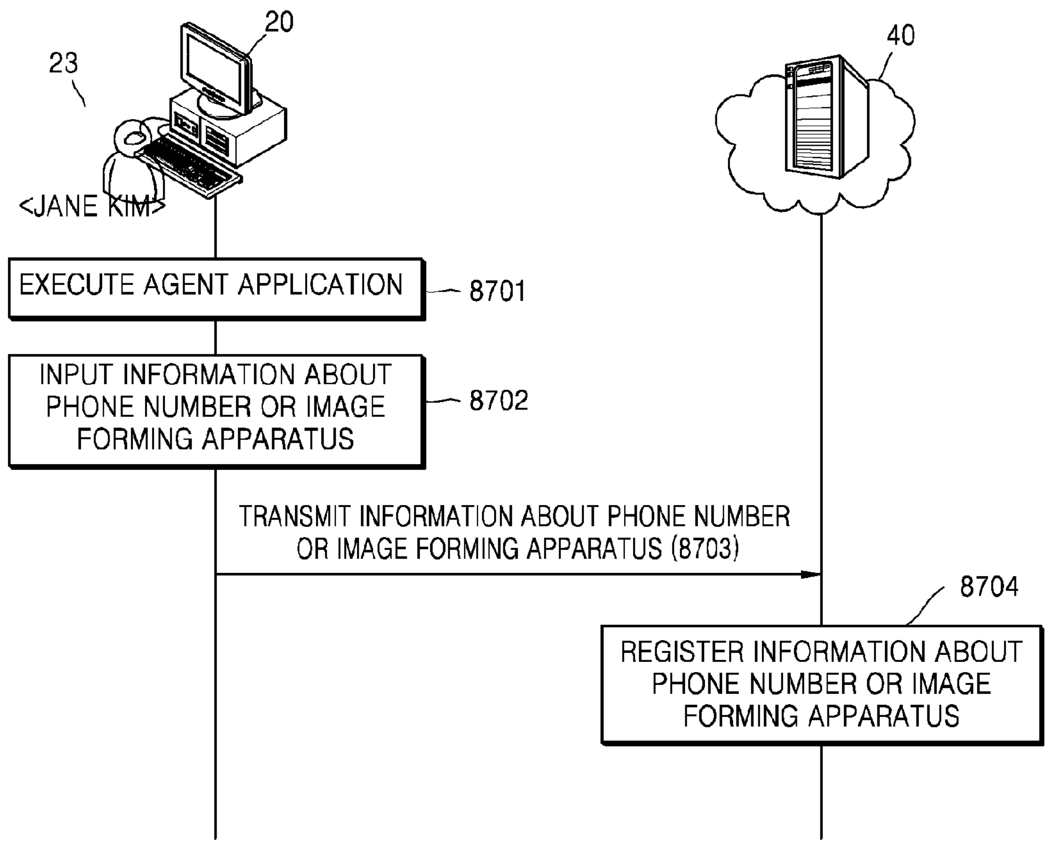
FIG. 87 is a diagram for describing a process of registering information about phone numbers or image forming apparatuses subscribed to a cloud printing service in a cloud server by using an agent application, according to an embodiment.

FIG. 87 is a diagram for describing a process of registering information about phone numbers or image forming apparatuses subscribed to a cloud printing service in the cloud server 40 by using the agent application 101, according to an embodiment.

In operation 8701, the controller 210 of the computing device 20 executes the agent application 101.

In operation 8702, the user of the computing device 20 inputs information about a phone number or an image forming apparatus to be registered in the agent application 101, through the UI unit 230. For example, the second individual 23 (Jane Kim) may input "+82-10-ABCD-ABCD" as the information about the phone number to be registered in the agent application 101, and may input the image forming apparatus 37 (SCX-6410n) as the information about the image forming apparatus to be registered in the agent application 101.

In operation 8703, the network interface unit 220 of the computing device 20 transmits the information about the phone number or the image forming apparatus, which is registered in the agent application 101, to the cloud server 40.

In operation 8704, the cloud server 40 registers the information about the phone number or the image forming apparatus. Also, the cloud server 40 registers path information indicating that the information about the phone number or the image forming apparatus is managed by the agent application 101.

As such, the cloud server 40 manages the information about the phone number, for example, of the second individual 23 (Jane Kim), the information about the image forming apparatus, for example, the image forming apparatus 37 (SCX-6401n), and information about the agent application 101 by linking them with each other.

Figure 88:
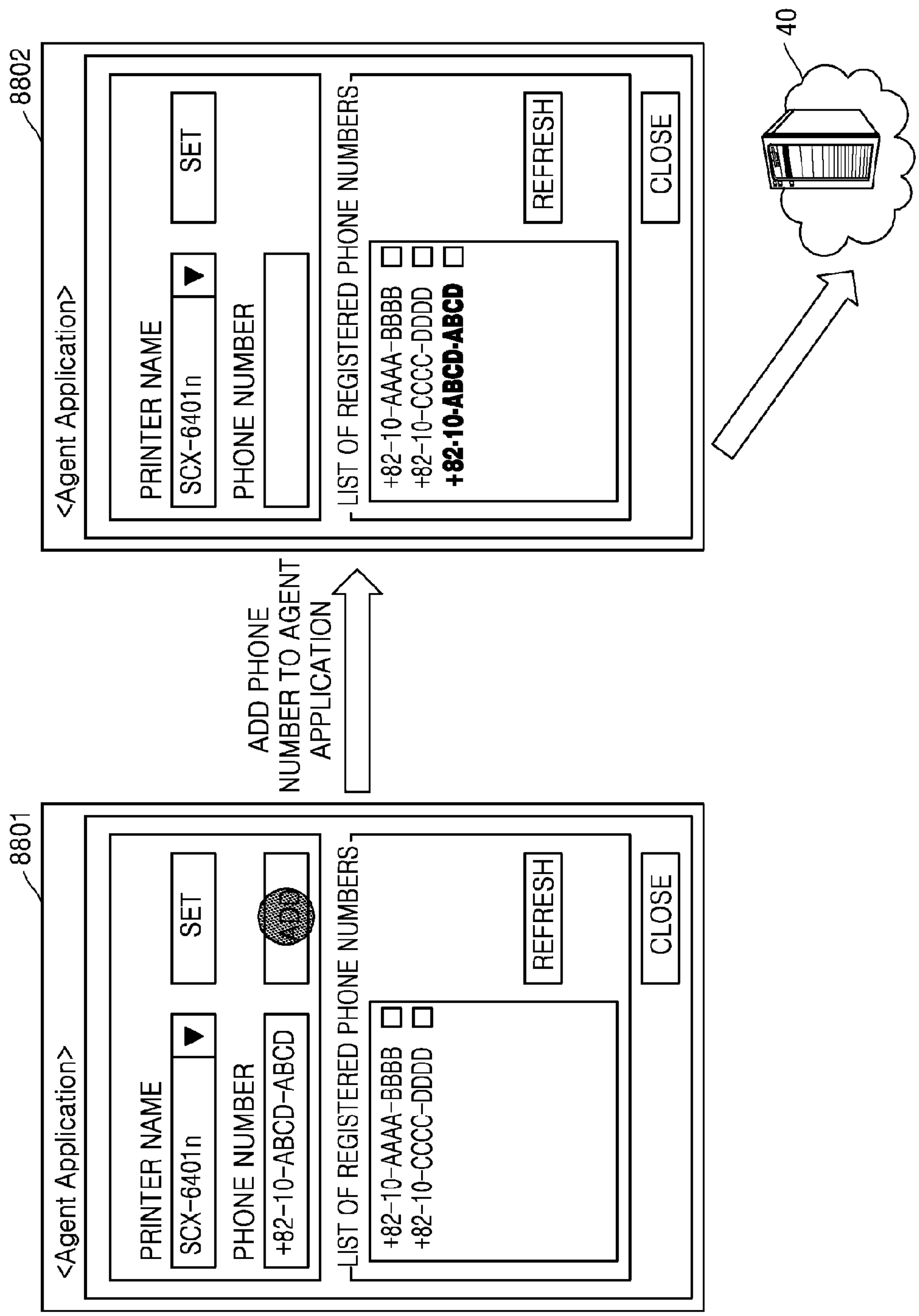
FIG. 88 is a diagram of UI screens for adding a phone number to subscribe to a cloud printing service by using an agent application, according to an embodiment.

FIG. 88 is a diagram of UI screens 8801 and 8802 for adding a phone number to subscribe to a cloud printing service by using the agent application 101, according to an embodiment.

Referring to the UI screen 8801 of the agent application 101, phone numbers "+82-10-AAAA-BBBB" and "+82-10-CCCC-DDDD" of other individuals are already assigned to the image forming apparatus 37 (SCX-6401n).

When the second individual 23 (Jane Kim) wants to add his/her phone number "+82-10-ABCD-ABCD" to the agent application 101, the second individual 23 inputs his/her phone number to the UI screen 8801 and clicks an "Add" button.

As a result, based on the UI screen 8802, the phone number "+82-10-ABCD-ABCD" of the second individual 23 is added, and at the same time, assigned to the image forming apparatus 37 and registered in the agent application 101.

Information about the added phone number of the second individual 23 is transmitted to the cloud server 40 and also registered in the cloud server 40. In other words, the cloud server 40 updates pre-registered information such that the phone numbers "+82-10-AAAA-BBBB", "+82-10-CCCC-DDDD", and "+82-10-ABCD-ABCD" are assigned to the image forming apparatus 37 by the agent application 101.

Figure 89:
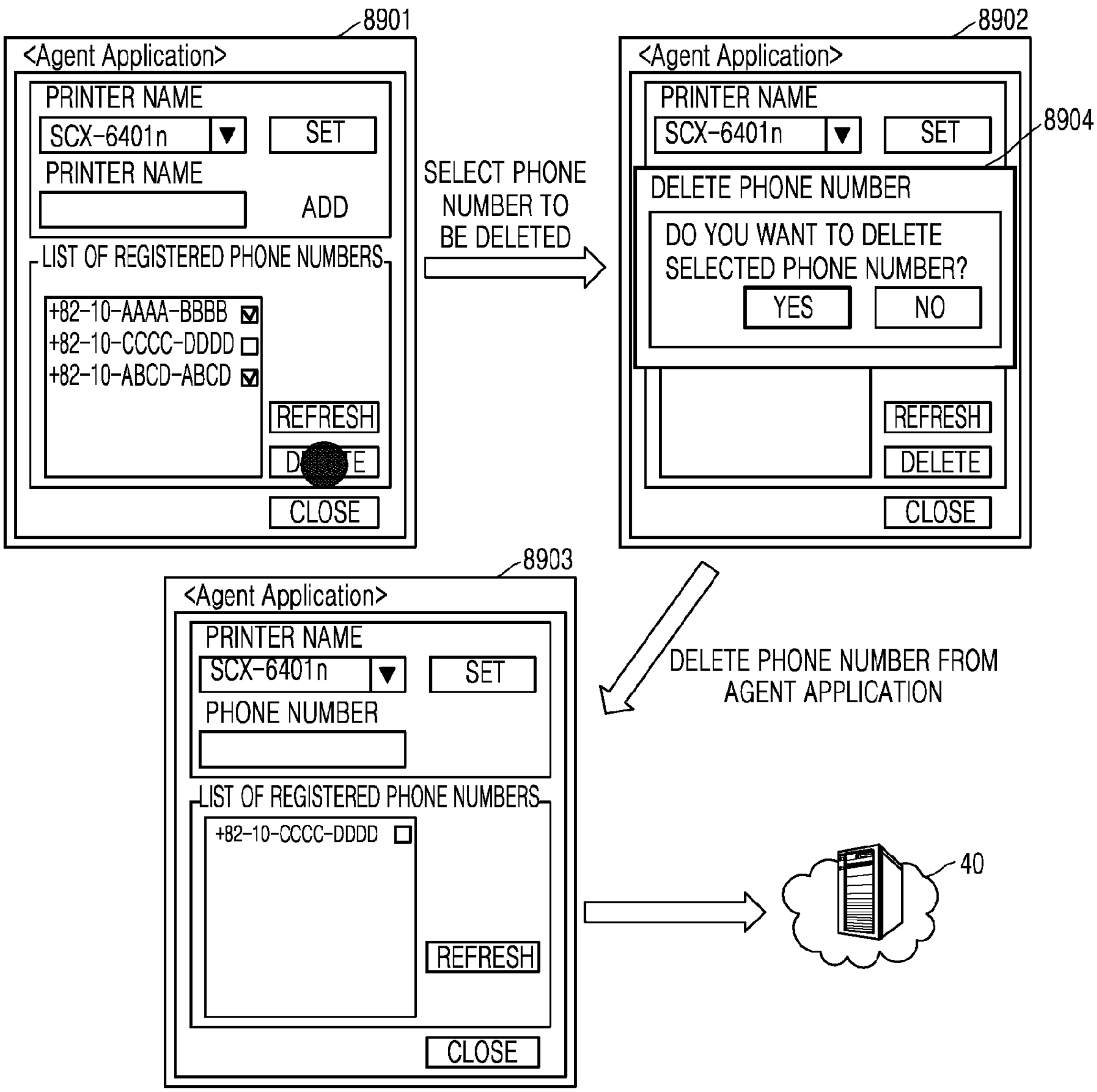
FIG. 89 is a diagram of UI screens for deleting a phone number subscribed to a cloud printing service by using an agent application, according to an embodiment.

FIG. 89 is a diagram of UI screens 8901 through 8903 for deleting a phone number subscribed to a cloud printing service by using the agent application 101, according to an embodiment.

Referring to the UI screen 8901 of the agent application 101, phone numbers "+82-10-AAAA-BBBB", "+82-10-CCCC-DDDD", and "+82-10-ABCD-ABCD" of individuals are already assigned to the image forming apparatus 37 (SCX-6501n).

When the second individual 23 (Jane Kim) wants to delete his/her phone number "+82-10-ABCD-ABCD" and the phone number "+82-10-AAAA-BBBB" of the other individual from the agent application 101, the second individual 23 selects phone numbers to be deleted and clicks a "Delete" button on the UI screen 8901.

As a result, a pop-up window 8904 inquiring whether to delete the selected phone numbers is displayed on the UI screen 8902.

When the second individual 23 clicks a "Yes" button in the pop-up window 8904, the phone numbers "+82-10-ABCD-ABCD" and "+82-10-AAAA-BBBB" are deleted from the agent application 101.

Thus, on the UI screen 8903, only the phone number "+82-10-CCCC-DDDD" is assigned to the image forming apparatus 37.

Information about the deleted phone numbers is transmitted to the cloud server 40. In other words, the cloud server 40 updates pre-registered information such that only the phone number "+82-10-CCCC-DDDD" is assigned to the image forming apparatus 37 by the agent application 101.

Figure 90:
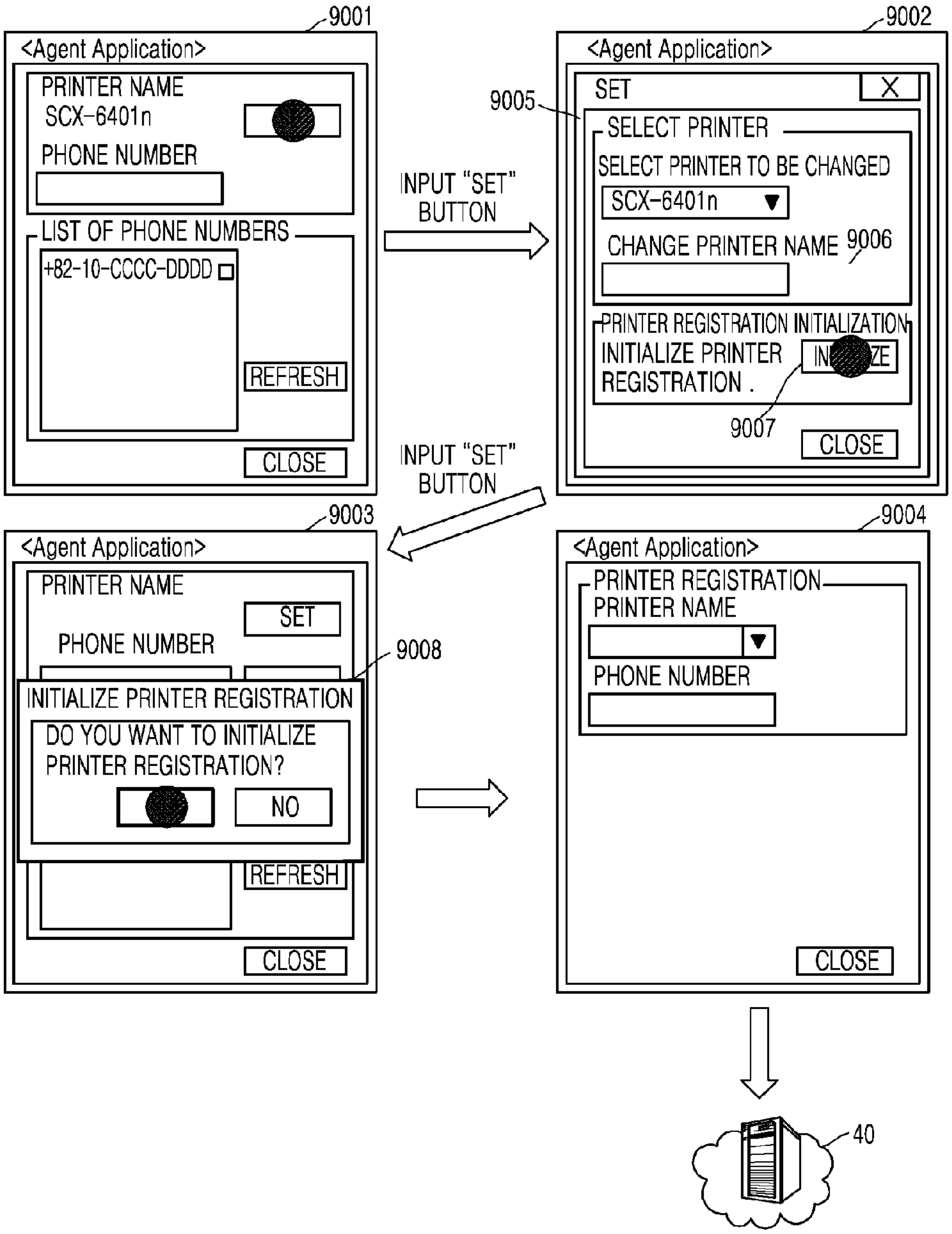
FIG. 90 is a diagram of UI screens for changing information about an image forming apparatus subscribed to a cloud printing service by using an agent application, according to an embodiment.

FIG. 90 is a diagram of UI screens 9001 through 9004 for changing information about the image forming apparatus 37 subscribed to a cloud printing service by using the agent application 101, according to an embodiment.

Referring to the UI screen 9001 of the agent application 101, a phone number "+82-10-CCCC-DDDD" is already assigned to the image forming apparatus 37 (SCX-6401n).

When the second individual 23 (Jane Kim) wants to change information about the image forming apparatus 37 from the agent application 101, the second individual 23 clicks a "Set" button on the UI screen 9001.

As a result, a pop-up window 9005 for changing a printer setting is displayed on the UI screen 9002.

When the second individual 23 wants to change the name of the image forming apparatus 37, i.e., "SCX-6401n", the second individual 23 may input a new name "Printer A" and then click a "Change" button 9006 of the pop-up window 9005 to change the name.

The second individual 23 may click an "Initialize" button 9007 of the pop-up window 9005 to delete and initialize the registration of the image forming apparatus 37 from the agent application 101. For example, the initializing of the image forming apparatus 37 may be used to register image forming apparatuses other than the image forming apparatus 37, in the agent application 101. Then, a pop-up window 9008 inquiring whether to initialize the registration of the image forming apparatus 37 is displayed on the UI screen 9003.

When the second individual 23 clicks a "Yes" button on the pop-up window 9008, the registration information of the image forming apparatus 37 is deleted from the agent application 101 as shown in the UI screen 9004.

Information about the deleted image forming apparatus 37 is transmitted to the cloud server 40. In other words, the cloud server 40 updates pre-registered information such that there is no image forming apparatus managed by the agent application 101.

Figure 91:
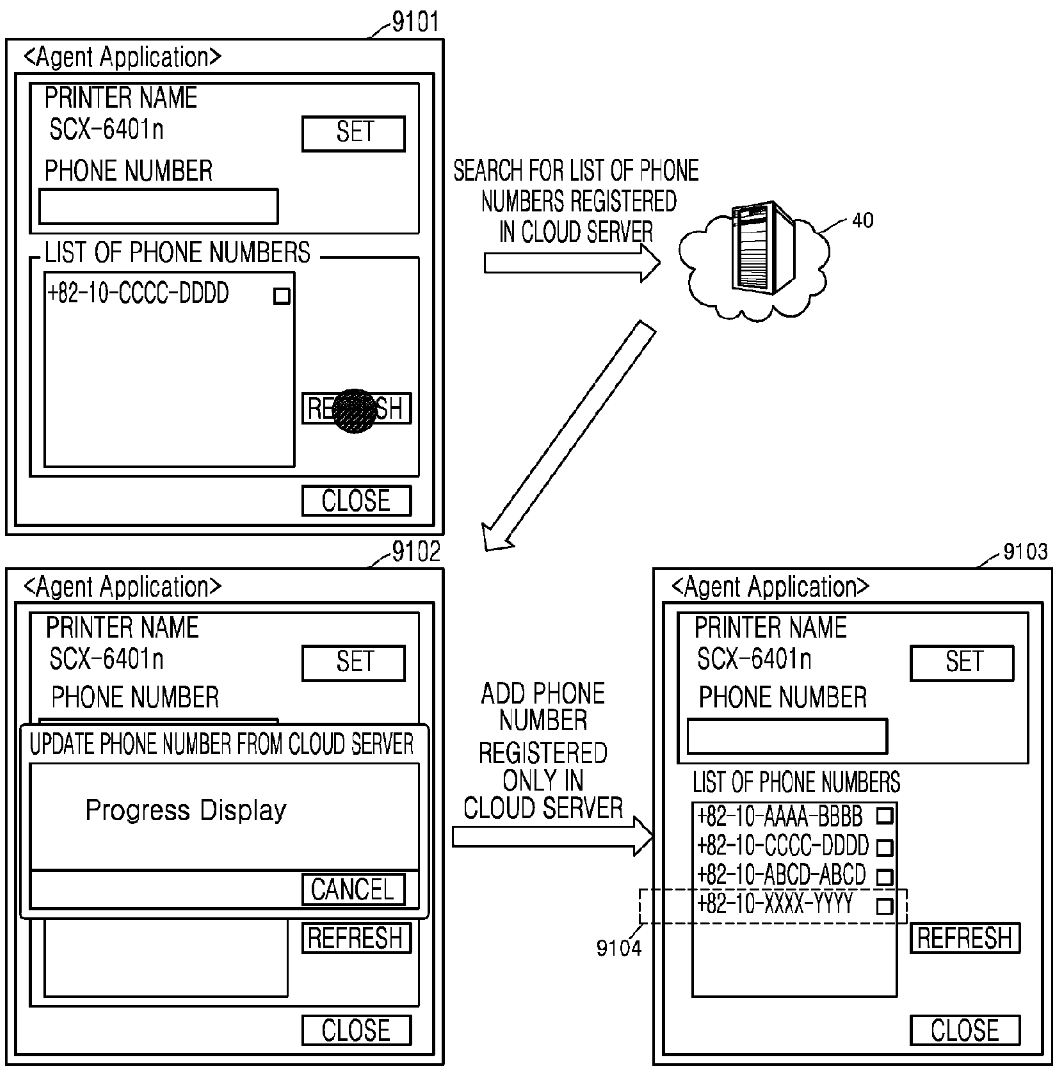
FIG. 91 is a diagram of UI screens for updating information registered in an agent application based on information registered in a cloud server, according to an embodiment.

FIG. 91 is a diagram of UI screens 9101 through 9103 for updating information registered in the agent application 101 based on information registered in the cloud server 40, according to an embodiment.

Referring to the UI screen 9101 of the agent application 101, phone numbers "+82-10-AAAA-BBBB", "+82-10-CCCC-DDDD", and "+82-10-ABCD-ABCD" of individuals are already assigned to the image forming apparatus 37 (SCX-6401n).

When the second individual 23 (Jane Kim) wants to update information registered in the agent application 101, the second individual 23 clicks a "Refresh" button on the UI screen 9101.

While an updating process is performed as shown in the UI screen 9102, the cloud server 40 transmits information about lists of phone numbers and image forming apparatuses currently managed by the cloud server 40 with respect to the agent application 101, to the agent application 101.

As a result, as shown in the UI screen 9103, a phone number "+82-10-XXXX-YYYY" 9104 that is not registered in the agent application 101 but registered only in the cloud server 40 is newly added in the agent application 101. The phone number "+82-10-XXXX-YYYY" 9104 may be registered in the cloud server 40 by being assigned to the image forming apparatus 37 (SCX-6401n) by another external device, for example, the mobile device 17 of FIG. 2, instead of the agent application 101 installed in the computing device 20.

In FIG. 91, the phone number "+82-10-XXXX-YYYY" 9104 is added to the agent application 101 by the cloud server 40, but alternatively, other various types of information, such as a name of an image forming apparatus, may be updated in the agent application 101 by the cloud server 40.

Figure 92:
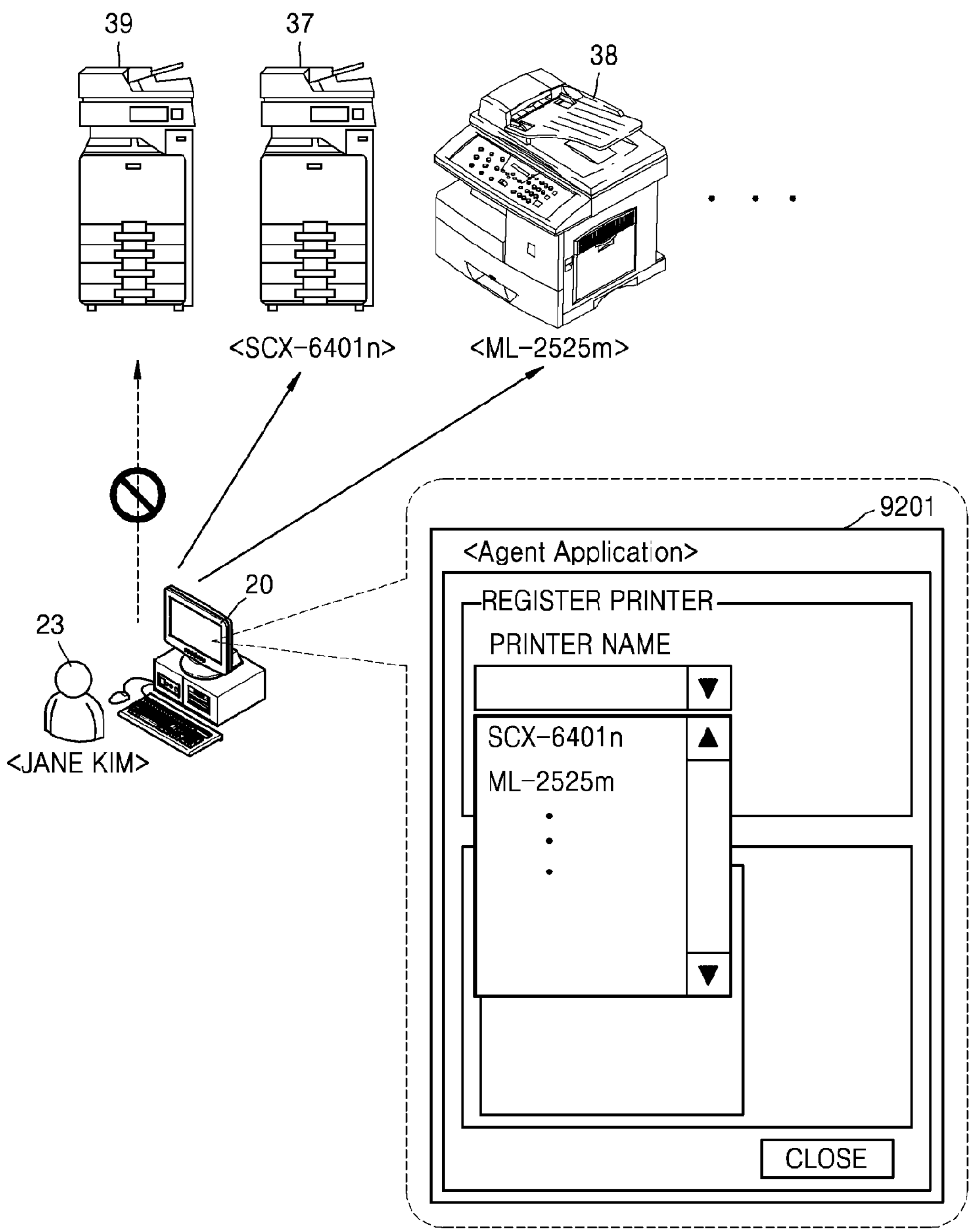
FIG. 92 is a diagram for describing providing a list of image forming apparatuses to subscribe to a cloud printing service by using an agent application, according to an embodiment.

FIG. 92 is a diagram for describing providing a list of image forming apparatuses to subscribe to a cloud printing service by using the agent application 101, according to an embodiment.

Referring to FIG. 92, image forming apparatuses that are connectable to the computing device 20 from among image forming apparatuses 37 through 39 around the computing device 20 are the image forming apparatus 37 (SCX-6401n) and the image forming apparatus 38 (ML-2525m).

When the second individual 23 (Jane Kim) wants to input information about the image forming apparatus to subscribe to the cloud printing service, the agent application 101 displays a UI screen 9201 for providing a list of image forming apparatuses connectable to the computing device 20. As described above, since it is assumed that the image forming apparatuses 37 and 38 are connectable to the computing device 20 in FIG. 92, the UI screen 9201 may display a list of "SCX-6401n" and "ML-2525m".

When the second individual 23 wants to input the information about the image forming apparatus to subscribe to the cloud printing service, the agent application 101 may need to discover the image forming apparatuses connectable to the computing device 20.

Figure 93A:
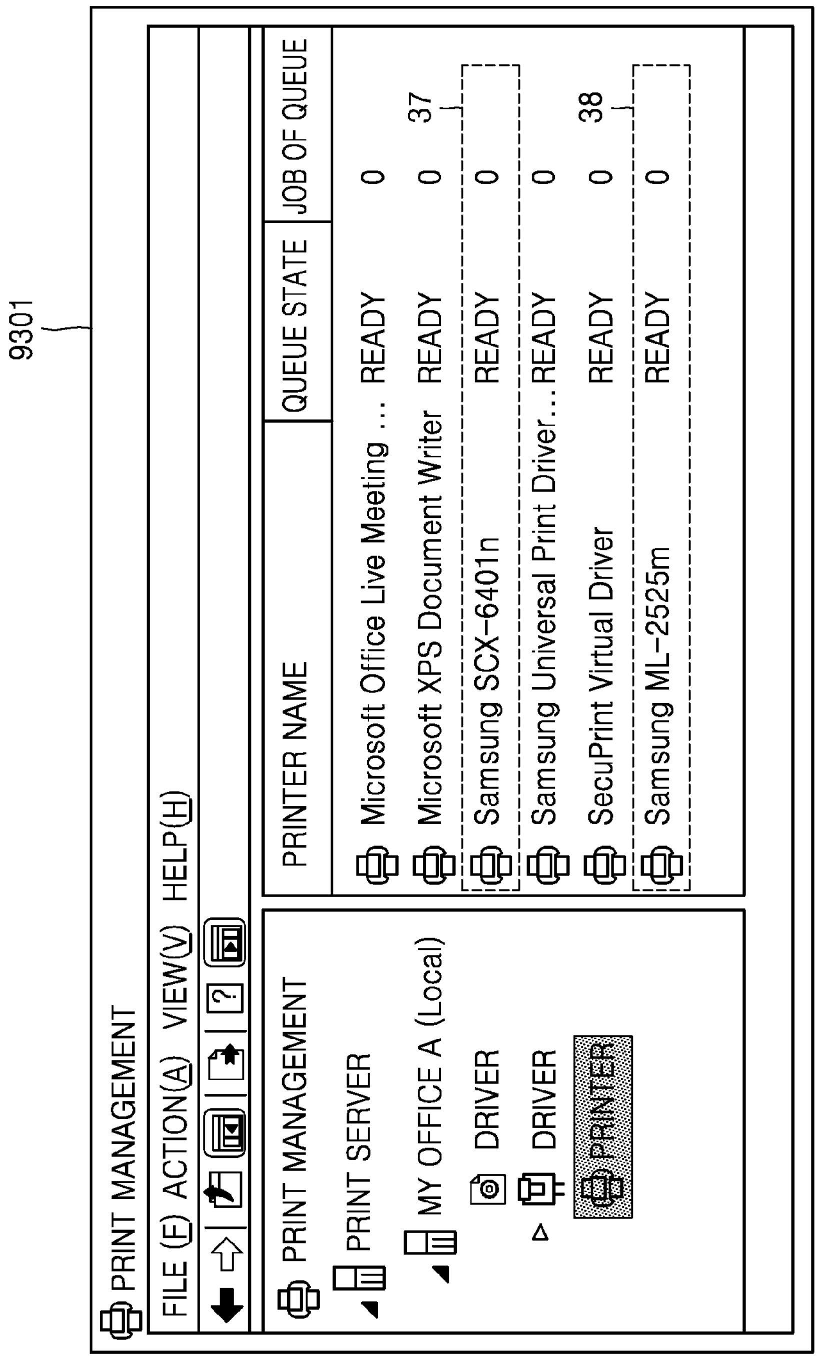
FIGS. 93A through 93C are diagrams for describing methods of discovering image forming apparatuses to subscribe to a cloud printing service, according to embodiments.
Figure 93B:
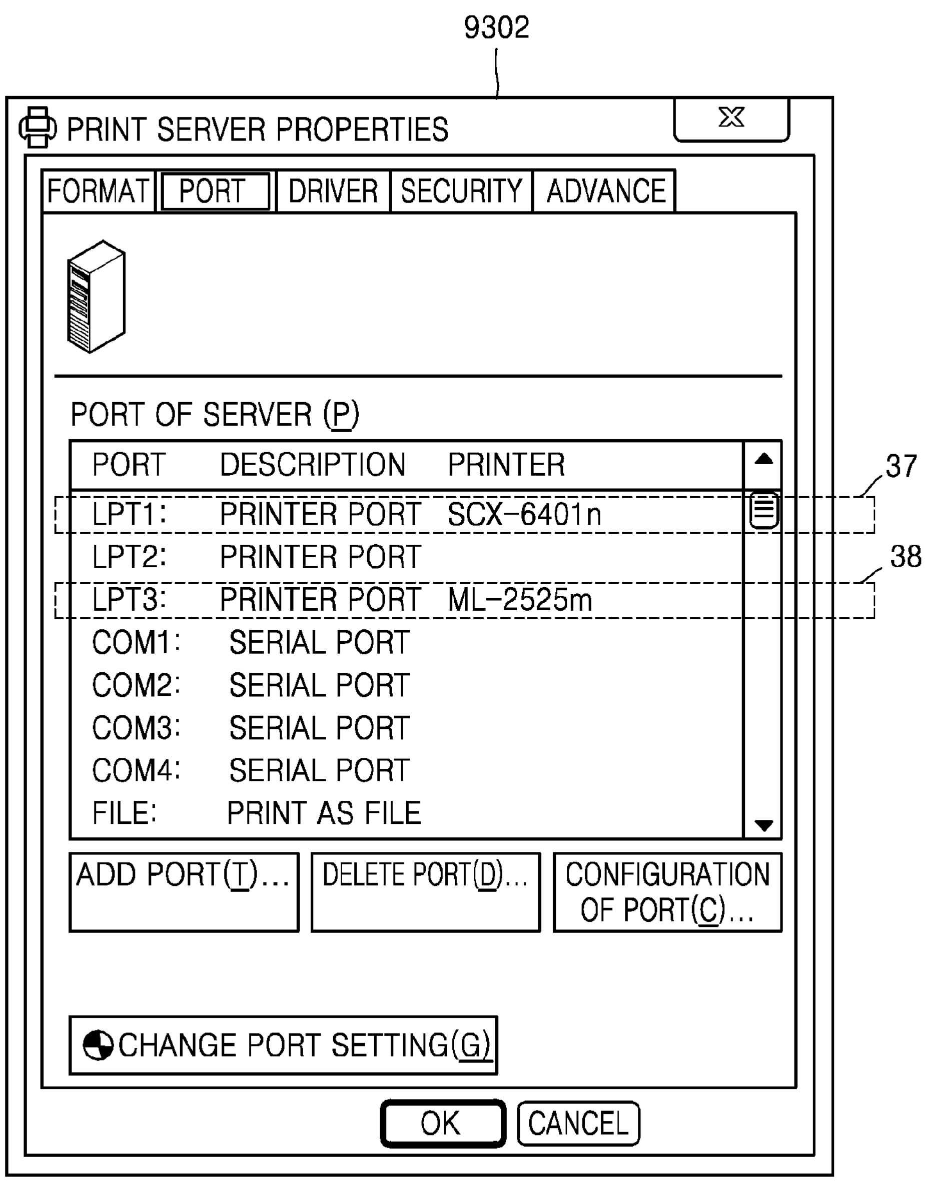
Figure 93C:
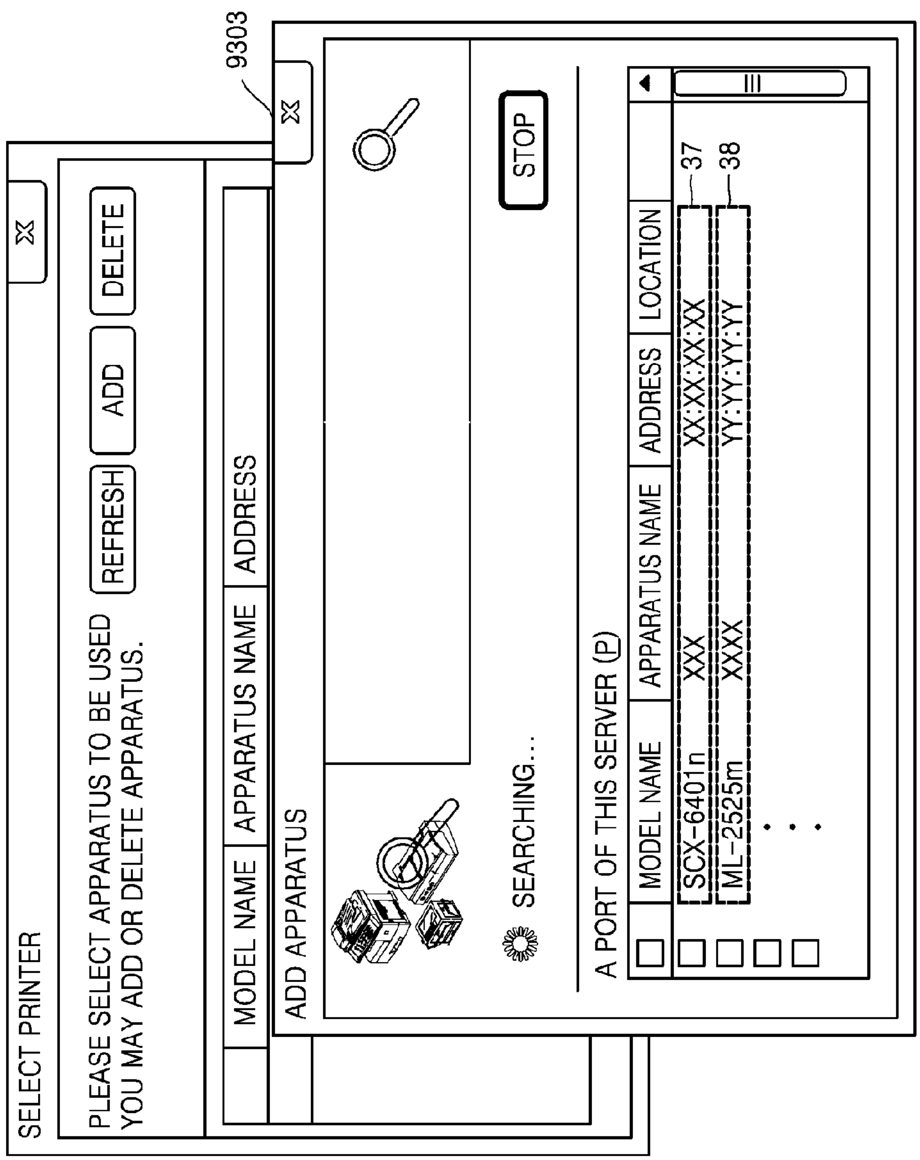

FIGS. 93A through 93C are diagrams for describing methods of discovering image forming apparatuses to subscribe to a cloud printing service, according to one or more embodiments.

Referring to FIG. 93A, the computing device 20 executes a dialog box 9301 of a print management of an OS to check a printer queue, thereby discovering the image forming apparatuses 37 and 38 (SCX-6401n and ML-2525m) connectable to the computing device 20, based on printer drivers installed in the OS.

Referring to FIG. 83B, the computing device 20 may execute a dialog box 9302 of print server properties of the OS to check a port list. As a result, the computing device 20 may discover that the image forming apparatuses 37 and 38 (SCX-6401n and ML-2525m) are connectable to the computing device 20.

Referring to FIG. 93C, the computing device 20 may execute a dialog box 9303 of an automatic search for searching for peripheral apparatuses of the computing device 20, thereby discovering the image forming apparatuses 37 and 38 (SCX-6401n and ML-2525m).

A list of the image forming apparatuses 37 and 38 (SCX-6401n and ML-2525m) discovered via discovering methods described above with reference to FIGS. 93A through 93C may be provided to the agent application 101 and displayed to the second individual 23 as shown in the UI screen 9201 of FIG. 12.

Figure 94:
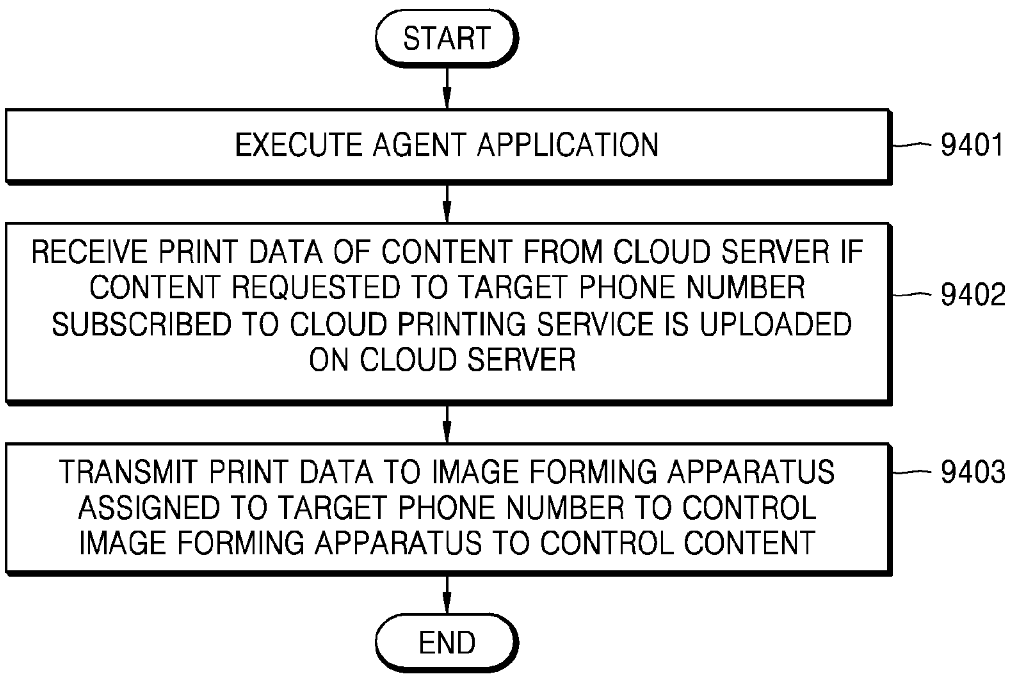
FIG. 94 is a flowchart illustrating a method of supporting a cloud printing service, which is performed by a computing device, according to an embodiment.

FIG. 94 is a flowchart illustrating a method of supporting a cloud printing service, which is performed by the computing device 20, according to an embodiment. The method of FIG. 94 includes processes that are performed in time series by the image forming system 8100 of FIG. 81, and thus details described above with reference to FIG. 81 and related diagrams may also be applied to the method of FIG. 94 even if omitted.

In operation 9401, the controller 210 of the computing device 20 executes an agent application.

In operation 9402, the network interface unit 220 of the computing device 20 receives print data of a content from the cloud server 40, if the content requested to a target phone number (for example, the phone number of the second individual 23, i.e., Jane Kim) subscribed to the cloud printing service is uploaded on the cloud server 40.

In operation 9403, the controller 210 transmits the print data to the image forming apparatus 37 assigned to the target phone number and controls the image forming apparatus 37 to print the content.

According to an embodiment, a cloud printing service may be interlocked (linked/coupled/interworked/interacted) with a web storage service so that a user of the cloud printing service may store print data in a server of the web storage service that is personally used.

Generally, a cloud printing server providing a cloud printing service temporarily stores print data only for a predetermined period of time required for a service provision. For example, print data uploaded to the cloud printing server by a sender is automatically deleted if a recipient does not check or print the print data for a predetermined period of time, for example, 24 hours. Data is temporarily stored only for a predetermined period of time so as to increase flexibility of using resources, which is a property of a cloud service, while preventing expenses generated by obtaining a storage space.

However, a user of the cloud printing service may want to store print data without a time limit. However, a provider of the cloud printing service may feel burdened by expenses generated while providing storage spaces desired by users. Moreover, even if the provider provides individual storage spaces to the users while enduring an increase of the expenses, reliability of the storage spaces provided by the cloud printing service may be lower than that of a personal web storage service in terms of the users.

Accordingly, one or more embodiments provide a method of interlocking a web storage service with a cloud printing service and storing the print data used in the cloud printing service, in a web storage server, as will now be described in detail with reference to FIGS. 95 through 109.

Figure 95:
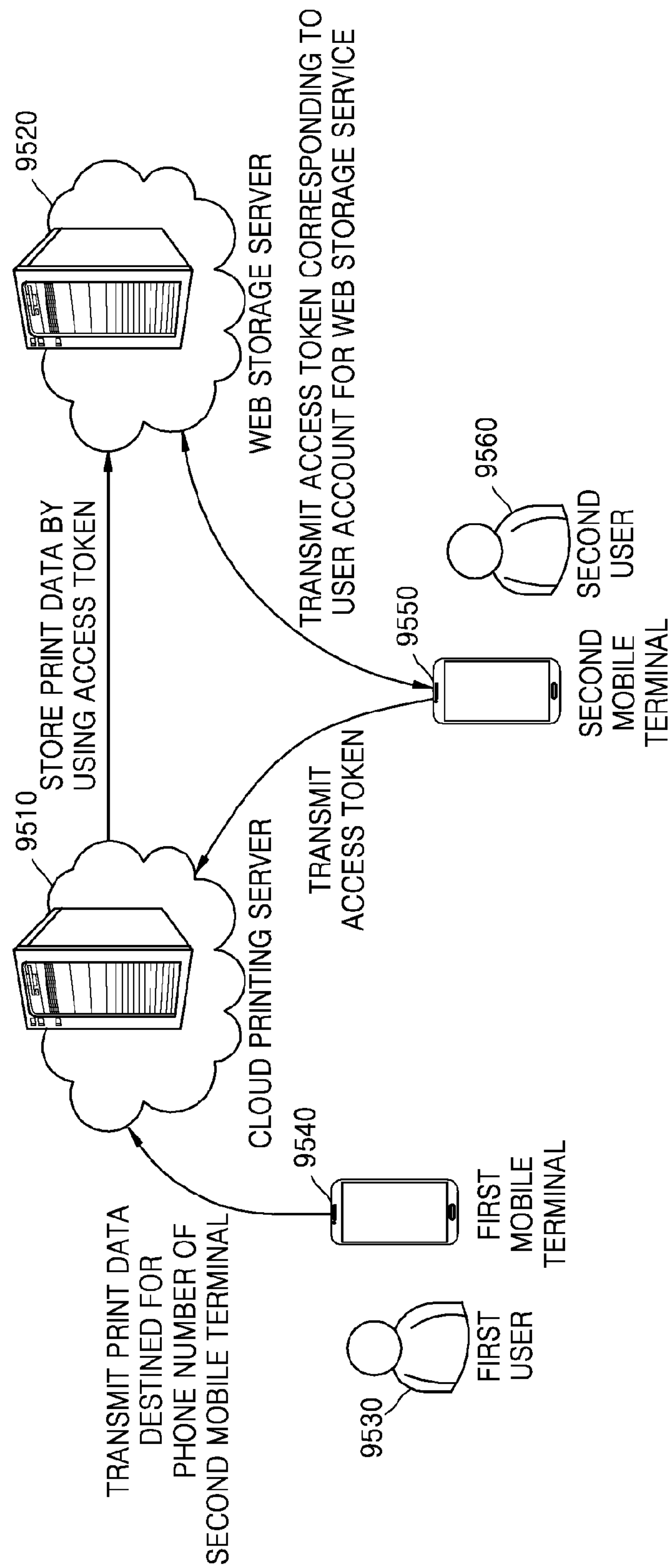
FIG. 95 is a diagram of a cloud printing system according to an embodiment.

FIG. 95 is a diagram of a cloud printing system according to an embodiment. Referring to FIG. 95, the cloud printing system according to an embodiment may include a cloud printing server 9510, a web storage server 9520, and first and second mobile terminals 9540 and 9550.

First and second users 9530 and 9560 are users subscribed to the cloud printing service, and a mobile application for using the cloud printing service in a mobile terminal is installed in the first and second mobile terminals 9540 and 9550. The first and second users 9530 and 9560 subscribed to the cloud printing service respectively through phone numbers of the first and second mobile terminals 9540 and 9550, and each have a user account for the cloud printing service. Accordingly, the user accounts of the first and second users 9530 and 9560 are mapped respectively to the phone numbers of the first and second mobile terminals 9540 and 9550, and are registered in the cloud printing server 9510.

The second user 9560 is also a user subscribed to a web storage service, and has a user account for the web storage service. The web storage service is a service providing a personal data storage space in a cloud server. In other words, the second user 9560 may upload or download data by accessing the web storage server 9520 from any one of various devices, such as a PC, a laptop, and a mobile terminal, through the user account of the second user 9560.

In an embodiment, the second user 9560 may interlock the cloud printing service with the web storage service. In detail, the cloud printing server 9510 may be interlocked with the web storage server 9520 with respect to the phone number of the second mobile terminal 9550 of the second user 9560.

In order to interlock the cloud printing server 9510 with the web storage server 9520 with respect to the phone number of the second mobile terminal 9550, the second mobile terminal 9550 receives an access token from the web storage server 9520 and transmits the access token to the cloud printing server 9510. The access token is an access token corresponding to the user account of the second user 9560 for the web storage service, and is required to access the web storage server 9520 by using the user account of the second user 9560.

The cloud printing server 9510 stores the access token after mapping the access token to the phone number of the second mobile terminal 9550. The user account of the second user 9560 for the cloud printing service may also be mapped and stored together with the phone number. When the cloud printing server 9510 receives print data, the cloud printing server 9510 may store the print data in the web storage server 9520 by using the access token.

When the first user 9530 uploads the print data destined for the phone number of the second mobile terminal 9550 in the cloud printing server 9510, the cloud printing server 9510 provides a cloud printing service with respect to the print data, and stores the print data in the web storage server 9520 by using the access token.

The provided cloud printing service may be direct printing of the print data or may be a service that stores the print data for a predetermined period of time and notifies the second mobile terminal 9550 about the upload of the print data. In other words, an assigned image forming apparatus may directly print the print data or the second user 9560 may check or print the uploaded print data through the mobile application of the cloud printing service in the second mobile terminal 9550 within the predetermined period of time from a point of time when the print data is uploaded.

A process of transmitting the print data to the second user 9560 will now be described in detail. The first user 9530 may transmit the print data to the second user 9560 by using the mobile application of the cloud printing service installed in the first mobile terminal 9540. In detail, when the print data destined for the phone number of the second mobile terminal 9550 is transmitted, the print data is mapped to the phone number of the second mobile terminal 9550 and uploaded to the cloud printing server 9510. Also, the cloud printing server 9510 transmits a message notifying that the print data is uploaded, to the second mobile terminal 9550. The second user 9560 checks the message, and may check or print the print data destined for the phone number of the second mobile terminal 9550 through the mobile application of the cloud printing service installed in the second mobile terminal 9550.

According to one or more embodiments described above, the print data uploaded to the cloud printing server 9510 is stored only for a predetermined period of time, and is deleted after the predetermined period of time. However, according to an embodiment, the print data is stored in the web storage server 9520 without a time limit, while being temporarily stored in the cloud printing server 9510 to provide the cloud printing service.

Upon receiving the print data, the cloud printing server 9510 checks that the web storage server 9520 is interlocked with the cloud printing server 9510 for the phone number of the second mobile terminal 9550 that is a destination of the print data, and stores the print data in the web storage server 9520. At this time, the access token mapped to the phone number of the second mobile terminal 9550 and stored in the cloud printing server 9510 is used. The cloud printing server 9510 requests the web storage server 9520 to store the print data by transmitting the access token to the web storage server 9520.

Here, since the access token corresponding to the user account of the second user 9560 is transmitted, the print data is stored in a space of the web storage server 9520, which corresponds to the user account of the second user 9560. Accordingly, the second user 9560 may access the print data stored in the web storage server 9520 not only directly through the user account for the web storage service, but also through the cloud printing service.

A process of accessing the print data stored in the web storage server 9520 through the cloud printing service will now be described in detail.

When the second user 9560 requests the cloud printing server 9510 to access print data and the print data is stored in the web storage server 9520, the cloud printing server 9510 may request the cloud printing server 9510 for the print data and receive the print data by using an access token that is pre-stored. The cloud printing server 9510 may store metadata of the print data including a storage path of the print data for storing the print data in the web storage server 9520, in the cloud printing server 9510. Accordingly, it may be determined whether the print data is stored in the web storage server 9520 by checking the stored metadata.

When the second user 9560 requests the cloud printing server 9510 to print the print data stored in the web storage server 9520, the cloud printing server 9510 may render the print data by using the access token as described above, and transmit the rendered print data to an image forming apparatus assigned by the second user 9560. Alternatively, when the second user 9560 requests for a preview, the cloud printing server 9510 may transmit a preview of the print data to the second mobile terminal 9550.

As described above, the second user 9560 may directly access the print data stored in the web storage server 9520 without passing through the cloud printing server 9510. In other words, the second user 9560 may upload the print data directly to the web storage server 9520, and change the print data stored in the web storage server 9520.

However, when the second user 9560 uploads or changes the print data by directly accessing the web storage server 9520, the cloud printing server 9510 needs to be notified about such changes. Accordingly, a synchronization folder that is synchronized with the cloud printing server 9510 may be managed in the web storage server 9520. Print data stored in the web storage server 9520 through the cloud printing server 9510 is stored in the synchronization folder, and if the second user 9560 directly accesses the web storage server 9520 to change data stored in the synchronization folder, the cloud printing server 9510 may also recognize such a change.

Accordingly, when the second user 9560 requests for a list of print data transmitted to the second user 9560 through the mobile application installed in the second mobile terminal 9550, the cloud printing server 9510 requests the web storage server 9520 for changes in the synchronization folder, and transmits a list of updated print data to the second mobile terminal 9550 by reflecting the changes.

Such a synchronization folder may be newly created in the web storage server 9520 while interlocking the cloud printing service and the web storage service with each other, or may be selected from folders pre-stored in the web storage server 9520.

Even when a web storage service is interlocked with respect to a phone number of a recipient, print data may be stored in the web storage server 9520 or may be stored only in the cloud printing server 9510 like a general cloud printing service without being stored in the web storage server 9520, based on a selection of a sender. This is because the sender may not want some data to be stored in a personal storage space of a recipient.

In detail, the first user 9530 transmits the print data destined for the phone number of the second mobile terminal 9550 through the mobile application installed in the first mobile terminal 9540. The cloud printing server 9510 checks that the web storage service is interlocked with respect to the phone number of the second mobile terminal 9550, and requests the first mobile terminal 9540 to determine whether to store the print data in the web storage server 9520. If the first user 9530 determines to store the print data in the web storage server 9520 from a selection request screen, the print data is stored in the web storage server 9520, and if not, the print data is temporarily stored in the cloud printing server 9510 only for a predetermined period of time.

Figure 96:
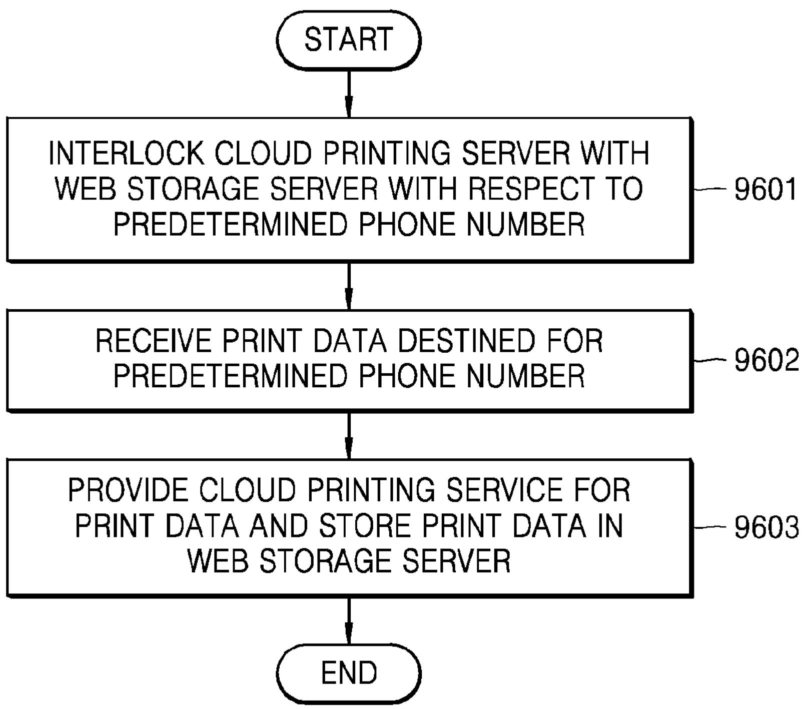
FIG. 96 is a flowchart illustrating an overall process of a method of interlocking a cloud printing service with a web storage service, according to an embodiment.

FIG. 96 is a flowchart illustrating an overall process of a method of interlocking a cloud printing service with a web storage service, according to an embodiment. The method will now be described briefly with reference to FIG. 96. In operation 9601, a cloud printing server is interlocked with a web storage server with respect to a predetermined phone number subscribed to a cloud printing service. In operation 9602, the cloud printing server receives print data destined for the predetermined phone number interlocked with a web storage service. Also, in operation 9603, the cloud printing server provides a cloud printing service for the print data, and stores the print data in the interlocked web storage server.

Hereinabove, an overall process of the method of interlocking a cloud printing service with a web storage service, according to one or more embodiments, has been described. Hereinafter, processes of interlocking services, transmitting print data, reading and printing stored print data will be described in detail with reference to accompanying drawings.

FIGS. 97 through 100 are diagrams illustrating in detail a process of interlocking a cloud printing service with a web storage service, which is included in the method of providing a cloud printing service, according to an embodiment. In other words, FIGS. 97 through 100 are diagrams corresponding to operation 9601 of FIG. 96.

Figure 97:
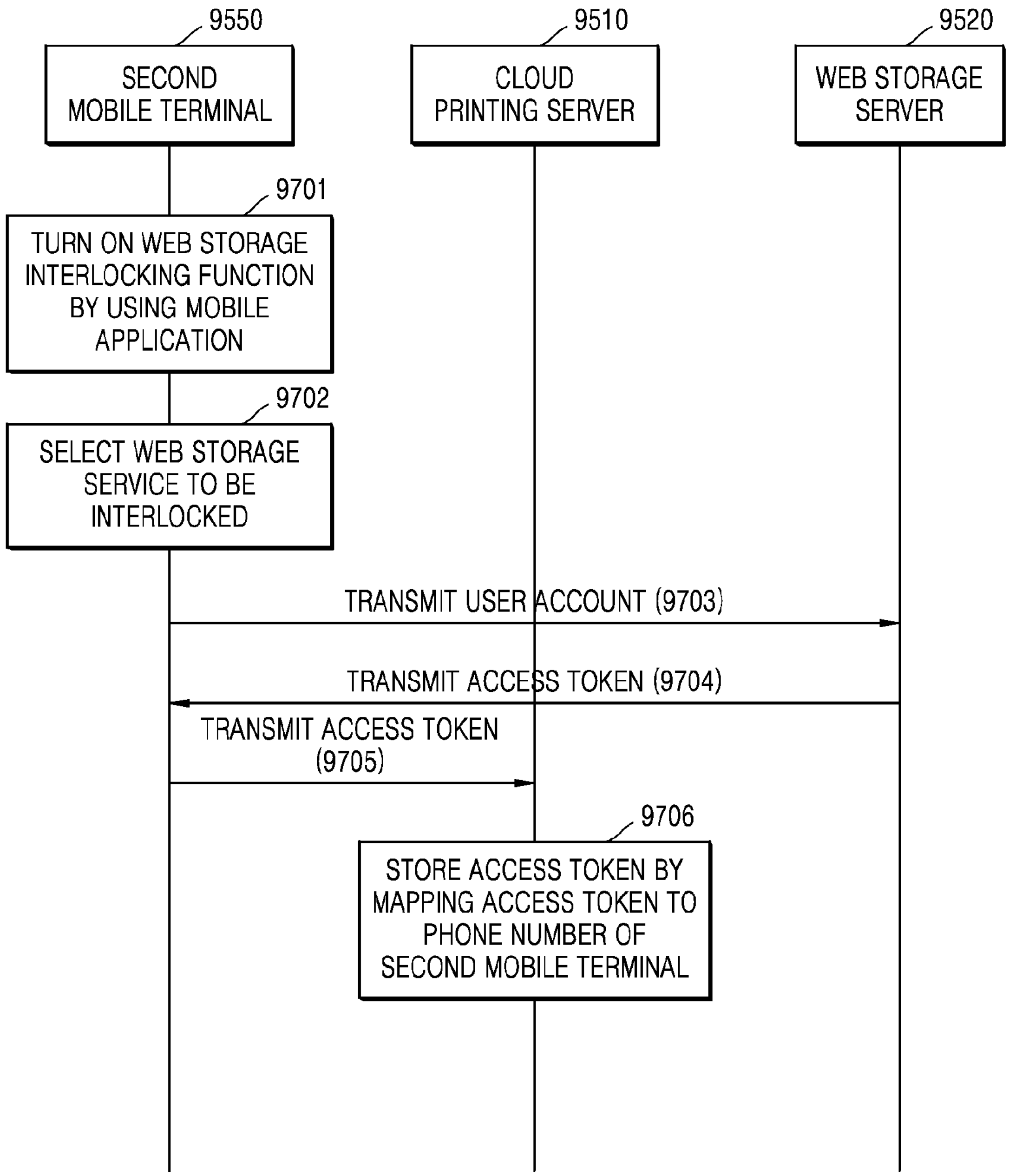
FIG. 97 is a diagram illustrating in detail a process of interlocking a cloud printing server with a web storage server, according to an embodiment.

FIG. 97 is a diagram illustrating in detail a process of interlocking a cloud printing server with a web storage server, according to an embodiment. Referring to FIG. 97, a mobile application executed in the second mobile terminal 9550 turns on a web storage interlocking function in operation 9701. When the web storage interlocking function is turned on, interlockable web storage services are displayed on a UI screen of the mobile application and a web storage service to be interlocked may be selected in operation 9702.

When the web storage service to be interlocked is selected, the second mobile terminal 9550 transmits a user account for the selected web storage service to the web storage server 9520, in operation 9703. The user account transmitted to the web storage server 9520 may include a user ID and a password for the selected web storage service.

The user account may be pre-stored in the second mobile terminal 9550 or may be directly input by a user when interlocking is requested. When the user account is pre-stored in the second mobile terminal 9550, the mobile application may obtain the user account from an account administrator of the second mobile terminal 9550. If there are a plurality of user accounts for the selected web storage service, the mobile application may display the plurality of user accounts obtained from the account administrator on a screen for the user to select one of the user accounts. Then, when the user selects one of the user accounts, the selected user account is transmitted to the web storage server 9520.

Upon receiving the user account for the web storage service, the web storage server 9520 transmits an access token corresponding to the received user account to the second mobile terminal 9550 in operation 9704. In operation 9705, the second mobile terminal 9550 transmits the received access token to the cloud printing server 9510. In operation 9706, the cloud printing server 9510 stores the access token after mapping the access token to the phone number of the second mobile terminal 9550. The stored access token is used when the cloud printing server 9510 stores print data in the web storage server 9520 or obtains print data stored in the web storage server 9520.

An access token is generally valid only for a predetermined period of time after it is generated, and cannot be used after its validity is expired. An access token having an expired validity needs to be renewed, and at this time, the access token may be automatically renewed or a valid access token may be newly issued. If the access token stored in the cloud printing server 9510 is capable of being automatically renewed, the cloud printing server 9510 may renew the access token when the validity of the access token expires. However, if a new valid access token needs to be issued, the cloud printing server 9510 requests the second mobile terminal 9550 for the new valid access token when the validity of the access token expires. The second mobile terminal 9550 transmits the user account to the web storage server 9502, receives the new valid access token from the web storage server 9502, and transmits the new valid access token to the cloud printing server 9510.

Figure 98:
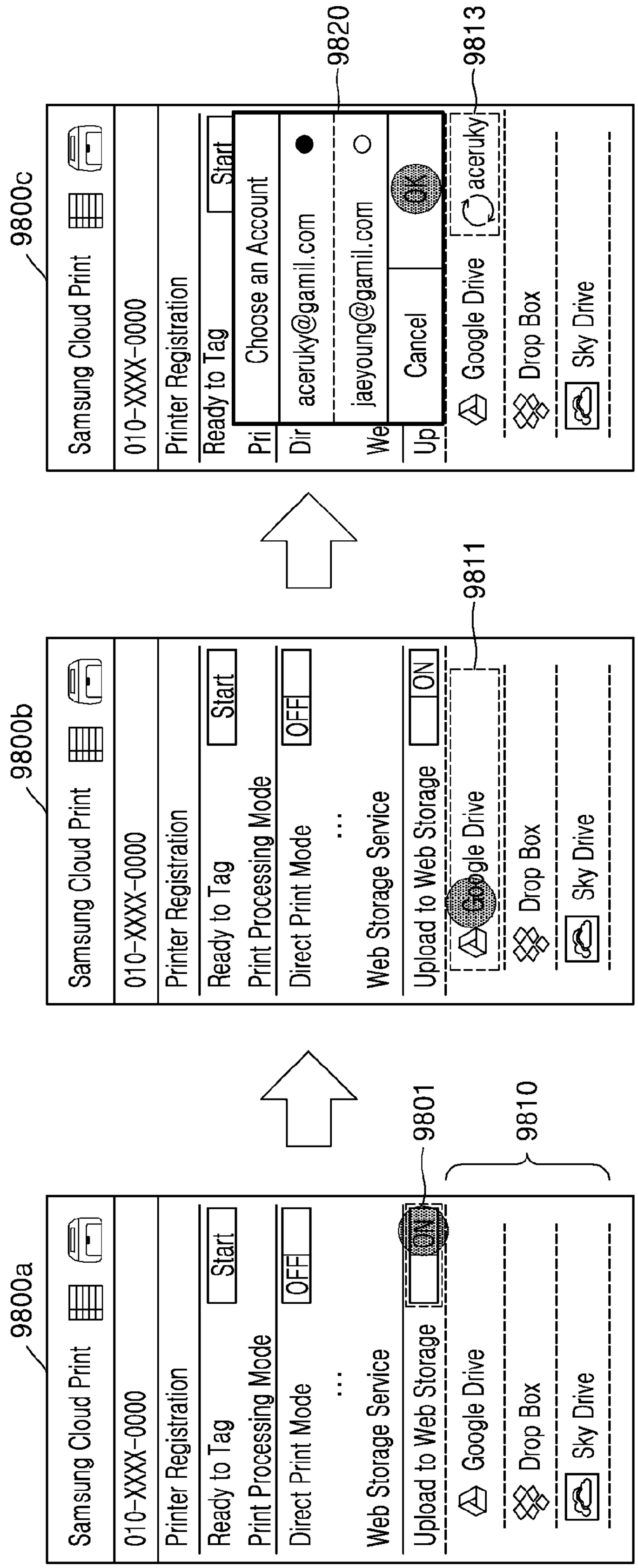
FIG. 98 is a diagram of UI screens shown on a mobile application when a cloud printing service is set to be interlocked with a web storage service during a method of providing the cloud printing service, according to an embodiment.

FIG. 98 is a diagram of UI screens shown on a mobile application when a cloud printing service is set to be interlocked with a web storage service during the method of providing the cloud printing service, according to an embodiment. Referring to FIG. 98, a user may select a region 9801 on a first UI screen 9800*a* to turn on a web storage interlocking function. When the web storage interlocking function is turned on, a list 9810 of selectable web storage services is displayed at the bottom of the first UI screen 9800*a*. In FIG. 98, Google Drive, Dropbox, and Sky Drive are displayed as the selectable web storage services.

In a second UI screen 9800*b*, when the user selects Google Drive 9811, the mobile application obtains a user account for the Google Drive 9811, which is stored in a mobile terminal. The mobile application may obtain the user account through an account administrator installed in the mobile terminal.

When only one user account is stored in the mobile terminal for the Google Drive 9811, the user account is immediately transmitted to the web storage server. However, when a plurality of user accounts are stored in the mobile terminal for the Google Drive 9811, a screen for selecting a user account is displayed as shown in a third UI screen 9800*c*. The plurality of user accounts for Google Drive are displayed on a user account selecting window 9820. A user touches a user account (aceruky@ gmail.com) to be used from the user account selecting window 9820, and touches an "OK" button.

As such, when the web storage service and the user account are selected, an icon indicating the interlocking is displayed in a region 9813 besides an item of Google Drive.

Figure 99:
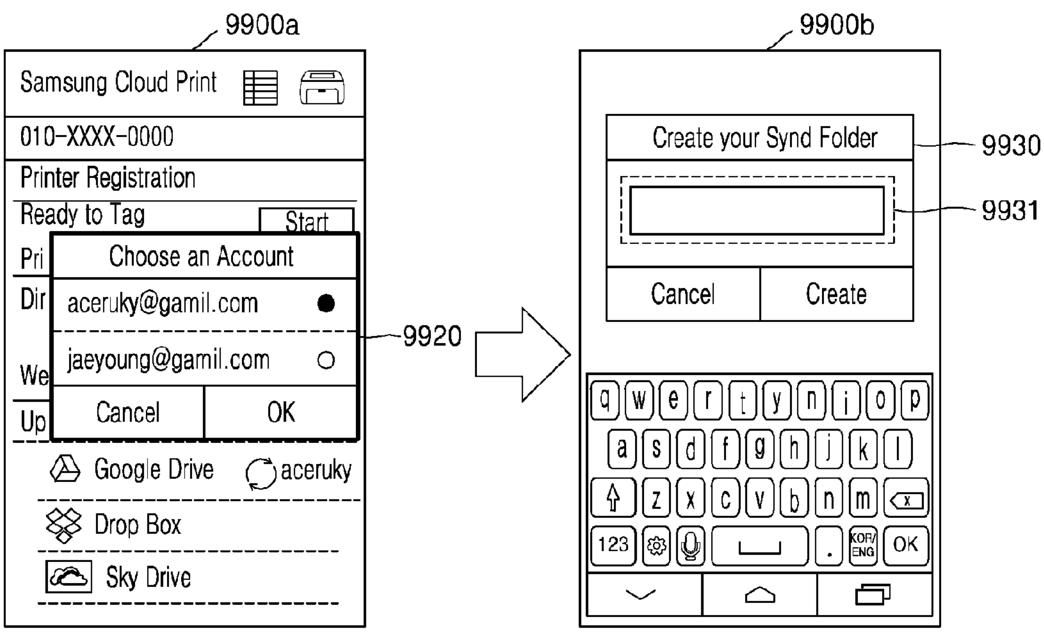
FIG. 99 is a diagram of UI screens displayed during a process of creating a synchronization folder when a cloud printing service is set to be interlocked with a web storage service during a method of providing a cloud printing service, according to an embodiment.

FIG. 99 is a diagram of UI screens displayed during a process of creating a synchronization folder when a cloud printing service is set to be interlocked with a web storage service during the method of providing a cloud printing service, according to an embodiment. A first UI screen 9900*a* of FIG. 99 is a UI screen for selecting a user account after a web storage service is selected. In other words, the first UI screen 9900*a* is the same screen as the third UI screen 9800*c* of FIG. 98. When a user touches an "OK" button after selecting a desired user account (aceruky@gmail.com) from the first UI screen 9900*a*, a UI screen for creating a synchronization folder is displayed as shown in a second UI screen 9900*b*.

When the user inputs a name of the synchronization folder to an input box 9931 of a synchronization folder creating window 9930, the synchronization folder having the input name is created in a web storage server. Data stored in the web storage server through a cloud printing server is stored in the synchronization folder, and changes of the data in the synchronization folder made by a direct access to the web storage server are transmitted to and updated in the cloud printing server.

A new synchronization folder may be created while interlocking the cloud printing service with the web storage service, or one of folders pre-stored in the web storage server may be selected as a synchronization folder.

Figure 100:
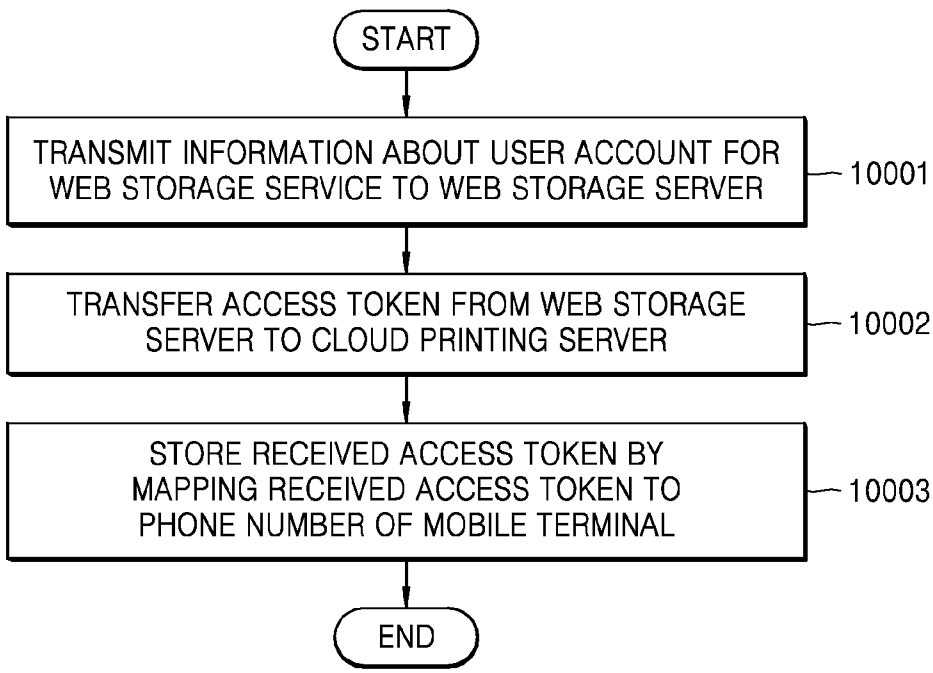
FIGS. 100 and 101 are flowcharts for describing processes of interlocking a cloud printing service with a web storage service during a method of providing a cloud printing service, according to embodiments.
Figure 101:
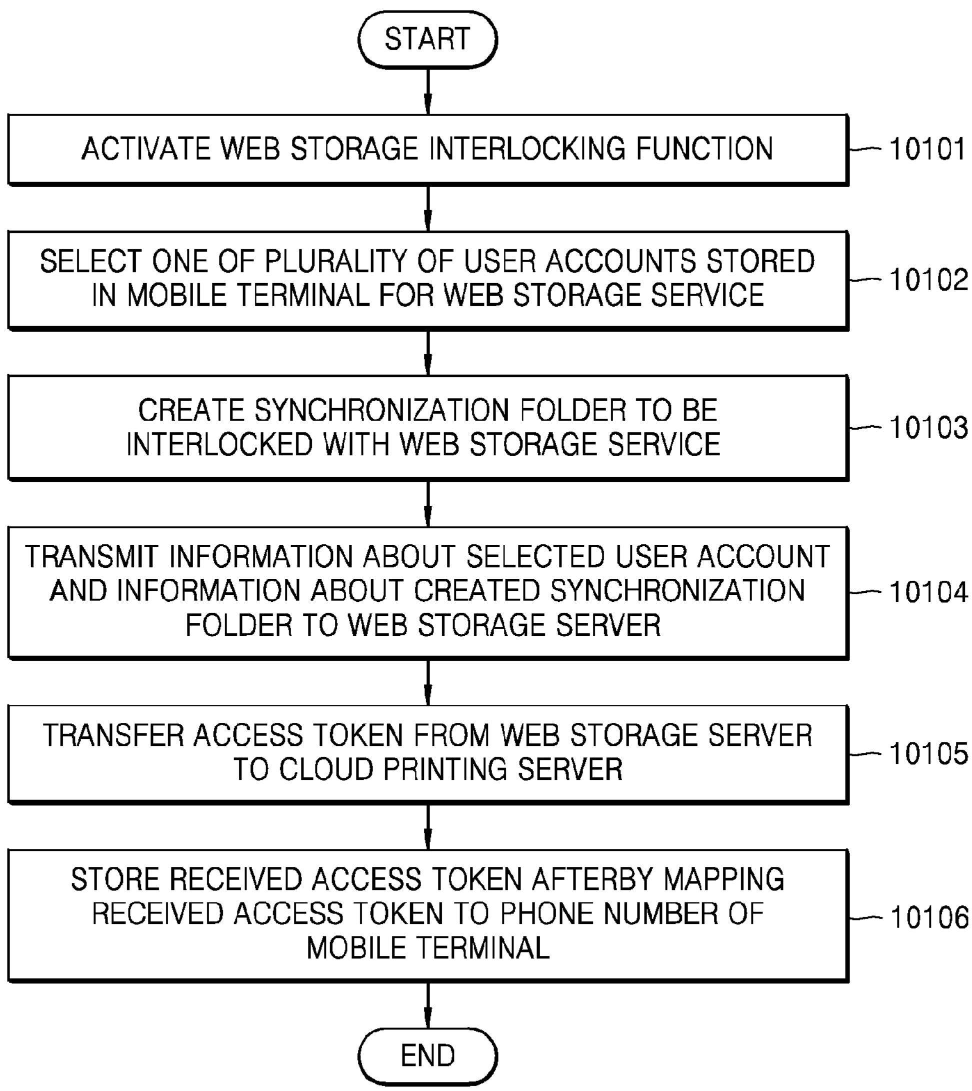

FIGS. 100 and 101 are flowcharts for describing processes of interlocking a cloud printing service with a web storage service during a method of providing a cloud printing service, according to one or more embodiments.

Referring to FIG. 100, in operation 10001, a mobile terminal transmits information about a user account for a web storage service to a web storage server. Then, in operation 10002, the mobile terminal transfers an access token from the web storage server to a cloud printing server. Next, in operation 10003, the cloud printing server stores the received access token after mapping the access token to a phone number of the mobile terminal.

Referring to FIG. 101, in operation 10101, a mobile application of the cloud printing service installed in the mobile terminal activates a web storage interlocking function. In operation 10102, one of a plurality of user accounts for the web storage service, which are stored in the mobile terminal, is selected. When a synchronization folder to be interlocked with the web storage service is created in operation 10103, the mobile terminal transmits information about the created synchronization folder and information about the selected user account to the web storage server in operation 10104. In other words, when a name of the synchronization folder to be creased is input through the mobile application in operation 10103, the name of the synchronization folder is transmitted to the web storage server in operation 10104. Then, the web storage server creates the synchronization folder under the received name.

In operation 10105, the mobile terminal transfers an access token from the web storage server to the cloud printing server, and in operation 10106, the cloud printing server stores the received access token after mapping the received access token to the phone number of the mobile terminal.

Figure 102:
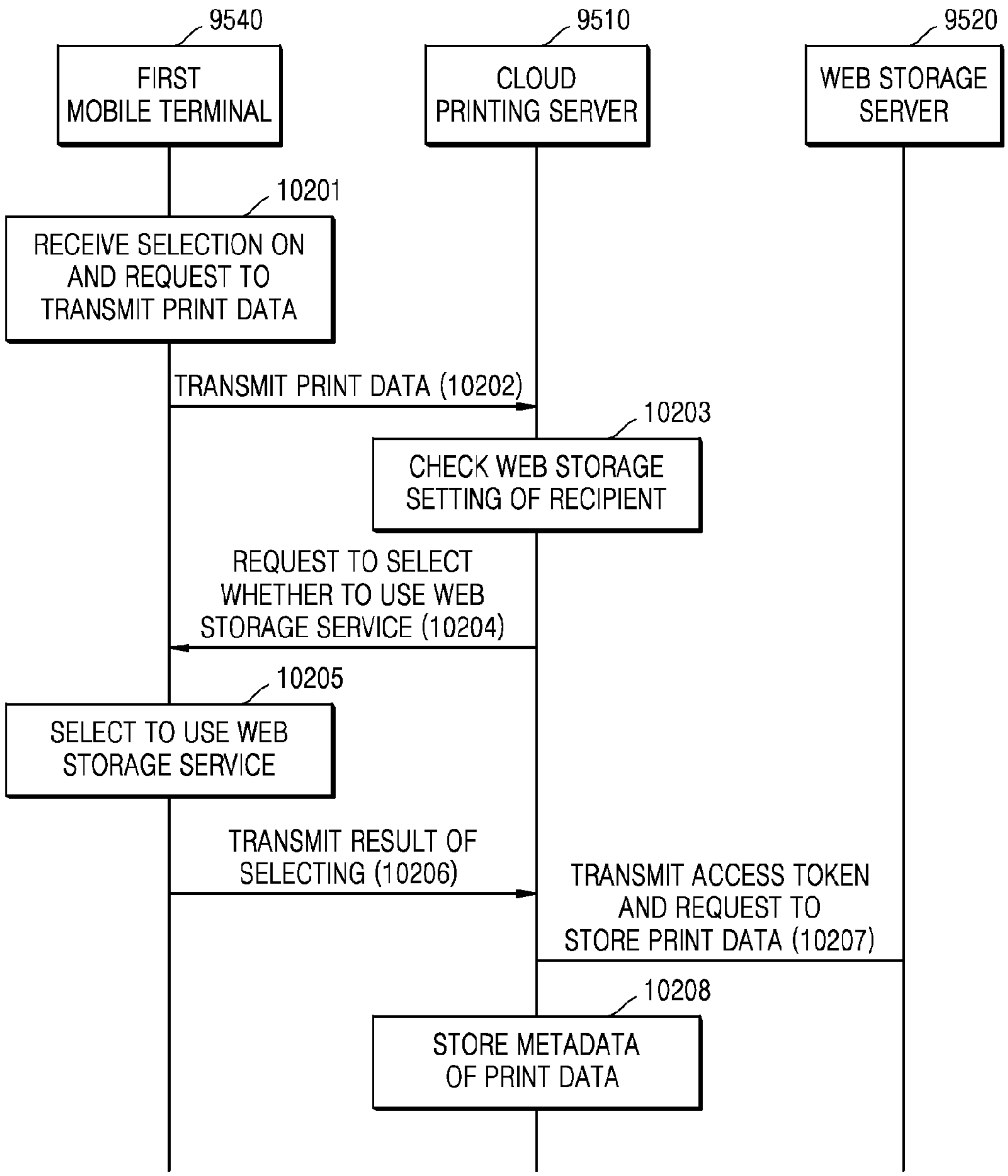
FIG. 102 is a diagram illustrating in detail a process of transmitting print data during a method of providing a cloud printing service, according to an embodiment.
Figure 103:
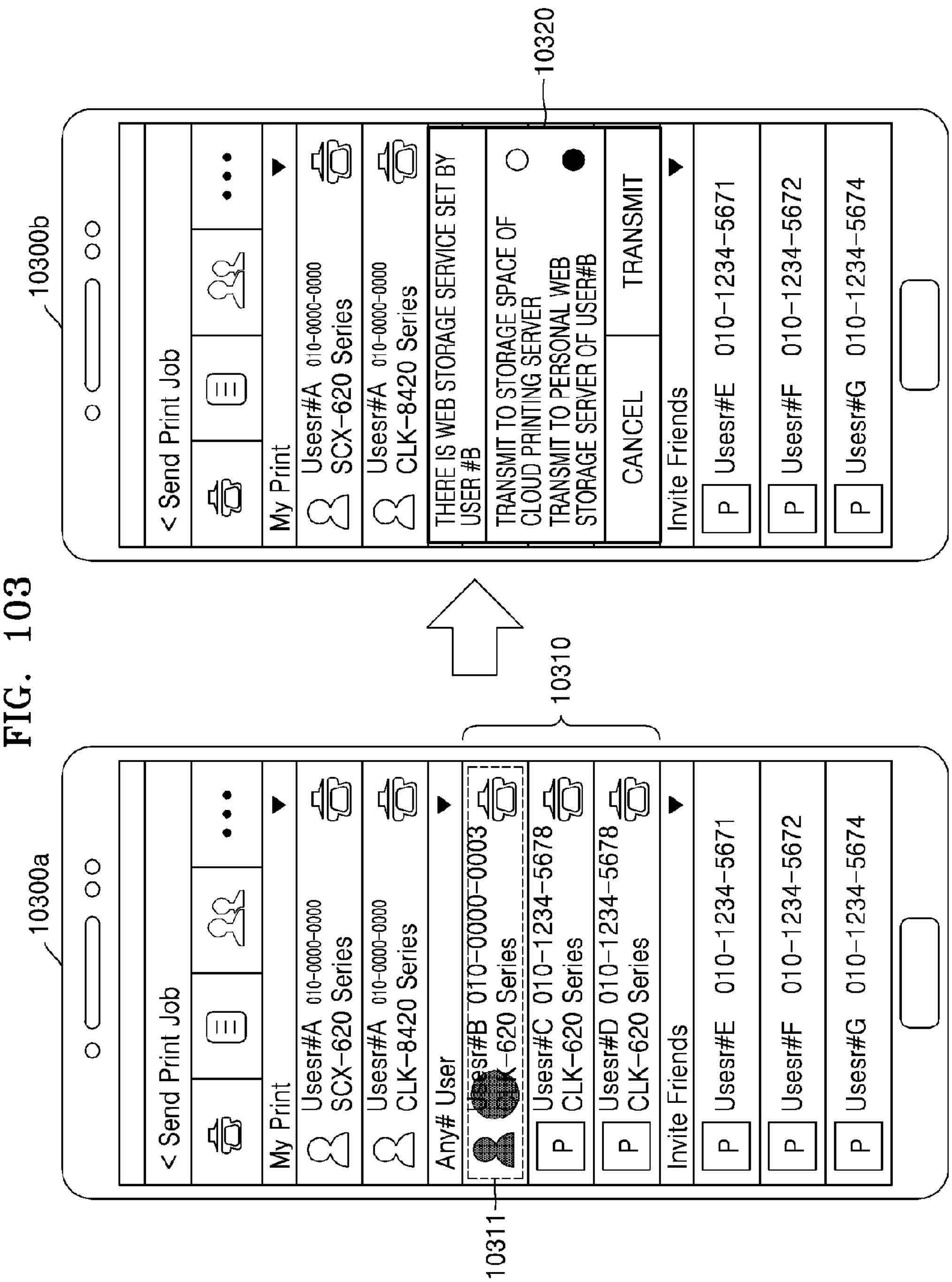
FIG. 103 is a diagram of UI screens shown on a mobile application when print data is transmitted during a method of providing a cloud printing service, according to an embodiment.
Figure 104:
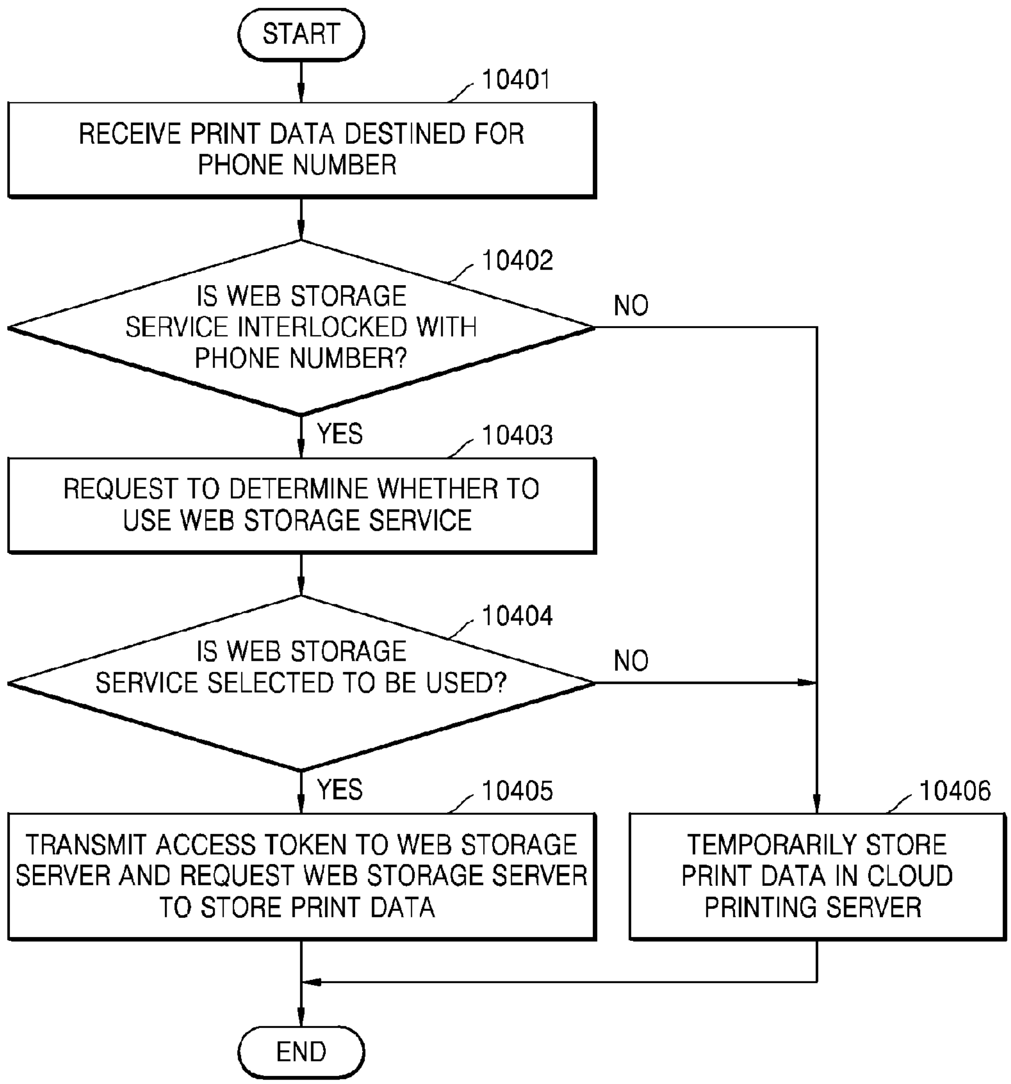
FIG. 104 is a flowchart for describing a process of transmitting print data during a method of providing a cloud printing service, according to an embodiment.

FIGS. 102 through 104 are diagrams illustrating in detail a process of transmitting print data during the method of providing a cloud printing service, according to an embodiment. In other words, FIGS. 102 through 104 are diagrams corresponding to operations 9602 through 9603 of FIG. 96.

FIG. 102 is a diagram illustrating in detail a process of transmitting print data during a method of providing a cloud printing service, according to an embodiment. Referring to FIG. 12, in operation 10201, the first mobile terminal 9540 receives a selection on and a request to transmit print data. In other words, a user selects one piece of print data stored in the first mobile terminal 9540, and requests the first mobile terminal 9540 to transmit the print data destined for a phone number subscribed to the cloud printing service. Upon receiving the request, the first mobile terminal 9540 transmits the print data to the cloud printing server 9510 in operation 10202.

The cloud printing server 9510 checks a web storage setting of a recipient in operation 10203. In other words, the cloud printing server 9510 determines whether there is a web storage service interlocked with the phone number assigned to be a destination of the print data. The cloud printing server 9510 maps and stores an access token corresponding to the web storage service interlocked with the phone number. Accordingly, the cloud printing server 9510 is able to determine whether the web storage service is interlocked with the phone number.

In operation 10203, when it is determined that the web storage service is interlocked with the phone number, i.e., the recipient, the first mobile terminal 9540 is requested to select whether to use the web storage service in operation 10204. In other words, a sender may select whether to store the transmitted print data in the web storage server 9520. Based on the sender's selection, the print data may be stored in the web storage server 9520 or may be temporarily stored only in the cloud printing server 9510.

When the sender selects to use the web storage service in operation 10205, the first mobile terminal 9540 transmits a result of the selecting to the cloud printing server 9510 in operation 10206. Upon receiving the result, the cloud printing server 9510 transmits an access token pre-stored correspondingly to the phone number and requests the web storage server 9520 to store the print data.

When the print data is stored in the web storage server 9520, the cloud printing server 9510 stores metadata of the print data in operation 10208. In detail, the cloud printing server 9510 may store a job ID of the print data, the web storage service where the print data is stored, and an URL of a storage path of the print data as the metadata of the print data.

FIG. 103 is a diagram of UI screens shown on a mobile application when print data is transmitted during a method of providing a cloud printing service, according to an embodiment.

Referring to FIG. 103, a user may select a recipient to which print data is to be transmitted from a list 10310 of other users subscribed to a cloud printing service, in a first UI screen 10300*a*. In FIG. 103, a "USER#B" is selected as the recipient.

When there is a web storage service interlocked with the "USER#B" that is selected as the recipient, a storage space selecting window 10320 is displayed as shown in a second UI screen 10300*b*. A message indicating that there is the web storage service interlocked with the "USER#B" is displayed on the storage space selecting window 10320, and a menu for selecting whether to store print data in a personal web storage server of the "USER#B" or only in a cloud printing server is displayed.

When the user selects to store the print data in the personal web storage server of the "USER#B" from the storage space selecting window 10320, and touches a "Transmit" button, the print data is stored in the personal web storage server through the cloud printing server according to processes described above.

FIG. 104 is a flowchart for describing a process of transmitting print data during a method of providing a cloud printing service, according to an embodiment. Referring to FIG. 104, in operation 10401, a cloud printing server receives print data destined for a predetermined phone number. In operation 10402, the cloud printing server determines whether a web storage service is interlocked with the predetermined phone number.

When it is determined that the web storage service is interlocked with the predetermined phone number in operation 10402, a sender is requested to determine whether to use the web storage service in operation 10403. It is determined whether the web storage service is selected to be used in operation 10404, and operation 10405 is performed if the web storage service is selected to be used. In operation 10405, the cloud printing server transmits an access token to a web storage server and requests the web storage server to store print data.

When it is determined that the web storage service is not interlocked with the predetermined phone number in operation 10402 or the web storage service is not selected to be used in operation 10404, operation 10406 is performed to temporarily store the print data in the cloud printing server.

Figure 105:
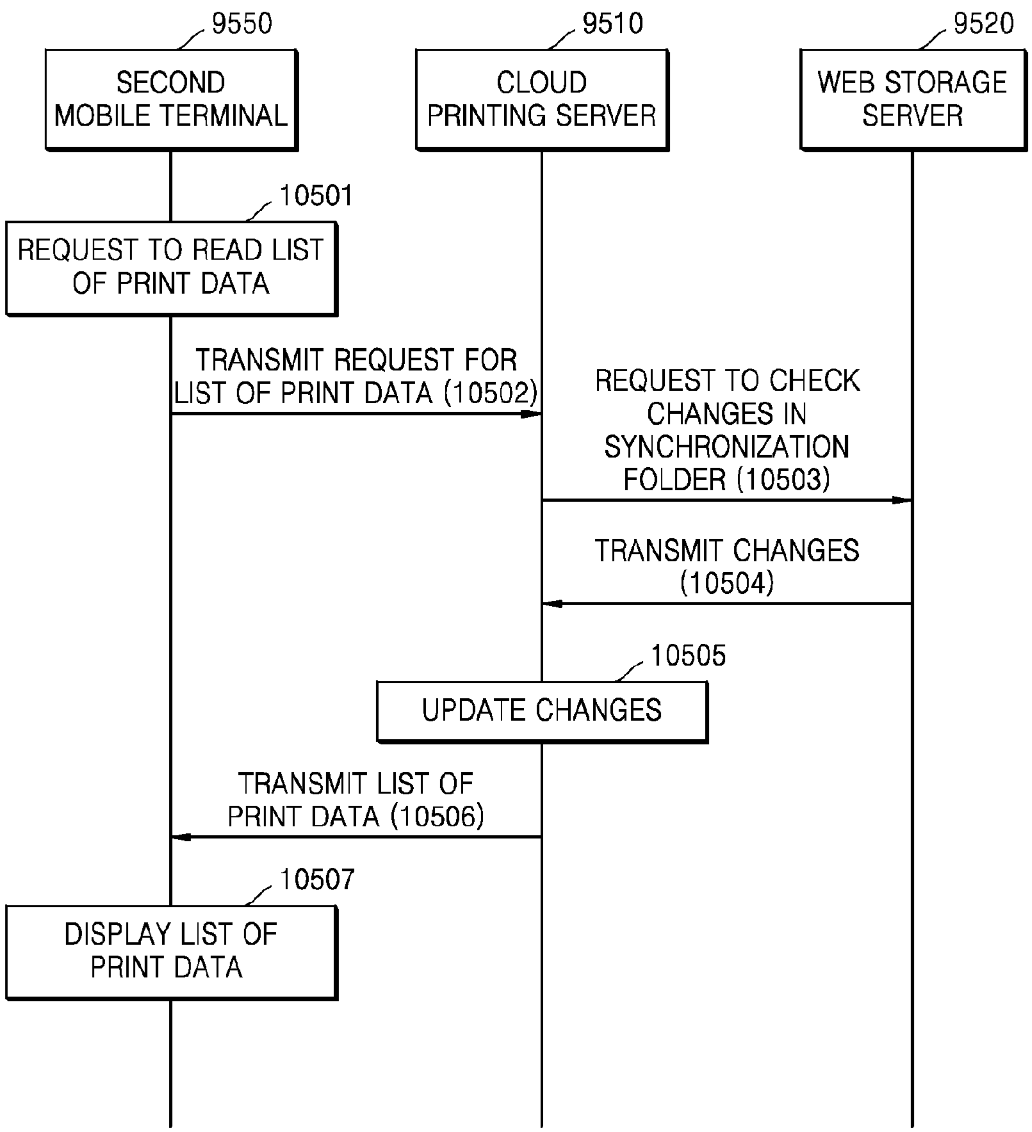
FIGS. 105 and 106 are diagrams illustrating in detail processes of reading a list of print data during a method of providing a cloud printing service, according to embodiments.
Figure 106:
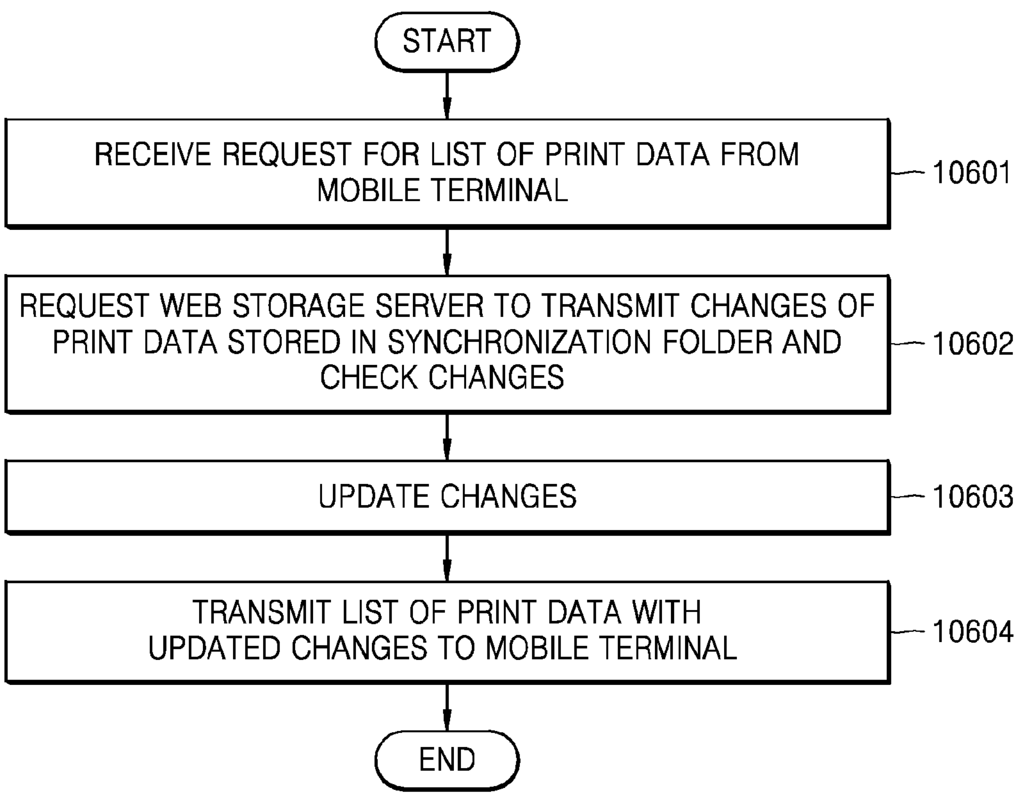

FIGS. 105 and 106 are diagrams illustrating in detail processes of reading a list of print data during a method of providing a cloud printing service, according to one or more embodiments.

Referring to FIG. 105, when a user requests to read a list of print data by using the second mobile terminal 9550 in operation 10501, the second mobile terminal 9550 transmits a request for the list of print data to the cloud printing server 9510 in operation 10502. Upon receiving the request, the cloud printing server 9510 requests the web storage server 9520 to check changes in a synchronization folder in operation 10503. When the web storage server 9520 transmits the changes to the cloud printing server 9510 in operation 10504, the cloud printing server 9510 updates the changes in operation 10505.

When the cloud printing server 9510 transmits the list of print data with the updated changes to the second mobile terminal 9550 in operation 10506, the second mobile terminal 9550 displays the list of print data with the updated changes in operation 10507.

Referring to FIG. 106, upon receiving a request for a list of print data from a mobile terminal in operation 10601, a cloud printing server requests a web storage server to transmit changes of the print data stored in a synchronization folder and checks the changes in operation 10602. The cloud printing server updates the changes of the list of print data in operation 10603, and transmits the list of print data with the updated changes to the mobile terminal in operation 10604.

Figure 107:
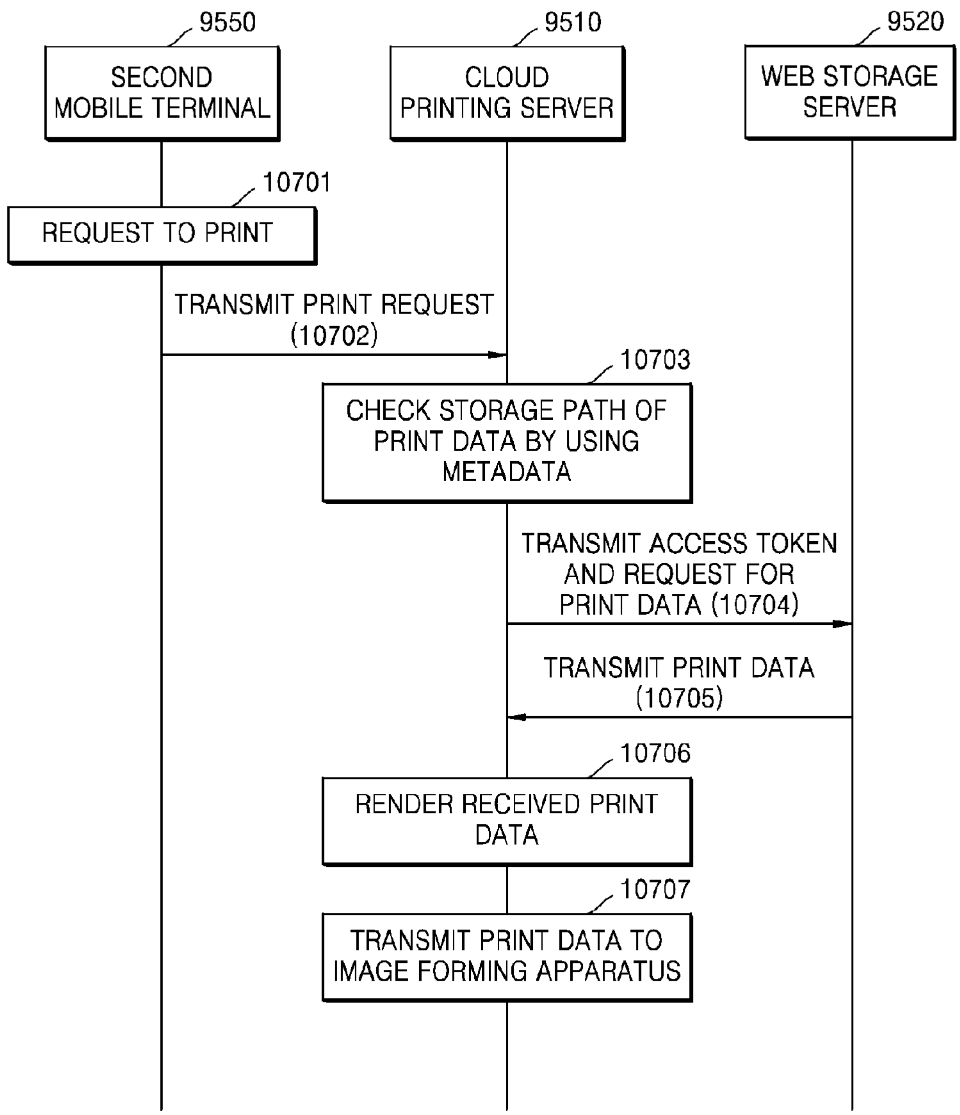
FIGS. 107 and 108 are diagrams illustrating in detail processes of printing print data stored in a web storage server during a method of providing a cloud printing service, according to embodiments.
Figure 108:
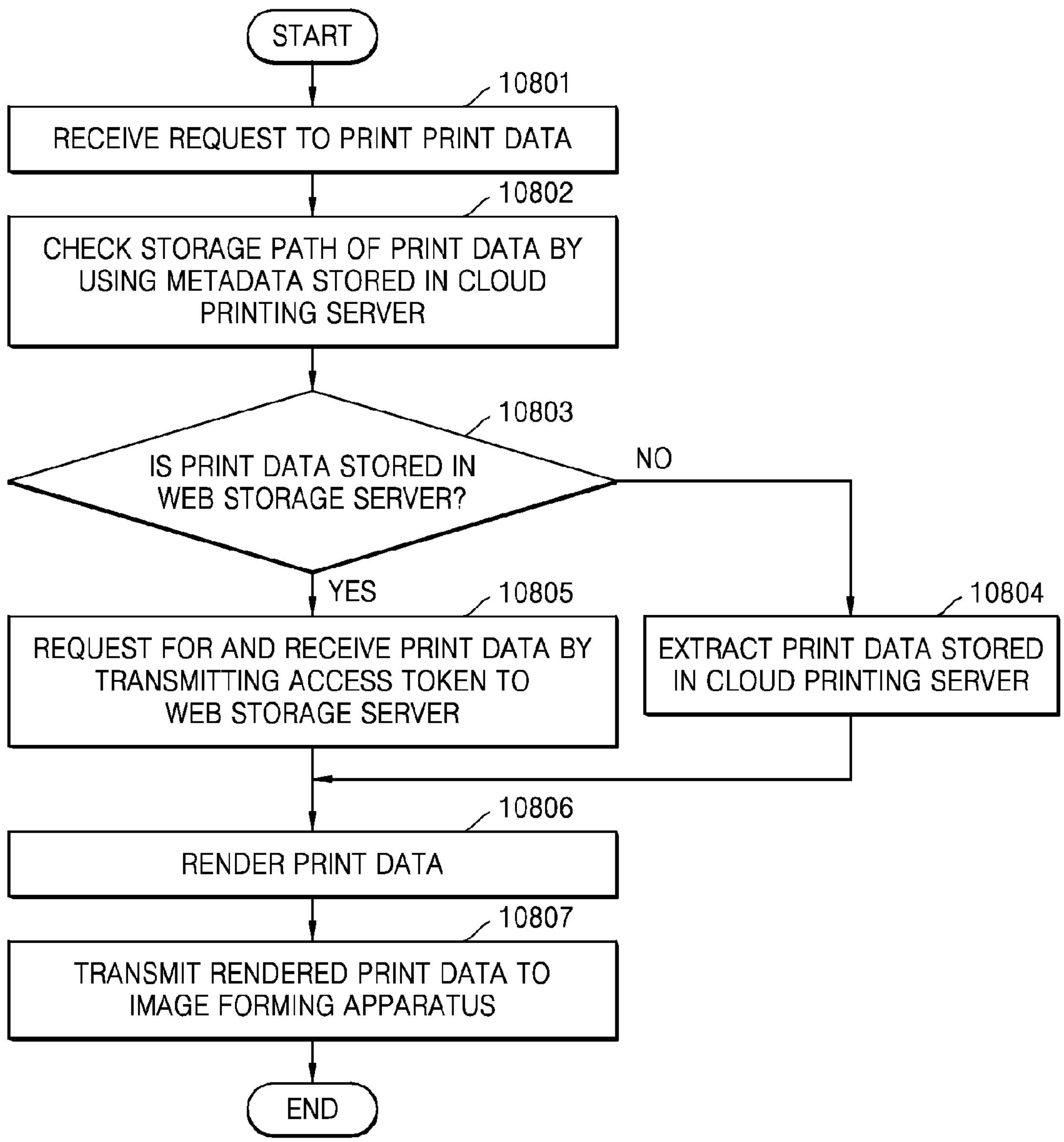

FIGS. 107 and 108 are diagrams illustrating in detail processes of printing print data stored in a web storage server during a method of providing a cloud printing service, according to one or more embodiments.

Referring to FIG. 107, when a user requests to print print data stored in the web storage server 9520 by using the second mobile terminal 9550 in operation 10701, the second mobile terminal 9550 transmits a print request to the cloud printing server 9510 in operation 10702.

In operation 10703, the cloud printing server 9510 checks a storage path of the print data by using pre-stored metadata of the print data. When it is determined that the print data is stored in the web storage server 9520, the cloud printing server 9510 transmits a pre-stored access token to the web storage server 9520 and requests the web storage server 9520 for the print data in operation 10704. Then, the web storage server 9520 transmits the print data to the cloud printing server 9510 in operation 10705.

Upon receiving the print data from the web storage server 9520, the cloud printing server 9510 renders the print data in operation 10706, and transmits the rendered print data to an image forming apparatus in operation 10707.

Referring to FIG. 108, when a cloud printing server receives a request to print print data in operation 10801, the cloud printing server checks a storage path of the print data by using pre-stored metadata in operation 10802. In operation 10803, it is determined whether the print data is stored in a web storage server based on the checked storage path.

When it is determined that the print data is stored in the web storage server, operation 10805 is performed to request for and receive the print data by transmitting an access token to the web storage server. When it is determined that the print data is not stored in the web storage server but is temporarily stored in the cloud printing server, operation 10804 is performed to extract the print data stored in the cloud printing server.

Then, the cloud printing server renders the print data in operation 10806, and transmits the rendered print data to an image forming apparatus in operation 10807.

Figure 109A:
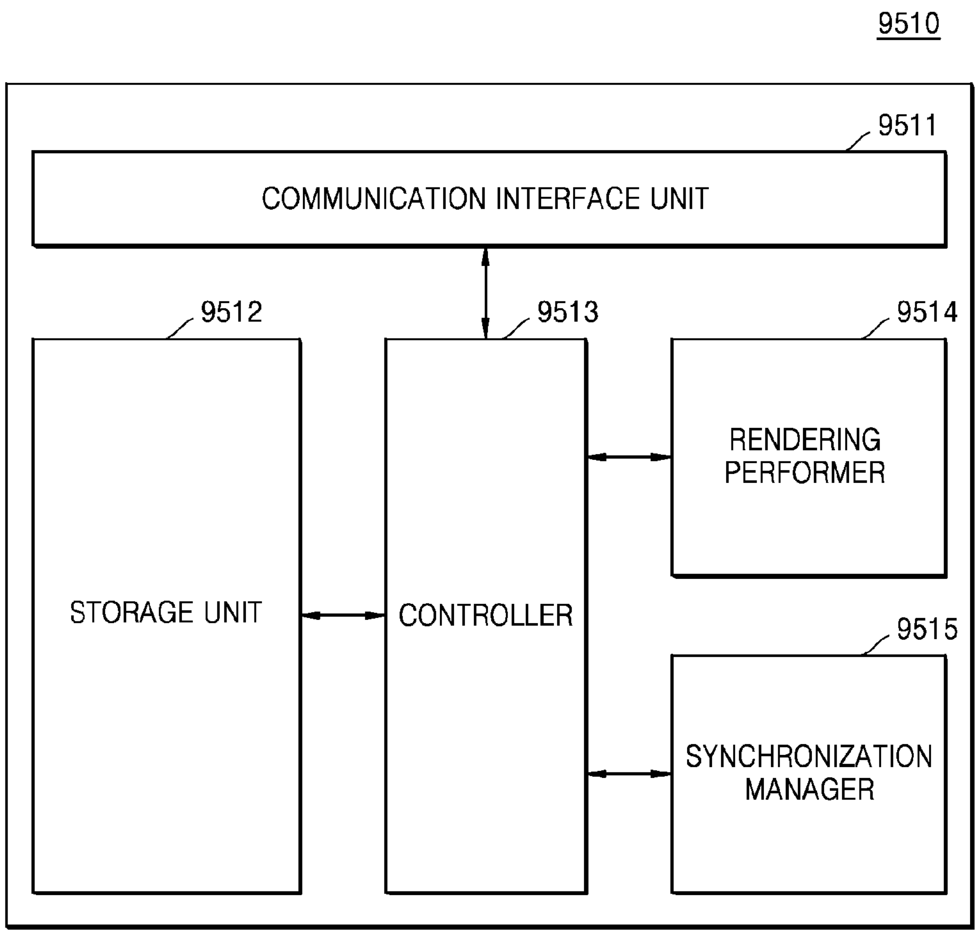
FIGS. 109A and 109B are block diagrams illustrating in detail a cloud printing server according to embodiments.
Figure 109B:
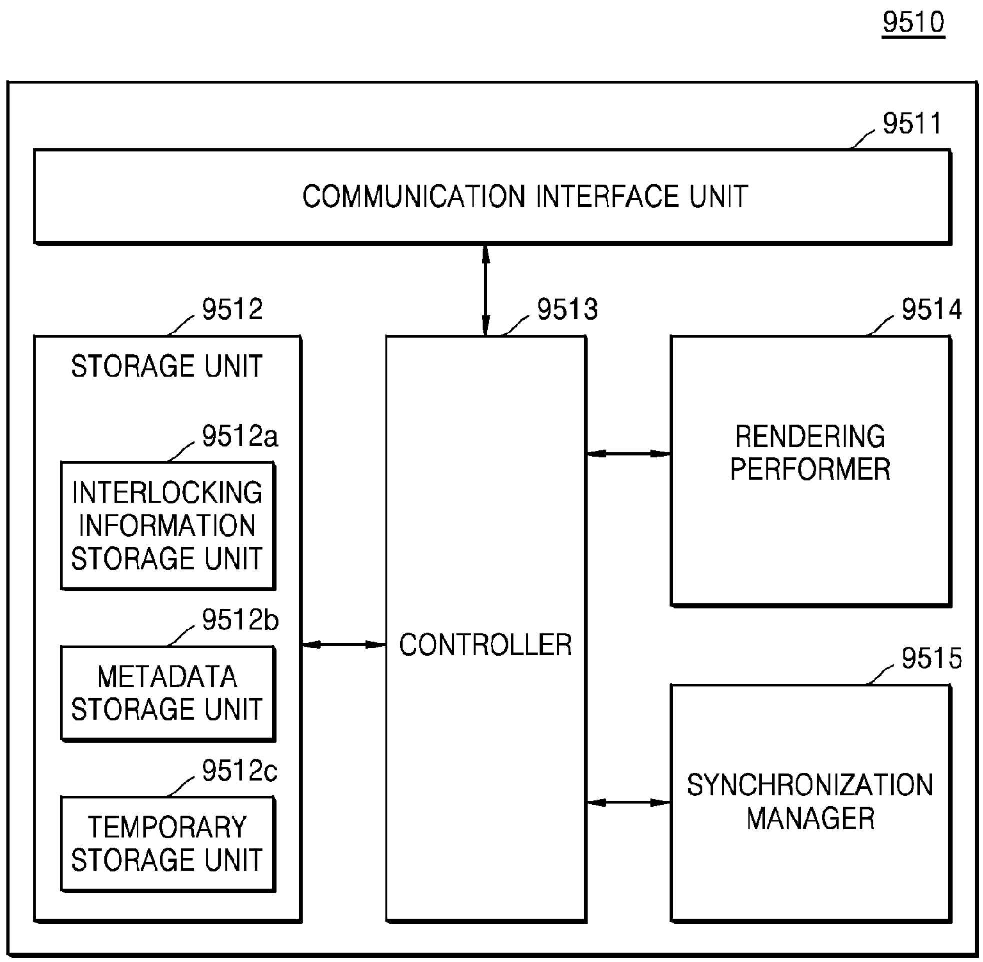

FIGS. 109A and 109B are block diagrams illustrating in detail the cloud printing server 9510 according to one or more embodiments. Referring to FIG. 109*a*, the cloud printing server 9510 according to an embodiment may include a communication interface unit (communication interface) 9511, a storage unit 9512, a controller 9513, a rendering performer 9514, and a synchronization manager 9515. Any two of the controller 9513, the rendering performer 9514, and the synchronization manager 9515 may be realized by one processor.

FIG. 109*b* is a diagram illustrating in detail the storage unit 9512 of FIG. 109*a*. Referring to FIG. 109*b*, the storage unit 9512 may include an interlocking information storage unit 9512*a*, a metadata storage unit 9512*b*, and a temporary storage unit 9512*c*. Details about each component will now be described.

The communication interface unit (communication interface) 9511 is used to communicate with an external mobile terminal or a web storage server, and may be a network module capable of wired and wireless communication.

The storage unit (storage) 9512 may be realized in any one of various types of storage medium. In detail, the interlocking information storage unit 9512*a* may store interlocking information required for interlocking with a web storage service. In detail, the interlocking information storage unit 9512*a* may store an access token for accessing an interlocked web storage service and an interlocked web storage server after mapping the access token to a phone number subscribed to a cloud printing service.

The metadata storage unit 9512*b* may store metadata about print data stored in the web storage server. In detail, the metadata storage unit 9512*b* may store a job ID, the web storage service, and a URL of a storage path after mapping them to print data stored in the web storage server.

The temporary storage unit 9512*c* temporarily stores print data for providing the cloud printing service only for a predetermined period of time.

The controller 9513 controls operations of other components. In detail, when print data destined for a phone number interlocked with the web storage service is received, the controller 9513 provides the cloud printing service for the print data, and stores the print data in the web storage server by using the interlocking information stored in the storage unit 9512.

The rendering performer 9512 renders the print data.

The synchronization manager 9515 manages synchronization of the print data stored in the web storage server.

Detailed operations of the cloud printing server 9510 of FIGS. 190*a* and 109*b* have been described above with reference to FIGS. 95 through 108.

According to an embodiment, even when a sender transmits a content to be printed together with a direct printing command, a recipient may print the content by using an image forming apparatus at a point of time the recipient wants to print the content.

Generally, when a sender transmits a content to be printed together with a direct printing command from a cloud printing service provided by a cloud server, the content is directly transmitted to an image forming apparatus to print the content. Thus, a recipient is unable to choose a point of time the recipient wants to print the content.

Accordingly, one or more embodiments provide a method of printing a content to be printed at a point of time a recipient wants to print the content even when a sender transmits the content together with a direct printing command. Such a method will now be described in detail with reference to FIGS. 110 through 125.

Figure 110:
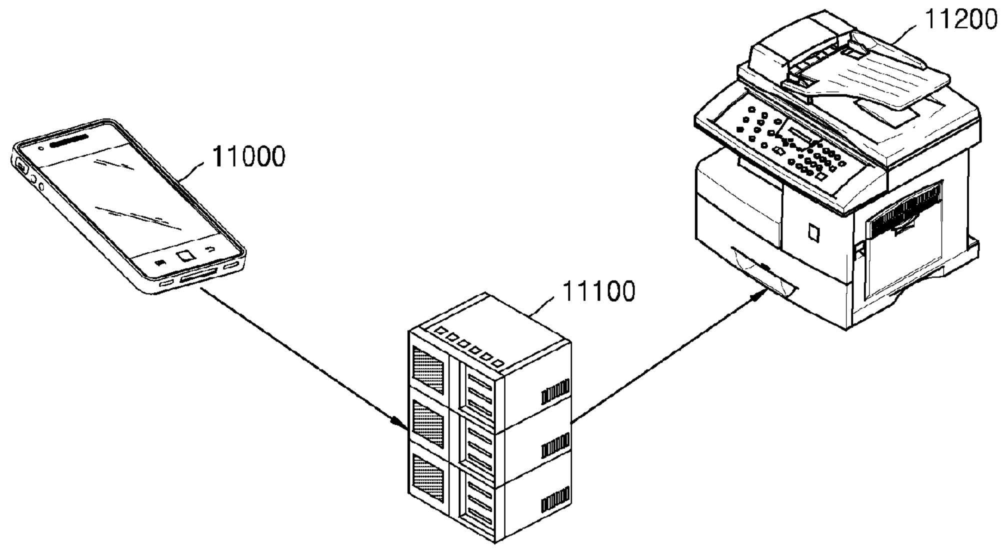
FIG. 110 is a diagram of an environment of a cloud printing system, according to an embodiment.

FIG. 110 is a diagram of an environment of a cloud printing system, according to an embodiment.

Referring to FIG. 110, a sender wants to immediately print a content to be printed in an image forming apparatus 11200 by transmitting the content.

The sender transmits a direct printing command and the content, which are destined for the image forming apparatus 11200, to a cloud server 11100 by using a user device 11000. A direct printing command is a command for transmitting a content to be printed to a destination through a cloud server to be immediately printed, without storing the content in the cloud server.

Upon receiving the direct printing command and the content, the cloud server 11100 analyzes the direct printing command and transmits the content to the image forming apparatus 11200. When the content is received, the image forming apparatus 11200 prints the content. Since the content is immediately printed by the image forming apparatus 11200, a point of time when the content is to be printed is unable to be determined.

In detail, in a phone number-based cloud printing system, a sender transmits a content to be printed and a print command, which are destined for a phone number, to the cloud server 11100, and the cloud server 11100 checks the phone number and transmits the content to the image forming apparatus 11200 corresponding to the phone number. When a direct printing command is not transmitted with the content, the cloud server 11100 may store the content correspondingly to the phone number, a recipient may check and print the content after requesting for a preview of the content at a point of time the recipient wants to print the content by using a device that was mapped to correspond to the phone number in a mobile terminal having the phone number or in the cloud server 11100, and the cloud server 11100 may transmit the content to the image forming apparatus 11200 corresponding to the phone number such that the image forming apparatus 11200 prints the content.

On the other hand, when a direct printing command is transmitted together with the content, the cloud server 11100 immediately transmits the content to the image forming apparatus 11200 corresponding to the cloud server 11100, and thus a recipient is unable to print the content at a point of time the recipient wants to print the content.

Figure 111:
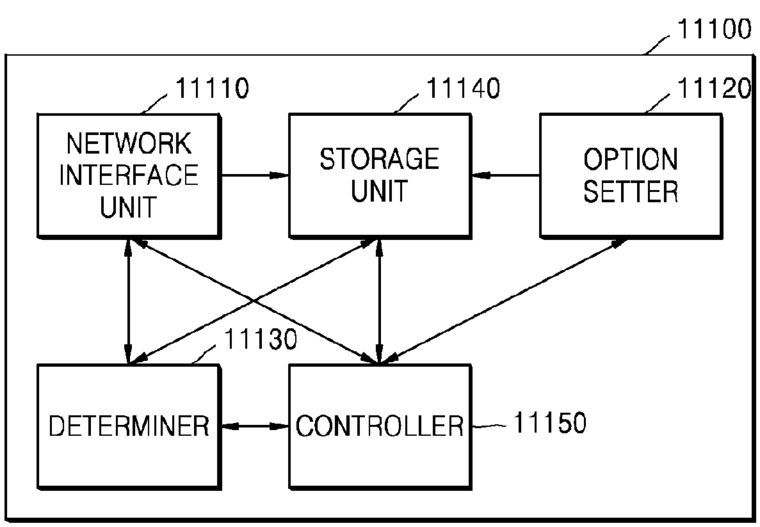
FIG. 111 is a block diagram of a cloud server according to an embodiment.

FIG. 111 is a block diagram of the cloud server 11100 according to an embodiment.

Referring to FIG. 111, the cloud server 11100 according to an embodiment receives print data and a direct printing command, which are destined for a predetermined phone number, determines whether direct printing is performable by checking options pre-set with respect to the predetermined phone number, and when the direct printing is performable, enables an image forming apparatus corresponding to the predetermined phone number to print the print data. On the other hand, when the direct printing is not performable, the print data is stored in the cloud server 11100 correspondingly to the predetermined phone number. Then, upon receiving a preview request of the stored print data, the cloud server 11100 transmits preview data of the stored print data to a user device, and upon receiving a print request of the preview data, the cloud server 11100 transmits the print data to the image forming apparatus corresponding to the predetermined phone number so that the image forming apparatus prints the print data.

Referring to FIG. 111, the cloud server 11100 includes a network interface unit (network interface) 11110, an option setter 11120, a determiner 11130, a storage unit 11140, and a controller 11150.

The network interface unit 11110 receives the print data and the direct printing command, which are destined for the predetermined phone number. Also, the network interface unit 11110 transmits the print data to the image forming apparatus corresponding to the predetermined phone number.

The option setter 11120 sets options for performing direct printing. In detail, the option setter 11120 may pre-set a time slot for direct printing with respect to the predetermined phone number or a sender allowing direct printing, as options.

The determiner 11130 determines whether the direct printing is performable by checking the options pre-set with respect to the predetermined phone number. The determiner 11130 may determine whether the direct printing is performable based on a time when the direct printing command is received. Alternatively, the determiner 11130 may determine whether the direct printing is performable based on a user who transmitted the direct printing.

The storage unit 11140 stores the predetermined phone number, the print data, and the options. The storage unit 240 may store the print data and the options to correspond to the predetermined phone number.

When it is determined that the direct printing is performable, the controller 11150 controls the image forming apparatus corresponding to the predetermined phone number to print the print data, and when it is determined that the direct printing is not performable, the controller 11150 controls the storage unit 11140 to store the print data in the cloud server 11100 correspondingly to the predetermined phone number. The controller 11150 controls the storage unit 11140 to store the options set by the option setter 11120. The set options may be stored correspondingly to the predetermined phone number.

The controller 11150 may control the network interface unit 11110 to receive the preview request of the print data from the user device, and upon receiving the preview request, to transmit the preview data of the print data to the user device. The controller 11150 may control the network interface unit 11110 to receive the print request of the preview data. The controller 11150 may control the image forming apparatus corresponding to the predetermined phone number to print the print data according to the print request of the preview data.

Figure 112:
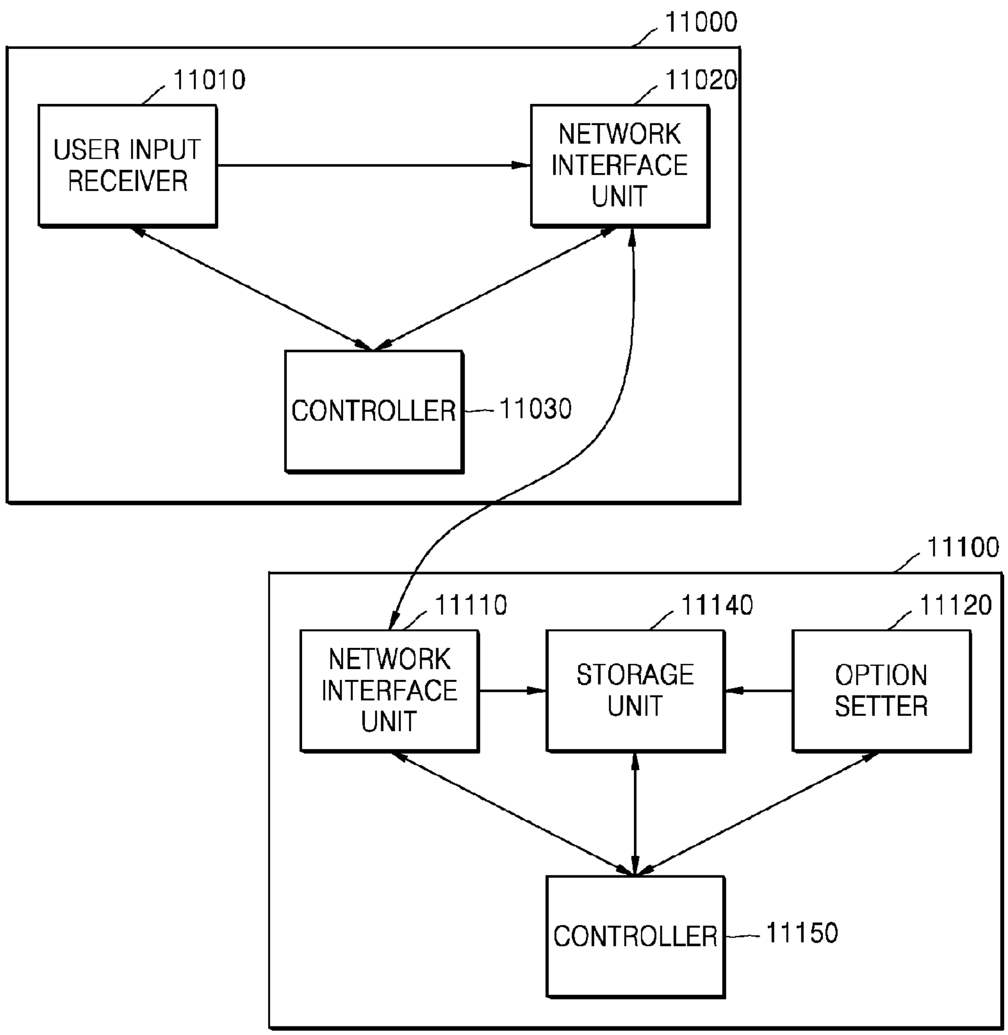
FIG. 112 is a block diagram of a cloud printing system according to an embodiment.

FIG. 112 is a block diagram of a cloud printing system according to an embodiment.

The cloud printing system according to an embodiment receives options for performing direct printing from the user device 11000, and transmits the option to the cloud server 11100 such that the cloud server 11100 sets the options. Upon receiving the options for performing direct printing, the cloud server 11100 sets and stores the options.

Referring to FIG. 112, the user device 11000 includes a user input receiver 11010, a network interface unit 11020, and a controller 11030.

The user input receiver 11010 receives a user input. For example, the user device 11000 may be a mobile terminal, and may receive various touch inputs through a touch panel of the mobile terminal. In detail, the user input receiver 11010 may receive the options for performing direct printing.

The network interface unit 11020 may transmit the options to the cloud server 11100 so that the cloud server 11100 sets the options. Also, the network interface unit 11020 may receive the options set by the cloud server 11100, from the cloud server 11100. A user may check the options set in the cloud server 11100 through a display unit (not shown), and change the set options. The display unit may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not so limited thereto and may include other types of displays.

The controller 11030 may control the user input receiver 11010 to receive the options for performing direct printing, and control the network interface unit (network interface) 11020 to transmit the options to the cloud server 11100. The controller 11030 may control the network interface unit 11020 to receive the options from the cloud server 11100. When the cloud server 11100 is requested to transmit the set options, the controller 11030 may receive the set options in response.

Referring to FIG. 112, the cloud server 11100 includes the network interface unit 11110, the option setter 11120, the storage unit (storage) 11140, and the controller 11150.

The network interface unit 11110 receives the options. The network interface unit (network interface) 11110 may transmit the options set by the option setter 11120 to the user device 11000.

The option setter 11120 sets the options received from the network interface unit 11110.

The storage unit 11140 stores the options. The options may be stored to correspond to the predetermined phone number. The predetermined phone number may be a phone number of the user device 11000 that is the mobile terminal.

The controller 11150 may control the network interface unit 11110 to receive the options from the user device 11000. The controller 11150 may control the option setter 11120 to set the options, and control the storage unit (storage) 11140 to store the received options. The controller 11150 may control the network interface unit 11110 to transmit the options set by the option setter 11120 to the user device 11000. The controller 11150 may control the network interface unit 11110 to receive a request for the options from the user device 11000 and transmit the options to the user device 11000 in response.

Figure 113A:
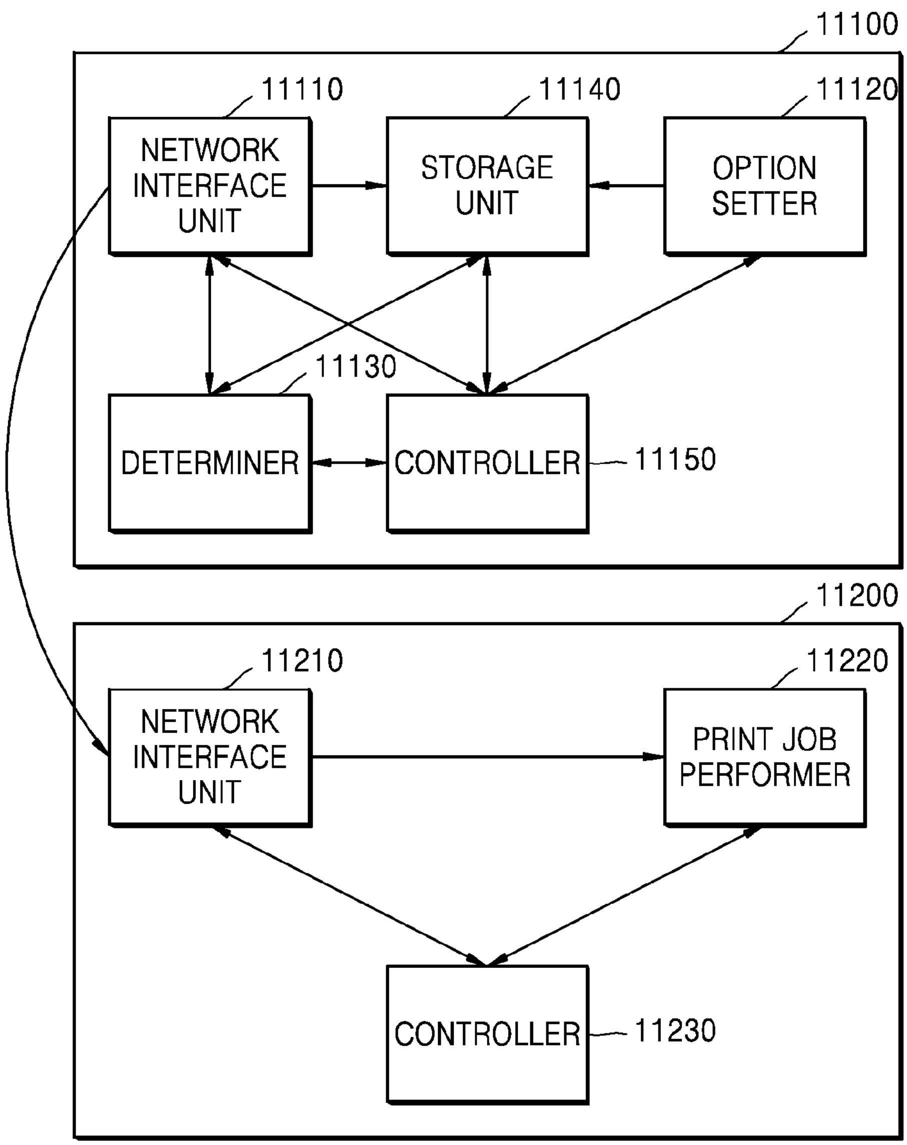
FIG. 113A is a block diagram of a cloud printing system according to an embodiment.

FIG. 113A is a block diagram of a cloud printing system according to an embodiment.

Referring to FIG. 113A, the cloud server 11100 receives print data and a direct printing command, which are destined for a predetermined phone number, determines whether direct printing is performable by checking options pre-set with respect to the predetermined phone number, and when it is determined that the direct printing is performable, transmits the print data to the image forming apparatus 11200 corresponding to the predetermined phone number. The image forming apparatus 11200 may receive the print data and print the received print data.

When it is determined that the direct printing is not performable, the cloud server 11100 stores the print data in a server correspondingly to the predetermined phone number. Then, when a print request of the print data is received, the cloud server 11100 transmits the print data to the image forming apparatus 11200 corresponding to the predetermined phone number. The image forming apparatus 11200 may receive and print the print data.

Since the cloud server 11100 of FIG. 113A performs functions of the cloud server 11100 of FIG. 111, details thereof are not repeated here.

The image forming apparatus 11200 includes a network interface unit (network interface) 11210, a print operation performer 11220, and a controller 11230.

The network interface unit 11210 receives the print data. The print operation performer 11220 performs a print operation on the print data. The controller 11230 may control the network interface unit 11210 to receive the print data from the cloud server 11100 and control the print operation performer 11220 to print the received print data.

Figure 113B:
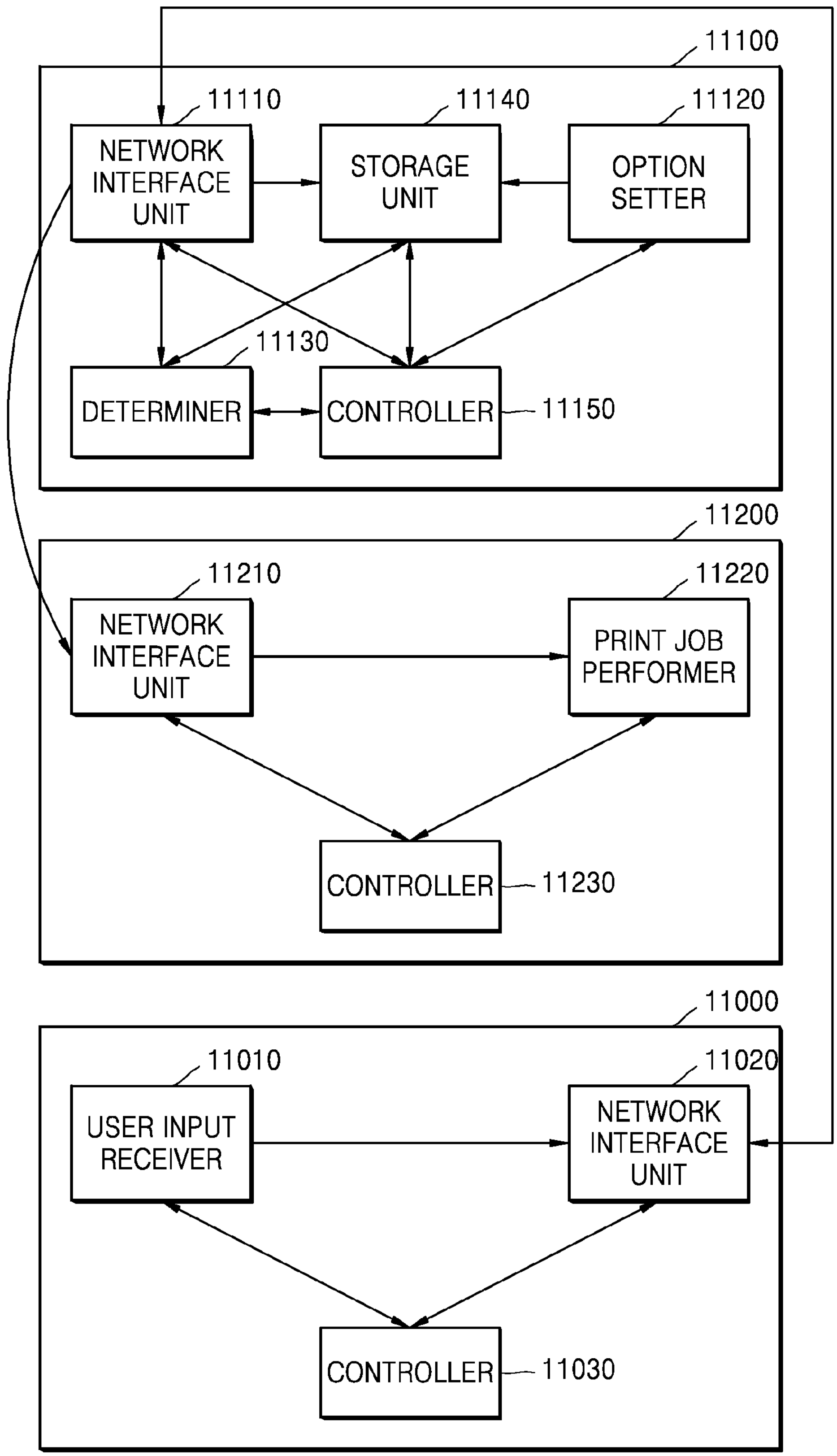
FIG. 113B is a block diagram of a cloud printing system according to an embodiment.

FIG. 113B is a block diagram of a cloud printing system according to an embodiment.

Referring to FIG. 113B, since the cloud server 11100 and the image forming apparatus 11200 of FIG. 113B performs functions of the cloud server 11100 and the image forming apparatus 11200 of FIG. 113A, details thereof are not repeated here.

Referring to FIG. 113B, the cloud printing system includes the user device 11000. The user device 11000 includes the user input receiver 11010, the network interface unit (network interface) 11020, and the controller 11030.

The network interface unit 11020 transmits a preview request of print data stored in the cloud server 11100. Also, the network interface unit 11020 receives preview data regarding the preview request. The preview data is data for a user to preview a content included in the print data. The preview data only include a part of the print data.

The user device 11000 may include a display unit (not shown), and the display unit may display the content included in the preview data. The user may check the content included in the preview data through the display unit. The display unit (display) may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not so limited thereto and may include other types of displays.

The user input receiver 11010 receives various user inputs from the user. The user input receiver 11010 may receive a print request of the preview data. In other words, the user may check the content included in the preview data through the display unit, and request the image forming apparatus 11200 to print the content included in the print data.

The controller 11030 may control the user input receiver 11010 to receive the preview request and control the network interface unit 11020 to transmit the preview request to the cloud server 11100.

Upon receiving the preview request from the user device 11000, the controller 11150 of the cloud server 11100 controls the network interface unit (network interface) 11110 of the cloud server 11100 to transmit the preview data of the print data to the user device 11000.

Upon receiving the print request of the preview data from the user input receiver 11010, the controller 11030 of the user device 11000 may control the network interface unit 11020 of the user device 11000 to transmit the print request to the cloud server 11100.

Upon receiving the print request from the user device 11000, the controller 11150 of the cloud server 11100 may control the network interface unit 11110 to transmit the print data to the image forming apparatus 11200.

Figure 114:
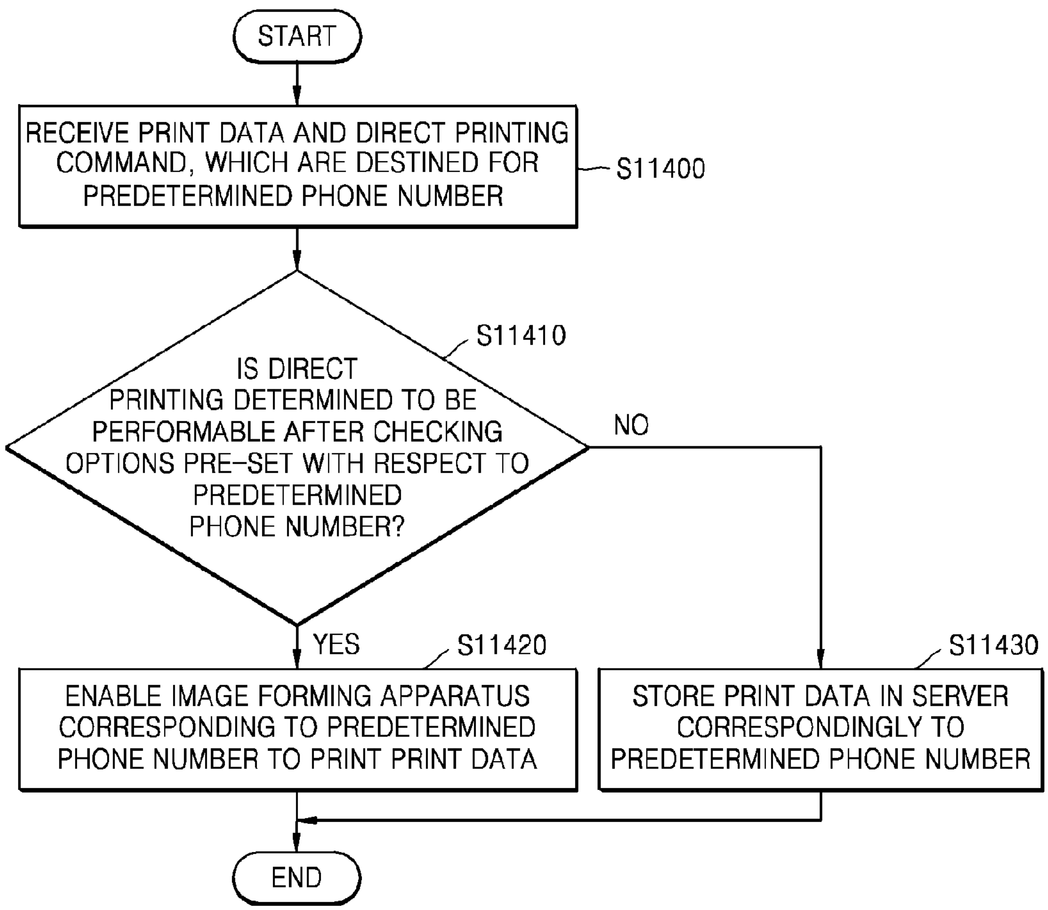

FIG. 114 is a flowchart illustrating a method of providing a cloud printing service, according to an embodiment.

Referring to FIG. 114, in operation S11400, the cloud server 11100 receives print data and a direct printing command, which are destined for a predetermined phone number.

In operation S11410, the cloud server 11100 determines whether direct printing is performable by checking options pre-set with respect to the predetermined phone number.

When it is determined that the direct printing is performable, the cloud server 11100 may enable the image forming apparatus 11200 corresponding to the predetermined phone number to print the print data in operation S11420. In detail, the cloud server 11100 may transmit the print data to the image forming apparatus 11200 so that the image forming apparatus 11200 prints the print data.

When it is determined that the direct printing is not performable, the cloud server 11100 stores the print data in the cloud server 11100 to correspond to the predetermined phone number in operation S11430.

Figure 115:
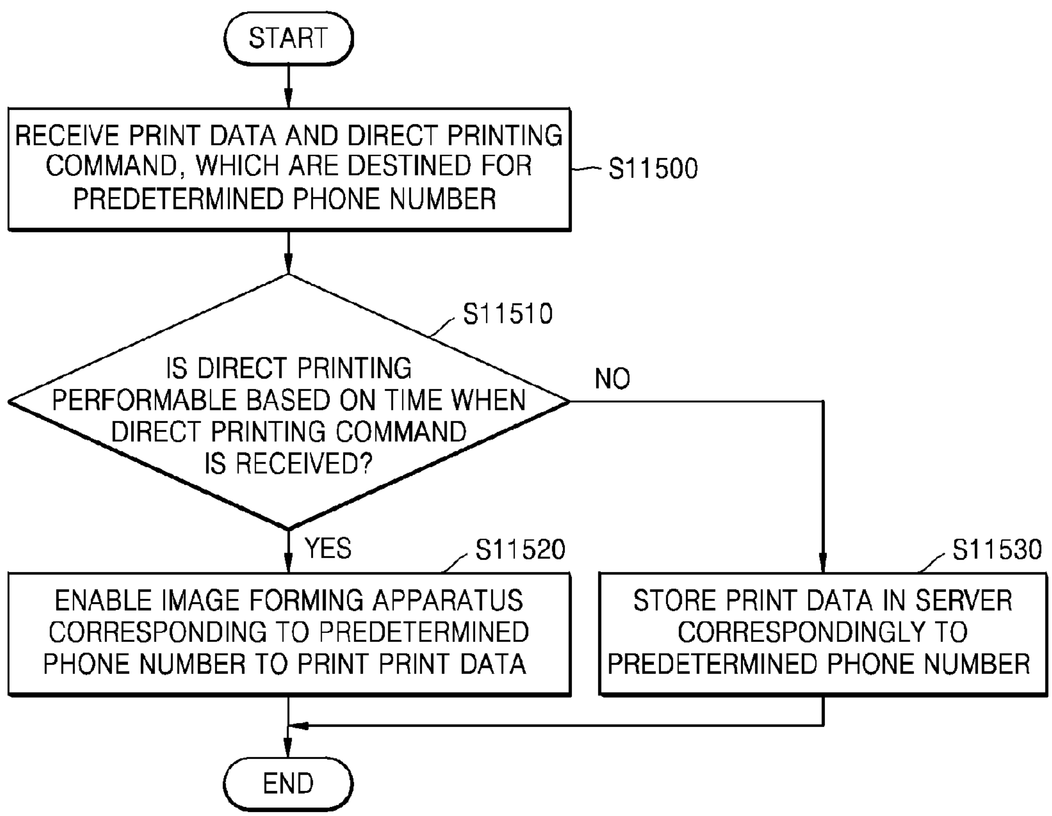

FIG. 115 is a flowchart illustrating a method of providing a cloud printing service, according to an embodiment.

In operation S11500, the cloud server 11100 receives print data and a direct printing command, which are destined for a predetermined phone number.

In operation S11510, the cloud server 11100 determines whether direct printing is performable based on a time when the direct printing command is received. In detail, the cloud server 11100 may pre-set a time slot when the direct printing is performable as an option, and determine whether the direct printing is performable by checking whether the time when the direct printing command is received is included in the time slot.

When it is determined that the direct printing is performable, the cloud server 11100 enables the image forming apparatus 11200 corresponding to the predetermined phone number to print the print data in operation S11520. In detail, the cloud server 11100 transmits the print data to the image forming apparatus 11200 so that the image forming apparatus 11200 prints the print data.

When it is determined that the direct printing is not performable, the cloud server 11100 stores the print data in the cloud server 11100 correspondingly to the predetermined phone number.

Figure 116:
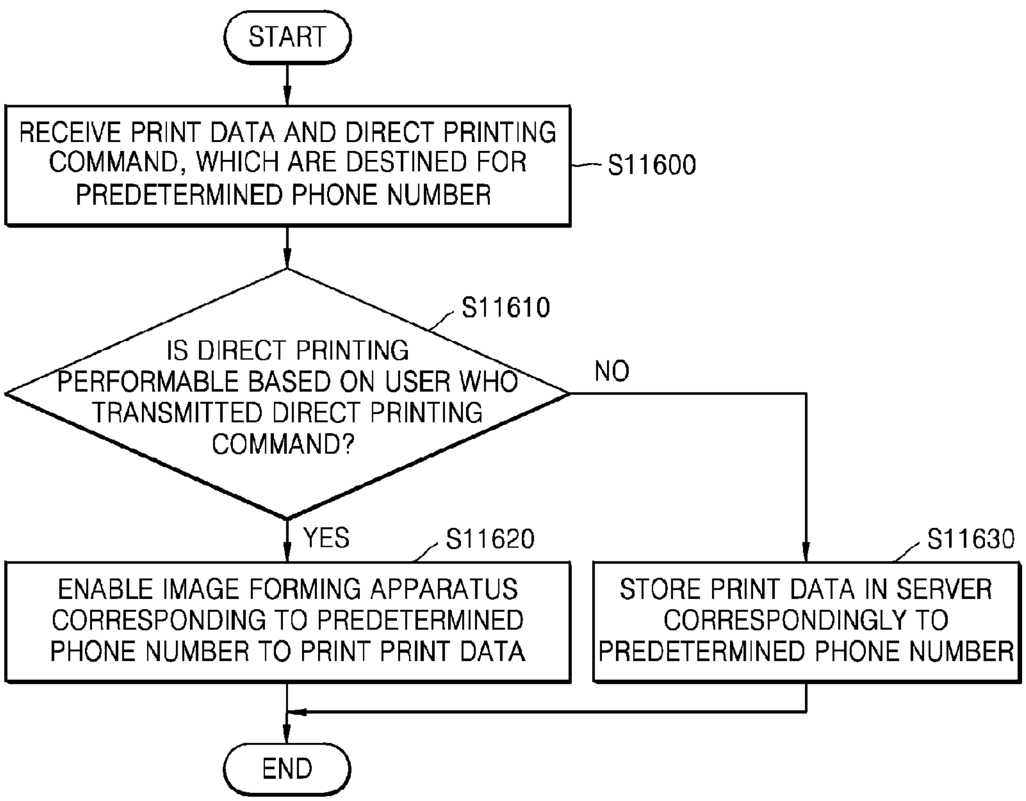

FIG. 116 is a flowchart illustrating a method of providing a cloud printing service, according to an embodiment.

In operation S11600, the cloud server 11100 receives print data and a direct printing command, which are destined for a predetermined phone number.

In operation S11610, the cloud server 11100 determines whether direct printing is performable based on a user who transmitted the direct printing command. In detail, the cloud server 11100 may pre-set a sender who is allowed to perform direct printing as an option, and determine whether the direct printing is performable by checking the sender and the user who transmits the direct printing command.

When it is determined that the direct printing is performable, the cloud server 11100 enables the image forming apparatus 11200 corresponding to the predetermined phone number to print the print data in operation S11620. In detail, the cloud server 11100 may transmit the print data to the image forming apparatus 11200 so that the image forming apparatus 11200 prints the print data.

When it is determined that the direct printing is not performable, the cloud server 11100 stores the print data in the cloud server 11100 correspondingly to the predetermined phone number in operation S11630.

Figure 117:
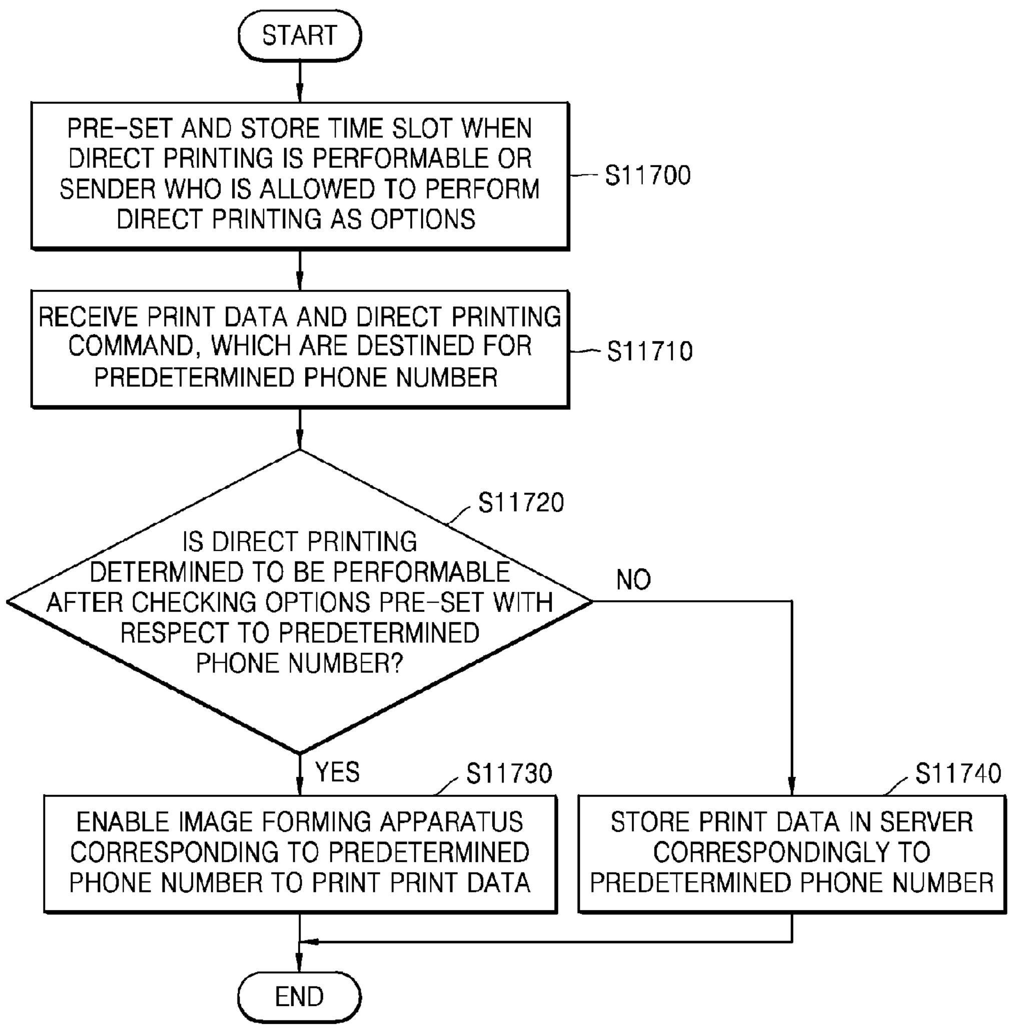

FIG. 117 is a flowchart illustrating a method of providing a cloud printing service, according to an embodiment.

In operation S11700, the cloud server 11100 pre-sets and stores a time slot when direct printing is performable or a sender who is allowed to perform direct printing as options.

In operation S11710, the cloud server 11100 receives print data and a direct printing command, which are destined for a predetermined phone number.

In operation S11720, the cloud server 11100 determines whether the direct printing is performable by checking options pre-set with respect to the predetermined phone number.

When it is determined that the direct printing is performable, the cloud server 11100 enables the image forming apparatus 11200 corresponding to the predetermined phone number to print the print data in operation S11730. In detail, the cloud server 11100 may transmit the print data to the image forming apparatus 11200 so that the image forming apparatus 11200 prints the print data.

When it is determined that the direct printing is not performable, the cloud server 11100 stores the print data in the cloud server 11100 correspondingly to the predetermined phone number in operation S11740.

Figure 118:
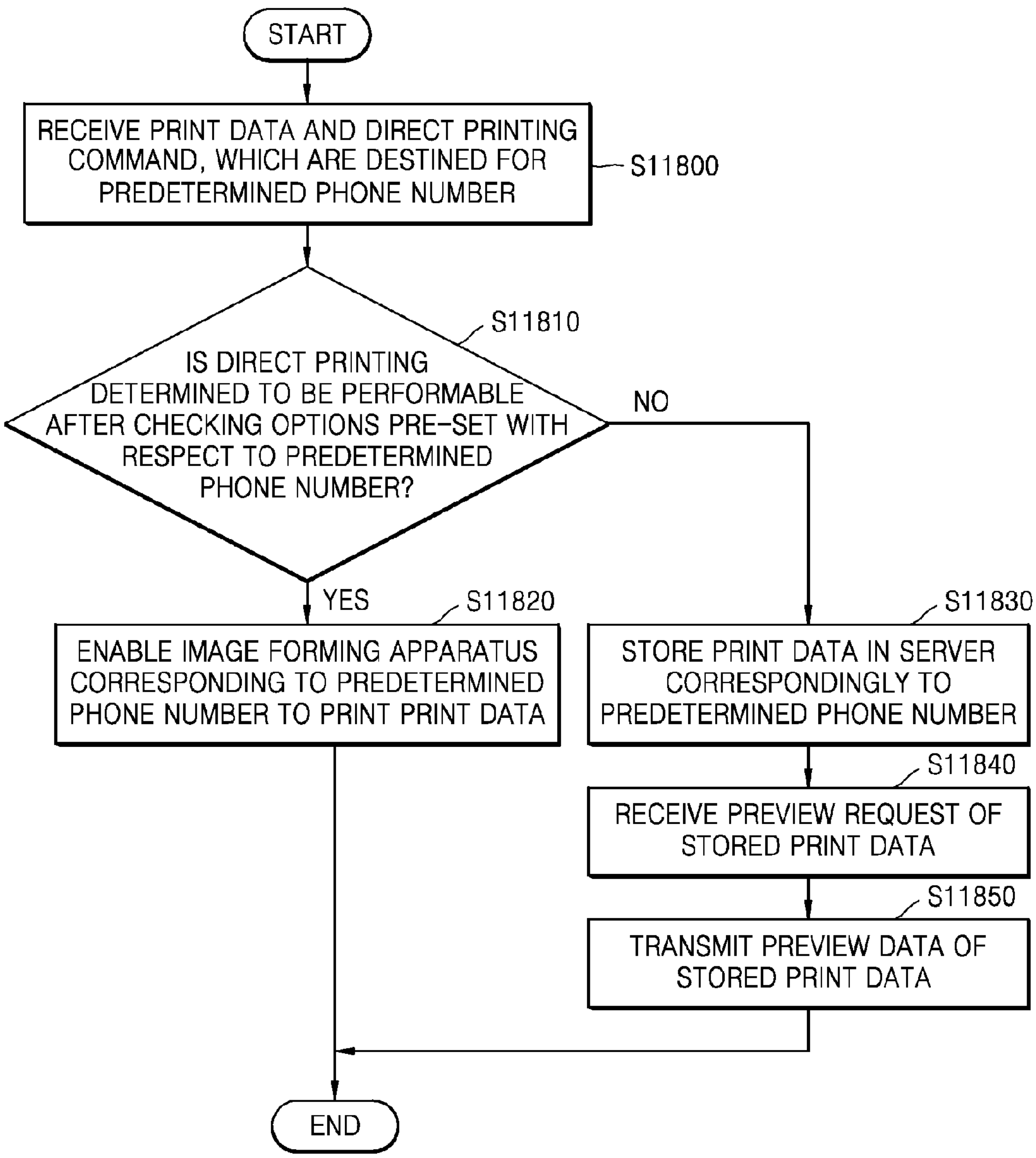

FIG. 118 is a flowchart illustrating a method of providing a cloud printing service, according to an embodiment.

In operation S11800, the cloud server 11100 receives print data and a direct printing command, which are destined for a predetermined phone number.

In operation S11810, the cloud server 11100 determines whether direct printing is performable by checking options pre-set with respect to the predetermined phone number.

When it is determined that the direct printing is performable, the cloud server 11100 enables the image forming apparatus 11200 corresponding to the predetermined phone number to print the print data in operation S11820. In detail, the cloud server 1110 may transmit the print data to the image forming apparatus 11200 so that the image forming apparatus 11200 prints the print data.

When it is determined that the direct printing is not performable, the cloud server 11100 may store the print data in the cloud server 11100 correspondingly to the predetermined phone number.

In operation S11840, the cloud server 11100 receives a preview request of the stored print data from the user device 11000.

In operation S11850, the cloud server 11100 transmits preview data of the stored print data to the user device 11000.

Figure 119:
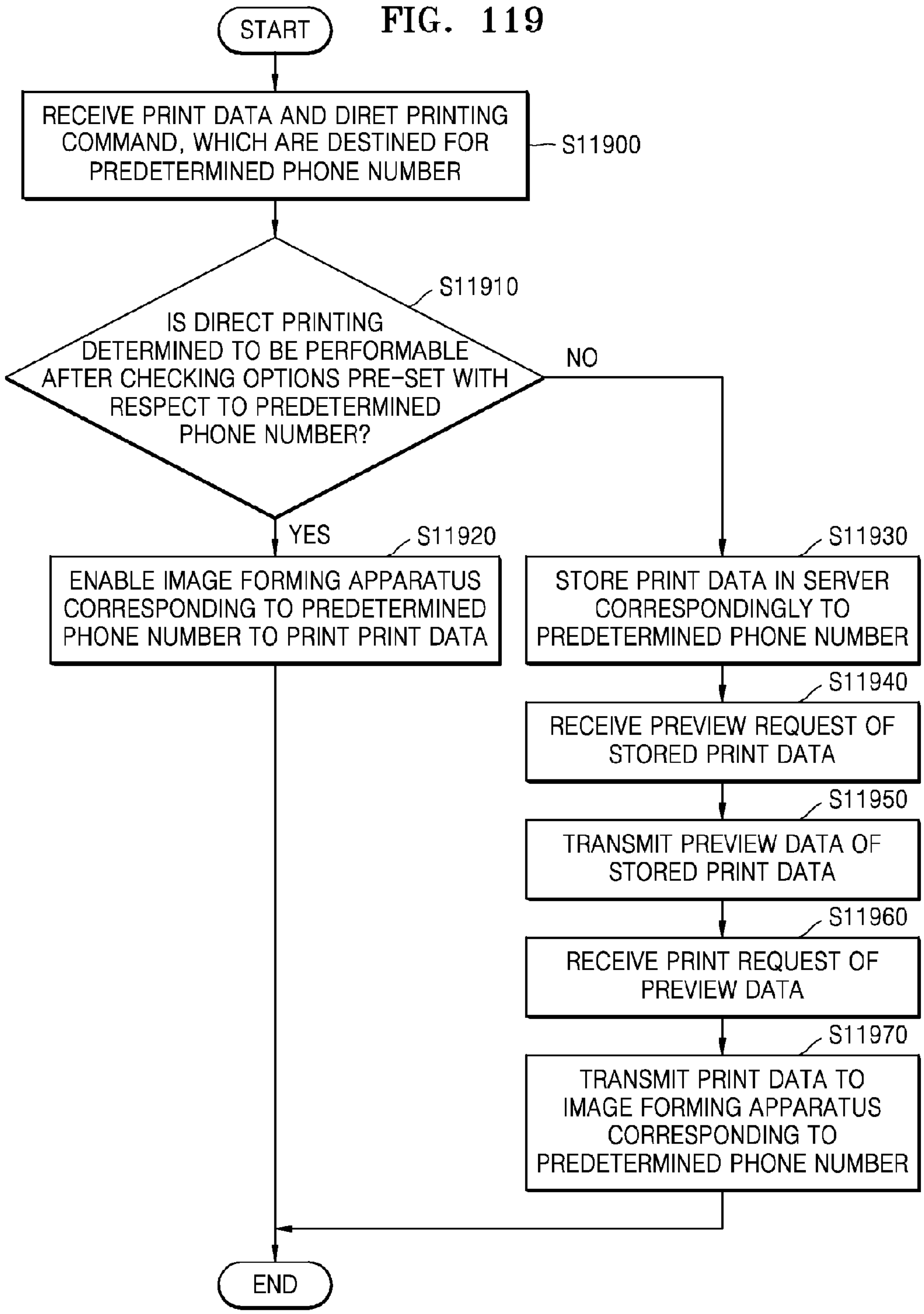

FIG. 119 is a flowchart illustrating a method of providing a cloud printing service, according to an embodiment.

In operation S11900, the cloud server 11100 receives print data and a direct printing command, which are destined for a predetermined phone number.

In operation S11910, the cloud server 11100 determines whether direct printing is performable by checking options pre-set with respect to the predetermined phone number.

When it is determined that the direct printing is performable, the cloud server 11100 enables the image forming apparatus 11200 corresponding to the predetermined phone number to print the print data in operation S11920. In detail, the cloud server 11100 transmits the print data to the image forming apparatus 11200 so that the image forming apparatus 11200 prints the print data.

When it is determined that the direct printing is not performable, the cloud server 11100 stores the print data in the cloud server 11100 correspondingly to the predetermined phone number.

In operation S11940, the cloud server 11100 receives a preview request of the stored print data from the user device 11000.

In operation S11950, the cloud server 11100 transmits preview data of the stored print data to the user device 11000.

In operation S11960, the cloud server 11100 receives a print request of the preview data from the user device 11000.

In operation S11970, the cloud server 11100 transmits the print data to the image forming apparatus 11200 corresponding to the predetermined phone number.

Figure 120:
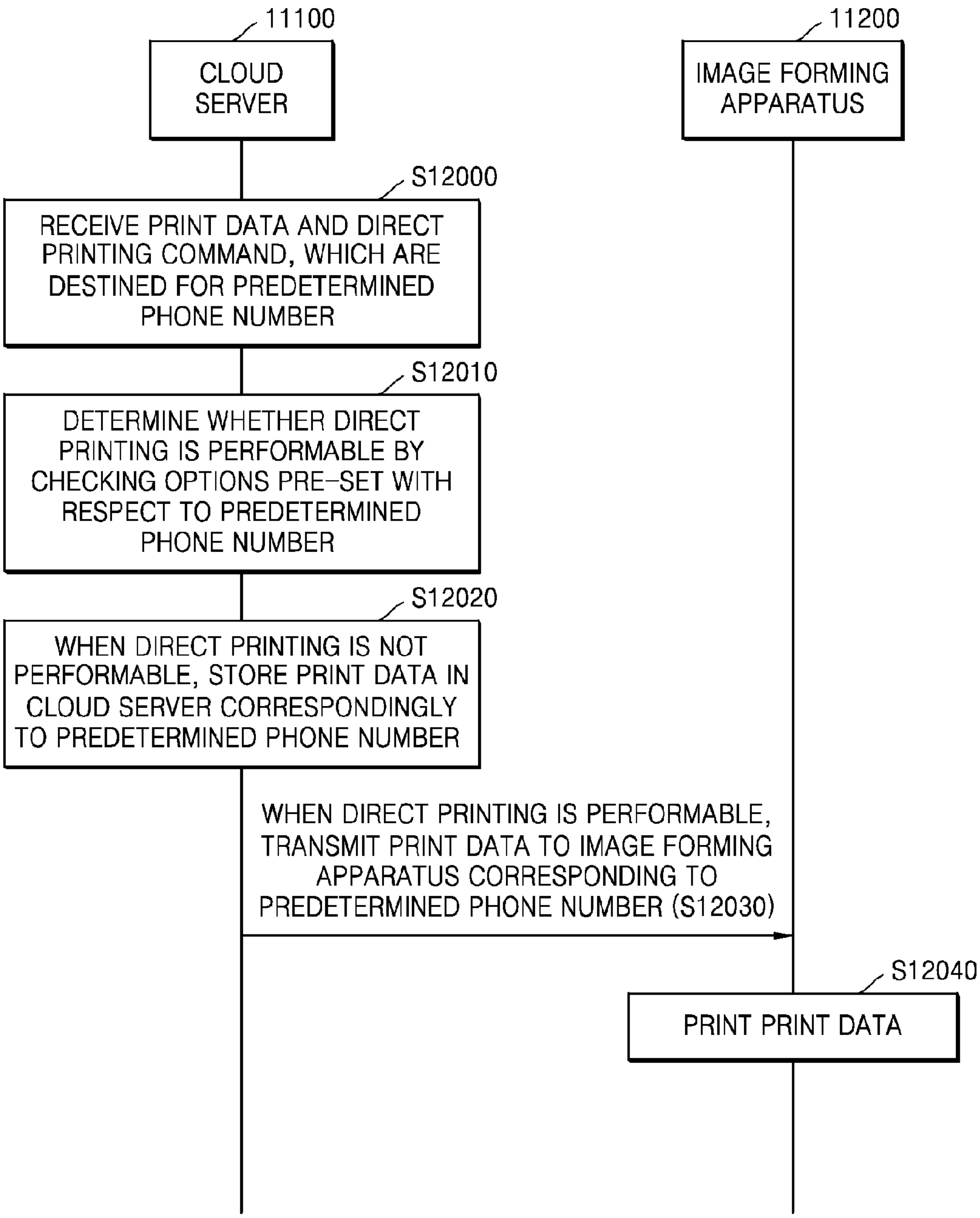

FIG. 120 is a diagram for describing a process of providing a cloud printing service, which is performed by a cloud system, according to an embodiment.

In operation S12000, the cloud server 11100 receives print data and a direct printing command, which are destined for a predetermined phone number.

In operation S12010, the cloud server 11100 determines whether direct printing is performable by checking options pre-set with respect to the predetermined phone number. A user may pre-set options for performing direct printing by using the user device 11000. The cloud server 11100 may receive the pre-set options from the user device 11000, and set options in the cloud server 11100.

When it is determined that the direct printing is not performable, the cloud server 11100 stores the print data in the cloud server 11100 correspondingly to the predetermined phone number in operation S12020.

When it is determined that the direct printing is performable, the cloud server 11100 transmits the print data to the image forming apparatus 11200 corresponding to the predetermined phone number in operation S12030.

In operation S12040, the image forming apparatus 11200 receives and prints the print data.

FIG. 121A is a diagram of an HTTP packet 12110 for receiving options set in the cloud server 11100, according to an embodiment.

Referring to FIG. 121A, a user receives the HTTP packet 12110 about the set options from "http://xx.xx.xx.xx/pp/settings/" that is an address of the cloud server 11100, by using the user device 11000. The HTTP packet 12110 is a packet received by the user device 11000 in response to a request transmitted to the cloud server 11100 by the user to check the options currently set in the cloud server 11100.

The HTTP packet 12110 includes details about the options currently set in the cloud server 11100. In detail, the HTTP packet 12110 includes options about whether direct printing is performable. An option portion 12120 includes details about "phoneNumber" and "time". In detail, "phoneNumber" denotes a phone number of a sender who is allowed to perform direct printing. "time" denotes a time slot when direct printing is allowed. For example, a "phoneNumber" portion of the option portion 12120 includes "01012345678", "01023456789", and "01034567890", which denotes that direct printing is performable only on print data transmitted from senders using phone numbers of "01012345678", "01023456789", and "01034567890". Also, a "time" portion of the option portion 12120 includes "0000_0000", "1000_1200", "1000_1200", "1000_1200", "1000_1200", "1000_1200", and "0000_0000", which denotes that direct printing is performable only on print data received from 00:00 to 00:00 on Monday, from 10:00 to 12:00 on Tuesday, from 10:00 to 12:00 on Wednesday, from 10:00 to 12:00 on Thursday, from 10:00 to 12:00 on Friday, from 10:00 to 12:00 on Saturday, and from 00:00 to 12:00 on Sunday.

FIG. 121B is a diagram of an HTTP packet 12130 for transmitting an option to be set in the cloud server 11100, according to an embodiment.

Referring to FIG. 121B, a user transmits the HTTP packet 12130 that is a request packet for setting options to "http:// xx.xx.xx.xx/transmit/pp/" that is an address of the cloud server 11100 by using the user device 11000.

The HTTP packet 12130 includes details about options currently set in the cloud server 11100. In detail, the HTTP packet 12130 includes options about whether direct printing is performable.

An allowed time portion 12140 is a portion for setting an option regarding a time slot when direct printing is performable. For example, in an embodiment, an option is set such that direct printing is performable from 00:00 to 00:00 on Monday, from 10:00 to 12:00 on Tuesday, from 10:00 to 12:00 on Wednesday, from 10:00 to 12:00 on Thursday, from 10:00 to 12:00 on Friday, from 10:00 to 12:00 on Saturday, and from 00:00 to 00:00 on Sunday.

An allowed sender portion 12145 is a portion for setting an option regarding a sender who is allowed to perform direct printing. For example, in an embodiment, an option is set such that direct printing is performable only on print data transmitted by senders using phone numbers of "010-1234-5678", "010-2345-6789", and "010-3456-7890".

Figure 122C:
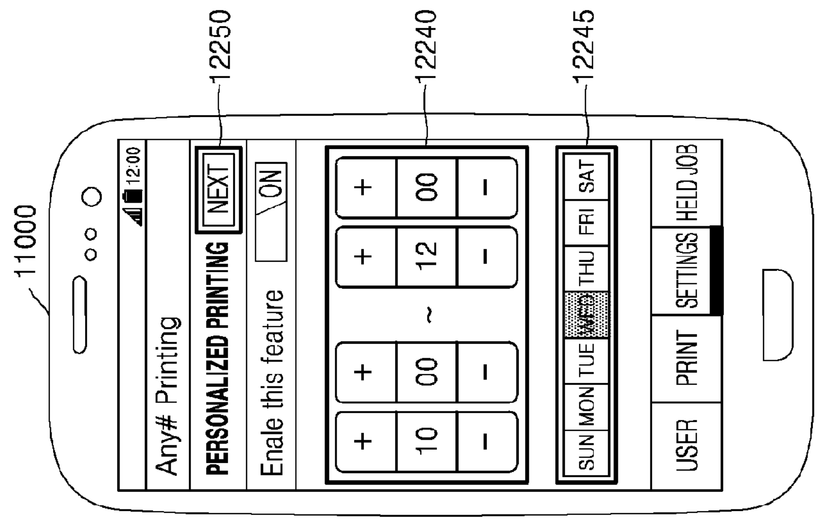
Figure 122B:
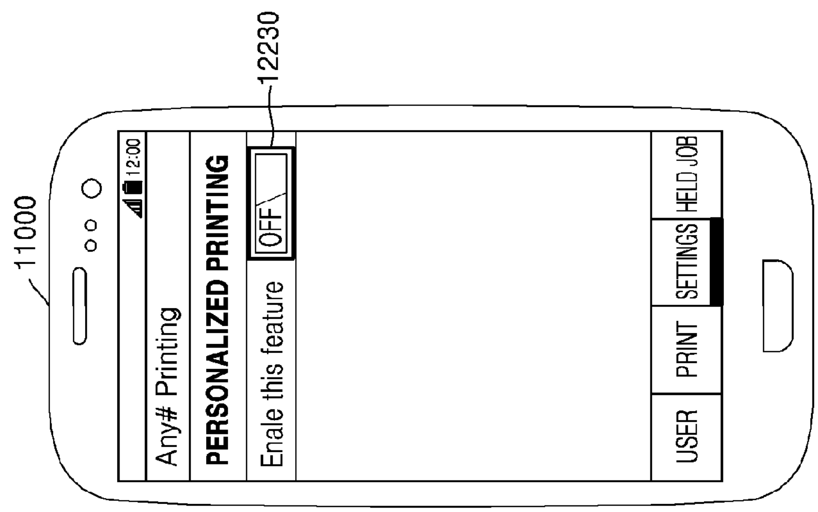
Figure 122A:
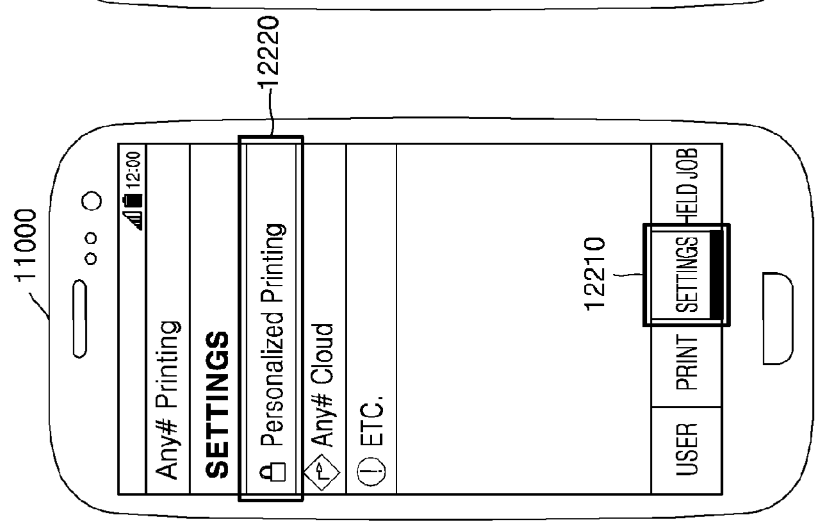

FIGS. 122A-122C are diagrams for describing a process of setting a time slot when direct printing is performable, according to embodiments.

Referring to FIG. 122A, a user selects "Settings" 12210 and selects "Personalized Printing" 12220 from a screen displayed on the user device 11000. Referring to FIG. 122B, after selecting the "Personalized Printing" 12220, the user is able to select whether to activate options via a toggle button 12230, by turning on or off the toggle button 12230. Referring to FIG. 122*c*, when the user selects "ON", the user may select a time slot 12240 and a day 12245 for allowing direct printing. The user is able to select a start time and a end time according to days by using a time picker. Then, when the user touches "NEXT" 12250, the user is able to set a time slot when direct printing is performable. The options set as such are transmitted to the cloud server 11100, and the cloud server 11100 sets the received options.

Figure 123A:
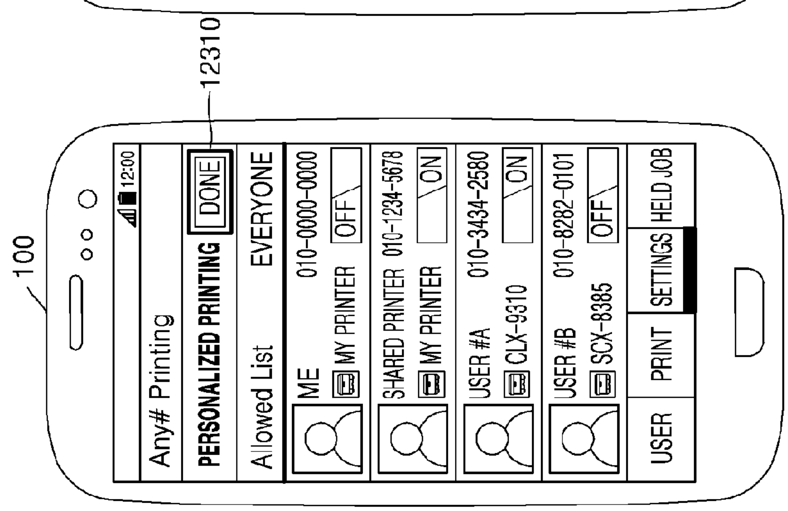
Figure 123B:
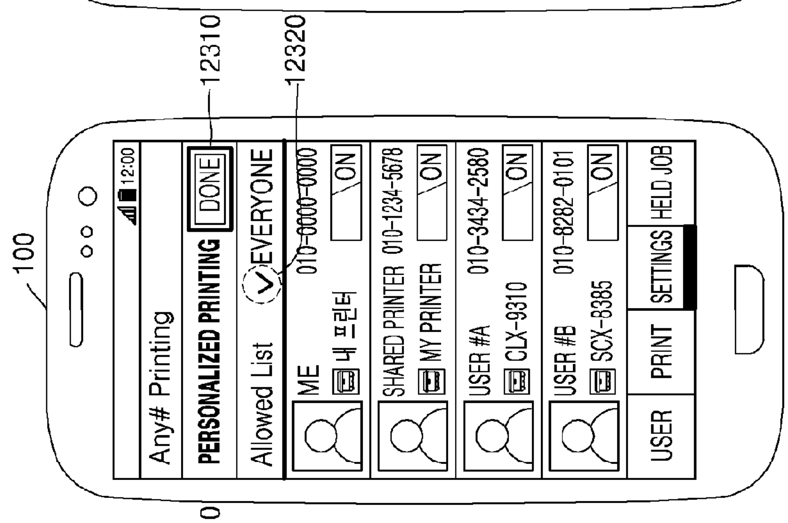

FIGS. 123A-123B are diagrams for describing a process of setting a sender who is allowed to perform direct printing, according to embodiments.

Referring to FIG. 123A, a user sets a sender who is allowed to perform direct printing from a screen displayed by using the user device 11000. When a list of phone numbers stored in the user device 11000 is displayed by calling the list, the user may select a sender who is allowed to perform direct printing. The user may use a toggle button to determine whether direct printing is allowed according to each sender. When the user selects "DONE" 12310 after setting the sender who is allowed to perform direct printing, direct printing may be performed only on print data transmitted by the set sender. Options set as such are transmitted to the cloud server 11100, and the options are set in the cloud server 11100. Referring to FIG. 123B, when the user selects "EVERYONE" 12320, direct printing may be allowed to all senders in the list of phone numbers stored in the user device 11000.

Figure 123C:
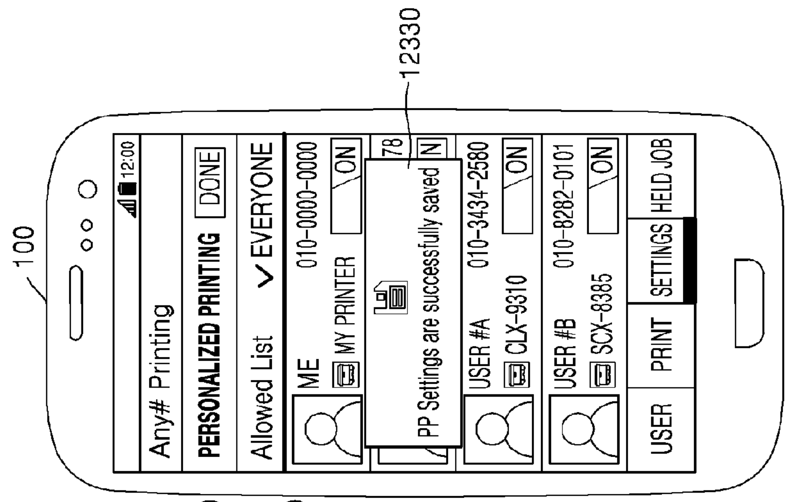

Referring to FIG. 123C, when the options are successfully set and stored in the cloud server 11100, a message 12330 notifying the success may be displayed on the user device 11000.

Figure 124:
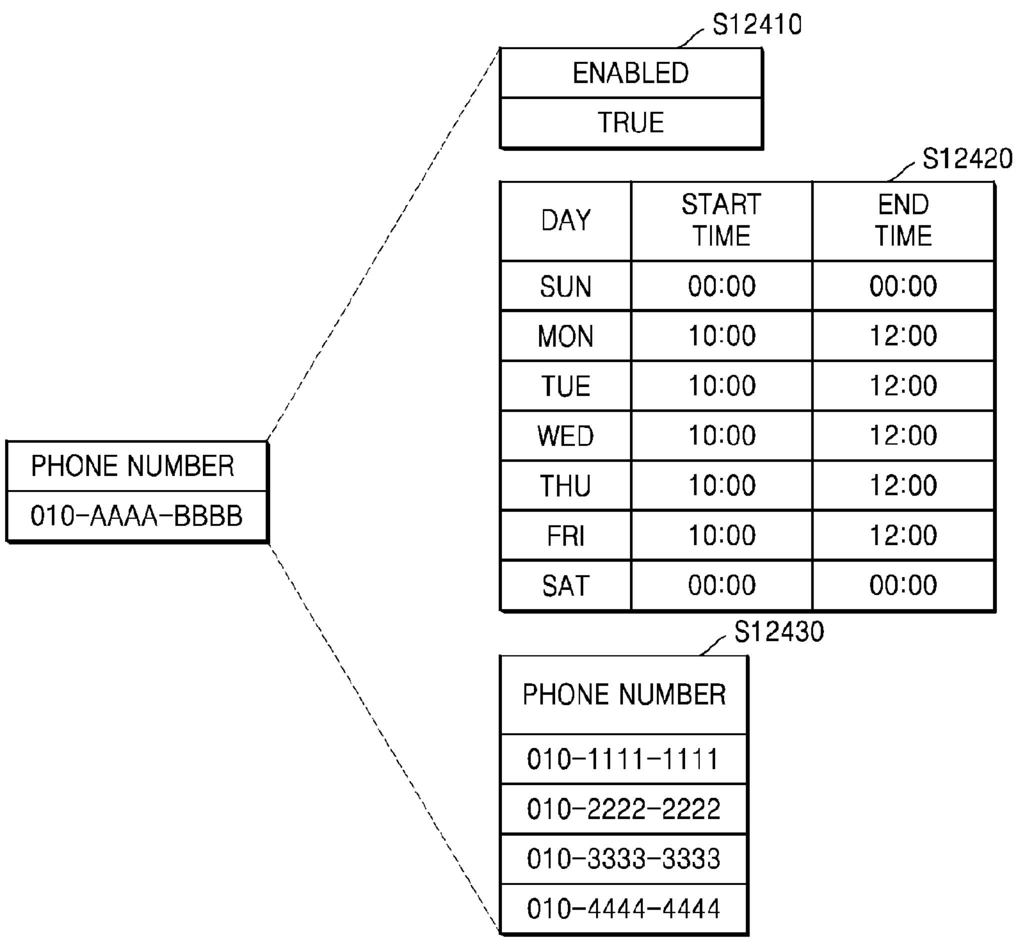

FIG. 124 is a diagram of a table for managing options about whether direct printing is performable, according to an embodiment.

Referring to FIG. 124, the cloud server 11100 stores options in a form of a table, and may manage the options about whether direct printing is performable through the table.

In an embodiment, it is assumed that options are set for a user having a phone number "010-AAAA-BBBB". The options may be stored in forms of tables, such as an enable table 12410, an allowed time table 12420, and an allowed sender table 12430 correspondingly to the phone number "010-AAAA-BBBB".

The enable table 12410 is a table for determining whether personalized printing is to be activated, and may have a value of "TRUE" or "FALSE".

The allowed time table 12420 is a table about a time slot when direct printing is allowed, and may be used to set days and time slots. Alternatively, the allowed time table 12420 may be used to set dates.

The allowed sender table 12430 is a table about a sender who is allowed to perform direct printing, and may be used to set a phone number of the sender. The allowed sender table 12430 may store additional information, such as an IP address, a serial number, and a location, together with the phone number of the sender.

Embodiments are not limited thereto, and the options about whether direct printing is performable may be stored and managed in various forms of tables.

FIG. 125 is a diagram for describing a process of providing a cloud printing service, which is performed by the cloud server 11100, according to an embodiment.

In operation S12500, the cloud server 11100 receives a direct print job. The direct print job may include a direct printing command and print data.

In operation S12510, the cloud server 1110 determines whether personalized print options are activated. The personalized print options are options about whether direct printing corresponding to a predetermined phone number is performable.

When it is determined that the personalized print options are activated, the cloud server 11100 determines whether a time when the direct print operation is received is within a set time in operation S12520.

When it is determined that the time is not within the set time, the cloud server 11100 performs pull-printing in operation S12550. The pull-printing is an operation for storing a print job in the cloud server 11100, and transmitting and printing print data to and in the image forming apparatus 11200 when a user requests the cloud server 11100 to print the print data. Direct printing is an operation for transmitting and printing print data to and in the image forming apparatus 11200 without storing the print data in the cloud server 11100.

In operation S12530, when it is determined that the time is within the set time, the cloud server 11100 determines whether a user who transmitted the direct print operation is a sender who is allowed to perform direct printing.

When the user is determined to be the sender who is allowed to perform direct printing, the cloud server 11100 may perform direct printing in operation S12540. In detail, the cloud server 11100 transmits the print data to the image forming apparatus 11200 so that the image forming apparatus 11200 prints the print data.

According to an embodiment, even when a sender transmits a direct printing command and print data, whether to perform direct printing may be determined based on options pre-set by a recipient, and thus direct printing may be performed only when the recipient wants, and pull-printing may be performed otherwise.

For example, the recipient may set a time slot when direct printing is performable so as to avoid printing noise during a personal time, such as a bedtime. Also, the recipient may store print data in the cloud server 11100 if required so that the print data is printed only after the recipient checks the print data through the user device 11000.

A phone number-based printing service may be requested by a sender not only through a mobile device, such as a mobile phone, but also through a sender device, such as an image forming apparatus. It is easy to input a phone number of a recipient who is to receive a print job to a mobile device, such as a mobile phone, by using an address book, but a sender has to directly input a phone number of a recipient in a sender device, such as an image forming apparatus. Hereinafter, requesting of a phone number-based printing service from an image forming apparatus will be described in detail with reference to FIGS. 126 through 138.

FIG. 126 is a diagram for describing an environment of a printing service of an image forming apparatus 12610 requesting for a phone number-based printing service.

Referring to FIG. 126, sender devices, i.e., the image forming apparatus 12610 and a mobile device 12630, are on the left of a cloud server 12650 and recipient devices, i.e., an image forming apparatus 12670 and a mobile device 12690, are on the right of the cloud server 12650. A sender who is to transmit a print job may register the print job in the cloud server 12650 by using the sender devices, and a recipient who is to receive the print job may receive the print job from the cloud server 12650 by using the recipient devices and perform the print job. The sender devices on the left of the cloud server 12650 may be the image forming apparatus 12610 that requests for a phone number-based printing service, and the mobile device 12630 communicable with the image forming apparatus 12610.

The image forming apparatus 12610 requesting for a phone number-based printing service may generate a print job, and transmit the print job to the cloud server 12650 so as to transmit the print job to a recipient by using a phone number of the recipient. In other words, when the image forming apparatus 12610 requests for a printing service using the phone number of the recipient, the phone number of the recipient and the print job may be transmitted to and registered in the cloud server 12650.

In order to request for a phone number-based printing service, the image forming apparatus 12610 needs to receive the phone number of the recipient from a user. If the user knows the phone number of the recipient, the user may directly input the phone number of the percipient to the image forming apparatus 12610. However, if the user does not know the phone number of the recipient, the phone number of the recipient may be obtained from the mobile device 12630 of the user or the cloud server 12650. Hereinafter, embodiments of easily inputting the phone number of the recipient from the image forming apparatus 12610 requesting for a phone number-based printing service will be described with reference to FIGS. 127 through 138.

FIG. 127 is a diagram for describing a structure of the image forming apparatus 12610 requesting for a phone number-based printing service, according to an embodiment.

Referring to FIG. 127, the image forming apparatus 12610 may include an application executer 12611, a user interface (UI) unit 12613, a communication unit (communicator) 12615, a controller 12617, and a storage unit (storage) 12619. The image forming apparatus 12610 of FIG. 127 may further include other general-purpose components. For example, the image forming apparatus 12610 may further include a scanner that generates scan image data by scanning a document, or an image former that forms an image on a printing paper.

The application executer 12611 may execute an application for inputting a print job request and a phone number of a recipient. For example, the application executer 12611 may execute a scan to phone application for registering scan image data obtained by scanning a document in the cloud server 12650, together with the phone number of the recipient. In another example, the application executer 12611 may execute a box to phone application for registering a print job stored in the image forming apparatus 12610 in the cloud server 12650, together with the phone number of the recipient.

The UI unit 12613 may adaptably display a UI of an application executed according to a user input. For example, the UI unit 12613 may display a list of print jobs or a preview of a print job when a user selects a screen for inputting a print job. In another example, the UI unit 12613 may display a message requesting the user to input the phone number of the recipient when the user selects a screen for inputting the phone number of the recipient.

Alternatively, the UI unit 12613 may adaptively display a UI by reflecting received external information. For example, the UI unit 12613 may reflect and display received external recipient information or an address book of an external device on the screen for inputting the phone number of the recipient. This will be described in detail later with reference to FIG. 130 or 136.

The communication unit (communicator) 12615 may receive information from an external device or transmit information to an external device. For example, the communication unit 12615 may receive recipient information including the phone number of the recipient from the mobile device 12630. In another example, the communication unit 12615 may request the cloud server 12650 supporting a phone number-based printing service for a server address book, and receive the server address book from the cloud server 12650 in response.

The communication unit 12615 may support various types of communication method, such as Wi-Fi-Direct®, Bluetooth®, Zigbee®, infrared data association (IrDA), and near field communication (NFC). The user may select a communication method by overall considering a state, a data amount, etc of a device that is to communicate with the image forming apparatus 12610. Alternatively, the communication unit 12615 may perform communication according to a pre-set communication method.

The controller 12617 may control the image forming apparatus 12610 in general. The controller 12617 is able to control components of the image forming apparatus 12610.

For example, the controller 12617 may control the image forming apparatus 12610 such that the recipient information received from the mobile device 12630 is automatically input on the screen for inputting the phone number of the recipient. In detail, the controller 12617 may control the UI unit 12613 such that a name and the phone number of the recipient are matched and automatically input to the screen for inputting the phone number of the recipient based on the recipient information received while displaying the screen for inputting the phone number of the recipient. The recipient information may further include at least one of an email address of the recipient and information about a group to which the recipient belongs, as well as the name and the phone number of the recipient, and the controller 12617 may further display the at least one of them on the screen.

Also, the controller 12617 may control the phone number of the recipient included in the recipient information and the print job to be transmitted to the cloud server 12650 supporting a phone number-based printing service, based on a print job request of the user.

In another example, the controller 12617 control the UI unit 12613 to display the server address book received from the cloud server 12540 on the screen for inputting the phone number of the recipient, and to receive a selection on a recipient from the displayed server address book. In detail, the controller 12617 may control the UI unit 12613 to match the name and the phone number of the recipient and display the name and the phone number, based on the server address book received while displaying the screen for inputting the phone number of the recipient. The server address book may further include at least one of an email address of the recipient and information about a group to which the recipient belongs, as well as the name and the phone number of the recipient, and the controller 12617 may further display the at least one of them.

Also, the controller 12617 may control the phone number and a print job to be transmitted to the cloud server 12650 supporting a phone number-based printing service, based on the print job request of the user.

The storage unit 12619 may store information and programs required for operations of the image forming apparatus 12610, and data generated according to the operations of the image forming apparatus 12610. For example, the storage unit 12619 may store the recipient information received from the mobile device 12630 in the address book of the image forming apparatus 12610 to update the address book. Alternatively, the storage unit 12619 may store the server address book received from the cloud server 12650 in the address book of the image forming apparatus 12610 to update the address book.

When the image forming apparatus 12610 includes a scanner (not shown), the storage unit 12619 may store scan image data generated by the scanner, and store the scan image data in a form of a print job list by listing the scan image data print job. The storage unit 12619 may store print jobs received from an external device. The storage unit 12619 may also store the received print jobs in a form of a print job list by listing the received print jobs.

In order to update the server address book of the cloud server 12650, the controller 12617 may transmit the address book that is updated by storing the recipient information received from the mobile device 12630 to the cloud server 12650. Also, in order to update a mobile address book of the mobile device 12630, the controller 12617 may transmit the address book that is updated by storing the server address book received from the cloud server 12650 to the mobile device 12630. The updated address book is transmitted so as to synchronize address books of devices supporting a phone number-based printing service, such as the image forming apparatus 12610, the mobile device 12630, and the cloud server 12650.

FIG. 128 is a diagram for describing a process of requesting a print job upon receiving recipient information from the mobile device 12630, which is performed by the image forming apparatus 12610 requesting for a phone number-based printing service, according to an embodiment.

The image forming apparatus 12610 may execute an application for inputting a print job request and a phone number of a recipient in operation S12805. In other words, a user may execute an application capable of performing a print job desired by the user from among menus of applications displayed on the UI unit 12613 of the image forming apparatus 12610. It is assumed that a scan to phone application is executed.

The image forming apparatus 12610 may adaptively display a UI of the application executed by the user in operation S12810. For example, when the user selects a screen for inputting a print job from the displayed UI, the image forming apparatus 12610 may display a list of existing scan image data or display a preview of scan image data of a currently scanned document. In another example, when the user selects a screen for inputting a phone number of a recipient, the image forming apparatus 12610 may display a message requesting the user to input the phone number of the recipient.

When the message requesting the user to input the phone number of the recipient is displayed, the user may directly input the phone number by using a keypad or other user interface. However, if the user does not know the phone number or needs to input several phone numbers, the user may easily input the phone number by transmitting recipient information including phone numbers of recipients to the image forming apparatus 12610 by using the mobile device 12630. Hereinafter, it is assumed that the user transmits the recipient information by using the mobile device 12630.

The mobile device 12630 may execute an application for selecting and transmitting user information including a phone number to an external device, in operation S12815. For example, the mobile device 12630 may execute an application supporting a phone number-based printing service, or an application for selecting user information by searching an address book of the mobile device 12630.

The mobile device 12630 displays a mobile address book, and the user may select a recipient from the mobile address book in operation S12820. In other words, the user may check the recipient to which a print job is to be transmitted from the mobile address book, and select recipient information including a phone number of the recipient.

The mobile device 12630 may transmit the recipient information selected from the mobile address book to the image forming apparatus 12610. In other words, the image forming apparatus 12610 may receive the recipient information including the phone number of the recipient from the mobile device 12630, in operation S12825.

The image forming apparatus 12610 may automatically input the recipient information received from the mobile device 12630 to the screen for inputting the phone number of the recipient in operation S12830. Accordingly, the user is able to check the recipient information selected by the mobile device 12630 through the UI unit 12613 of the image forming apparatus 12610.

Based on the print job request of the user, the image forming apparatus 12610 may transmit the phone number of the recipient included in the recipient information and a requested print job to the cloud server 12650 supporting a phone number-based printing service in operation S12835. In other words, the cloud server 12650 may receive the phone number of the recipient and the requested print job from the image forming apparatus 12610. The cloud server 12650 may match and store the phone number of the recipient and the requested print job.

The image forming apparatus 12610 may store the recipient information received from the mobile device 12630 in an address book in operation S12840 so as to update the address book of the image forming apparatus 12610. Then, when the user wants to transmit a print job to the same recipient, the user may use the updated address book of the image forming apparatus 12610.

The image forming apparatus 12610 may transmit the updated address book to the cloud server 12650 in operation S12845. In other words, the cloud server 12650 may receive the updated address book of the image forming apparatus 12610 from the image forming apparatus 12610.

The cloud server 12650 may update a server address book in operation S12850 by using the updated address book of the image forming apparatus 12610 received from the image forming apparatus 12610. As such, the address book of the image forming apparatus 12610 and the server address book of the cloud server 12650 may be synchronized with each other.

The image forming apparatus 12610 may store log data of a print job in operation S12855. The cloud server 12650 may store log data under the name of the recipient with respect to the received print job. Accordingly, the recipient of the received print job may be easily determined based on the log data.

FIG. 129 is a diagram for describing a process of selecting a recipient to receive a print job from a mobile address book of the mobile device 12630, according to an embodiment. FIG. 129 illustrates an UI 12640 of the mobile device 12630 during operations S12815 through S12825 of FIG. 128.

A user, i.e., a sender, may select the recipient who is to receive a print job, from the mobile address book of the mobile device 12630. If the user is unable to remember a phone number of the recipient or there are several recipients, the user may use phone numbers of recipients stored in the mobile device 12630.

Referring to FIG. 129, the mobile address book is displayed on the UI 12640 of the mobile device 12630. Such a mobile address book may be displayed on the UI 12640 by executing an application supporting a phone number-based printing service or an application for selecting user information by searching the mobile address book of the mobile device 12630.

The user, i.e., the sender may select the recipient who is to receive the print job, from the mobile address book displayed on the UI 12640 of the mobile device 12630. As shown in FIG. 129, the user may scroll the mobile address book to search for desired recipient information, and select a check box to select the recipient. The user may select at least one recipient and touch a "Complete" button to compete the selecting of the recipient.

When the selecting of the recipient is completed, the mobile device 12630 may transmit the recipient information to the image forming apparatus 12610 according to a pre-set communication method. If a communication method or an image forming apparatus is not pre-set, the mobile device 12630 may display a pop-up for selecting a communication method or an image forming apparatus to which the recipient information is to be transmitted, so as to induce the user to select a communication method or an image forming apparatus. For example, the mobile device 12630 may display a pop-up of various types of communication methods, such as Wi-Fi-Direct®, Bluetooth®, Zigbee®, infrared data association (IrDA), and NFC, and a plurality of image forming apparatuses registered in the mobile device 12630 for the user to select. When the communication method and the image forming apparatus 12610 are selected, the mobile device 12630 may transmit the recipient information to the image forming apparatus 12610.

FIG. 130 is a diagram for describing a process of automatically inputting recipient information on a screen for inputting a phone number of a recipient upon receiving the recipient information from the mobile device 12630, which is performed by the image forming apparatus 12610 requesting for a phone number-based printing service, according to an embodiment. FIG. 128 illustrates a UI 12620 of the image forming apparatus 12610 during operations S12805 through S12830 of FIG. 128.

The UI 12620 of the image forming apparatus 12610 at the right top of FIG. 130 is displayed when a user selects the screen for inputting the phone number of the recipient. An address book region 12622 may be displayed in a partial region of the UI 12620 of the image forming apparatus 12610. When user information is registered in an address book of the image forming apparatus 12610, the image forming apparatus 12610 may display the registered user information in the address book region 12622. When user information is not registered in the address book of the image forming apparatus 12610, the image forming apparatus 12610 may display a message requesting the user to input a phone number of a recipient. The user may directly input the phone number of the recipient by using a keypad located below the address book region 12622 or other user interface. When it is difficult for the user to directly input the phone number of the recipient, the user may transmit recipient information including the phone number of the recipient to the image forming apparatus 12610 by using the mobile device 12630, as described above with reference to FIG. 129.

When the user selected the recipient information from the UI 12640 of the mobile device 12630 and transmitted the selected recipient information to the image forming apparatus 12610, the UI 12620 of the image forming apparatus 12610 at the right top of FIG. 130 may be displayed as the UI 12620 of the image forming apparatus 12610 at the right bottom of FIG. 130. In other words, the recipient information selected from the UI 12640 of the mobile device 12630 may be automatically input to the screen for inputting the phone number of the recipient in the UI 12620 of the image forming apparatus 12610, and displayed to the user. As shown in FIG. 130, the recipient information transmitted from the mobile device 12630 may be temporarily automatically input to the address book of the image forming apparatus 12610. After the recipient is selected, the user may touch a "Send" button on the UI 12620 of the image forming apparatus 12610 to request for a print job. Accordingly, the image forming apparatus 12610 may generate scan image data and transmit the scan image data to the cloud server 12650, together with the phone number of the recipient.

FIGS. 131 and 132 are diagrams for describing processes of storing recipient information in an address book, which are performed by the image forming apparatus 12610 requesting for a phone number-based printing service, according to one or more embodiments. FIGS. 131 and 132 illustrate UIs of the image forming apparatus 12610 during operation S12840 of FIG. 128.

FIG. 131 illustrates a pop-up window 12624 asking a user whether to update the address book of the image forming apparatus 12610. In other words, the user needs to determine whether to update the address book of the image forming apparatus 12610 by storing recipient information received from the mobile device 12630 in the address book of the image forming apparatus 12610. When there is a possibility that a print job may be transmitted later, the user may touch a "YES" button to update the address book of the image forming apparatus 12610.

However, when a phone number of a recipient and a print job are transmitted based on a print job request of the user, the address book of the image forming apparatus 12610 may be pre-set to be automatically updated so as to skip the displaying of the pop-up window 12624 of FIG. 131.

FIG. 132 is a diagram for describing a process of selecting a category 12626 of an address book of the image forming apparatus 12610, where recipient information received from the mobile device 12630 is to be stored. Examples of the category 12626 where the recipient information received from the mobile device 12630 is to be stored may include "Individual", "Group", and "Any#" as shown in FIG. 132. "Individual" may be selected when recipient information received from the mobile device 12630 is to be stored according to individuals. "Group" may be selected when recipient information received from the mobile device 12630 includes information about a group and is to be stored according to groups. "Any#" may be selected when recipient information received from the mobile device 12630 is to be stored correspondingly to names and phone numbers of recipients. Unlike "Individual" and "Group", an address book storage space of according to "Any#" separately has a storage space for phone numbers, and thus phone numbers of recipients may be stored in such a storage space.

FIGS. 133A through 133C are diagrams of recipient information stored in an address book of the image forming apparatus 12610 requesting for a phone number-based printing service, according to categories, according to one or more embodiments.

In FIG. 133A, recipient information received from the mobile device 12630 is stored in an address book of the image forming apparatus 12610 by selecting "Individual" as a category.

Referring to FIG. 133A, a name, a phone number, and an email address of a recipient are input in the sated order, and the phone number replaced a fax number in the address book. However, alternatively, a phone number field may be separately provided to store the phone number.

In FIG. 133B, recipient information received from the mobile device 12630 is stored in an address book of the image forming apparatus 12610 by selecting "Group" as a category.

Referring to FIG. 133B, information about a group included in the recipient information is "Company", and total three people are in the group.

In FIG. 133C, recipient information received from the mobile device 12630 is stored in an address book of the image forming apparatus 12610 by selecting "Any#" as a category.

Referring to FIG. 133C, names and phone numbers of recipients are stored in the address book of the image forming apparatus 12610, and in detail, there is a phone number field for storing the phone numbers.

FIG. 134 is a diagram for describing a process of requesting for a print job upon receiving a server address book from the cloud server 12650, which is performed by the image forming apparatus 12610 requesting for a phone number-based printing service, according to an embodiment.

The image forming apparatus 12610 may execute an application for inputting a request for a print job and a phone number of a recipient in operation S13405. In other words, a user may execute an application for performing a print job desired by the user from among menus of applications displayed on the UI unit 12613 of the image forming apparatus 12610. Hereinafter, for convenience of description, it is assumed that a scan to phone application is executed.

The image forming apparatus 12610 may adaptively display a UI of the executed application in operation S13410. For example, when the user selects a screen for inputting a print job from the displayed UI, the image forming apparatus 12610 may display a list of existing scan image data or display a preview of scan image data of a currently scanned document. In another example, when the user selects a screen for inputting a phone number of a recipient, the image forming apparatus 12610 may display a message requesting for a phone number of a recipient.

When the message requesting for a phone number of a recipient is displayed, the user may directly input the phone number by using a keypad or other user interface. However, if the user does not remember the phone number or has to input several phone numbers, the user may use the cloud server 12650.

The image forming apparatus 12610 may request the cloud server 12650 for the server address book in operation S13415. In response, the image forming apparatus 12610 may receive the server address book from the cloud server 12650 in operation S13420.

The image forming apparatus 12610 may display the server address book received from the cloud server 12650 on the screen for inputting a phone number of a recipient, in operation S13425.

The user may select a recipient from the server address book displayed on the image forming apparatus 12610, thereby easily inputting a phone number of a recipient in operation S13430.

Based on the request for a print job, the image forming apparatus 12610 may transmit a phone number of the selected recipient and the requested print job to the cloud server 12650 supporting a phone number-based printing service, in operation S13435. In other words, the cloud server 12650 may receive the phone number and the requested print job from the image forming apparatus 12610. The cloud server 12650 may match and store the phone number and the requested print job.

The image forming apparatus 12610 may store the server address book received from the cloud server 12650 in an address book, in operation S13440, so as to update the address book of the image forming apparatus 12610. Then, when a print job is to be transmitted to the same recipient later, the updated address book of the image forming apparatus 12610 may be used.

The image forming apparatus 12610 may transmit the updated address book to the mobile device 12630 in operation S13445. In other words, the mobile device 12630 may receive the updated address book of the image forming apparatus 12610 from the image forming apparatus 12610.

The mobile device 12630 may update a mobile address book by using the updated address book received from the image forming apparatus 12610, in operation S13450, thereby synchronizing the address book of the image forming apparatus 12610 and the mobile address book of the mobile device 12630.

The image forming apparatus 12610 may store log data of the print job in operation S13455. The log data of the print job transmitted to the cloud server 12650 may be stored under a name of the recipient.

FIG. 135 is a diagram of a screen for setting a connection with the cloud server 12650, which is performed by the image forming apparatus 12610 requesting for a phone number-based printing service, according to an embodiment.

As described with reference to operation S13415 of FIG. 134, the image forming apparatus 12610 may request the cloud server 12650 for the server address book. Accordingly, the image forming apparatus 12610 may perform an operation of pre-setting information about the cloud server 12650.

Referring to FIG. 135, the image forming apparatus 12610 may display a UI 12628 for pre-setting the information about the cloud server 12650, or may amend the information about the cloud server 12650 according to a user input.

FIG. 136 is a diagram for describing a process of displaying a server address book on a screen for inputting a phone number of a recipient upon receiving the server address book from the cloud server 12650, which is performed by the image forming apparatus 12610 requesting for a phone number-based printing service, according to an embodiment. FIG. 136 illustrates the UI 12620 of the image forming apparatus 12610 during operations S13405 through S13430 of FIG. 134.

The UI 12620 of the image forming apparatus 12610 at the left top of FIG. 136 is displayed when the user of the image forming apparatus 12610 selects a screen for inputting a phone number of a recipient. The address book region 12622 may be displayed on a partial region of the UI 12620 of the image forming apparatus 12610. When there is user information registered in the address book of the image forming apparatus 12610, the image forming apparatus 12610 may display the registered user information on the address book region 12622. However, when there is no user information registered in the address book of the image forming apparatus 12610, the image forming apparatus 12610 may display a message requesting for a phone number of a recipient. At this time, the user may directly input the phone number by using a keypad or other user face below the address book region 12622. If it is difficult for the user to directly input the phone number, the image forming apparatus 12610 may receive the server address book from the cloud server 12650.

The user may request the cloud server 12650 that is pre-set to be connected to the image forming apparatus 12610 for the server address book through the UI 12620 of the image forming apparatus 12610. When the user touches a button 12629 requesting for a phone number on the UI 12620, the image forming apparatus 12610 may request the cloud server 12650 for the server address book.

In response, the cloud server 12650 may transmit the server address book to the image forming apparatus 12610.

When the cloud server 12650 transmitted the server address book to the image forming apparatus 12610, the UI 12620 at the left top of FIG. 136 may be displayed as the UI 12620 at the left bottom of FIG. 136. In other words, the server address book received from the cloud server 12650 may be displayed on the screen for inputting a phone number of a recipient. As shown in FIG. 136, the server address book received from the cloud server 12650 may be displayed on the address book of the image forming apparatus 12610. The user may check a check box from the server address book to select a recipient who is to receive a print job, and touch a "Send" button on the UI 12620 of the image forming apparatus 12610, thereby requesting for the print job. Accordingly, the image forming apparatus 12610 may generate scan image data, and transmit the scan image data to the cloud server 12650, together with a phone number of the selected recipient.

FIG. 137 is a flowchart illustrating a method of requesting for a phone number-based printing service, according to an embodiment. Hereinafter, details about the image forming apparatus 12610 requesting for a phone number-based printing service described above may also be applied to the method of FIG. 137, even if omitted.

First, in operation S13710, the image forming apparatus 12610 may execute an application for inputting a request for a print job and a phone number of a recipient.

In operation S13720, the image forming apparatus 12610 may adaptively display a UI of the executed application based on a user input. When a user selects a screen for inputting a print job, the image forming apparatus 12610 displays a list of print jobs or displays a preview of a print job, and when the user selects a screen for inputting a phone number of a recipient, the image forming apparatus 12610 may display a message requesting for the phone number of the recipient.

In operation S13730, the image forming apparatus 12610 may receive recipient information including the phone number of the recipient from a mobile device, and automatically input the recipient information to the screen for inputting the phone number. The image forming apparatus 12610 may match and automatically input a name and the phone number of the recipient based on the recipient information received while displaying the screen for inputting the phone number of the recipient. The recipient information may further include at least one of an email address of the recipient and information about a group to which the recipient belongs.

In operation S13740, the image forming apparatus 12610 may transmit the phone number included in the recipient information and the requested print job to a cloud server supporting a phone number-based printing service, based on the request for the print job.

FIG. 138 is a flowchart illustrating a method of requesting for a phone number-based printing service, according to an embodiment. Hereinafter, details about the image forming apparatus 12610 requesting for a phone number-based printing service described above may also be applied to the method of FIG. 138, even if omitted.

First, in operation S13810, the image forming apparatus 12610 may execute an application for inputting a request for a print job and a phone number of a recipient.

In operation S13820, the image forming apparatus 12610 may adaptively display a UI of the executed application, based on a user input. The image forming apparatus 12610 may display a list of print jobs or display a preview of a print job when the user selects a screen for inputting a phone number of a recipient.

In operation S13830, the image forming apparatus 12610 may receive a server address book from the cloud server 12650 supporting a phone number-based printing service, according to a request for the server address book, and display the server address book on the screen for inputting the phone number of the recipient. The image forming apparatus 12610 may match and display a name and the phone number of the recipient based on the server address book received while displaying the screen for inputting the phone number of the recipient. The server address book may further include at least one of an email address of the recipient and information about a group to which the recipient belongs.

In operation S13840, the image forming apparatus 12610 may receive a selection on a recipient from the displayed server address book.

In operation S13850, the image forming apparatus 12610 may transmit a phone number of the selected recipient and the requested print operation to the cloud server 12650 based on the request for the print operation.

In FIGS. 81 through 94, the image forming apparatus 37 provides a cloud printing service with a help of the agent application 101 installed in the computing device 20 that intermediates between the cloud server 40 and the image forming apparatus 37, if the image forming apparatus 37 does not support a network connection function or an application supporting a cloud printing service is unable to be installed in the image forming apparatus 37.

According to FIGS. 81 through 94, only a user who has an authority to log in the computing device 20 (for example, the second individual 23) is able to assign a new phone number to the image forming apparatus 37 and register or subscribe the new phone number in or to a cloud printing service through the agent application 101 installed in the computing device 20. Accordingly, another user who has no authority to log in the computing device 20 (for example, the first individual 21) is unable to perform registration or subscription to a cloud printing service by using the agent application 101 without a help of the second individual 23.

A method registering even a user who does not have a login authority in a cloud printing service by using an NFC tag will now be described with reference to FIGS. 139 through 149. Also, a user who has a login authority may easily register in a cloud printing service by using an NFC tag that is to be described below. In FIGS. 139 through 149, the same reference numerals are used to denote the same elements, even if not illustrated, for convenience of description.

FIG. 139 is a diagram of a cloud printing system 139 supporting a cloud printing service of an image forming apparatus 13930 by using a computing device 13920 in which an agent application 13901 is installed, according to an embodiment.

Unlike the image forming system 1 of FIG. 2, the cloud printing system 139 of FIG. 139 further includes the computing device 20 in which the agent application 13901 is installed. It is assumed that the image forming apparatus 13930 of the cloud printing system 139 is unable to receive a cloud printing service by independently connecting to a cloud server 13940 since the image forming apparatus 13930 does not support a network connection function or an application for executing a cloud printing service is unable to be installed in the image forming apparatus 13930.

Referring to FIG. 139, the cloud server 13940, a first mobile device 13910, a second mobile device 13915, the computing device 13920, the image forming apparatus 13930, and the agent application 13901, which exist on the cloud printing system 139, may provide a phone number-based cloud printing service in the same manner described above with reference to FIGS. 81 through 94.

In FIG. 139, it is assumed that a user A 1391 is an owner of the computing device 13920 and the first mobile device 13910, but embodiments are not limited thereto. Also, it is assumed that the user A 1391 has an authority to log in an OS installed in the computing device 13920. It is assumed that a user B 1393 is an owner of the second mobile device 13915 and does not have an authority to log in the OS of the computing device 13920. However, alternatively, the user B 1393 may have an authority to log in the computing device 13920.

The agent application 13901 that is the same as the agent application 101 described above with reference to FIGS. 81 through 94 is installed in the computing device 13920. Accordingly, when a phone number of the first mobile device 13910 and the image forming apparatus 13930 are registered in the agent application 13901, the user A 1391 may print a content regarding a cloud printing service requested to the phone number of the first mobile device 13910 through the image forming apparatus 13930.

When a phone number of the second mobile device 13915 used by the user B 1393 is not registered in the agent application 13901, the user B 1393 is unable to print a content requested to the phone number of the second mobile device 13915 through the image forming apparatus 13930. Also, since the user B 1393 does not have an authority to log in the computing device 13920, the user B 1393 is unable to directly register the phone number of the second mobile device 13915 in the computing device 13920. In this case, the user B 1393 may register the phone number of the second mobile device 13915 in a cloud printing service through the agent application 13901 by using an NFC tag 19302.

In detail, since the cloud server 13940 registers and manages information about the agent application 13901, a printing application installed in the first mobile device 13910 and supporting a cloud printing service may receive the information about the agent application 13901 from the cloud server 13940. Accordingly, the user A 1391 may NFC-tag the first mobile device 13910 to the NFC tag 13902 so as to write the information about the agent application 13901 on the NFC tag 13902.

Accordingly, the information about the agent application 13901 is stored in the NFC tag 19302.

Then, the user B 1393 NFC-tags the second mobile device 13915 to the NFC tag 13902 so as to obtain the information about the agent application 13901 written on the NFC tag 13902. In other words, even if the user B 1393 is unable to execute the agent application 13901 since the user B 1393 does not have an authority to log in the computing device 13920, the user B 1393 may obtain the information about the agent application 13901 via NFC tagging.

Like the first mobile device 13910, a printing application supporting a cloud printing service is installed in the second mobile device 13915. The second mobile device 13915 transmits the information about the agent application 13901 obtained via the NFC tagging to the cloud server 13940 by using the printing application. The second mobile device 13915 also transmits information about the phone number of the second mobile device 13915, which is to be registered in the agent application 13901.

The cloud server 13940 that registers and manages the agent application 13901 registers the phone number of the second mobile device 13915 after mapping the phone number of the second mobile device 13915 to the agent application 13901, by using the information about the agent application 13901 and the phone number of the second mobile device 13915 received from the second mobile device 13915.

Accordingly, even when the phone number of the second mobile device 13915 is not directly registered in the agent application 13901 by manipulating the agent application 13901 through the computing device 13920, the user B 1393 is able to register the phone number of the second mobile device 13915 in the agent application 13901 via the NFC tagging. As a result, the user B 1393 may print the content about the cloud printing service requested to the phone number of the second mobile device 13915 through the image forming apparatus 13930 registered in the agent application 13901.

FIG. 140 is a diagram for describing the NFC tag 13902 attached to the computing device 13920, according to an embodiment.

Referring to FIG. 140, the NFC tag 13902 may be attached to the computing device 13902 for convenience of using the NFC tag 13902. Accordingly, a user who is to be registered in the agent application 13901 installed in the computing device 13920 may conveniently subscribe the cloud printing service by NFC-tagging the NFC tag 13902, without having to execute the agent application 13901 by booting the computing device 13920.

In FIG. 140, the NFC tag 13902 on which the information about the agent application 13901 is recorded is attached to the computing device 13920 in which the agent application 13901 is installed, but alternatively, the NFC tag 13902 may be attached to any place under an office environment or home environment.

FIG. 141A is a block diagram of the first mobile device 13910 according to an embodiment, and FIG. 141B is a block diagram of the second mobile device 13915 according to an embodiment.

Referring to FIG. 141A, the first mobile device 13910 includes a controller 13911, a network interface unit (network interface) 13912, an NFC module 13913, and a UI unit (user interface) 13914. Also, referring to FIG. 141B, the second mobile device 13915 includes a controller 13916, a network interface unit 13917, an NFC module 13918, and a UI unit 13919.

In order to prevent features of an embodiment from being blurred, only hardware components related to an embodiment are described in FIGS. 141A and 141B. However, general-purpose hardware components other that those shown in FIGS. 141A and 141B may be included in the first and second mobile devices 13910 and 13915.

The first and second mobile devices 13910 and 13915 of FIGS. 141A and 141B may each be a smart phone, laptop computer, notebook computer, portable game player, portable media player (PMP), digital camera, a tablet device, a personal digital assistant (PDA), or a wearable device, but are not limited thereto. Further, it is understood that embodiments are also applicable to any device with which an apparatus, method, or medium of an embodiment can be used.

The UI unit 13914 is a hardware component including an input device or a display device, and displays information to the user A 1391 of the first mobile device 13910 or receives information from the user A 1391. The user interface unit 13914 may include, for example, one or more of a keyboard, a keypad, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a pedal or footswitch, a virtual-reality device, and the like. The user interface 13914 may further include a haptic device to provide haptic feedback to a user. The user interface 13914 may also include a touchscreen display, for example. The touchscreen display may include a liquid crystal display (LCD), a light emitting diode (LED) display, an organic light emitting diode (OLED) display, active matrix organic light emitting diode (AMOLED), flexible display, 3D display, and the like, for example. However, the disclosure is not so limited thereto and may include other types of touchscreen displays. The disclosure may also include other types of user interfaces. The UI unit 13919 may also be a hardware component having the same functions as the UI unit 13914.

The controller 13911 is a hardware component for controlling overall operations and functions of the first mobile device 13910. In detail, the controller 13911 may execute a printing application providing a phone number-based cloud printing service. The controller 13916 may also be a hardware component having the same functions as the controller 13911.

The controller 13911 or 13916 may be realized by at least one processor, such as a central processing unit (CPU), an application processor (AP) an arithmetic logic unit, a graphics processing unit (GPU), a digital signal processor (DSP), a microcomputer, a field programmable gate array, a programmable logic unit, an application-specific integrated circuit (ASIC), a microprocessor or any other device capable of responding to and executing computer-readable instructions.

The network interface unit 13912 is a hardware component supporting a wired or wireless communication function, and may support a wireless communication, such as Wi-Fi®, Wi-Fi Direct®, Zigbee®, infrared data association (IrDA), or Bluetooth®, a wired communication, such as Ethernet, a 2G mobile communication, a 3G mobile communication, or a 4G mobile communication. The network interface unit 13917 may also be a hardware component having the same functions as the network interface unit 13912.

The NFC module 13913 or 13918 is a hardware component that communications with other NFC devices, for example, the NFC tag 13902 and an NFC supporting smart phone, according to an NFC protocol. When an NFC tagging function is activated, the NFC module 13913 or 13918 may operate in a P2P mode, a read/write mode, or an emulation mode.

Detailed operations and functions of the components of the first and second mobile devices 13910 and 13915 related to an embodiment will now be described in detail with reference to FIGS. 142 through 149.

FIG. 142 is a diagram for describing registering a use of the agent application 13901 installed in the computing device 13920, in the cloud server 13940, according to an embodiment.

Referring to FIG. 142, the registering of the use of the agent application 13901 is related to the registering of the use of the agent application 101 described above with reference to FIGS. 139 through 149. Accordingly, details described above with reference to FIGS. 139 through 149 and details that will be described below with reference to FIG. 142 may be applied to each other.

The cloud server 13940 registers and manages the agent application 13901 installed in the computing device 13920. In other words, the cloud server 13940 may register and manage not only the agent application 13901, but also agent applications existing on the cloud printing system 139. The agent application may be installed in image forming apparatuses or computing devices.

Referring to a table 14200, an "Agent Type" item has a value of "PRT_AGENT" when agent applications are installed in image forming apparatuses, and has a value of "PC_AGENT" when agent applications are installed in computing devices.

The "Agent Type" item may correspond to the path information described above with reference to FIGS. 139 through 149. In other words, when the "Agent Type" item has the value of "PRT_AGENT", a content requested to a certain phone number is directly transmitted to and printed by a certain image forming apparatus. In this case, an agent application supporting a cloud printing service is installable in the certain image forming apparatus, and a provided path of the cloud printing service is the certain image forming apparatus. On the other hand, when the "Agent Type" item has the value of "PC_AGENT", a content requested to a certain phone number is transmitted to a certain computing device, and then is printed by a certain image forming apparatus registered in an agent application installed in the certain computing device. In this case, an agent application supporting a cloud printing service is unable to be installed in the certain image forming apparatus, and a provided path of the cloud printing service is the certain computing device. However, as described above, the agent application installed in the certain computing device may be used even when an agent application is installable in the certain image forming apparatus.

Referring to the table 14200, a "Device_ID (Mac Address)" item may be an MAC address, an IP address, or the like that is intrinsically assigned to a device where an agent application is installed.

The cloud server 13940 maps and manages types ("Agent Type") of agent applications and network information ("Device_ID (Mac Address)") of devices where agent applications are installed, by using the table 14200.

For example, referring to the table 14200, since the value of "PRT_AGENT" is mapped to an MAC address "00:15:99:00:00:AA", an agent application installed in an image forming apparatus having the MAC address "00:15:99:00:00:M" is registered in the cloud server 13940. Also, since the value of "PC_AGENT" is mapped to MAC addresses "00:15:99:00:00:BB" and "00:15:99:00:00:CC", agent applications installed in computing devices having the MAC addresses "00:15:99:00:00:BB" and "00:15:99:00:00:CC" are registered in the cloud server 13940.

The cloud server 13940 stores the table 1420 for managing registration information of agent applications as described above.

FIG. 143 is a diagram for describing registering a list of phone numbers and a list of image forming apparatuses, which are managed by the agent application 13901, in the cloud server 13940, according to an embodiment.

Referring to FIG. 143, the registering of the lists managed by the agent application 13901 is related to the details described above with reference to FIGS. 139 through 149. Accordingly, details described above with reference to FIGS. 139 through 149 and details that will be described below with reference to FIG. 143 may be applied to each other.

The user A 1391 may add a new phone number, for example, "+82-10-0000-0004") through a UI screen 14301 of the agent application 13901.

In order to register the new phone number in the cloud server 13940, the computing device 13920 transmits information about the new phone number to the cloud server 13940. The computing device 13920 may also transmit ID information of the agent application 13901 so that the cloud server 13940 identifies a request from the agent application 13901. The ID information may be an authentication key or a login account intrinsically assigned from the cloud server 13940 to the agent application 13901, or may be an MAC address of the computing device 13920 where the agent application 13901 is installed.

The cloud server 13940 determines that the agent application 13901 installed in the computing device 13920 corresponds to an MAC address "00:15:99:00:00:CC", by using a table 14302.

Also, the cloud server 13940 maps and registers the MAC address "00:15:99:00:00:CC" and the new phone number "+82-10-0000-0004" as shown in a table 14303. Image forming apparatus information "SCX-6401" may be additionally mapped.

As described above, the cloud server 13940 may map and manage phone numbers added by the agent application 13901 and information about the agent application 13901.

FIG. 144 is a diagram for describing a process of writing information on the NFC tag 13902 by using the first mobile device 13910, according to an embodiment. Also, FIG. 145 is a diagram for describing a process of writing information on the NFC tag 13902 through a UI screen 14503 of the first mobile device 13910, according to an embodiment. FIGS. 144 and 145 will be described in connection with each other.

In operation 14401, the controller 13911 of the first mobile device 13910 executes a printing application installed in the first mobile device 13910.

When the printing application is executed, the UI unit 13914 of the first mobile device 13910 displays the UI screen 14503 of the printing application.

As shown on the UI screen 14503, it is assumed that a phone number of the first mobile device 13910 is "+82-10-0000-0004".

When the user A 1391 clicks a start button 14504 instructing NFC write through the UI screen 14503, the controller 13911 of the first mobile device 13910 activates an NFC tagging mode of the printing application, in operation 14402.

In operation 14403, the network interface unit 13912 of the first mobile device 13910 requests the cloud server 13940 for ID information of the agent application 13901, according to a control of the printing application. The ID information of the agent application 13901 includes network address information of the computing device 13920 where the agent application 13901 is installed. In detail, the network address information of the computing device 13920 may be the MAC address of the computing device 13920 used while registering the agent application 13901 in the cloud server 13940, as described above with reference to FIG. 142.

In order to request for the ID information of the agent application 13901, the network interface unit 13912 of the first mobile device 13910 may transmit the phone number of the first mobile device 13910 registered in the agent application 13901 to the cloud server 13940.

The cloud server 13940 determines that MAC addresses mapped to the phone number "+82-10-0000-0004" of the first mobile device 13910 are "00:15:99:00:00:CC" and "00:15:99:00:00:DD", by using a table 14501. Also, the cloud server 13940 determines that an agent application mapped to the MAC address "00:15:99:00:00:CC" is an agent application installed in a PC of "HOME PC", and an agent application mapped to the MAC address "00:15:99:00:00:DD" is an agent application installed in a PC of "OFFICE PC", by using a table 14502.

In operation 14404, the cloud server 13940 transmits the ID information of the agent application 13901 to the first mobile device 13910. The transmitted ID information includes the MAC addresses "00:15:99:00:00:CC" and "00:15:99:00:00:DD". Also, the transmitted ID information may also include PC names "HOME PC" and "OFFICE PC" respectively corresponding to the MAC addresses "00:15:99:00:00:CC" and "00:15:99:00:00:DD".

When the user A 1391 NFC-tags the first mobile device 13910 to the NFC tag 13902, the NFC module 13913 of the first mobile device 13910 writes the ID information of the agent application 13901 on the NFC tag 13902 in operation 14405.

Since the transmitted ID information includes two types of MAC addresses, the user A 1391 may select at least one of the MAC addresses through the UI screen 14503. As such, when the transmitted ID information includes a plurality of MAC addresses, the UI screen 14503 displays a pop-up window 14505 for selecting an MAC address to be written.

When the user A 1391 selects "OFFICE PC, 00:15:99:00:00:DD" 14506 from the pop-up window 14505, the NFC module 13913 writes ID information of "OFFICE PC, 00:15:99:00:00:DD" 14506 on the NFC tag 13902. If the user A 1391 selects two or more MAC addresses, the selected two or more MAC addresses may be written.

In operation 14406, the NFC tag 13902 stores the ID information of the agent application 13901. In other words, the NFC tag 13902 stores the ID information of "OFFICE PC, 00:15:99:00:00:DD" 14506.

FIG. 146 is a diagram for describing a process of reading information from the NFC tag 13902 by using the second mobile device 13915, according to an embodiment. Also, FIG. 147 is a diagram for describing a process of reading information from the NFC tag 13902 through a UI screen 14701 of the second mobile device 13915, according to an embodiment. FIGS. 146 and 147 will now be described in connection with each other.

In operation 14601, the controller 13916 of the second mobile device 13915 executes a printing application installed in the second mobile device 13915.

When the printing application is executed, the UI unit 13919 of the second mobile device 13915 displays the UI screen 14701 of the printing application.

As shown in the UI screen 14701, it is assumed that a phone number of the second mobile device 13915 is "+82-10-1234-ABCD".

When the user B 1393 clicks a start button 14702 instructing NFC read through the UI screen 14701, the controller 13916 of the second mobile device 13915 activates an NFC tagging mode of the printing application in operation 14602.

When the user B 1393 NFC-tags the second mobile device 13915 to the NFC tag 13902, the NFC module 13918 of the second mobile device 13915 reads the ID information of the agent application 13901 written on the NFC tag 13902, in operation 14603. In other words, the NFC module 13918 reads the ID information of "OFFICE PC, 00:15:99:00:00:DD" from the NFC tag 13902.

In operation 14604, the network interface unit 13917 of the second mobile device 13915 transmits a registration request including the read ID information of "OFFICE PC, 00:15:99:00:00:DD" and the phone number "+82-10-1234-ABCD" of the second mobile device 13915 to the cloud server 13940.

In operation 14605, the cloud server 13940 registers the phone number of the second mobile device 13915 after mapping the phone number to the agent application 13901 corresponding to the ID information.

In detail, the cloud server 13940 determines the agent application 13901 mapped to the ID information by using a table 14703. Then, the cloud server 13940 registers the phone number of the second mobile device 13915 in the agent application 13901 corresponding to the ID information, as shown in a table 14704.

In operation 14606, the cloud server 13940 transmits a registration response to the second mobile device 13915 in response to the registration request from the second mobile device 13915. In other words, the cloud server 13940 may transmit the registration response indicating that the phone number of the second mobile device 13915 is registered in the agent application 13901 corresponding to the ID information.

In operation 14607, the UI unit 13919 of the second mobile device 13915 displays registration information 14705 indicating that the phone number of the second mobile device 13915 is registered in the agent application 13901, based on the registration response. In other words, the UI unit 13919 may display the registration information 14705 indicating that the phone number of the second mobile device 13915 is registered in the agent application 13901 corresponding to the ID information, through the UI screen 14701.

In operation 14608, the cloud server 13940 may transmit the registration information to the first mobile device 13910 or the computing device 13920 where the agent application 13901 is installed.

In operation 14609, the first mobile device 13910 or the agent application 13901 may update a list of existing phone numbers based on the transmitted registration information.

As such, the user B 1393 may register the phone number of the second mobile device 13915 in the agent application 13901 via NFC tagging, even when the phone number of the second mobile device 13915 is not directly registered in the agent application 13901 by manipulating the agent application 13901 in the computing device 13920.

FIG. 148 is a diagram for describing a whole process of registering the second mobile device 13915 in a cloud printing service by using the NFC tag 13902, according to an embodiment.

In FIG. 148, the processes performed by the first mobile device 13910, the second mobile device 13915, the cloud server 13940, and the NFC tag 13902, which have been described above with reference to FIGS. 144 through 147, are synthetically described. Accordingly, details described with reference to FIGS. 144 through 147 may also be applied to details described with reference to FIG. 148.

In operation 14801, the first mobile device 13910 executes a printing application.

In operation 14802, the first mobile device 13910 activates an NFC tagging mode of the printing application.

In operation 14803, the cloud server 13940 transmits the ID information of the agent application 13901 installed in the computing device 13920 to the first mobile device 13910.

In operation 14804, the first mobile device 13910 writes the ID information of the agent application 13901 on the NFC tag 13902.

In operation 14805, the second mobile device 13915 executes the printing application.

In operation 14806, the second mobile device 13915 activates the NFC tagging mode of the printing application.

In operation 14807, the second mobile device 13915 reads the ID information of the agent application 13901 written on the NFC tag 13902.

In operation 14808, the second mobile device 13915 transmits the read ID information and the phone number of the second mobile device 13915 to the cloud server 13940.

In operation 14809, the cloud server 13940 registers the phone number of the second mobile device 13915 after mapping the phone number of the second mobile device 13915 to the agent application 13901 corresponding to the read ID information.

In operation 14810, the cloud server 13940 transmits the registration information to the second mobile device 13915.

FIG. 149 is a flowchart illustrating a method of registering the second mobile device 13915 in a cloud printing service by using the NFC tag 13902, according to an embodiment. Since the method of FIG. 149 includes operations that are performed in time series by the cloud printing system 139 of FIGS. 139 through 148, details described above with reference to FIGS. 139 through 148 may also be applied to the method of FIG. 149 even if omitted.

In operation 14901, the first mobile device 13910 receives the ID information of the agent application 13901 in which the phone number of the first mobile device 13910 is registered, from the cloud server 13940.

In operation 14902, the first mobile device 13910 writes the received ID information on the NFC tag 13902.

In operation 14903, the second mobile device 13915 reads the written ID information from the NFC tag 13902.

In operation 14904, the second mobile device 13915 transmits a registration request generated by using the read ID information to the cloud server 13940.

In operation 14905, the cloud server 13940 registers the second mobile device 13915 in the agent application 13901 based on the transmitted registration request.

In order to use the cloud printing service described above, a process of registering an image forming apparatus, such as a printer, a scanner, or a multi-function product (MFP), in a server after mapping the image forming apparatus to a phone number is necessary. Hereinabove, a method of tagging a mobile terminal to an NFC tag of an image forming apparatus has been described as a device registration method.

However, in the device registration method through NFC tagging, it may be difficult to recognize a location of an image forming apparatus supporting a cloud printing service, and moreover, it is not possible to register an image forming apparatus that does not support an NFC tag.

Accordingly, one or more embodiments for registering an image forming apparatus in a cloud printing server through an augmented reality application, a Bluetooth® communication, or QR code reading are suggested. Such one or more embodiments will now be described in detail with reference to FIGS. 150 through 168.

FIG. 150 is a diagram of a cloud printing system capable of device registration through an augmented reality application, a Bluetooth®, or QR code reading, according to an embodiment.

Referring to FIG. 150, the cloud printing system may include a cloud printing server 15010, a mobile terminal 15020, and an image forming apparatus 15030. In order to use a cloud printing service, the image forming apparatus 15030 needs to be registered in the cloud printing server 15010 correspondingly to a predetermined phone number as described above. In an embodiment, it is assumed that the image forming apparatus 15030 is registered in the cloud printing server 15010 to correspond to a phone number of the mobile terminal 15020.

In an embodiment, the mobile terminal 15020 requests the cloud printing server 15010 for a device registration of the image forming apparatus 15030. In order to request for the device registration, device information about the image forming apparatus 15030 is required together with the phone number of the mobile terminal 15020. The device information may include at least one of an MAC address, an IP address, a serial number, a host name, a model name, or capability of the image forming apparatus 15030.

Accordingly, the mobile terminal 15020 obtains the device information about the image forming apparatus 15030 through at least one of an augmented reality application, a Bluetooth® communication, and QR code reading, and requests for the device registration while transmitting the obtained device information and the phone number of the mobile terminal 1520 to the cloud server 15010.

Detailed processes of obtaining the device information about the image forming apparatus 15030, and performing the device registration through at least one of the augmented reality application, the Bluetooth® communication, and the QR code reading will now be described in detail with reference to accompanying drawings.

FIGS. 151 through 155 are diagrams for describing in detail a method of registering an image forming apparatus by using an augmented reality application.

FIG. 151 is a diagram of a cloud printing system capable of registering the image forming apparatus 15030 by using an augmented reality application, according to an embodiment.

Referring to FIG. 151, indoor positioning system (IPS) information and device information of the image forming apparatus 15030 are first registered in the cloud printing server 15010.

An IPS is a system for determining a location of a person or an object in a building by using a wireless communication apparatus mostly indoors where a global positioning system (GPS) does not reach, and may use any one of triangulation using Wi-Fi® or Bluetooth®, a fingerprint method, and various methods using infrared rays, an acoustic analysis, an electronic tag (RFID), and various sensors. In other words, IPS information corresponds to location information for determining a location indoors. Considering that an image forming apparatus is generally located indoors, it is assumed that IPS information is used.

The device information of the image forming apparatus 15030 may be an MAC address, and may further include a model name and supportability of a cloud printing service.

The mobile terminal 15020 executes the augmented reality application, and photographs the image forming apparatus 15030. The mobile terminal 15020 may request for IPS information and device information stored in the cloud printing server 15010. In response, the cloud printing server 15010 transmits the IPS information and the device information to the mobile terminal 15020. The cloud printing server 15010 may extract and transmit IPS information and device information of an image forming apparatus adjacent to the mobile terminal 15020 from among the stored IPS information and the stored device information.

The mobile terminal 15020 may recognize the image forming apparatus 15030 photographed by the augmented reality application, by using the received IPS information. In detail, an image forming apparatus may be found from a captured screen of the augmented reality application through the location of the image forming apparatus 15030 determined from the received IPS information.

After finding the image forming apparatus from the captured screen, the device information of the image forming apparatus 15030 received from the cloud printing server 15010 may be displayed at a location corresponding to the found image forming apparatus. The displayed device information may include a model name of the image forming apparatus 15030 or supportability of a cloud printing service.

In FIG. 151, the model name, i.e., "ML-2020", of the image forming apparatus 15030 is displayed in a region 15101 of a screen of the augmented reality application. Also, when the image forming apparatus is found from the captured screen, a button 15102 for device registration and a button 15103 for performing printing may be additionally displayed.

When the button 15102 for device registration is selected, the mobile terminal 15020 requests the cloud printing server 15010 for device registration while transmitting a phone number of the mobile terminal 15020 together with the MAC address of the image forming apparatus 15030. When the button 15102 for performing printing is selected, the image forming apparatus 15030 performs printing.

In order for the mobile terminal 15020 that executed the augmented reality application to receive the IPS information and the MAC address from the cloud printing server 15010, the IPS information and the MAC address need to be prestored in the cloud printing server 15010.

When the image forming apparatus 15030 is able to obtain or generate the IPS information, the image forming apparatus 15030 may directly transmit the IPS information and the MAC address to the cloud printing server 15010. However, when the image forming apparatus 15030 is unable to obtain or generate the IPS information, the mobile terminal 15020 may obtain or generate the IPS information and transmit the obtained or generated IPS information to the cloud printing server 15010.

FIG. 152 is a diagram illustrating example of registering IPS information and an MAC address in the cloud printing server 15010 respectively when the image forming apparatus 15030 is able to generate the IPS information. FIG. 153 is a diagram illustrating example of registering IPS information and an MAC address in the cloud printing server 15010 respectively when the image forming apparatus 15030 is unable to generate the IPS information.

Referring to FIG. 152, the image forming apparatus 15030 directly obtains or generates the IPS information, and transmits the IPS information to the cloud printing server 15010, together with the MAC address of the image forming apparatus 15030. For example, the image forming apparatus 15030 may generate the IPS information by determining an indoor location based on location information and strength of a connection signal of a wireless AP connected via Wi-Fi, or by using any one of well-known various methods. The cloud printing server 15010 stores the MAC address and the IPS information in a table 15201 after mapping the IPS information to the MAC address.

Referring to FIG. 153, the mobile terminal 15020 generates the IPS information of the image forming apparatus 15030 since the image forming apparatus 15030 is unable to directly obtain or generate the IPS information. Then, the mobile terminal 15020 receives the MAC address from the image forming apparatus 15030, and transmits the received MAC address and the generated IPS information to the cloud printing server 15010. The cloud printing server 15010 stores the MAC address and the IPS information in a table 15301 after mapping the IPS information to the MAC address.

A method of the mobile terminal 15020 generating the IPS information of the image forming apparatus 15030 may vary. For example, the mobile terminal 15020 is connected to the image forming apparatus 15030 via Bluetooth® and measures a distance between the mobile terminal 15020 and the image forming apparatus 15030 by measuring strength of a connection signal, and determines a location of the mobile terminal 15020 based on a location of a connected base station or a wireless AP. Then, the mobile terminal 15020 may generate the IPS information by using the location of the mobile terminal 15020 and the distance between the mobile terminal 15020 and the image forming apparatus 15030. Alternatively, the mobile terminal 15020 may receive the IPS information from an external IPS information providing system.

FIG. 154 is a diagram illustrating a detailed process of a method of registering the image forming apparatus 15030 by using an augmented reality application, according to an embodiment.

Referring to FIG. 154, the cloud printing server 15010 stores the IPS information and the device information of the image forming apparatus 15030 in operation 15401. In detail, the cloud printing server 15010 receives the MAC address together with the IPS information of the image forming apparatus 15030, maps the IPS information to the MAC address, and stores the IPS information and the MAC address in a table. The IPS information of the image forming apparatus 15030 may be received directly from the image forming apparatus 15030 or received from the mobile terminal 15020 or an external system.

In operation 15402, the mobile terminal 15020 executes the augmented reality application to photograph the image forming apparatus 15030. The mobile terminal 15020 requests the cloud printing server 15010 for the IPS information and the device information, in operation 15403. The cloud printing server 15010 transmits the IPS information and the device information, which are pre-stored, to the mobile terminal 15020 in operation 15404. The cloud printing server 15010 may extract and transmit only IPS information and device information of an image forming apparatus adjacent to the mobile terminal 15020, from among the pre-stored IPS information and the pre-stored device information. In this case, the mobile terminal 15020 may transmit the location information of the mobile terminal 15020 to the cloud printing server 15010 while requesting for the IPS information and the device information in operation 15403, and the cloud printing server 15010 may extract the IPS information and the device information of the image forming apparatus adjacent to the mobile terminal 15020 based on the received location information of the mobile terminal 15020.

In operation 15405, the mobile terminal 15020 may recognize the image forming apparatus 15030 photographed by using the received IPS information. In detail, a location corresponding to the received IPS information is searched for in the captured screen of the augmented reality application, and it may be recognized that the image forming apparatus 15030 exists in the searched location.

In operation 15406, the received device information is displayed on the captured screen of the augmented reality application. In other words, the device information received in operation 15404 is displayed at the location of the image forming apparatus 15030 recognized in operation 15405. The displayed device information may be the model name of the image forming apparatus 15030, and may also include supportability of a cloud printing service. An example of a screen of an augmented reality application on which device information is displayed is shown in FIG. 151.

In operation 15407, the mobile terminal 15020 receives a request for device registration. A user may check the image forming apparatus 15030 and the device information of the image forming apparatus 15030 from the screen of the augmented reality application, and request for device registration of the image forming apparatus 15030. For example, a button for device registration may also be displayed on the screen of the augmented reality application where a captured image and the device information of the image forming apparatus 15030 are displayed, and the user may touch the button to request for the device registration.

In operation 15408, the mobile terminal 15020 may transmit the phone number and the device information to the cloud printing server 15010 to request the cloud printing server 15010 to register the image forming apparatus 15030. In detail, the mobile terminal 15020 may transmit the MAC address of the image forming apparatus 15030 from among the device information to the cloud printing server 15010, together with the phone number of the mobile terminal 15020 to request for registration. In response, the cloud printing server 15010 may store the phone number and the MAC address after mapping the MAC address to the phone number, thereby registering the image forming apparatus 15030 as a device capable of using a cloud printing service.

FIG. 155 is a flowchart illustrating a method of registering an image forming apparatus by using an augmented reality application, according to an embodiment.

Referring to FIG. 155, IPS information and device information of the image forming apparatus are stored in a cloud printing server in operation 15501. The cloud printing server stores the IPS information after mapping the IPS information to an MAC address of the image forming apparatus.

In operation 15502, a mobile terminal executes the augmented reality application and photographs the image forming apparatus.

In operation 15503, the mobile terminal obtains the IPS information and the device information of the image forming apparatus from the cloud printing server.

In operation 15504, the mobile terminal displays the device information of the image forming apparatus on a captured image by using the received IPS information. In detail, the mobile terminal may search for a location corresponding to the received IPS information from a captured screen of the augmented reality application, and recognize that the image forming apparatus exists at the searched location. Also, the mobile terminal may display a model name of the image forming apparatus and supportability of a cloud printing service, which are included in the received device information, on the location of the image forming apparatus in the captured image.

In operation 15505, the mobile terminal receives a request for device registration. A button for device registration may be displayed on a screen of the augmented reality application executed in the mobile terminal, and when a user touches the button, the mobile terminal receives the request for device registration regarding the image forming apparatus displayed on the screen.

In operation 15506, the mobile terminal transmits a phone number and the device information to the cloud printing server, and requests the cloud printing server for device registration of the image forming apparatus. In response, the cloud printing server may register the image forming apparatus after mapping an MAC address included in the received device information to the received phone number.

FIG. 156 is a diagram of a cloud printing system capable of registering the image forming apparatus 15030 through QR code reading, according to an embodiment.

Referring to FIG. 156, the cloud printing system capable of registering the image forming apparatus 15030 through QR code reading may include the cloud printing server 15010, the mobile terminal 15020, the image forming apparatus 15030, and a QR code 15031 on which the device information of the image forming apparatus 15030 is recorded.

The QR code 15031 may be manufactured in a sticker to be attached to an outer surface of the image forming apparatus 15030, or may be printed on a test page output after setting the image forming apparatus 15030.

When the user executes a mobile application of a cloud printing service in the mobile terminal 15020 and selects device registration using a QR code from menus of the mobile application, the mobile terminal 15020 is switched to a state for reading a QR code. Then, when the user photographs the QR code 15031 by using the mobile terminal 15020, the device information including the MAC address of the image forming apparatus 15030, which is stored in the QR code 15031 is obtained. Next, the mobile terminal 15020 transmits the phone number of the mobile terminal 15020 to the cloud printing server 15010, together with the obtained device information of the image forming apparatus 15030, and requests the cloud printing server 15010 for device registration. The cloud printing server 15010 registers the image forming apparatus 15030 after mapping the device information to the received phone number.

FIG. 157 is a diagram for describing a detailed process of a method of registering the image forming apparatus 15030 through QR code reading, according to an embodiment.

In operation 15701, the image forming apparatus 15030 transmits the device information including the MAC address and the model name to the cloud printing server 15010 when power is turned on.

In operation 15702, the cloud printing server 15010 stores the received device information, and maintains a connection with the image forming apparatus 15030. In detail, the cloud printing server 15010 receives and stores the MAC address and the model name from the image forming apparatus 15030 via a wireless connection, such as Bluetooth®. Then, the wireless connection used for transmission is not released but maintained. The MAC address and the model name are mapped to the maintained wireless connection.

In operation 15703, the mobile terminal 15020 may obtain the MAC address and the model name of the image forming apparatus 15030 by photographing a QR code attached to the image forming apparatus 15030. When the user executes the mobile application of the cloud printing service in the mobile terminal 15020 and selects a device registration menu using a QR code from the mobile application, the mobile terminal 15020 is changed to a state for photographing a QR code. Then, the mobile terminal 15020 photographs a QR code and obtains device information stored in the QR code.

In operation 15704, the mobile terminal 15020 transmits the MAC address and the model name of the image forming apparatus 15030, together with the phone number of the mobile terminal 15020.

In operation 15705, the cloud printing server 15010 maps the phone number to an existing connection by using the MAC address of the image forming apparatus 15030 as a key value. In detail, as described above, the cloud printing server 15010 maintains the connection with the image forming apparatus 15030 in operation 15702, and the MAC address of the image forming apparatus 15030 is mapped to the maintained connection. Accordingly, the cloud printing server 15010 is able to find a connection corresponding to the MAC address received in operation 15704, and map the phone number of the mobile terminal 15020 also received in operation 15704 to the connection.

FIG. 158 is a flowchart illustrating a method of registering an image forming apparatus through QR code reading, according to an embodiment.

Referring to FIG. 158, a mobile terminal photographs a QR code attached to the image forming apparatus to obtain an MAC address and a model name of the image forming apparatus, in operation 15801.

In operation 15802, the mobile terminal transmits the obtained MAC address and the obtained model name to a cloud printing server, together with a phone number of the mobile terminal.

In operation 15803, the cloud printing server registers the image forming apparatus after mapping the MAC address and the model name to the received phone number.

FIG. 159 is a diagram of a cloud printing system capable of direct registration of the image forming apparatus 15030, according to an embodiment.

Referring to FIG. 159, the cloud printing system capable of direct registration of the image forming apparatus 15030 may include the cloud printing server 15010, the mobile terminal 15020, and the image forming apparatus 15030.

The image forming apparatus 15030 may display a UI screen 15901 for device registration on a display unit (display). A user 15040 may input the phone number of the mobile terminal 15020 to the UI screen 15901 via an input device of the image forming apparatus 15030. When the phone number of the mobile terminal 15020 is input, the image forming apparatus 15030 may request the cloud printing server 15010 for device registration by transmitting the input phone number and the MAC address of the image forming apparatus 15030. In response, the cloud printing server 15010 stores the phone number and the MAC address after mapping the MAC address to the phone number.

FIG. 160 is a diagram for describing a detailed process of a method of directly registering the image forming apparatus 15030, according to an embodiment.

Referring to FIG. 160, the image forming apparatus 15030 transmits the MAC address and the model name to the cloud printing server 15010 when power is turned on, in operation 16001.

In operation 16002, the cloud printing server 15010 stores received information and maintains a connection with the image forming apparatus 15030. In detail, the cloud printing server 15010 receives and stores the MAC address and the model name from the image forming apparatus 15030 through a wireless connection, such as Bluetooth®. Then, the wireless connection used for transmission is not released but maintained. The received MAC address and the model name are mapped to the maintained wireless connection.

In operation 16003, the image forming apparatus 15030 displays a UI screen for device registration on a display unit.

In operation 16004, the image forming apparatus 15030 receives a phone number of a mobile terminal from a user through the UI screen.

In operation 16005, the image forming apparatus 15030 transmits the input phone number and the MAC address to the cloud printing server 15010.

In operation 16006, the cloud printing server 15010 maps the phone number to an existing connection by using the received MAC address as a key value. In detail, the cloud printing server 15010 maintains the connection with the image forming apparatus 15030 as described above in operation 16002, and the MAC address of the image forming apparatus 15030 is mapped to the maintained connection. Accordingly, the cloud printing server 15010 is able to find a connection corresponding to the MAC address received in operation 16005, and map the phone number of the mobile terminal 15020 received in operation 16005.

FIG. 161 is a flowchart illustrating a method of directly registering an image forming apparatus, according to an embodiment.

Referring to FIG. 161, a UI screen for device registration is displayed on a display unit of an image forming apparatus in operation 16101.

In operation 16102, a phone number to be registered is received through the UI screen from a user.

In operation 16103, the image forming apparatus transmits the received phone number to a cloud printing server, together with an MAC address, to request the cloud printing server for device registration. In response, the cloud printing server stores the received phone number and the MAC address after mapping the MAC address to the received phone number.

FIG. 162 is a diagram of a cloud printing system capable of registering the image forming apparatus 15030 by using a Bluetooth®, according to an embodiment.

Referring to FIG. 162, the cloud printing system capable of registering the image forming apparatus 15030 by using the Bluetooth® may include the cloud printing server 15010, the mobile terminal 15020, and the image forming apparatus 15030. The mobile terminal 15020 and the image forming apparatus 15030 may support the Bluetooth®.

The mobile terminal 15020 may obtain the device information from the image forming apparatus 15030 by being connected to the image forming apparatus 15030 via the Bluetooth®. The received device information may include an MAC address, an IP address, a serial number, a host name, a model name, and capability of the image forming apparatus 15030.

The mobile terminal 15020 may request the cloud printing server 15010 for device registration of the image forming apparatus 15030 by transmitting the obtained device information and the phone number of the mobile terminal 15020 to the cloud printing server 15010. In response, the cloud printing server 15010 stores the received phone number and the device information after mapping the device information to the received phone number.

Device information of image forming apparatuses may be pre-stored in the cloud printing server 15010. Also, whether each image forming apparatus is registered may be recorded in the pre-stored device information. Accordingly, upon receiving device information from the mobile terminal 15020, the cloud printing server 15010 may compare the received device information and pre-stored device information to notify the mobile terminal 15020 whether an image forming apparatus corresponding to the received device information is already registered. When the image forming apparatus 15030 is a nonregistered device, the mobile terminal 15020 may request the cloud printing server 15010 for device registration of the image forming apparatus 15030.

FIG. 163 is a diagram for describing a process of storing device information of image forming apparatuses 15030*a* and 15030*b* pre-registered in the cloud printing server 15010 during a method of registering an image forming apparatus by using a Bluetooth®, according to an embodiment.

Referring to FIG. 163, the image forming apparatuses 15030*a* and 15030*b* transmit device information to the cloud printing server 15010. The device information may be transmitted through a Bluetooth®. The cloud printing server 15010 stores the received device information in a table 16301. Although not shown, the table 16301 may show whether an image forming apparatus corresponding to each piece of device information is a registered device.

FIG. 164 is a diagram for describing a process of the mobile device 15020 obtaining device information from the image forming apparatus 15030*a* during a method of registering an image forming apparatus by using a Bluetooth®, according to an embodiment.

Referring to FIG. 164, the mobile terminal 15020 receives device information 16402 from the image forming apparatus 15030*a* and device information 16401 from the image forming apparatus 15030*b*. The received device information 16401 and 16402 may include capability, such as color printability and double-side printability, and current state information.

The mobile terminal 15020 may transmit the received device information 16401 and 16402 to the cloud printing server 15010 to inquire registration of the image forming apparatuses 15030*b* and 15030*a* respectively corresponding to the device information 16401 and 16402. The cloud printing server 15010 compares the received device information 16401 and 16402 with pre-stored device information, and transmits a response regarding the registration to the mobile terminal 15020.

The mobile terminal 15020 may transmit a registration request for a nonregistered device to the cloud printing server 15010, together with the phone number of the mobile terminal 15020. In FIG. 164, if the image forming apparatus 15030*a* is a registered device but the image forming apparatus 15030*b* is a nonregistered device, the mobile terminal 15020 may request the cloud printing server 15010 for device registration by transmitting the device information 16401 of the image forming apparatus 15030*b* to the cloud printing server 15010, together with the phone number of the mobile terminal 15020. In response, the cloud printing server 15010 stores the received phone number and the device information 16401 after mapping the device information 16401 to the received phone number.

FIG. 165 is a diagram for describing a detailed process of a method of registering the image forming apparatus 15030 by using a Bluetooth®, according to an embodiment.

Referring to FIG. 165, the image forming apparatus 15030 transmits and stores the device information of the image forming apparatus 15030 to and in the cloud printing server 15010 when power is turned on.

In operation 16502, the mobile terminal 15020 obtains the device information from the image forming apparatus 15030 through the Bluetooth®.

In operation 16503, the mobile terminal 15020 inquires device registration of the image forming apparatus 15030 by transmitting the device information to the cloud printing server 15010.

In operation 16504, the cloud printing server 15010 compares pre-stored device information and the device information received in operation 16503 to determine the device registration, and transmits a result of the determining to the mobile terminal 15020.

When it is determined that the image forming apparatus 15030 is a nonregistered device, the mobile terminal 15020 transmits the device information and the phone number to the cloud printing server 15010 to request for device registration in operation 16505.

FIG. 166 is a diagram for describing a detailed process of a method of performing cloud printing by using a Bluetooth®, according to an embodiment.

Referring to FIG. 166, the image forming apparatus 15030 transmits and stores the device information to and in the cloud printing server 15010 when power is turned on, in operation 16601.

In operation 16602, the mobile terminal 15020 transmits a print request to the cloud printing server 15010 after setting print options, such as color printability and double-side printability.

In operation 16603, the cloud printing server 15010 compares pre-stored device information and the received print options so as to transmit print data to the image forming apparatus 15030 capable of printing according to the received print options.

The image forming apparatus 15030 prints the received print data in operation 16604, and transmits a result of the printing the print data to the mobile terminal 15020 in operation 16605. In detail, the image forming apparatus 15030 may transmit the result about whether the printing was successful or whether the printing failed since the image forming apparatus 15030 is not capable of printing, to the mobile terminal 15020. If an error message that the printing failed is transmitted to the mobile terminal 15020, a user checks the error message through the mobile terminal 15020, and request another image forming apparatus to print the print data. In this case, the cloud printing server 15010 may search for an image forming apparatus capable of printing the print data according to the print option by using the device information, and transmit the print data and a print command to the searched image forming apparatus.

FIG. 167 is a flowchart illustrating a method of registering an image forming apparatus by using a Bluetooth®, according to an embodiment.

Referring to FIG. 167, device information of an image forming apparatus is stored in a cloud printing server in operation 16701. In detail, the image forming apparatus transmits the device information to the cloud printing server when power is turned on, and the cloud printing server may store the received device information in a table. The cloud printing server may record whether the image forming apparatus corresponding to the stored device information is a registered device.

In operation 16702, a mobile terminal may obtain device information of an adjacent image forming apparatus via a Bluetooth® connection. Device information may include current state information and capability, such as color printability and double-side printability.

When the mobile terminal transmits the obtained device information to the cloud printing server in operation 16703, the cloud printing server compares the stored device information and the received device information to determine whether the adjacent image forming apparatus corresponding to the received device information is a registered device in operation 16704, and transmits a result of the determining to the mobile terminal.

When it is determined that the adjacent image forming apparatus is a nonregistered device in operation 16704, the mobile terminal transmits the device information obtained in operation 16702 to the cloud printing server, together with a phone number of the mobile terminal, and requests the cloud printing server for device registration, in operation 16705.

In operation 16706, the cloud printing server registers the image forming apparatus correspondingly to the received phone number.

FIG. 168 is a flowchart illustrating a method of registering an image forming apparatus through an augmented reality application, a Bluetooth®, or QR code reading, according to an embodiment.

In operation 168, a mobile terminal obtains device information of the image forming apparatus through at least one of an augmented reality application, a Bluetooth® communication, and QR code reading, in operation 16801.

In operation 16802, the mobile terminal requests a cloud printing server for device registration by transmitting the obtained device information together with a phone number of the mobile terminal.

In operation 16803, the cloud printing server registers the image forming apparatus correspondingly to the received phone number.

Generally, when a plurality of files including several contents are to be uploaded but some of the plurality of files are not properly uploaded or are damaged, a mobile terminal determines that an entire uploading operation failed even if the other some of the plurality of files are uploaded in a cloud server and re-uploads the plurality of files, thereby unnecessarily inducing traffics and unnecessarily wasting a storage space. Also, when one file including content is to be transmitted to several users, the file is uploaded for each user, thereby unnecessarily including traffics and unnecessarily wasting a storage space.

One or more embodiments provide a method of uploading print content and a print job to a cloud server by using a content key.

According to one or more embodiments, a mobile terminal uploads print content and a print job to a cloud server by using a content key, without unnecessarily inducing traffics.

According to one or more embodiments, by using a content key, a mobile terminal does not upload a plurality of files and thus traffics are not unnecessarily induced. Also, the mobile terminal uploads a file which is duplicated between users only once and thus a storage space may be saved.

Such one or more embodiments will now be described in detail with reference to FIGS. 169 through 186.

FIG. 169 is a diagram of an environment of a user uploading content to be printed and a print job to a cloud server by using a mobile terminal 16900.

Referring to FIG. 169, the user uploads, to the cloud server, content to be printed and a print job related to the content to be printed, by using the mobile terminal 16900. The cloud server may include a management server 17001 and a content server 17010. Here, the management server 17001 is a server that performs a function of generating and managing the print job related to content, which is uploaded by the user by using the mobile terminal 16900. The content server 17010 is a server that performs a function of storing content related to a print job. One server does not perform all functions, but functions may be divided and a plurality of servers may respectively perform the divided functions so as to reduce a load of each server.

The user may first select content to be uploaded by using the mobile terminal 16900. At the same time, the user may select a job to be performed in relation to the content to be uploaded, by using the mobile terminal 16900. For example, the user uploads 'a.jpg', 'b.jpg', and 'c.jpg' files including drawing contents to a space in the cloud server by using the mobile terminal 16900, and later wants to print the 'a.jpg', 'b.jpg', and 'c.jpg' files through an image forming apparatus registered in the cloud server by accessing the cloud server by using the mobile terminal 16900.

In operation 16901, the mobile terminal 16900 transmits a job upload request regarding content selected by the user, to the management server 17001.

In operation 16902, the management server 17001 transmits content received from the mobile terminal 16900 to the content server 17010 such that the content is stored in the content server 17010. Here, the management server 17001 may transmit the content together with the job upload request. The content server 17010 receives the content from the management server 17001, and stores the received content.

In operation 16903, when the content is stored in the content server 17010, the management server 17001 may generate job data related to the stored content. In other words, the management server 17001 may generate a job identifier, and map and store the generated job identifier and the stored content, thereby generating the job data. For example, the management server 17001 uploads the 'a.jpg', 'b.jpg', and 'c.jpg' files to an individual cloud space assigned to the user at once. Here, the mobile terminal 16900 calls an API once with respect to the 'a.jpg', 'b.jpg', and 'c.jpg' files from the management server 17001. When the 'a.jpg', 'b.jpg', and 'c.jpg' files are all uploaded to the content server 17010, the management server 17001 generates jobs with respect to the job upload request.related to the 'a.jpg', 'b.jpg', and 'c.jpg' files. The management server 17001 may manage the generated jobs in a form of a table. Here, the table may include a job identifier, a content identifier, and a phone number. While generating the jobs, the management server 17001 may generate a job for each of the 'a.jpg', 'b.jpg', and 'c.jpg' files. Since the jobs are registered in the management server 17001 when there are no jobs, the registered job identifiers may be '1', '2', and '3' in sequence. Also, the management server 17001 may store 'a.jpg', 'b.jpg', and 'c.jpg' as content identifiers in sequence in relation to currently generated jobs.) In addition, the management server 17001 may store metadata (a file name or a file size) of each file together with each job.

After the content (file) to be printed and the print job related to the content (file) are uploaded (stored) in the cloud server, the user may download and print the uploaded content (file).

The management server 17001 may store the print job regarding the content (file) in a storage space corresponding to mobile terminal ID information. Here, the mobile terminal ID information may be a phone number of the mobile terminal 16900.

If the user wants to upload a print job regarding content to an individual cloud space assigned to the user by using the mobile terminal 16900, the user may be able to transmit a job upload request regarding the content to the management server 17001 without having to separately input the mobile terminal ID information. At this time, the mobile terminal 16900 may check a subscriber ID number (i.e., the phone number of the mobile terminal 16900) stored in a USIM chip of the mobile terminal 16900, and transmit the subscriber ID number together with the job upload request. Accordingly, the management server 17001 may determine storage spaces according to subscriber ID numbers, and store print jobs in the determined storage spaces. For example, the user may store a print job in an individual storage space corresponding to a phone number '010-xxx-xxxx' of the mobile terminal 16900. Here, the storage spaces are not limitedly divided physically, but may be logically divided. In other words, if storage spaces are logically divided, even if the storage spaces are physically divided, the storage devices are divided according to phone numbers since the storage spaces are mapped and managed according to the phone numbers. For convenience of description, a job table includes a phone number field, but a corresponding relation between the phone number field and the job table may be separately managed in a form of a mapping table or may be managed by storing the job table in storage spaces according to phone numbers.

The user may transmit content to be printed and a print job to several other users. In operation 16901, in order to transmit the print job to the several other users, the user may input phone numbers of the several other users to the mobile terminal 16900 and transmit a job upload request regarding the content to the management server 17001, together with the phone numbers of the several other users, by using the mobile terminal 16900. For example, the mobile terminal 16900 may transmit a print job upload request regarding 'a.jpg' that is drawing content to phone numbers '010-yyy-yyyy' and '010-zzz-zzzz' of the several other users.

In operation 16902, the management server 17001 may transmit content to the content server 17010 such that the content is stored in the content server 17010. Here, if the same content is stored according to users, the content server 17010 stores the same content several times according to the users. For example, when the mobile terminal 16900 transmits a job upload request regarding the 'a.jpg' to the phone numbers '010-yyy-yyyy' and '010-zzz-zzzz' of the several other users, the content server 17010 stores the 'a.jpg' in storage spaces respectively mapped to the phone numbers '010-yyy-yyyy' and '010-zzz-zzzz'. Thus, the content server 17010 stores 'a.jpg' twice.

In operation 16903, the management server 17001 may generate job data in a form of a mapping table in which a job identifier and content are mapped. Here, a job table may be generated in a storage space mapped to a phone number of a mobile terminal. For example, the job table is generated in each storage space mapped to the phone number '010-yyy-yyyy'. The management server 17001 may generate and store a job table having rows in which a job identifier is '1' and a content identifier field is 'a.jpg', in the storage space mapped to the phone number '010-yyy-yyyy'. Also, the management server 17001 may generate and store a job table having rows in which a job identifier is '1' and a content identifier field is 'a.jpg', in the storage space mapped to the phone number '010-zzz-zzzz'.

Referring to FIG. 169, the user uploads a job regarding content to the cloud server by using the mobile terminal 16900, and several files are uploaded simultaneously for the job. At this time, if only some of the several files are stored in the cloud server while the other some of the several files are not stored in the cloud server, the cloud server notifies the mobile terminal 16900 that all of the several files are not stored, and thus the mobile terminal 16900 transmits all of the several files again despite that some of the several files are already stored in the cloud server. Accordingly, traffics are unnecessarily induced and a storage space is unnecessarily wasted.

Also, if the user transmits a job upload request regarding the same content to other several users by using the mobile terminal 16900, the same content is uploaded to the cloud server several times according to the other several users, and thus traffics are unnecessarily induced and a storage space is unnecessarily wasted by storing the same content several times.

FIG. 170 is a block diagram of a cloud server 17000 according to an embodiment.

The cloud server 17000 according to an embodiment may receive a user input indicating a job request regarding content from the mobile terminal 16900, store the content according to the received user input, obtain a content key corresponding to the stored content, and transmit the obtained content key to the mobile terminal 16900. Then, the cloud server 17000 may receive the job request together with the content key from the mobile terminal 16900 and perform a job on the stored content corresponding to the received content key according to the received job request.

Referring to FIG. 170, the cloud server 17000 may include a receiver 17005, a transmitter 17015, a controller 17025, and a storage unit 17035.

The receiver 17005 may receive data from an external device. In detail, the receiver 17005 may receive a user input indicating a job request regarding content from the mobile terminal 16900. The receiver 17005 may receive the job request from the mobile terminal 16900 together with a content key received from the transmitter 17015.

The transmitter 17015 may transmit data to the external device. Upon successfully storing content received from the mobile terminal 16900, the transmitter 17015 may transmit a content key corresponding to the stored content to the mobile terminal 16900.

The controller 17025 may control components (the transmitter 17015, the receiver 17005, and the storage unit 17035) included in the cloud server 17000. In detail, the controller 17025 may further include an obtainer 17026, a job manager 17027, a job performer 17028, and an authenticator 17029. The obtainer 17026 may perform a function of obtaining content and a content key. The job manager 17027 may perform a management function, such as generating or deleting a job mapped to a content key. The job performer 17028 may perform a function of performing a job generated by the job manager 17027. The authenticator 17029 may authenticate a mobile terminal ID number, and at this time, generate a PIN code and an access token.

The controller 17025 may control the receiver 17005 to receive a user input indicating a job request regarding content, from the mobile terminal 16900. Also, the controller 17025 may control the storage unit 17035 to store the content according to the user input received from the receiver 17005. The controller 17025 may obtain a content key corresponding to the stored content. In other words, the content key may be generated and obtained under a control of the controller 17025.

The controller 17025 may control the transmitter 17015 to transmit the obtained content key. The controller 17025 may control the receiver 17005 to receive a job request from the mobile terminal 16900, together with the content key from the transmitter 17015. The controller 17025 may perform a job on the stored content corresponding to the received content key, based on the received job request.

The controller 17025 may control the receiver 17005 to receive an identifier stored in the storage unit 17035 from the mobile terminal 16900. The controller 17025 may control the storage unit 17035 to obtain a content key mapped to a job identifier, and control the storage unit 17035 to obtain content stored in the storage unit 17035 by using the obtained content key. The controller 17025 may perform a job on the content obtained from the storage unit 17035.

A job request regarding content, which is received from the mobile terminal 16900, may be destined for a predetermined phone number, and the controller 17025 may control the receiver 17005 to receive a confirmation request on a job identifier stored in the storage unit 17035 from a mobile terminal corresponding to the predetermined phone number. The controller 17025 may control the transmitter 17015 to transmit a job list including the job identifier corresponding to the confirmation request received from the receiver 17005 to the mobile terminal corresponding to the predetermined phone number.

The controller 17025 may control the receiver 17005 to receive, from the mobile terminal corresponding to the predetermined phone number, a print job request including at least one job identifier included in the job list transmitted from the transmitter 17015. The controller 17025 may control the storage unit 17035 to obtain a content key corresponding to the job identifier included in the received print job request. The controller 17025 may control the storage unit 17035 to obtain content stored in the storage unit 17035 by using the content key corresponding to the job identifier obtained from the storage unit 17035. The controller 17025 may control the transmitter 17015 to transmit content obtained from the storage unit 17035 to an image forming apparatus corresponding to a mobile terminal ID information such that an image forming job of the content is performed by the image forming apparatus.

The controller 17025 may control the receiver 17005 to receive, from a mobile terminal, a content preview request including at least one job identifier included in the job list transmitted from the transmitter 17015. The controller 17025 may control the storage unit 17035 to obtain a content key corresponding to the at least one job identifier included in the content preview request received from the receiver 17005. The controller 17025 may control the storage unit 17035 to obtain content stored in the storage unit 17035 by using the content key corresponding to the at least one job identifier obtained from the storage unit 17035. The controller 17025 may generate preview data of the obtained content, and control the storage unit 17035 to store the generated preview data.

The controller 17025 may control the transmitter 17015 to transmit location information of the preview data to the mobile terminal that transmitted the content preview request to the cloud server 17000 such that the mobile terminal checks the preview data.

The controller 17025 may control the receiver 17005 to receive an authentication request from the mobile terminal 16900. The controller 17025 may generate a PIN code corresponding to mobile terminal ID information based on the authentication request received from the receiver 17005. The controller 17025 may control the transmitter 17015 to transmit a message including the PIN code to the mobile terminal 16900 such that the mobile terminal 16900 checks the message. The controller 17025 may control the receiver 17005 to receive a PIN code confirmation request including a PIN code from the mobile terminal 16900, in response to the message transmitted from the transmitter 17015. If it is determined that the PIN code included in the PIN code confirmation request is the same as the PIN code included in the message, an access token corresponding to the mobile terminal 16900 is generated and obtained under a control of the controller 17025. The controller 17025 may control the transmitter 17015 to transmit the obtained access token to the mobile terminal 16900. Here, the controller 17025 may control the receiver 17005 to receive a user input indicating a job request regarding content from the mobile terminal 16900, together with the access token from the transmitter 17015.

The controller 17025 may generate, delete, or modify a job regarding content. In detail, the controller 17025 may generate a job identifier corresponding to a job request received from the receiver 17005, and map and store the generated job identifier and a content key corresponding to content. Here, the controller 17025 may generate a mapping table wherein the generated job identifier and the content key corresponding to the content are mapped to each other.

The controller 17025 may control the storage unit 17035 to store content, preview data of the content, and a job identifier (a mapping table wherein a job identifier and a content key corresponding to content are mapped to each other).

The cloud server 17000 may include the management server 17001 and the content server 17010. The controller 17025 may control the management server 17001 to transmit a store request regarding content to the content server 17010.

The controller 17025 may control the content server 17010 to store the content based on the received store request. The controller 17025 may control the content server 17010 to generate a content key corresponding to the content stored in the content server 17010. The controller 17025 may control the management server 17001 to receive the generated content key from the content server 17010. Also, the controller 17025 may control the management server 17001 to transmit the store request regarding the content to the content server 17010 such that the content is stored. The controller 17025 may control the content server 17010 to store the content according to the received store request. The controller 17025 may control the management server 17001 to receive the content key stored in the content server 17010 from the content server 17010. The controller 17025 may control the management server 17001 to receive a stored job identifier from a mobile terminal. The controller 17025 may control the management server 17001 to obtain a content key corresponding to the received job identifier. The controller 17025 may control the management server 17001 to transmit a request regarding the stored content including the content key corresponding to the job identifier to the content server 17010. The controller 17025 may control the management server 17001 to receive the stored content from the content server 17010 in response to the transmitted request regarding the stored content. The controller 17025 may perform a job on the received content.

FIG. 171 is a diagram for describing a process of uploading content to a cloud server, according to an embodiment.

When a user wants to store a print job regarding content in an individual cloud server storage space assigned to the user, or transmit the print job to another user, the content needs to be first uploaded. In the current embodiment, it is assumed that a storage space is not divided according to users, but is managed by using a content key corresponding to content, which is generated when the content is stored. Accordingly, a physical cloud space of content does not exist for users, but all files may be stored in one cloud space, a unique content key may be assigned to content, and a mapping table wherein the assigned unique content key and a user are mapped to each other may be managed, thereby easily securing a storage space according to a service increase, without having to obtain a physical (or logical) cloud storage space according to users.

First, the user may input a job upload request regarding content by using the mobile terminal 16900. For example, the user may execute an application in the mobile terminal 16900, select content on the application, and set a destination for the content. In other words, the mobile terminal 16900 may receive a user input indicating an upload request regarding content from the user.

In operation 17101, the mobile terminal 16900 may transmit an upload request regarding content to the management server 17001. The upload request may contain the content.

In operation 17102, upon receiving the upload request from the mobile terminal 16900, the management server 17001 may transmit the content included in the upload request to the content server 17010 to be stored.

In operation 17103, upon receiving the content from the management server 17001, the content server 17010 may store the received content and generate a content key corresponding to the stored content. The content server 17010 may transmit the generated content key to the management server 17001.

In operation 17104, upon receiving the content key from the content server 17010, the management server 17001 may transmit the content key to the mobile terminal 16900. Here, the management server 17001 does not store the content key but directly transmits the content key to the mobile terminal 16900, thereby relaying the content key.

The mobile terminal 16900 may receive the content key from the management server 17001. Upon receiving the content key, the mobile terminal 16900 may determine that the content has been normally transmitted. Upon determining that the content has been normally transmitted, the mobile terminal 16900 may request the cloud server to generate a print job regarding the content. Here, the content key may be generated according to contents.

Accordingly, when the user uploads several files (contents) by using the mobile terminal 16900 by calling API once, a content key is generated whenever one file (content) is successfully uploaded in the content server 17010, and upon receiving the content keys, the mobile terminal 16900 may determine which file (content) is successfully uploaded and which content is failed to be uploaded. Accordingly, the mobile terminal 16900 may prevent traffics from being unnecessarily induced by re-transmitting only a file (content) including the content that is failed to be uploaded.

Generally, if a user wants to transmit a print job regarding content to other users by using the mobile terminal 16900, the content is uploaded according to the other users. In detail, if the user requests to upload a job regarding the same content to the other users, the mobile terminal 16900 transmits an upload request regarding the same content to each of the other users, and thus the same content is uploaded several times. However, referring to FIG. 171, if the user wants to transmit a print job regarding the same content to other users by using the mobile terminal 16900, the mobile terminal 16900 first transmits an upload request regarding the same content to the cloud server, and at this time, transmits the same content only once to be stored in the cloud server, without having to transmit the same content to each of the other users. In the current embodiment, a content key corresponding to content is generated and the generated content key is transmitted to a mobile terminal, but an embodiment is not limited thereto, and it would be obvious to one of ordinary skill in the art that an identifier corresponding to content may be generated and the generated identifier may be transmitted to a mobile terminal.

FIG. 172 is a diagram for describing a process of transmitting, by the mobile terminal 16900, a job upload request regarding content, according to an embodiment.

If a user wants to upload a job regarding content by using the mobile terminal 16900, the content related to the job is first successfully uploaded to the cloud server as shown in FIG. 171, regardless of a destination of the job and a type of the job. Once the content is successfully uploaded, the mobile terminal 1690 may transmit the job upload request as shown in FIG. 172. As described above, the mobile terminal 16900 may determine that the content is successfully uploaded by receiving a content key.

Referring to FIG. 172, upon receiving a content key after content is successfully uploaded to the cloud server, the mobile terminal 16900 may transmit the received content key and a job upload request regarding the content to the management server 17001, in operation 17201. Here, the user of the mobile terminal 16900 is unable to recognize that the mobile terminal 16900 transmits the job upload request again after an upload request regarding the content is transmitted. In other words, when the user inputs the job upload request regarding the content to the mobile terminal 16900, the mobile terminal 16900 transmits the upload request regarding the content and the job upload request regarding the content to the cloud server.

In operation 17202, the management server 17001 may transmit a content search request to the content server 17010 by using the received content key.

In operation 17203, the content server 17010 may determine the content corresponding to the content key, in response to the content search request. At this time, a determination result may be transmitted to the management server 17001. The determination result may include metadata (a file name or a file size) of the content determined in the content server 17010.

In operation 17204, when the management server 17001 receives the determination result from the content server 17010 and determines that the content exist, the management server 17001 may generate job data regarding the content. In detail, the management server 17001 may generate and manage a job table.

In the current embodiment, it is assumed that a user uploads a job to an individual cloud space assigned to the user. Here, unlike when a job is transmitted to another user, the user does not have to separately input a mobile terminal ID information (for example, a phone number). The mobile terminal 16900 may determine mobile terminal ID information embedded in a USIM chip and transmit the mobile terminal ID information together with the job upload request regarding the content. The management server 17001 may check a space corresponding to the mobile terminal ID information by using the mobile terminal ID information, and generate a job in the checked space. In the current embodiment, it is assumed that a job table is stored in the space corresponding to the mobile terminal ID information. In other words, it would be obvious to one of ordinary skill in the art that the management server 17001 separately stores a table wherein mobile terminal ID information and a storage space are mapped to each other, and the storage space is managed by using the table.

First, the management server 17001 generates a job identifier. In the current embodiment, since there is no job uploaded to the management server 17001, the generated job identifier is '1'. The management server 17001 may map a content key to a job identifier. For example, the management server 17001 may generate the job identifier '1', and store a content key 'abc' corresponding to content stored according to the job identifier '1' in the same row of a job table as the job identifier '1'. Here, the management server 17001 may map and additionally store the metadata included in the determination result and the content key, in the same row as the job identifier '1'.

The user does not want to directly print content, but uploads the content to be printed in the cloud server and prints the content whenever the user wants to, by accessing the cloud server.

Although not shown in FIG. 172, it would be obvious to one of ordinary skill in the art that a name of a file (content) corresponding to the content key may also be stored in the job table.

FIG. 173 is a diagram for describing a process of transmitting, by the mobile terminal 16900, a job upload request regarding content, according to an embodiment.

In the current embodiment, it is assumed that a user directly prints content by using an image forming apparatus registered in the cloud server.

Here, the user may request for and receive a list of image forming apparatuses pre-registered in the cloud server by using the mobile terminal 16900, and select an image forming apparatus from the list. The cloud server may manage the image forming apparatuses pre-registered in the cloud server by assigning image forming apparatus identifiers to the image forming apparatuses according to mobile terminal ID information. When the user selects content to be printed and an image forming apparatus for printing the content by using the mobile terminal 16900, first as shown in FIG. 171, the mobile terminal 16900 transmits an upload request regarding the content to the management server 17001, and receives a content key corresponding to the content if the content is successfully uploaded to the cloud server.

Referring to FIG. 173, in operation 17301, the mobile terminal 16900 may transmit a print request to the management server 17001, together with the received content key and an image forming apparatus identifier.

In operation 17302, the management server 17001 may transmit a content search request to the content server 17010 to search for content by using the content key corresponding to a received job identifier.

In operation 17303, the content server 17010 may extract the content corresponding to the content key in response to the content search request, and transmit the extracted content to the management server 17001. The management server 17001 may receive the content from the content server 17010. Here, the extracted content may also contain metadata (a file name or a file size) of a file including the extracted content.

In operation 17304, the management server 17001 may check the received content to determine that the content requested to be uploaded exists, and generate job data. In detail, the management server 17001 may generate a job identifier and then generate a job table by mapping the job identifier and a content key corresponding to content. In the current embodiment, it is assumed that a job is first generated in the cloud server, and thus the management server 17001 may generate a job table including a job identifier '1' and a content key 'abc' in the same row. Here, metadata of a file including content may also be mapped to a content key and stored in the same row.

In operation 17305, the management server 17001 may transmit a rendering request regarding the received content to a rendering server 17020. While transmitting the rendering request, information about an image forming apparatus 17100 corresponding to the image forming apparatus identifier received from the mobile terminal 16900 may also be transmitted. The rendering server 17020 may perform rendering on the content. In detail, the rendering server 17020 may convert the content to print data such that the content is printed in the image forming apparatus 17100. Here, the print data may be data including a command interpretable by the image forming apparatus 17100.

In operation 17306, the rendering server 17020 may transmit the rendered content to the image forming apparatus 17100 corresponding to the image forming apparatus identifier. The image forming apparatus 17100 may perform an image forming job on the rendered content by receiving the rendered content from the rendering server 17020.

FIG. 174 is a diagram for describing a process of transmitting, by the user of the mobile terminal 16900, a job regarding content to another user, according to an embodiment.

Referring to FIG. 174, the user may additionally input a phone number of the other user by using the mobile terminal 16900 in order to transmit a print job regarding content to the other user. First, as described above with reference to FIG. 171, the mobile terminal 16900 transmits an upload request regarding the content to the management server 17001. After the content is successfully uploaded to the cloud server, the mobile terminal 16900 may receive a content key corresponding to the uploaded content.

In operation 17401, the mobile terminal 16900 may transmit a print job upload request to the management server 17001, together with the phone number of the other user and the content key. For example, when the user selects the content and inputs the phone number '010-yyy-yyyy' of the other user by using the mobile terminal 16900, the mobile terminal 16900 may transmit the upload request regarding the selected content to the cloud server and receive the content key corresponding to the uploaded content from the cloud server if the content is successfully uploaded to the cloud server. The mobile terminal 16900 may transmit the job upload request regarding the uploaded content together with the received content key and the phone number '010-yyy-yyyy' of the other user.

In operation 17402, the management server 17001 may transmit a content search request to the content server 17010 to search for the content by using the content key. The content server 17010 may receive the content search request from the management server 17001.

In operation 17403, the content server 17010 may check the content stored in the content server 17010 corresponding to the content key, in response to the content search request. The content server 17010 may transmit a content check result to the management server 17001.

In operation 17404, the management server 17001 may receive the content check result from the content server 17010. Upon receiving the content check result, the management server 17001 may determine that the content exists, and generate job data regarding the content.

Here, the management server 17001 searches for a storage space corresponding to the phone number of the other user received from the mobile terminal 16900. The management server 17001 may use a mapping table generated by mapping storage spaces of the management server 17001 and pre-registered phone numbers to each other.

The management server 17001 may generate a job identifier. For example, since the management server 17001 generates a job for the first time in the storage space of the phone number '010-yyy-yyyy', i.e., the storage space of the other user, the job identifier may be '1'.

The management server 17001 may map the content key to the job identifier. For example, the management server 17001 may map a content key 'abc' corresponding to the uploaded content to the job identifier '1'. The management server 17001 may store the job identifier and the content key in one row of the job table. Referring to FIG. 174, the job table includes a phone number field to indicate to which phone number a job identifier is mapped, but the job table may not include the phone number field as long as the job table is stored in a storage space of a certain phone number). On the other hand, if storage spaces are not divided according to phone numbers, the management server 17001 may generate a job table including a phone number field to indicate a phone number a job is destined for.

In operation 17405, the other user may transmit a job list confirmation request regarding a print job corresponding to the phone number '010-yyy-yyyy' of the other user to the management server 17001, by using a mobile terminal 17200 having the phone number '010-yyy-yyyy'. Here, the mobile terminal 17200 may check the phone number '010-yyy-yyyy' of the other user embedded in a USIM chip of the mobile terminal 17200, and transmit the checked phone number '010-yyy-yyyy' while transmitting the job list confirmation request.

Upon receiving the job list confirmation request from the mobile terminal 17200, the management server 17001 may search for a storage space corresponding to the phone number '010-yyy-yyyy', and generate, in the storage space, a job list based on the job included in the job table. Here, the job list may not include the content key included in the job table.

In operation 17406, the other user may receive the job list from the management server 17001 by using the mobile terminal 17200. The other user may select one of jobs included in the received job list by using the mobile terminal 17200. The other user may transmit a preview or print request regarding the selected job to the management server 17001 so as to receive preview data regarding content related to the selected job or to print the content related to the selected job by using an image forming apparatus registered in the cloud server. The receiving of the preview data or the printing of the content by transmitting the preview or print request to the cloud server will now be described in detail with reference to FIGS. 175 and 176.

FIG. 175 is a diagram for describing a process of performing, by the image forming apparatus 17100, an image forming job regarding content included in a print job as a user B transmits the print job registered in the cloud server to the image forming apparatus 17100.

Referring to FIG. 175, the user B may transmit a job list confirmation request to the cloud server by using the mobile terminal 17200, and select a job from a job list received from the cloud server. Also, the user B may transmit a image forming apparatus list request to the cloud server by using the mobile terminal 17200 to receive an image forming apparatus list including image forming apparatuses pre-registered in the cloud server. The user B may select the image forming apparatus 17100 to perform the image forming job regarding the content from the image forming apparatus list, by using the mobile terminal 17200.

In operation 17501, the mobile terminal 17200 may transmit a print request to the management server 17001, together with a job identifier indicating a job and an image forming apparatus identifier indicating the image forming apparatus 17100, which are selected by the user B.

In operation 17502, the management server 17001 may obtain a content key from job data by using the job identifier received from the mobile terminal 17200. In detail, the management server 17001 may refer to a job table to obtain the content key from a content key field in the same row as the job identifier. For example, the management server 17001 may obtain a content key 'abc' in a content key field of the same row as a job identifier '1' by referring to the job table.

In operation 17503, the management server 17001 may transmit a content search request to the content server 17010 to search for content by using the content key obtained according to the job identifier. The content server 17010 may search for the content corresponding to the content key, in response to the content search request.

In operation 17504, the content server 17010 may search for the content corresponding to the content key and transmit searched content to the management server 17001.

In operation 17505, the management server 17001 may receive the content from the content server 17010, and transmit a rendering request regarding the content to the rendering server 17020. Here, the management server 17001 may transmit information about the image forming apparatus 17100 corresponding to the image forming apparatus identifier received from the mobile terminal 17200, to the rendering server 17020, together with the rendering request.

In operation 17506, the rendering server 17020 receives the rendering request from the management server 17001, and performs rendering on the content included in the rendering request. In detail, the rendering server 17020 converts the content to print data including a print command regarding the content so that the image forming apparatus 17100 performs the image forming job on the content. The rendering server 17020 may transmit the rendered content to the image forming apparatus 17100 by using the information about the image forming apparatus 17100 corresponding to the received image forming apparatus identifier. The image forming apparatus 17100 may receive the rendered content from the rendering server 17020, and perform the image forming job on the rendered content based on the rendered content.

FIG. 176 is a diagram for describing receiving preview data regarding content included in a print job as the user B transmits a preview request regarding the print job registered in the cloud server.

Referring to FIG. 176, in operation 17601, the user B receives a job list stored in a storage space corresponding to the phone number of the mobile terminal 17200 from the management server 17001, by using the mobile terminal 17200. Here, the job list may include a job identifier corresponding to an uploaded job.

In operation 17602, the user B may select one of jobs included in the job list by using the mobile terminal 17200. Here, the mobile terminal 17200 may transmit a preview request to the management server 17001, together with a job identifier corresponding to the job selected by the user B.

In operation 17603, the management server 17001 may obtain a content key from job data by using the job identifier received together with the preview request from the mobile terminal 17200. In detail, the management server 17001 may obtain the content key from a content key field in the same raw as the job identifier by referring to a job table. For example, the management server 17001 may obtain a content key 'abc' in a content key field in the same row as a job identifier '1' by referring to the job table.

In operation 17604, the management server 17001 may transmit a content search request to the content server 17010 to search for content by using the content key corresponding to the job identifier. The content server 17010 may receive the content search request from the management server 17001, and search for the content corresponding to the content key, in response to the received content search request.

In operation 17605, the content server 17010 may transmit searched content corresponding to the content key to the management server 17001.

In operation 176060, the management server 17001 may receive the searched content from the content server 17010, and transmit a preview data generate request to a preview server 17030 to generate preview data regarding the received content. Upon receiving the preview data generate request, the preview server 17030 generates the preview data regarding the content. In detail, the preview server 17030 may include various types of contents, and may convert such content to an image file (JPG or PNG files) supported by a web browser such that the content is previewed by a user using the web browser, regardless of an operating system of the mobile terminal 17200 and without having to separately install a plug-in in the mobile terminal 17200. Here, the image file may be preview data. Alternatively, any type of data obtained by converting content to be previewed by a user may be preview data.

In operation 17507, after generating the preview data regarding the content, the preview server 17030 may generate the preview data to the content server 17010 to be stored. Upon receiving the preview data from the preview server 17030, the content server 17010 may store the preview data and provide a URL of the preview data to the preview server 17030 such that the user B may access the preview data by using a web browser.

In operation 17608, the preview server 17030 may transmit the URL of the preview data provided from the content server 17010 to the management server 17001.

In operation 17609, the management server 17001 may transmit the URL of the preview data received from the preview server 17030 to the mobile terminal 17200.

In operation 17610, the mobile terminal 17200 may receive the URL of the preview data from the management server 17001, and access the preview data stored in the content server 17010 by using the received URL. The user B may view the preview data via a display of the mobile terminal 17200.

According to the current embodiment, for example, a user does not have to install a separate program to a mobile terminal so as to preview a file edited by a certain program by using the mobile terminal, and thus the user may receive and preview content from a cloud server without having to install the separate program to the mobile terminal.

FIG. 177 is a diagram for describing a process of receiving, by the mobile terminal 16900, an access code as the phone number of the mobile terminal 16900 is authenticated by the authentication server before a job upload request regarding content is transmitted.

Referring to FIG. 177, the user of the mobile terminal 16900 transmits a print job upload request regarding content to the cloud server, by using the mobile terminal 16900. Here, the cloud server first authenticates the mobile terminal 16900 so as to determine that the user is using a mobile terminal corresponding to mobile terminal ID information. Here, the cloud server includes the management server 17001 and the authentication server 17040.

In operation 17701, the user may transmit an authentication request to the management server 17001 by using the mobile terminal 16900. Here, even if the user does not input the phone number of the mobile terminal 16900, the mobile terminal 16900 may check the phone number embedded in the USIN chip of the mobile terminal 16900, and transmit the checked phone number to the management server 17001 together with the authentication request.

In operation 17702, the management server 17001 may transmit the authentication request to the authentication server 17040. Here, the management server 17001 may transmit the received phone number of the mobile terminal 16900 to the authentication server 17040, together with the authentication request.

In operation 17703, the authentication server 17040 may generate a PIN code correspondingly to the received phone number.

In operation 17704, the authentication server 17040 may request a short message service (SMS) provider 17300 to transmit an SMS message including the generated PIN code to the mobile terminal 16900. The SMS provider 17300 may be a communication carrier. In this case, the SMS provider 17300 may be located outside the cloud server.

In operation 17705, the SMS provider 17300 may transmit the SMS message including the generated PIN code to the mobile terminal 16900.

In operation 17606, after the mobile terminal 16900 received the SMS message, the user may transmit a PIN code confirmation request to the management server 17001 by inputting a PIN code that is the same as the PIN code included in the SMS, by using the mobile terminal 16900.

In operation 17607, the management server 17001 may receive the PIN code confirmation request from the mobile terminal 16900, and transmit the received PIN code confirmation request to the authentication server 17040.

In operation 17708, the authentication server 17040 may receive the PIN code confirmation request from the management server 17001, determine whether the PIN code included in the PIN code confirmation request and the PIN code generated and received in operations 17703 through 17705 are the same, and if the PIN codes are the same, issues an access token corresponding to the phone number of the mobile terminal 16900.

In operation 17709, the authentication server 17040 may transmit the issued access token to the management server 17001.

In operation 17710, the management server 17001 may receive the access token from the authentication server 17040, and transmit the received access token to the mobile terminal 16900.

In operation 17711, the mobile terminal 16900 may receive the access token from the management server 17001, and transmit an upload request regarding the content to the management server 17001, together with the received access token. Here, upon receiving the upload request from the mobile terminal 16900, the management server 17001 may determine whether the access token is proper. In other words, the management server 17001 transmits the access token to the authentication server 17040, and the authentication server 17040 determines whether the transmitted access token is issued by itself. Also, the authentication server 17040 determines whether the issued access token is generated by authenticating the phone number of the mobile terminal 16900. As such, the authentication server 17040 determines whether the access token is proper, and transmits a determination result to the management server 17001. The management server 17001 may receive the determination result from the authentication server 17040 to check whether the access token is proper, and if the access token is proper, the management server 17001 processes the upload request transmitted together with the access token. In the current embodiment, only the upload request is transmitted together with the access token, but alternatively, any request transmitted from the mobile terminal 16900 to the management server 17001 may be transmitted together with the access token, and the authentication server 17040 may determine whether the access token is proper.

FIG. 178 is a diagram for describing a cloud printing system according to an embodiment.

Referring to FIG. 178, the cloud printing system according to an embodiment includes the mobile terminal 16900, the cloud server 17000, an SMS provider 17300, the image forming apparatus 17100, and a personal computer (PC) 17400.

The cloud server 17000 denotes several servers immediately supporting a client with settable computing resources (a network, a server, a storage space, an application system and service) through a network whenever the user requires the settable computing resources, such that the settable computing resources are easily accessed through the network. In detail, according to the current embodiment, the cloud server 17000 denotes servers providing computing resources so as to provide a cloud printing service to the client.

Referring to FIG. 178, the cloud server 17000 may include an API server 17810, a content server 17820, a database 17830, an authentication server 17840, a rendering server 17850, a preview server 17860, a fetching server 17870, and a web server 17880.

The API server 17810 is a server that provides a client service function to the client in a form of RESTful API so as to provide the cloud printing service to the client. Accordingly, the API server 17810 may receive a cloud printing service function through the RESTful API of the API server 17810. Here, the RESTful API is an interface that basically provides jobs of generating, reading, modifying, and deleting data.

The content server 17820 is a server that includes a storage space for content. The content server 17820 performs the same functions as the content server 17010. In other words, the content server 17820 may not divide a storage space according to users but store content in one storage space, generate a content key corresponding to the content, and manage the stored content by using a job table wherein the content key corresponding the content and a job identifier are mapped to each other.

The database 17830 provides a storage space for job data. In detail, the database 17830 may assign the storage space according to users. The database 17830 may store a job table in the storage space assigned according to users. The job table may include a job identifier and a content key mapped to the job identifier.

Here, a storage space assigned according to users indicates that a storage space is assigned to correspond to mobile terminal ID information. Here, the mobile terminal ID information includes a phone number, a country code, and a mobile hardware ID (a unique value for classifying a mobile terminal) of a user. Alternatively, the storage spaces may not be assigned according to users, but the mobile terminal ID information may be mapped to the job identifier and included in the job table such that the database 17830 is managed without having to use storage spaces divided according to users or mobile terminals. The job table may be stored in a storage space according to users and include a job assigned to users, but alternatively, jobs transmitted from a user to other users may be stored in a storage space according to the transmitted users in a form of a job history table.

Also, the database 17830 may store various types of information generated by the API server 17810, the authentication server 17840, the fetching server 17870, and the web server 17880.

When the user transmits an authentication request regarding a phone number by using the mobile terminal 16900, the authentication server 17840 may issue a PIN code regarding the authentication request. Also, the authentication server 17840 may verify validity of the PIN code. Also, when the authentication server 17840 determines that the PIN code is valid by verifying the validity of the PIN code in response to the authentication request, the authentication server 17840 may issue an access token. Then, the authentication server 17840 may verify validity of the access token when the user transmits various requests together with the access token by using the mobile terminal 16900 to receive a cloud printing service. The authentication server 17840 may link and manage a user account and a phone number of a mobile terminal. Here, the linking and managing mean that a user account is managed after being mapped to phone numbers of several mobile terminals. For example, a user account 'samsung' may be mapped to phone numbers of a plurality of mobile terminals, and at this time, if the user transmits an authentication request regarding the user account 'samsung' to the authentication server 17840 by using the mobile terminal 16900, since the user account 'samsung' is mapped to the phone numbers of the plurality of mobile terminals, not only a job of the mobile terminal 16900, but also jobs of the plurality of mobile terminals may be provided to the user.

Upon receiving a rendering request regarding content from the API server 17810, the rendering server 17850 may render the content stored in the content server 17820. Here, the rendered content may be obtained by converting the content to print data including a print command regarding the content such that the image forming apparatus 17100 may print the content. The rendering server 17850 may transmit the rendered content to the image forming apparatus 17100, and the image forming apparatus 17100 may receive the rendered content from the rendering server 17850 and perform an image forming job on the content by using the received rendered content.

Upon receiving a preview request regarding the content stored in the content server 17820 from the API server 17810, the preview server 17860 may generate preview data regarding the content. Here, the preview data may be obtained by converting the content to an image file (JPG or PNG) supported by a web browser so that the content is previewed on the mobile terminal 16900. The preview server 17860 may transmit a storage request regarding the preview data to the content server 17850 to store the preview data, receive a URL of the stored preview data from the rendering server 17850, and provide the URL to the mobile terminal 16900. Thus, the mobile terminal 16900 is able to access the preview data by using the URL received from the preview server 17860, and the user is able to preview the content upon receiving the preview data by using the mobile terminal 16900.

The fetching server 17870 is a server that tracks state information of the rendering server 17850 or the preview server 17860, and if the rendering server 17850 or the preview server 17860 receives a rendering request or a preview request regarding content from the API server 17810, the fetching server 17870 may receive the state information of the rendering server 17850 or the preview server 17860 from the rendering server 17850 or the preview server 17860 to determine a current job state related to the content in the rendering server 17850 or the preview server 17860. The determined current job state is transmitted to the mobile terminal 16900 through the API server 17810 for the user to check the current job state.

The web server 17880 is a server that provides a user portal service in a form of a web service, and provides a web service on the assumption that a user account of a user portal is linked to a phone number of a mobile terminal. For example, when the user may execute a web browser by using the PC 17400, access a user portal website to authenticate a user account, and if the user account is successfully authenticated, view a job and a job history related to the mobile terminal 16900 linked to the user account through the web browser. Also, the user may check a registration state of the image forming apparatus 17100 corresponding to the phone number of the mobile terminal 16900 linked to the user account, and then may register an additional image forming apparatus or set the image forming apparatus 17100 as a basic image forming apparatus.

On the other hand, the mobile terminal 16900, the image forming apparatus 17100, and the PC 17400 may communicate with the cloud server 17000 by using an HTTP or a hypertext transfer protocol secure (HTTPS). The API server 17810 may communicate with the database 17830 by using a transmission control protocol (TCP). The web server 17880 may communicate with the database 17830 by using a TCP.

The API server 17810 may communicate with the content server 17820, the authentication server 17840, the rendering server 17850, and the preview server 17860 by using an HTTP/HTTPS. The fetching server 17870 may communicate with the rendering server 17850 and the preview server 17860 by using an HTTP/HTTPS. The authentication server 17840 may communicate with the SMS provider 17300 by using a TCP.

FIG. 179 is a flowchart of a method of providing a cloud printing service, according to an embodiment.

In operation 17910, the cloud server 17000 may receive a user input indicating a job request regarding content from the mobile terminal 16900.

In operation 17920, upon receiving the user input from the mobile terminal 17900, the cloud server 17000 may store the content according to the user input.

In operation 17930, when the content is stored, the cloud server 17000 may generate a key corresponding to the content and obtain the generated key. In operation 17940, the cloud server 17000 may transmit the key to the mobile terminal 16900.

In operation 17950, the cloud server 17000 may receive the job request from the mobile terminal 16900, together with the key from the mobile terminal 16900.

In operation 17960, the cloud server 17000 may perform a job on the content corresponding to the key according to the job request received from the mobile terminal 16900.

FIG. 180 is a flowchart illustrating operation 17920 of FIG. 179 in detail, according to an embodiment.

The cloud server 17000 may include the management server 17001 and the content server 17010. Accordingly, when the cloud server 17000 stores the content, data may be exchanged between the management server 17001 and the content server 17010.

In operation 18010, upon receiving the user input indicating the job request regarding the content from the mobile terminal 16900, the management server 17001 may transmit a store request regarding the content to the content server 17010.

In operation 18020, the content server 17010 may store the content according to the store request received from the management server 17001.

FIG. 181 is a flowchart illustrating operation 17930 of FIG. 179 in detail, according to an embodiment.

In operation 18110, the content server 17010 may generate a key corresponding to the content stored in the content server 17010. The content server 17010 may transmit the generated key to the management server 17001.

In operation 18120, the management server 17001 may receive the key from the content server 17010. The management server 17001 may obtain a content key by receiving the key from the content server 17010.

FIG. 182 is a flowchart illustrating operation 17960 of FIG. 179 in detail, according to an embodiment.

In operation 18210, the cloud server 17000 may generate a job identifier corresponding to the job request received from the mobile terminal 16900.

In operation 18220, the cloud server 17000 may store the job identifier after mapping the job identifier to the key.

In operation 18230, the cloud server 17000 may receive the job identifier from the mobile terminal 16900. Here, the cloud server 17000 may receive the job identifier input by the user of the mobile terminal 16900 from the mobile terminal 16900.

In operation 18240, the cloud server 17000 may receive the job identifier from the mobile terminal 17900, obtain a key mapped according to the received job identifier, and obtain content by using the content key.

In operation 18250, the cloud server 17000 may perform a job on the obtained content.

FIG. 183 is a flowchart illustrating operations 18240 through 18250 of FIG. 182 in detail, according to an embodiment.

Referring to FIG. 183, in operation 18310, the management server 17001 may receive the job identifier from the mobile terminal 16900.

In operation 18320, the management server 17001 may obtain the key corresponding to the job identifier, and request the content server 17010 to transmit the request regarding the stored content, including the obtained key corresponding to the job identifier. Upon receiving the request from the management server 17001, the content server 17010 may determine whether the content corresponding to the key is stored in the content server 17010.

In operation 18330, the management server 17001 may receive the content corresponding to the key from the content server 17010.

In operation 18340, the management server 17001 may perform a job on the received content.

FIG. 184 is a flowchart of a method of providing a cloud service, according to an embodiment.

It is assumed that the mobile terminal 16900 transmits a job upload request regarding content to the cloud server 17000, wherein the job upload request is destined for mobile terminal ID information of another mobile terminal, and when the cloud server 17000 generates a job identifier according to the job upload request, the job identifier is mapped to the mobile terminal ID information of the other mobile terminal. Here, mobile terminal ID information may be a phone number of a mobile terminal. When a job uploaded to the cloud server 17000 is to be performed, the other mobile terminal that is a destination requests the cloud server 17000 to transmit job identifiers mapped to the mobile terminal ID information of the other mobile terminal, selects one of the received job identifiers, and transmits a request including the selected job identifier to the cloud server 17000 such that the cloud server 17000 performs the job on the content. Here, the job performed on the content may be transmitting the content to an image forming apparatus corresponding to the mobile terminal ID information such that the image forming apparatus performs an image forming job on the content, or may be generating preview data of the content, storing the generated preview data, and transmitting location information (for example, a URL) of the stored preview data to the other mobile terminal such that the other mobile terminal previews the content.

If the destination of the job to be uploaded is mobile terminal ID information of the mobile terminal 16900 that requested the job upload request, the other mobile terminal may be the mobile terminal 16900.

In operation 18410, the cloud server 17000 may receive a confirmation request regarding a job identifier stored in the cloud server 17000 from a mobile terminal corresponding to mobile terminal ID information. Here, the stored job identifier may be mapped to the mobile terminal ID information, and the cloud server 17000 may check the job identifier corresponding to the mobile terminal ID information.

In operation 18420, the cloud server 17000 may transmit a job list including job identifiers corresponding to the confirmation request to the mobile terminal corresponding to the mobile terminal ID information.

In operation 18430, the cloud server 17000 may receive a print job request including at least one of the job identifiers included in the job list from the mobile terminal corresponding to the mobile terminal ID information.

In operation 18440, the cloud server 17000 may obtain a key corresponding to the job identifier included in the print job request.

In operation 18450, the cloud server 17000 may obtain content by using the key corresponding to the job identifier.

In operation 18460, the cloud server 17000 may transmit the obtained content to the image forming apparatus 17100 corresponding to the mobile terminal ID information such that the image forming apparatus 17100 performs an image forming job on the obtained content.

FIG. 185 is a flowchart of a method of providing a cloud service, according to an embodiment.

In operation 18510, the cloud server 17000 may receive a confirmation request regarding a job identifier stored in the cloud server 17000 from a mobile terminal corresponding to the mobile terminal ID information. Here, the stored job identifier may be mapped to the mobile terminal ID information, and the cloud server 17000 may check the job identifier corresponding to the mobile terminal ID information.

In operation 18520, the cloud server 17000 may transmit a job list including job identifiers corresponding to the confirmation request to the mobile terminal corresponding to the mobile terminal ID information.

In operation 18530, the cloud server 17000 may receive a content preview request including at least one of the job identifiers included in the job list from the mobile terminal corresponding to the mobile terminal ID information.

In operation 18540, the cloud server 17000 may obtain a key corresponding to the job identifier included in the content preview request.

In operation 18550, the cloud server 17000 may obtain content by using the key corresponding to the job identifier.

In operation 18560, the cloud server 17000 may generate and store preview data regarding the content.

In operation 18570, the cloud server 17000 may transmit location information about the preview data to the mobile terminal corresponding to the mobile terminal ID information such that the mobile terminal displays the preview data. Accordingly, the mobile terminal that transmitted the content preview request may receive the location information about the preview data and access the preview data based on the location information. Thus, the user of the mobile terminal may preview the content.

FIG. 186 is a flowchart illustrating operation 17910 of FIG. 179 in detail, according to an embodiment.

In the current embodiment, it is assumed that the user uses a cloud printing service through the mobile terminal 16900 for the first time.

In operation 18610, the cloud server 17000 may receive an authentication request from the mobile terminal 16900.

In operation 18620, the cloud server 17000 may generate a PIN code corresponding to mobile terminal ID information based on the authentication request. Here, the PIN code corresponding to the mobile terminal ID information may be a phone number of the mobile terminal 16900.

In operation 18630, the cloud server 17000 may transmit a message including the PIN code to the mobile terminal 16900. The cloud server 17000 may request an SMS provider to transmit the message to the mobile terminal 16900. Then, the SMS provider may transmit the message according to the request of the cloud server 17000.

In operation 18640, the cloud server 17000 may receive a PIN code confirmation request including a PIN code from the mobile terminal 16900 in response to the message.

In operation 18650, if the PIN code included in the PIN code confirmation request is the same as the PIN code included in the message, the cloud server 17000 generates an access token corresponding to the mobile terminal ID information, and obtains the generated access token.

In operation 18660, the cloud server 17000 may transmit the obtained access token to the mobile terminal 16900.

In operation 18670, the cloud server 17000 may receive a user input indicating a job request regarding content from the mobile terminal 16900, together with the access token.

As such, according to the current embodiment, a user is able to use a service by authenticating a phone number, without having to separately subscribe to the service.

According to another embodiment, if data is stored in a storage space of the cloud server 17000 for a long period of time, a service provider may have to spend additional costs based on a storage period and may have a reduced usable storage space. Also, most data stored in the cloud server 17000 are useless after about one day. Thus, the cloud server 17000 may be set to store content and a job only for a predetermined period of time. For example, the cloud server 17000 may store the content and the job for 24 hours. Here, a user who is using a cloud printing service may need to check remaining times of content and a job before deleting the content and the job.

Hereinafter, a method of easily checking, by a user, remaining times of content and job through a mobile terminal by displaying the remaining times on a UI of the mobile terminal in graphics, when the user is using a cloud printing service via the mobile terminal, according to an embodiment, will now be described in detail with reference to FIGS. 187 and 188.

FIG. 187 is a diagram for describing a process of displaying, by the mobile terminal 16900, a remaining time regarding an uploaded job, according to an embodiment.

Referring to FIG. 187, the user executes an application regarding a cloud printing service by using the mobile terminal 16900. When the application is executed, an initial screen is displayed as shown in the left of FIG. 187. When a 'My Cloud' menu 18710 is selected from the initial screen, a 'My Cloud' screen is displayed as shown in the right of FIG. 187. Jobs related to the mobile terminal 16900 are displayed on the 'My Cloud' screen. The user may check a remaining time graphic 18720 and a remaining time 18730 together with the jobs related to the mobile terminal 16900.

FIG. 188 is a diagram for describing various remaining time graphics 18810 and remaining times 18820 displayed on the mobile terminal 16900, according to an embodiment.

Referring to FIG. 188, the remaining time graphics 18810 and the remaining times 18820 displayed on the mobile terminal 16900 are illustrated.

Referring to the remaining time graphic 18810 and the remaining time 18820 at the top of FIG. 188, current content is just uploaded and the remaining time 18820 is 24 hours, and thus bar regions of the remaining time graphic 18810 may be displayed in a light color. Also, the remaining time 18820 may be displayed as "24:00" to show that 24 hours are left. Here, a time may be expressed in "HH:mm". Here, HH denotes a currently remaining hour and mm denotes a currently remaining minute.

Referring to the remaining time graphic 18810 and the remaining time 18820 shown first at the bottom of FIG. 188, 1 hour has passed after the current content is uploaded and thus the remaining time 18820 is 23 hours, and the bar regions of the remaining time graphic 18810 may still be displayed in the light color. Here, the remaining time graphics 18810 when the remaining time 18820 is 24 hours and when the remaining time 18820 is 23 hours are displayed in the same form because one bar region indicate 2 hours, and 2 hours are not passed yet. Alternatively, a part of the bar region may be changed to a dark color according to time.

Also, the remaining time 18820 may be displayed as "23:00" to show that 23 hours are left.

Referring to the remaining time graphic 18810 and the remaining time 18820 shown second at the bottom of FIG. 188, 2 hours have passed after the current content is uploaded and thus the remaining time 18820 is 22 hours, and one of the bar regions of the remaining time graphic 18810 may be displayed in a dark color. Also, the remaining time 18820 may be displayed as "22:00" to show that 22 hours are left. When the remaining times 18820 are 18 hours and 12 hours, the remaining time graphics 18810 and the remaining times 18820 may be displayed on the mobile terminal 16900 as shown third and fourth at the bottom of FIG. 188.

FIG. 189 illustrates an environment where a cloud print service is provided using a mobile application, according to an embodiment.

Referring to FIG. 189, a cloud print service system according to an embodiment may include mobile terminals, namely, first and second mobile terminals 18920 and 18950, multifunction printers (MFP), namely, MFP1 and MFP2 18930 and 18940, and a cloud server 18910.

Here, it is illustrated that the first and second mobile terminals 18920 and 18950 are smartphones. However, the first and second mobile terminals 18920 and 18950 may also be a tablet PC or a notebook computer, and the MFPs may also include various kinds of image forming devices such as a printer, a scanner, and a fax machine.

An application for using a cloud print service may be installed on the mobile terminals first and second 18920 and 18950. At this time, the application may be made by a provider of the cloud print service or a third party. Furthermore, the first and second mobile terminals 18920 and 18950 may be registered as devices which may use the cloud print service in the cloud server 18910 by installing the application.

The MFP1 and MFP2 18930 and 18940 as well as the first and second mobile terminals 18920 and 18950 may be registered as devices, which may use the cloud print service, in the cloud server 18910. At this time, the MFP1 and MFP2 18930 and 18940 are registered in the cloud server 18910 in order to correspond to the phone numbers of the first and second mobile terminals 18920 and 18950. Furthermore, the registration of the MFP1 and MFP2 18930 and 18940 may be simply performed through near field communication (NFC) in the state where the application is executed, as described in detail when describing the drawings illustrating UI screens.

A method of providing a cloud print service, according to an embodiment, will be described below with reference to FIG. 189.

A first user 18960 installs an application on the first mobile terminal 18920 so that the first mobile terminal 18920 may be registered as a device which may use a cloud print service in the cloud server 18910.

Furthermore, the first user 18960 allows the MFP1 18930 to be registered in the cloud server 18910 by performing NFC tagging on the MFP1 18930 in the state where the application is executed in the first mobile terminal 18920. In detail, in the state where a UI screen for device registration of the application is displayed on a display unit of the first mobile terminal 18920, if the first mobile terminal 18920 NFC-tags the MFP1 18930, the MFP1 18930 is registered in the cloud server 18910 as the device corresponding to the phone number of the first mobile terminal 18920.

Likewise, if the first mobile terminal 18920 and MFP1 18930 are registered in the cloud server 18910, the first user 18960 may perform printing by NFC-tagging the first mobile terminal 18920 to the MFP1 18930.

Furthermore, the second user 18970 may also register the second mobile terminal 18950 and the MFP2 18940 as devices, which may use the cloud print service, in the cloud server 18910 in the same manner as that by the first user 18960. At this time, the MFP2 18940 may be registered in the cloud server 18910 to correspond to the phone number of the second mobile terminal 18950 as described above.

If the registration of devices is completed, the first user 18960 may print print data stored in the first terminal 18920 or transmit the print data to the second user 18970 through the cloud server 18910.

In detail, the first user 18960 may select print data from among print data stored in the first mobile terminal 18920 and tag the first mobile terminal 18920 to the MFP1 18930 so that the print data may be promptly printed. At this time, in the state where the UI screen for printing of the application is displayed, if the NFC-tagging to the MFP1 18930 is performed, the printing job is promptly performed in the MFP1 18930.

Furthermore, the first user 18960 may store print data in the cloud server 18910 to correspond to the phone number of the first user 18960, i.e., the phone number of the first mobile terminal 18920, and NFC-tag the first mobile terminal 18920 to the MFP1 18930 at a desired point of time so as to print the print data stored in the cloud server 18910.

Furthermore, the first user 18960 may transmit print data stored in the first mobile terminal 18920 to the second user 18970. In detail, after the first user 18960 selects print data to be transmitted on the executed application in the first mobile terminal 18920, if the print data is transmitted using the phone number of the second mobile terminal 18950 of the second user 18970 as the destination, the selected print data is stored in the cloud server 18910 to correspond to the phone number of the second mobile terminal 18950.

Then, the second user 18970 may check print data, which is received after executing the application in the second mobile terminal 18950, i.e., print data which is stored in the cloud server 18910 to correspond to the phone number of the second mobile terminal 18950 of the second user 18970. Furthermore, the second user 18970 may select data to be printed from among received print data and NFC-tag the second mobile terminal 18950 to the MFP2 18940 so as to print the print data stored in the cloud server 18910.

In detail, the second user 18970 checks and selects print data, which is received on the UI screen for performing printing of the application displayed on the second mobile terminal 18950, and NFC-tags the second mobile terminal 18950 to the MFP2 18940 in the state where the UI screen for printing is displayed. Then, the selected print data is printed in the MFP2 18940.

Hereinafter, the method of providing a cloud print service by using a mobile application, according to an embodiment, will be described below in detail with reference to UI screens of the application which is displayed on a mobile terminal.

FIGS. 190 and 191 illustrate UI screens which are displayed in the process of registering an image forming device in a cloud server via a mobile application, according to an embodiment.

Referring to FIG. 190, a first UI screen **19000*a* for selecting and registering an image forming device displays a list 19010 of registered devices that correspond to the user's mobile terminal, and a list 19020 of phone numbers of other users which use the cloud print service. A check box 19011 displays a basic device, and it may be understood that My Cloud Printer has been set as the basic device in the first UI screen 19000*a***.

In the state where the first UI screen **19000*a* is displayed on the display unit of the mobile terminal, if the mobile terminal NFC-tags the image forming device, a second UI screen 19000*b* is displayed on the mobile terminal. A pop-up window 19012, in which whether to register a tagged device is asked, is displayed on the second UI screen 19000*b***.

If the OK button is selected from the pop-up window 19012 displayed on the second UI screen **19000*b*, an input blank field 19013 for inputting the name of the device registered in the pop-up window 19012 in a third UI screen 19000*c* is displayed. A model name of the registered device is basically displayed on the input blank 19013**, and if the user desires to register the device with another name, the user may directly input the desired name.

If the OK button is selected from the pop-up window 19012 displayed on the third UI screen **19000*c*, a fourth UI screen 19000*d* is displayed. In the fourth UI screen 19000*d*, a newly registered image forming device has been added to the list 19010 of registered devices. At this time, the check box 19011** is displayed on the newly registered image forming device, and thus it is understood that the device has been set as a basic device. Likewise, when a new device is registered, the device may be set as a basic device.

Referring to FIG. 191, a list 19110 of registered devices that correspond to the user's mobile terminal and a list 19120 of phone numbers of other users which use the cloud print service are displayed on a first UI screen **19100*a* via which selection and registration of devices is performed. A check box 19111** displays a basic device.

If an additional menu display button 19112 is touched in a second UI screen **19100*b*, additional menu items such as a third UI screen 19100*c* are displayed. If an "Add device with NFC" item 19113 is selected from the menu items, a pop-up window 19114, which guides on the method of registering a device through NFC, is displayed on a fourth UI screen 19100*d***.

The user may register a device by NFC-tagging the mobile terminal to an image forming device according to the guidance of the pop-up window 19114. The following process is similar to the process described with reference to FIG. 190.

FIGS. 192A and 192B illustrate UI screens which are displayed in the process of uploading print data in a cloud server via a mobile application, according to an embodiment.

Referring to FIG. 192A, a first UI screen **19200*a* is a UI screen via which the selection and registration of devices is performed and that displays a list 19210 of registered devices that correspond to the user's mobile terminal and a list 19220 of phone numbers of other users which use the cloud print service. If My Cloud Printer 19211 is selected from the list 19210, a second UI screen 19200*b*** is displayed.

The second UI screen **19200*b* is a screen where Start Print 19230 is selected from among menu items of Start Print 19230, Get Print 19240, and Send Print 19250. The second UI screen 19200*b* is a UI screen for transmitting print data to perform a printing job. The user may select the category of print data to be uploaded from the second UI screen 19200*b*. In the present embodiment, an album 19231 has been selected. As such, a list of albums is displayed on a third UI screen 19200*c*. If Album Name 5 19232 is selected from among the displayed albums, image files included in the Album Name 5 19232 are displayed on a fourth UI screen 19200*d*. If one of the image files, for example, an image file 19233, is selected from among the image files displayed on the fourth UI screen 19200*d*, a fifth UI screen 19200*e* of FIG. 192**B is displayed.

Referring to FIG. 192B, a checkbox is displayed on the image file 19233, which is selected from among the image files in the fifth UI screen **19200*e*, which indicates that the image file 19233 has been selected. Here, it is illustrated that only one image file 19233 has been selected, but two or more image files may also be selected. After the selection of an image file is completed, if the user touches a print button 19234, a pop-up window 19235, which indicates that data is being uploaded to the cloud server, is displayed on a sixth UI screen 19200*f***.

If the upload of the print data is completed, a pop-up window 19236, including a message notifying that the upload has been completed, is displayed on a seventh UI screen 19200*g*. If Go to Get Print is selected from the pop-up window 19236 of the seventh UI screen 19200*g*, the screen where a Get Print 19240 menu item has been selected is displayed on an eighth UI screen 19200*h*, and a list 19241 of print data uploaded to the cloud server is displayed. Furthermore, if an OK button is selected from the pop-up window 19236 of the seventh UI screen 19200*g*, the screen where a Start Print 19230 menu item has been selected is displayed on a ninth UI screen 19200*i*.

FIGS. 193A and 193B illustrate UI screens which are displayed in the process of uploading print data in a cloud server by designating a receiver in a mobile application, according to an embodiment.

Referring to FIG. 193A, a first UI screen 19300*a* is a screen where a Send Print 19350 menu item has been selected and is a UI screen for transmission of print data. A list 19310 of people who have installed the application in a mobile terminal and a list 19320 of people who have not installed the application are separately displayed on the first UI screen 19300*a*. An icon 19312, which denotes the cloud, is displayed on the list 19310 of people who have installed the application. Furthermore, an invitation message to install an application by selecting one from the list 19320 of people who have not installed the application may be transmitted.

Print data may be transmitted to people who have installed the application in the mobile terminal. If a receiver 19311 is selected in the first UI screen 19300*a*, a checkbox is displayed to the selected receiver as in a second UI screen 19300*b*. Furthermore, if the print button is selected in the second UI screen 19300*b*, a pop-up window 19313, which shows categories of print data to be transmitted, is displayed on a third UI screen 19300*c*. If a photo 19314 is selected from the categories displayed on the pop-up window 19313, a list of photo albums is displayed on a fourth UI screen 19300*d*.

If a receiver icon 19316 is selected in the fourth UI screen 19300*d*, the first UI screen 19300*a* is displayed again so that the receiver may be selected again. If one album 19315 is selected from the list of photo albums displayed on the fourth UI screen 19300*a*, a fifth UI screen 19300*e* of FIG. 193B is displayed.

Referring to FIG. 193B, print data 19317 to be transmitted is selected in the fifth UI screen 19300*e*, and if the print button is selected, a pop-up window 19318, which indicates that the print data is being transmitted, is displayed on a sixth UI screen 19300*f*. Furthermore, if the transmission of the print data is completed by the passage of a certain time, a pop-up window 19319, which notifies that transmission has been completed, is displayed on a seventh UI screen 19300*g*. Here, if the OK button is pushed, an eighth UI screen 19300*h* is displayed. The eighth UI screen 19300*h* is a UI screen in the state where a Send Print 19350 menu item has been selected.

Furthermore, here, the fact that print data has been transmitted to the receiver actually refers to print data being uploaded to the cloud server to correspond to a phone number of the mobile terminal of the receiver. The receiver may check print data uploaded to the cloud server and perform a printing job by executing the application from the receiver's mobile terminal.

FIGS. 194 and 195 illustrate UI screens which are displayed in the process of printing print data which is stored in a cloud server via a mobile application, according to an embodiment.

Referring to FIG. 194, a first UI screen 19400*a* is a UI screen in the state where a Get Print 19440 menu item has been selected. A list 19410 of print data to be printed is displayed on the first UI screen 19400*a*. The print data displayed in the list 19410 is files which are stored in the cloud server.

If print data 19411 to be printed is selected by the user in a second UI screen 19400*b* and the mobile terminal NFC-tags the image forming device in the state where the application screen is displayed, a pop-up window 19412, which indicates that the print data is being transmitted from the cloud server to the image forming device, is displayed on a third UI screen 19400*c*. Furthermore, if the printing of the selected print data is completed with the passage of a certain time, a fourth UI screen 19400*d* is displayed. A message that the printing has been completed is displayed on the fourth UI screen 19400*d*. Furthermore, a list of print-completed data disappears from a list 19420 of the print data, and print data, which is waiting for printing, is displayed.

Referring to FIG. 195, a first UI screen 19500*a* is a UI screen in the state where a Get Print 19540 menu item has been selected. A list 19510 of print data to be printed is displayed on the first UI screen 19500*a*. The print data displayed in the list 19510 is files which are actually stored in the cloud server.

If the mobile terminal NFC-tags the image forming device in the state where the first UI screen 19500*a* is displayed on the mobile terminal, all print data in the list 19510 is selected. A second UI screen 19500*b* shows that all print data has been selected. Furthermore, if the mobile terminal NFC-tags the image forming device again in the state the second UI screen 19500*b* has been displayed, the printing of the selected print data is performed. A pop-up window 19512, which indicates that the print data is being transmitted from the cloud server to the image forming device, is displayed on a third UI screen 19500*c*, and if the printing job is completed with the passage of a certain time, a message, which notifies that the printing has been completed, is displayed on a fourth UI screen 19500*d*.

FIGS. 196 to 199 illustrate animation screens which are displayed when performing each operation of a cloud print service via a mobile application, according to an embodiment.

Figure 196:
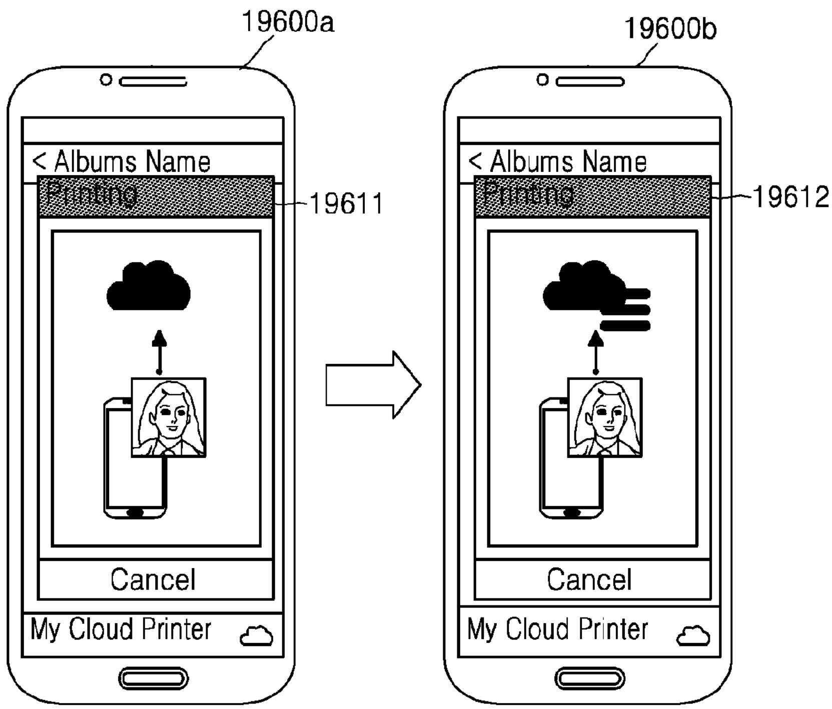

In detail, FIG. 196 illustrates an animation which is displayed when uploading print data to the cloud server to correspond to the user's mobile terminal. Referring to FIG. 196, a pop-up window 19611, which indicates that print data is being uploaded to the cloud server, is displayed on a first UI screen 19600*a*, and if the upload is completed with the passage of a certain time, a pop-up window 19612, which shows an animation indicating that the upload of the print data has been completed, is displayed on a second UI screen 19600*b*.

Figure 197:
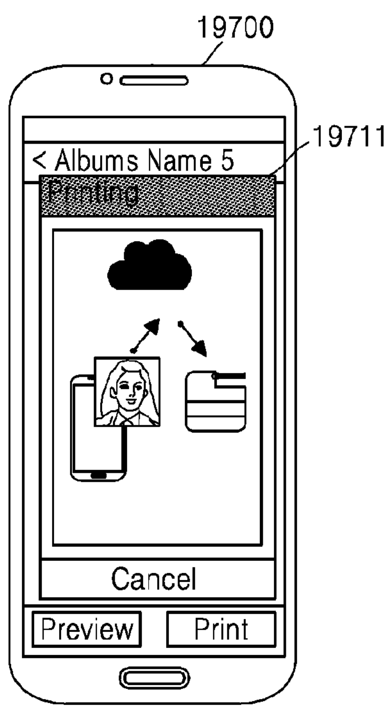

FIG. 197 illustrates an animation which is displayed when performing printing by transmitting print data stored in the mobile terminal directly to the image forming device through the cloud server. A UI screen 19700 displays a pop-up window 19711 which illustrates an animation indicating that the print data is being transmitted to the image forming device through the cloud.

Figure 198:
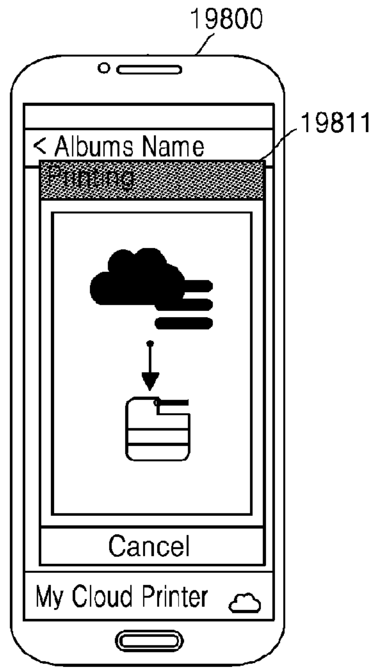

FIG. 198 illustrates an animation which is displayed when printing print data stored in the cloud server. A pop-up window 19811, which illustrates an animation indicating that print data stored in the cloud server is being transmitted to the image forming device, is displayed on the UI screen 19800.

Figure 199:
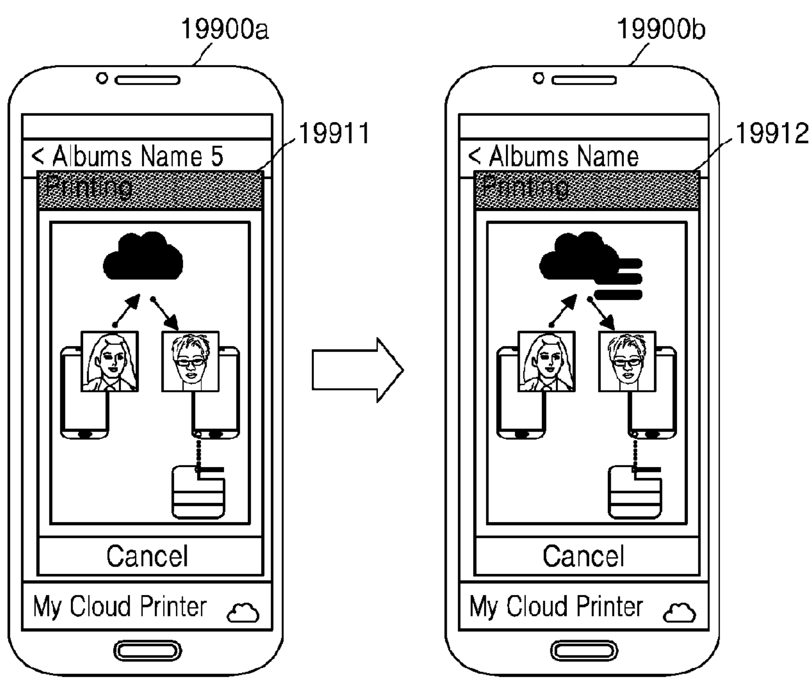

FIG. 199 illustrates an animation which is displayed when printing the print data to another person through the cloud server. A pop-up window 19911, which illustrates an animation indicating that the print data is being transmitted to another person through the cloud, is displayed on a first UI screen 19900*a*. If the transmission of data is completed with the passage of a certain time, a pop-up window 19912, which illustrates an animation indicating that the storing of the print data in the cloud server has been completed, is displayed on a second UI screen 19900*b*.

FIGS. 200 to 205 are flowcharts illustrating operations of a method of providing a cloud print service by using a mobile application, according to embodiments.

Figure 200:
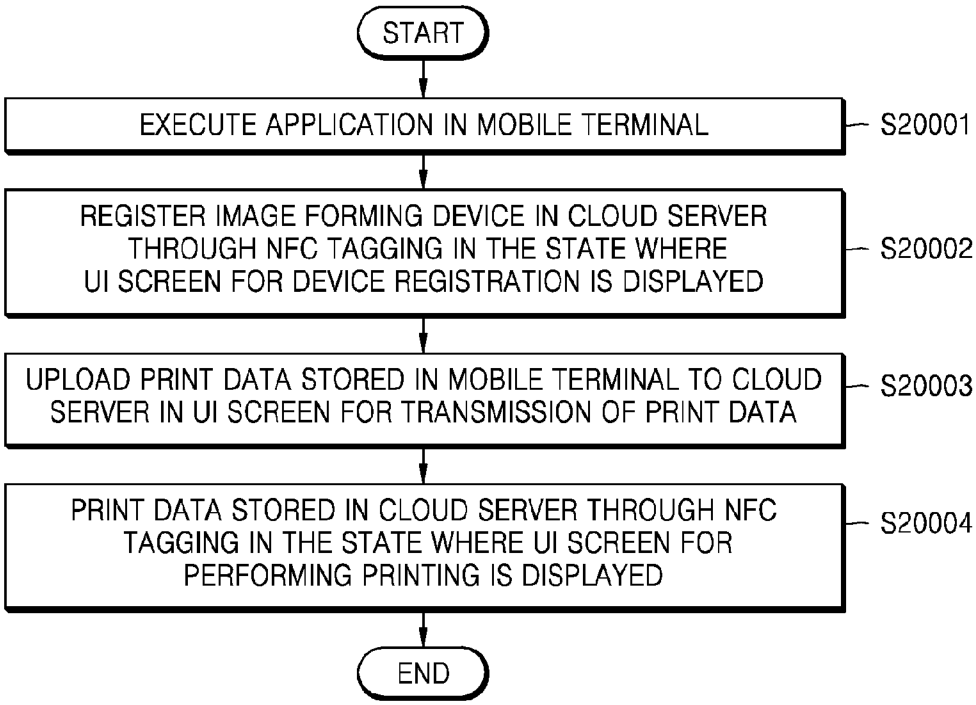

Referring to FIG. 200, in operation S20001, an application for using the cloud print service in a mobile terminal is executed. In operation S20002, an image forming device is registered in a cloud server through NFC tagging in a state where a UI screen for device registration of the application is displayed. In operation S20003, print data stored in the mobile terminal is uploaded to the cloud server in the UI screen for transmission of print data. Lastly, in operation S20004, in the state where the UI screen for performing printing is displayed, data stored in the cloud server is printed through NFC tagging.

FIGS. 201 to 205 are flowcharts of operations of FIG. 200 in detail.

Figure 201:
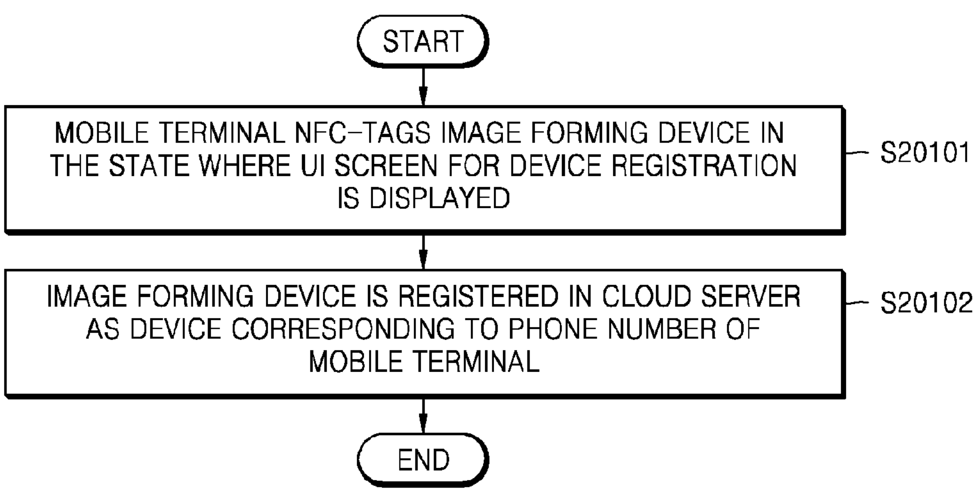

FIG. 201 is a flowchart of operation S20002 in detail. Referring to FIG. 201, in operation S20101, in the state where a UI screen for device registration is displayed, if the mobile terminal NFC-tags the image forming device, in operation S20102, the image forming device is registered in the cloud server as the device corresponding to a phone number of the mobile terminal.

Figure 202:
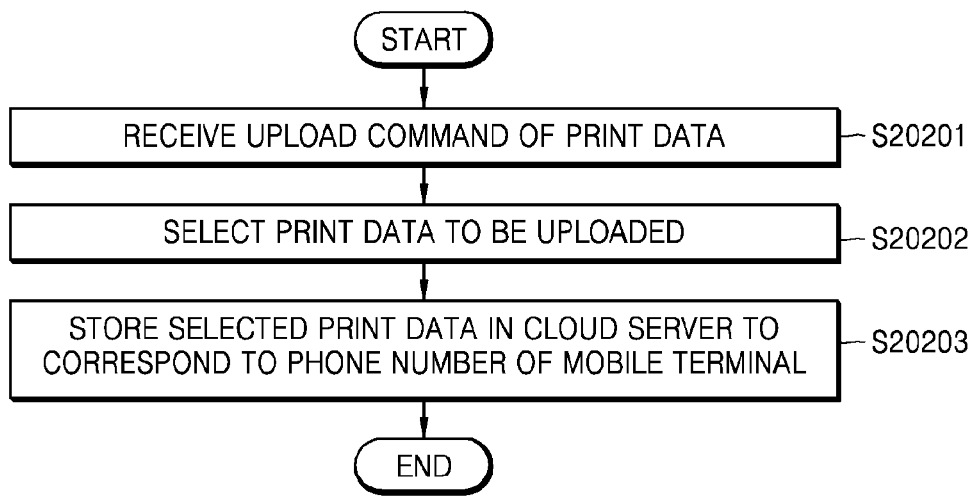
Figure 203:
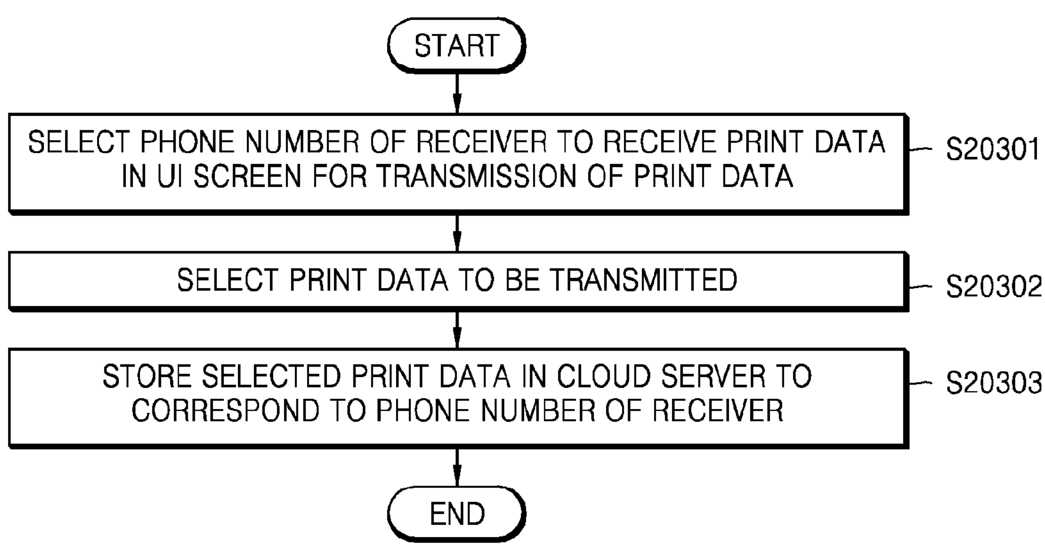

FIGS. 202 and 203 are flowcharts of operation S20004 in detail.

Referring to FIG. 202, an upload command of print data is received in operation S20201. In operation S20202, print data to be uploaded is selected. In operation S20203, the selected print data is stored in the cloud server to correspond to a phone number of the mobile terminal.

Referring to FIG. 203, the phone number of the receiver to receive print data is selected in the UI screen for transmission of print data in operation S20301. In operation S20302, the print data to be transmitted is selected. In operation S20303, the selected print data is stored in the cloud server to correspond to the phone number of the receiver.

Figure 204:
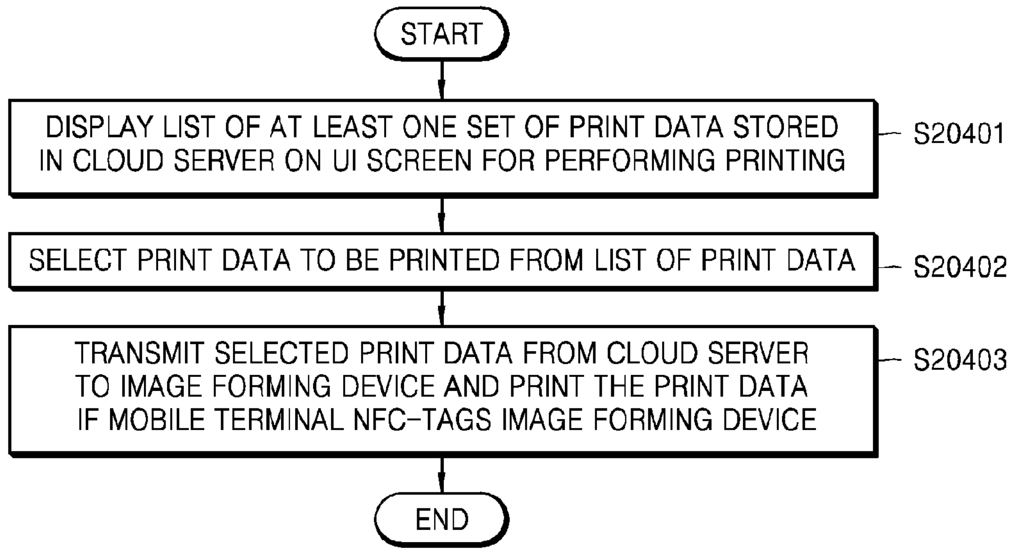
Figure 205:
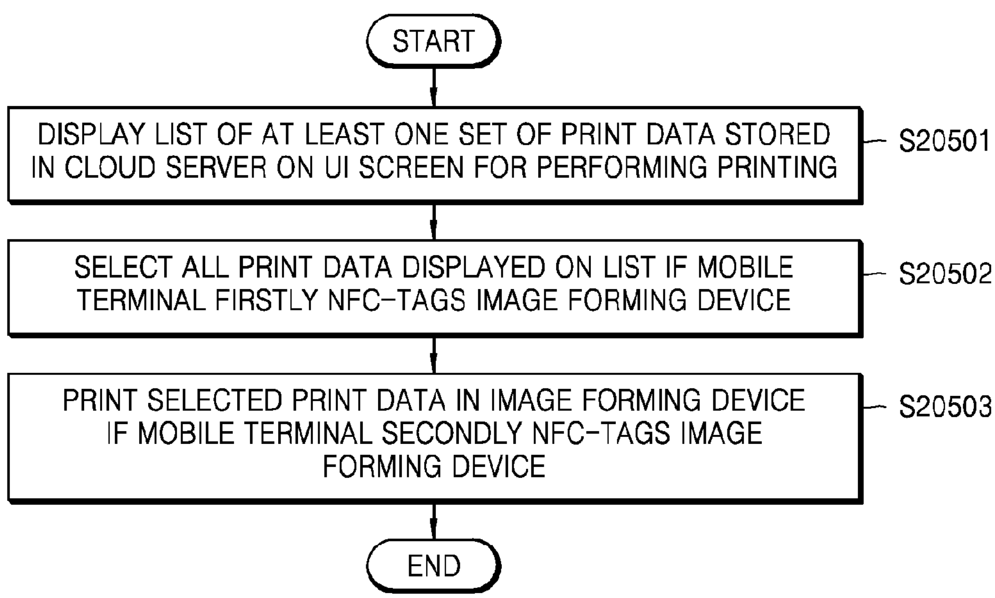

FIGS. 204 and 205 are flowcharts of operation S20004 of FIG. 200 in detail.

Referring to FIG. 204, in operation S20401, a list of at least one set of print data stored in the cloud server is displayed on a UI screen for performing printing. In operation S20402, print data to be printed is selected from the list of print data. In operation S20403, if the mobile terminal NFC-tags the image forming device, the print data selected from the cloud server is transmitted to the image forming device so as to be printed.

Referring to FIG. 205, in operation S20501, the list of at least one set of print data stored in the cloud server is displayed on the UI screen for performing printing. In operation S20502, if the mobile terminal firstly NFC-tags the image forming device, all the print data displayed in the list is selected. In operation S20503, if the mobile terminal secondly NFC-tags the image forming device, the selected print data is printed in the image forming device.

FIG. 206 is a diagram of a cloud print system provided through a mobile application, according to an embodiment. Referring to FIG. 206, the cloud print system provided through the mobile application, according to an embodiment may include a cloud print server 20610, first and second mobile terminals 20620 and 20650, and output devices. Here, the output terminals may include an image forming apparatus 20630 capable of a print output, and a TV 20640 capable of a display output.

A mobile application for using a cloud print service may be installed in and executed by the first and second mobile terminals 20620 and 20650, and the first and second mobile terminals 20620 and 20650 may be registered in the cloud print service. In detail, when the mobile application is installed in the first and second mobile terminals 20620 and 20650 and goes through a predetermined registering process, a user account is generated under a phone number of each of the first and second mobile terminals 20620 and 20650, and thus the first and second mobile terminals 20620 and 20650 are registered in the cloud print server 20610.

Examples of the output devices include all devices that support various types of outputs, such as the image forming apparatus 20630 and the TV 20640. The image forming apparatus 20630 supports an output in a printing form and the TV 20640 supports an output in a display form. Since examples of content used in the cloud print service generally include texts and images, such as documents and photos, the output device may be any device supporting an output of such content. For example, the output device may be a device capable of outputting an image, such as a monitor or a laptop, or a device capable of a print output, such as a printer or a multi-function printer (MFP).

The output devices may be registered in the cloud print server 20610 to correspond to the phone number of at least one of the first and second mobile terminals 20620 and 20650. Also, authority for using the output devices registered in the cloud print server 20610 is assigned to the user account of the corresponding phone number. For example, when the image forming apparatus 20630 is registered in the cloud print server 20610 to correspond to the phone number of the first mobile terminal 20620, a first user 20660 having the user account of the phone number of the first mobile terminal 20620 has authority for using the image forming apparatus 20630.

When the first and second mobile terminals 20620 and 20650 are registered in the cloud print service, the first and second mobile terminals 20620 and 20650 may perform cloud printing by transmitting and sharing content to and with another mobile terminal or the output devices registered in the cloud print service. Such an operation may be performed through the mobile application installed in the first and second mobile terminals 20620 and 20650, and in detail, an embodiment suggests a method of transmitting and sharing content through a sharing room.

A user who subscribed to a cloud print service may open a sharing room on a mobile application, and invite another user who is subscribed to the cloud print service and an output device that is authorized to be used by the user to the sharing room.

FIG. 207 is a diagram for describing an example of opening a sharing room and inviting another user and another device to the sharing room. It is assumed that the first user 20660 and a second user 20670 are subscribed to a cloud print service by respectively using the phone numbers of the first and second mobile terminals 20620 and 20650 as user accounts, and the image forming apparatus 20630 is registered in the cloud print server 20610 to correspond to the phone number of the first mobile terminal 20620. Referring to FIG. 207, the first user 20660 may open a sharing room by executing a mobile application in the first mobile terminal 20620, and invite the second user 20670 that is another user who subscribed to the cloud print service and the image forming apparatus 20630 that is an output device authorized to be used by the first user 20660 to the sharing room.

When the second user 20670 and the image forming apparatus 20630 participate in the sharing room, content may be transferred and shared through the sharing room. When the participating is completed, participants of the sharing room are displayed on an application screen displayed on a display unit of the first mobile terminal 20620. Here, the opening of the sharing room may be simultaneously performed with the inviting, or the inviting may be additionally performed while the sharing room is opened. Detailed operations of transmitting and sharing content through a sharing room are described in detail later with reference to drawings regarding user interface (UI) screens displayed during the corresponding operation.

FIG. 208 is a block diagram of the cloud print server 20610 for providing a cloud print service using a mobile application, according to an embodiment.

Referring to FIG. 208, the cloud print server 20610 according to an embodiment may include a communication interface unit 20611, a controller 20612, a storage unit 20613, a rendering performer 20614, and a sharing room manager 20615. Also, the cloud print server 20610 may selectively include a hypertext mark-up language (HTML) converter 20616.

The communication interface unit 20611 is a component for communicating with a mobile terminal and output devices through an Internet or the like.

The controller 20612 is a component for controlling operations of other components included in the cloud print server 20610, and controls a series of operations for providing a cloud print service.

The storage unit 20613 may store account information subscribed to the cloud print service, device information registered to correspond to each account, and content transferred through the cloud print service.

The rendering performer 20614 performs rendering to convert content to a proper format being output by an output device. The rendering performer 20614 may be realized as a component included in the cloud print server 20610 as shown in FIG. 208, or may be realized in a separate server that performs rendering.

The sharing room manager 20615 manages a sharing room opened on a mobile application executed in a mobile terminal connected to the cloud print server 20610. For example, the sharing room manager 20615 transmits a sharing room invitation message to a mobile terminal or manages lists of mobile terminals or output devices participating in a sharing room. Also, the sharing room manager 20615 stores content transferred or shared through a sharing room in the storage unit 20613 or transmits the content to a destination terminal or a device. The sharing room manager 20615 may be physically realized in one processor together with the controller 20612.

The HTML converter 20616 is a component that is selectively included if required, and converts transferred content to an HTML format. Although a layout of a file in an HTML format may sometimes be misaligned, but the HTML format is widely used in transferring content since the HTML is conveniently obtained and any device having a web browser is capable of interpreting and displaying an HTML file.

Operations of the components included in the cloud print server 20610, in detail, the sharing room manager 20615, will be described in detail later by referring to UI screens of a mobile application.

FIG. 209 is a block diagram of a mobile terminal 20620 for providing a cloud print service using a mobile application, according to an embodiment.

Referring to FIG. 209, the mobile terminal 20620 according to an embodiment may include a communication interface unit 20621, a controller 20622, a storage unit 20623, an application executer 20624, and a near-field communication (NFC) module 20625.

The communication interface unit 20621 is a component for communicating with a cloud print server through an Internet or the like.

The controller 20622 is a component for controlling operations of other components included in the mobile terminal 20620, and controls a series of operations for providing a cloud print service using a mobile terminal.

The storage unit 20623 may store various contents, and may store data required to execute a mobile application. Also, the storage unit 20623 may store details about option settings on a mobile application.

The application executer 20624 is a component for executing a mobile application. The application executer 20624 may perform processes for opening a sharing room, inviting a user or a device to the sharing room, and transferring and sharing content in the sharing room. In detail, when a sharing room is opened, or a user or a device is invited to the sharing room, such information is notified to the cloud print server so that the sharing room is managed. Also, when content is transferred or shared through the sharing room, content stored in the storage unit 20623 may be transmitted to the cloud print server through the communication interface unit 20621, the mobile terminal 20620 may receive content stored in the cloud print server, or content stored in the cloud print server may be transmitted to an output device.

The NFC module 20625 is a component that is selectively included if required. The NFC module 20625 may be used while registering an output device in the cloud print server. In detail, when the mobile terminal 20620 tags an NFC tag storing device information of the output device, the NFC module 20625 obtains the device information stored in the NFC tag. The controller 20622 transmits the obtained device information to the cloud print server together with a phone number of the mobile terminal 20620 so that the output device is registered as a device corresponding to the phone number of the mobile terminal 20620.

Detailed operations of the components included in the mobile terminal 20620, in detail, the application executer 20624, will be described in detail later by referring to UI screens of a mobile application.

A method of using a cloud print service using a mobile application, according to an embodiment will now be described in detail with reference to FIGS. 210 through 217 illustrating UI screens of a mobile application. Here, the cloud print server 20610 of FIG. 208 and the mobile terminal 20620 of FIG. 209 will also be described.

FIG. 210 illustrates UI screens displayed during a process of subscribing to a cloud print service through a mobile application, according to an embodiment.

A first UI screen 21000*a* is a UI screen displayed when a mobile application is initially executed in a mobile terminal after the mobile application is installed. When “Phone number” 21001 is selected from the first UI screen 21000*a*, a UI screen for receiving a phone number is displayed as in a second UI screen 21000*b*.

When a phone number of the mobile terminal is input to a phone number input box 21002 displayed on the second UI screen 21000*b*, and “Register” is selected, the mobile terminal is subscribed to a cloud print service by using the phone number as a user account, and then a third UI screen 21000*c* is displayed. A list 21003 of output devices registrable as device buddies is displayed in the third UI screen 21000*c*. Here, a device buddy is a device registered in a server for using a cloud print service.

A registrable output device may be searched for via any one of various methods, and for example, a device, such as a registrable image forming apparatus or TV may be searched for via an access point (AP).

When an output device is selected from the list 21003 displayed on the third UI screen 21000*c*, the selected output device is registered in a cloud print server to correspond to the phone number of the mobile terminal. In FIG. 210, an image forming apparatus "SCX-621" and a TV "Smart TV" are selected.

After the mobile terminal subscribes to the cloud print service and the selected output device is registered in the cloud print service, a fourth UI screen 21000*d* is displayed. A device buddy list 21004 and a buddy list 21005 are displayed on the fourth UI screen 21000*d*. As described above, a device buddy is a device registered in a server for using a cloud print service, and a buddy is another user capable of using the cloud print service. When the mobile terminal initially subscribes to the cloud print service, the buddy list 21005 may be formed by comparing contacts stored in the mobile terminal with phone numbers registered in the cloud print server, and preparing a list of users corresponding to phone numbers matching the contacts. In other words, a user who is subscribed to the cloud print service from among people stored in the contacts is registered as a buddy and included in the buddy list 21005.

In FIG. 210, the mobile application is executed by the application executer 20624 of the mobile terminal 20620. Then, when the phone number is input and "Register" is selected in the second UI screen 21000*b*, the application executer 20624 transmits the input phone number to the cloud print server 20610 through the communication interface unit 20621. The controller 20612 of the cloud print server 20610 stores the received phone number in a user account table of the storage unit 20613, thereby completing account registration.

Also, when an output device is selected in the third UI screen 21000*c*, the controller 20612 maps a media access control (MAC) address of the selected output device to the phone number of the mobile terminal 20620, and stores the MAC address in the storage unit 20613.

After the account registration is completed, the cloud print server 20610 provides the buddy list 21005 to the mobile terminal 20620 based on contact information received from the mobile terminal 20620.

FIG. 211 illustrates UI screens displayed during a process of additionally registering, by a mobile application, a device, according to an embodiment.

A first UI screen 21100*a* of FIG. 211 is in a state in which a buddy menu 21110 is selected, and a device buddy list 21101 and a buddy list 21102 are displayed. When a buddy add icon 21109 is selected in the first UI screen 21100*a*, a second UI screen 21100*b* is displayed.

First through fourth menus 21111 through 21114 of various methods for adding a buddy are displayed on the second UI screen 21100*b*. Also, a list 21103 of devices registrable as device buddies and a list 21104 of users registrable as buddies are displayed below the first through fourth menus 21111 through 21114. As shown in FIG. 211, when a device "SCX-621" is selected from the list 21103, the selected device "SCX-621" is registered in a cloud print server, and a third UI screen 21100*c* is displayed. The device "SCX-621" that is already registered is disappeared from a list 21105 of registrable devices in the third UI screen 21100*c*.

When the buddy menu 21110 is selected again after device registration, a fourth UI screen 21100*d* is displayed. As shown in the fourth UI screen 21100*d*, the newly registered device "SCX-621" is added to a device buddy list 21107.

An output device may be registered as a device buddy via any other method. Referring to the second UI screen 21100*b*, when the first menu 21111 is selected, a device buddy is registered according to the method described with reference to FIG. 211. When the second menu 21112 is selected, a device may be registered by inputting an identification (ID) or a serial number of the device. When the third menu 21113 is selected, a device may be registered in a server by reading a quick response (QR) code storing information about the device. Here, if the device is a printer, a printer ID and the QR code may be printed on a demo page output after installing the printer.

When the fourth menu 21114 is selected, a mobile terminal may be NFC-tagged to an output device to conveniently register the output device.

In FIG. 211, when a device buddy is added, the controller 20612 of the cloud print server 20610 may map an MAC address of the added device buddy to a phone number of the mobile terminal 20620, and store the mapped MAC address in the storage unit 20613.

FIG. 212 illustrates UI screens displayed during a process of opening, by a mobile application, a sharing room by inviting an output device and outputting, by the output device, content through the sharing room, according to an embodiment.

In a first UI screen 21200*a* of FIG. 212, a share menu 21220 is selected and a list 21201 of sharing rooms is displayed. In order to enter one of the sharing rooms, a sharing room item is selected from the list 21201. In order to open a new sharing room, a sharing room add icon 21221 at the right top of the first UI screen 21200*a* is selected. When the sharing room add icon 21221 is selected, a second UI screen 21200*b* is displayed.

In the second UI screen 21200*b*, a screen for selecting a buddy to be invited to the new sharing room is shown. In the second UI screen 21200*b*, a device buddy list 21202 and a buddy list 21203 are displayed. Here, a device buddy displayed on the device buddy list 21202 may be displayed in a device name, such as "Smart TV", or may be displayed in a device location or model name, such as "7th Meeting room (SCX-621)". In addition, a device buddy may be displayed in any method for identifying the device buddy.

In FIG. 212, "7th Meeting room (SCX-621)" is selected from the device buddy list 21202. As a result, a sharing room screen is displayed as in a third UI screen 21200*c*, and buddies participating in the new sharing room are shown in a region 21223. In a region 21230, menus of operations performable in the new sharing room are displayed. A user may select one of the menus in the region 21230 to take a photograph and transmit the photograph directly to the new sharing room, to select one of photographs stored in the mobile terminal and transmit the selected photograph to the new sharing room, or to select one of documents stored in the mobile terminal and transmit the selected document to the new sharing room. In FIG. 212, a document transmit menu 21231 is selected from the menus in the region 21230.

When the document transmit menu 21231 is selected from the third UI screen 21200*c* and then the user selects a document to be transmitted, the document is transmitted to and shared in the new sharing room as in a fourth UI screen 21200*d*. When the document is transmitted, a preview of the document is displayed in a form of a thumbnail 21240 in the new sharing room. A file name 21241 of the document is also displayed in the thumbnail 21240. Also, a document output icon 21242 is displayed at the bottom of the thumbnail 21240. The user may select the document output icon 21242 to output the document corresponding to the thumbnail 21240. Here, the document is output by "7th Meeting room (SCX-621)" that is the device buddy participating in the new sharing room.

In the current embodiment, since the device buddy participating in the new sharing room is an image forming apparatus, the document is printed according to a document output command, but if "Smart TV" is selected in the second UI screen 21200*b* and participates in the new sharing room, the document is displayed on a TV screen corresponding to "Smart TV" according to attributes of a TV that is an output device.

If a plurality of output devices are participating in the new sharing room, a UI screen for receiving a selection on an output device is displayed according to a content output command, and the document is output according to attributes of the output device selected by a user.

As such, a user may open a sharing room in a mobile application and invite a device buddy to the sharing room, thereby conveniently outputting content through the device buddy. Here, outputting of the content may be determined according to attributes of an output device participating in the sharing room.

In FIG. 212, when a mobile application opens a sharing room, the application executer 20624 of the mobile terminal 20620 notifies the cloud print server 20610 about the opened sharing room, and the sharing room manager 20615 of the cloud print server 20610 manages the sharing room. In detail, the sharing room manager 20615 manages a list of buddies participating in the sharing room, and when content is shared in the sharing room, receives the content from the mobile terminal 20620 and stores the content in the storage unit 20613. Here, the content may be converted to an HTML format by the HTML converter 20616 and then stored in the storage unit 20613.

Also, the sharing room manager 20615 provides a thumbnail of a preview of the content to the mobile terminal 20620, and if the HTML converter 20616 is included in the cloud print server 20610, the sharing room manager 20615 transmits the content in the HTML format to the mobile terminal 20620 and the application executer 20624 of the mobile terminal 20620 displays the content in the HTML format in the sharing room as the thumbnail 21240.

Also, when the document output icon 21242 is selected from the fourth UI screen 21200*d*, the sharing room manager 20615 extracts the content corresponding to the thumbnail 21240 from the storage unit 20613 and transmits the extracted content to the rendering performer 20614 to be rendered.

FIGS. 213A and 213B illustrate UI screens displayed during a process of transmitting, by a mobile application, content to another user through a sharing room, and outputting, by the other user who received the content, the content by using a device participating in the sharing room, according to an embodiment. In detail, FIG. 213A illustrates UI screens displayed on a mobile terminal of "Carol" who is a transmitter, and FIG. 213B illustrates UI screens displayed on a mobile terminal of "Stella" who is a receiver.

A share menu 21320 is selected from a first UI screen 21300*a* of FIG. 213A. Here, as described above, a list 21301 of sharing rooms is displayed. When "Carol" who is the transmitter selects a sharing room add icon 21321 from the first UI screen 21300*a*, a second UI screen 21300*b* is displayed.

A screen for selecting a buddy to be invited to a sharing room that is newly opened is shown in the second UI screen 21300*b*. A device buddy list 21302 and a buddy list 21303 are displayed in the second UI screen 21300*b*.

In FIG. 213A, "Carol" selects "7th Meeting room (SCX-621)" from the device buddy list 21302 and selects "Stella" as the receiver from the buddy list 21303. As a result, a sharing room screen is displayed as in a third UI screen 21300*c*, and buddies participating in the sharing room are displayed in a region 21323. A menu of operations performable in the sharing room is displayed in a region 21330, and "Carol" selects a document transmit menu 21331 from among the menus.

When the document transmit menu 21331 is selected from the third UI screen 21300*c* and "Carol" selects a document to be transmitted, the document is transmitted to and shared in the sharing room as shown in a fourth UI screen 21300*d*. When the document is transmitted, a preview of the document is displayed in the sharing room in a form of a thumbnail 21340. A file name 21341 of the document is also displayed in the thumbnail 21340. Also, a document output icon 21342 is displayed at the bottom of the thumbnail 21340. Here, if "Carol" selects the document output icon 21342 from the mobile terminal, "7th Meeting room (SCX-621)" participating in the sharing room prints the document corresponding to the thumbnail 21340, as described above with reference to FIG. 212.

The UI screens displayed on the mobile terminal of "Stella" will now be described with reference to FIG. 213B.

A sharing room is displayed on a fifth UI screen 21300*e* of FIG. 213B, and a thumbnail 21350 and a file name 21351 of a document shared with buddies participating in the sharing room are displayed. The fifth UI screen 21300*e* is similar to the fourth UI screen 21300*d* of the mobile terminal of "Carol" described above. However, the fifth UI screen 21300*e* further displays a store menu 21352, a print menu 21353, and a display menu 21354. "Stella" may select the store menu 21352 from the fifth UI screen 21300*e* to store a document file shared in the sharing room in the mobile terminal. Alternatively, "Stella" may select the print menu 21353 or the display menu 21354 to print or display a shared document.

In FIG. 213B, when "Stella" selects the print menu 21353, a popup 21360 for selecting a device to perform printing is displayed as shown in a sixth UI screen 21300*f*. In FIG. 213B, only one device is displayed since the number of output devices participating in the sharing room is one, but if at least two devices participate in the sharing room, the at least two devices may be displayed and one of the at least two devices may be selected to perform printing.

When a device is selected and an OK button is selected in the sixth UI screen 21300*f*, a shared document is printed, and when the printing is completed, a message indicating that the printing is completed is displayed in a region 21370 as shown in a seventh UI screen 21300*g*.

Operations of the cloud print server 20610 and the mobile terminal 20620 in FIGS. 213A and 213B are similar to those described above with reference to FIG. 212.

FIG. 214 illustrates a UI screen 21400 displaying a state of a device participating in a sharing room of a mobile application, according to an embodiment.

Referring to FIG. 214, the sharing room is displayed on the UI screen 21400, and a list of buddies participating in the sharing room is displayed in a region 21410. In a region 21420, state information of "SCX-621" that is a device participating in the sharing room is displayed. The displayed state information includes information about whether a current operation is performable and print option information.

Also, a message indicating that the device participating in the sharing room is currently usable, such as "SCX-621 is Ready", is displayed in a region 21430. A user may easily determine option settings and current usability by referring to the state information displayed in the sharing room.

In FIG. 214, the sharing room manager 20615 of the cloud print server 20610 checks option settings and a state of a device participating in a sharing room, and transmits the checked option settings and state to the mobile terminal 20620 to be displayed in a form of a message.

FIG. 215 illustrates UI screens displayed during a process of controlling, by a mobile application, content displayed on an output device, according to an embodiment.

Referring to FIG. 215, in a first UI screen 21500*a*, a user selects a display menu 21523 so that a document shared in "Smart TV" that is a device participating in a sharing room is displayed.

When the document is displayed on "Smart TV", a mobile terminal displays a screen for remotely controlling display of the document, as in a second UI screen 21500*b*. In the second UI screen 21500*b*, a message indicating that the display is currently controlled is displayed in a region 21530, a total number of pages of the document and a currently displayed page number of the document are displayed in a region 21541, and a time passed after the document is displayed is displayed in a region 21542. Here, the document currently displayed is in a form of a thumbnail 21540.

When the user touches and slides the thumbnail 21540 in the second UI screen 21500*b*, a screen displaying a next page of the document is shown as in a third UI screen 21500*c*.

As such, the user may control a displayed screen through a UI screen of a mobile application while a document shared in a sharing room is displayed on a device.

In FIG. 215, the application executer 20624 of the mobile terminal 20620 transmits details of controlling a display on a mobile application to the cloud print server 20610, and the sharing room manager 20615 transmits a control command to a device according to the received details.

FIG. 216 illustrates UI screens displayed during a process of adding a memo to a document shared in a sharing room of a mobile application, according to an embodiment.

A sharing room is displayed in a first UI screen 21600*a* of FIG. 216, a list of buddies participating in the sharing room is displayed in a region 21610, and a thumbnail 21621 of a shared document is displayed. When a user touches the thumbnail 21621 in the first UI screen 21600*a*, a function of adding a memo to a document is activated as shown in a second UI screen 21600*b*.

The user may add a memo 21633 by selecting a memo menu 21631 and touching a screen in the second UI screen 21600*b*. Also, if the user wants to delete an added memo, the user may select a delete menu 21632 and touch the added memo.

After the user completes a memo and selects a store menu, a popup 21640 for selecting a space for storing the document with the memo is displayed as in a third UI screen 21600*c*. In FIG. 216, "Sharing Window" that is an item for sharing in the sharing room is selected. Then, a thumbnail 21650 of the document with the memo is displayed in the sharing room as in a fourth UI screen 21600*d*. The document with the memo may be output as described above.

In FIG. 216, the application executer 20624 of the mobile terminal 20620 transmits content with a memo to the cloud print server 20610, and the sharing room manager 20615 extracts the content with the memo in a form of a bitmap and stores the extracted content with the memo in the storage unit 20613.

FIG. 217 illustrates UI screens displayed during a process of checking and managing, by a mobile application, a history of contents shared in a sharing room, according to an embodiment.

When a history management menu 21730 is selected from a first UI screen 21700*a*, thumbnails 21741 and 21751 that were pre-shared and sharing room information 21742 and 21752 including information about participants and shared times of the sharing room are displayed as in the first UI screen 21700*a*. A user checks the first UI screen 21700*a* to conveniently determine the history of contents shared in the sharing room.

Then, when the first UI screen 21700*a* is scrolled down, a previous history is displayed as in a second UI screen 21700*b*.

If content has been shared before but is currently deleted, the thumbnail 21741 is displayed dark as shown in a third UI screen 21700*c*. Also, if the sharing room is currently deleted, the sharing room information 21742 is displayed dark as shown in a fourth UI screen 21700*d*.

In FIG. 217, the sharing room manager 20615 of the cloud print server 20610 transmits the history of contents shared in the sharing room to the mobile terminal 20620 according to a request of the mobile terminal 20620, and the application executer 20624 receives and displays the history on a screen.

FIGS. 218 through 221 are flowcharts of a method of providing a cloud print service using a mobile application, according to embodiments.

Figure 218:
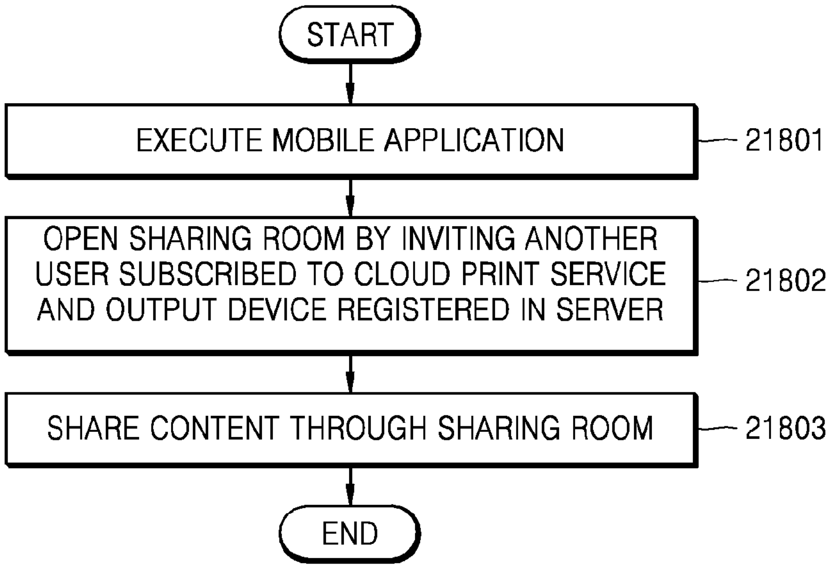

Referring to FIG. 218, a mobile application is executed in a mobile terminal in operation 21801.

In operation 21802, a sharing room is opened by inviting another user subscribed to a cloud print service and an output device registered in a server. Here, a device buddy and a buddy to be invited may be selected by using a device buddy list and a buddy list displayed on a UI screen of the mobile application.

In operation 21803, content is shared through the opened sharing room.

Figure 219:
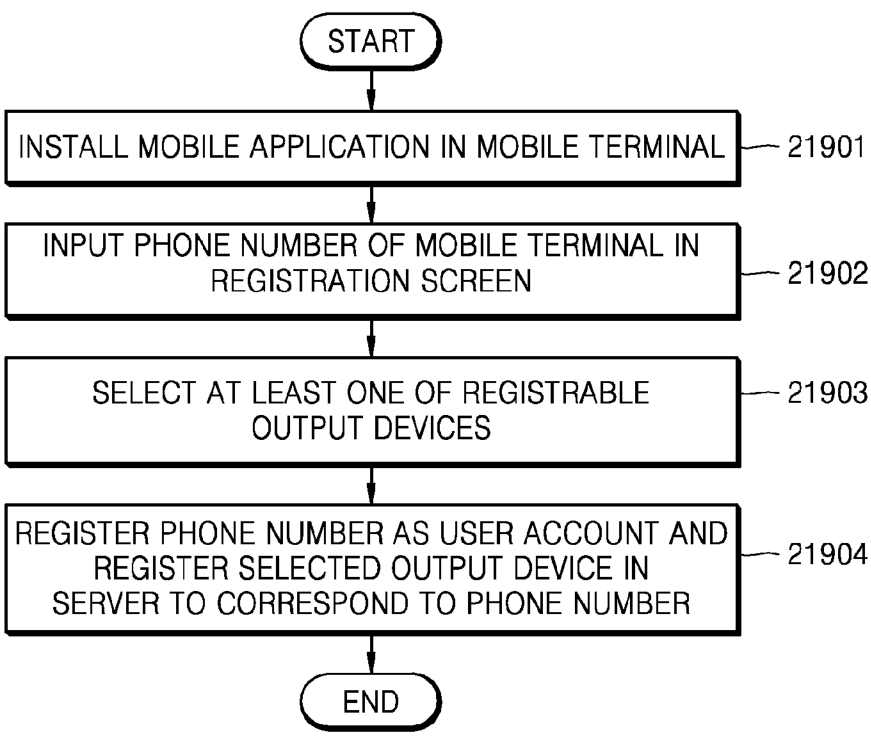

Referring to FIG. 219, a mobile application is installed in a mobile terminal in operation 21901, and a phone number of the mobile terminal is input in a registration screen of the mobile application in operation 21902. When the phone number is input, a list of output devices registrable as device buddies are displayed via searching.

When at least one of the output devices is selected in operation 21903, the input phone number is registered as a user account and the selected at least one output device is registered in a server to correspond to the phone number in operation 21904.

Figure 220:
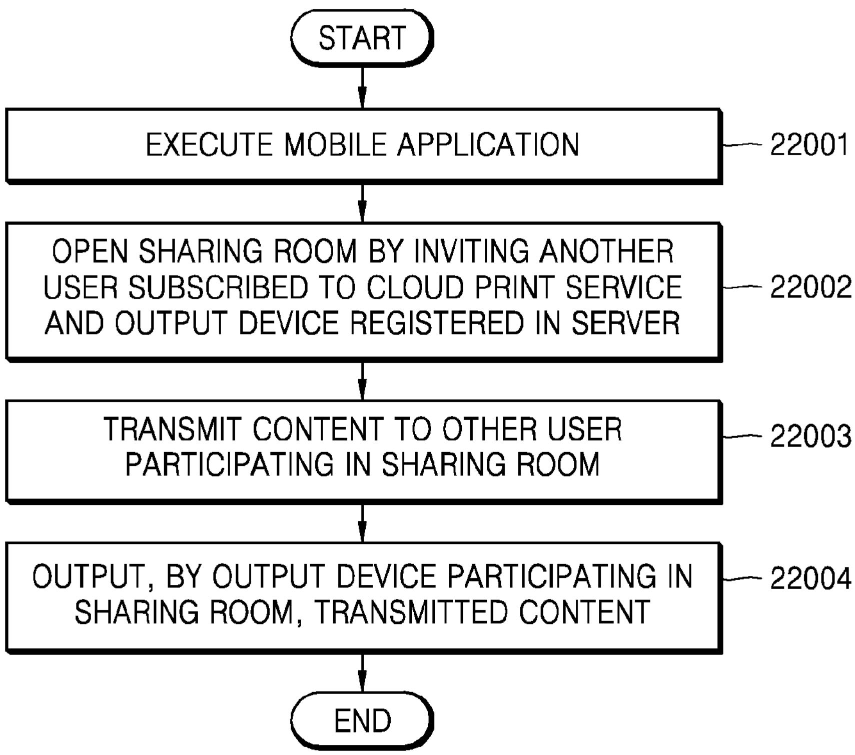

Referring to FIG. 220, a mobile application is executed in a mobile terminal in operation 22001.

In operation 22002, a sharing room is opened by inviting another user subscribed to a cloud print service and an output device registered in a server. Here, a device buddy and a buddy to be invited may be selected by using a device buddy list and a buddy list displayed on a UI screen of the mobile application.

In operation 22003, content is transmitted to the other user, i.e., a buddy, participating in the sharing room.

In operation 22004, the transmitted content is output by the output device, i.e., a device buddy, participating in the sharing room.

Figure 221:
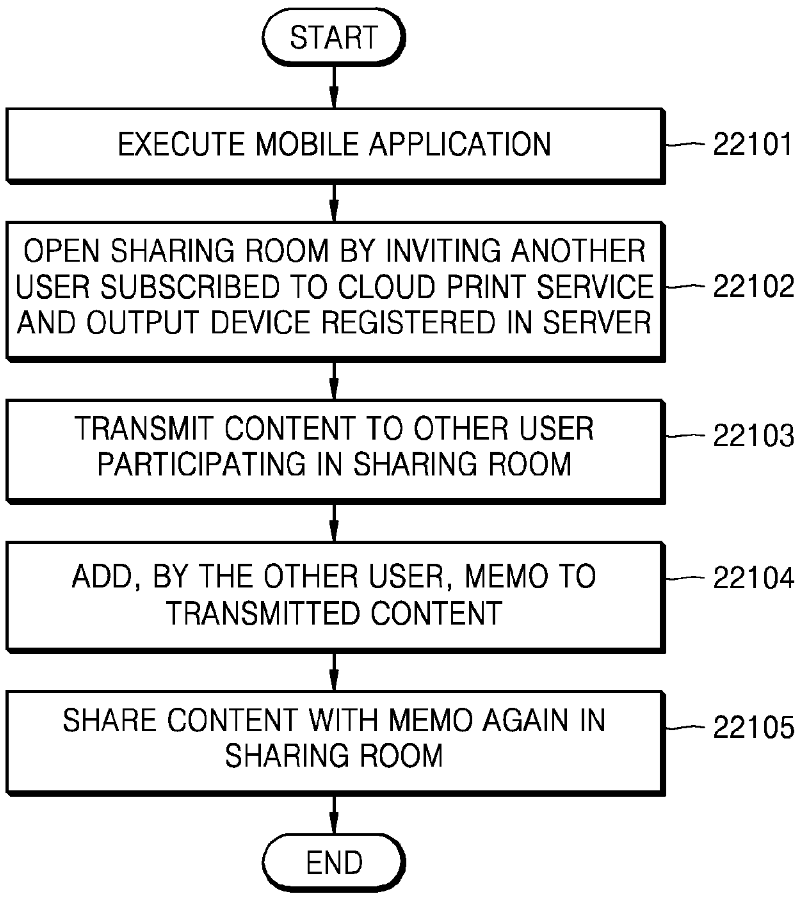

Referring to FIG. 221, in operation 22101, a mobile application is executed in a mobile terminal.

In operation 22102, a sharing room is opened by inviting another user subscribed to a cloud print service and an output device registered in a server. Here, a device buddy and a buddy to be invited may be selected by using a device buddy list and a buddy list displayed on a UI screen of the mobile application.

In operation 22103, content is transmitted to the other user, i.e., a buddy, participating in the sharing room.

In operation 22104, the other user participating in the sharing room adds a memo to the content.

In operation 22105, the content with the memo is shared again in the sharing room.

As described above, according to the one or more of the above embodiments, an image forming apparatus supporting a cloud printing service may be easily found and registered in a server by using an augmented reality application. Also, device registration of image forming apparatuses adjacent to a mobile terminal may be determined via a Bluetooth communication, and a nonregistered image forming apparatus may be registered in the server. Also, even when an image forming apparatus does not support an NFC tag, the image forming apparatus may be registered in the server via QR code reading.

FIG. 222 is a diagram for describing a process of registering an image forming apparatus 22223 in a cloud printing server 22222 by using a mobile device, according to an embodiment.

In operation 22201, when the power of the image forming apparatus 22223 is turned on, the image forming apparatus 22223 is connected to the cloud printing server 22222. At this time, the image forming apparatus 22223 may maintain connection to the cloud printing server 22222 according to a long-polling connection scheme. On the other hand, in the embodiments of the present specification, the term "cloud printing server 22222" may also be used along with the term "cloud server" (for example, the term "cloud server 40" in FIG. 2 or the like).

In operation 22202, the image forming apparatus 22223 transmits meta-information to the cloud printing server 22222 so as to identify the image forming apparatus 22223. Here, the meta-information of the image forming apparatus 22223 may contain information including a serial number, a MAC address, an IP address, a product name, a manufacturer, or the like.

In operation 22203, the cloud printing server 22222 stores the meta-information including the serial number, the MAC address, the IP address, the product name, the manufacturer, or the like from the image forming apparatus 22223. The cloud printing server 22222 may identify the image forming apparatus 22223 by using the stored meta-information.

In operation 22204, the image forming apparatus 22223 transmits identification information of the image forming apparatus 22223, including the MAC address of the image forming apparatus 22223, to the mobile device 22221 (receiving device, for example, the mobile device 13). The image forming apparatus 22223 may transmit the MAC address of the image forming apparatus 22223 to the mobile device 22221 through a P2P connection such as NFC tagging or Bluetooth.

In operation 22205, the mobile device 22221 maps a phone number of the mobile device 22221 to the MAC address of the image forming apparatus 22223 so as to register the image forming apparatus 22223 as a device designated in the phone number of the mobile device 22221.

In operation 22206, the mobile device 22221 transmits registration request information, including the phone number of the mobile device 22221 and the MAC address of the image forming apparatus 22223, to the cloud printing server 22222.

In operation 22207, the cloud printing server 22222 identifies the image forming apparatus 22223 by comparing the MAC address included in the meta-information stored in operation 22203 and the MAC address included in the registration request information received in operation 22206.

In operation 22208, when the image forming apparatus 22223 is identified by the MAC address of the image forming apparatus 22223, the cloud printing server 22222 registers the image forming apparatus 22223 with regard to the phone number of the mobile device 22221.

In operation 22209, the mobile device 22221 requests the cloud printing server 22222 to transmit the meta-information of the image forming apparatus 22223 registered to the phone number of the mobile device 22221.

In operation 22210, the cloud printing server 22222 transmits the meta-information of the registered image forming apparatus 22223, including the serial number, the MAC address, the IP address, the product name, or the manufacturer, to the mobile device 22221. Here, the transmitted meta-information may be the meta-information stored in operation 22203.

In operation 22211, the mobile device 22221 identifies the image forming apparatus 22223 registered to the phone number of the mobile device 22221 using the serial number, the MAC address, the IP address, the product name, or the manufacturer included in the meta-information. That is, when the mobile device 22221 receives an upload notification of content for a cloud printing service from the printing server 22222, the mobile device 22221 may identify the image forming apparatus 22223 as a device for printing the content by using the product name or the like of the image forming apparatus 22223 included in the meta-information. Here, in the embodiments of the present specification, the content for the cloud printing service may include a picture photographed by the transmitting device (for example, the mobile device 11 of FIG. 1), an image stored in the transmitting device (mobile device 11 of FIG. 1), a document stored in the transmitting device (mobile device 11 of FIG. 1), a webpage displayed on the transmitting device (mobile device 11 of FIG. 1), and an email displayed on the transmitting device (mobile device 11 of FIG. 1).

FIG. 223 is a diagram for describing a process of receiving a print job from a print job server 22320 and performing printing, which is performed by an image forming apparatus 22310, according to an embodiment.

Referring to FIG. 223, in operation 22320, the image forming apparatus 22310 maintains a session with the print job server 22320 by using a long-polling connection scheme so as to receive a print job. The print job server 22320 is a server that is included in the rendering server 17850 and refers to a server that manages rendered content. In particular, the rendering server 17850 may manage the rendered content by mapping the rendered content to an identifier of the image forming apparatus 22310. Specifically, the image forming apparatus 22310 maintains the session by transmitting a long-polling request to the print job server 22320 so as to receive the print job (rendered content) in a state of being connected to the print job server 22320 through a wired/wireless network. A time during which the session is maintained may be preset.

In operation 22301, when an event corresponding to the long-polling request occurs, the print job server 22320 transmits a response to the long-polling request to the image forming apparatus 22310 at a point of time when the event occurs. Specifically, when a print job mapped to the image forming apparatus 22310 is generated by the print job server 22320 within the session maintenance time, the print job server 22320 notifies the reception of the print job to the image forming apparatus 22310 through the session connected to the image forming apparatus 22310 in a form of a response to the long-polling request. The print job may be generated by a fetching server.

In operation 22302, when the notification of the print job is received, the image forming apparatus 22310 may recognize the arrival of the print job and request the print job server 22320 for print job information, including a file name, a file size, and a job identifier. At this time, in practice, the image forming apparatus 22310 does not request the print job but requests metadata, such as the file name, the file size, and the job identifier of the print job.

In operation 22303, when the request for the metadata of the print job is received from the image forming apparatus 22310, the print job server 22320 transmits the metadata of the print job, which is mapped to the image forming apparatus 22310, to the image forming apparatus 22310. The image forming apparatus 22310 receives the metadata of the print job (that is, detailed job information) from the print job server 22320.

In operation 22304, when the metadata of the print job is received, the image forming apparatus 22310 may transmit the request for the print job to the print job server 22320.

In operation 22305, when the request for the print job is received, the print job server 22320 may transmit print job data (rendered content) to the image forming apparatus 22310.

In operation 22306, when the print job data is transmitted to the print job server 22320, the image forming apparatus 22310 requests the print job server 22320 to delete the relevant print job from the print job server 22320. Here, the image forming apparatus 22310 requesting the print job server 22320 to delete the print job data so as to prevent the repeated reception of the same print job, but the current embodiment is not limited thereto. It is obvious to those of ordinary skill in the art that the request for reducing the printable number of times of the print job may be transmitted to the print job server 22320, without directly deleting the print job on the print job server 22320, or the print job may not be directly deleted.

In operation 22307, when the print job is successfully deleted, the print job server 22320 may send a message indicating the successful deletion of the print job.

In operation 22308, when the print job data is received from the print job server 22320, the image forming apparatus 22310 may perform an image forming operation for the print job. That is, the image forming apparatus 22310 may print the print job data.

In operation 22309, after the print job is output, the image forming apparatus 22310 may transmit the print job output result to the print job server 22320. For example, the image forming apparatus 22310 may transmit to the print job server 22320 the print job output result indicating that the print job has been successfully performed after the output of the print job. At this time, the print job server 22320 may send a message indicating that the print job output result has been successfully confirmed.

On the other hand, after reception of the message indicating that the print job output result has been successfully confirmed, the session is connected between the image forming apparatus 22310 and the print job server 22320 in a long-polling manner by transmitting a long-polling request, and the image forming apparatus 22310 waits for the print job mapped to the image forming apparatus 22310.

Specifically, the image forming apparatus 22310 and the print job server 22320 may communicate with each other by using an HTTP or an HTTPS.

FIG. 224 is a diagram for describing a process of performing a scan job to upload a scan job file.

In operation 22400, an image forming apparatus 22400 may perform a scan job on a document to be scanned. When the scan job has been completed, a scan job file may be generated. The image forming apparatus 22410 transmits the scan job file to a cloud server 22420. At this time, the image forming apparatus 22410 may receive a user input indicating that the scan job is performed.

In operation 22401, the cloud server 22420 may receive the scan job file from the image forming apparatus 22410.

In operation 22402, the cloud server 22420 may store the relevant scan job file and send a content key corresponding to the stored scan job file to the image forming apparatus 22410.

In operation 22403, the image forming apparatus 22410 may send, to the cloud server 22420, the received content key, sender information input from a user through a user panel of the image forming apparatus 22410 (arbitrary input character string), and receiver information (country code and phone number of a receiver).

The cloud server 22420 generates a job identifier mapped such that the content key and the phone number of the receiver corresponded to each other, and sends a message indicating the successful generation of the job identifier to the image forming apparatus 22410. At this time, the message may include the job identifier.

The image forming apparatus 22410 and the cloud server 22420 may communicate with each other by using an HTTP/HTTPS.

FIG. 225 is a diagram for describing a process of registering an image forming apparatus 22520 in a managing server 22520 and performing a print job, according to an embodiment.

In operation 22500, when the power of the image forming apparatus 22510 is turned on, the image forming apparatus 22510 performs connection to the managing server 22520.

In operation 22501, the image forming apparatus 22510 transmits a serial number, a MAC address, and a model name of the image forming apparatus 22510 to the managing server 22520.

In operation 22502, the managing server 22520 may generate an image forming apparatus object. The generated image forming apparatus object is a logical object. The image forming apparatus object may be generated by mapping the serial number, the MAC address, and the model name of the image forming apparatus to each other. At this time, an image forming apparatus identifier (printer ID) corresponding to the image forming apparatus 22510 may be generated. On the other hand, when the image forming apparatus object is already generated by the managing server 22520, the process of generating the image forming apparatus object may not be performed.

In operation 22503, when the managing server 22520 generates the image forming apparatus object, the managing server 22520 may transmit a print job server address and an image forming apparatus identifier to the image forming apparatus 22510. The image forming apparatus 22510 may periodically check a license with respect to the managing server 22520. For example, the image forming apparatus 22510 may check the license every 24 hours.

Since the contents associated with the communication performed between the image forming apparatus 22510 and the print job server 22530 are substantially the same as the contents described above with reference to FIG. 223, a description thereof will be omitted.

FIG. 226 is a diagram for describing a process of applying a print option stored in a cloud server 22620 to content, which is performed by the cloud server 22610, according to an embodiment.

A user may set an option by using a mobile device 22610 and upload and store a print option set to the cloud server 22620 by using the mobile device 22610. At this time, the cloud server 22620 may store the print option mapped to a user account.

According to an embodiment, the print option may be mapped to identification information of the mobile device 22610, such as the phone number of the mobile device 22610, and be stored in the cloud server 22620. On the other hand, the embodiment is not limited to the use of the mobile device 22610 to set the print option, the user may use a PC to set the print option.

At this time, the user may access a webpage provided by the cloud server 22620 using a web browser embedded in the PC and set the print option in a user interface including a print option provided on the webpage. On the other hand, the print option set on the webpage and the print option set in the mobile device 22620 may be synchronized with each other.

The print option refers to an option that is applicable to content so as to allow the image forming operation to be performed in the image forming apparatus 22630. For example, the print option may include an option regarding color/black-and-white supportability, an option regarding a paper direction, an option regarding double-side printability, and an option regarding to a paper size.

The print option may further include an option regarding direct printing mode/pull printing mode supportability. In particular, when the print mode is set to support the direct printing mode, one of the image forming apparatuses registered in the cloud server 22620 may be set by default. The direct printing mode refers to a printing mode in which content uploaded from the mobile device 22610 to the cloud server 22620 is transmitted to the image forming apparatus 22630 set by default and is output in the image forming apparatus 22630, without being stored in the cloud server 22620. The pull printing mode refers to a printing mode in which content uploaded from the mobile device 22610 to the cloud server 22620 is stored, information designating one of the plurality of registered image forming apparatuses is received from the mobile device 22610 when the cloud server 22620 receives a print request for the content from the mobile device 22610, and the uploaded content is transmitted to the designated image forming apparatus 22630.

Since the image forming apparatuses are able to support different print options, the print option that is able to be set by the user using a mobile device or a computer may be a print option that is supported by all image forming apparatuses. Upon receiving a print request from the mobile device 22610 in the cloud server 22620, it is checked whether the print option stored in the cloud server 22620 is an option that is supported by the image forming apparatus 22630 that is to transmit the content. If not supported, an error message may be sent to the mobile device 22610. For example, when a print request for content is transmitted to the image forming apparatus 22630 that supports only A4, an error occurs when a paper option stored in the cloud server 22620 is set A3. The mobile device 22610 may provide a user with an interface for setting the print option, and the user may change the print option.

On the other hand, the mobile device 22610 transmits the changed print option to the cloud server 22620, and the cloud server 22620 receives the print option from the mobile device 22610. At this time, the received print option may be stored in the cloud server 22610. The previously stored option is changed to the received print option and is stored in the cloud server 22610.

The cloud server 22620 may transmit the content, to which the print option is applied, to the image forming apparatus 22630, and the image forming apparatus 22630 may receive the content, to which the print option is applied, and perform the image forming job on the received content.

Referring to FIG. 226, the mobile device 22610 transmits the print request for the content to the cloud server 22620. It is assumed that, upon transmitting the print request for the content, the mobile device 22610 does not receive a user input of setting a separate print option from a user and does not transmit the separate print option included in the user input together with the print request.

At this time, the phone number of the mobile device 22610, which is included in a USIM chip of the mobile device 22610, may be obtained, and the obtained phone number of the mobile device 22610 may be transmitted together with the print request for the content. Upon receiving the print request for the content, the cloud server 22620 obtains the option stored in the cloud server 22620. That is, the cloud server 22620 may obtain the print option mapped to the phone number of the mobile device 22610 that is transmitted together with the print request for the content. The cloud server 22620 may apply the obtained print option to the content stored in the cloud server 22620 and transmit the content, to which the print option is applied, to the image forming apparatus 22630. The content may be converted to the print data and be transmitted to the image forming apparatus 22630.

When the content is successfully transmitted to the image forming apparatus 22630, the cloud server 22620 may send a message indicating the successful transmission of the content to the mobile device 22610.

When the image forming apparatus 22620 receives the content from the cloud server 22620, the image forming apparatus 22630 may perform the image forming job on the content. Specifically, the image forming apparatus 22630 may print the content.

The embodiment is not limited thereto. The cloud server 22620 may transmit the obtained print option to the image forming apparatus 22630 together with the content mapped to the phone number of the mobile device 22610, and the image forming apparatus 22630 may perform the image forming job on the content by applying the print option to the content received from the cloud server 22620.

FIG. 227 is a diagram for describing a process of applying a print option received from a mobile device 22710 to content, which is performed by a cloud server 22720, according to an embodiment.

A user may set a print option by using the mobile device 22710 and upload and store a print option set to the cloud server 22720 by using the mobile device 22710. At this time, the cloud server 22720 may store the print option mapped to a user account. According to an embodiment, the cloud server 22720 may store the print option mapped to identification information of the mobile device 22710, such as the phone number of the mobile device 22710.

Referring to FIG. 227, the mobile device 22710 sends a print request for content to the cloud server 22720. It is assumed that upon sending the print request for the content, the mobile device 22710 receives a user input of setting a separate print option from a user and sends the separate print option included in the user input together with the print request.

At this time, the phone number of the mobile device 22710, which is embedded in a USIM chip of the mobile device 22710, may be obtained, and the obtained phone number of the mobile device 22710 may be sent together with the print request for the content. When the cloud server 22720 receives the print request for the content together with the print option, the cloud server 22720 may apply the received print option to the requested content. That is, when the cloud server 22720 receives the print request for the content together with the print option, the option stored in the cloud server 22720 is not used. The cloud server 22720 may apply the obtained print option to the content stored in the cloud server 22720 and transmit the content, to which the print option is applied, to the image forming apparatus 22730. At this time, the content may be converted to print data and be transmitted to the image forming apparatus 22730.

When the content is successfully transmitted to the image forming apparatus 22730, the cloud server 22720 may send a message indicating the successful transmission of the content to the mobile device 22710.

When the image forming apparatus 22730 receives the content from the cloud server 22720, the image forming apparatus 22730 may perform the image forming job on the content. Specifically, the image forming apparatus 22730 may print the content.

At this time, the cloud server 22720 may temporarily apply the print option received from the mobile device 22710 to the content and does not change the previously stored print option. However, the embodiment is not limited thereto, and the previously stored print option may be changed and synchronized.

FIG. 228 is a diagram for describing a process of uploading content, including a webpage or an email, to a cloud server 22840, according to an embodiment.

Referring to FIG. 228, a user executes a cloud printing service application by using a mobile device 22810. The mobile device 22810 displays icons that allow the user to select a type of content to be uploaded on a screen of the mobile device 22810.

It is assumed that the user selects a web icon 22811 and an email icon 22812 among the icons regarding the type of the content displayed on the screen of the mobile device 22810.

If the user selects the web icon 22811 by using the mobile device 22810, a web browser is executed and a webpage is displayed on the screen of the mobile device 22810. That is, if the user performs web surfing by using the mobile device 22810, the mobile device 22810 receives a webpage from a web server 22820 through an HTTP and displays the received webpage on the screen of the mobile device 22810. On the other hand, when the displayed webpage is uploaded to the cloud server 22840 as content, the user selects "Send Job" by using the mobile device 22810 in a state in which the relevant webpage is displayed.

When the user selects "Send Job" by using the mobile device 22810, page data may be generated by dividing the webpage currently displayed on the screen by page. The generated page data is converted to image data, such as PNG or JPEG, and the image data is transmitted to the cloud server 22840. When the cloud server 22840 receives the image data generated by the mobile device 22810, the cloud server 22840 may store the relevant image data. When the cloud server 22840 receives a print request for content by using the mobile device 22810, the cloud server 22840 may transmit the stored content (image data) to an image forming apparatus 22850, and the image forming apparatus 22850 may receive the relevant content and print the received content.

If the user selects the email icon 22812 by using the mobile device 22810, the contents included in the email is displayed on the screen of the mobile device 22810. That is, the user inputs a user account/password by using the mobile device 22810 or connects to an mail server 22830 by using the prestored user account/password. In order for the user to check the email stored in the mail server 22830, the mobile device 22810 receives the email from the mail server 22830 through POP3 or IMAP and displays the received email. When the displayed email is uploaded to the cloud server 22840 as content, the user selects "Send Job" by using the mobile device 22810 in a state in which the relevant email is displayed.

When the user selects "Send Job" by using the mobile device 22810, page data may be generated by dividing the webpage currently displayed on the screen by page. The generated page data is converted to image data, such as PNG or JPEG, and the image data is transmitted to the cloud server 22840. When the cloud server 22840 receives the image data generated by the mobile device 22810, the cloud server 22840 may store the relevant image data. When the cloud server 22840 receives a print request for content by using the mobile device 22810, the cloud server 22840 may transmit the stored content (image data) to the image forming apparatus 22850, and the image forming apparatus 22850 may receive the relevant content and print the received content.

On the other hand, the mobile device 22810 may generate page data based on a paper size. That is, when the mobile device 22810 receives HTML data or email data from the web server 22820 or the mail server 22830, the mobile device 22850 may extract a raw image of an entire page from the HTML data or the email data and divide raw image data to page images, based on a selected page height/width.

FIG. 229A is a diagram illustrating a user interface of a mobile device that sets a print option, according to an embodiment.

Referring to FIG. 229A, when a user intends to print content uploaded to a cloud server or content stored in the mobile device by using the mobile device, the mobile device 22910 may obtain preview data of content to be printed and display the obtained preview data on a preview screen 22910 of the mobile device, and the user may check the content in advance through the preview screen 22910. On the other hand, the user may set a simple print option 22920 displayed on the preview screen 22910 of the mobile device. At this time, the simple print option 22920 may display a print option stored in the cloud server. The user may select the simple print option 22920 and changes the user print option. A print request for the previewed content may be transmitted to the cloud server together with the changed print option. The cloud server may receive the print request for the content together with the changed print option, generate print data by applying the received print option to the content, transmit the generated print data to the image forming apparatus, and perform the image forming job on the received print data. On the other hand, the print option stored in the cloud server is replaced with the print option transmitted together with the print request for the content and the print option may be stored in the cloud server. The embodiment is not limited to the preview screen 22910. The user may select a print option displayed on a different screen and change the selected print option.

When the user selects a setting icon 22930 on the preview screen 22910 of the mobile device by using the mobile device, the mobile device displays the setting screen 22930. Here, various print options 22940 may be set. When the user selects the print options 22940, the selected print options are transmitted to the cloud serve and replace the print option stored in the cloud server. The print options are stored and synchronized.

FIG. 229B is a diagram illustrating a user interface on a web that sets a print option, according to an embodiment.

A user may access a web server included in a cloud server by using a user device or a PC and set print options. In other words, the user may select option values of print option items 22950 through a UI screen of FIG. 229B displayed on the user device or the PC. If an image forming apparatus for performing a print job is selected, the UI screen may display print option items that are selectable according to the selected image forming apparatus.

Meanwhile, if the user selects the option values of the print options items 22950 and selects a save icon 22960, the selected option values are stored in a cloud server. Here, the selected option values may be mapped to a user's account and stored in the cloud server.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

While embodiments been particularly shown and described above, it will be understood by those of ordinary skill in the art that various changes in form and details may be made therein without departing from the spirit and scope of the disclosure as defined by the appended claims. Embodiments should be considered in a descriptive sense only and not for purposes of limitation. Therefore, the scope of the disclosure is defined not by the detailed description but by the appended claims, and all differences within the scope will be construed as being included in the present disclosure.

What is claimed is:

1. At least one server comprising:

at least one memory to store information indicating correspondences of image forming devices to identification information of mobile devices; and at least one controller configured to:

receive, from a first mobile device, content and identification information of a second mobile device as a destination of the content, receive a printing request of the second mobile device for the content, and in response to the received printing request, transmit the content to an image forming apparatus corresponding to the identification information of the second mobile device in the stored information indicating correspondences.

2. The at least one server of claim 1, wherein:

the stored information indicating correspondences of image forming apparatuses to identification information includes at least two image forming apparatuses corresponding to the identification information of the second mobile device, and to transmit the content to the image forming apparatus, the at least one controller supports selection of an image forming apparatus from the at least two image forming apparatuses, and transmits the content to the selected image forming apparatus.

3. The at least one server of claim 1, wherein the second mobile device is a mobile phone, and the identification information of the second mobile device is a phone number of the second mobile device.

4. The at least one server of claim 1, wherein:

the at least one controller receives information of the content, and the information of the content includes at least one of location information, identification information for retrieval of the content.

5. The at least one server of claim 1, wherein to transmit the content to the image forming apparatus, the at least one controller converts the content into a printing data and transmits the printing data to the image forming apparatus.

6. The at least one server of claim 1, wherein the at least one controller transmits a notification to the second mobile device, according to the received content.

7. The at least one server of claim 1, wherein the at least one controller transmits a list of contents to the second mobile device, according to a request of the second mobile device.

8. The at least one server of claim 1, wherein the at least one controller transmits a preview of the content, according to a request of the second mobile device for the content.

9. The at least one server of claim 1, wherein the at least one controller supports changing the content, according to a request of the second mobile device.

10. The at least one server of claim 1, wherein the at least one controller supports registration of the image forming apparatus to correspond to the identification information of the second mobile device, according to a request to register the image forming apparatus.

11. A method comprising:

performing, by at least one server:

storing, in at least one memory, information indicating correspondences of image forming apparatuses to identification information of mobile devices;

receiving, from a first mobile device, content and identification information of a second mobile device as a destination of the content;

receiving a printing request of the second mobile device for the content; and in response to the received printing request, transmitting the content to an image forming apparatus corresponding to the identification information of the second mobile device in the stored information indicating correspondences.

12. The method of claim 11, wherein:

the stored information indicating correspondences of image forming apparatuses to identification information includes at least two image forming apparatuses corresponding to the identification information of the second mobile device, and the transmitting of the content to the image forming apparatus comprises supporting selection of an image forming apparatus from the at least two image forming apparatuses, and transmitting the content to the selected image forming apparatus.

13. The method of claim 11, wherein the second mobile device is a mobile phone and the identification information of the second mobile device is a phone number of the second mobile device.

14. The method of claim 11, wherein:

the receiving receives information of the content, and the information of the content includes at least one of location information, identification information for retrieval of the content.

15. The method of claim 11, wherein the transmitting of the content to the image forming apparatus comprises converting the content into a printing data and transmitting the printing data to the image forming apparatus.

16. The method of claim 11, wherein the at least one server further performs transmitting a notification to the second mobile device, according to the received content.

17. The method of claim 11, wherein the at least one server further performs transmitting a list of contents to the second mobile device, according to a request of the second mobile device.

18. The method of claim 11, wherein the at least one server further performs transmitting a preview of the content according to a request of the second mobile device for the content.

19. The method of claim 11, wherein the at least one server further performs supporting changing the content, according to a request of the second mobile device.

20. The method of claim 11, wherein the at least one server further performs supporting registration of the image forming apparatus to correspond to the identification information of the second mobile device, according to a request to register the image forming apparatus.

21. An image forming apparatus comprising:

a communication interface configured to communicate with at least one server, wherein content and identification information of a first mobile device as a destination of the content is receivable by the at least one server from a second mobile device, and the image forming apparatus is correspondable to the identification information of the first mobile device; and a controller configured to:

receive a job to print the content from the at least one server in response to a printing request of the first mobile device for the content being received by the at least one server and the image forming apparatus being corresponded to the identification information of the first mobile device.

22. The image forming apparatus of claim 21, wherein the controller supports causing the at least one server to store a list of mobile devices for determining permissions of the mobile devices with regard to printing requests, so that the at least one server confirms, according to the list, a permission of the first mobile device with regard to the printing request for the content.

23. A non-transitory computer-readable medium storing computer readable instructions which when executed by at least one controller of at least one server cause the at least one server to perform:

storing, in at least one memory, information indicating correspondences of image forming apparatuses to identification information of mobile devices;

receiving, from a first mobile device, content and identification information of a second mobile device as a destination of the content;

receiving a printing request of the second mobile device for the content; and in response to the received printing request, transmitting the content to an image forming apparatus corresponding to the identification information of the second mobile device in the stored information indicating correspondences.

* * * * *